(12) United States Patent
Haghighat et al.

(10) Patent No.: US 11,922,220 B2
(45) Date of Patent: Mar. 5, 2024

(54) FUNCTION AS A SERVICE (FAAS) SYSTEM ENHANCEMENTS

(71) Applicant: Intel Corporation, Santa Clara, CA (US)

(72) Inventors: Mohammad R. Haghighat, San Jose, CA (US); Kshitij Doshi, Tempe, AZ (US); Andrew J. Herdrich, Hillsboro, OR (US); Anup Mohan, Milpitas, CA (US); Ravishankar R. Iyer, Portland, OR (US); Mingqiu Sun, Beaverton, OR (US); Krishna Bhuyan, Sammamish, WA (US); Teck Joo Goh, Saratoga, CA (US); Mohan J. Kumar, Aloha, OR (US); Michael Prinke, Aloha, OR (US); Michael Lemay, Hillsboro, OR (US); Leeor Peled, Magal (IL); Jr-Shian Tsai, Portland, OR (US); David M. Durham, Beaverton, OR (US); Jeffrey D. Chamberlain, Tracy, CA (US); Vadim A. Sukhomlinov, Santa Clara, CA (US); Eric J. Dahlen, Sherwood, OR (US); Sara Baghsorkhi, Los Gatos, CA (US); Harshad Sane, Portland, OR (US); Areg Melik-Adamyan, Austin, TX (US); Ravi Sahita, Portland, OR (US); Dmitry Yurievich Babokin, San Jose, CA (US); Ian M. Steiner, Portland, OR (US); Alexander Bachmutsky, Sunnyvale, CA (US); Anil Rao, Menlo Park, CA (US); Mingwei Zhang, Hillsboro, OR (US); Nilesh K. Jain, Portland, OR (US); Amin Firoozshahian, Mountain View, CA (US); Baiju V. Patel, Portland, OR (US); Wenyong Huang, Beijing (CN); Yeluri Raghuram, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 410 days.

(21) Appl. No.: 17/255,588

(22) PCT Filed: Apr. 16, 2019

(86) PCT No.: PCT/US2019/027659
§ 371 (c)(1),
(2) Date: Dec. 23, 2020

(87) PCT Pub. No.: WO2020/096639
PCT Pub. Date: May 14, 2020

(65) Prior Publication Data
US 2021/0263779 A1    Aug. 26, 2021

Related U.S. Application Data

(63) Continuation of application No. PCT/CN2018/114602, filed on Nov. 8, 2018.

(51) Int. Cl.
*G06F 9/50* (2006.01)
*G06F 9/52* (2006.01)
(Continued)

(52) U.S. Cl.
CPC .............. *G06F 9/5061* (2013.01); *G06F 9/52* (2013.01); *G06F 11/302* (2013.01);
(Continued)

(58) Field of Classification Search
CPC ........ G06F 9/5061; G06F 9/52; G06F 11/302; G06F 11/3495; G06F 21/53;
(Continued)

(56) References Cited

U.S. PATENT DOCUMENTS

| 6,430,570 B1 * | 8/2002 | Judge .................. G06F 9/44594 707/999.102 |
| 8,510,759 B1 | 8/2013 | Megowan |

(Continued)

FOREIGN PATENT DOCUMENTS

WO    2018144060 A1    8/2018

OTHER PUBLICATIONS

W. Lloyd et al., "Serverless Computing: An Investigation of Factors Influencing Microservice Performance", Apr. 17, 2018, 11 pages.
(Continued)

*Primary Examiner* — Jorge A Chu Joy-Davila
(74) *Attorney, Agent, or Firm* — Jordan IP Law, LLC

(57) ABSTRACT

Embodiments of systems, apparatuses and methods provide enhanced function as a service (FaaS) to users, e.g., computer developers and cloud service providers (CSPs). A computing system configured to provide such enhanced FaaS service include one or more controls architectural subsystems, software and orchestration subsystems, network and storage subsystems, and security subsystems. The com-
(Continued)

puting system executes functions in response to events triggered by the users in an execution environment provided by the architectural subsystems, which represent an abstraction of execution management and shield the users from the burden of managing the execution. The software and orchestration subsystems allocate computing resources for the function execution by intelligently spinning up and down containers for function code with decreased instantiation latency and increased execution scalability while maintaining secured execution. Furthermore, the computing system enables customers to pay only when their code gets executed with a granular billing down to millisecond increments.

30 Claims, 118 Drawing Sheets

(51) Int. Cl.
  *G06F 11/30* (2006.01)
  *G06F 11/34* (2006.01)
  *G06F 21/53* (2013.01)
  *G06F 21/56* (2013.01)
  *G06F 21/60* (2013.01)
  *G06N 20/00* (2019.01)

(52) U.S. Cl.
  CPC .......... *G06F 11/3495* (2013.01); *G06F 21/53* (2013.01); *G06F 21/604* (2013.01); *G06F 21/56* (2013.01); *G06F 2209/521* (2013.01); *G06F 2221/033* (2013.01); *G06N 20/00* (2019.01)

(58) Field of Classification Search
  CPC .. G06F 21/604; G06F 21/56; G06F 2209/521; G06F 2221/033; G06F 2201/865; G06F 2201/88; G06F 2221/2105; G06F 11/3409; G06F 11/3419; G06F 21/78; G06F 2209/502; G06F 9/5005; G06F 11/301; G06N 20/00
  See application file for complete search history.

(56) References Cited

U.S. PATENT DOCUMENTS

| | | | |
|---|---|---|---|
| 9,880,947 | B2 | 1/2018 | Rubira Branco et al. |
| 10,121,021 | B1 | 11/2018 | Fonseka et al. |
| 10,771,554 | B2 | 9/2020 | Sukhomlinov et al. |
| 11,372,689 | B1* | 6/2022 | Allen .................. G06F 9/4887 |
| 2008/0221911 | A1* | 9/2008 | Cherkasova ........... G06Q 10/06 705/1.1 |
| 2018/0034924 | A1 | 2/2018 | Horwood |
| 2018/0113793 | A1 | 4/2018 | Fink et al. |
| 2018/0115551 | A1 | 4/2018 | Cole |
| 2018/0143858 | A1* | 5/2018 | Sanjabi ................ G06F 9/5011 |
| 2018/0254998 | A1 | 9/2018 | Cello et al. |
| 2019/0042315 | A1* | 2/2019 | Smith .................. G06F 9/5077 |
| 2019/0042339 | A1 | 2/2019 | Doshi et al. |
| 2019/0044971 | A1 | 2/2019 | Sukhomlinov et al. |
| 2019/0045037 | A1 | 2/2019 | Sukhomlinov et al. |
| 2019/0080090 | A1* | 3/2019 | Li ........................ G06F 21/566 |
| 2019/0104178 | A1 | 4/2019 | Sukhomlinov et al. |
| 2021/0149742 | A1* | 5/2021 | Turanyi ................. H04L 67/51 |

OTHER PUBLICATIONS

A. Mampage et al., "A Holistic View on Resource Management in Serverless Computing Environments: Taxonomy and Future Directions", Jun. 1, 2021, 32 pages, New York, US.
European Search Report for EPO Patent Application No. 19882848.5, dated Jul. 7, 2022, 22 pages.
Reto Achermann, "Separating Translation for Protection in Address Spaces with Dynamic Remapping", HotOS 2017, May 8, 2017, 7 pages, Whistler BC Canda.
Wikipedia, "Bloom filter", Wikipedia.org, Jun. 19, 2018, 16 pages.
Wikipedia, "Global Descriptor Table", Wikipedia.org, May 7, 2018, 4 pages.
Andrew Herdrich et al., "SMT QoS: Hardware Prototyping of Thread-level Performance Differentiation Mechanisms", HotPar'12, Jun. 7, 2012, 6 pages, Usenix, Berkeley California.
Baiju Patel, "Intel Releases New Technology Specification for Memory Encryption", <software.intel.com/en-us/blogs/2017/12/22/intel-releases-new-technology-specification-for-memory-encryption>, Dec. 22, 2017, 3 pages.
Wikipedia, "Anonymous function", Wikipedia.org, Aug. 15, 2018, 29 pages.
"Intel Architecture Memory Encryption Technologies Specification", Dec. 2017, Rev: 1.1, 30 pages.
Github, "Network Function Framework for Go (former YANFF)", retrieved Aug. 9, 2018, 5 pages.
Scott Ward, "NGINX Plus on AWS", Oct. 2014, 31 pages, Amazon Web Services.
Eric Jonas et al., "Cloud Programming Simplified: A Berkeley View on Serverless Computing", Technical Report No. UCB/EECS-2019-9, Feb. 10, 2019, 35 pages, Electrical Engineering and Computer Sciences University of California at Berkeley.
Micrsoft Docs, "What are Durable Functions?", Durable Functions Overview—Azure, Dec. 21, 2018, 3 pages.
Microsoft Docs, "Trusted Platform Module Technology Overview", Trusted Platform Module Technology Overview (Windows 10), Nov. 28, 2018, 4 pages.
Markus Thommes, "Squeezing the milliseconds: How to make serverless platforms blazing fast!", Medium.com, Apr. 20, 2017, 9 pages.
Tim Wagner, "Understanding Container Reuse in AWS Lambda," AWS Compute Blog, Dec. 31, 2014, 4 pages.
Robert N. M. Watson et al., "Capability Hardware Enhanced RISC Instructions (CHERI): Notes on the Meltdown and Spectre Attacks", Technical Report, Feb. 2018, 16 pages, No. 916, University of Cambridge Computer Laboratory.
Hyungro Lee et al., "OpenWhisk Experiment Documentation", Jun. 29, 2018, 15 pages, Release 0.1, Apache.
Wikipedia, "Remote Procedure Call", Wikipedia.org, Jul. 14, 2018, 5 pages.
Wikipedia, "Virtual Method Table", Wikipedia.org, Apr. 14, 2018, 5 pages.
Rodric Rabbah, "Introducing Serverless Composition for IBM Cloud Functions", IBM Cloud Blog, Oct. 10, 2017, 8 pages.
International Search Report and Written Opinion for International Patent Application No. PCT/US2019/027659, dated Sep. 25, 2019, 10 pages.

* cited by examiner

FLB

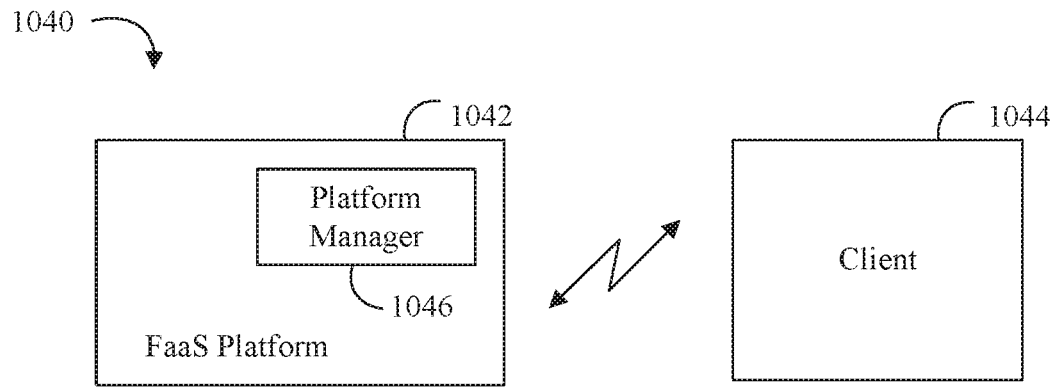
FIG. 10B
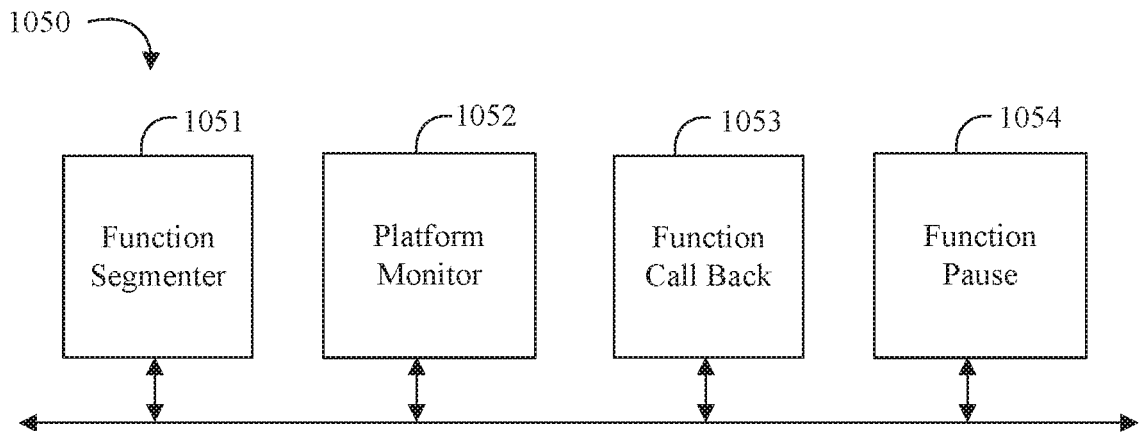
FIG. 10C
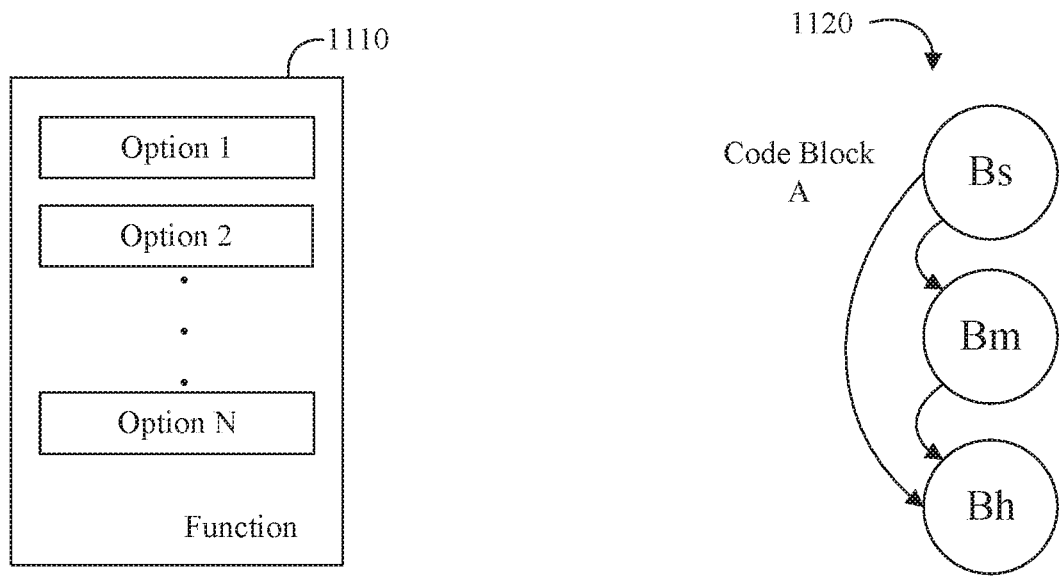
FIG. 11A
FIG. 11B

2640

| Caller 3302 | Arguments 3304 | Other Field(s) 3306 | File System Path 3308 | Database Tablespace Range 3310 |

4120 — Associate Resource Characteristics with Executed Functions to Generate Demand Fingerprints of the Executed Functions at Each Stage of Execution 4130 — Generate Detailed Reports on the Usage of Different Resources at Multiple Stages of Execution of the Functions 4140 — Schedule the Execution of Functions and Allocate Resources to the Functions Based on the Generated Reports

FIG. 41C

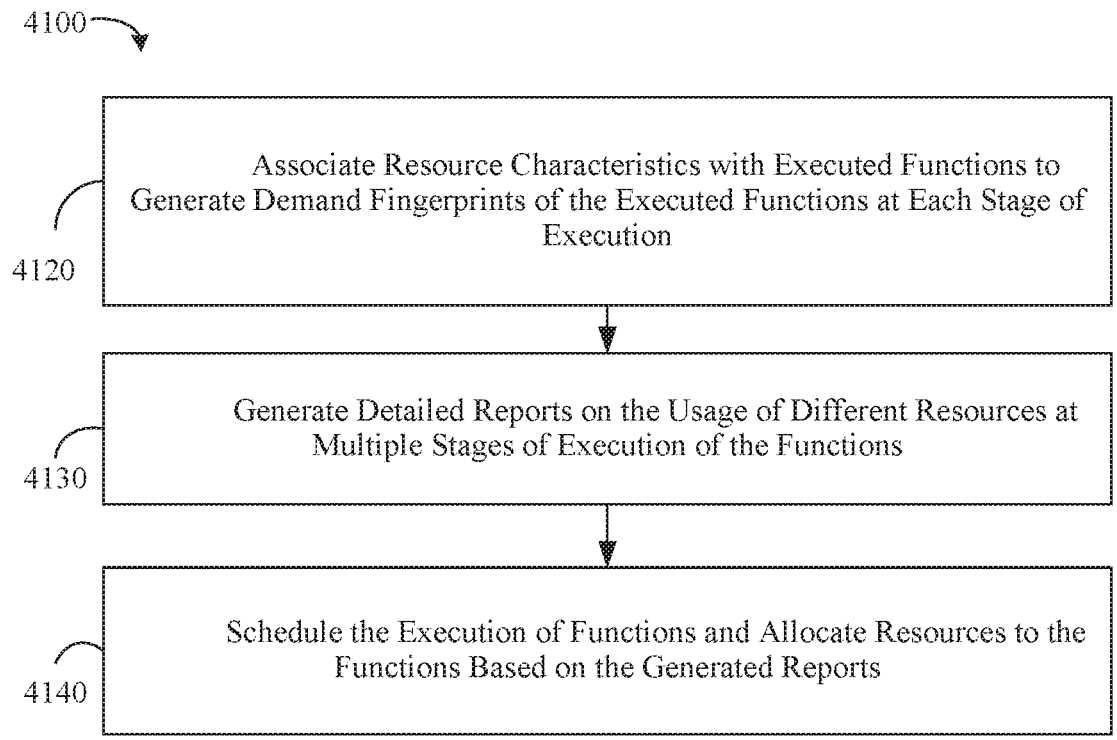

4542 — Intercept a remote procedure call from a first network function at an application layer of a network stack prior to packetization of the remote procedure call 4544 — Conduct an instantiation of a second network function associated with the remote procedure call, wherein the instantiation is to bypass one or more of a transport layer of the network stack or a network layer of the network stack

FIG. 45B

FUNCTION AS A SERVICE (FAAS) SYSTEM ENHANCEMENTS

CROSS REFERENCE TO RELATED APPLICATIONS

The present application is a U.S. National Phase Patent Application which claims the benefit of priority to International Patent Application No. PCT/US2019/027659 filed on Apr. 16, 2019, which claims the benefit of priority to International Provisional Patent Application No. PCT/CN2018/114602 filed on Nov. 8, 2018.

BACKGROUND

Function as a Service (FaaS) is an event-oriented highly-scalable computer code execution model that typically provisions a single purpose application programming interface (API) endpoint on a cloud computing infrastructure to receive and run the code execution requests for a small amount of time. Such code execution requests and/or executions of requested code are variously and commonly referred to as lambdas, functions, actions, and/or run-to-completion procedures. In this application, the term "Function" and/or "function" may refer to any of these code execution requests and the execution of these requests, whether such execution proceeds as software, or as actions that proceed in hardware or any combination thereof. That is, the terms "function" and "Function" as used herein may generally refer to a FaaS function unless explicitly stated otherwise and/or implied otherwise through context. FaaS may therefore be considered as a step in the evolution of cloud computing. Sometimes also referred to as "Serverless Computing," FaaS may enable software developers to write highly-scalable code but without the cost, time, and expense required to provision or otherwise pre-define the hardware or application software resources that execution of the code will involve. FaaS may also enable Cloud Service Providers (CSPs) to increase resource usage due to better allocation (e.g., bin packing).

Compute units of scale have been changing over time with an increasing focus on business logic and decreasing concern/control over the cloud stack implementation. FaaS abstracts a runtime environment such as the Common Language Runtime (CLR) and execution context lifecycle. Users, e.g., application developers, and CSPs can capture significant value through FaaS. For example, developers build applications such as function code using high level language and upload the function code to a FaaS platform for execution. The developers simply use the FaaS platform without hosting it themselves and the infrastructure of the FaaS platform is opaque to the users.

In case of CSPs, while a CSP may use its portfolio of functions as services as a key differentiator, there remains considerable room for improvement. For example, concerns remain around "proprietary lock-in" as function code written and deployed in the cloud becomes inextricably linked with the CSP provided functions at that moment in time. This proprietary lock-in means that applications become optimized for a specific cloud environment. Accordingly, moving functions between CSPs could sacrifice performance and responsiveness of an application in addition to resulting in situations where some of the CSP-provided functions are not supported by other CSPs.

FIG. 2A illustrates a generalized existing serverless service platform 203 for providing function as a service, which receives serverless function code 201 uploaded by a computer application developer, and executes the function code 201 triggered by a corresponding event. The application developer of the serverless function code 201 may pay an amount that corresponds to only when the serverless function code 201 is invoked and/or runs in the serverless services platform 203. As shown in FIG. 2A, the serverless service platform 203 has a serverless services manager 203a to receive the serverless function code 201, and store the serverless function code 201 to a storage, and schedule the execution of the serverless function code 201 using required computer resources such as containers. The serverless service platform 203 may also include a networking and messaging module 203b to trigger and route one or more events associated with executing the serverless function code 201 among end-points of a CSP network. The serverless service platform 203 may also include a security and access manager 203c, and one or more storage services 203d. The security and access manager 203c is responsible for providing security in executing the serverless function code 201. For example, the security and access manager 203c may verify access to various computer resources and/or privileges associated with executing the serverless function code 201. The storage services 203d may include an object storage (e.g., S3 of Amazon AWS' Lambda), a key-value database (e.g., DynamoDB of Amazon's AWS services) and/or a mobile backend database (e.g., Cloud Firestore of Google's Cloud Functions) to provide specialized backend services. The storage services 203d may also enable big data services including big data query (e.g., AWS Athena and Google BigQuery) and big data transform (e.g., AWS Glue and Google Cloud Dataflow). The serverless service platform 203 enables the serverless services through a serverless services architecture 203e (e.g., the architecture of AWS Lambda, the architecture of Google CloudPlatform, and/or the architecture of Azure Functions), and one or more hardware associated elements such as hardware assisted virtual machines, CPUs, GPUs and accelerators.

There are challenges for existing FaaS solutions such as the one shown in FIG. 2A. For example, existing FaaS solutions typically provide an immature developer tools ecosystem. Further, existing FaaS solutions frequently require unpredictable and costly cold starts which comprise readying the necessary execution environment in addition to running the code, and this incurs high, variable and unpredictable latency. Taking on-the-fly video encoding application as an example, existing solutions, which may use an object store, are too slow to support fine-grained communication and/or suffer from a lengthy latency before serverless function code gets executed.

Furthermore, existing FaaS solutions currently suffer from limited control and difficulty in managing code execution states. Taking machine learning training at scale as an example, existing FaaS solutions, such as the one shown in FIG. 2A, face challenges in achieving desirable high scalability due to lack of fast and/or shared memory, as well as lack of sufficient support for networking connectivity.

Additionally, FaaS introduces an extra layer of abstraction, which makes it more difficult to expose and exercise distinctive and/or new infrastructure features in processors, platforms, or systems, such as computer architectures for supporting hardware heterogeneity by existing FaaS solutions. In other words, while existing FaaS solutions may abstract software development, such abstraction may lead to difficulty in efficiently utilizing the hardware architectures to execute the software code.

BRIEF DESCRIPTION OF THE DRAWINGS

The various advantages of the embodiments will become apparent to one skilled in the art by reading the following specification and appended claims, and by referencing the following drawings, in which:

FIG. 10B is a block diagram of another example of a FaaS system with feedback support according to an embodiment;

FIG. 10C is a block diagram of another example of a FaaS system with feedback support according to an embodiment;

FIG. 11A is an illustrative diagram of an example of a function having multiple options for instantiation according to an embodiment;

FIG. 11B is a block diagram of another example of a FaaS system supporting functions having multiple options for instantiation according to an embodiment;

FIG. 33A is an example of enhanced function construct of a function of FaaS according to an embodiment;

FIG. 41C is an example of a method of efficient FaaS resource management using demand fingerprints according to an embodiment;

FIG. 41D is an example of a demand fingerprint according to an embodiment;

FIG. 45B is a flowchart of operating a runtime framework according to an embodiment;

FIG. 47A is an illustration of an example of a parameter marshalling solution according to an embodiment;

FIG. 47B is a diagram of an example of a high-level architecture that uniformly invokes functions across platforms according to an embodiment;

FIG. 47C is a flowchart of marshalling function parameters according to an embodiment;

FIG. 48A is a block diagram of an example of a transfer of capability information between functions according to an embodiment;

FIG. 48B is a block diagram of an example of encoded inline capability (EIC) information according to an embodiment;

FIG. 48C is a block diagram of an example of a hardware queue manager according to an embodiment;

FIG. 48D is a flowchart of operating a hardware queue manager according to an embodiment;

FIG. 48E is a flowchart of enqueueing a capability according to an embodiment;

FIG. 48F is a flowchart of dequeuing a capability according to an embodiment;

FIG. 49A is an illustration of an example of a mapping between key identifiers and keys according to an embodiment;

FIG. 49B is a block diagram of an example of a single address space according to an embodiment;

FIG. 49C is a block diagram of an example of a context switch according to an embodiment;

Figure 49A:
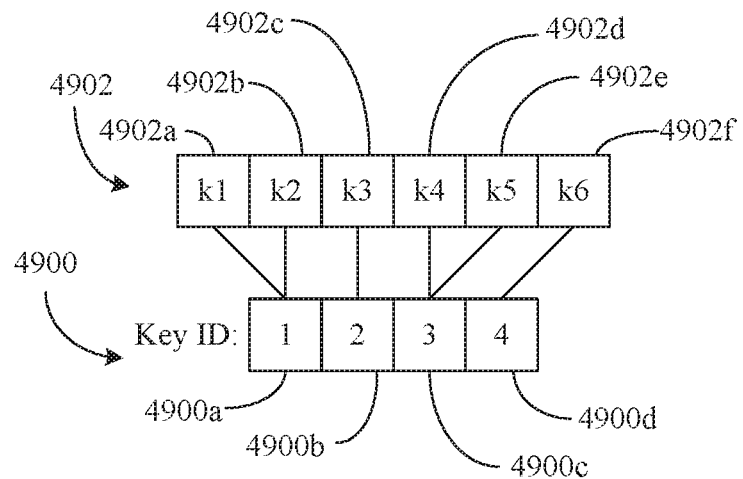
Figure 49B:
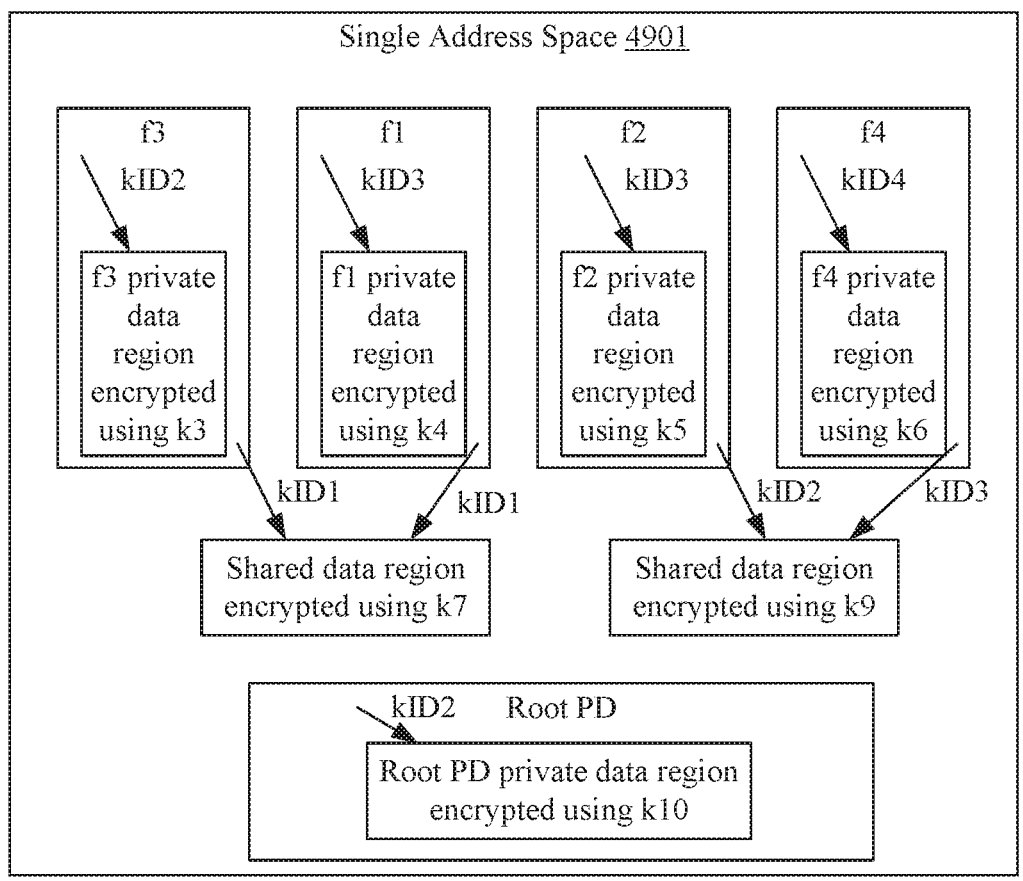
Figure 49C:
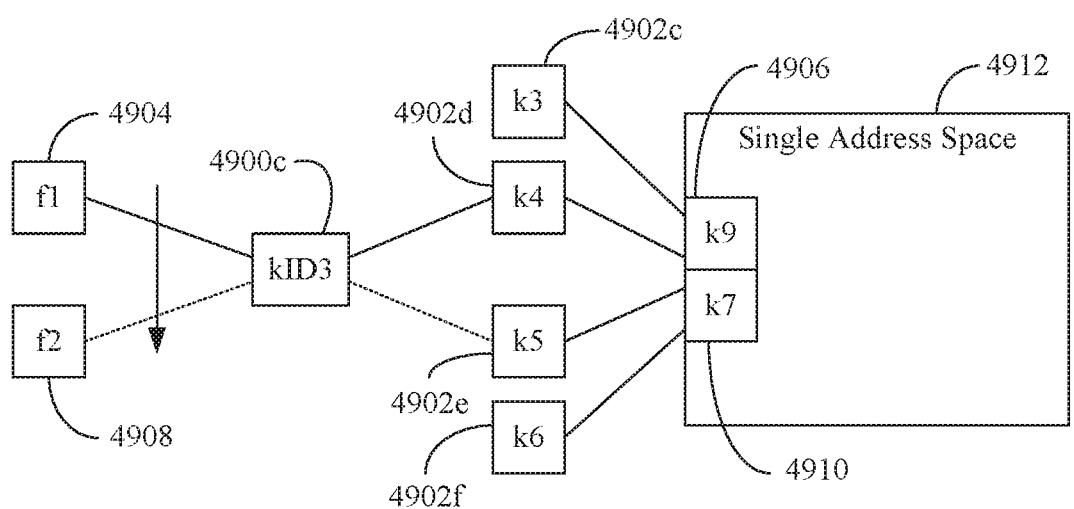
Figure 49D:
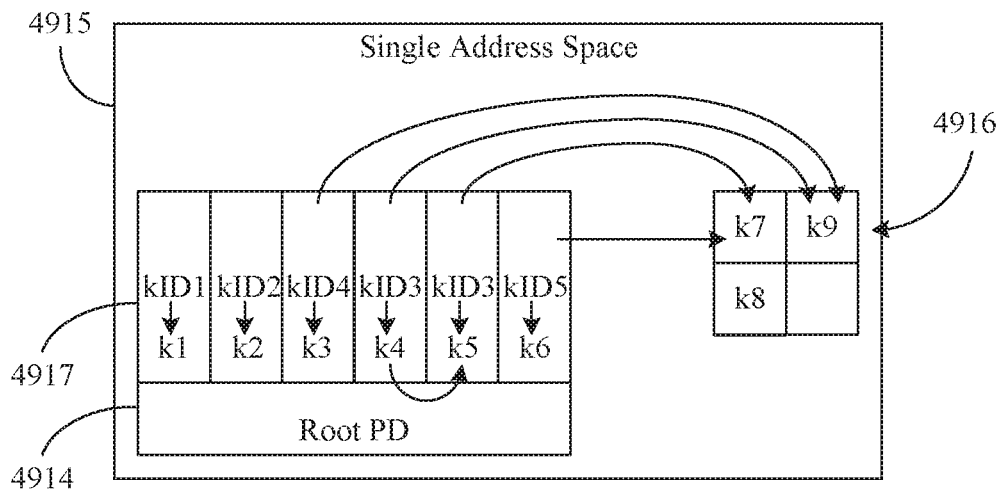
Figure 49E:
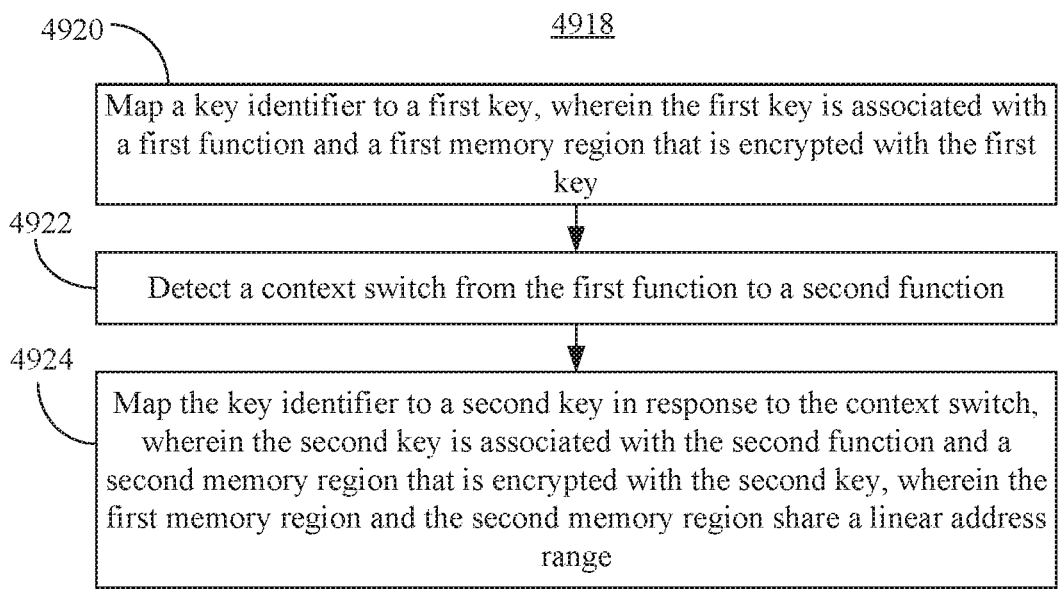
Figure 49F:
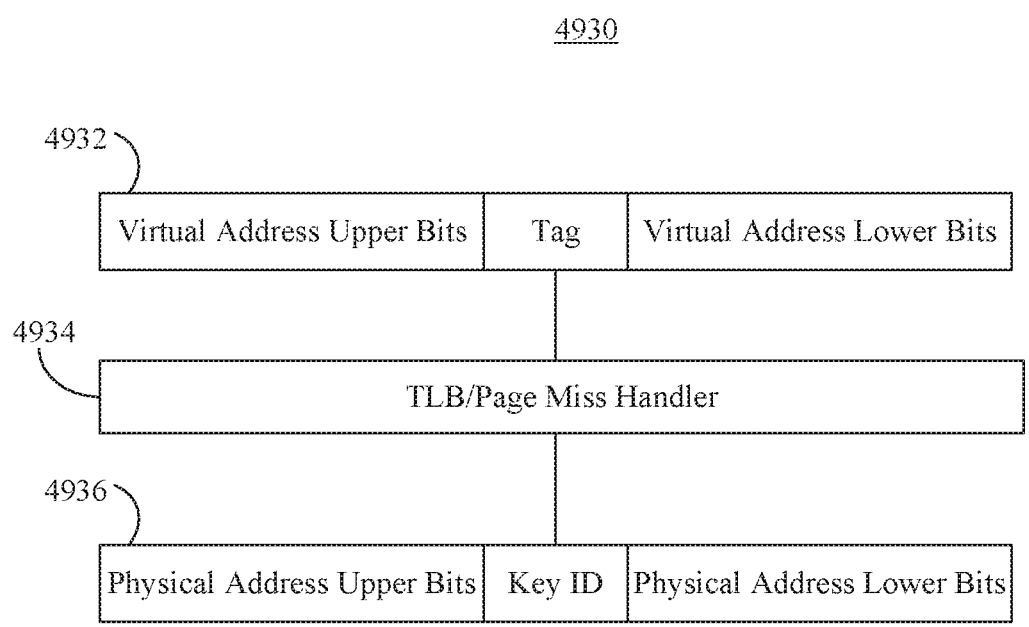
Figure 50A:
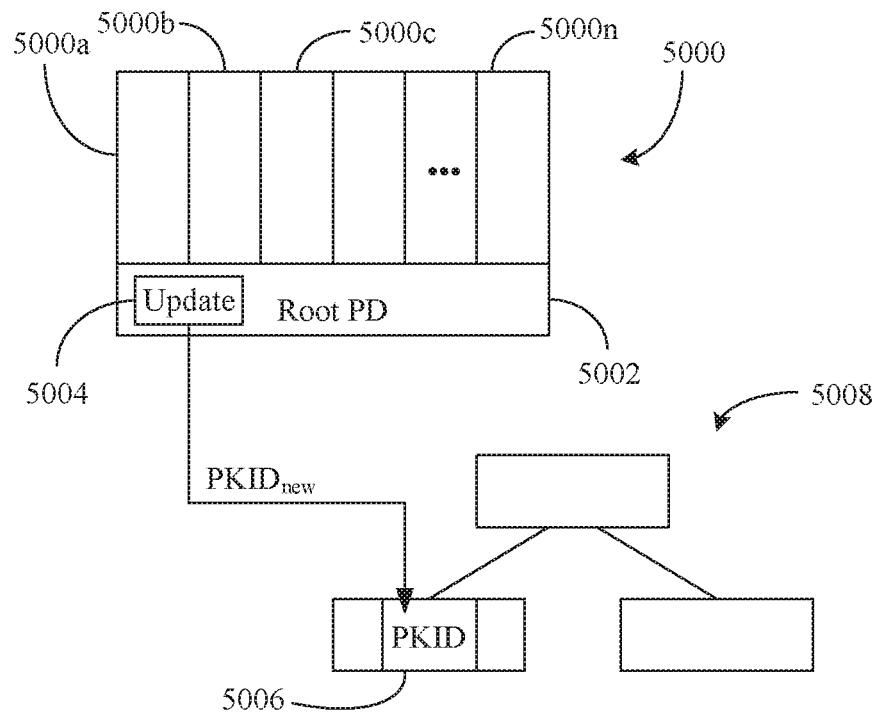
Figure 50B:
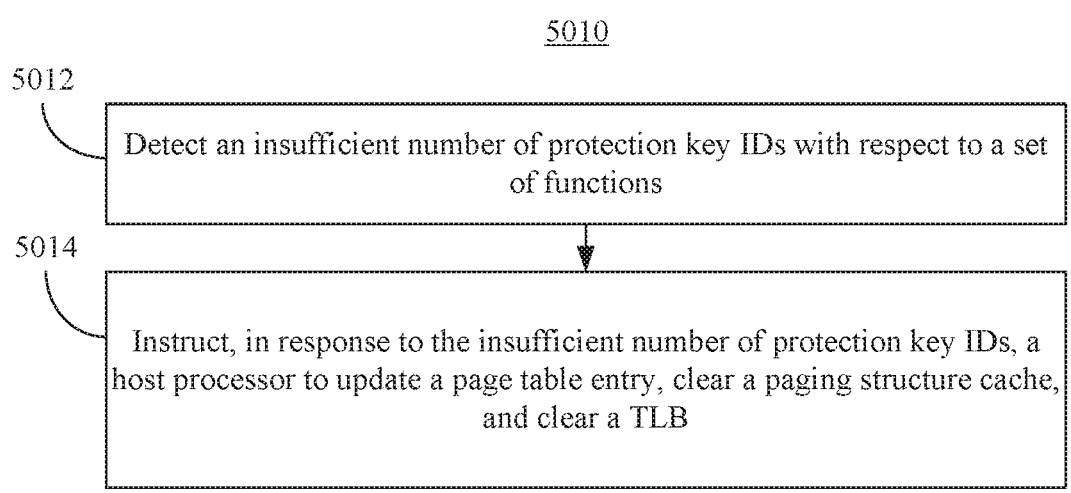
Figure 51A:
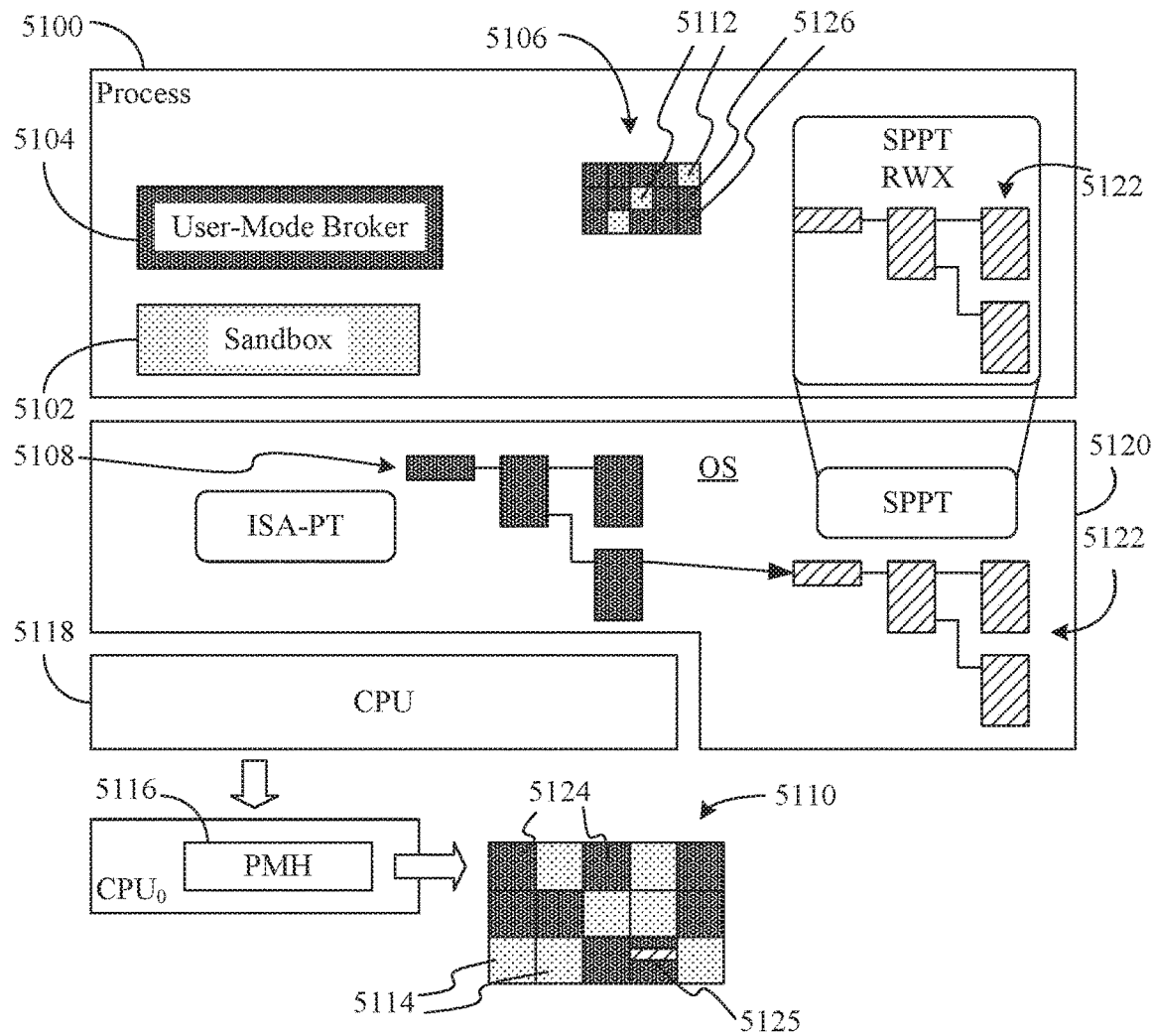
Figure 51B:
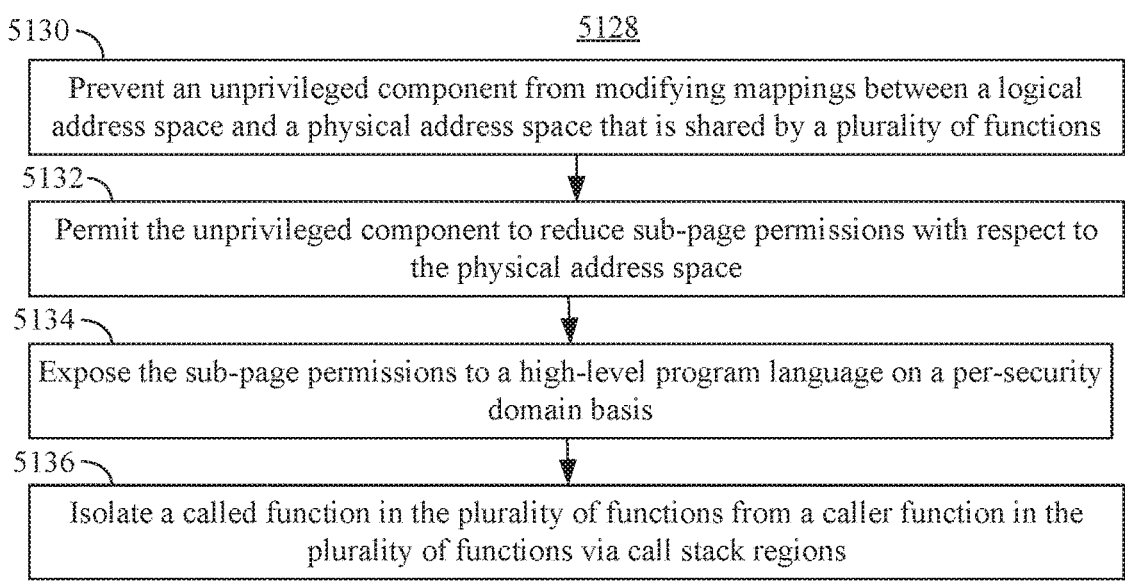
Figure 52A:
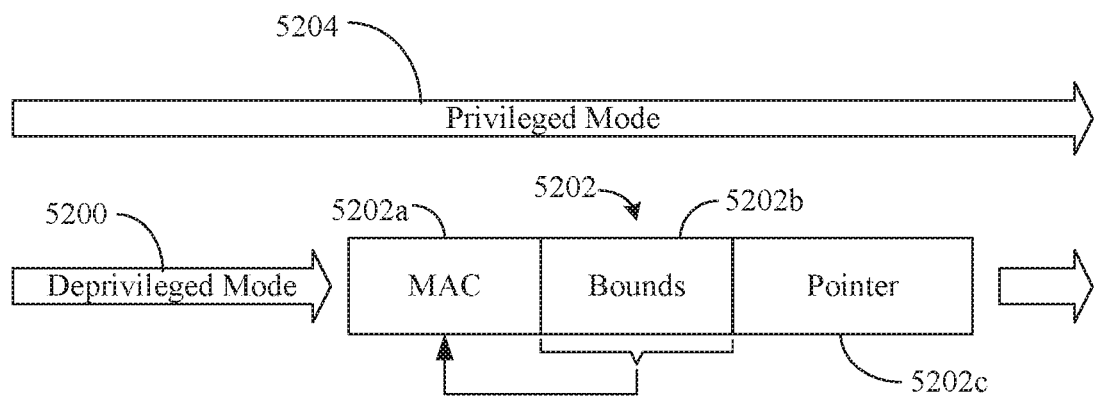
Figure 52B:
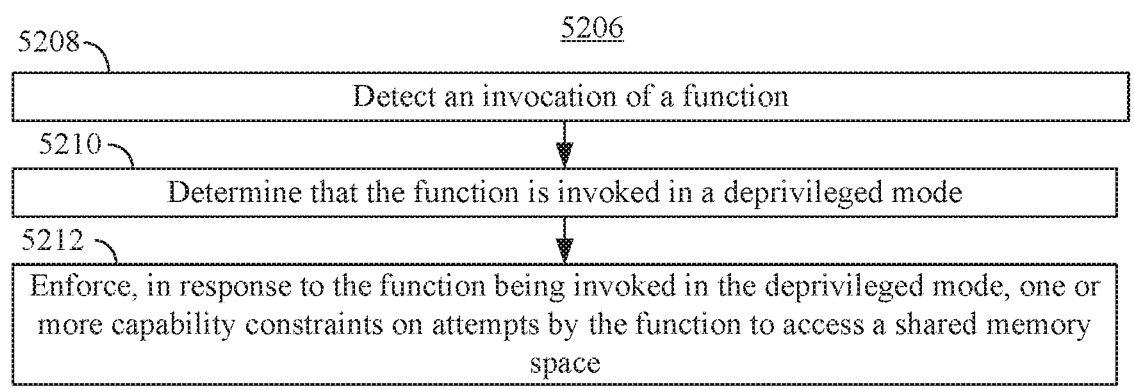

FIG. 49D is a block diagram of an example of a key identifier map update according to an embodiment;

FIG. 49E is a flowchart of updating key identifier mappings according to an embodiment;

FIG. 49F is a block diagram of an example of a translation look-aside buffer/page miss handler that maps between virtual addresses and physical addresses;

FIG. 50A is a block diagram of an example of a protection key identifier update instruction according to an embodiment;

FIG. 50B is a flowchart of updating protection key identifiers according to an embodiment;

FIG. 51A is a block diagram of an example of an unprivileged component that is permitted to modify sub-page permissions according to an embodiment;

FIG. 51B is a flowchart of controlling sub-page permissions according to an embodiment;

FIG. 52A is an illustration of an example of a deprivileged mode path that includes capability information constraints according to an embodiment; and FIG. 52B is a flowchart of controlling memory accesses according to an embodiment.

DESCRIPTION OF EMBODIMENTS

Figure 1:
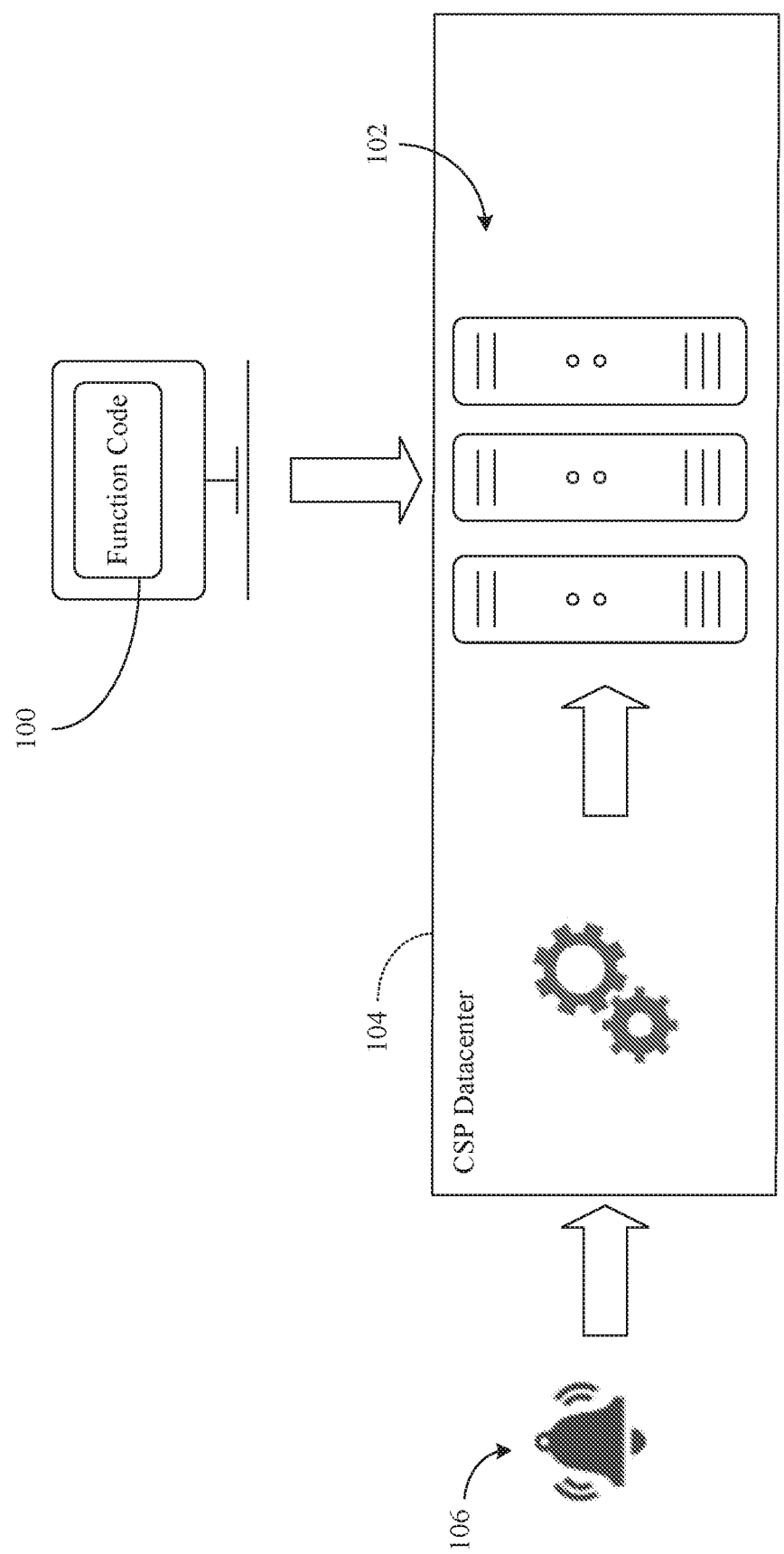
FIG. 1 is an illustration of an example of a FaaS computing environment according to an embodiment.

FIG. 1 shows a FaaS computing environment according to one embodiment. A developer writes function code 100 (also referred to as "computer code" herein) representing one or more computer functions, and the function code 100 is uploaded to a FaaS platform 102 in, for example, a CSP datacenter 104. A trigger 106 such as, for example, a use case or an Internet of Things (IoT) event, initiates the execution of the function code 100 at the FaaS platform 102. The environment in which a Function's code is executed is referred to as a container. The container may be any isolated-execution entity such as a process, a Docker or Kubernetes container, a virtual machine, etc. A container that is run in its own virtual machine is referred to as a virtual container, Within the CSP datacenter 104, including the FaaS platform 102, their datacenter, edge environment, and the IoT (including mobile) devices over which the CSPs have control, infrastructure is "spun up" (e.g., activated and/or allocated) and scaled on demand. The function code 100 gets executed on the CSP's physical infrastructure/Edge/IoT device and underlying virtualized containers. Finally, the infrastructure is "spun down" (e.g., deactivated and/or deallocated) in response to the execution being completed.

As will be discussed in greater detail below, technology described herein reduces concerns around proprietary lock-in, costly cold starts, latency, and the management/control of code execution states by providing enhanced FaaS features, such as running function codes on demand in response to events and automatically scaling with number of events based on atomic units of scale that deploy function code with its corresponding function as a unit of compute scale. Technology described herein further reduces the aforementioned concerns by enabling breadth of enhancements, allowing for diversity of platforms and/or enabling security directly in hardware and through standard libraries or runtimes. Additionally, technology described herein makes it easier to expose and exercise new silicon features. By enabling developers to build applications using higher level languages supported by CSP FaaS platforms, and simplifying operations, optimization, flexibility, and scaling, the technology described herein may further empower non-expert developers to achieve robust, high performance, and secure FaaS solutions that benefit transparently from acceleration capabilities delivered in hardware. The technology described herein may further simplify coding and drive more demand for compute by the CSP FaaS platforms.

Figure 2A:
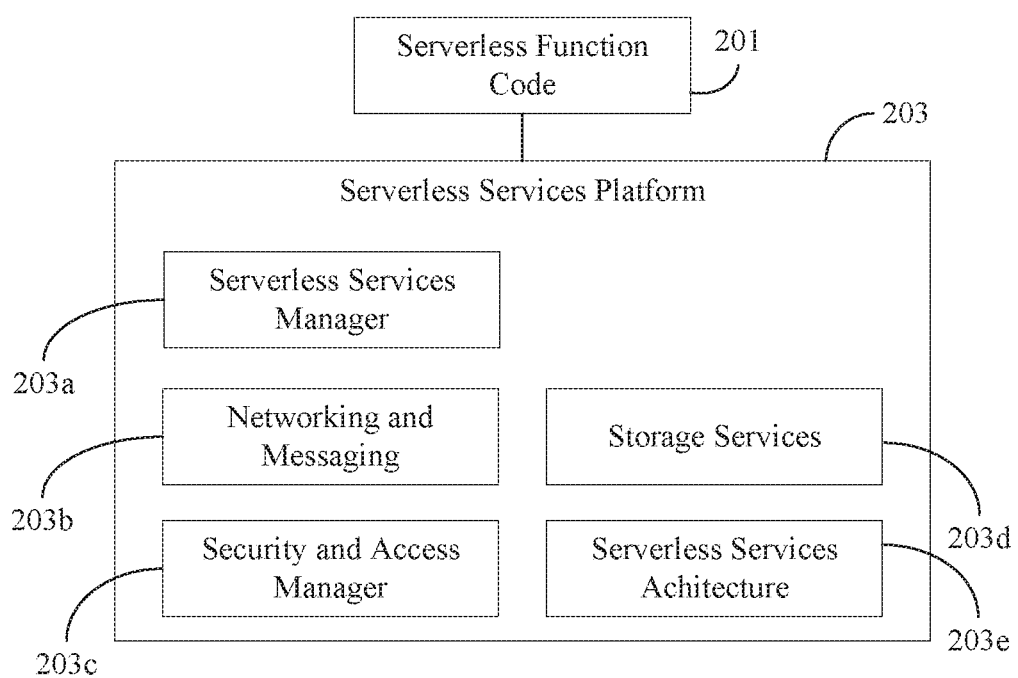
FIG. 2A illustrates an example of a generalized existing serverless service.
Figure 2B:
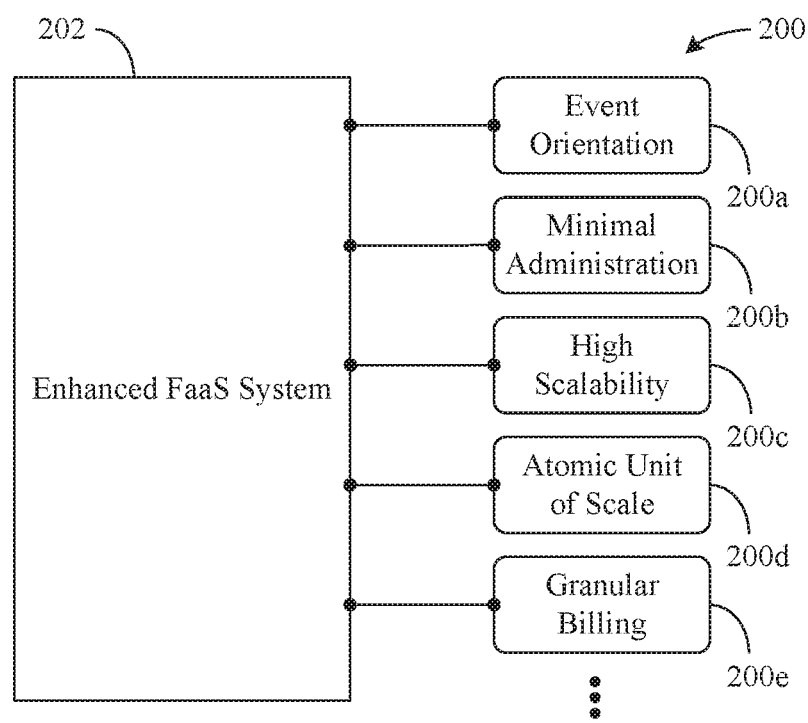
FIG. 2B is a block diagram of an example of a set of FaaS system components according to an embodiment.

FIG. 2B shows examples of components 200 (200a-200b) of an enhanced FaaS system 202 as described herein. Comparing with the challenges associated with the existing FaaS services such as the one shown in FIG. 2A, the enhanced FaaS system 202 provides numerous enhancements, such as efficient function code execution in an event oriented execution environment, which requires minimal administration while offering high scalability and granular billing. In the illustrated example, an event orientation component 200a ensures that function code is run on demand in response to events, a minimal administration component 200b abstracts infrastructure management of executing function code away from users (e.g., code developers) by a FaaS service provider, a high scalability component 200c scales function code execution automatically with the number of events (e.g., user events or IoT related events), an atomic unit of scale component 200d deploys computer code with its corresponding function as a unit of compute scale, and a granular billing component 200e enables customers (e.g., computer code developers) to pay only when their code gets executed, and customers are billed in, for example, 100 millisecond increments. The enhanced FaaS system 202 may also include other advantageous components, as will be discussed in greater detail below.

Users and CSPs will therefore capture significant value through the enhanced FaaS system 202. The values offered by the enhanced FaaS system 202 for users include, for example, increased focus on development of operations of interest, reduced time to market (TTM), reduced infrastructure management, and reduced total cost of ownership (TCO). For a CSP, the value offered by the enhanced FaaS system 202 include, for example, driving high-margin services adoption, earning more per unit of compute, enabling new cloud workloads, improved amortization of costs, elasticity in scheduling of computing resources, and providing the ability to compete with other CSPs.

Figure 3:
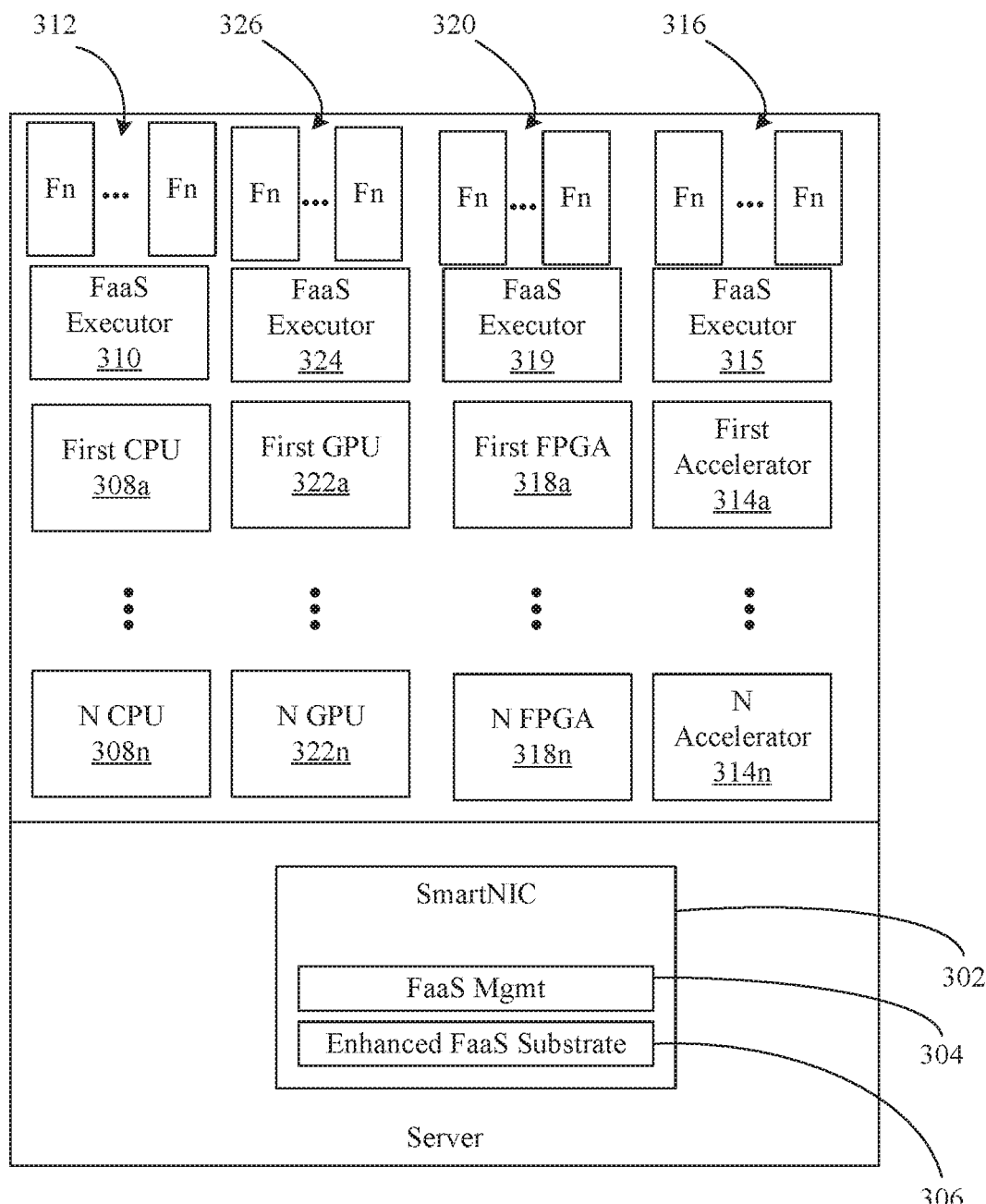
FIG. 3 is a block diagram of an example of a FaaS server configuration according to an embodiment.

In an embodiment, there are five components of the enhanced FaaS system 202. The first is a function format component to create functions and execute computer code of the functions. One example of a function format component is FaaS executors 310, 324, 319, 315 as illustrated in FIG. 3 (discussed below). The second is an event handling API proxy component to route event calls to functions. One example of an event handling API proxy is user interface handler 402 of FIG. 4 (discussed below). The third component is function code storage that receives, stores, and secures function code packages. One example of the function code storage is network, storage, and memory manager 408 of FIG. 4 (discussed below). The fourth component is a FaaS container, which provides a function execution environment where function code is downloaded and instantiated in a container or in other isolated-execution alternatives. One example of the FaaS container is FaaS architecture 406 of FIG. 4 (discussed below). After execution, the container is wiped (or reset, reinitialized, etc.) for new functions. Containers often run within virtual machines (VMs) for security and isolation. The last core component is a function/container orchestration component to optimize container placement within available compute resources by spinning up the container for function code (e.g., "cold boot"). One example of the function/container orchestration component is orchestrator 404 of FIG. 4 (discussed below). If a function has run recently, a new function may be placed in an already "warm" container, decreasing instantiation latency. A warm container may be a container that was recently used to execute a function, or a container that is frequently used for function execution. Rather than tearing down the container after the function completes, the container may be retained for future function executions. Thus, the container may be considered "warm" in that the container does not need to be built, and is ready for immediate execution of a function.

FIG. 3 shows a FaaS server configuration 300 for providing users/CSPs enhanced FaaS performance. In the illustrated illustration, the FaaS server configuration 300 includes a smart network interface card (NIC) 302, which includes FaaS management logic 304 on an enhanced FaaS substrate 306. In some embodiments, the smart network interface card 302 functions as a control center of the FaaS server configuration 300. The FaaS server configuration 300 includes one or more computer code executing units which are configured to execute multiple sets of functions in an orchestrated manner. In other embodiments, FaaS management logic 304 and enhanced FaaS substrate 306 may be implemented variously in a baseboard management controller (BMC), in a processor, in a software module that executes on a processor, a special function logic, and/or as any combinations thereof. In the illustrated example, one or more central processing units (CPUs) 308a-308n (e.g., host processor) uses a FaaS executor 310 to execute a first set of functions 312, one or more accelerators 314a-314n (e.g., fixed-functionality hardware logic) executes a second set of functions 316, one or more field programmable gate arrays (FPGAs) 318a-318n executes a third set of functions 320 and one or more graphics processing units (GPUs) 322a-322n executes a fourth set of functions 326. Accordingly, the illustrated FaaS server configuration 300 is powered by specialized silicon, including GPUs 322a-322n, FPGAs 318a-318n, and specialized accelerators 314a-314n. The FaaS server configuration 300 may contain multiple CPUs 308a-308n, GPUs 322a-322n, FPGAs 318a-318n, and other specialized accelerators 314a-314n.

It is worth noting that the specialized accelerators 314a-314n may be of different types from each other. For example, each of the specialized accelerators 314a-314n may be designed specifically for accelerating certain functions or primitives (e.g., accelerators specifically designed for matrix multiplications during the training of a machine learning (ML) model, accelerators for more efficient power and energy consumption, and/or accelerators for better security and privacy of certain computations and data).

Similarly, the CPUs 308a-308n of the FaaS server configuration 300 may be different architectures (e.g., fabricated by different vendors and have different schematics as well as architectures) from each other. For example, in some embodiments, the CPUs 308a-308n might be a combination of various ones of Intel architectures, advanced reduced instruction set computer machine processors, microprocessor without interlocked pipelined stages processors, and reduced instruction set computer-V (RISC-V) processors. In some embodiments, the CPUs 308a-308n may all have a same architecture (e.g., all be Intel Architecture). Similarly, the GPUs 322a-322n may be the same or may be different architectures (e.g., fabricated by different vendors and have different schematics) from each other. Similarly, the FPGAs 318a-318n may be the same or may be different architectures (e.g., fabricated by different vendors and have different schematics) from each other. Furthermore, the specialized accelerators 314a-314n may be the same or may be different architectures (e.g., fabricated by different vendors and have different schematics) from each other. Moreover, the executions units, the CPUs 308a-308n, GPUs 322a-322n, FPGAs 318a-318n, and specialized accelerators 314a-314n may utilize analog designs in addition to the digital designs.

FaaS workloads likely have different characteristics than traditional workloads, for example in terms of finer (e.g., increased) granularity of the workload. The increased granularity of the workloads may make it easier to take advantage of specialized silicon such as the accelerators 314a-314n and the FPGAs 318a-318n. By disaggregating multiple sets of functions, the FaaS server configuration 300 enables the CSP to match each workload (e.g., transcode, inference, specialized operations, etc.) with an optimal piece of silicon such as the accelerator 314a-314n, the FPGA 318a-318n, the CPU 308a-308n, the GPUs 322a-322n, etc. FaaS-specific hardware such as FaaS server configuration 300 described in FIG. 3 is able to improve FaaS performance and adoption by more users and CSPs. The enhanced FaaS solution offers high degrees of flexibility and heterogeneity for improved execution characteristics comparing with existing solutions.

The FaaS server configuration 300 may include more or fewer of the illustrated components. For example, in one example the FaaS server configuration 300 may include one CPU, such as the first CPU 308a. In another example, the FaaS server configuration 300 may include one FPGA, such as the first FPGA 318a and one CPU, such as CPU 308a. In yet another example, the FaaS server configuration 300 includes the first accelerator 314a and none of the CPU 308a-308n. In yet another example, the FaaS server configuration 300 includes multiple CPUs 308a-308n, multiple GPUs 322a-322n, one FPGA such as FPGA 318a, and multiple specialized accelerators 314a-314n of different types.

Figure 4:
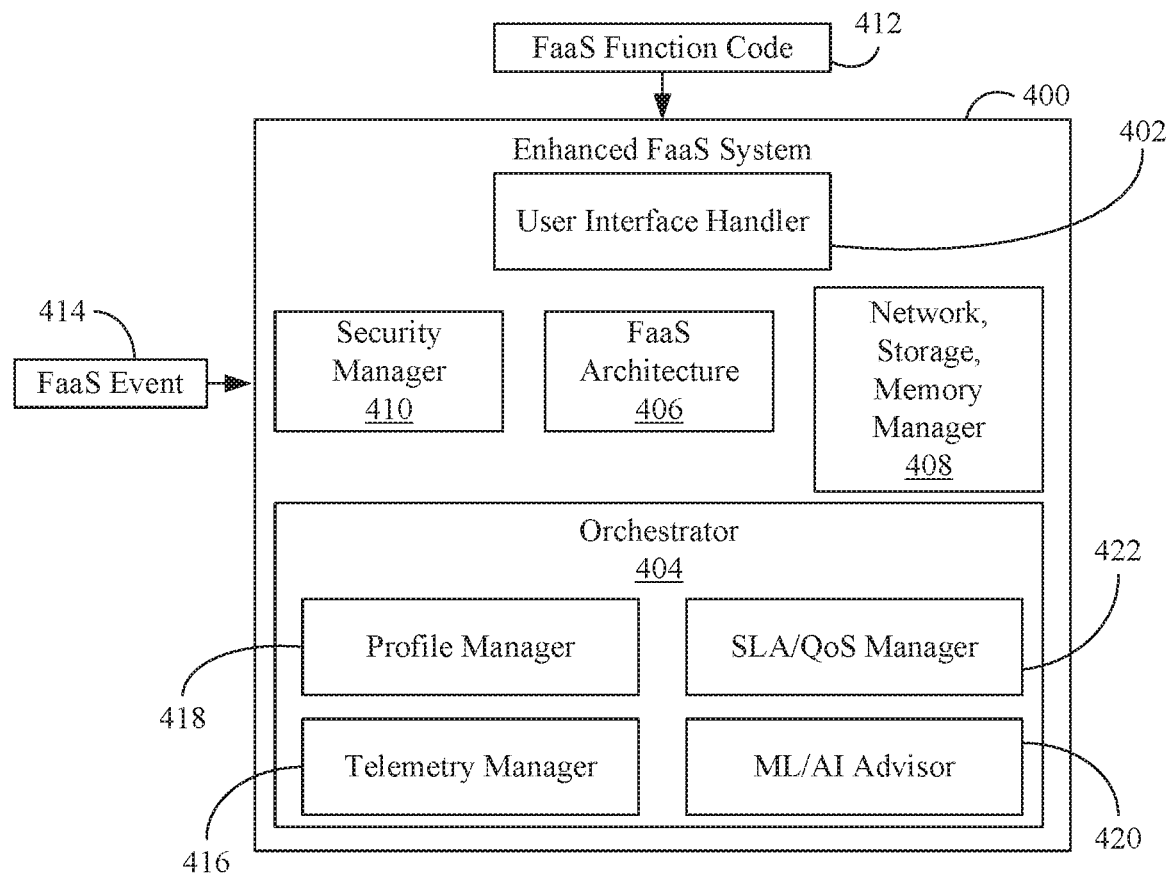
FIG. 4 is a block diagram of an example of an enhanced FaaS system according to an embodiment.

Turning now to FIG. 4, an embodiment of an enhanced FaaS system 400 is shown. The illustrated system 400 includes a user interface handler 402, an orchestrator 404, a FaaS architecture 406, a network, storage, memory manager 408 and a security manager 410. In an embodiment, the system 400 receives FaaS function code 412 to be executed using the FaaS architecture 406, which provides a container/function execution environment. The illustrated system 400 also detects one or more FaaS events 414 received by the system 400 such as user requests for executing his/her computer code, e.g., FaaS function code 412. In response to a FaaS event, the corresponding function code 412 is downloaded and instantiated in a container or another isolated-execution alternative of the system 400. The user interface handler 402 is an event handling API proxy that routes event calls to corresponding functions of the computer code 412. The orchestrator 404 optimizes execution of the functions (e.g., whether by a container, a virtual machine, a process, etc.) within available compute resources by spinning up containers or other execution engines for the function code 412. If a function has run recently in a container, the container is marked as a "warm" container. The orchestrator 404 may place a new function in an already "warm" container (and more generally, a ready execution engine), decreasing instantiation latency. The term "container" as used herein may be considered as any form of an execution engine for code such as the function code 412. The container may be a process, a process group, a virtual machine, a sandboxed environment within a process address space, a process within a virtual machine, etc. The network, storage, and memory manager 408 may receive and store the function code 412, which is secured by the security manager 410. In one example, the security manager 410 ensures that the containers run within VMs for security and isolation.

The Orchestrator 404 may also include the following sub-components: telemetry manager 416, profile manager 418, machine learning/artificial intelligence (ML/AI) advisor 420, and service-level agreement/quality of service (SLA/QoS) manager 422. The orchestrator 404 may profile data such as for example resource needs and/or demand profiles of functions described with respect to the embodiments of FIGS. 13A-13C, static and dynamic profile information of a function as described with respect to the embodiments of FIGS. 24A-24B, and dynamic profiles as described below with respect to FIGS. 40A-40B.

Figure 7A:
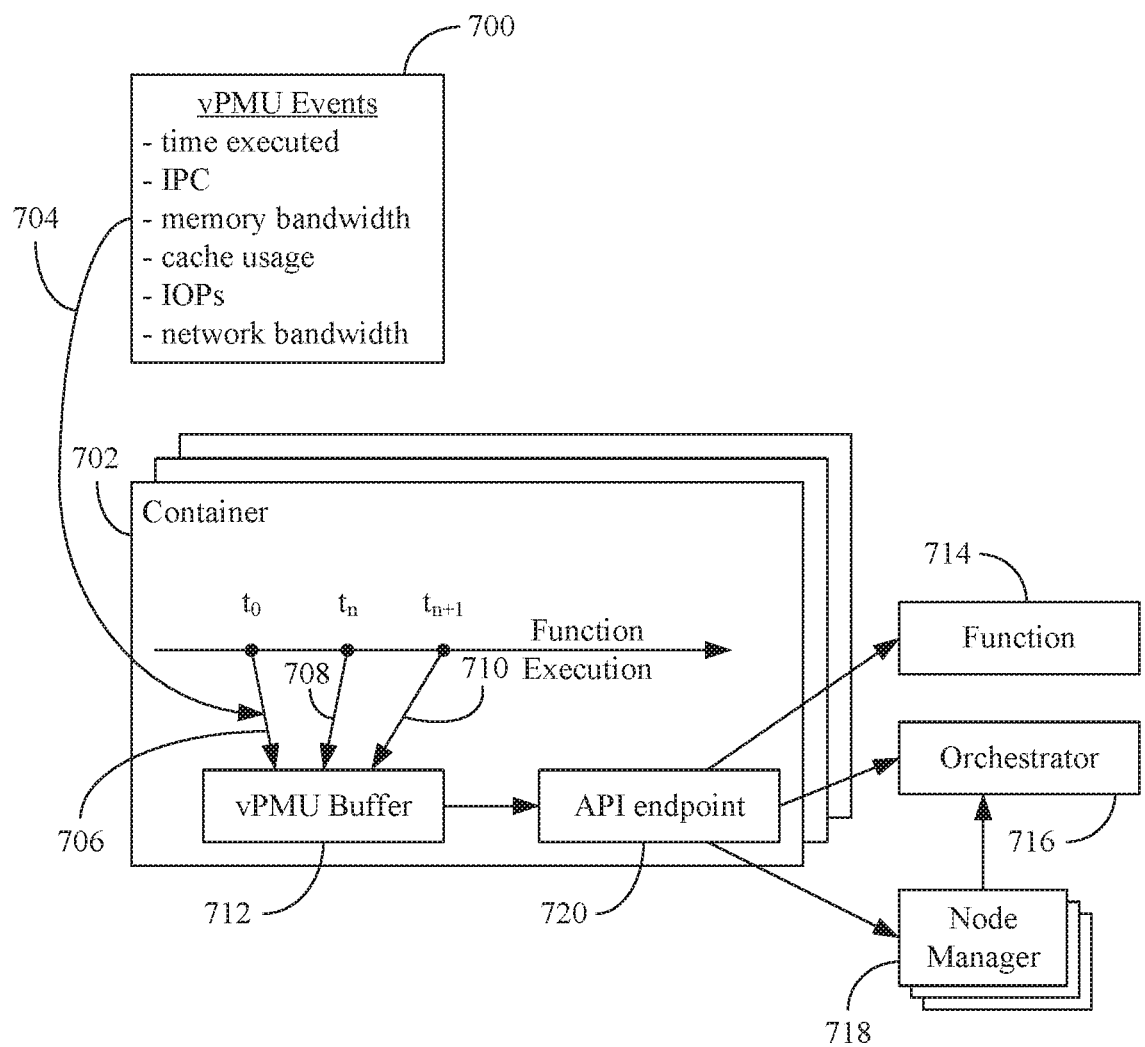
FIG. 7A is a block diagram of an exemplary FaaS compute node for monitoring various virtual power performance monitoring unit (vPMU) events in a container according to an embodiment.
Figure 7B:
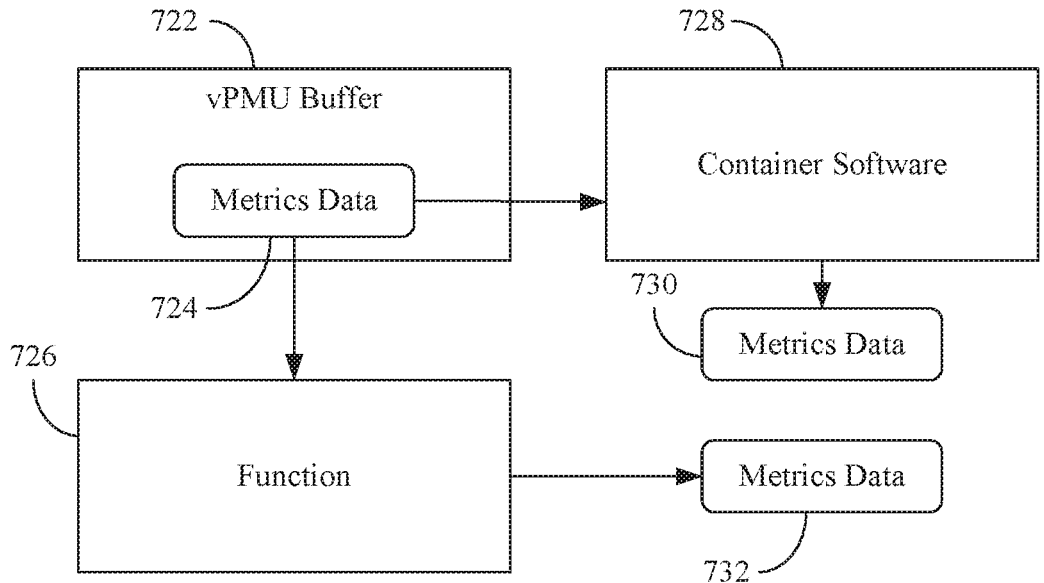
FIG. 7B is a block diagram of an example of a vPMU buffer according to an embodiment.
Figure 7C:
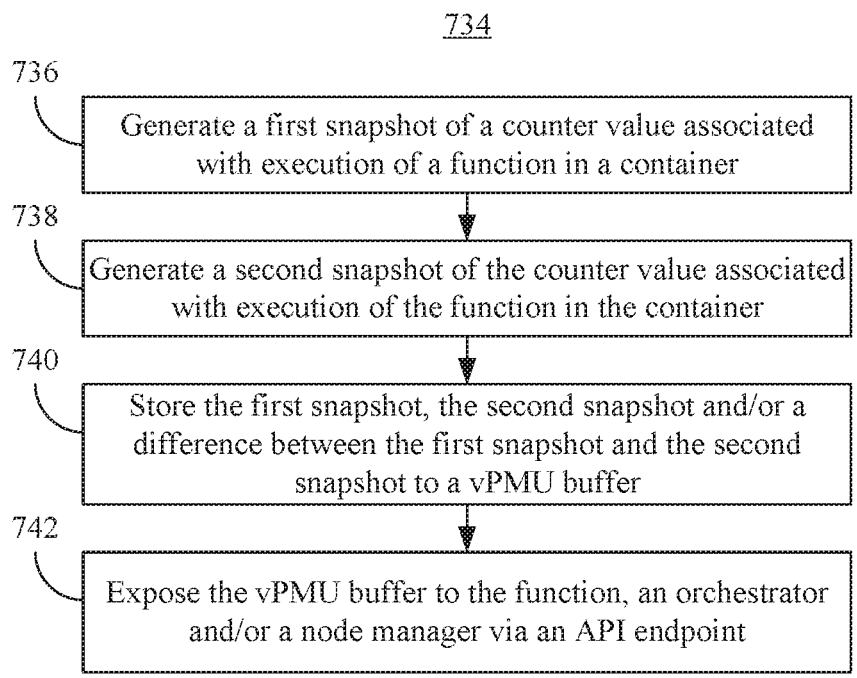
FIG. 7C is a flowchart of an example of a method of monitoring the performance of a function according to an embodiment.
Figure 13A:
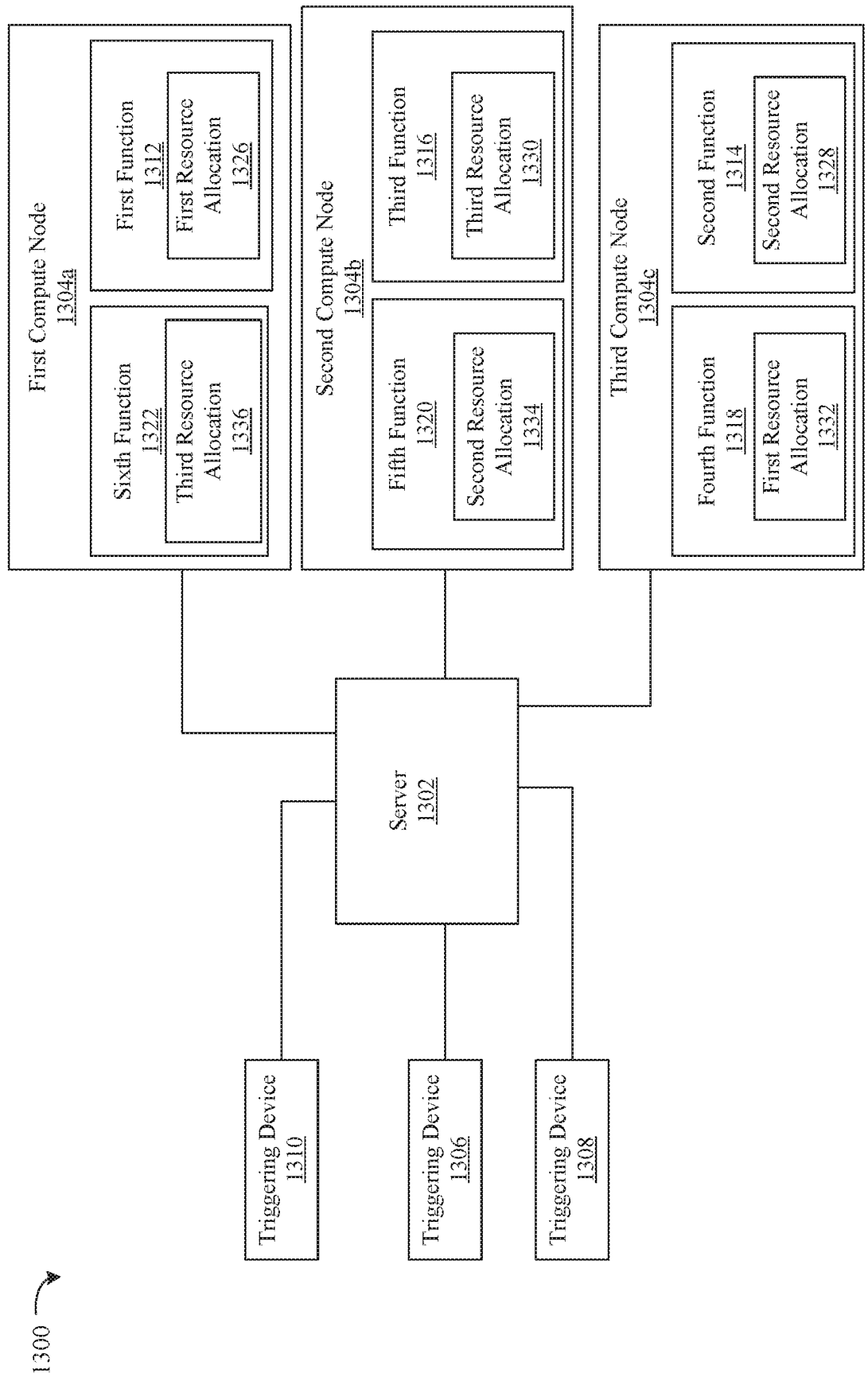
FIG. 13A is a block diagram of an example of a FaaS server architecture according to an embodiment.
Figure 13B:
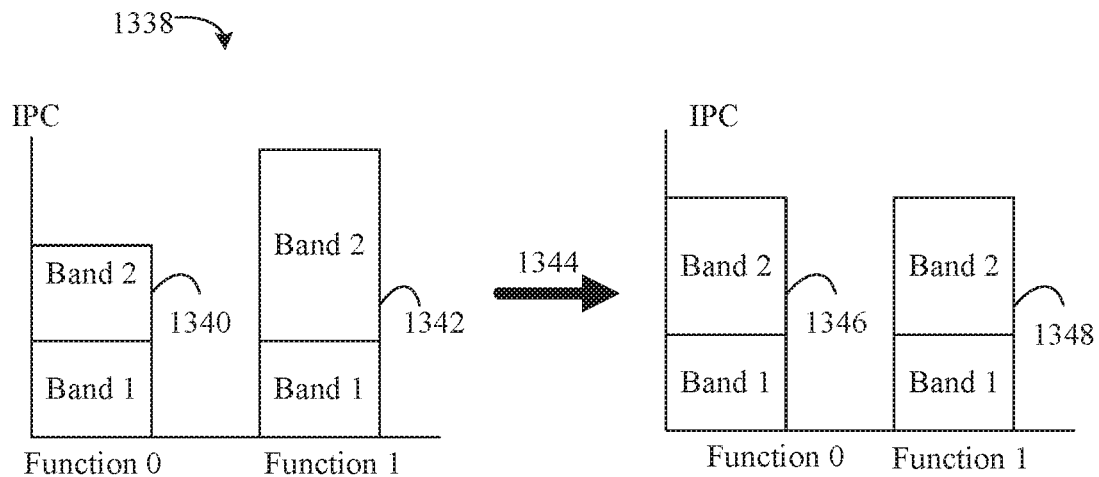
FIG. 13B is an example of an enhanced FaaS scheduling process according to an embodiment.
Figure 13C:
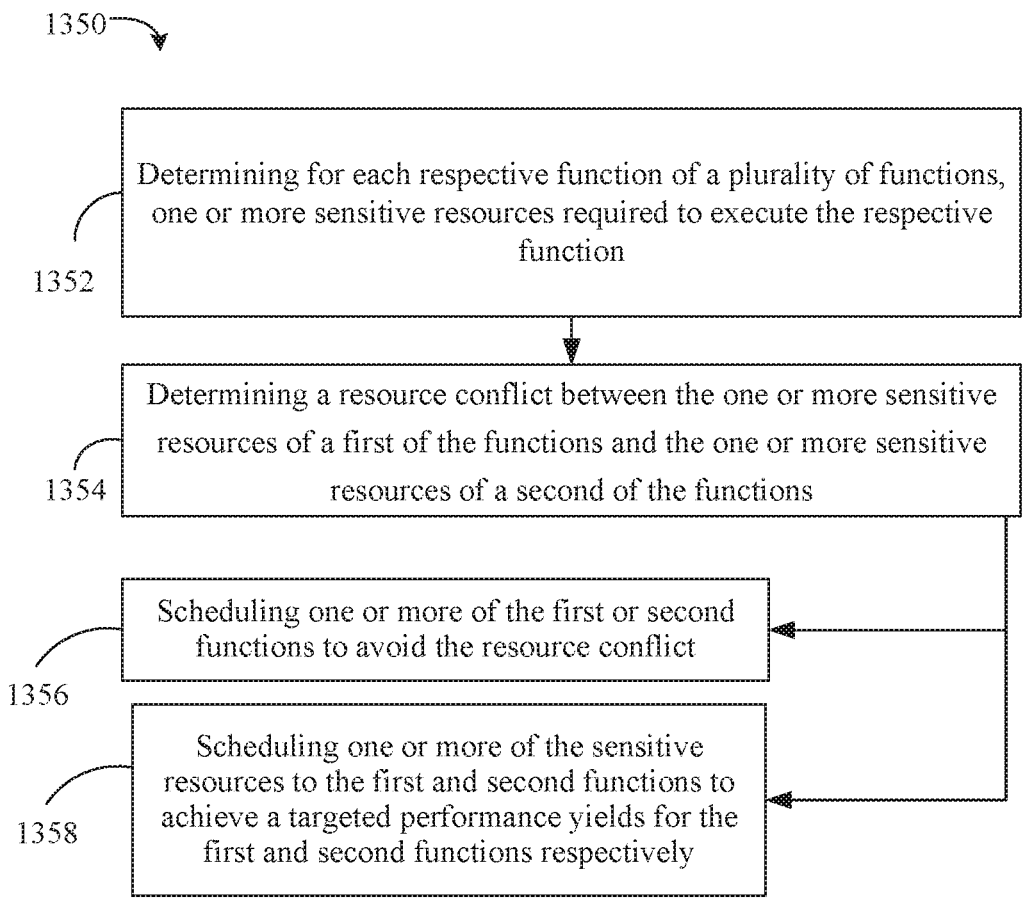
FIG. 13C is a flowchart of functions according to an embodiment.
Figure 21A:
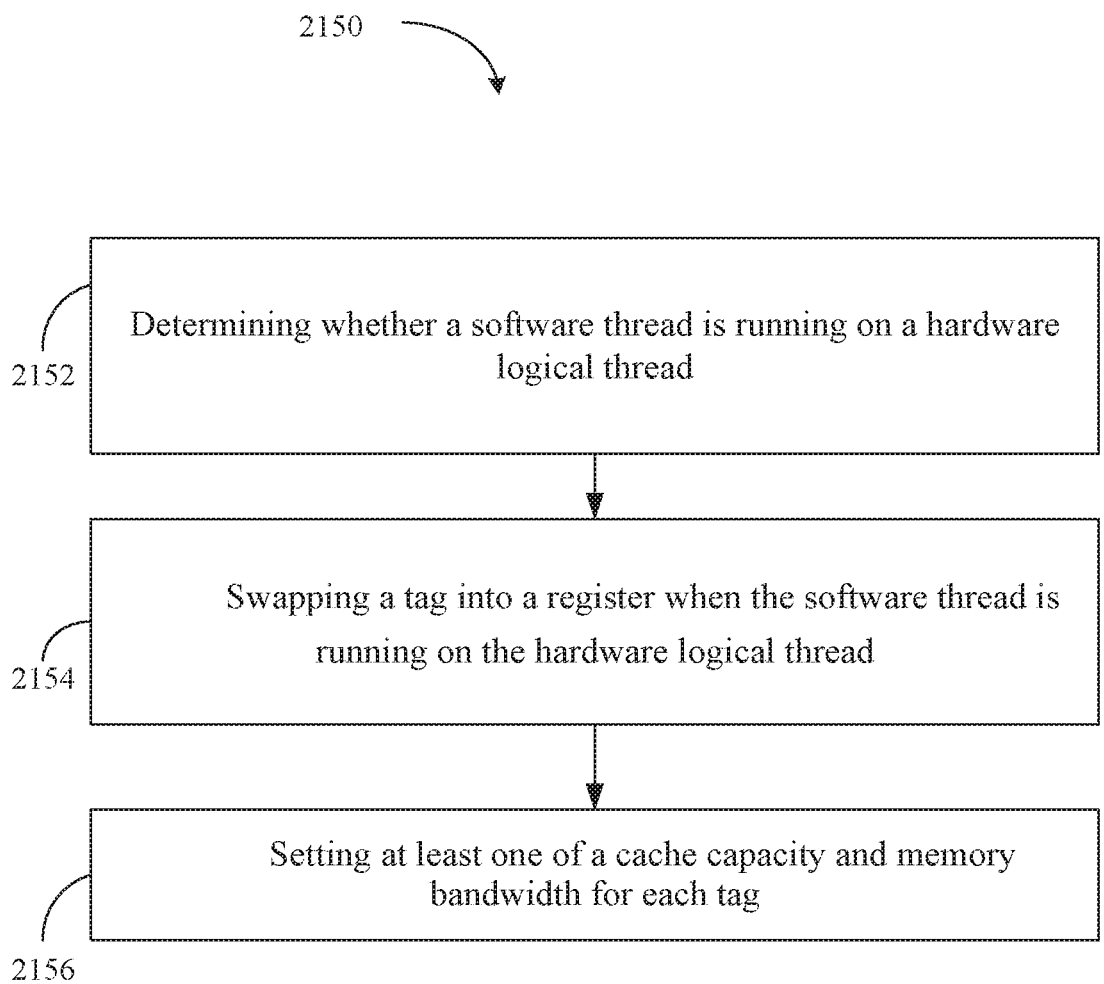
FIG. 21A is an example of a method of prioritizing a software thread according to an embodiment.
Figure 21B:
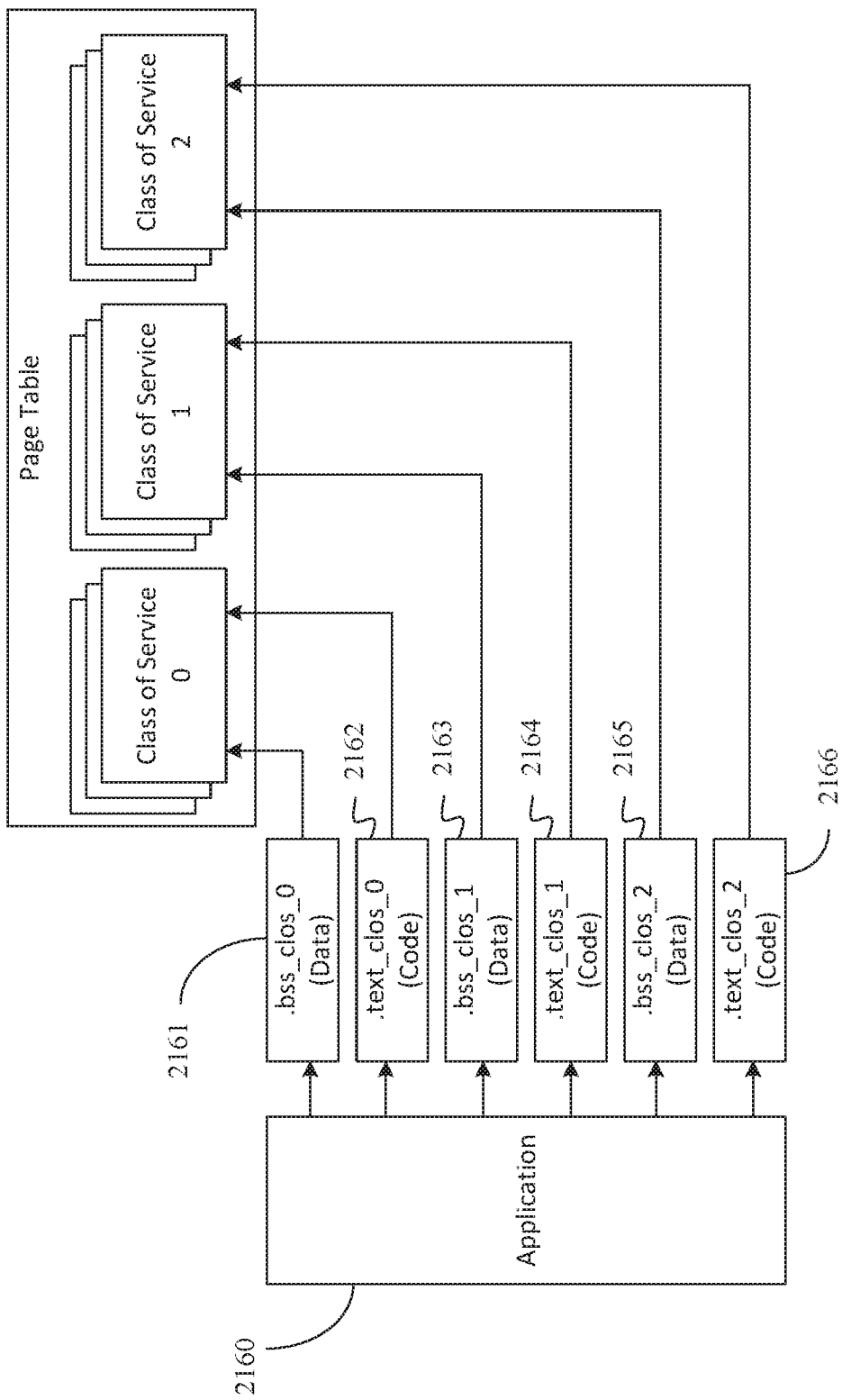
FIG. 21B and FIG. 21C illustrates interaction between tasks and class of services (CLOSs) in a page table for providing page level QoS in an enhanced FaaS architecture according to an exemplary embodiment.
Figure 21C:
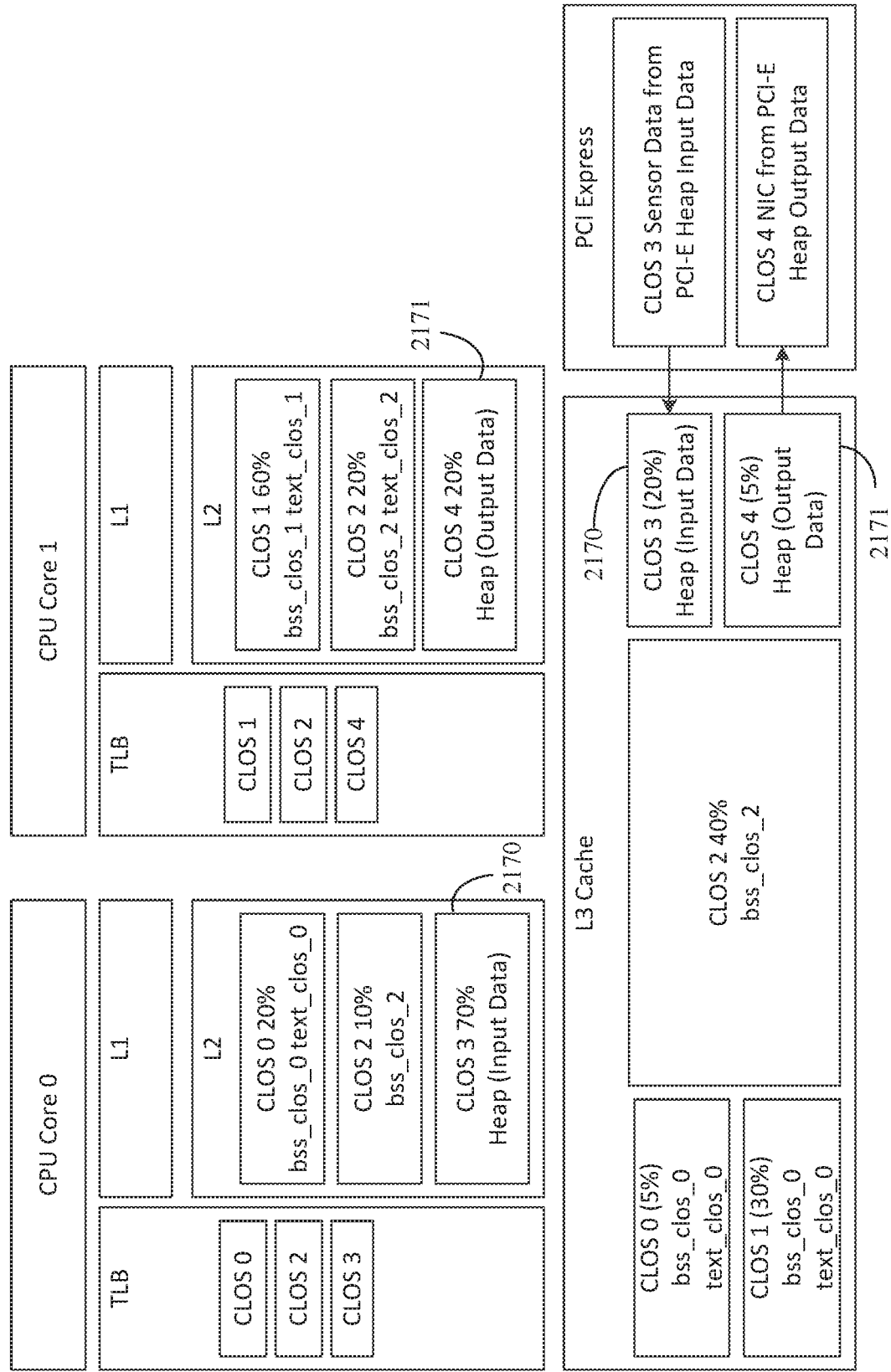
Figure 21D:
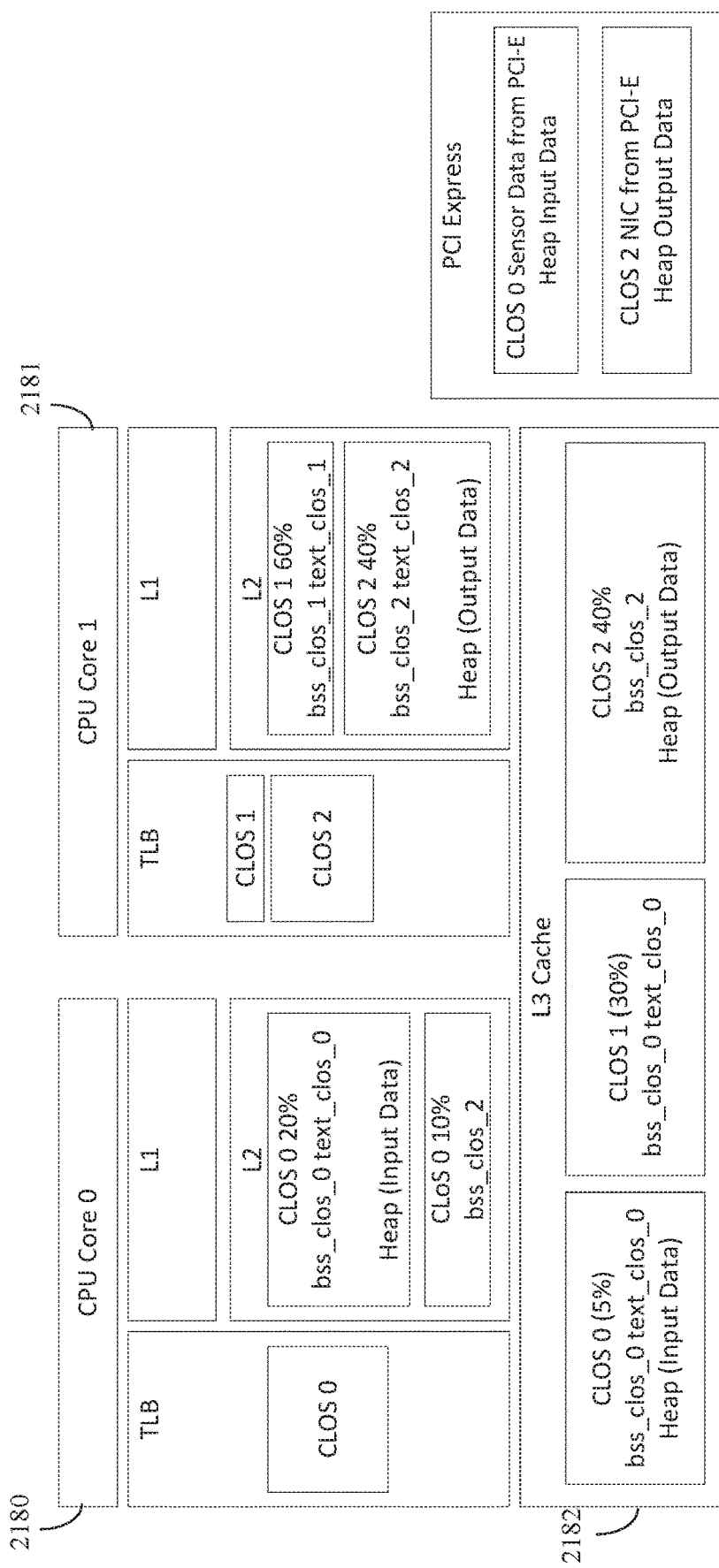
FIG. 21D illustrates another architecture related to page level QoS according to an exemplary embodiment.
Figure 22:
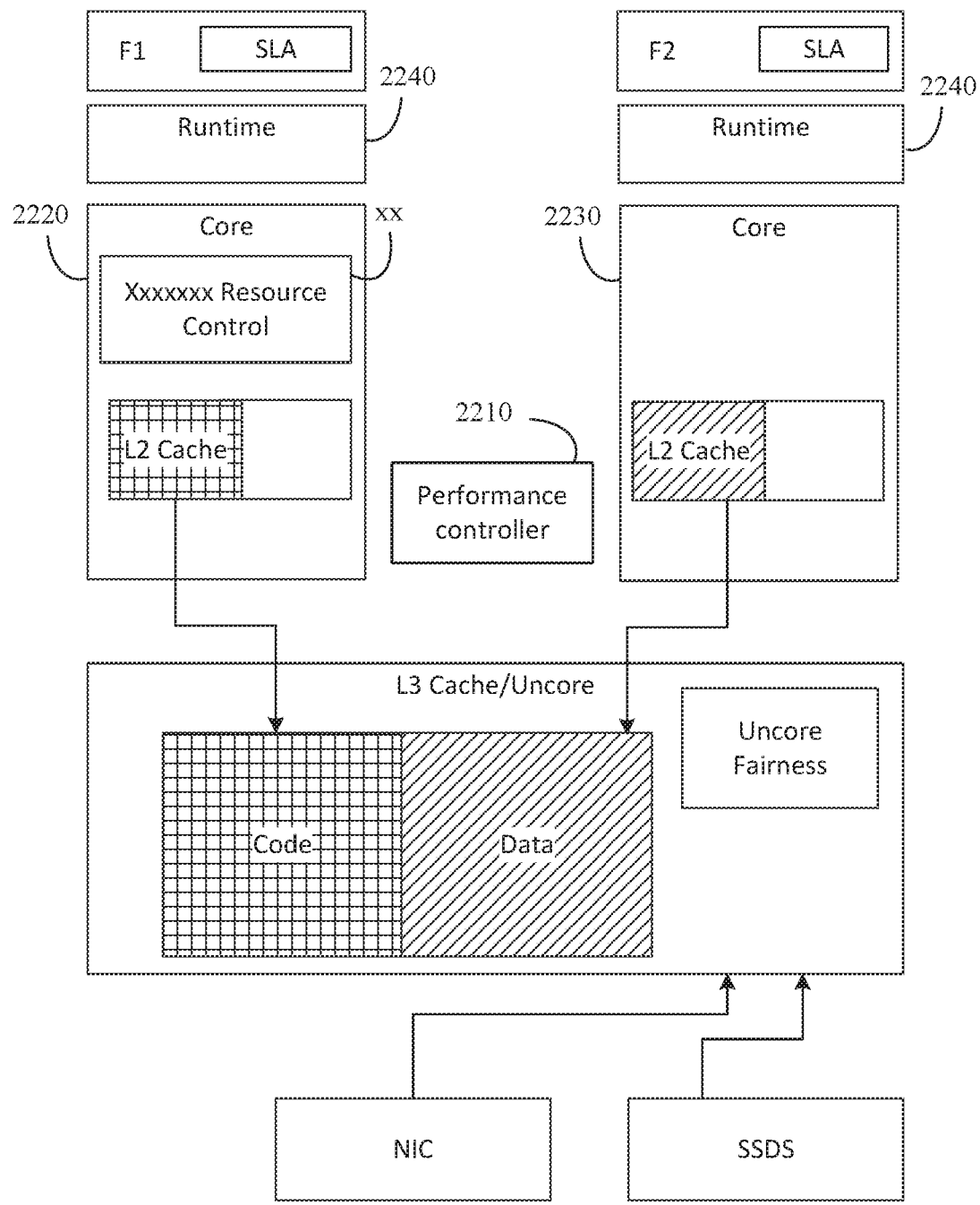
FIG. 22 illustrates an example architecture to provide determinism and accuracy with respect to a FaaS service according to an embodiment.
Figure 24A:
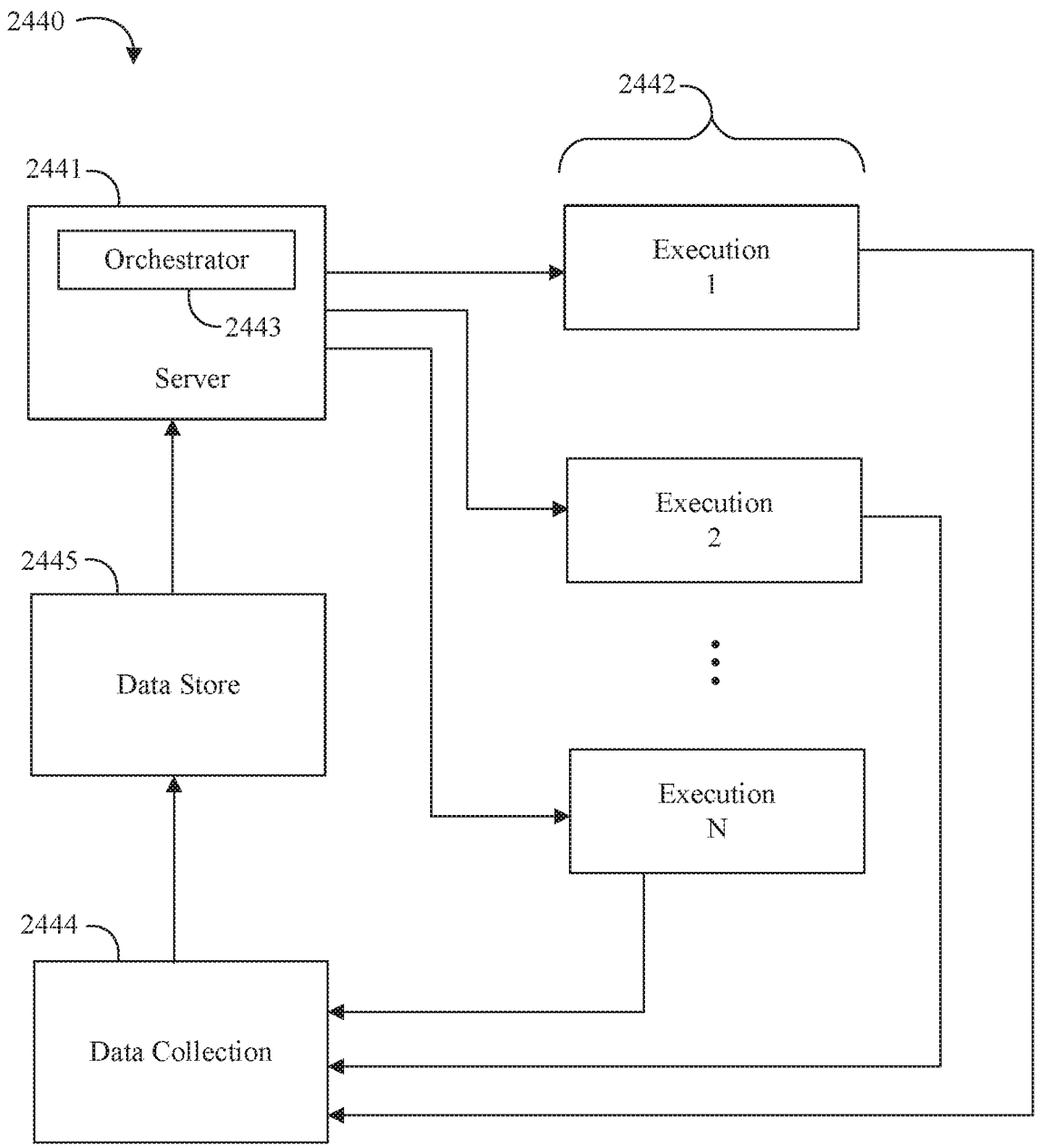
FIG. 24A is a block diagram of an example of a distributed computing environment according to an embodiment.
Figure 24B:
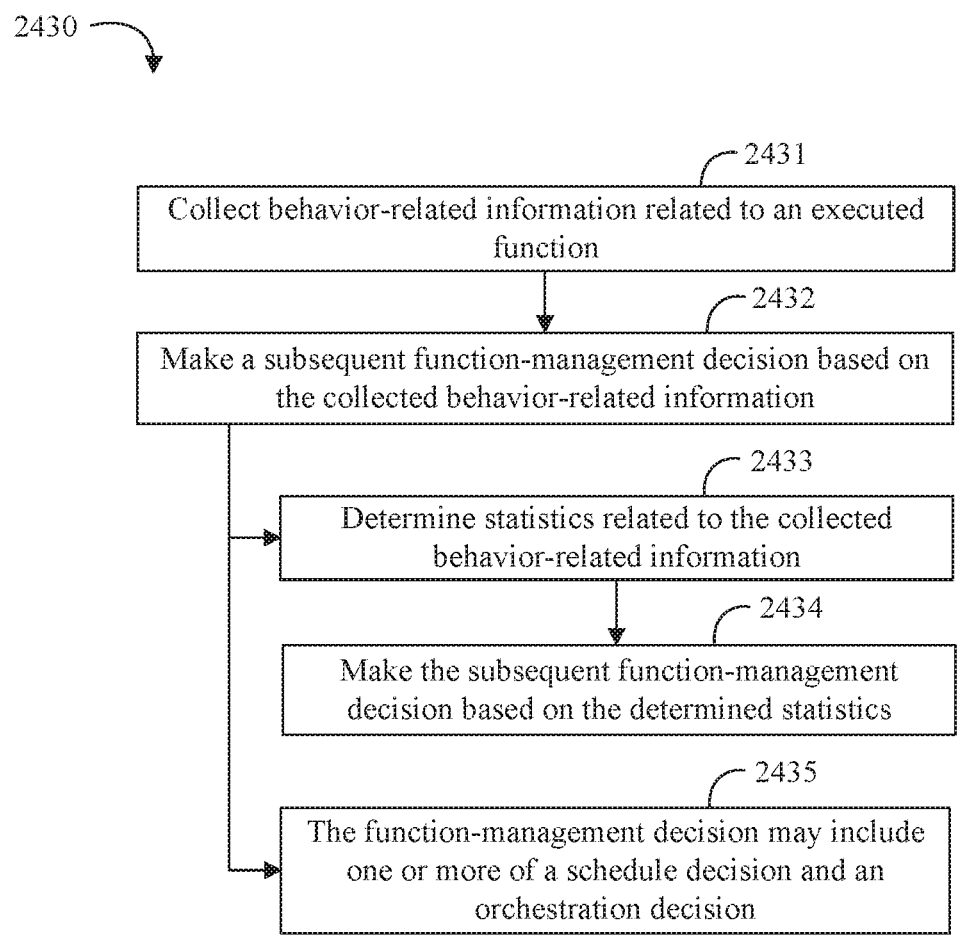
FIG. 24B is a flowchart of another example of providing a function as a service according to an embodiment.
Figure 36A:
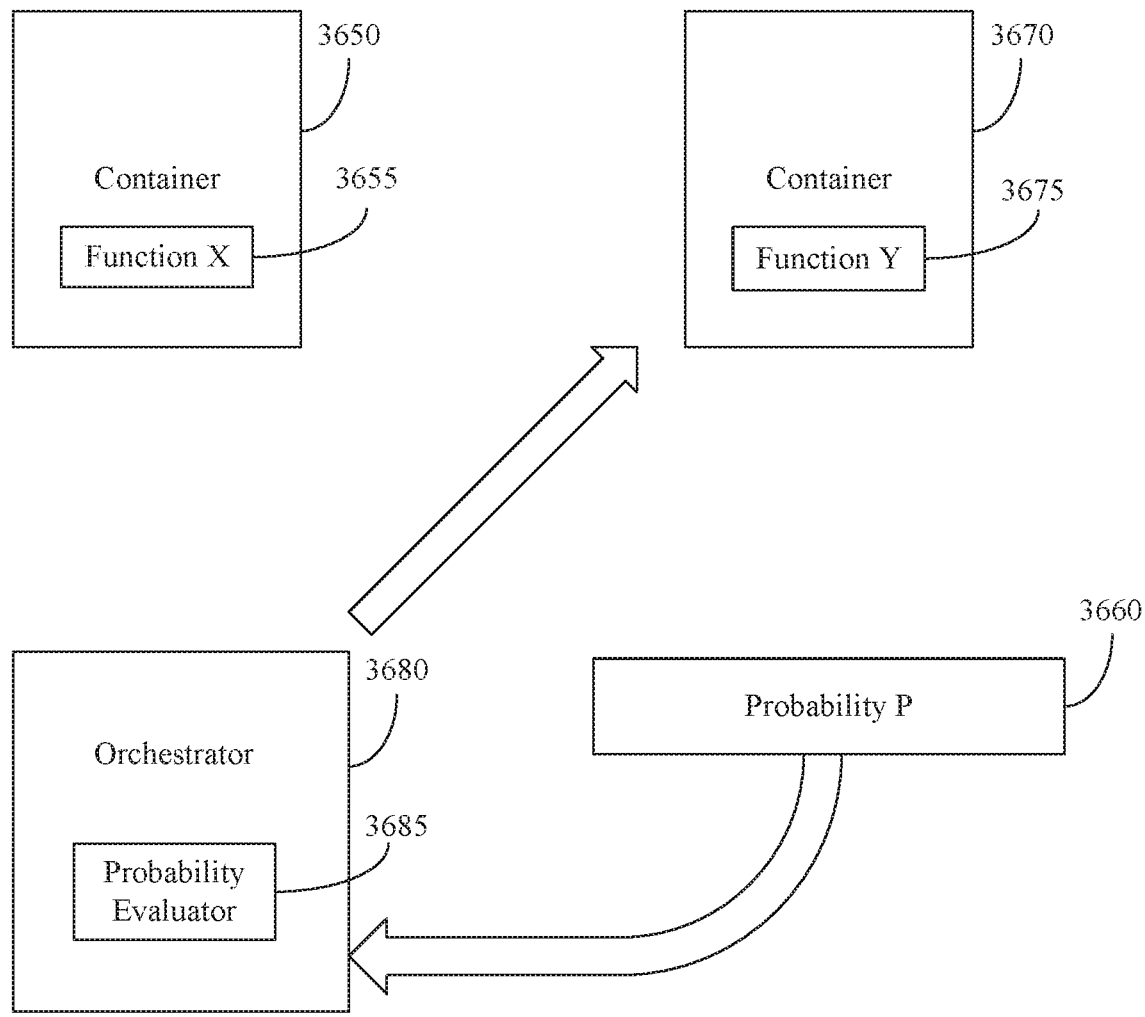
FIG. 36A illustrates an example of maintaining the warmth of a container based on a probability of a function being executed according to an embodiment.
Figure 36B:
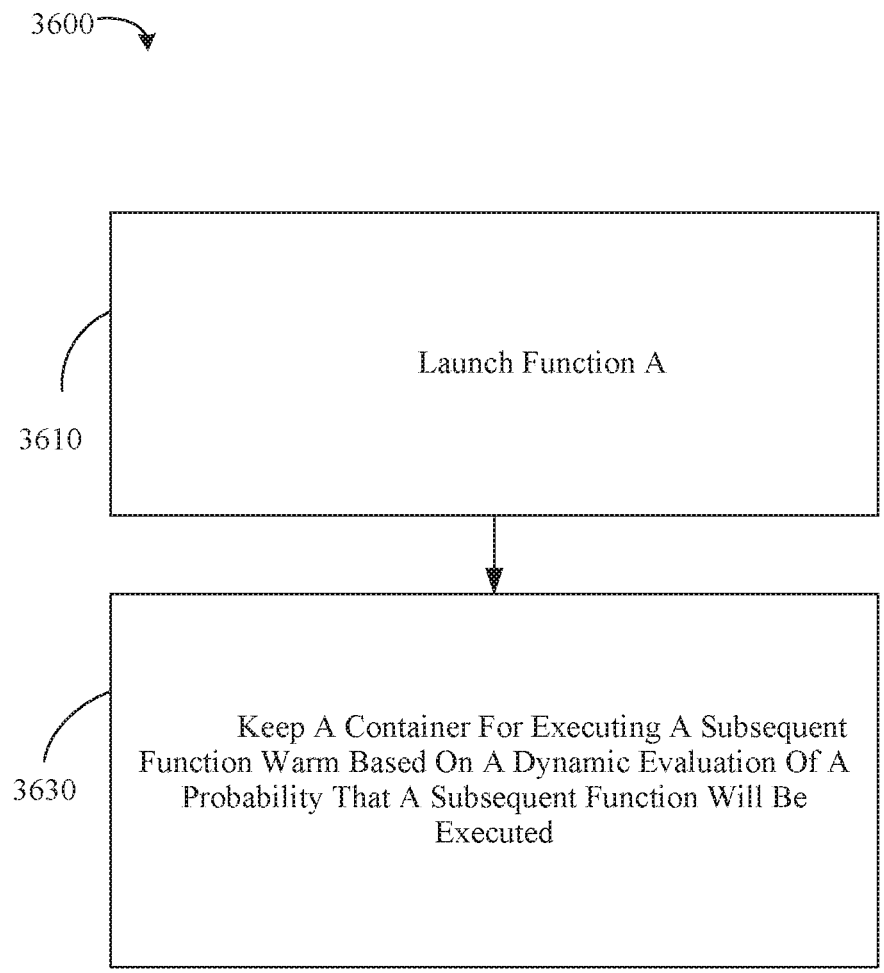
FIG. 36B is an example of a method of executing a FaaS function from a warm container according to an embodiment.

Further, the telemetry manager 416 may monitor and record resource needs of functions, for example as metrics data (e.g., cache usage over time), and/or demand profiles as described in the embodiments of FIGS. 13A-13C, background performance monitoring and specific performance telemetry arising during execution of a function as discussed with respect to the embodiments FIGS. 7A-7C, out-of-band (OOB) telemetry as described with respect to the embodiments FIG. 22, telemetry and profile information as described with respect to the embodiments of FIGS. 24A-24B and telemetry information as described with respect to the embodiments of FIGS. 36A-36B. Moreover, the SLA/QoS manager 422 may be utilized to determine an address-based QoS, class of service, page level QoS and/or thread level QoS as described with respect to the embodiments of FIG. 21A-21D, as well as QoS compliant execution, QoS manifest vector, QoS mix, security vector and/or QoS specification as described with respect to FIGS. 39A-39C.

It will be understood the orchestrator 404, the telemetry manager 416, the profile manager 418, ML/AI advisor 420, and the SLA/QoS manager 422 may be combined and utilized in various ways to execute any of the embodiments described herein. Moreover, different arrangements of the orchestrator 404 may be used in which only a subset of the telemetry manager 416, the profile manager 418, ML/AI advisor 420, and the SLA/QoS manager 422 are part of the orchestrator 404.

In some embodiments, the enhanced FaaS system 400 collects, with the telemetry manager 416, telemetry information associated with a function that is being executed. The telemetry information may be used as part of the profile information about that function and is stored by the Profile Manager 418. The SLA/QoS Manager 422 may query the profile information of the Profile Manager 418 in addition to seeking advice and/or directions from the ML/AI Advisor 420 for mapping the function execution to different execution units to enhance efficiency while meeting requirements (e.g., time and/or cost constraints) of future invocations of the function. In one embodiment, the ML/AI Advisor 420 may execute anomaly detection based on the previously observed scenarios and take proper actions, and/or advise the SLA/QoS advisor 422.

The Orchestrator 404 may efficiently place a FaaS function for execution. In addition to algorithmic and rule-based mechanisms embedded in the orchestrator 404, the ML/AI Advisor 420 may guide the orchestrator 404 in scheduling functions. Due to continuous operation of the FaaS system 400, enormous amount of "telemetry" data may be collected by the telemetry manager 416. Such telemetry data may capture the execution characteristics of functions on different ranges of systems and at different times/locations. The telemetry information may include attributes such as CPU utilization, memory consumption, cache hierarchy behavior, I/O and networking behavior, time/location of the execution, power/energy consumption, security/privacy aspects of the functions and their data (e.g., security requirements and malicious attack detection), users and applications calling the functions, parameters and data used by the functions, etc.

The profile manager 418 may process the collected telemetry information (in real-time as well as offline) and generate a summary of the information and find the correlation and anti-correlation of functions execution behavior. The orchestrator 404 may then query the profile manager 418 as well as the ML/AI Advisor 420 before determining aspects of function placement, such as a time, node, accelerator usage, etc.

For example, the orchestrator 404 may avoid scheduling two or more CPU-intensive functions on the same processor at the same time. Instead, the orchestrator 404 may schedule a CPU-intensive function with a memory-hungry function (e.g., a function that requires a large amount of memory or has a high number of processor cache misses, or both) on the same processor. Further, the orchestrator 404 may avoid scheduling multiple I/O intensive functions on the same system at the same time, and so on. Thus, the orchestrator 404 may ensure that the resource consumption of FaaS servers are balanced.

Furthermore, in addition to such rules embedded in the orchestrator 404, the ML/AI Advisor 420 may automatically learn from an enormous amount of past information collected by the telemetry manager 416 and processed by the profile manager 418. For example, ML models collected and constructed by the profile manager 418 may assist the ML/AI Advisor 420 on automatically determining the placement of the functions for execution. As an example, the information may include possible ML models collected and processed by the Profile Manager 418. The ML models may reveal that certain collections of functions that are executed simultaneously on the same system will result in unusually poor execution characteristics (e.g., anomalies, high latency executions, etc.).

The orchestrator 404 may determine and record the functions that are running on all servers under its control and their states. The orchestrator 404 may also be a collection of distributed orchestrators, each responsible for a subset of FaaS servers. When a new function is to be placed for execution, the orchestrator 404 may query the ML/AI Advisor and seek guidance for placement of the function.

As such, the orchestrator 404 may be "adaptive." As telemetry data is continuously collected by the telemetry manager 416, the enhanced FaaS system 400 may continuously learn about function execution behavior. This aspect may enable the enhanced FaaS system 400 to automatically learn about new functions that were not previously analyzed by the FaaS system 400 before as well as learn about phase shifts (e.g., sudden and/or significant changes in function execution behavior such as changes in CPU usage, memory consumption, I/O operations, and network interactions among others) and seasonal effects. Seasonal effects may include external events whose occurrence and frequency in times affect function execution and execution characteristics. For instance, functions that are impacted by seasonal effects may include internet enabled GPS, are driven by street traffic which may get executed more frequently during rush hour or national holidays. Another example may include executing streaming applications of video content after regular work hours. For example, the enhanced FaaS system 400 may automatically detect that suddenly there is a major increase in the calls for execution of a particular group of functions or access to a particular set of data. Such information may then result in setting up more FaaS servers for execution or moving the data closer to the locations of function execution including from datacenters to the edge of the network and/or in allocating more memory in platforms with disaggregated memory architectures.

Figure 5:
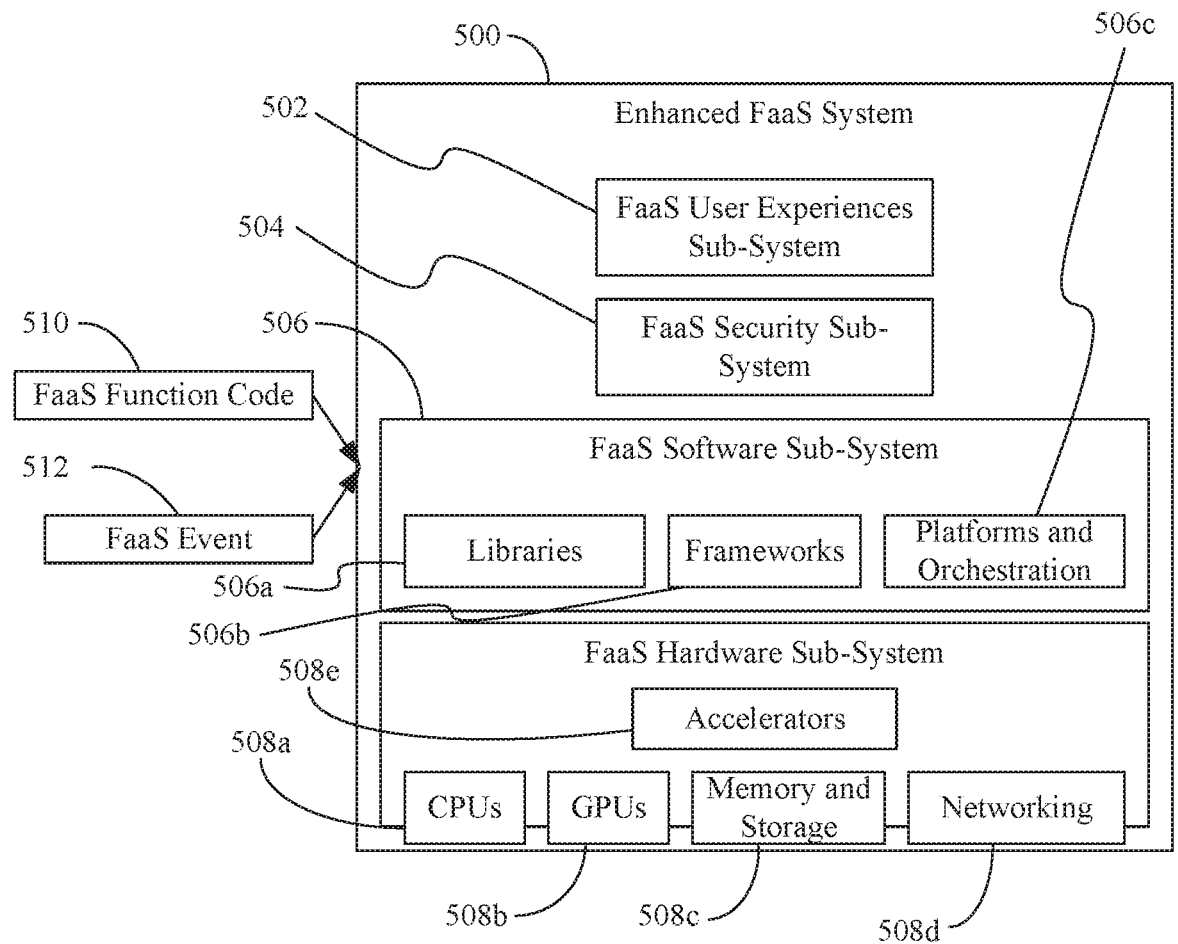
FIG. 5 is a block diagram of an example of the subsystems of an enhanced FaaS system according to an embodiment.

FIG. 5 shows an embodiment of an enhanced FaaS system 500 that includes sub-systems. In the illustrated example, the FaaS system 500 includes a user experiences sub-system 502, a security sub-system 504, a software sub-system 506 (506a-506c), and a hardware sub-system 508 (508a-508d). The software sub-system 506 may include libraries 506a, frameworks 506b, platforms and orchestration modules 506c, and so forth. Additionally, the illustrated hardware sub-system 508 includes CPUs 508a, GPUs 508b, memory and storage 508c, networking components 508d, accelerators 508e (e.g., FPGAs), etc. The enhanced FaaS system 500 receives FaaS function code 510 to be executed and executes the function code 510 in response to one or more associated FaaS events 512.

The enhanced FaaS system 500 is therefore suited for a more diversified market by creating opportunity for feature monetization. For smaller service providers like Communications Service Providers (CoSPs) and regional CSPs who own edge locations, FaaS represents a chance for greater participation in the next wave of end to end applications and services. Many next generation applications and services may need a portion of an application or service to be executed or provided near the consumer or enterprise. Hosting a small portfolio of functions at these edge sites is a much easier undertaking for smaller players than offering a rich Platforms as a Service (PaaS) with all the development and operations (DevOps) tools, APIs, and services like those available from Hyperscale CSPs.

The enhanced FaaS system 500 improves existing FaaS architectures and broadens the FaaS parameters by increasing tenancy, scale and utilization of computing resources. FaaS is likely to become a default mode for the development of cloud-based technologies, liberating developers from backend infrastructure maintenance and opening up programming to the many, not just the few. In this way, the enhanced FaaS system 500 has the potential to provide a whole new way of working for developers. For example, the illustrated system 500 supports and/or directly provides software that augments and extends FaaS provider offerings. FaaS service providers benefit from a lower barrier to FaaS adoption with better tooling while users experience increased ease of use provided by the system 500.

While certain examples herein are discussed with regard to FaaS functions, the concepts are more broadly applicable to other types of software compartments such as, for example, non-FaaS containers, desktop applications, and so forth.

Enhanced FaaS Architecture

The enhanced FaaS system (e.g., the FaaS system illustrated in FIG. 4 and FIG. 5) may also provide user level capabilities for using software functions and/or accelerated functions (e.g., FPGA or other configurable logic) to directly control hardware features. Such an approach may be advantageous for privileged maintenance functions that back up a solid-state drive (SSD) block device, management functions for accelerators, and so forth. Because the functions are run-to-completion tasks that are not long-lived, hardware-based control over their use of hardware provides for more efficiency and transparency than requiring other layers of platform software (e.g., to whom the functions are indistinguishable from any other functions of user level software) to mediate such access.

Figure 6A:
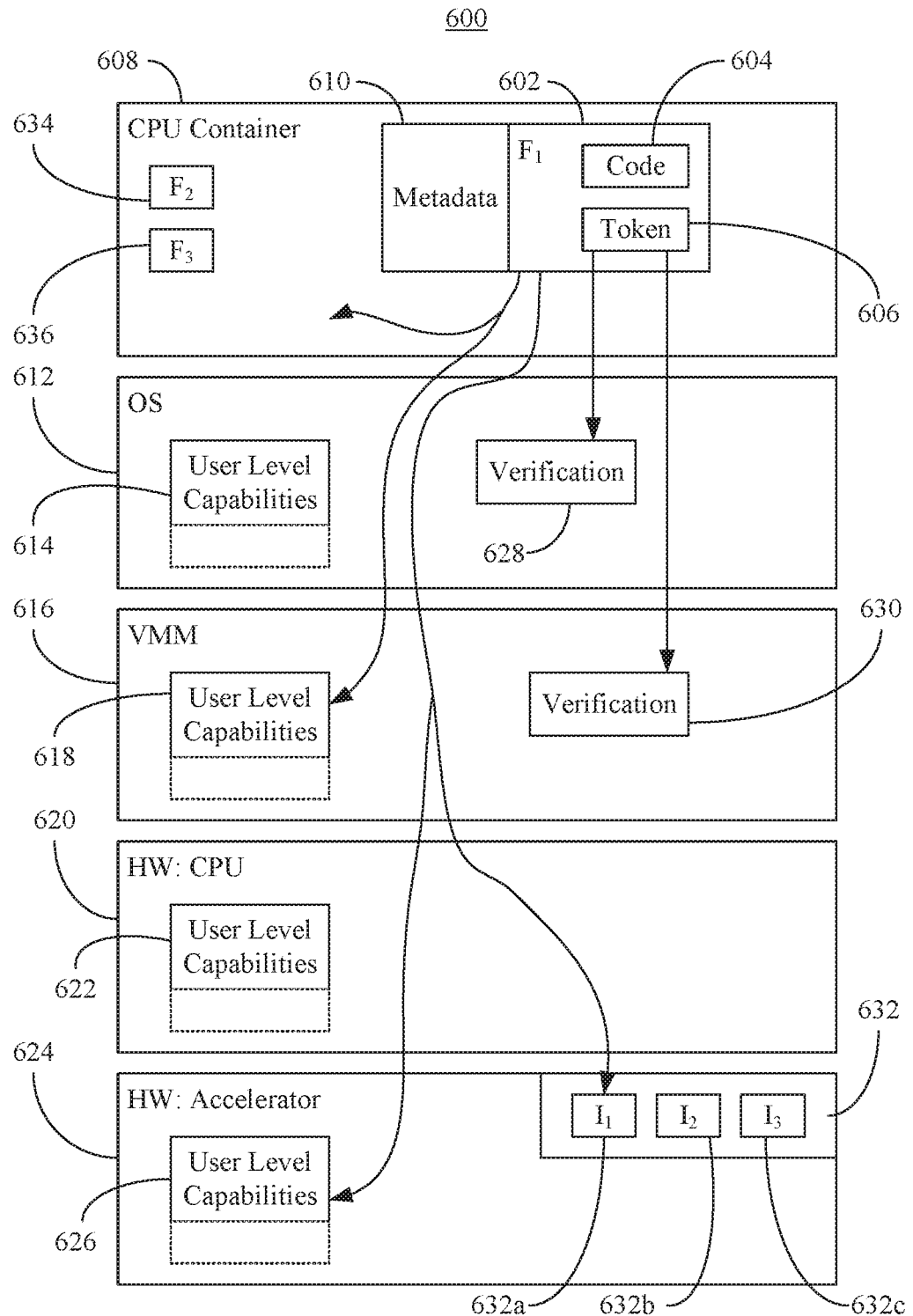
FIG. 6A is a block diagram of an example of an enhanced FaaS architecture for resource allocation and control according to an embodiment.

FIG. 6A shows an enhanced FaaS architecture 600 for resource allocation and control. In the illustrated architecture 600, a first function 602 ("$F_1$") includes code 604 to be executed within a CPU container 608 and a security attestation token 606. The illustrated first function 602 is also associated with metadata 610 that defines a set of user level capabilities, for example user level capabilities 614, 618, 622, 626. In one example, the set of user level capabilities correspond to one or more features outside the container 608. For example, features 614 in an OS 612 might include memory management, system calls, etc., or any combination thereof. Additionally, features 618 in a VMM 616 (virtual machine monitor, e.g., hypervisor) may include memory management, device management, network reconfiguration, access to network paths, virtual software reconfiguration, etc., or any combination thereof. In an embodiment, features 622 in the CPU 620 include resource director technology (RDT) monitor counters, RDT cache and memory controls, Platform Quality of Service monitor counters, Platform Quality of Service cache and memory controls, hardware performance monitoring counters, more direct control of DRAM, 3D XPoint, storage devices, etc., or any combination thereof. Moreover, features 626 in an accelerator 624 (e.g., FPGA) include hardware reconfiguration, bitstreams (e.g., FPGA implementation images), device resets, etc., or any combination thereof.

The security attestation token 606 associated with function 602 may be difficult if not impossible to forge, and tied to some enumerable, discoverable or verifiable attribute of an activation of the first function 602. Thus, if a verification module 628 in the OS 612 and/or a verification module 630 in the VMM 616 determine that the security attestation token 606 is valid, the first function 602 is permitted to use the features 614, 618, 622, and 626 (e.g., corresponding to the user level capabilities). The illustrated curved arrows from the first function 602 represent the various calls that the first function 602 might make within the container 608 and outside the container 608. In one example, the permissioned features are not able to be reserved or otherwise prevented from exposure to the first function 602 by the VMM 616, the OS 612, or other software "executive" (e.g., hypervisor host, guest OS). Indeed, the architecture 600 may expand/extend the set of user level capabilities as long as the expansion does not create a correctness violation (e.g., protocol and/or syntax error) or a security violation. The expansion might include, for example, a filtered view of OS/VMM counters, a tailored control over OS/VMM operations such as "affinitization" (e.g., enforcing affinity rules that establish relationships between VMs and hosts) or policy hinting for memory tiering, etc. If, however, it is determined that the security attestation token 606 is invalid, the architecture 600 prevents the use by the first function 602 of the user level capabilities and continues execution with default features. Thus, the first function 602 may directly call (e.g., command) the features outside the container 608 so as to bypass the container 608.

The illustrated accelerator 624 in FIG. 6A also includes one or more virtual interfaces 632 (632a-632c) that enable separate functions to reconfigure the accelerator 624. In one example, the first function 602 reconfigures the accelerator 624 via a first virtual interface 632a, a second function 634 ("F$_2$") reconfigures the accelerator 624 via a second virtual interface 632b, and a third function 636 ("F$_3$") reconfigures the accelerator 624 via a third virtual interface 632c. The virtual interfaces 632 therefore enable the use of single-root IO virtualization (SR-IOV) and/or serial rapid IO (sRIO) in a FaaS architecture such as the architecture illustrated in FIG. 6A.

Figure 6B:
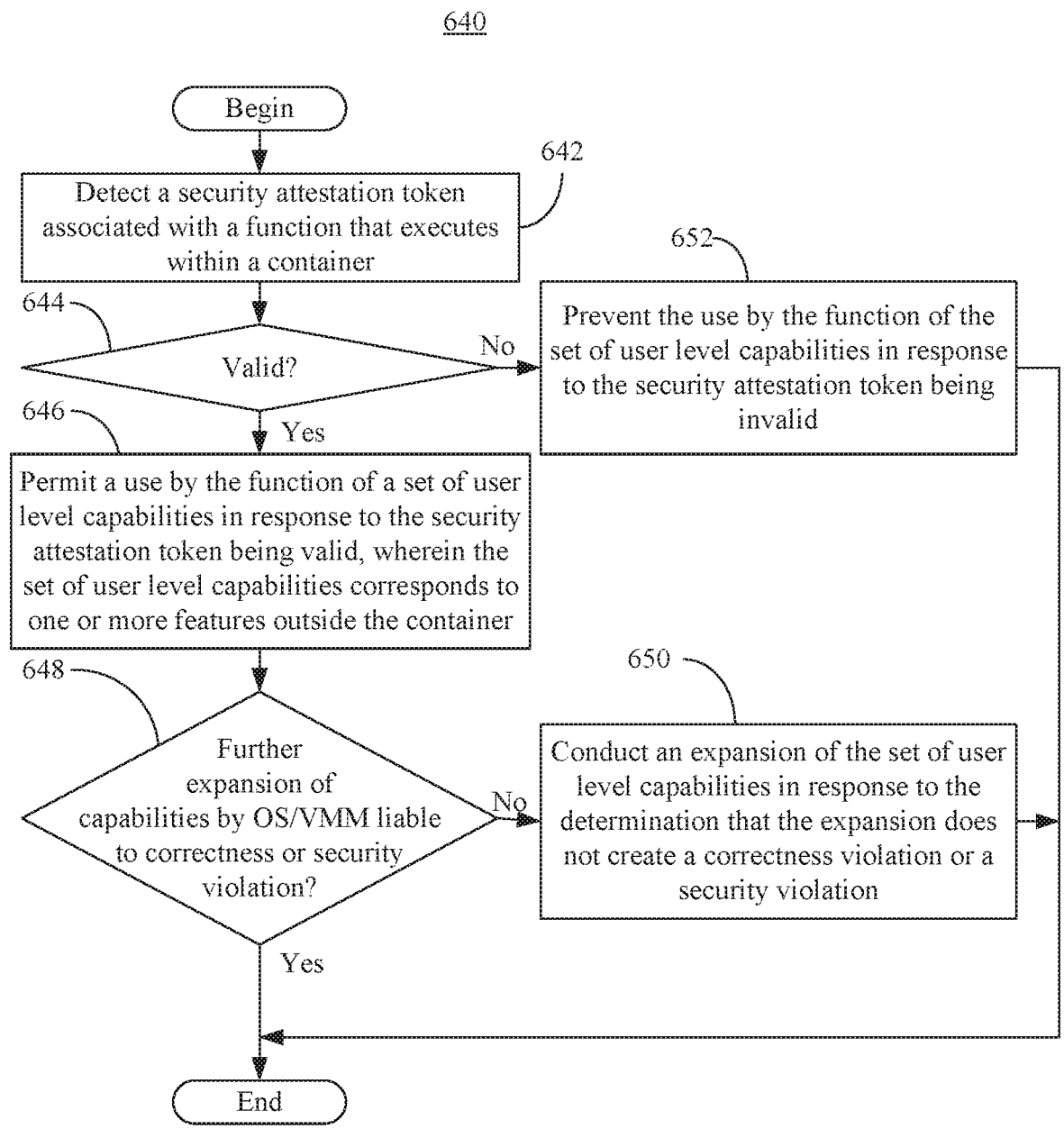
FIG. 6B is a flowchart of managing user level capabilities using an enhanced FaaS architecture according to an embodiment.

Turning now to FIG. 6B, FIG. 6B illustrates a method 640 of managing user level capabilities using an enhanced FaaS architecture such as the one shown in FIG. 6A. The method 640 may generally be implemented in an enhanced FaaS system such as, for example, the system 202 (FIG. 2), the system 300 (FIG. 3), the system 400 (FIG. 4), and/or the system 500 (FIG. 5), already discussed. More particularly, the method 640 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 642 provides for detecting a security attestation token associated with a function that is executed within a container. For example, an orchestrator provides the required security attestation tokens when the orchestrator sends the function to a function invoker. Further, an invoker may maintain a registry of such security attestation tokens and is framework dependent. Security attestation tokens may be generated by either of the invoker or the orchestrator ahead of time when, for example, when a function is registered with the orchestrator by a developer or a consumer of the function.

A determination may be made at block 644 as to whether the security attestation token is valid by verification of signature or other applicable method. If so, block 646 permits a use (e.g., direct access) by the function of a set of user level capabilities, wherein the set of user level capabilities corresponds to one or more features outside the container. The set of capabilities may include, for example, self-monitoring, control over a portion of a virtual space, control over read protections for a range of pages, control over write protections for a range of pages, establishment of a name space for objects stored in persistent memory, memory management, system call management, device management, network configuration, access to network paths, virtual software reconfiguration, and so forth. Moreover, the features may be host processor (e.g., CPU) features, OS features, virtual machine (e.g., VMM) features, accelerator features, and so forth. Further, the features may include granular reservation or prioritization over various components of the FaaS architecture (such as processor share, cache share, I/O throughput share, accelerator share and so forth), using a specific technology such as Intel® Resource Director Technology (RDT) or similar technologies implemented in GPUs, ASIC, PCIe Hub, FPGA, etc.

Additionally, a determination may be made at block 648 as to whether an expansion of the set of user level capabilities creates a correctness violation (e.g., protocol and/or syntax error) or a security violation. If not, illustrated block 650 conducts the expansion in response to the determination that the expanse does not create a correctness or security violation. If it is determined at block 648 that the expansion would create a correctness or security violation, the method 640 terminates. If it is determined at block 644 that the security attestation token invalid, block 652 prevents the use by the function of the set of user level capabilities.

Figure 6C:
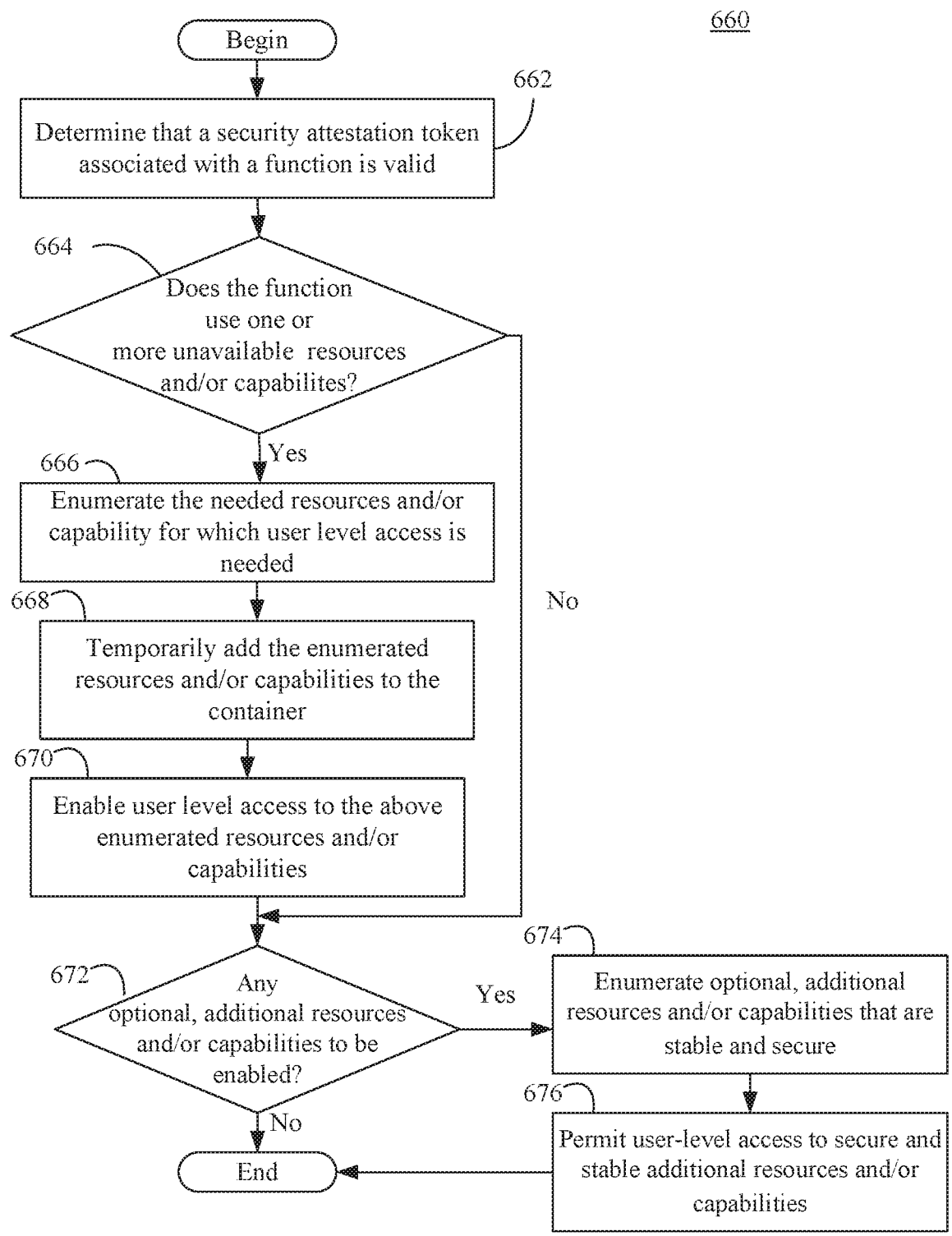
FIG. 6C is a flowchart of managing user level capabilities using an enhanced FaaS architecture according to an embodiment.

Turning now to FIG. 6C, FIG. 6C illustrates a method 660 of managing user level capabilities using an enhanced FaaS architecture such as the one shown in FIG. 6A. The method 660 may generally be implemented in an enhanced FaaS system such as, for example, the system 202 (FIG. 2), the system 300 (FIG. 3), the system 400 (FIG. 4), and/or the system 500 (FIG. 5), already discussed. More particularly, the method 660 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 662 provides for determining that a security attestation token associated with a function is valid by verification of signature or other applicable methods. The function may be executed within a container. Block 664 determines whether the function uses and/or requires access to one or more unavailable resources and/or features. For example, block 664 may determine that a resource or a capability is unavailable when the resource or capability is not available at a user level, and/or not available to a container. The capability source may include, for example, self-monitoring, control over a portion of a virtual space, control over read protections for a range of pages, control over write protections for a range of pages, establishment of a name space for objects stored in persistent memory, memory management, system call management, device management, network configuration, access to network paths, virtual software reconfiguration, and so forth. The resources may be host processor (e.g., CPU) features, OS features, virtual machine (e.g., VMM) features, accelerator features, and so forth. Moreover, the capabilities and/or resources may include granular reservation or prioritization over various components of the FaaS architecture (such as processor share, cache share, I/O throughput share, accelerator share and so forth), using a technology such as Intel® Resource Director Technology (RDT) or similar technologies implemented in GPUs, ASIC, PCIe Hub, FPGA, etc.

If so, block 666 enumerates the needed resources and/or capabilities for which user level access is needed. In some embodiments, block 666 may further include a check as to whether an expansion of the set of user level resources and/or capabilities creates a correctness violation (e.g., protocol and/or syntax error) or a security violation, and does not enumerate any resources and/or capabilities that do so. Block 668 adds the enumerated resources and/or capabilities. For example, block 668 temporarily adds the enumerated resources and/or capabilities to the container of the function. The temporary addition remains for the duration of the function. Block 670 enables user level access to the enumerated resources and/or capabilities.

After block 670 executes or if the function does not use any unavailable resources and/or capabilities, illustrated block 672 determines whether any optional, additional resources and/or capabilities are to be enabled. Block 672 consults a table describing optional, additional resources and/or capabilities that are beneficial for performance or enhance simplicity (e.g., ability to pin down pages, affinitize threads, etc). If so, block 674 may enumerate the optional, additional resources and/or capabilities. As already described above, block 674 may further execute a check to determine whether a correctness violation (e.g., protocol and/or syntax error) or security violation will occur if a particular optional, additional resource and/or capability is enumerated and allowed for user-level access. If a security or correctness violation would occur for the particular optional, additional resource and/or capability, the particular optional, additional resource and/or capability is not enumerated. As such, block 674 will enumerate only secure and stable optional, additional resources and/or capabilities. That is, only optional, additional resources and/or capabilities that do not cause security problems and which also do not pose a risk to stable functioning of the system (such as deadlocks, livelocks, starvation, etc.) will be enumerated. Block 676 permits user-level access to secure and stable additional resources and/or capabilities for the duration of the function execution.

After block 676 completes, the method terminates. If block 672 determines that no further capabilities and resources are to be enabled, the method terminates.

It is worth noting that the methods 640 and 660 may be modified and combined together. For example, boxes 664, 666, 668, 670, 672, 674, 676 may be substituted for one or more of boxes 646, 648, 650.

Additional Notes and Examples

Example 601 includes at least one computer readable storage medium comprising a set of computer executable program instructions, which, when executed by a computing device, cause the computing device to detect a security attestation token associated with a function that executes within a container, permit a use by the function of a set of user level capabilities if the security attestation token is valid, and prevent the use by the function of the set of user level capabilities if the security attestation token is invalid, wherein the set of user level capabilities corresponds to one or more features outside the container.

Example 602 includes the at least one computer readable storage medium of Example 601, wherein the program instructions, when executed by the computing device, cause the computing device to conduct at least one expansion of the set of user level capabilities if the security attestation token is valid, wherein the security attestation token is valid if it does not create a correctness violation or a security violation.

Example 603 includes the at least one computer readable storage medium of Example 601, wherein the set of user level capabilities is selected from a group comprising self-monitoring, control over a portion of a virtual space, control over read protections for a range of pages, control over write protections for a range of pages, establishment of a name space for objects stored in persistent memory, memory management, system call management, device management, network reconfiguration, access to network paths, and virtual software reconfiguration.

Example 604 includes the at least one computer readable storage medium of Example 601, wherein the one or more features are selected from the group comprising host processor features, operating system features, virtual machine features and accelerator features.

FIG. 7A shows a FaaS compute node in which various virtual power performance monitoring unit (vPMU) events 700 are monitored at the function or container level during the execution of a function 714 within a container 702. The events 700 may be configured for monitoring via an architectural interface 704 (e.g., hardware and/or software) that enables nested monitoring. With regard to nesting, the monitoring may be done within a container or even within a function, in the same way that it may be done in a virtual machine guest, in a bare metal operating system or in a bare metal container. In other words, the ability to measure some architectural event (e.g., numbers of instructions executed, the number of cache misses encountered, etc.) or the ability to sample software event counters (such as numbers of page faults, pages paged in or paged out, numbers of packets received or transmitted, etc.) is not dependent on from where counters are read. Moreover, the measurements are possible at each level to obtain a reading that reflects the contribution of that particular level (e.g., a function, a container, a guest OS, a host OS, etc.) to that reading.

In the illustrated example, the events 700 include time executed, instructions per cycle (IPC), memory bandwidth, cache usage, I/O operations per second (IOPs) and network bandwidth, although other events may also be monitored/collected. The programming of the events 700 to be monitored may be unified through system software capabilities. In one example, vPMU drivers furnished by, for example, the container 702 and/or host machine, conduct the unification of the events 700. As will be discussed in greater detail, the events 700 may be tracked via various virtual PMU counters (e.g., "shadow" counters that mirror other counters).

For example, at time to, a first snapshot 706 is generated of a counter value associated with the execution of the function 714 in the container 702. Similarly, a second snapshot 708 may be generated of the counter value at time to, a third snapshot 710 may be generated of the counter value at time $t_{n+1}$, and so forth. The counter value may generally quantify one or more of the events 700, wherein the snapshots 706, 708, 710 may be generated in response to a new instruction, a new interface call, etc. Implementing the snapshots 706, 708, 710 in hardware may minimize software overhead. One or more of the snapshots 706, 708, 710 may be shadow snapshots that mirror other parts of other pre-existing snapshots at deeper levels of software nesting. The snapshots 706, 708, 710 and/or differences (e.g., deltas) between the snapshots 706, 708, 710 are stored in a vPMU buffer 712, which may operate as a scratchpad area for the function 714. In the illustrated example, the vPMU buffer 712 is exposed to one or more of the function 714, an orchestrator 716 or a node manager 718 via an API endpoint 720 (e.g., Hypertext Transfer Protocol/HTTP endpoint).

The illustrated solution may therefore be used to prevent starvation in terms of capacity or bandwidth in a FaaS infrastructure that provides limited memory resources for each function invocation. More particularly and as an example, a developer of the function 714 may monitor if and how much memory page swapping or cache thrashing the function 714 encounters by programming a vPMU to obtain OS metrics, memory cache and memory access statistics, etc., via the snapshots 706, 708, 710. Additionally, multiple node-level vPMUs may be composed into a distributed vPMU.

Turning now to FIG. 7B, a vPMU buffer 722 is shown in which first metrics data 724 (e.g., telemetry snapshots and/or differences between snapshots) associated with the execution of a function 726 is provided to the function 726 and container software 728. In the illustrated example, the container software 728 performs an aggregation of the first metrics data 724 (e.g., cache usage over time) and generates second metrics data 730 based on the aggregation. Additionally, the function 726 may collect and process the first metrics data 724 to generate third metrics data 732.

Turning now to FIG. 7C, a method 734 of monitoring the performance of a function is shown. The method 734 may generally be implemented in an enhanced FaaS system such as, for example, the system 202 (FIG. 2), the system 300 (FIG. 3), the system 400 (FIG. 4), and/or the system 500 (FIG. 5), already discussed. More particularly, the method 734 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 736 provides for generating a first snapshot of a counter value associated with execution of a function in a container at a first point of time of the execution, wherein a second snapshot of the counter value is generated at block 738 at second point of time of the execution. In one example, block 740 stores one or more of the first snapshot, the second snapshot or a difference between the first snapshot and the second snapshot to a vPMU buffer. Additionally, the vPMU buffer may be exposed to one or more of the function, an orchestrator or a node manager via an API endpoint at block 742.

Technology described herein therefore enables a function developer to work in conjunction with containers or any other execution engine to demarcate, via background performance monitoring, specific performance telemetry arising during execution of the function. Accordingly, event orientation, minimal administration, high scalability, atomic unit of scale and granular billing may all be achieved. It further permits a privilege-appropriate view of the collected snapshot data. For example, a container software module hosting the function code may observe and/or identify some events that may be obscured from a developer provided module. For example and due to different architectures, the function code may not exhibit certain tendencies when the function code is hosted in the developer provided module, but may exhibit those certain tendencies when hosted inside the container software module. Thus, the technology herein allows granular performance tracking on a platform that is not directly accessible by the developer (e.g., the developer did not develop and/or debug the function code on the platform). In some embodiments, a FaaS system (e.g., an orchestrator or scheduler) may use the collected snapshot data for more efficient scheduling and allocations.

Additional Notes and Examples

Example 701 includes at least one computer readable storage medium comprising a set of executable program instructions, which, when executed by a computing device, cause the computing device to generate a first snapshot of a counter value associated with execution of a function in a container, generate a second snapshot of the counter value associated with execution of the function in the container, and store one or more of the first snapshot, the second snapshot or a difference between the first snapshot and the second snapshot to a virtual performance monitoring unit (PMU) buffer.

Example 702 includes the at least one computer readable storage medium of Example 701, wherein the program instructions, when executed by the computing device, cause the computing device to expose the virtual PMU buffer to one or more of the function, an orchestrator or a node manager via an application program interface (API) endpoint.

Shared Memory Examples

Some embodiments may advantageously provide a buffer extension for in-core messages, in-system messages, in-platform messages and/or machine message communication. Conventional inter-function communication over HTTP may involve more overhead than needed if collaborating functions are co-located on a same core, same system, same platform and/or any execution units with shared memory. Some embodiments may provide shared memory to allow two collaborating functions to share a memory segment for copying the content of data exchanged between the two functions. Advantageously, some embodiments may avoid inter-function communication overhead by bypassing the OS kernel and other HTTP layers.

Figure 8A:
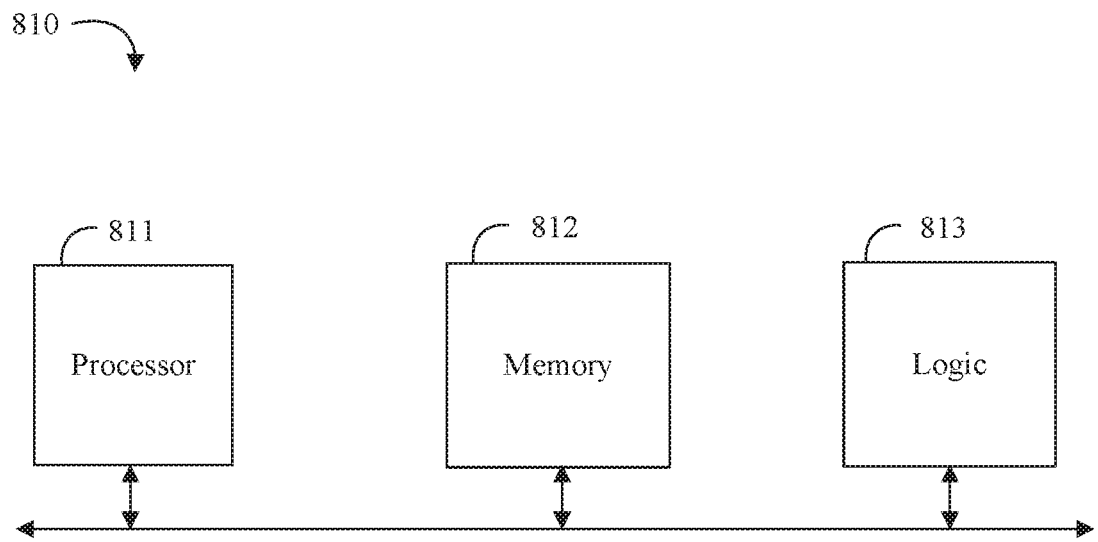
FIG. 8A is a block diagram of an example of an electronic processing system according to an embodiment.

Turning now to FIG. 8A, an embodiment of an electronic processing system 810 may include a processor 811, memory 812 communicatively coupled to the processor 811, and logic 813 communicatively coupled to the processor 811 and the memory 812 to share a memory region of the memory 812 between a first transient function and a second transient function which collaborates with the first transient function. In some embodiments, the logic 813 may be further configured to provide a buffer extension for in-core, in-system, in-platform and/or machine message communication between collaborative transient functions of a FaaS platform, such as the first and second transient functions. In some embodiments, the logic 813 may be configured to exchange data between the first transient function and the second transient function with the shared memory region. For example, the logic 813 may be configured to synchronize the exchanged data with at least one of a call instruction and a return instruction. In some embodiments, the logic 813 may be located in, or co-located with, various components, including the processor 811, memory 812, etc. (e.g., on a same die).

Embodiments of each of the above processor 811, memory 812, logic 813, and other components of the system 810 may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application-specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 812, persistent storage media, or other memory may store a set of instructions which when executed by the processor 811 cause the system 810 to implement one or more components, features, or aspects of the system 810 (e.g., the logic 813, sharing the memory region, providing the buffer extension, exchanging data, etc.). Embodiments of a suitable processor may include a general purpose processor, a special purpose processor, a CPU, a GPU, a controller, a micro-controller, a kernel, an execution unit, etc.

Figure 8B:
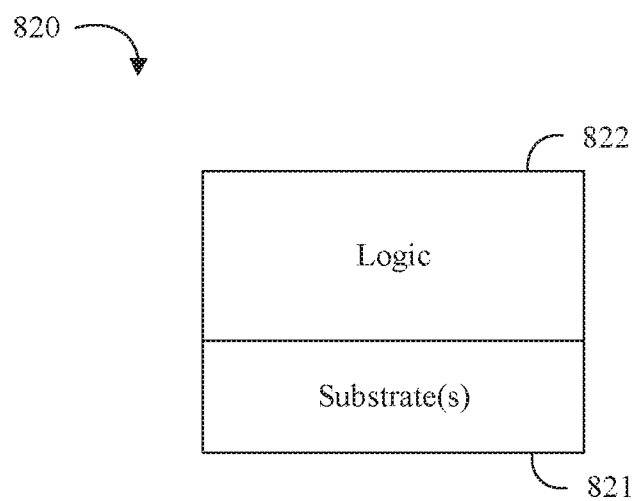
FIG. 8B is a block diagram of an example of a semiconductor package apparatus according to an embodiment.

Turning now to FIG. 8B, an embodiment of a semiconductor package apparatus 820 may include one or more substrates 821, and logic 822 coupled to the one or more substrates 821, where the logic 822 is at least partly implemented in one or more of configurable logic and fixed-functionality hardware logic. The logic 822 coupled to the one or more substrates 821 may be configured to share a memory region between a first transient function and a second transient function which collaborates with the first transient function. In some embodiments, the logic 822 may be further configured to provide a buffer extension for in-core, in-system and/or in-platform machine message communication between collaborative transient functions of a FaaS platform. In some embodiments, the logic 822 may be configured to exchange data between the first transient function and the second transient Function with the shared memory region. For example, the logic 822 may be configured to synchronize the exchanged data with at least one of a call instruction and a return instruction. In some embodiments, the logic 822 coupled to the one or more substrates 821 may include transistor channel regions that are positioned within the one or more substrates 821.

Embodiments of logic 822, and other components of the apparatus 820, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 820 may implement one or more aspects of the method 830 (FIG. 8C), or any of the embodiments discussed herein. In some embodiments, the illustrated apparatus 820 may include the one or more substrates 821 (e.g., silicon, sapphire, gallium arsenide) and the logic 822 (e.g., transistor array and other integrated circuit/IC components) coupled to the substrate(s) 821. The logic 822 may be implemented at least partly in configurable logic or fixed-functionality logic hardware. In one example, the logic 822 may include transistor channel regions that are positioned (e.g., embedded) within the substrate(s) 821. Thus, the interface between the logic 822 and the substrate(s) 821 may not be an abrupt junction. The logic 822 may also be considered to include an epitaxial layer that is grown on an initial wafer of the substrate(s) 821.

Figure 8C:
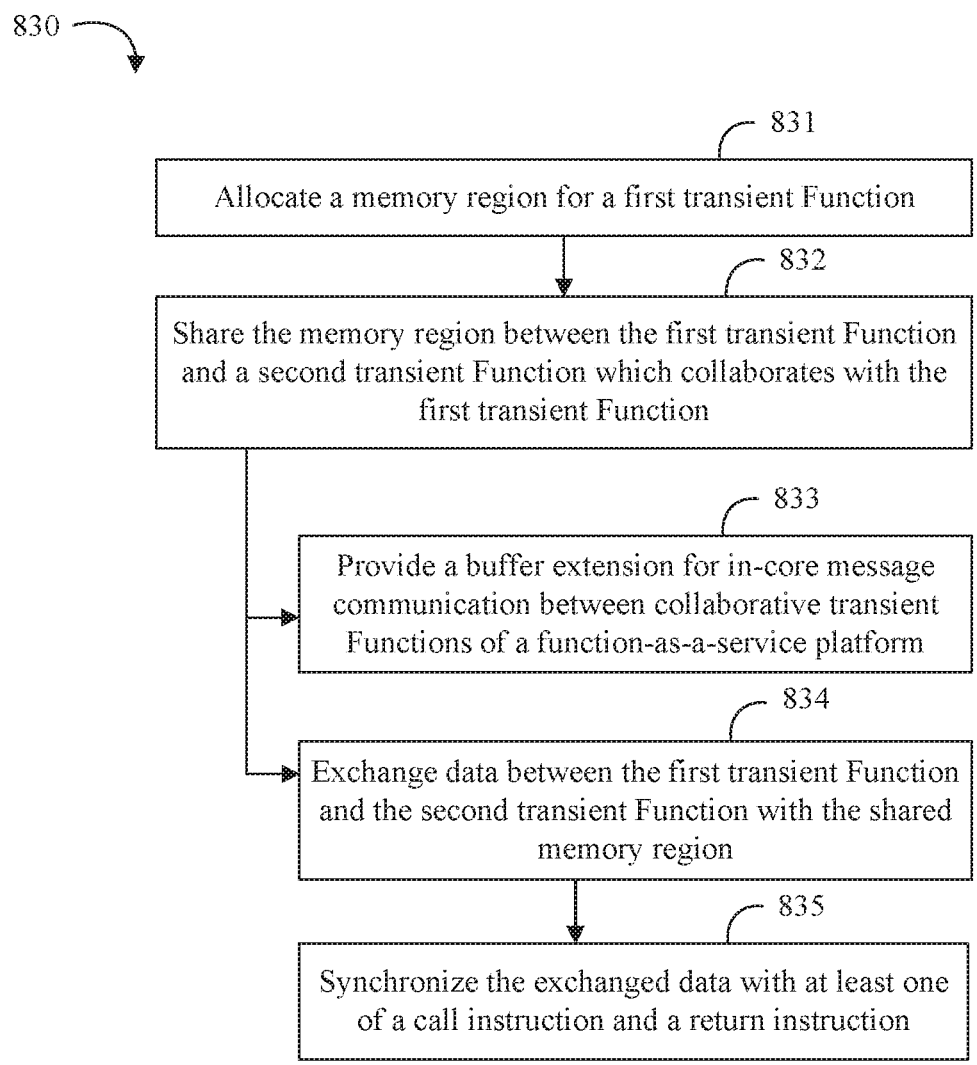
FIG. 8C is a flowchart of an example of sharing memory among multiple FaaS functions according to an embodiment.

Turning now to FIG. 8C, an embodiment of a method 830 of sharing memory among multiple FaaS functions may include allocating a memory region for a first transient function at block 831, and sharing the memory region between the first transient function and a second transient function which collaborates with the first transient function at block 832. Some embodiments of the method 830 may further include providing a buffer extension for in-core machine message communication between collaborative transient Functions of a FaaS platform at block 833. Some embodiments of method 830 may provide a buffer extension for in-node machine message communication between the transient functions of a FaaS platform at block 833. The method 830 may also include exchanging data between the first transient function and the second transient function with the shared memory region at block 834. For example, the method 830 may include synchronizing the exchanged data with at least one of a call instruction and a return instruction at block 835.

Embodiments of the method 830 may be implemented in a system, apparatus, computer, device, etc., for example, such as those described herein. More particularly, hardware implementations of the method 830 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 830 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 830 may be implemented on a computer readable medium as described in connection with Examples 814 to 817 below. Embodiments or portions of the method 830 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 8D:
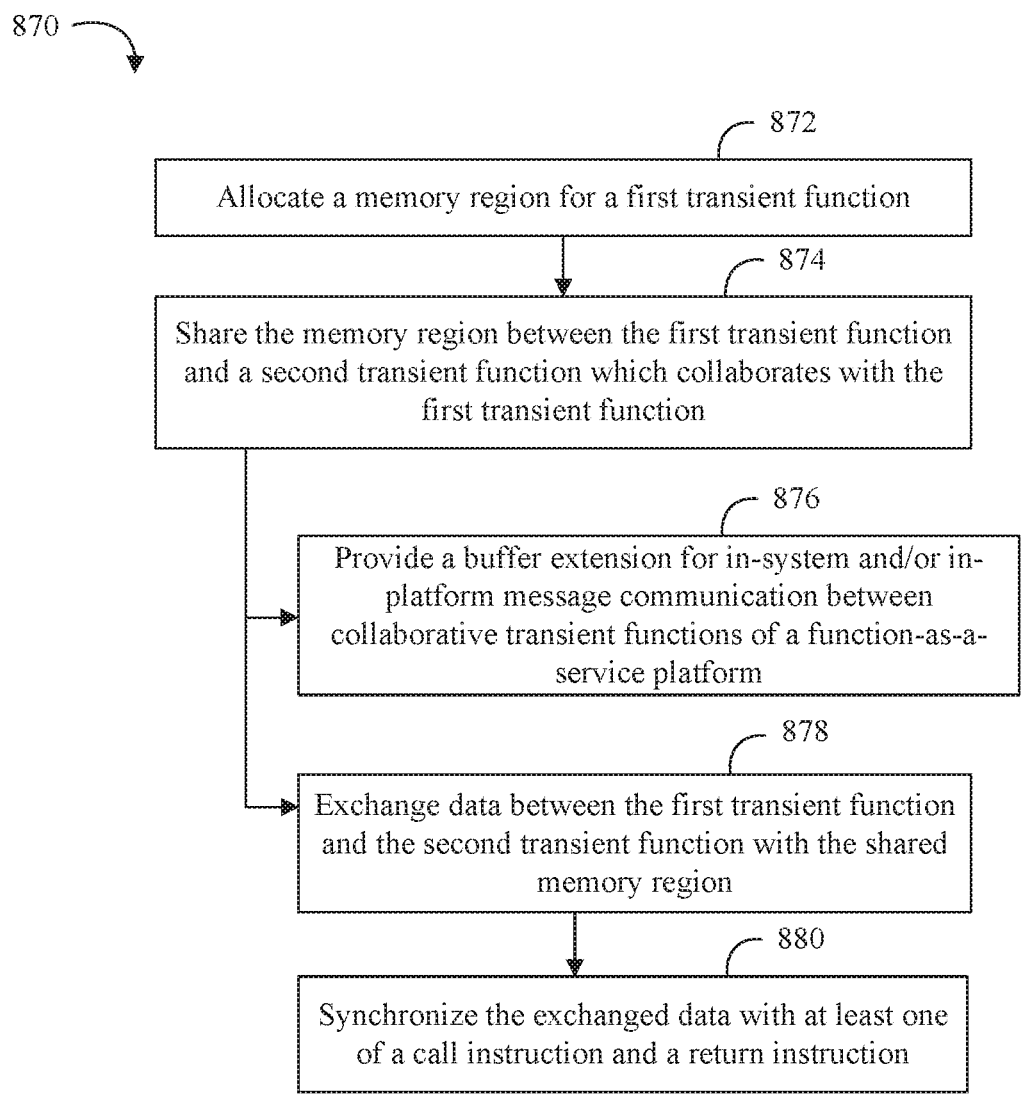
FIG. 8D is a flowchart of an example of sharing memory among multiple FaaS functions according to an embodiment.

Turning now to FIG. 8D, an embodiment of a method 870 of sharing memory among multiple FaaS Functions may include allocating a memory region for a first transient function at block 872, and sharing the memory region between the first transient function and a second transient function which collaborates with the first transient function at block 874. Some embodiments of the method 870 may further include providing a buffer extension for in-system and/or in-platform machine message communication between collaborative transient functions of a FaaS platform at block 876. The method 830 may also include exchanging data between the first transient function and the second transient function with the shared memory region at block 878. For example, the method 870 may include synchronizing the exchanged data with at least one of a call instruction and a return instruction at block 880.

Embodiments of the method 870 may be implemented in a system, apparatus, computer, device, etc., for example, such as those described herein. More particularly, hardware implementations of the method 870 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 870 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 870 may be implemented on a computer readable medium as described in connection with Examples 814 to 817 below. Embodiments or portions of the method 870 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

In some embodiments, the passing of data between two collaborating functions that are on the same machine and are using memory-based transfer as described in method 870 does not require the processes or threads that are performing the communication to have to go into a kernel, and thus they can accomplish the data exchange from the user's application. Further, new instructions may perform the necessary exchange of data, securely at the user level. That is, since the instructions may be designed to operate with hardware privileges (which are even greater than kernel privileges), and thus the execution of the function has the right to copy data from the container of one function to the container of another function. Alternatively, the actual copying may be performed in firmware or in a helper thread in the OS, but may be set in motion by a new instruction that does not require sending and receiving functions in kernel mode in order to activate the firmware or the helper threads.

Figure 8E:
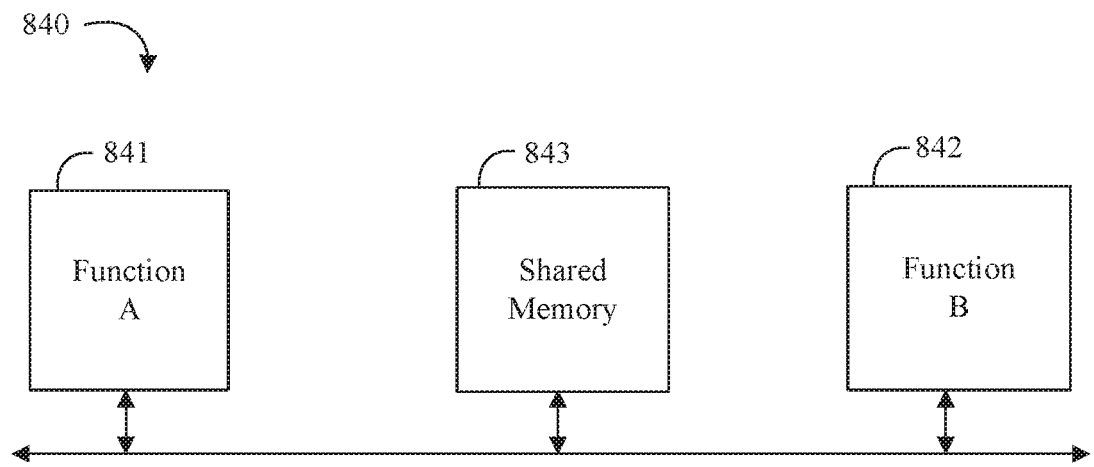
FIG. 8E is a block diagram of another example of a FaaS system that provides memory sharing among multiple FaaS functions according to an embodiment.

Turning now to FIG. 8E, an embodiment of an enhanced FaaS system 840 may include two collaborating FaaS functions 841 and 842 (e.g., function A and B), and shared memory 843 that may be configured to facilitate the collaboration between the two FaaS functions 841 and 842. Some embodiments may advantageously provide a buffer/ISA extension for machine message/JSON communication between FaaS functions 841 and 842. Some FaaS architecture may use standard data-interchange formats such as JSON for inter-function communication over HTTP. When collaborating FaaS functions are co-located on the same machine (e.g., core or host) by the scheduler, the inter function communication does not need to go through the OS kernel and other HTTP layers. In some embodiments, shared memory 843 may provide a way of communication by letting the two functions 841, 842 share a memory segment for copying the content of data exchanged between the two functions 841, 842. Just before the callee function is invoked, for example, parameters passed by the caller function may be copied from the caller into the shared memory. After the callee is returned, a response/JSON object content may be copied from the shared memory to the caller. The synchronization may happen naturally via the call and return instructions.

Figure 8F:
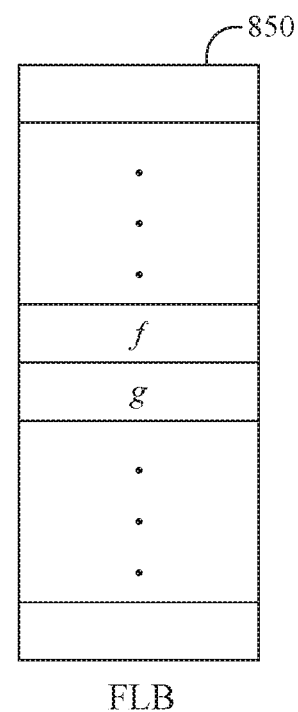
FIG. 8F is a block diagram of another example of a function look-aside buffer to facilitate communications between two FaaS functions according to an embodiment.

Turning now to FIG. 8F, an embodiment of a function look-aside buffer (FLB) 850 may include entries for two collaborating FaaS functions $f$ and $g$. Whether communication should happen via shared memory (e.g., or internal buffers) or through the conventional HTTP/kernel route may be determined by checking if the caller is local/proximate (e.g., in-core, in-system, in-platform and/or execution units with shared memory) to the callee, and then branch based on the value of that check to run the appropriate code for packing/copying data. To speedup this check, the FLB 850 may include a hardware structure similar a translation look-aside buffer (TLB) that may be used to cache the process/ lambda ID of the functions co-located together. The locality information may be updated as functions move around similar to page table entries and any resident entry in the cache is invalidated when functions are removed from the host.

Figure 8G:
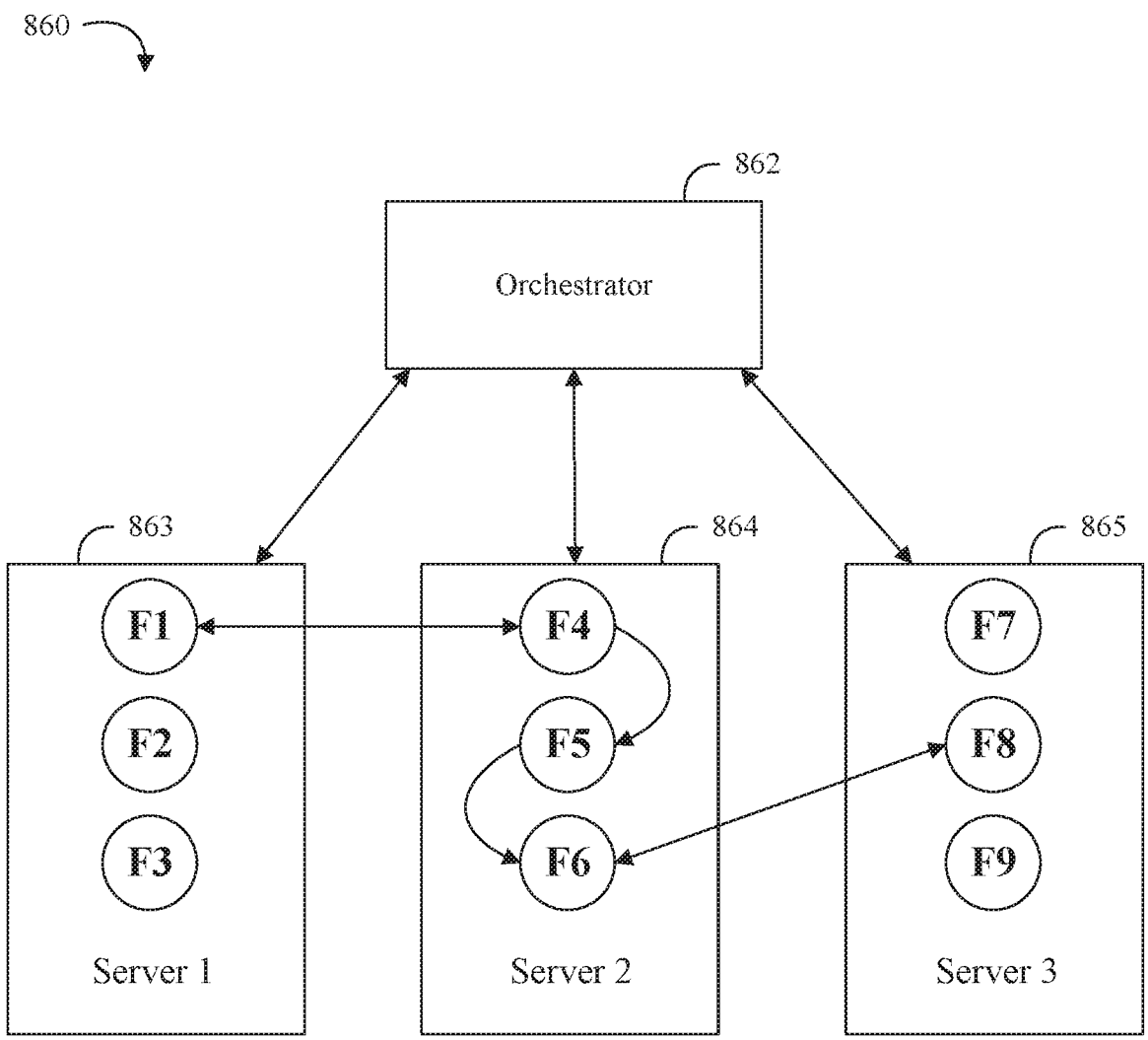
FIG. 8G is a block diagram of another example of a FaaS system for orchestrating distributed FaaS functions according to an embodiment.

Turning now to FIG. 8G, an embodiment of an enhanced FaaS system 860 may include an orchestrator 862 in communication with two or more servers 863, 864, and 865. Function code F1 through F9 may be distributed among the servers 863, 864, and 865, with collaboration between F1, F4, F5, F6, and F8. Because F4, F5, and F6 are co-located on the same server 864, some embodiments may advantageously utilize shared memory on the server 864 to facilitate the collaboration among F4, F5, and F6. Some embodiments may utilize a graph based representation of what functions are running on what servers for better bin packing and/or locality optimization. Some embodiments may also utilize a graph based representation of cross function communication patterns. For example, call chains across nodes may be shared as a graph based representation.

In some embodiments, the OS may expose a function call API to the functions. For example, the API framework may use an OS API for function calls instead of network communication if available. Advantageously, the API framework may provide a more efficient transport as compared to the network for remote calls. Some embodiments may avoid the network by utilizing 128 bit addresses to make all functions global and remote direct memory access (RDMA) accessible.

Embodiments or aspects/features of the system 810 (FIG. 8A), the apparatus 820 (FIG. 8B), the method 830 (FIG. 8C), the FaaS system 840 (FIG. 8D), the FLB 850 (FIG. 8F), and or the FaaS system 860 (FIG. 8G) may be substituted for, or incorporated into, all or portions of the FaaS platform 102 (FIG. 1), the enhanced FaaS system 202 (FIG. 2), the FaaS server architecture 300 (FIG. 3), the enhanced FaaS system (FIG. 4), and/or the enhanced FaaS system (FIG. 5). For example, software components of the various embodiments (e.g., the function code, aspects of the logic, etc.) may be incorporated in the FaaS software sub-system 506 (FIG. 5), and hardware components of the various embodiments (e.g., the shared memory, the FLB, aspects of the logic, etc.) may be incorporated in the FaaS hardware sub-system 508 (FIG. 5).

Additional Notes and Examples

Example 800 includes at least one computer readable storage medium comprising a set of executable program instructions, which, when executed by a computing device, cause the computing device to share a memory region of the memory between a first transient function and a second transient function which collaborates with the first transient function, utilize 128 bit addresses, expose a function call interface for the first and second transient functions, and create a graph-based representation which include the first and second transient functions.

Example 801 includes an electronic processing system, comprising a processor, memory communicatively coupled to the processor, and logic communicatively coupled to the processor and the memory to share a memory region of the memory between a first transient function and a second transient function which collaborates with the first transient function.

Example 802 includes the system of Example 801, wherein the logic is further to provide a buffer extension for machine message communication among collaborative transient functions of a function-as-a-service platform.

Example 803 includes the system of any of Examples 801 to 802, wherein the logic is further to exchange data between the first transient function and the second transient function with the shared memory region.

Example 804 includes the system of Example 803, wherein the logic is further to synchronize the exchanged data with at least one of a call instruction and a return instruction.

Example 805 includes a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to share a memory region of the memory between a first transient function and a second transient function which collaborates with the first transient function.

Example 806 includes the apparatus of Example 805, wherein the logic is further to provide a buffer extension for machine message communication among collaborative transient functions of a function-as-a-service platform.

Example 807 includes the apparatus of any of Examples 805 to 806, wherein the logic is further to exchange data between the first transient function and the second transient function with the shared memory region.

Example 808 includes the apparatus of Example 807, wherein the logic is further to synchronize the exchanged data with at least one of a call instruction and a return instruction.

Example 809 includes the apparatus of Example any of Examples 805 to 808, wherein the logic coupled to the one or more substrates includes transistor channel regions that are positioned within the one or more substrates.

Example 810 includes a method of sharing memory, comprising allocating a memory region for a first transient function, and sharing the memory region of the memory between the first transient function and a second transient function which collaborates with the first transient function.

Example 811 includes the method of Example 810, further comprising providing a buffer extension for machine message communication among collaborative transient functions of a function-as-a-service platform.

Example 812 includes the method of any of Examples 810 to 811, further comprising exchanging data between the first transient function and the second transient function with the shared memory region.

Example 813 includes the method of Example 812, further comprising synchronizing the exchanged data with at least one of a call instruction and a return instruction.

Container Speculative Execution Examples

Some embodiments may advantageously provide container run ahead speculative execution. Some functions involve long latency/startup, which can slow down execution. Some embodiments may provide a run ahead execution mechanism to fetch data/instruction streams at the processor/core level, and also to reserve and/or reallocate resources. Advantageously, some embodiments may reduce latency/startup for functions that can take advantage of the run ahead capability.

By way of explanation and not limitation, run ahead may refer to a technique that allows a processor to keep executing instructions (e.g., speculatively) during cache miss cycles instead of stalling. The speculative execution may be used to generate instruction and data stream prefetches by detecting instruction/cache misses before they would otherwise occur by using the idle execution resources. The manageable costs may include providing speculative execution support to preserve the register file state and to prevent speculative stores from modifying memory.

Some FaaS functions may benefit from performing blocking of variable length (e.g., some long) latency operations such as querying from databases, invoking other FaaS services, etc. Some embodiments may provide run ahead execution technology to fetch data/instruction streams at the processor/core level, and also to reserve/reallocate resources (e.g., such as reserving bandwidth for accessing databases, warming up containers/FaaS functions that will potentially be invoked, re-locating containers/FaaS function to a close proximity of the current function, etc.)

To enable such capability in a FaaS environment, some embodiments may provide copy on write technology to support speculative execution at processor level, and also a runtime routine to substitute out the externally visible operations (e.g., such as external function invocations, database updates, etc.) into appropriate matching operations for reserving/reallocating resources. Some embodiments may utilize multi-key total memory encryption (MKTME) to tag keys to functions. For example, some embodiment may use MKTME to provide a free speculation side channel with RDMA. In some embodiments, a programmer may indicate through a data structure a hint as to whether or not to perform run ahead speculative execution.

In one embodiment, an electronic processing system such as the one described in connection with FIG. 8A is configured to run ahead to fetch FaaS-related information, and block one or more variable length latency operations based on the fetched FaaS-related information. In some embodiments, the electronic processing system may be further configured to reserve and/or reallocate resources based on the fetched FaaS-related information. Additionally, or alternatively, the electronic processing system may be further configured to substitute out one or more externally visible operations for corresponding matching operations to one or more of reserve and reallocate resources. In some embodiments, various components, such as a logic, a processor, a memory, etc., may be located in, or co-located with each other (e.g., on a same die).

In another embodiment, a semiconductor package apparatus same or similar as the semiconductor package apparatus illustrated in FIG. 8B may include one or more substrates, and logic coupled to the one or more substrates, where the logic is at least partly implemented in one or more of configurable logic and fixed-functionality hardware logic. The logic coupled to the one or more substrates may be configured to run ahead to fetch FaaS-related information, and block one or more variable length latency operations based on the fetched FaaS-related information. In some embodiments, the logic may be further configured to reserve and/or reallocate resources based on the fetched FaaS-related information. Additionally, or alternatively, the logic may be further configured to substitute out one or more externally visible operations for corresponding matching operations to one or more of reserve and reallocate resources. In some embodiments, the logic coupled to the one or more substrates may include transistor channel regions that are positioned within the one or more substrates.

Figure 9A:
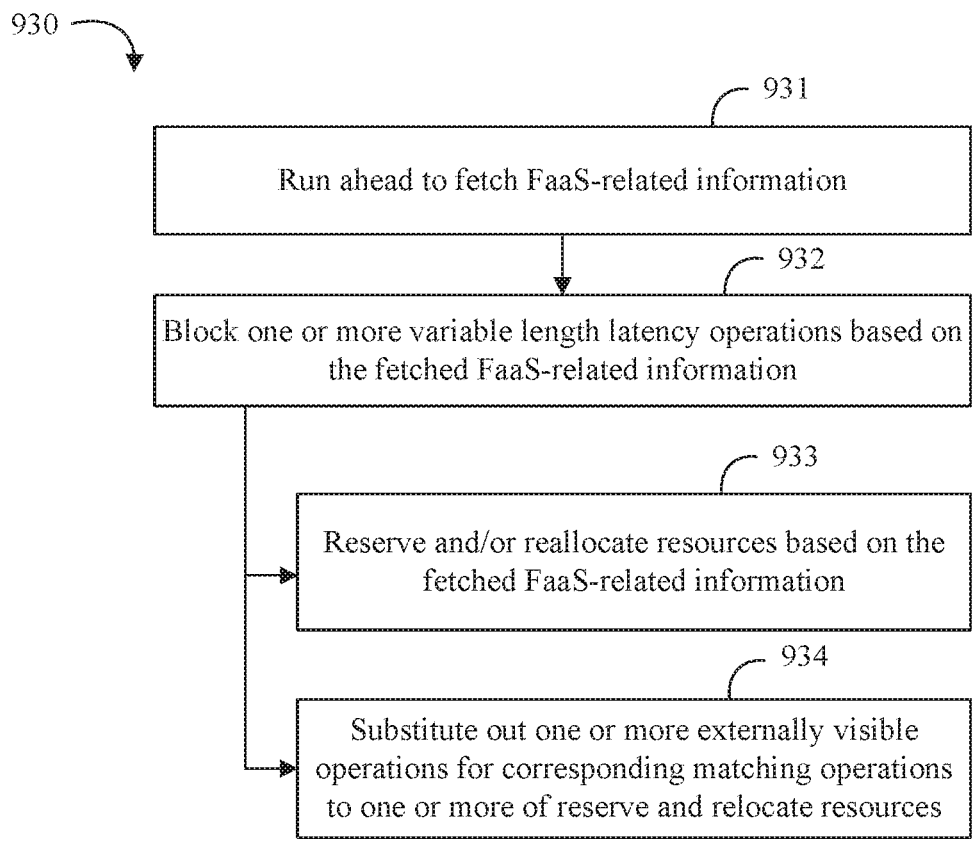
FIG. 9A is a flowchart of an example of a method of providing container run ahead speculative execution of a function as a service according to an embodiment.

Turning now to FIG. 9A, an embodiment of a method 930 of providing a function as a service may include running ahead to fetch FaaS-related information at block 931, and blocking one or more variable length latency operations based on the fetched FaaS-related information at block 932. Some embodiments of the method 930 may further include reserving and/or reallocating resources based on the fetched FaaS-related information at block 933. Additionally, or alternatively, the method 930 may also include substituting out one or more externally visible operations for corresponding matching operations to one or more of reserve and reallocate resources at block 934.

Embodiments of the method 930 may be implemented in a system, apparatus, computer, device, etc., for example, such as those described herein. More particularly, hardware implementations of the method 930 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 930 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 930 may be implemented on a computer readable medium as described in connection with Examples 931 to 933 below. Embodiments or portions of the method 930 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 9B:
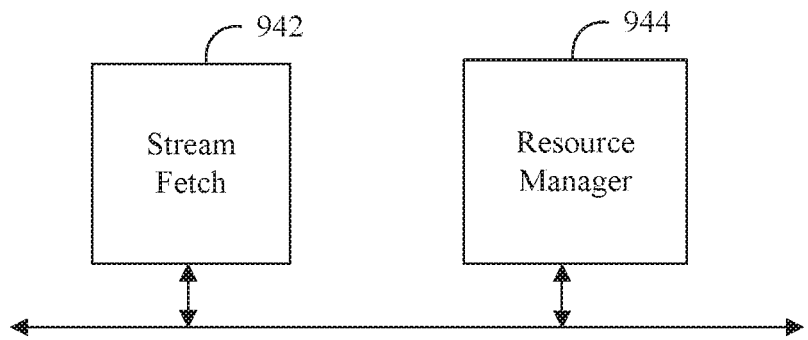
FIG. 9B is a block diagram of another example of a FaaS system supporting container run ahead speculative execution according to an embodiment.

Turning now to FIG. 9B, an embodiment of an enhanced FaaS system 940 may include a stream fetch module 942 communicatively coupled to a resource manager 944. The stream fetch module 942 may include technology to run ahead to fetch FaaS-related information of a function to be executed. The resource manager 944 may include technology to block one or more variable length latency operations based on the fetched FaaS-related information. In some embodiments, the resource manager 944 may be further configured to reserve and/or reallocate resources based on the fetched FaaS-related information. Additionally, or alternatively, the resource manager 944 may be further configured to substitute out one or more externally visible operations for corresponding matching operations to one or more of reserve and reallocate resources. Some embodiments of the system 940 may advantageously provide container run ahead speculative execution (e.g., in a FaaS environment).

Figure 9C:
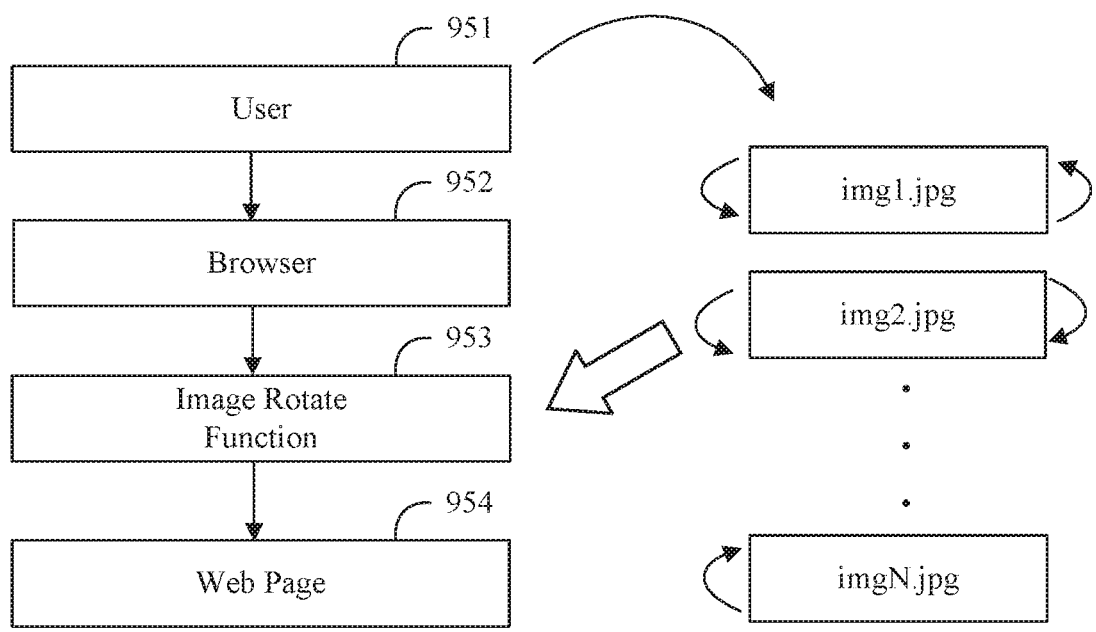
FIG. 9C is a block diagram of another example of a FaaS system supporting container run ahead speculative execution of image rotation functions according to an embodiment.

Turning now to FIG. 9C, an embodiment of an enhanced FaaS system 950 may include speculative execution of some FaaS functions. A user 951 may use a browser 952 to display a web page 954 which includes multiple images, e.g., img1.jpg through imgN.jpg. The user 951 may rotate one or more images of the web page 954 via an image rotate function 953, through the FaaS system 950. The FaaS system 950 may determine a likely user intent to rotate one or more images (e.g., img1.jpg through imgN.jpg) and may speculatively rotate the images to one or more alternative orientations. For example, the FaaS system 950 may detect a pattern/sequence of usage of the image orientations and launch various rotation functions in advance for a better user experience and/or performance metrics. The speculative execution may vastly reduce the latency to rotate the images from the user's perspective.

Embodiments or aspects/features of the system, the apparatus, the method 930 (FIG. 9A), the FaaS system 940 (FIG. 9B), and/or the FaaS system 950 (FIG. 9C) may be substituted for, or incorporated into, all or portions of the FaaS platform 102 (FIG. 1), the enhanced FaaS system 202 (FIG. 2), the FaaS server architecture 300 (FIG. 3), the enhanced FaaS system (FIG. 4), and/or the enhanced FaaS system (FIG. 5). For example, software components of the various embodiments (e.g., the stream fetcher, the resource manager, the function code, aspects of the logic, etc.) may be incorporated in the FaaS software sub-system 506 (FIG. 5), and hardware components of the various embodiments (e.g., various queues/buffers, aspects of the logic, etc.) may be incorporated in the FaaS hardware sub-system 508 (FIG. 5).

Additional Notes and Examples

Example 900 includes at least one computer readable storage medium comprising a set of executable program instructions, which, when executed by a computing device, cause the computing device to run ahead to fetch FaaS-related information of at least one function, block one or more variable length latency operations based on the fetched FaaS-related information, tag keys to functions with multi-key total memory encryption, detect image-related information, and launch an image operation in advance based on the detected image-related information.

Example 901 includes an electronic processing system, comprising a processor, memory communicatively coupled to the processor, and logic communicatively coupled to the processor and the memory to run ahead to fetch FaaS-related information of at least one function, and block one or more variable length latency operations based on the fetched FaaS-related information.

Example 902 includes the system of Example 901, wherein the logic is further to one or more of reserve and reallocate resources based on the fetched FaaS-related information.

Example 903 includes the system of any of Examples 901 to 902, wherein the logic is further to substitute out one or more externally visible operations for corresponding matching operations to one or more of reserve and reallocate resources.

Example 904 includes a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to run ahead to fetch FaaS-related information of at least one function, and block one or more variable length latency operations based on the fetched FaaS-related information.

Example 905 includes the apparatus of Example 904, wherein the logic is further to one or more of reserve and reallocate resources based on the fetched FaaS-related information.

Example 906 includes the apparatus of any of Examples 904 to 905, wherein the logic is further to substitute out one or more externally visible operations for corresponding matching operations to one or more of reserve and reallocate resources.

Example 907 includes the apparatus of Example any of Examples 904 to 906, wherein the logic coupled to the one or more substrates includes transistor channel regions that are positioned within the one or more substrates.

Example 908 includes a method of providing a function as a service, comprising running ahead to fetch FaaS-related information of at least one function, and blocking one or more variable length latency operations based on the fetched FaaS-related information.

Example 909 includes the method of Example 908, further comprising one or more of reserving and reallocating resources based on the fetched FaaS-related information.

Example 910 includes the method of any of Examples 908 to 909, further comprising substituting out one or more externally visible operations for corresponding matching operations to one or more of reserve and reallocate resources.

Platform Feedback, Multi-Version Function, and Asynchronous Function Examples

A conventional FaaS invocation may involve a number of triggers, including some final trigger which invokes a function. After the function is invoked, the work is dispatched to a platform with some containers (e.g., newly started, warmed up, etc.). But there may be too few resources used to support the new invocation. Piled up latencies may delay execution of the function. The conventional triggering mechanism flows one way, from the antecedents to the function invocation, which may make it difficult to optimize between the FaaS system's own capabilities and external resources. In some FaaS systems, startup times for accelerated functions increase the latency of executing a function. Another problem is that FaaS data/actions may be difficult to synchronize across disaggregated systems. Fully synchronous actions require the calling function to wait for completion of tasks before calling subsequent function. Resources for the calling function are tied up waiting.

Some embodiments of an enhanced FaaS system may provide feedback from the platform executing the functions to the triggering mechanism indicating the platform is ripe for the next function invocation. Some embodiments may also provide advance notice of needed resources/conditions, with some notification returned from the platform when such resources are available or expected to be available and when such conditions are met (e.g., a pull versus a push). Some embodiments may also hide the startup time for an accelerated function by providing alternative forms of the accelerated function which may be used while the accelerated function starts up. In some embodiments, some functions may be identified as asynchronous to support service chaining. Advantageously, some embodiments may avoid resource starvation, provide better utilization of resources, and/or experience less latency in function execution (e.g., or apparent latency). For example, some embodiments may free up a calling function after dispatching a chained function (e.g., making functions more atomic and more modular).

In one embodiment, an electronic processing system same or similar as the one described in connection with FIG. 8A may include a processor, memory communicatively coupled to the processor, and logic communicatively coupled to the processor and the memory to receive a request from a trigger agent for a subsequent function invocation, and provide feedback to the trigger agent to indicate readiness for the subsequent function invocation. Alternatively, or additionally, the logic may be configured to provide one or more alternative forms of an accelerated function which may be used while the accelerated function starts up. Alternatively, or additionally, the logic may be configured to identify one or more functions as asynchronous to support a service chain. In some embodiments, the logic may be located in, or co-located with, various components, including the processor, memory, etc. (e.g., on a same die).

In another embodiment, a semiconductor package apparatus same or similar as the one described with connection of FIG. 8B may include one or more substrates, and logic coupled to the one or more substrates, where the logic is at least partly implemented in one or more of configurable logic and fixed-functionality hardware logic. The logic coupled to the one or more substrates may be configured to receive a request from a trigger agent for a subsequent function invocation, and provide feedback to the trigger agent to indicate readiness for the subsequent function invocation. Alternatively, or additionally, the logic may be configured to provide one or more alternative forms of an accelerated function which may be used while the accelerated function starts up. Alternatively, or additionally, the logic may be configured to identify one or more functions as asynchronous to support a service chain. In some embodiments, the logic coupled to the one or more substrates may include transistor channel regions that are positioned within the one or more substrates 1021.

Figure 10A:
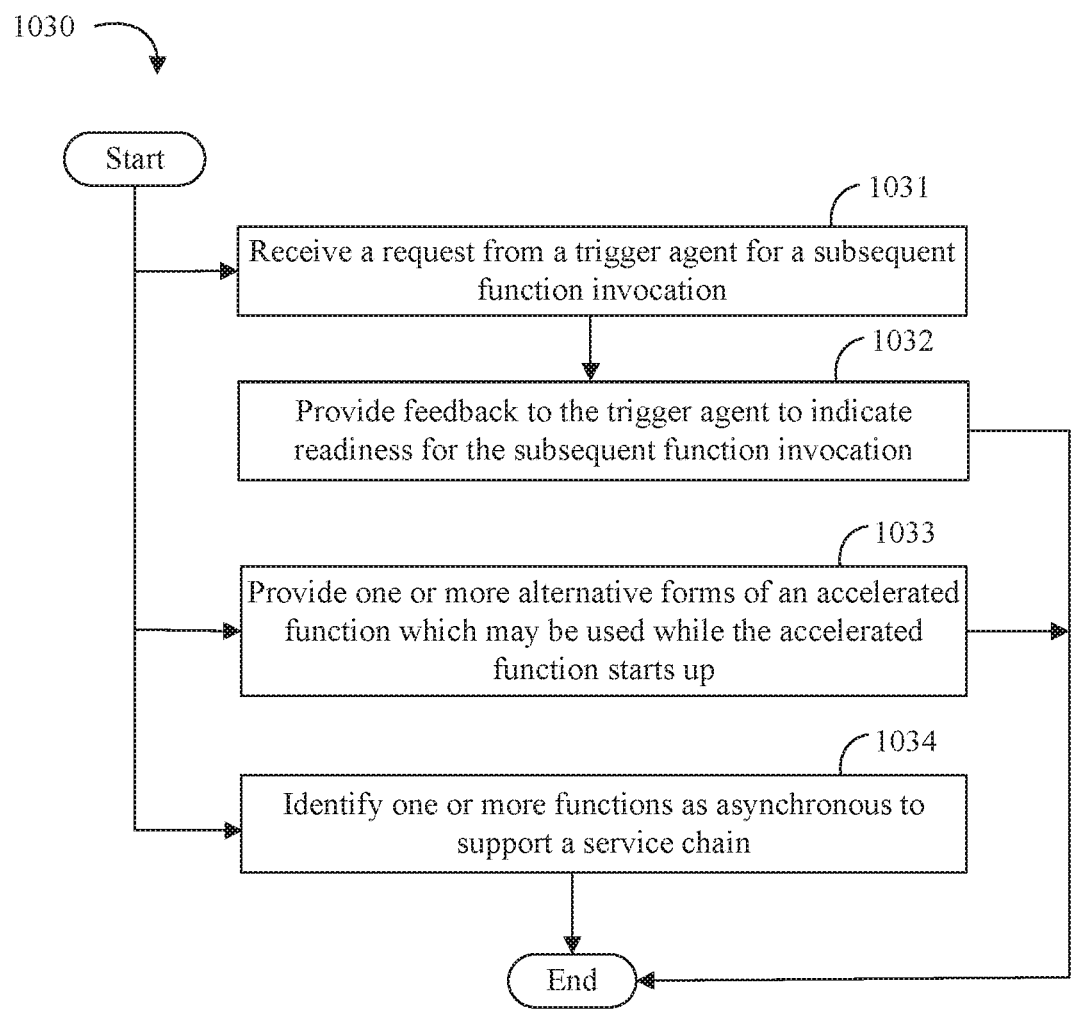
FIG. 10A is a flowchart of another example of a method of providing a function as a service with feedback support according to an embodiment.

Turning now to FIG. 10A, an embodiment of a method 1030 of providing a function as a service may include receiving a request from a trigger agent for a subsequent function invocation at block 1031, and providing feedback to the trigger agent to indicate readiness for the subsequent function invocation at block 1032. Alternatively, or additionally, the method 1030 may include providing one or more alternative forms of an accelerated function which may be used while the accelerated function starts up at block 1033. Alternatively, or additionally, the method 1030 may include identifying one or more functions as asynchronous to support a service chain at block 1034.

Embodiments of the method 1030 may be implemented in a system, apparatus, computer, device, etc., for example, such as those described herein. More particularly, hardware implementations of the method 1030 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 1030 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 1030 may be implemented on a computer readable medium as described in connection with Examples 1011 to 1013 below. Embodiments or portions of the method 1030 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Platform Feedback Examples

Turning now to FIG. 10B, an embodiment of an enhanced FaaS system 1040 may include a FaaS platform 1042 communicatively coupled (e.g., wired or wirelessly) to a client 1044. Some embodiments may advantageously provide architectural support for predicating FaaS and/or hardware-accelerated FaaS (AFaaS) actions on platform events and callbacks. A hardware-accelerated FaaS or AFaaS action is one that may be executed, in a FaaS server 300 shown in FIG. 3 on an FPGA 318, an accelerator 314, a GPU, a SmartNIC 302, and so on. For example, the FaaS platform 1042 may include a platform manager 1046 which includes technology to receive a request from the client 1044 for a subsequent function invocation, and provide feedback to the client 1044 to indicate readiness for the subsequent function invocation. When a function gets triggered (e.g., invoked), a DAEMON, for example, may cause a delay by unripe conditions for dispatch (e.g., wait longer for better conditions, QoS considerations, etc.). The unripe condition may also relate to a limited resources situation (e.g., storage, accelerator, etc.) which may be in high demand and so there may be a queue to access the resources. Due to constraints, the function may never execute because it may take too long when started (e.g., a time out after 5 minutes). Some embodiments may provide platform monitoring (e.g., executed by the platform invoker) and/or break a function into segments/pieces. The platform manager 1046 may then run pieces of the function that do not require access to the limited resources, pre-queue data, start a virtual function to monitor resources, and execute the remaining pieces when ready. With the function broken into segments, the client 1044 (e.g., a consumer) may execute a call back at an appropriate time and/or pause the function until the resources become available.

Some embodiments may provide two potentially independent but complementary capabilities including 1) a platform-and-capability enlightened submission and execution of FaaS actions, and 2) conditions, or event-feedback based, just-in-time execution of FaaS actions. Some embodiments may provide flexibility for the consumer (e.g., client 1044) to guide the platform provider, and for the platform provider to achieve a more collaborative and informed execution of actions based on various platform, network, and power conditions.

Turning now to FIG. 10C, an embodiment of an enhanced FaaS system 1050 may include a function segmenter 1051, a platform monitor 1052, a function call back module 1053, and a function pause module 1054. For example, various platform conditions may be monitored by the platform monitor 1052, and when resources for performing actions are available, and the platform meets various other subtle conditions as described next, then the actual triggering of the action may be performed. An example of a subtle platform condition is distance to data. For example, if datasets reside in a machine or storage location, and the function that needs the datasets runs on a different machine and from which, the accesses of the function to the datasets have to pass through one or more network or storage links that make the accesses much slower than if the datasets were in the same machine as the function (e.g., they require considerable numbers of disk or network 10 operations), then such a subtle platform condition is not met. A meta-scheduler may initiate a data migration operation in order to meet such a "distance to data" condition, and once enough data has migrated, the action can proceed. Alternatively, if the function needs to be pushed closer to where the data is (e.g., on a remote node), then the subtle condition changes to "having sufficient computational resources" near the data. Another example of a subtle condition is cost. For example, it may be desirable that a function only be triggered (e.g., assuming all other conditions for triggering it are met) if it can be executed at low cost. This may be true if, for example, a platform has sufficient surplus capacity in power, CPU cycles, memory bandwidth etc., such that the function can be given best-effort treatment and be expected to complete within some liberal but bounded latency. In other words, this approach contemplates triggering and/or actual dispatch of a function predicating upon satisfaction of various direct and indirect measures of effectiveness, efficiency, and even security (e.g., an example of a security criterion can be that no sensitive services are running on the platform, in order to permit running an action that is gray-listed for security).

For AFaaS, resource availability can be such a platform condition as well, particularly if AFaaS is used to conduct low-intensity background training of an artificial intelligence (AI) model. By so doing, the goal may be to achieve a more deterministic execution of functions, particularly as the conditions under which the functions execute are themselves a second trigger (e.g., where the first trigger may just be to the effect "all the logical state based, or time-triggered precursors have been satisfied"). Effectively, this technique may explicitly and systematically link the execution of a function to the availability of the right resources and projected demands on the function.

The function call back module 1053 may allow a consumer (e.g., or a software agent acting as consumer's proxy) to tie the actual submission of FaaS activities upon receiving and processing the information it requests through feedback from the platform infrastructure. For example, the call back module 1053 may utilize certain meta-functions that are treated as always ready (e.g., "pre-triggered") so that the callback naturally activates a consumer proxy at a controller or at an invoker. This proxy provides the needed triggering of the function that the consumer intends to dispatch just-in-time, and under just-the-right platform conditions.

Advantageously, some embodiments of monitoring and/or callback technology in a FaaS system may support a "bring your own capabilities" (BYOC) approach to achieve richer collaboration in which a consumer may pre-reserve some resources (e.g., explicitly obtain some resources by requesting them separately ahead of time) with the acquiescence of a CSP while waiting for other resources that are scarcer at the CSP, to achieve enlightened dispatch. For example, some translation services may get everything ready on their own resources before invoking FaaS to perform the translation. A deep neural network (DNN) may be too large for the FaaS platform, so the consumer may perform the DNN part on its own prepaid resources at a CSP, and then use the CSP's FaaS platform to execute the remainder of the intended function.

Embodiments or aspects/features of the system, the apparatus, the method 1030 (FIG. 10A), the FaaS system 1040 (FIG. 10B), and or the FaaS system 1050 (FIG. 10C) may be substituted for, or incorporated into, all or portions of the FaaS platform 102 (FIG. 1), the enhanced FaaS system 202 (FIG. 2), the FaaS server architecture 300 (FIG. 3), the enhanced FaaS system (FIG. 4), and/or the enhanced FaaS system (FIG. 5). For example, software components of the various embodiments (e.g., the platform manager, the function segmenter, the platform monitor, the callback feature, the pause feature, the function code, aspects of the logic, etc.) may be incorporated in the FaaS software sub-system 506 (FIG. 5), and hardware components of the various embodiments (e.g., various queues/buffers, aspects of the logic, etc.) may be incorporated in the FaaS hardware sub-system 508 (FIG. 5).

Multi-Version Function Examples

Turning now to FIG. 11A, an embodiment of a function 1110 may include multiple options for instantiation (e.g., Option 1 through N). Some embodiments may advantageously provide multiple versions of the same function 1110, and further provide multiple accelerated versions of the same function 1110. The multiple versions of the same function 1110, including the multiple accelerated versions of the same function 1110, may differ from one another in the time or resources needed for their instantiations, and the time it takes to execute or run the instantiations when the function 1110 needs to be performed. Some embodiments provide these multiple versions as multiple tenants that are initiated in a graduated manner. Some containers (e.g., containers that use accelerators or utilize cores where the cores vary according to machine), may take a while to start. Software functions may provide a low latency start, but longer latency execution. Hardware functions may provide a long latency start, but short latency execution. In some embodiments, the function 1110 may include multiple options (e.g., instantiations), one of which may be selected for execution depending on various factors (e.g., invoker requirements, FaaS platform conditions, etc.)

Turning now to FIG. 11B, an embodiment of an enhanced FaaS system 1120 may support a code block A with multiple versions of a function B. For example, an invoker of the code block A may identify different versions of the function B including a minimalist accelerator version Bm, a high accelerator version Bh, and no accelerator version Bs. If a container is started for an accelerator (e.g., the minimalist accelerator Bm), some embodiments may shuttle each version of the B function to the container. Some embodiments may degrade acceleration containers based on a number of new arrivals of the function B diminishing (e.g., free up the high accelerator Bh and warm up the minimalist version Bm, or shift to a software/non-accelerator version Bs). Some embodiments may combine the multiple function versions with prefetching of data to be near a physical location of the function B.

Some embodiments may advantageously perform accelerated functions in a multi-tenant situation in a way that hides the expected non-trivial startup latencies at the point of launching a new accelerated function. For an invoker running on a general-purpose CPU, a target of the invocation may correspond to some function whose initializer or host-CPU based code is code block A, and the accelerated function may correspond to function B. At the point that A receives control, B may be either already initialized on the accelerator, or B may need to be imaged onto the accelerator.

Generally, the initialization of Bh may take several milliseconds to several tens of milliseconds. For example, the FPGA resources may be arbitrated among a number of active in-use, idle, and requested (e.g., queued) functions. If Bh is not active, then it may take some time to allocate the resources for Bh, fetch the bit stream for Bh from near or far memory, and then to activate (e.g., launch) the bitstream. Once activated, the bitstream for Bh may be kept active for some time to amortize the cost of starting up Bh over many duty cycles for which Bh is kept around before resources for Bh are reduced and Bh is reclaimed. To hide this latency, some embodiments may support multiple versions of Bh including, for example, two additional, alternative forms Bm and Bs, where Bm may correspond to a minimal accelerated version of Bh that takes a very small amount of time to start up but which may take longer to execute (e.g., because it executes loops in time instead of executing them in space), and where Bs may correspond to a software (e.g., CPU) version of B (e.g., a non-accelerated version of B which may be lot less power and performance efficient than Bh, but is nearly instantaneous to launch if Bs is warm).

Figure 11C:
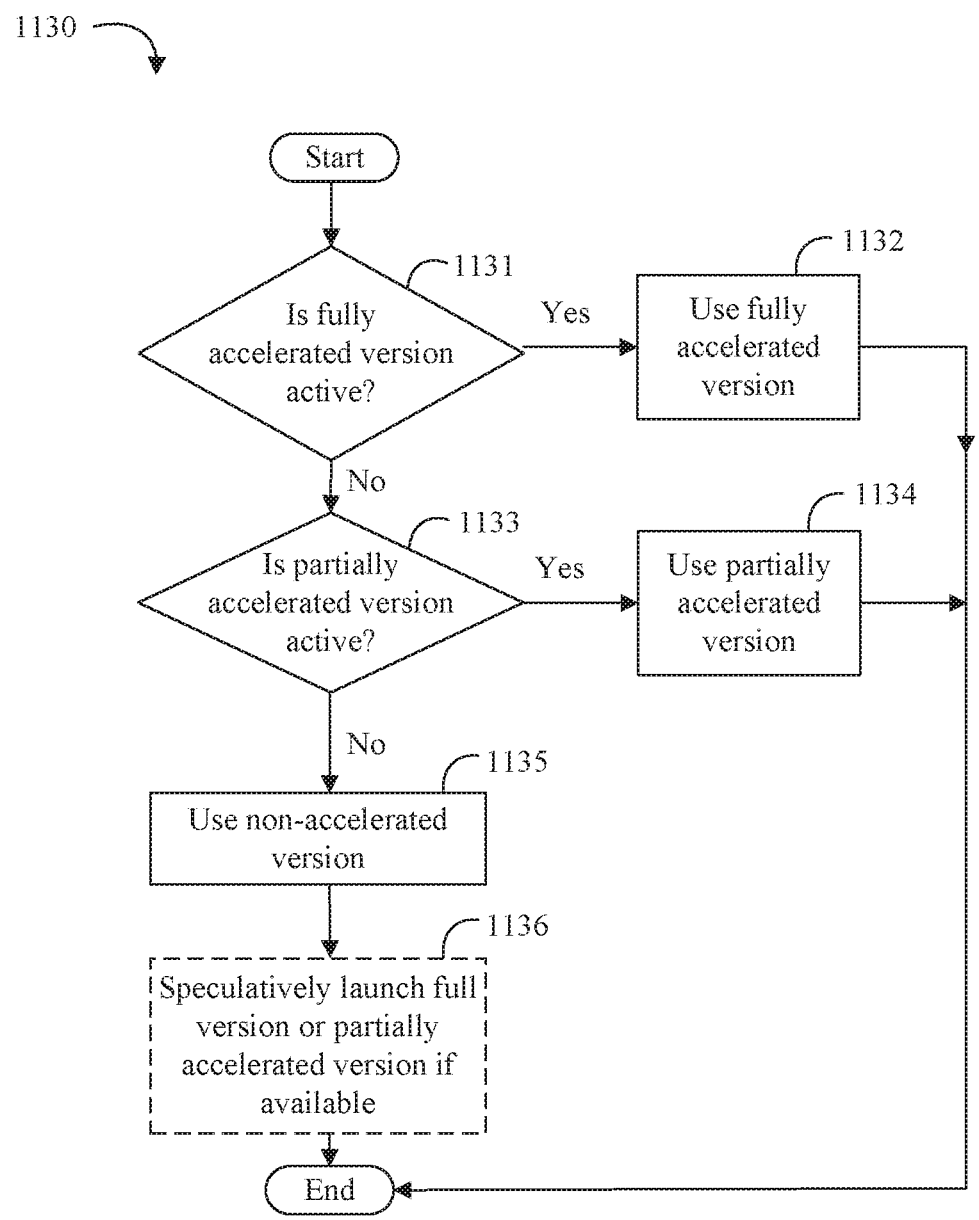
FIG. 11C is a flowchart of another example of a method of providing a function as a service for functions having multiple options for instantiation according to an embodiment.

Turning now to FIG. 11C, an embodiment of a method 1130 of providing a function as a service may include determining if a fully accelerated version of a function (e.g., a function that executes in a container that operates on high accelerator hardware) is active at block 1131 and, if so, using the fully accelerated version at block 1132. Otherwise, the method 1130 may determine if a partially accelerated version of the function (e.g., a function that executes in a container that operates on minimalist accelerator hardware) is active at block 1133 and, if so, using the partially accelerated version at block 1134. Otherwise, the method 1130 may use a non-accelerated version of the function at block 1135. Depending on the customer needs/platform conditions, the method 1130 may further include speculatively launching the full version or partially accelerated version of the function at block 1136 (e.g., and switching to that version when it becomes active).

In other words, the code block A may use Bh, where Bh is already active (e.g., the fastest and most efficient execution of B), and with no setup time for Bh; otherwise A may use Bm if Bm is already active (e.g., with no setup time but longer duration execution); or A may use Bs, if neither Bh nor Bm are active, after which A may launch Bm or launch Bh, and then use the launched Bm or Bs according to desired latency-performance-area-power tradeoffs.

Some embodiments may first prelaunch Bm versions for those accelerated functions that are known (e.g., through historical profiling) to be frequent. For non-frequent accelerated functions, some embodiments may launch these minimal versions on demand, but initially use the software versions Bs if Bm or Bs are not already launched. If demand for Bs or Bm exceeds a certain threshold in a recent time window, some embodiments may launch the accelerated function Bh and, until Bh is fully activated, continue to use Bs or Bm for requests for B.

Some embodiments may also collect moving-window utilization and cost metrics for each launched B. If the collected information falls below a threshold, or if the demand for other functions ticks up, then some embodiments may initiate a reclaim of Bh, if Bm qualifies, then reclaim resources for Bh but launch Bm in its place in response to a new request for performing B. Conversely, if demand for B exceeds a threshold from below, some embodiments may initiate a launch of Bh, and reclaim Bm if Bm is active after Bh has been activated.

In selecting the thresholds for launching Bm or Bh (e.g., as respectively the utilization Bs or Bm rises), and in selecting the thresholds for reclaiming Bh or Bm (e.g., as utilization of Bh and Bm respectively declines), some embodiments may take into account service level agreement (SLA) inputs provided dynamically by an AFaaS control service. If no SLA input is provided, then these thresholds may be set heuristically and dynamically, based on the arrival rates for requests for B (e.g., or a moving window average of the arrival rates).

Some embodiments may utilize a continuous monitoring of the duty cycles (utilization) normalized by cost of Bh in hardware to achieve two goals of 1) deciding how long to keep Bh active and 2) accumulating historical information so that future activations of Bh may be expedited by using the historical frequency and duration of active utilization as guides. Greedy bin-packing heuristics may be employed for determining the thresholds for switching from Bs to Bm to Bh versions of a function. These statistics may be updated by using an epilog for Bh, and may be used to update in-memory statistics that future activations of code block A use to choose between Bs, Bm, and Bh.

Embodiments or aspects/features of the function 1110 (FIG. 11A), the FaaS system 1120 (FIG. 11B), and/or the method 1130 (FIG. 11C) may be substituted for, or incorporated into, all or portions of the FaaS platform 102 (FIG. 1), the enhanced FaaS system 202 (FIG. 2), the FaaS server architecture 300 (FIG. 3), the enhanced FaaS system (FIG. 4), and/or the enhanced FaaS system (FIG. 5). For example, software components of the various embodiments (e.g., the multi-version function code, aspects of the logic, etc.) may be incorporated in the FaaS software sub-system 506 (FIG. 5), and hardware components of the various embodiments (e.g., monitoring, aspects of the logic, etc.) may be incorporated in the FaaS hardware sub-system 508 (FIG. 5).

Asynchronous Function Examples

Figure 12:
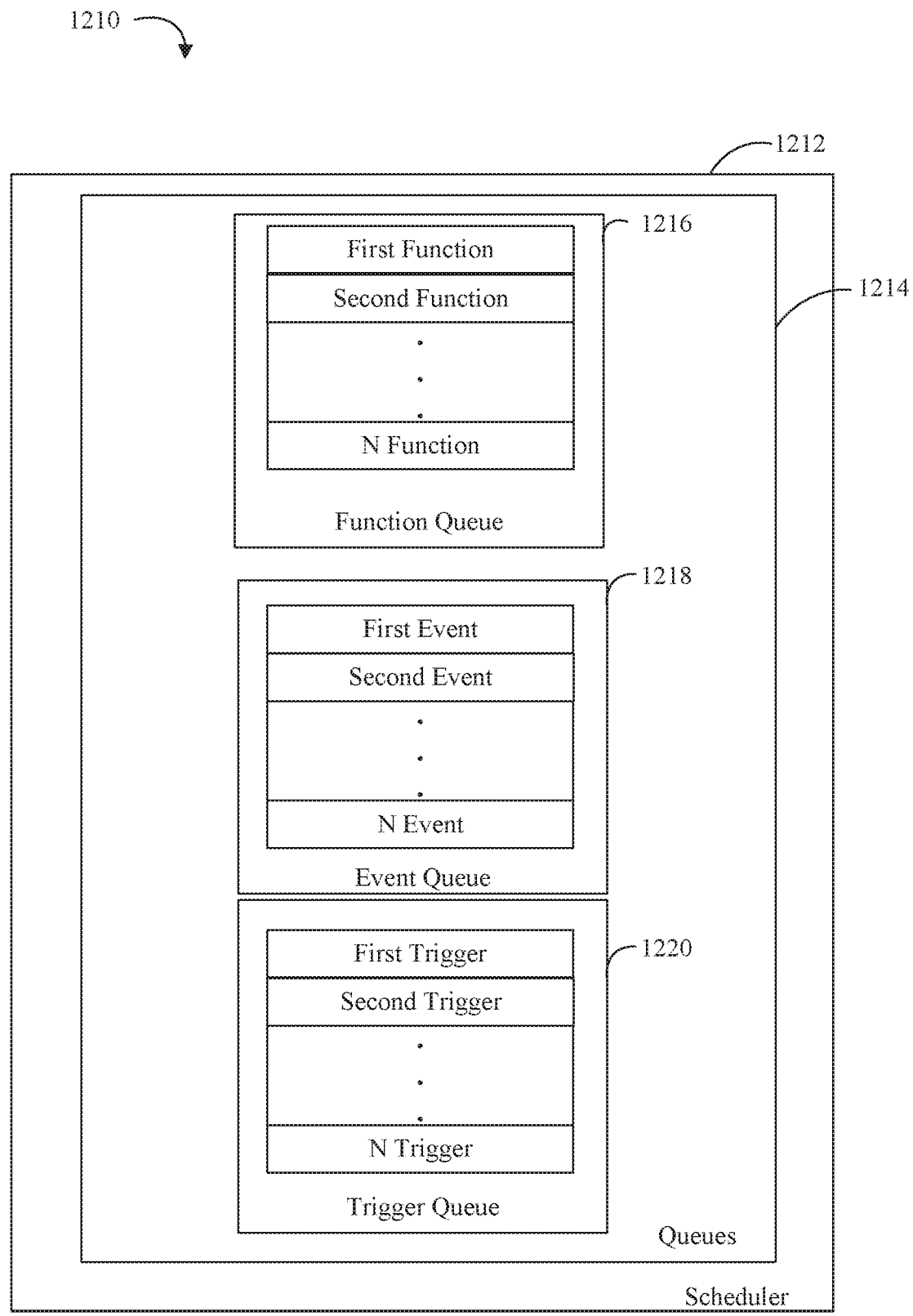
FIG. 12 is a block diagram of another example of a FaaS system with a scheduler according to an embodiment.

Turning now to FIG. 12, an embodiment of an enhanced FaaS system 1210 may include a scheduler 1212 with queues 1214 that includes an events queue 1218, function queue 1216, triggers queue 1220, etc. Some embodiments may advantageously provide efficient synchronization among distributed actions. Chained functions linked by intermediary actions (e.g., function X needs to call an action to store data to be used by function Y) may result in several calls. Consider an action X, which needs to perform a network or storage operation P before it can consider itself completed, and trigger another action Y which is to process the data communicated or populated in a storage area by virtue of operation P above. In conventional FaaS systems, for example, action X must wait for network or storage operation P to finish population and then call or trigger action Y. The scheduler 1212 may need to wait around, with resources being used by action X during the wait time. Some embodiments of the enhanced FaaS solution may advantageously have the action X trigger network or storage operation P and modify network or storage operation P so that the completion of network or storage operation P is to trigger action Y so action X may be discarded before the network or storage operation P completes to free up resources consumed by action X. Some embodiments may also allow for more interesting parallelism (e.g., modular designs) because the root (e.g., parent function) does not need to wait around, so other functions may begin to execute that are triggered by completion. Some embodiments may be implemented by a hardware queue manager (HQM).

Many distributed actions need to be synchronized even if only to meet the requirement that a state that is committed for durability, or communicated for visibility, is updated by serializable sequences of operations. Thus, for example, time should not appear to have moved backward in the way that results of these operations were recorded on durable media or observed from a third party. However, in some cases, the approach taken in distributed systems of processes may be too conservative. For example, all agents may proceed through barriers, such as in two phase locking, even when the processes that are employed are already data parallel (e.g., they operate on disjoint partitions of data). For low latency FaaS actions that need to be performed across a set of coordinating nodes, such overheads are prohibitively expensive and they introduce unnecessary delays.

Because some or most of the actual coordination may need to occur where a state is updated for persistence or communication, some embodiments of the enhanced FaaS solution may extend fabric and/or storage interfaces to support asynchronous submissions of various payloads for communication and storage (e.g., as storage functions or as network functions), such that the updates to any given range of data get performed in a globally consistent time order. Accordingly, if two operations X and Y are dependency chained so that X performs an asynchronous update of a block of data on a shared disk, and the completion of X triggers Y (e.g., where Y may consume the update made by X (a read-after-write, or, RAW dependency) or overwrite it (a write-after-write, or WAW dependency)), then some embodiments of chaining of "storage FaaS actions" may avoid violating the required ordering dependencies. Some embodiments may abstract the storage action itself as a chained FaaS action.

By way of explanation and not limitation, distributed functions may be different from distributed processes in that the functions may follow the close-to-open, or acquire-to-release consistency models over shared data (e.g., because functions may not have any notion of a session state that goes past their finite duration or run-to-completion model). Instead of action X having to perform network or storage operation P synchronously within action X, before signaling completion of action X and triggering action Y (e.g., represented as [X, P]⇒Y), in some embodiments, one function X can complete, then perform (e.g., trigger) a chained action P (e.g., storage, network, etc.), and when P gets scheduled and performed, specify that the completion of P may trigger the function Y (e.g., represented as X⇒[P⇒Y]).

For example, the function queue 1216 may contain a queue of the functions that are to be executed. Function Y (or some indication of Function Y) may be stored in function queue 1216, as a first function for example. The event queue 1218 may include different events that execute a trigger, such as "when the first event occurs (e.g., completion of the network or storage operation P), execute the first trigger of the trigger queue 1220." The trigger queue 1220 may store various triggers for one or more functions of the function queue 1216 to execute. The first trigger of the trigger queue 1220 may include triggering the first function (e.g., function Y) from the function queue 1216. Thus, when the network or storage operation P completes, the system may determine from the events queue 1218 that the first event has occurred (e.g., completion of the network or storage operation P), to cause execution of the first trigger from the trigger queue 1220 to execute. The first trigger may then cause one or more functions (e.g., Function Y) from the function queue 1216 to execute.

The conventional sequence [X, P]⇒Y requires the function X to perform the update action P synchronously (e.g., wait for P) before retiring, thus increasing latency and potentially causing scaling bottlenecks (e.g., if X needs to contend for various locks and resources to perform P). Y may itself be related to X. For example, Y may be a continuation of X and require some credentials that are made available to it as result of performing P. As one example, X may be an image processing task that processes some camera feed, P may be a task that updates an image database, and Y may be a task that needs to process the latest update to see if it contains a particular target object or pattern. In some embodiments, the task P may be considered as a fire-and-forget task relative to X, such that resources allocated to X may be released after P is launched.

In some embodiments, acquiring and releasing locks, and performing two-phase transactions for such synchronization and coordination in distributed systems may be replaced with asynchronous command queuing technology for high performance fabric and storage operations (e.g., smart NICs, smart disks, etc). This may be particularly useful for "rack-scale-design" or RSD architectures in which pooled storage and pooled memory can be used by different execution engines in a shared, flat-access paradigm, so that hardware based queuing mechanisms can avoid the need for locks, conditions, etc. and simultaneously avoid the need for higher level software protocols (e.g., reader-writer lock management, deadlock detection and resolution, etc.). Some embodiments may utilize HQM-like technology. For example, tasks may be delegated to a HQM to manage execution of the tasks.

Embodiments or aspects/features of the system 1210 (FIG. 12) may be substituted for, or incorporated into, all or portions of the FaaS platform 102 (FIG. 1), the enhanced FaaS system 202 (FIG. 2), the FaaS server architecture 300 (FIG. 3), the enhanced FaaS system (FIG. 4), and/or the enhanced FaaS system (FIG. 5). For example, software components of the various embodiments (e.g., the scheduler, the function code, aspects of the logic, etc.) may be incorporated in the FaaS software sub-system 506 (FIG. 5), and hardware components of the various embodiments (e.g., the HQM, aspects of the logic, etc.) may be incorporated in the FaaS hardware sub-system 508 (FIG. 5).

Additional Notes and Examples

Example 1200 includes at least one computer readable storage medium comprising a set of executable program instructions, which, when executed by a computing device, cause the computing device to receive a request from a trigger agent for a subsequent function invocation, provide feedback to the trigger agent to indicate readiness for the subsequent function invocation, provide graduated multi-version initiation of multi-tenant accelerated functions, provide synchronization among distributed actions, and trigger the subsequent function invocation when a criterion is met.

Example 1201 includes an electronic processing system, comprising a processor, memory communicatively coupled to the processor, and logic communicatively coupled to the processor and the memory to receive a request from a trigger agent for a subsequent function invocation, and provide feedback to the trigger agent to indicate readiness for the subsequent function invocation.

Example 1202 includes the system of Example 1201, wherein the logic is further to provide one or more alternative forms of an accelerated function which may be used while the accelerated function starts up.

Example 1203 includes the system of any of Examples 1201 to 1202, wherein the logic is further to identify one or more functions as asynchronous to support a service chain.

Example 1204 includes a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to receive a request from a trigger agent for a subsequent function invocation, and provide feedback to the trigger agent to indicate readiness for the subsequent function invocation.

Example 1205 includes the apparatus of Example 1204, wherein the logic is further to provide one or more alternative forms of an accelerated function which may be used while the accelerated function starts up.

Example 1206 includes the apparatus of any of Examples 1204 to 1205, wherein the logic is further to identify one or more functions as asynchronous to support a service chain.

Example 1207 includes the apparatus of Example any of Examples 1204 to 1206, wherein the logic coupled to the one or more substrates includes transistor channel regions that are positioned within the one or more substrates.

Example 1208 includes a method of providing a function as a service, comprising receiving a request from a trigger agent for a subsequent function invocation, and providing feedback to the trigger agent to indicate readiness for the subsequent function invocation.

Example 1209 includes the method of Example 1208, further comprising providing one or more alternative forms of an accelerated function which may be used while the accelerated function starts up.

Example 1210 includes the method of any of Examples 1208 to 1209, further comprising identifying one or more functions as asynchronous to support a service chain.

Performance Enhanced Computing Architecture for FaaS

Serverless computation may allow for FaaS and non-FaaS functions to execute on a same compute node. For example, it may be possible to consolidate large numbers of independent FaaS functions into the interstices (idle periods) between normal cloud applications (e.g., non-FaaS functions) similar to hyperthreading. An interstice may be a gap that may not, in any case, be filled by the normal cloud applications. Hyperthreading may utilize idle micro-architectural resources that are not fully exercised with just one thread per core, with an additional thread.

Therefore, FaaS and non-FaaS functions may be consolidated in a multi-tenancy to operate concurrently on a same compute node (e.g., server or processor core) for example. In such multi-tenancy situations, a noisy neighbor problem may exist, in which a cloud service provider (CSP) co-tenant monopolizes resources (e.g., bandwidth, disk I/O, CPU), that can negatively affect the performance of other co-tenants. For example, the non-FaaS functions may soak up the resource bandwidths not fully subscribed-to at all times by the FaaS functions, and vice versa. This causes an uneven cloud network performance across the co-tenants and increases latency for FaaS functions to execute or reduces the performance of non-FaaS cotenants. The new noisy neighbor problem may be qualitatively unique as it concerns the efficient, adaptive, fine-grained and fair sharing of resources within each compute node, for example at the processor core level, unlike other designs which assign or reserve resources such as cache capacity, memory bandwidth, or processor scheduling priorities, at a virtual machine or container level in currently existing solutions.

Embodiments described below may schedule each FaaS function and non-FaaS function to avoid the noisy neighbor problems under the much higher levels of multi-tenancy that these consolidations represent. Doing so may reduce or stabilize latency due to waiting, and reduce failures of functions due to time-out errors, and control variability in execution performance. Furthermore, some embodiments may enhance resource distribution. For example, functions may be provided to nodes that have specialized hardware accelerators to enhance execution of the functions.

Some embodiments may provide for scoped allocation of core execution resources among multiple hardware threads by a prioritized scheduling. The prioritized scheduling may schedule functions with non-conflicting demand profiles for simultaneous multithreading (SMT) execution (e.g., SMT4, SMT8, etc.) on shared cores so that each function receives fair use of at least those resources to which the function is most sensitive. By doing so, inter-function resource conflicts or a noisy neighbor problem may be avoided. Thus, some embodiments may include methods and tools, and feedback mechanisms needed for efficient and agile, short-duration and finely scoped allocation of core execution resources during SMT (e.g., SMT2, SMT4).

Turning to FIG. 13A, a performance enhanced computing architecture 1300 for FaaS that reduces resource contention is illustrated. As described below, the server 1302 may reduce resource contention by distributing first-third functions 1312, 1314, 1316 to allow the first-third functions 1312, 1314, 1316 to have first-third resource allocations 1326, 1328, 1330 that are sufficient for execution. Further, in some embodiments, fourth-sixth functions 1318, 1320, 1322, which are executing on the first-third compute nodes 1304a-1304c, may have allocation amounts of the first-third resources that do not impair access to the first-third resources by the first-third functions 1312, 1314, 1316.

Initially, an efficiency enhanced server 1302 may receive requests for first-third functions 1312, 1314, 1316 (e.g., FaaS functions) from event-based triggering devices or simply just triggering devices 1306, 1308, 1310 (e.g., various computing devices). The requests for the first-third functions 1312, 1314, 1316 may be invoked by applications operating on the triggering devices 1306, 1308, 1310. The server 1302 may determine the sensitive resources of the first-third functions 1312, 1314, 1316. For example, the first function 1312 may require access to a first resource to execute, the second function 1314 may require access to a second resource to execute, and the third function 1316 may require access to a third resource to execute. The first-third resources may be any type of computing resource (e.g., a hardware resource, hardware accelerators, bandwidth, arithmetic logic units, power, frequency, etc.) required by the first-third functions 1312, 1314, 1316 during execution and may be different from each other.

The server 1302 may direct hardware resource allocations so that each of the first-third functions 1312, 1314, 1316 receives fair use of at least the first-third resources that are sensitive for execution. In detail, the server 1302 may schedule the first-third functions 1312, 1314, 1316 to execute on various compute nodes 1304a-1304c at various timings so that the first-third functions 1312, 1314, 1316 have access to the first-third resources without resource contention. For example, to avoid resource contention, the server 1302 may distribute the first function 1312 to first compute node 1304a so that the first function 1312 has a first resource allocation 1326 that is sufficient for execution. The server 1302 may distribute the second function 1314 to third compute node 1304c so that the second function 1314 has a second resource allocation 1328 that is sufficient for execution. The server 1302 may distribute the third function 1316 to second compute node 1304b so that the third function 1316 has a third resource allocation 1330 that is sufficient for execution.

Prior to execution, the server 1302 may speculatively determine the first-third resources that are needed by the first-third functions 1312, 1314, 1316. For example, the server 1302 may determine the sensitive resources of the first-third functions 1312, 1314, 1316 by analyzing an associated implementation (e.g., source code, transcode, historical requirements by similar same functions, etc.). Thus, the server 1302 may identify a required resource allocation needed by a function, and/or a type of the resource needed by a function, and label such a resource as a sensitive resource. The resources may include one or more of power consumption, firmware requirements, hardware requirements (e.g., bandwidth demands, accelerators, numbers or fractions of available resources in a CPU's instruction fetch, TLB, Brach Target Buffer (BTB), reservation stations, operation ports such as arithmetic logic units (ALU)s, etc.,) or clock frequency requirements. The resources may also be reserved against overallocation—for example, not permitting a CPU core to enter turbo execution, to control variability of performance under different multi-tenant conditions.

In some embodiments, the server 1302 may determine whether one or more resource allocations needed by each of the first-third functions 1312, 1314, 1316 are above a threshold. If so, the server 1302 may label the one or more resources as being sensitive resources. The threshold may correspond to an average historical resource availability at the first-third compute nodes 1304a-1304c. The threshold may also be set to a current resource availability at each of the one or more of the compute nodes 1304a-1304c.

The server 1302 may further schedule the first-third functions 1312, 1314, 1316 based on the speculatively determined first-third resources to execute on different ones of the compute nodes 1304a-1304c and/or at different timings to avoid resource conflicts. The server 1302 may therefore reduce latency and enhance completion rates of the first-third functions 1312, 1314, 1316.

For example, the first function 1312 may execute an intensive memory bandwidth function and therefore the first resource (e.g., the sensitive resource) is a high bandwidth resource. The second function 1314 may execute an intensive ALU computation function, and therefore the second resource (e.g., the sensitive resource) may be an ALU resource. Third function 1316 may include a power intensive operation, and therefore the third resource (e.g., the sensitive resource) may be high power.

As noted above, the server 1302 may receive requests to execute the first-third functions 1312, 1314, 1316 from triggering devices 1306, 1308, 1310 and distribute the first-third functions 1312, 1314, 1316 to various ones of the compute nodes 1304a-1304c to avoid resource contention. In some embodiments, the server 1302 may already have scheduled fourth-sixth functions 1318, 1320, 1322 (e.g., non-FaaS functions) that are in execution at compute nodes 1304a-1304c. The server 1302 may identify that the first-third resources are being extensively utilized by the fourth-sixth functions 1318, 1320, 1322 at various ones of the first-third compute nodes 1304a-1304c by referring to the first-third resource allocations 1332, 1334, 1336 of the fourth-sixth functions 1318, 1320, 1322.

The server 1302 may distribute the first function 1312 to first compute node 1304a to avoid resource contention. In detail, the first resource needed by the first function 1312 is different from the third resource needed by the sixth function 1322, and therefore resource contention is avoided between the first and sixth functions 1312, 1322. In contrast, if the first function 1312 was provided to the third compute node 1304c, resource contention may exist since both first and fourth functions 1312, 1318 require the first resource as a sensitive resource.

As explained above, the first and fourth functions 1312, 1318 require high allocations of the first resource, and the high allocations may exceed the availability of the first resource on the third compute node 1304c. For example, although the first function 1312 may be able to access the first resource in a limited quantity at the third node 1304c, the first function 1312 may not have sufficient access to the first resource to complete execution since the first resource is already significantly allocated to the fourth function 1318 by the first resource allocation 1332. Likewise, the third function 1316 is provided to the second compute node 1304b, and the second function 1314 may be provided to third compute node 1304c.

In some embodiments, the server 1302 may determine that the sixth function 1322 is utilizing the first resource at the first compute node 1304a. In such a scenario, the server 1302 may determine whether the first function 1312 will have sufficient access to the first resource to complete execution. For example, if the sixth function 1322 is only allocated a small amount and/or access to the first resource, then the first function 1312 may still receive an allocation of the first resource that will facilitate execution.

Thus, the server 1302 may determine whether a function may have access to a sensitive resource based on an availability of the resource. For example, the server 1302 may follow Equation 1300 below to determine the total available allocation at a compute node:

Total available allocation=Total potential allocation− Existing allocation(s)     Equation 1300

In the above Equation 1300, the total potential allocation is the total potential allocation of a sensitive resource at a compute node, and the existing allocation is the current allocation of the sensitive resource at the compute node, for example to other functions. The server 1302 may follow Equation 1301 below to determine whether a sufficient allocation of the sensitive resource exists:

Sensitive resource requirement≤Total available allocation     Equation 1301

The sensitive resource requirement is the sensitive resource requirement of the function. If the above is true, then a sufficient allocation does exist. That is, if the sensitive resource requirement is less than or equal to the total available allocation of the sensitive resource at the compute node, then a sufficient allocation does exist to complete execution of the function at the compute node.

In some embodiments, the server 1302 may reduce first-third resource allocation 1332, 1334, 1336 to fourth-sixth functions 1318, 1320, 1322 and allocate those first-third resources to first-third functions 1312, 1314, 1316, so that the sensitive resources are distributed equally. For example, in some embodiments the server 1302 may distribute the first function 1312 to the third compute node 1304c rather than to the first compute node 1304a. Both first and fourth functions 1312 and 1318 require the first resource as a sensitive resource and so there may be resource contention. To reduce the resource contention, the server 1302 may reduce the first resource allocation 1332 to the fourth function 1318 and increase the first resource allocation 1326 to first function 1312. Doing so may establish equal allocations of the first resource between fourth function 1318 and first function 1312.

In some embodiments, the server 1302 may schedule a timing of the first-third functions 1312, 1314, 1316 to avoid resource contention. For example, in some embodiments the server 1302 may provide the first function 1312 to third compute node 1304c. As noted, both first function 1312 and fourth function 1318 require first resource as a sensitive resource and so there may be resource contention. To avoid the resource contention, the server 1302 may schedule the first function 1312 to execute on the third compute node 1304c after the fourth function 1318 has completed execution. Doing so may avoid resource contention of the first resource between the first and fourth functions 1312, 1318.

In some embodiments, the server 1302 may determine that a hardware accelerator and/or an FPGA may enhance execution of one of the functions 1312, 1314, 1316. The server 1302 may schedule the one of the functions 1312, 1314, 1316 accordingly to have access to the hardware accelerator.

In some embodiments, the compute nodes 1304a-1304c may be processor cores, computing devices or servers. In some embodiments, the triggering devices 1306, 1308, 1310 may invoke an application running on a remote server (not illustrated) that in turn provides requests for the functions 1312, 1314, 1316 to the server 1302. In some embodiments, the server 1302 may invoke the functions 1312, 1314, 1316. The triggering devices 1306, 1308, 1310 may include for example, laptops, mobile devices, servers, desktops, etc. In some embodiments, the server 1302 may include the first-third compute nodes 1304a-1304c. Furthermore, in some embodiments the server 1302 may include the enhanced FaaS system 400, such as orchestrator 404, of FIG. 4 that implement the aspects described above.

FIG. 13B illustrates an enhanced scheduling process 1338 for more fair bin packing that may be implemented by the server 1302 of FIG. 13A. In the present example, band 1 and band 2 for each of the function 0 and function 1 may be allocated hardware resources. For example, band 1 may represent hardware accelerator resources and band 2 may represent allocated processor core resources. For example, the server 1302 may speculatively analyze functions 0 and 1 to identify predicted instruction-per-cycle (IPC) resources 1340, 1342 allocated to the functions 0 and 1, if the functions 0 and 1 operate at the same time on a same compute node. Function 1 may be for example a non-FaaS function and function 0 may be a FaaS function. As noted, function 1 may be allocated an unfairly high amount of resources 1340, 1342 (e.g., allocated hardware resources) relative to function 0. For example, if function 1 begins operation before function 0, function 1 may have an unfair resource allocation.

Therefore, the scheduling of the functions 0 and 1 may be modified, as illustrated by arrow 1344 for more fair bin packing, and/or to be scheduled at different times, at or at different nodes and/or hardware resources may be redistributed to establish fairness (e.g., equal amounts) between hardware resources required for higher IPC. Thus, function 0 may be allocated an amount of resources 1346 (e.g., allocated hardware resources) to achieve an IPC equal to that achieved by an amount of resources 1348 (e.g., allocated hardware resources) allocated to function 1. While not illustrated, the power and frequency allocations may also be more evenly allocated between function 0 and function 1 by the modification.

FIG. 13C shows a method 1350 of scheduling functions in a CSP environment, and may be executed by the server 1302 of FIG. 13A and/or the enhanced FaaS system 400, such as orchestrator 404, of FIG. 4. The method 1350 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

For example, computer program code to carry out operations shown in the method 1350 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 1352 may include determining for each respective function of a plurality of functions, one or more sensitive resources required to execute the respective function. Illustrated processing block 1354 may include determining a resource conflict between the one or more sensitive resources of a first of the functions and the one or more sensitive resources of a second of the functions. Illustrated processing block 1356 may include scheduling one or more of the first or second functions to avoid the resource conflict. For example, illustrated processing block 1356 may include scheduling one or more of the first or second functions to execute at completely non-overlapping times on a same node, to execute on different nodes from each other and/or to redistribute an allocation of resources from one function to another function to establish fairness and maintain quality of service. Illustrated processing block 1358 may include scheduling one or more of the sensitive resources to the first and second functions to achieve a targeted performance yields for the first and second functions respectively. For example, illustrated processing block 1358 may include allocating the sensitive resources to the first and second functions. While not illustrated, the method 1350 may include determining a lack of resource conflict between the one or more sensitive resources of the first function and the one or more sensitive resources of a third of the functions. The method 1350 may include scheduling the first and third functions to execute on a same node at an overlapping time based on the lack of resource conflict.

The method 1350 may enhance efficiency and operation of the CSP environment. For example, the method 1350 may reduce latency and enhance completion rates of the functions.

Additional Notes and Examples

Example 1300 includes at least one computer readable storage medium, comprising a set of instructions, which, when executed by a computing device, cause the computing device to determine for each respective function of a plurality of functions, one or more sensitive resources required to execute the respective function, determine a resource conflict between the one or more sensitive resources of a first function in the plurality of functions and the one or more sensitive resources of a second function in the plurality of functions, schedule one or more of the first function or the second function to avoid the resource conflict, schedule the first and second functions to execute at different times, schedule the first and second functions to execute on different compute nodes, determine a lack of resource conflict between the one or more sensitive resources of the first function and the one or more sensitive resources of a third function in the plurality of functions, schedule the first and third functions to execute on a same node at an overlapping time, and schedule one or more of the sensitive resources to the first and second functions to achieve a targeted performance yields for the first and second functions respectively.

Example 1301 includes at least one computer readable storage medium, comprising a set of instructions, which, when executed by a computing device, cause the computing device to determine for each respective function of a plurality of functions, one or more sensitive resources required to execute the respective function, determine a resource conflict between the one or more sensitive resources of a first function in the plurality of functions and the one or more sensitive resources of a second function in the plurality of functions, and schedule one or more of the first function or the second function to avoid the resource conflict.

Example 1302 includes the at least one computer readable storage medium of Example 1301, comprising a further set of instructions, which, when executed by a computing device, cause the computing device to schedule the first and second functions to execute at different times.

Example 1303 includes the at least one computer readable storage medium of Example 1301, comprising a further set of instructions, which, when executed by a computing device, cause the computing device to schedule the first and second functions to execute on different compute nodes.

Example 1304 includes the at least one computer readable storage medium of Example 1301, comprising a further set of instructions, which, when executed by a computing device, cause the computing device to determine a lack of resource conflict between the one or more sensitive resources of the first function and the one or more sensitive resources of a third function in the plurality of functions, and schedule the first and third functions to execute on a same node at an overlapping time.

Example 1305 includes at least one computer readable storage medium, comprising a set of instructions, which, when executed by a computing device, cause the computing device to determine for each respective function of a plurality of functions, one or more sensitive resources required to execute the respective function, determine a resource conflict between the one or more sensitive resources of a first function in the plurality of functions and the one or more sensitive resources of a second function in the plurality of functions, and schedule one or more of the sensitive resources to the first and second functions to achieve a targeted performance yields for the first and second functions respectively.

Enhanced Function Execution for FaaS

Figure 14A:
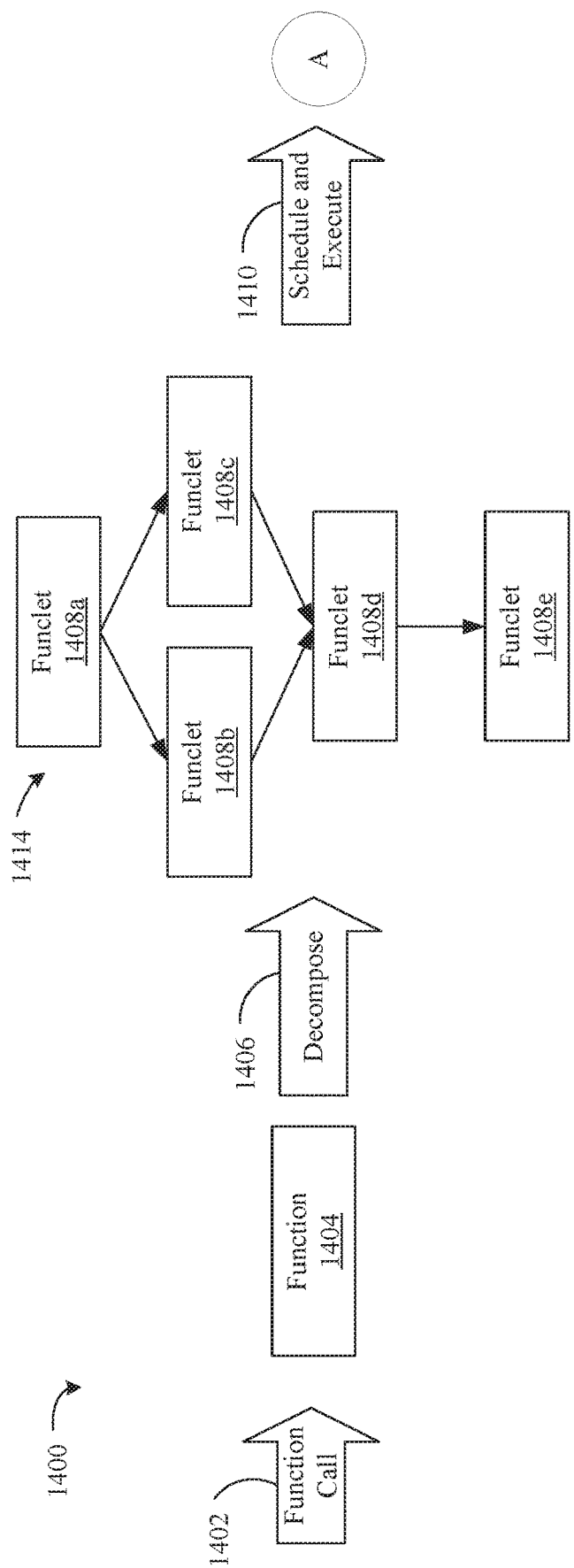
FIGS. 14A and 14B are examples of an enhanced function execution sequence according to an embodiment.
Figure 14B:
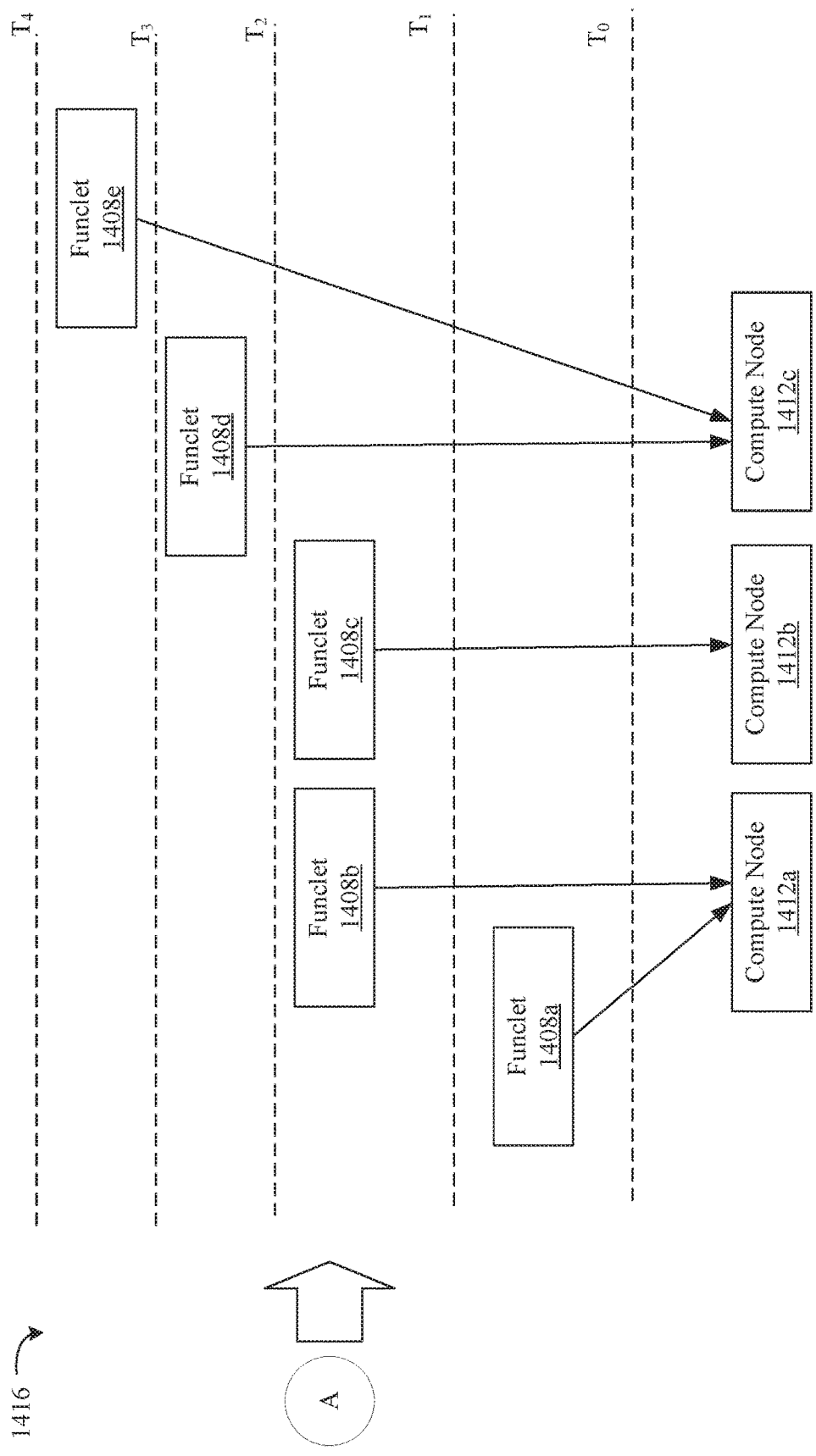

FIGS. 14A and 14B illustrate an enhanced function execution sequence 1400 according to some embodiments. Such an example may be implemented by server 1302 of FIG. 13A for example, one or more of first-third compute nodes 1304a-1304c and/or the enhanced FaaS system 400, such as orchestrator 404, of FIG. 4. More particularly, a function call 1402 may request function 1404 to execute. The function call 1402 may also be referred to as a "trigger" in a FaaS context. Function 1404 may be a serverless function (e.g., a single FaaS function). Function 1404 may be viewed as a collection of internal operations that are executable in some order. An operation may be an execution of a module within the function 1404 which accomplishes a portion of the total function. For example, suppose that function 1404 is to select some number of tuples from a database table according to a set of conditions, and then needs to sort the results to produce the output in a desired order or subselect further from the sorted output. In that example, the select and sort are two operations internal to the function 1404. The internal operations may be referred to as "funclets."

Decomposition procedure 1406 may decompose the function 1404 into a series of funclets 1408a-1408e, through a transcode for example, or a static analysis of which modules are called from the code body of the function 1404, rather than treating the function 1404 as an atomic unit and executing the function 1404 as presented. The decomposition procedure 1406 may be specified by a programmer, by a cloud service provider, and/or may be implemented by an optimization tool chain that is authored by third parties. The decomposition procedure 1406 and the operation of the decomposition procedure 1406 may be further controlled by options, hints, directives, and so on that are provided by a programmer or a cloud service provider. One or more of the funclets 1408a-1408c may optionally be implemented by a user and specified to procedure 1406. Unlike functions, funclets 1408a-1408e may share varying levels of state among each other for efficient computation and coordination. The individual funclets 1408a-1408e may undergo an individual scheduling and execution process 1410 to reduce latency and manage resources more efficiently. In detail, some of the funclets 1408a-1408e may execute concurrently to reduce latency. Further, if a particular funclet of the funclets 1408a-1408e requires a resource such as a specialized hardware (for example, an accelerator or an FPGA) or firmware to execute, it may be possible to delay execution of that particular funclet of the funclets 1408a-1408e until the specialized hardware becomes available to enhance resource utilization and scheduling.

As illustrated, the function 1404 may be decomposed into a dependency graph 1414 composed of the funclets 1408a-1408e in which the dependency graph 1414 indicates an order of execution of the funclets 1408a-1408e. In the dependency graph 1414, the funclet 1408a may execute first. Funclets 1408b, 1408c may execute based on information from funclet 1408a, and execute concurrently. Funclet 1408d may operate after funclets 1408b, 1408c and based on information from both funclets 1408b, 1408c. Funclet 1408e may execute after funclet 1408d based on information from funclet 1408d and complete execution of the function 1404.

A scheduling and execution procedure 1410 may operate based on the dependency graph 1414 to individually schedule each of the funclets 1408a-1408e. For example, based on the dependency graph 1414, the interconnections between the funclets 1408a-1408e are clear. Thus, the scheduling and execution procedure 1410 may determine whether to concurrently schedule (in parallel) or serially schedule (one after another) the funclets 1408a-1408e based the dependency interconnections of the dependency graph 1414.

As illustrated in a schedule graph 1416 of FIG. 14B, the funclets 1408a-1408e may be scheduled by the scheduling and execution procedure 1410 to operate during various time slots between timings $T_0$-$T_4$ and at various compute nodes 1412a-1412c. Funclet 1408a may be scheduled to execute on compute node 1412a between times $T_0$-$T_1$. Since the other funclets 1408b-1408e require data from the funclet 1408a, none of the other funclets 1408 may execute during time $T_0$-$T_1$.

After funclet 1408a completes execution, funclets 1408b, 1408c may both execute at compute nodes 1412a, 1412b between times $T_1$-$T_2$. As illustrated in the dependency graph

1414, the funclets 1408*b*, 1408*c* may concurrently execute as the funclets 1408*b*, 1408*c* both only need information from funclet 1408*a*, and not funclets 1408*d*, 1408*e*. Thus, in the schedule graph 1416, the funclets 1408*b*, 1408*c* concurrently execute at different compute nodes 1412*a*, 1412*b*. In some embodiments, if one of compute node 1412*a*-1412*c* has sufficient resources to support both funclets 1408*b*, 1408*c*, both funclets 1408*b*, 1408*c* may be scheduled to execute on the one of the compute nodes 1412*a*-1412*c*.

After the funclets 1408*b*, 1408*c* complete execution, funclet 1408*d* may execute on compute node 1412*c* during times $T_2$-$T_3$. Execution of the funclet 1408*d* may be enhanced through a hardware accelerator and/or an FPGA found on compute node 1412*c*. Thus, the scheduling and execution procedure 1410 may further consider whether a resource, such as a hardware resource, may enhance execution of one of the funclets 1408*a*-1408*e*, and schedule the one of the funclets 1408*a*-1408*e* accordingly. Further, as illustrated in the dependency graph 1414, the funclet 1408*d* may need data from funclets 1408*b*, 1408*c*, but not funclet 1408*e*, to execute and is therefore scheduled after the funclets 1408*b*, 1408*c* complete execution.

After the funclet 1408*d* completes execution, the funclet 1408*e* may execute on compute node 1412*c* during times $T_3$-$T_4$. Efficiency of resources may be enhanced by having the funclet 1408*e* execute on the compute node 1412*c*. That is, since the funclet 1408*e* may need data from funclet 1408*d*, the funclet 1408*e* may be scheduled to execute on a same node as the funclet 1408*d* to minimize data transfers between the compute nodes 1412*a*-1412*c*, and enhance memory and cache usage. Thus, the scheduling and execution procedure 1410 may further enhance resource usage by minimizing data transfers and enhancing cache reuse through enhanced scheduling of the funclets 1408*a*-1408*e*.

In some embodiments, one or more of the funclets 1408*a*-1408*e* may be executed at a later time from a recreated state when resources needed for the funclets 1408*a*-1408*e* become available. For example, suppose that the funclet 1408*d* requires the hardware accelerator for execution. The funclet 1408*d* may be scheduled to execute in response to an identification that the hardware accelerator is available. The execution of the funclet 1408*d* may occur a period after funclets 1408*b*, 1408*c* complete execution. That is, funclet 1408*d* may not be automatically triggered to begin execution as soon as the funclets 1408*b*, 1408*c* complete execution. Rather, funclet 1408*d* may be scheduled to execute when the hardware accelerator becomes available in addition to the funclets 1408*b*, 1408*c* completing execution.

Dividing the function 1404 into funclets 1408*a*-1408*e* may reduce a failure potential of the function 1404. For example, in some embodiments, some of the operations of the function 1404 may require specific hardware, such as the funclet 1408*d* mentioned above. If the function 1404 must wait for the hardware, a time-out failure may occur in which the function 1404 fails to complete before a predetermined time limit, and is therefore abandoned.

By dividing the function 1404 into a series of individual funclets 1408*a*-1408*e*, such time-out failures may be better avoided since the funclets 1408*a*-1408*e* may be discretely scheduled to operate only when resources are available. Simply put, the function 1404 may be "paused" between funclets 1408*a*-1408*e* by waiting to initiate a funclet 1408*a*-1408 until resources are available. As noted, the funclet 1408*d* may be scheduled to execute when the hardware accelerator becomes available, rather than beginning execution and then waiting for the hardware accelerator to become available.

Furthermore, the decomposition procedure 1406, and scheduling and execution procedure 1410 may provide opportunities for enhancing the overall execution by acquiring and releasing resources at funclet 1408*a*-1408*e* level granularities, which is a finer granularity than that of the function 1404. Further, it may be possible to mix a funclet, such as funclet 1408*d*, that may be accelerated on special purpose hardware accelerator with those that are better fit for conventional or CPU based software execution for example funclets 1408*a*-1408*c* and 1408*e*.

Further, embodiments allow for a simple flow execution of the function 1404, in which the function 1404 is decompounded into smaller funclets 1408*a*-1408*e* along with ordering, as illustrated in the dependency graph 1414. A scheduling scheme implemented in the scheduling and execution procedure 1414 may monitor available resources/execution or priorities of other contending needs for those resources, for opportunistic scheduling while maintaining funclet order. Moreover, a developer may be unaware of the enhanced function execution sequence 1400. This may simplify the developer task since the developer does not need to identify sub-functions as the process is opaquely executed on the CSP side.

As described above, the funclets 1408*a*-1408*e* may be provisioned to an execution platform according to the ordering dependencies described by the dependency graph 1414. Architectural support may be provided for ensuring the correct ordering dependencies in the dependency graph 1414, including support for efficient logical barriers and event coordination using techniques that extend user level interrupts (ULI), hardware queue managers, Remote Atomics (RAO), etc., for the funclets 1408*a*-1408*e* that may be scheduled as concurrent activities within or across address space boundaries. The funclets 1408*a*-1408*e* may also be decomposed into smaller units called "mini-funclets" that are executed similarly to as described above.

The enhanced function execution sequence 1400 may be coordinated by one or more hardware queue managers. Multiple hardware queue managers may schedule and queue the funclets 1408*a*-1408*e*. The hardware queue managers may be on different nodes, but may maintain the queue of the funclets 1408*a*-1408*e* in order of execution of the dependency graph 1414 and schedule accordingly.

The enhanced function execution sequence 1400 may further be implemented by the server 1302 of FIG. 13A as noted above, but may also, or in conjunction with the sever 1302, be implemented in the enhanced FaaS system 400, such as orchestrator 404, of FIG. 4 and/or one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

For example, computer program code to carry out operations shown in the enhanced function execution sequence 1400 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

As an example, suppose a function includes analyzing a short speech file. The analyzing of the short speech file may be decomposed into funclets (e.g., constituent operations), including translating (transcribing) the speech file into text, recognizing and separating the words and/or sentences spoken by different participants, and attributing the transcriptions by the identities of the speakers. By decomposing the function as described above with respect to the enhanced function execution sequence 1400, partial execution of the function is obtained, so that some of the funclets complete in an available amount of time with a particular amount of resources. Thus, decomposing the function into funclets may enhance execution, reduce resource usage and reduce latency.

Figure 14C:
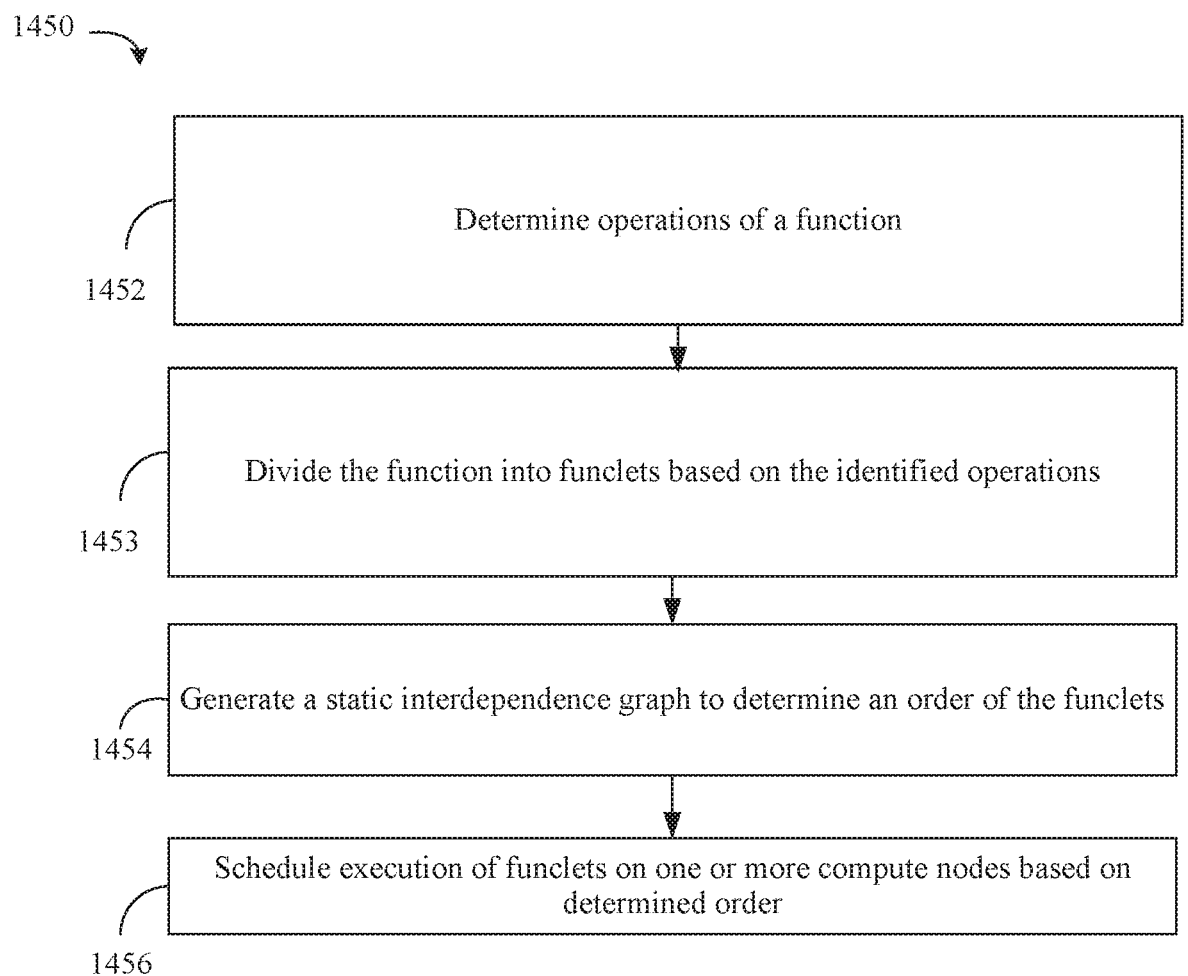
FIG. 14C is a flowchart of scheduling a function that has multiple operations according to an embodiment.

FIG. 14C shows a method 1450 of scheduling a function having multiple operations in a CSP environment, and may be executed by the server 1302 of FIG. 13A, but may also, or in conjunction with the server 1302 be implemented in the enhanced FaaS system 400, such as orchestrator 404, of FIG. 4 and/or one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

For example, computer program code to carry out operations shown in the method 1450 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 1452 may determine operations (e.g., funclets) of a function. Illustrated processing block 1453 divides the function into funclets based on the identified operations. For example, each funclet may include a single operation. In other embodiments, each funclet may include several operations if the operations are related to each other (e.g., utilize similar data or need data from each other). Illustrated processing block 1454 may generate a static interdependence graph to determine the order of the funclets. For example, and as noted above, the order may include determining whether the funclets (e.g., the operations) may execute concurrently or serially. Illustrated processing block 1456 may individually schedule the funclets based on the determined order. For example, a first funclet (e.g., operation) may be scheduled before other funclets (e.g., operations) if the other funclets depend on data from the first funclet. Illustrated processing block 1456 may further schedule a first of the funclets to execute at a first compute node, and a second of the funclets to execute at a second compute node that is different from the first compute node. Thus, concurrent scheduling may be facilitated, or the use of different hardware (e.g., specialized and/or non-specialized) to reduce latency of the first and second functions.

Illustrated processing block 1456 may also schedule a first of the funclets at a first time and schedule a second of the funclets at a second time that is different from the first time. Thus, serial execution of the first and second funclets may be implemented. Further, illustrated processing block 1456 may schedule the second funclet to begin execution in response to both an identification that a resource allocation (e.g., specialized hardware accelerator and/or FPGA) is available and an identification that the first funclet is completed. In such an embodiment, the method 1450 may further include intentionally delaying execution of the second funclet until the resource allocation is available. Furthermore, the second funclet may require an output from the first funclet.

The method 1450 may enhance efficiency and operation of the CSP environment. For example, the method 1450 may reduce latency, enhance resource utilization and enhance completion rates of the function.

Additional Notes and Examples

Example 1400 includes at least one computer readable medium, comprising a set of instructions, which, when executed by a computing device, cause the computing device to determine operations of a function, determine an order of the operations, individually schedule the operations based on the determined order, schedule a first of the operations to execute at a first compute node, and a second of the operations to execute at a second compute node, schedule the first operation at a first time, schedule the second operation at a second time that is different from the first time, schedule the second operation to begin execution in response to both an identification that a resource allocation is available and an identification that the first operation is completed, and delay execution of the second operation until the resource allocation is available, wherein the second operation is to receive an output from the first operation.

Example 1401 includes at least one computer readable medium, comprising a set of instructions, which, when executed by a computing device, cause the computing device to determine operations of a function, determine an order of the operations, individually schedule the operations based on the determined order.

Example 1402 includes the at least one computer readable medium of Example 1401, comprising a further set of instructions, which, when executed by a computing device, cause the computing device to schedule a first of the operations to execute at a first compute node, and a second of the operations to execute at a second compute node.

Example 1403 includes the at least one computer readable medium of Example 1401, comprising a further set of instructions, which, when executed by a computing device, cause the computing device to schedule a first operation of the operations at a first time, and schedule a second operation of the operations at a second time that is different from the first time.

Example 1404 includes the at least one computer readable medium of Example 1403, comprising a further set of instructions, which, when executed by a computing device, cause the computing device to schedule the second operation to begin execution in response to both an identification that a resource allocation is available and an identification that the first operation is completed.

Example 1405 includes the at least one computer readable medium of Example 1404, comprising a further set of instructions, which, when executed by a computing device, cause the computing device to delay execution of the second operation until the resource allocation is available.

Example 1406 includes the at least one computer readable medium of Example 1403, wherein the second operation is to receive an output from the first operation.

Example 1407 includes the at least one computer readable medium of Example 1400, comprising a further set of instructions, which, when executed by a computing device, cause the computing device to determine the operations based on a user input.

Enhanced Memory Allocation for FaaS

Figure 15A:
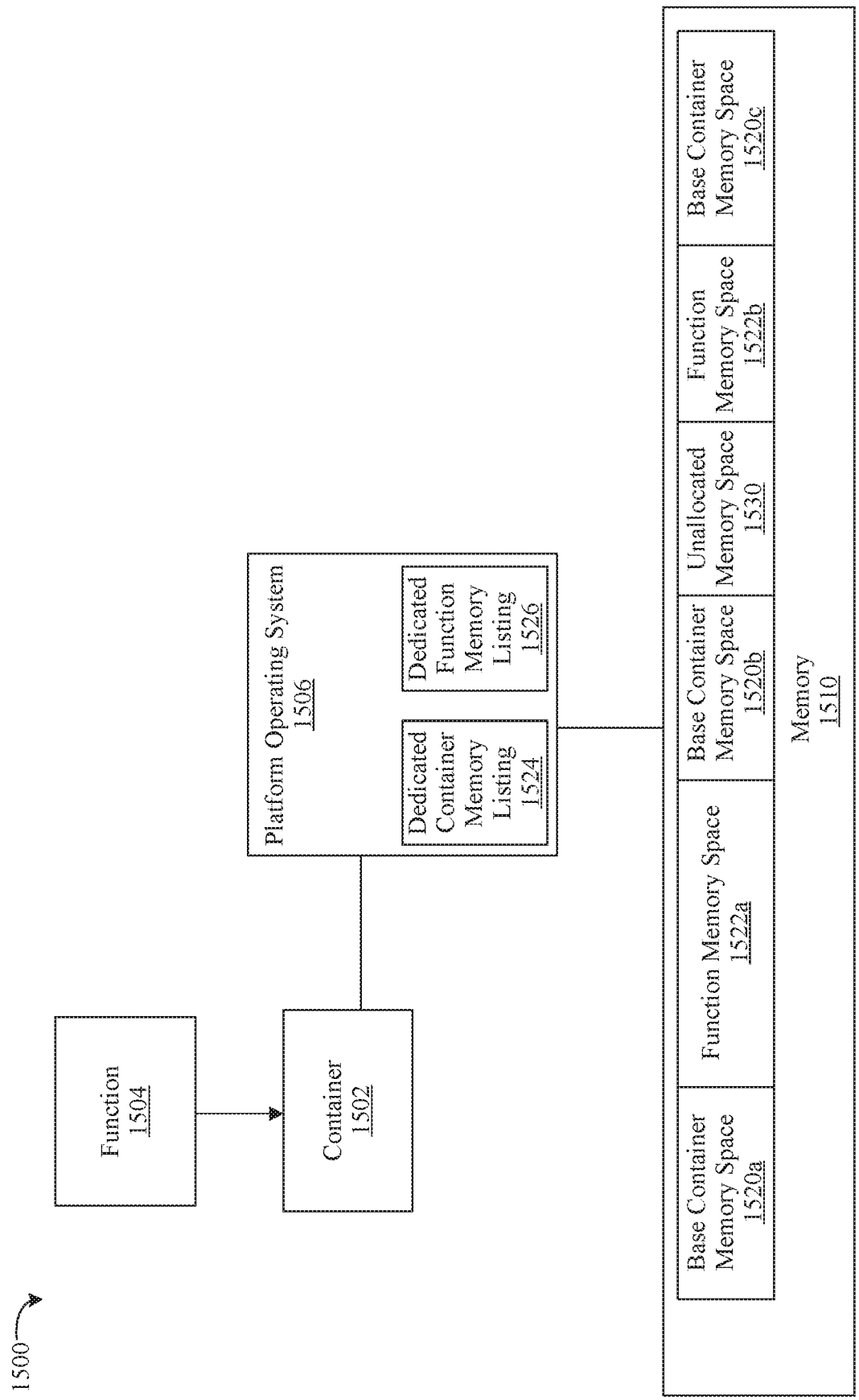
FIG. 15A is a block diagram of an example of a memory storage enhanced computing architecture for FaaS according to an embodiment.

FIG. 15A illustrates a performance and memory storage enhanced computing architecture 1500 according to some embodiments. Such an example may be implemented by server 1302 of FIG. 13A for example, one or more of first-third compute nodes 1304a-1304c and/or the enhanced FaaS system 400, such as orchestrator 404, of FIG. 4.

The performance and memory storage enhanced computing architecture includes a container 1502 and a function 1504. The function 1504 may operate in conjunction with the container 1502. For example, the function 1504 may be loaded into the container 1502. In some embodiments, the function 1504 may be downloaded and instantiated into the container 1504. The platform operating system 1506 may host the container 1502 and function 1504, and operate in conjunction with the memory 1510 to store data for the container 1502 and function 1504.

As illustrated, the platform operating system 1506 may include dedicated memory container listing 1524 and dedicated function memory listing 1526. The dedicated container memory listing 1524 and the dedicated function memory listing 1526 may be data structures, arrays or lookup tables that identify address ranges of the memory 1510 that are dedicated to the function 1504 and/or the container 1502. For example, the dedicated container memory listing 1524 identifies base container memory spaces 1520a-1520c. The dedicated function memory listing 1526 identifies function memory spaces 1522a, 1522b. As illustrated, the memory 1510 may include unallocated memory space 1530 as well.

When a memory allocation request is received by the platform operating system 1506, the platform operating system 1506 may determine whether the function 1504 or the container 1502 originates the memory allocation request. If the container 1502 originates the memory allocation request, a memory allocation may be provided based on the dedicated container memory listing 1524. For example, the memory allocation may be an allocation of a memory range identified by the dedicated container memory listing 1524. Therefore, the container 1502 may store and write data to the base container memory spaces 1520a-1520c based on the memory allocation received from the platform operating system 1506. Thus, the container 1502 may be provisioned with standard, trusted memory portions through the base container memory spaces 1520a-1520c.

In contrast, if the function 1504 originates the memory allocation request, a memory allocation may be provided based on the dedicated function memory listing 1526. For example, the memory allocation may be an allocation of a memory range identified by the dedicated function memory listing 1526. Therefore, the function 1504 may store and write data to the function memory spaces 1522a, 1522b.

As such, container specific data of the container 1502 and function specific data, which is used only by the function 1504, may be stored in different base container and function memory spaces 1520a-1520c, 1522a, 1522b. The container specific data may be reusable by many different functions and may not be altered by the function 1504 during execution of the function 1504.

Once the function 1504 terminates, for example by completing execution or faulting, the function specific data stored in the function memory spaces 1522a, 1522b may be wiped. The container specific data stored in the base container memory spaces 1520a-1520c may not be wiped when the function 1504 completes execution. As such, even when the function 1504 terminates and no longer executes, the container 1502 remains in a semi-warm state ready to receive another function for execution. Thus, tearing down of the entire container 1502 may be avoided by a limitation of the data that is wiped when the function 1504 terminates. By having the function 1504 store data only to the function memory spaces 1522a, 1522b, only changes effected by the function 1504 from the state of the container 1502 may be removed, thereby leaving the container 1502 in the semi-warm state with the trusted code stored in the base container memory spaces 1520a-1520c. As such, by dividing data between function specific data and container specific data and storing accordingly, deletion of data associated with the function 1504 may be facilitated to enhance security and reduce high latency cold container starts.

In detail, for various container types, overheads for terminating and restarting the container 1502 may be prohibitive and increase latency. For example, if the container 1502 is for a neural network (e.g., a convolutional neural network or deep neural networks), the container 1502 may be expensive to terminate and then spin up again. This may be because a neural network includes a significant data load (e.g., neural weights and/or constant values) to operate. Such a data load may be part of the container 1502 as the data load may be reused by different functions and is unalterable by the functions. Thus, if the function 1504 faults, the container 1502 may be forced to terminate and be spun up again, which increases latency and reduces efficiency.

The computing architecture 1500 may enhance the termination process of the function 1504. For example, if the function 1504 faults, the platform operating system 1506 may limit the scope of data that is terminated. That is, only data that is stored in the function memory spaces 1522a, 1522b may be wiped or deallocated. Therefore, only changes effected by the function 1504 are removed from the state of the container 1502, and tearing down the entire container 1502 is avoided. As illustrated, the platform operating system 1506 provides the container 1502 with the ability to maintain two different sets of resources that include function memory spaces 1522a, 1522b allocated and used for the function 1504 to run in the container 1502, and base container memory spaces 1520a-1520c allocated and used for the container 1502 itself.

Further, security is enhanced since sensitive data of the function 1504 is wiped after the function 1504 terminates. For example, the sensitive data, that is particular to the function 1504, may be wiped from the function memory spaces 1522a, 1522b.

The platform operating system 1506 may operate in conjunction with a Virtual Machine Monitor (not illustrated) as well as a library used by one or more of the container 1502 or function 1504. One or more of the platform operating system 1506, Virtual Machine Monitor and the library may implement a mechanism of determining whether a memory allocation call (e.g., malloc, calloc, etc.) originates from a code range that is white listed as being part of the container 1502, or a known and validated body of execution of the container 1502. If the memory allocation call originates from the white listed code range or the known and validated body of the container 1502, the memory allocation call is provided with a memory range from the base container memory spaces 1520*a*-1520*c*. Otherwise, by default, the memory allocation call is assumed to originate from the code of the function 1504 and is then given a memory range from the function memory spaces 1522*a*, 1522*b*. Dedicated function memory ranges may be considered "pro-tem" ranges.

If there is a need to execute a cleanup or teardown loop, for example as a result of a segmentation violation, instead of tearing down base container memory spaces 1520*a*-1520*c*, only the function memory spaces 1522*a*, 1522*b* of the function 1502 are torn down. For example, the dedicated container memory listing 1524 may include a list of all allocated memory spaces that are utilized by the container 1502. Likewise, the dedicated function memory listing 1526 may include a list of all allocated memory spaces that are utilized by the function 1504. During cleanup, the memory spaces allocated to the function 1504 may be torn down and wiped while leaving the memory spaces allocated to the container 1502 untouched.

Furthermore, any type of memory allocation call, for example a Portable Operating System Interface Compliant Unix (POSIX) system call (e.g., mmap( ) call) or a dynamic memory allocation call (e.g., malloc, calloc, etc.) may be identified and appropriately directed as described above. For example, if a mmap( ) call is received from function 1504, virtual memory ranges furnished for the mapping may be provided based on the dedicated function memory listing 1526. Thus, the dedicated function memory listing 1526 may include an identification of virtual memory ranges. Therefore, only those virtual memory ranges and any associated physical memory ranges may need to be reclaimed.

Further, file descriptors may be treated similarly. For example, for an "open( )" command, the platform operating system 1506 may maintain two different groups of file descriptors in the dedicated container memory listing 1524 and the dedicated function memory listing 1526. The file descriptors in the dedicated container memory listing 1524 and the associated base container memory spaces 1520*a*-1520*c* do not need to be terminated or closed (but may need to be reinitiated, recreated or reopened and re-initialized) upon on an abnormal condition or the termination of function 1504. The file descriptors in the dedicated function memory listing 1526 and the associated function memory spaces 1522*a*, 1522*b* may always be closed on an abnormal condition or termination of the function 1504.

When function 1504 terminates, for example due to a trap caused by an illegal instruction or segmentation violation, the container 1502 may execute the cleanup for the function 1504 without the container 1502 itself being forced to exit. As noted above, one or more of the platform operating system 1506, software library and Virtual Machine Monitor may facilitate the tearing down of the function 1504.

In some embodiments, the platform operating system 1506 and/or the container 1502 may tear down the container 1502 in addition to the function 1504. That is, the base container memory spaces 1520*a*-1520*c* may be wiped when the container 1502 is identified as causing an error. For example, if a terminating condition (such as an illegal instruction fault) occurs as a result of code that is executing from inside a white-listed body of the container 1502, then the process or the container 1502 should be torn down in addition to the function 1504. In some embodiments, the container 1502 may be torn down if the container 1502 remains unused by a function for a predetermined amount of time.

In some embodiments, when the function 1504 terminates prior to completion (e.g., from a fault), a special entry point may be defined in the container 1502. The entry point is where execution is vectored towards, after the function 1504 is torn down and the function memory spaces 1522*a*, 1522*b* are deallocated. The re-entry point may a point at which the container 1502 performs the launch of a function during a warm start. For example, the re-entry point may be the launch point at which the container 1502 has fully initialized and is ready to begin processing of the function 1504. Vectoring to this re-entry point may be equivalent to a "longjmp call" to that launch point.

Various adjustments may be made to commands or library interfaces to facilitate appropriate allocation and deallocation. For example, the "backtrace" command is usually required to determine the origin of various allocations; but it may be avoided by having two different entry points for various allocations and "open calls." For example, one entry point is only linked into white-listed code, and the other entry point is a default to code of the function 1504. Similar bifurcation of commands may be done for other types of provisioning calls such as "mmap( )" (which has to furnish virtual ranges), "open( )" (which allocates file descriptors, socket( ) etc). In each case it may be assumed that the white-listed code is linked with code that allocates in the normal way, while non-white-listed code goes through a path that sequesters the resources into function memory spaces 1522*a*, 1522*b* via dedicated function memory listing 1526, or which tracks opened file descriptors, sockets, etc., as data associated with the function 1504 that needs to be auto-freed/auto-closed on a fault.

Thus, the enhanced computing architecture 1500 may include several enhancements, including limited tearing down of containers and limited initialization of cold container, thereby reducing cost. Moreover, the enhanced computing architecture 1500 may enhance efficiency of the utilization of resources since less bandwidth and power are utilized to tear down and recreate containers. Further, enhanced computing architecture 1500 has less latency due to faster startup of containers from semi-warm state and less overhead from function termination and faults. Security may also be enhanced by removing function specific data from the function memory spaces 1522*a*, 1522*b*.

Figure 15B:
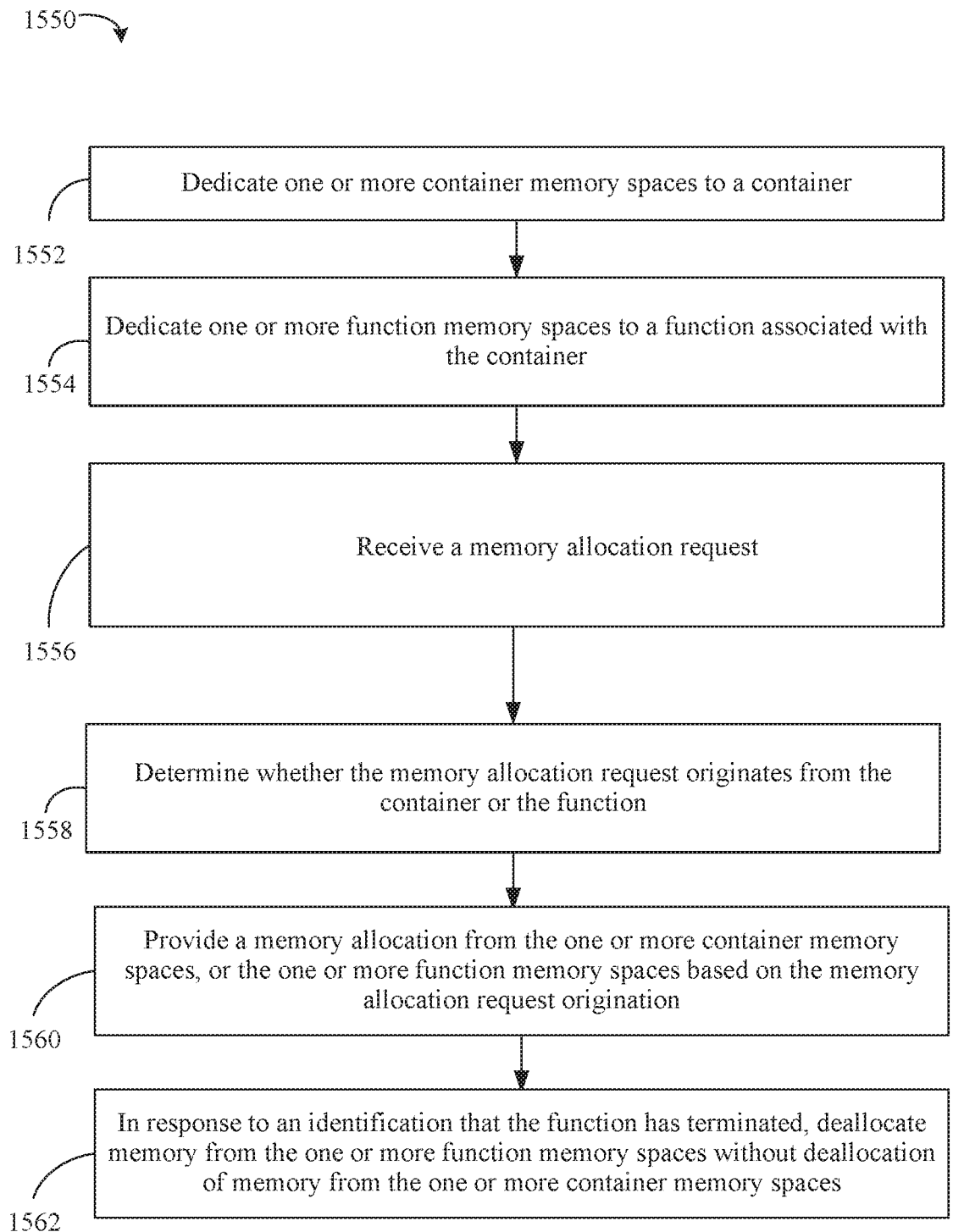
FIG. 15B is a flowchart of memory allocation for containers and functions of a FaaS platform according to an embodiment.

FIG. 15B shows a method 1550 of memory allocation for a function and a container, and may be executed by the server 1302 of FIG. 13A, but may also, or in conjunction with the server 1302 be implemented in the enhanced FaaS system 400 of FIG. 4 and/or one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

For example, computer program code to carry out operations shown in the method 1550 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 1552 may dedicate one or more container memory spaces to a container. Illustrated processing block 1554 may dedicate one or more function memory spaces to a function associated with the container. Illustrated processing block 1556 may receive a memory allocation request. Illustrated processing block 1558 may determine whether the memory allocation request originates from the container or the function. Illustrated processing block 1560 may provide a memory allocation from the one or more container memory spaces, or the one or more function memory spaces based on whether the memory allocation request originates from the container or the function. For example, when the memory allocation request originates from the container, the memory allocation may be from the one or more container memory spaces. In contrast, when the memory allocation request originates from the function, a memory allocation may be provided from the one or more function memory spaces.

Furthermore, only data for the container to operate may be stored in the one or more container memory spaces. Moreover, function specific data is only stored in the one or more function memory spaces.

Illustrated processing block 1562 may, in response to an identification that the function has terminated, deallocate memory from the one or more function memory spaces without deallocation of memory from the one or more container memory spaces. While not illustrated, the method may further include loading another function into the container for execution. Thus, the method 1550 may include several enhancements, including limited tearing down of containers and limited initialization of cold container, thereby reducing cost. Moreover, the method 1550 may enhance efficiency of the utilization of resources since less bandwidth and power are utilized to tear down and recreate containers. Moreover, the method 1550 may have less latency due to faster startup of containers from semi-warm state and less overhead from function termination and faults.

Additional Notes and Examples

Example 1500 includes at least one computer readable medium, comprising a set of instructions, which, when executed by a computing device, cause the computing device to dedicate one or more container memory spaces to a container, and dedicate one or more function memory spaces to a function associated with the container, receive a memory allocation request, determine whether the memory allocation request originates from the container or the function, provide a memory allocation from the one or more container memory spaces when the memory allocation request originates from the container, provide a memory allocation from the one or more function memory spaces when the memory allocation request originates from the function, and in response to an identification that the function has terminated, deallocate memory from the one or more function memory spaces without deallocation of memory from the one or more container memory spaces, wherein only data for the container to operate is stored in the one or more container memory spaces, and function specific data is only stored in the one or more function memory spaces, wherein the one or more container memory spaces are to store one or more of a file descriptor or a socket descriptor.

Example 1501 includes at least one computer readable medium, comprising a set of instructions, which, when executed by a computing device, cause the computing device to dedicate one or more container memory spaces to a container, and dedicate one or more function memory spaces to a function associated with the container.

Example 1502 includes the at least one computer readable medium of Example 1501, comprising a further set of instructions, which, when executed by a computing device, cause the computing device to receive a memory allocation request, determine whether the memory allocation request originates from the container or the function, and provide a memory allocation from the one or more container memory spaces, or the one or more function memory spaces based on whether the memory allocation requests originate from the container or the function.

Example 1503 includes the at least one computer readable medium of Example 1502, comprising a further set of instructions, which, when executed by a computing device, cause the computing device to provide the memory allocation from the one or more container memory spaces when the memory allocation request originates from the container.

Example 1504 includes the at least one computer readable medium of Example 1502, comprising a further set of instructions, which, when executed by a computing device, cause the computing device to provide the memory allocation from the one or more function memory spaces when the memory allocation request originates from the function.

Example 1505 includes the at least one computer readable medium of Example 1501, wherein only data for the container to operate is stored in the one or more container memory spaces, and function specific data is only stored in the one or more function memory spaces.

Example 1506 includes the at least one computer readable medium of Example 1501, comprising a further set of instructions, which, when executed by a computing device, cause the computing device to in response to an identification that the function has terminated, deallocate memory from the one or more function memory spaces without deallocation of memory from the one or more container memory spaces.

Example 1507 includes the at least one computer readable medium of Example 1506, wherein the one or more container memory spaces are to store one or more of a file descriptor or a socket descriptor.

Distribution of Functions to Warm and Cold Containers

Functions may have a random distribution between warm and cold containers. As already described herein, the latency time to initialize a cold container may not be trivial. As such, functions distributed to cold containers may have a higher latency since the cold container must be initialized for example by being provisioned, and then the functions must execute. In contrast, functions distributed to warm containers may have a lower latency since the cold container initialization may be avoided.

Cold container initialization latency may be caused by many phases of initialization and factors. One set of factors may be allocating and configuring OS-level resources such as namespaces for resource IDs (e.g. process IDs and file descriptors) and control groups to restrict the quantity of various resources (e.g. CPU and memory) allocated to a container. Another set of factors may be initializing the contents of the container, such as the language runtime for managed languages such as Java. Starting the function itself also imposes additional overhead. Warm containers can perform some number of these phases in advance to reduce the latency of invoking functions hosted within warm containers.

Conventional scheduling may not consider the time required for cold container initialization when distributing functions, or how to minimize cold container initialization. Moreover, some scheduling may have an inefficient distribution of functions between warm and cold containers, leading to higher resource usage and higher latency execution.

Figure 16A:
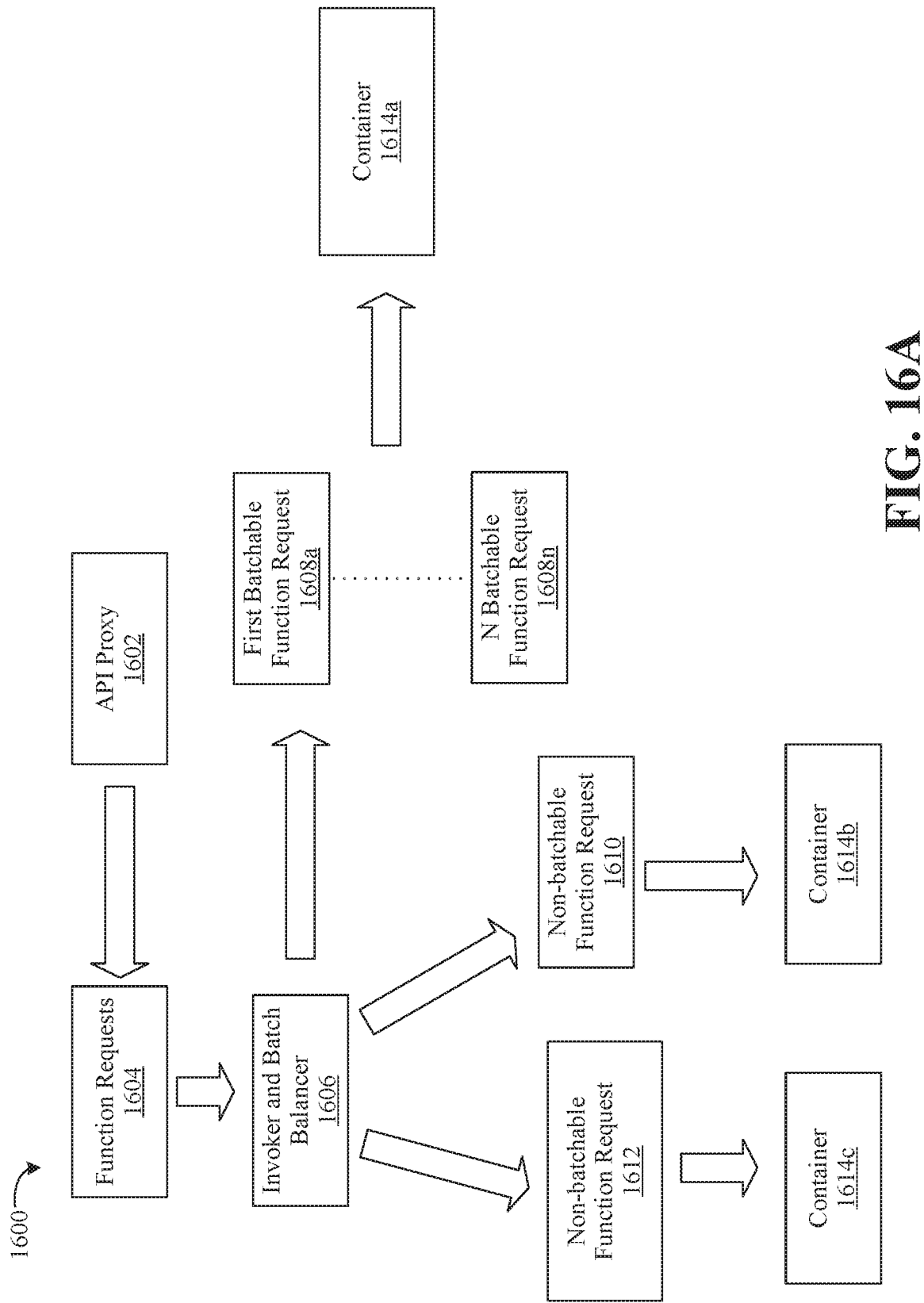
FIG. 16A is an example of batched function requests for function execution according to an embodiment.

Turning now to FIG. 16A, an example 1600 is shown in which function requests 1604 are scheduled by invoker and batch balancer 1606 of a FaaS system, for example the FaaS system 400 of FIG. 4. The invoker and batch balancer 1606 may implement a batched implementation to reduce latency and enhance resource utilization. For example, some embodiments may identify first-N batchable function requests 1608a-1608n that each request execution of a batchable function. The first-N batchable function requests 1608a-1608n may be batched together, and anticipatorily scheduled so that the batchable functions execute in a same container 1614a, rather than in different containers. Cold container initializations may therefore be reduced by the batched execution of the batchable functions to reduce latency and utilize fewer containers.

Furthermore, the invoker and batch balancer 1606 may identify latency constraints of particular functions associated with function requests 1604 and distribute the function requests 1604 to meet the latency constraints. A latency constraint may correspond to a requested time by which the function should complete execution. For example, shorter latency functions may be grouped together when the latency constraints permit and ordered such that all of the latency constraints for every function in the group are satisfied. The above analysis may particularly enhance particular situations in which program code of functions varies greatly in length. One such situation may be when a long function with a lax latency constraint (e.g., long latency constraint) and a short function with a tight latency constraint (e.g., short latency constraint) are scheduled together. Scheduling the short function first enables both latency constraints of the long and short functions to be satisfied. In contrast, scheduling the long function first causes the latency requirements for the short function to not be met.

In some embodiments, an "earliest-deadline first" scheduling policy is used to generate a feasible schedule. Thus, functions with the shortest latency constraints are scheduled before function with longer latency constraints. In some embodiments, alternative scheduling scheme such as "shortest job first" and implementation (e.g., round robin) may be used. So for example, the shortest functions are executed before longer functions, and may be executed in a round robin fashion.

In some embodiments, a hybrid model of the "earliest-deadline first" and "shortest job first" may be adopted. For example, the "shortest job first" policy may arrange the shortest functions to execute before longer functions. The system may then analyze all of the functions (e.g., predict timings needed to complete the functions and compare the timings to associated latency constraints) to predict whether all of the latency constraints will be met. If so, the system may schedule the functions according to the determined arrangement.

If the latency constraints of some of the functions will not be met, the system may modify the arrangement based on the "earliest-deadline first" policy so that those functions, whose latency constraints will not be met, will execute before other functions whose latency constraints are met. As one example, say $F_1$, $F_2$, $F_3$ and $F_4$ are scheduled by the "shortest job first" policy to execute in that order. If it is identified that $F_2$ and $F_3$ will not meet the latency constraints, the system may move $F_2$, $F_3$ to execute before $F_1$, $F_4$. To determine whether $F_2$ or $F_3$ executes first, the system may execute an "earliest-deadline first" policy, and determine that $F_3$ has the earliest deadline between $F_2$, $F_3$, and should be scheduled before $F_2$. Thus, the final order would resemble: $F_3$, $F_2$, $F_1$ and $F_4$ In some embodiments, historical information such as that gathered from various telemetry sources (e.g. timers that timed previous function executions), may be used to estimate the execution time for each function, which may help to inform scheduling of future invocations of the functions. For more detail, see the discussion of FIG. 24A and FIG. 41A. Some embodiments may also determine whether a cold container initialization will be necessary to process the batchable functions, and if so, consider a latency time for cold container initializations when identifying whether the latency constraints will be met.

Thus, some embodiments may limit cold container initializations while having a more effective distribution of functions to reduce resource usage. For example, it may be more resource efficient to have several functions execute within a same container, rather than initializing several new cold containers to execute the functions. It may be apparent that other than the first function, batched functions need to wait for the preceding batched functions to complete in a serial execution model, which may increase latency relative to assuming an infinite parallelism model where no function in a dedicated container needs to wait for any other function to complete. Despite this, the overall latency of the batched functions and even the latency for functions that are not the first function may actually be lower once limits in parallelism are considered and the reduction in initialization time is taken into account. Thus, some embodiments may have lower latency due to enhanced warm container usage, even if functions are batched together. Parallel execution of multiple batched functions in a single container may further reduce latency.

Furthermore, as noted above, resource management may be enhanced. For example, warm containers may be torn down after a certain amount of idle time. Idle time may be time during which the warm containers do not process any function. By keeping warm containers utilized more often through a batched implementation as described herein, embodiments may exhibit less frequent cold container initializations and less frequent teardown of warm containers since the warm containers are more frequently used. Further, some embodiments may have fewer instances of identical containers consuming resources. For example, rather than having a container for each function, one container may service several functions. Thus, embodiments enhance efficiency and utilize fewer resources to reduce cost. Therefore, even if the first-N batchable function requests 1608a-1608n occur in sudden and infrequent bursts, cold container penalties may be avoided and allow the enhanced FaaS system more control over the building and tearing down of containers.

Furthermore, load balancing costs may be reduced. For example, individually scheduling each function by an orchestrator may require greater computation resources, as opposed to scheduling a batch of functions together. Moreover, messaging overheads may be reduced, but since individual messages may not be sent for each function request, rather a batched function request message, that includes all of the first-N batched function requests 1608a-1608n, may be transmitted.

As illustrated in the example 1600, function requests 1604 are scheduled by invoker and batch balancer 1606 of a FaaS system, for example the FaaS system 400 of FIG. 4. The invoker and batch balancer 1606 may be a part of the orchestrator 404, or operate in conjunction with the orchestrator 404.

As illustrated in FIG. 16A, an event handling API proxy 1602 may route event calls to functions associated with the function requests 1604. In the example of 1600, the API proxy 1602 may generate function requests 1604 via an API for example. The function requests 1604 may be provided to the invoker and batch balancer 1606. The function requests 1604 may each be a request to execute a respective function.

The invoker and batch balancer 1606 may analyze the function requests 1604 to identify whether the function requests 1604 may be batched. In detail, the invoker and batch balancer 1606 may determine whether the functions of the function requests 1604 may execute in a same container of the containers 1614a-1614c. Requests may be allowed to build up unless there is a strong latency constraint, and then they may be sent as a batch to an available warm container or to a new cold container, according to how much workload is contained in a batch. Thus, under such optional batching, load-balancing, invoking, and execution of actions are all performed in a decoupled (e.g., two-stage manner) when actions are triggered. Functions that may execute in a same container of the containers 1614a-1614c may be batched together. In some embodiments, the invoker and batch balancer 1606 may determine that identical functions are batchable together. Further, the invoker and batch balancer 1606 may determine that non-identical functions are batchable together if those non-identical functions may execute in a same one of the containers 1614a-1614c.

The invoker and batch balancer 1606 may identify non-batchable function requests 1610, 1612 from the function requests 1604. The non-batchable function request 1610, 1612 may request non-batchable functions that cannot be grouped with other functions, and are therefore deemed to be non-batchable. The non-batchable function requests 1610, 1612 may be sent to containers 1614b, 1614c individually. That is, the non-batchable functions may execute in separate containers 1614b, 1614c. The containers 1614b, 1614c may be warm or cold, with priority being given to the non-batchable function request of the non-batchable function requests 1614b, 1614c having a strongest latency constraint.

As illustrated, the invoker and batch balancer 1606 may identify first-N batchable function requests 1608a-1608n from the function requests 1604. As described, each of the first-N batchable function requests 1608a-1608n may invoke a function (that may be referred to as a "batchable function") that is configured to execute within a same container. Therefore, the first-N batchable function requests 1608a-1608n may be sent to the container 1614a. The batchable functions may execute within the container 1614a. The first-N batchable function requests 1608a-1608n may include any number of function requests greater than one.

In some embodiments, the batchable functions associated with the first-N batchable function requests 1608a-1608n may execute simultaneously in the container 1614a, if the container 1614a has enough resources to support such simultaneous execution. For example, the invoker and batch balancer 1606 may determine resource requirements of each of the batchable functions, and determine if the container 1614a has access to sufficient resources (e.g. CPU and memory) to meet all of the resource requirements simultaneously. If so, then simultaneous execution may be scheduled. If not, simultaneous execution may not be supported and the batchable functions may be executed serially (one after another).

In some embodiments, the invoker and batch balancer 1606 may determine security protocols of the batchable functions. If a security protocol indicates that a particular batchable function has a particular security requirement (e.g., high security), the particular batchable function may be scheduled for non-simultaneous execution in the container 1614a, and execute a limited tearing down of the container 1614a in which only data of the particular batchable function is removed while the data of the container 1614a is maintained, as described with respect to FIG. 15A-15B and the associated description above.

In some embodiments, some of the batchable functions may be executed simultaneously, and others of the batchable functions may be executed serially. In some embodiments, the container 1614a may execute a first group of the batchable functions, for example, a maximum number of batchable functions that may be supported by the resources of the container 1614a. After the first group complete execution, a second group of the batchable functions may begin execution, for example a maximum number of batchable functions that may be supported by the resources of the container 1614a. Thus, the invoker and batch balancer 1606 may schedule a hybrid serial and parallel execution of the batchable functions in the container 1614a based on security protocols and resource availability of the container 1614a relative to resource requirements of the functions.

In some embodiments, the container 1614a may include partitioned work spaces to separate batchable functions that execute in parallel. Each function may execute in a different partition. All of the partitions may have access to common data that may be utilized by any of the batchable functions. The partitions may have separated memory spaces to preserve data that is particular to a function. So, each partition may save data generated by the function in the separated memory space, while accessing common data used by the functions. After a function has completed execution in a partition, data from the corresponding separated memory space may be saved to another data storage (if needed), and the separated memory space is wiped to prepare the partition for another function. The common data however may not be altered by the functions during execution, and it is reusable by each function that executes in the container 1614a.

In some embodiments, the invoker and batch balancer 1606 may accumulate the function requests 1604. For example, the function requests 1604 may each be sent at a different time to the invoker and batch balancer 1606. The invoker and batch balancer 1606 may allow the function requests 1604 to accumulate for a period of time. That is, the invoker and batch balancer 1606 may not immediately schedule the function requests 1604 as they are received. Rather, the invoker and batch balancer 1606 may wait before scheduling the function requests 1604. Doing so may allow the invoker and batch balancer 1606 to receive a number of potentially batchable function requests 1604 and then schedule them based on whether the function requests 1604 are batchable together.

In some embodiments, the invoker and batch balancer 1606 may determine a latency constraint of each of the function requests 1604, and schedule an associated function accordingly. For example, the non-batchable function request 1610 may have a strong latency constraint. That is, the non-batchable function request 1610 may need to be scheduled to execute a corresponding function immediately due to an associated latency constraint. The latency constraint may be a numerical value and/or absolute time. The latency constraint may indicate that the associated function of the non-batchable function request 1610 may need to be completed within a short time frame. Thus, the non-batchable function request 1610 may be scheduled to execute within container 1614b, which may be a warm container.

In some embodiments, if the latency constraint of a function request of the function requests 1604 meets a non-batchable threshold, the function request may be automatically classified as non-batchable to ensure timely execution. For example, if the latency constraint indicates that the function must be completed in under a predetermined amount of time, the corresponding function request may be immediately scheduled without identifying other batchable functions to batch with the corresponding function request.

In some embodiments, the invoker and batch balancer 1606 may further determine the latency constraints of each of the first-N batchable function requests 1608a-1608n. The invoker and batch balancer 1606 may wait to schedule the first-N batchable function requests 1608a-1608n based on the strongest latency constraint of the first-N batchable function requests 1608a-1608n that have been received thus far.

For example, the invoker and batch balancer 1606 may determine from the latency constraints, a time frame of each respective function of the first-N batchable function requests 1608a-1608n to complete execution. The time frame may correspond to a preferred time window during which the respective batchable function should complete execution. A shortest time frame from the time frames may be determined. The invoker and batch balancer 1606 may send the first-N batchable function requests 1608a-1608n to the container 1614a to meet the shortest time frame. For example, the invoker and batch balancer 1606 may send the first-N batchable function requests 1608a-1608n to the container 1614a at a first time to ensure the function, having the shortest time frame, completes within the shortest time frame. The invoker and batch balancer 1606 however may continue to receive and accumulate the function requests 1604 until the first time is reached. As such, the invoker and batch balancer 1606 may wait a period of time before sending the first-N batchable function requests 1608a-1608n to the container 1614a, and to conform to the latency constraints.

In some embodiments, the invoker and batch balancer 1606 may determine a timing to begin execution of a particular function to conform to the latency constraint. The invoker and batch balancer 1606 may determine a total projected latency needed to complete execution of the particular function. The total projected latency may include the time needed to initialize a cold container, time the invoker and batch balancer 1606 has already spent accumulating function request 1604, latencies of functions scheduled to execute in a container before the particular function, communication latencies and/or a latency of the particular function to complete execution in the container. The following Equation 1600 may be used to determine whether the latency constraint of a particular function will be met based on a comparison of the total projected latency and an acceptable latency:

$$L_{wait} + L_{CCL} + L_F + L_C \leq L_{accept} \quad \text{Equation 1600}$$

In the above Equation 1600, $L_{wait}$ is the period of time that the invoker and batch balancer 1606 has accumulated the particular function request of the particular function. For example, $L_{wait}$ may be the difference between the present time and a time at which the particular function request was received. $L_{CCL}$ is the time needed to initialize a cold container. If a warm container is identified as being usable, $L_{CCL}$ may be set to zero. $L_F$ is a summation of a projected execution latency of each function that is scheduled to execute before the particular function, as well as a latency projected for the particular function to complete execution. Thus, $L_F$ may be a total function execution latency estimation. $L_C$ is the communication latency to send the first-N batchable function requests 1608a-1608n to the container 1614a. $L_{accept}$ may be determined from the latency constraint, and may be a total acceptable latency of the particular function. For example, $L_{accept}$ may be a threshold set by a service provider or a client, and may be a total time within which the function is expected to complete execution. If the function completes execution with a latency equal or less to $L_{accept}$, the function may be considered timely completed. The latency constraint may be considered to be met if the above is true or if $L_{accept}$ is greater than or equal to a summation of $L_{wait}$, $L_{CCL}$, $L_C$ and $L_F$. In some embodiments, the invoker and batch balancer 1606 may consider the latency constraint to be met only if $L_{accept}$ is larger than the summation by a predetermined amount.

Based on the above Equation 1600, the invoker and batch balancer 1606 may determine a start timing to begin execution of the particular function. The invoker and batch balancer 1606 may further determine a transmission time to transmit the first-N batchable function requests 1608a-1608n to meet the start timing. For example, the invoker and batch balancer 1606 may determine static values, such as $L_{CCL}$ and $L_C$, and adjust the dynamic latencies, such as $L_{wait}$ and $L_F$, by controlling the timing (transmission time) at which the first-N batchable function requests 1608a-1608n are sent to the container 1614a, and an order of the batchable function execution in the container 1614a.

In some embodiments, the invoker and batch balancer 1606 may send the first-N batchable function requests 1608a-1608n to the container 1614a in response to a particular number of the first-N batchable function requests 1608a-1608n being accumulated. For example, the container 1614a may be able to support concurrent execution of a supported number of functions. As such, when the number of functions of the first-N batchable function requests 1608a-1608n reaches the supported number, the first-N batchable function requests 1608a-1608n may be sent to the container 1614a to begin execution. In some embodiments, the functions may concurrently operate on independent software threads within the container 1614a, and therefore the functions may execute in parallel. In some embodiments, the function may execute in time shared mode on the available threads.

Thus, in the above example the first-N batchable function requests 1608a-1608n may be received at different times by the invoker and batch balancer 1606, and accumulated. The invoker and batch balancer 1606 may send the first-N batchable function requests 1608a-1608n as a batch to the container 1614a, which may be warm or cold. The invoker and batch balancer 1606 may schedule the batch according to how much work there may be in the batch and to meet the associated latency constraints. Thus, under such a batching scheme, load-balancing, invoking, and execution of functions may be performed in a decoupled (two-stage manner) when functions are triggered.

In some embodiments, first-N batchable function requests 1608a-1608n may be divided into two or more groups by the invoker and batch balancer 1606 according to the latency constraints. For example, the first-N batchable function requests 1608a-1608n may be divided so that a first group has the strongest latency constraints, a second group has the next strongest latency constraints and so on.

Concurrent execution of the two or more groups with two or more containers may occur to reduce latency. In some embodiments, if there are not enough warm containers for the two or more groups, the warm containers may be assigned according to latency constraints. For example, groups having the strongest latency constraints (shortest time windows for execution) may be sent to the warm containers, whereas groups having weaker latency constraints (longer time windows for execution) may be sent to cold containers. For example, an identification may be made of the latency constraints from first-N batchable function requests 1608a-1608n. The first-N batchable function requests 1608a-1608n may be grouped according to the latency constraints so that functions having the shortest windows of time to complete execution are executed in warm containers. In contrast, functions having longer windows of time to complete execution may be grouped together to complete execution in cold containers.

In some embodiments, the groups may be scheduled to execute in the same container 1614a one after another. The groups having the strongest latency constraints may be scheduled to execute before groups having the weaker latency constraints.

Further, in some embodiments, the invoker and batch balancer 1606 may operate as a coarse-grained dispatch from the front-end of the FaaS infrastructure to the back-end to schedule batches of functions. For example, at the back-end, the first-N batchable function requests 1608a-1608n may be given to the container 1614a in which the associated functions execute in a normal manner. In contrast, a commercial, high volume use of FaaS may require more resources to perform load balancing, container assignments, and transport operations (all of which may be pure overhead) based on an individual function request scheduling scheme.

Moreover, the batched scheduling scheme described herein may automatically reduce the ratio of cold to warm containers. In detail, a cold container is only cold for the first action (e.g., a function) in the batch and is warm for the remaining actions in the batch. Further, fewer cold containers are built to accommodate the functions, reducing the ratio of cold to warm containers. As noted above, a function may not be delayed for more than a threshold duration based on the latency constraint, and at that point, whatever batch the function is within, is pushed towards execution.

Figure 16B:
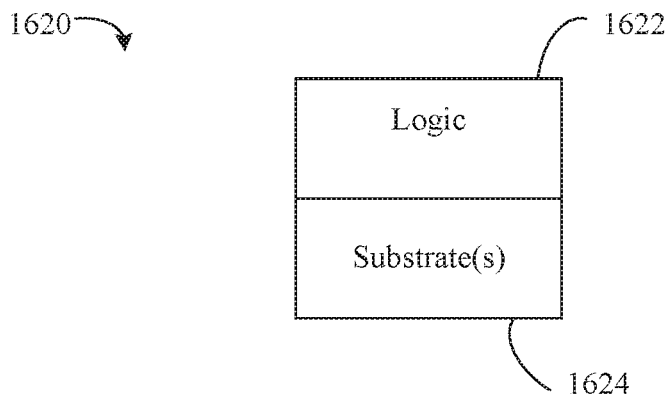
FIG. 16B is an illustration of an example of a semiconductor package apparatus according to an embodiment.

Turning now to FIG. 16B, an embodiment of a semiconductor package apparatus 1620 may include one or more substrates 1624, and logic 1622 coupled to the one or more substrates 1624, where the logic 1622 is at least partly implemented in one or more of configurable logic and fixed-functionality hardware logic. The logic 1622 coupled to the one or more substrates 1624 may be configured to receive a plurality of function requests that each request execution of a respective function, and determine batchable function request from the plurality of function request. In some embodiments, the logic 1622 may be configured to send the batchable function request to a same container. For example, the logic 1622 may be configured to determine that the same container is warm, and in response to a determination that the container is warm, determine that the batchable function requests are to be sent to the same container. In some embodiments, the logic 1622 coupled to the one or more substrates 1624 may include transistor channel regions that are positioned within the one or more substrates 1624.

Embodiments of logic 1622, and other components of the apparatus 1620, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 1620 may implement one or more aspects of the methods 1650, 1670 and 1690 (FIGS. 16C, 16D and 16E), or any of the embodiments discussed herein. In some embodiments, the illustrated apparatus 1620 may include the one or more substrates 1624 (e.g., silicon, sapphire, gallium arsenide) and the logic 1622 (e.g., transistor array and other integrated circuit/IC components) coupled to the substrate(s) 1624. The logic 1622 may be implemented at least partly in configurable logic or fixed-functionality logic hardware. In one example, the logic 1622 may include transistor channel regions that are positioned (e.g., embedded) within the substrate(s) 1624. Thus, the interface between the logic 1622 and the substrate(s) 1624 may not be an abrupt junction. The logic 1622 may also be considered to include an epitaxial layer that is grown on an initial wafer of the substrate(s) 1624.

Figure 16C:
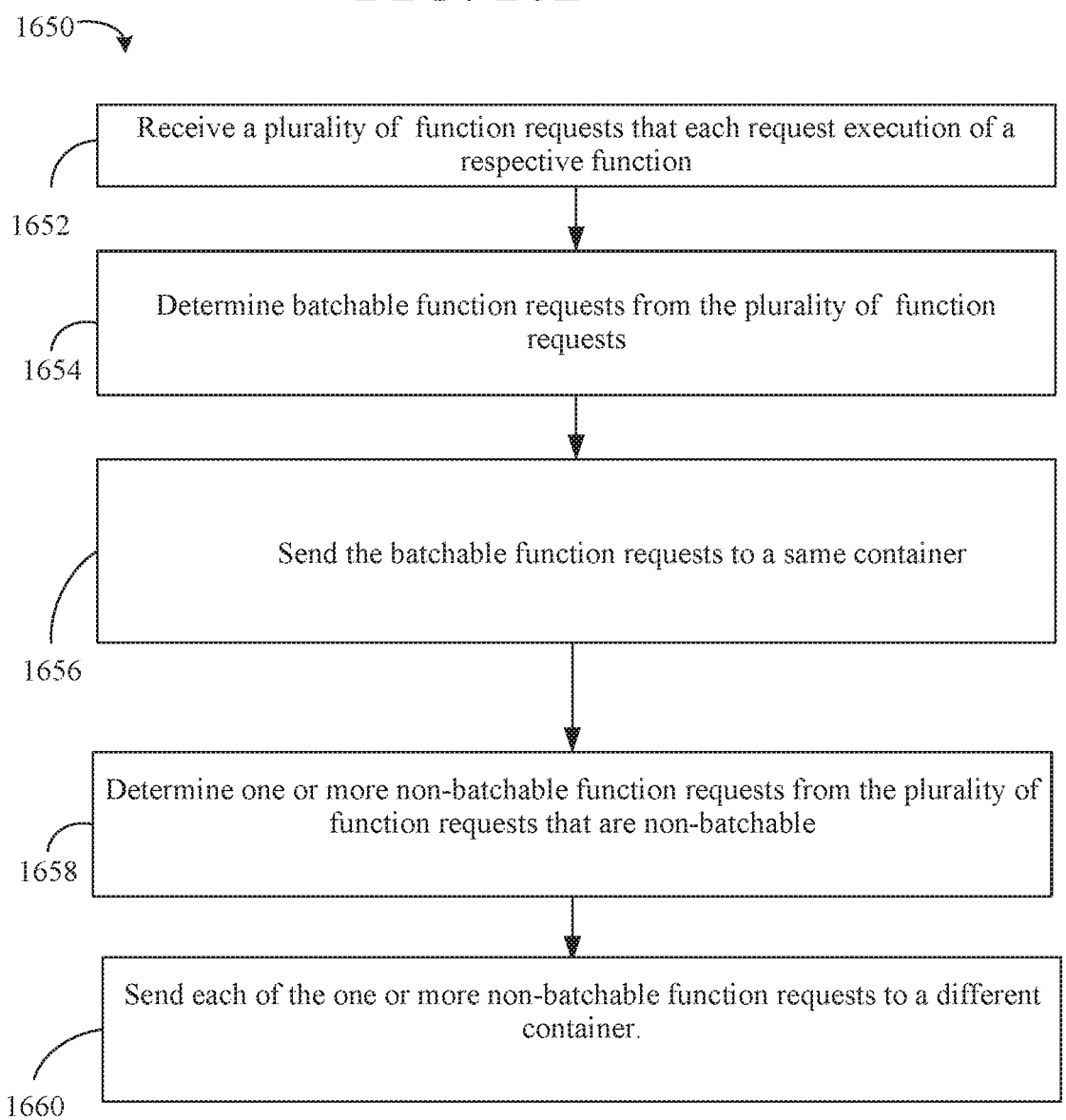
FIG. 16C is a flowchart of batching function requests according to an embodiment.

FIG. 16C shows a method 1650 of batching function requests, and may be executed by the server 1302 of FIG. 13A, but may also, or in conjunction with the server 1302 be implemented in the enhanced FaaS system 400 of FIG. 4 and/or one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

For example, computer program code to carry out operations shown in the method 1650 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 1652 may receive a plurality of function requests that each request execution of a respective function. Illustrated processing block 1654 may determine batchable function requests from the plurality of function requests. Illustrated processing block 1656 may send the batchable function requests to a same container. Illustrated processing block 1656 may further determine that the same container is warm, and determine that the batchable function requests are to be sent to the same container based on the same container being warm.

Illustrated processing block 1658 may determine one or more non-batchable function requests from the plurality of function requests that are non-batchable. Illustrated processing block 1660 may send each of the one or more non-batchable function requests to a different container.

Figure 16D:
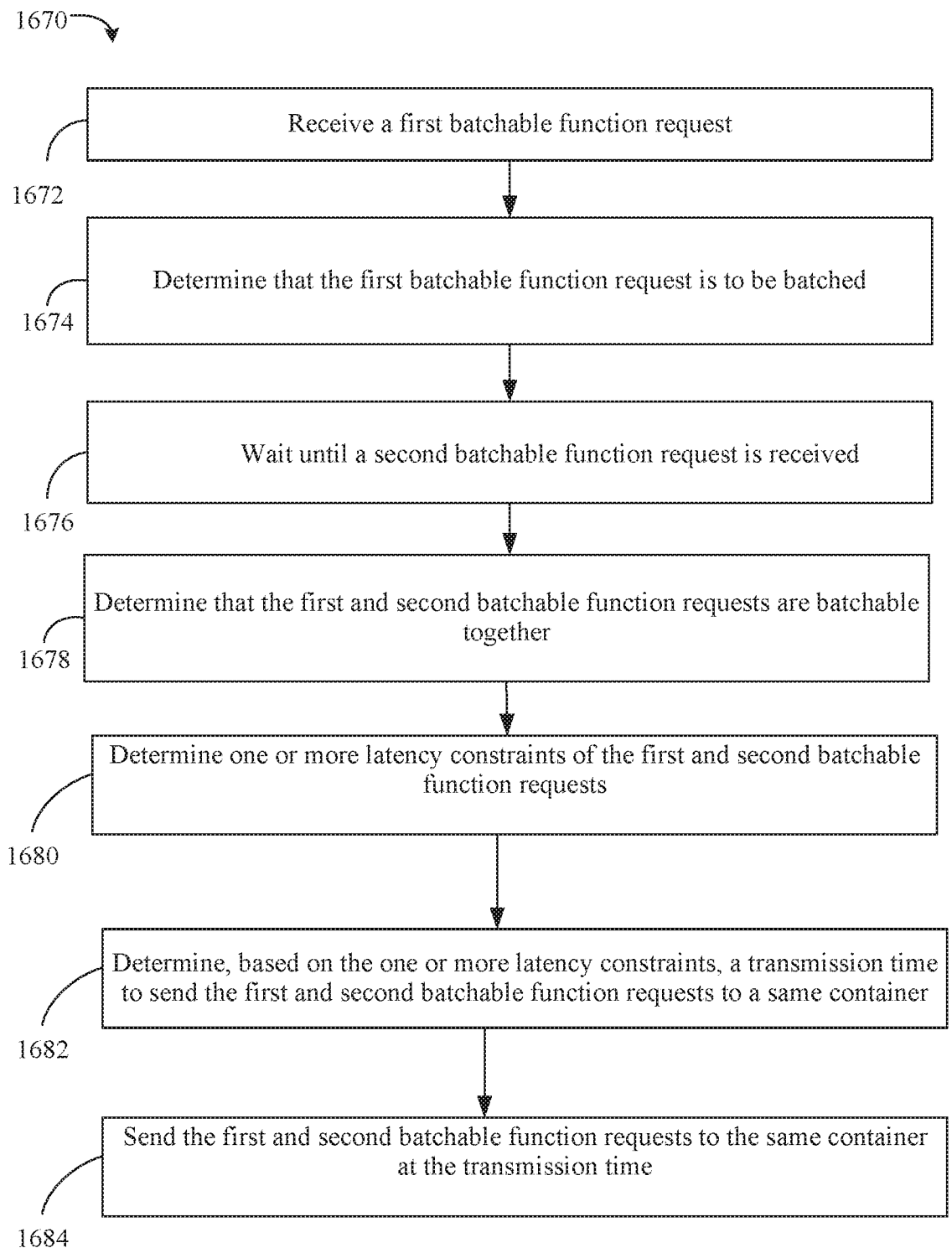
FIG. 16D is a flowchart of batching two or more function requests according to an embodiment.

FIG. 16D shows a method 1670 of batching two or more function requests, and may be executed by the server 1302 of FIG. 13A, but may also, or in conjunction with the server 1302 be implemented in the enhanced FaaS system 400 of FIG. 4 and/or one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 1672 may receive a first batchable function request. Illustrated processing block 1674 may determine that the first batchable function request is to be batched. Illustrated processing block 1676 may wait until a second batchable function request is received. That is, the first batchable function request may not be immediately sent to a container for execution and/or scheduled. Rather, method 1670 may wait for other function requests to be received so as to effectively batch function requests together for execution prior to scheduling. Illustrated processing block 1678 may determine that the first and second batchable function requests are batchable together. Illustrated processing block 1680 may determine one or more latency constraints of the first and second batchable function requests. As already described herein, the latency constraint may reflect a requested time at which functions invoked by the first and second batchable function requests should complete execution. Illustrated processing block 1682 may determine, based on the one or more latency constraints, a transmission time to send the first and second batchable function requests to a same container. In detail, the transmission time may ensure that the first and second batchable function requests conform to the one or more latency constraints or complete execution by the requested time. Illustrated processing block 1684 may send the first and second batchable function requests to the same container at the transmission time.

In some embodiments, illustrated processing blocks 1680, 1682 may occur simultaneously with or prior to one or more of illustrated processing blocks 1674, 1676, 1678. For example, the latency constraint of the first batchable function request may be identified simultaneously with block 1674. Further, illustrated processing block 1674 may determine, based on the latency constraint of the first batchable function request, that the first batchable function request is non-urgent and may wait for other functions requests. Moreover, illustrated processing block 1676 may wait for the other functions for a period of time that conforms with the latency constraint of the first batchable function request.

Figure 16E:
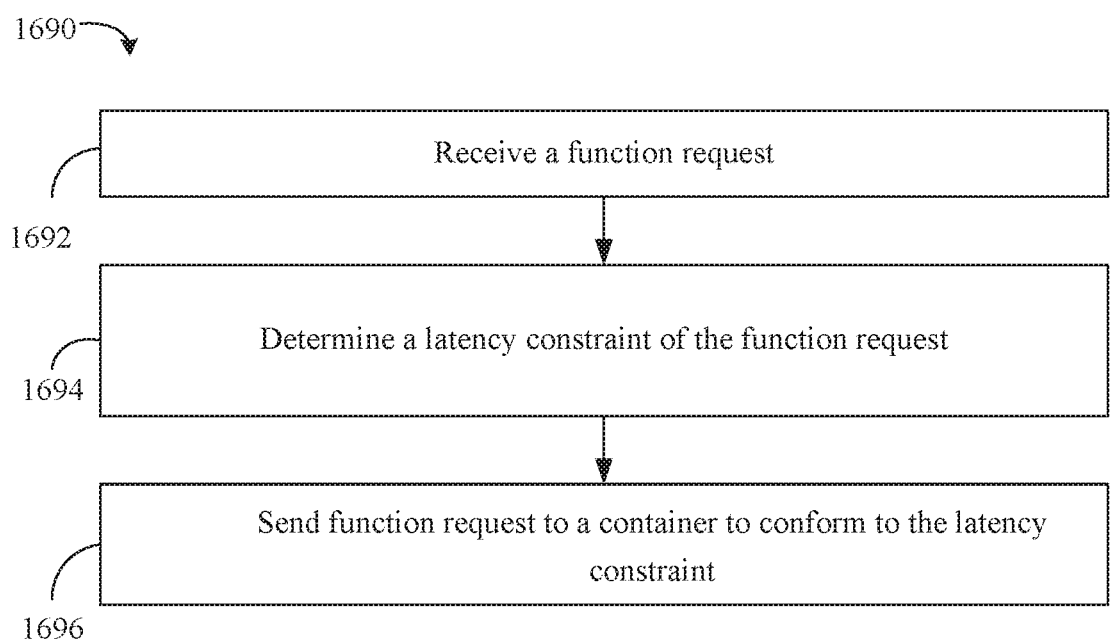
FIG. 16E is a flowchart of scheduling function requests according to an embodiment.

FIG. 16E shows a method 1690 of scheduling a function request to conform to a latency constraint, and may be executed by the server 1302 of FIG. 13A, but may also, or in conjunction with the server 1302 be implemented in the enhanced FaaS system 400 of FIG. 4 and/or one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 1692 receives a function request. For example, an orchestrator may receive the function request and schedule the function request. Illustrated processing block 1694 may determine a latency constraint of the function request. As described above, the latency constraint may reflect a total acceptable latency for a function invoked by the function request. The latency constraint may be a numerical measure (e.g., 5 ms) and/or an absolute time (e.g., 2:48 EST) reflecting a preferred completion timing of the function. In some embodiments, the latency constraint may be dependent on another function request. For example, the function may operate on data from another function, and therefore the latency constraint may reflect that the function should complete execution within a predetermined amount of time of a completion of the other function. In some embodiments the latency constraint may reflect that the function of the function request is to be executed as soon as possible without waiting for batching.

Illustrated processing block 1696 may send the function request to a container to conform to the latency constraint. The function request may be batched with other function requests. Thus, the function request and the other function requests may be sent to the container. In some embodiments, the function request may not be batched if the function request cannot share a container, or the latency constraint does not permit time for batching.

Additional Notes and Examples

Example 1600 includes at least one computer readable medium, comprising a set of instructions, which, when executed by a computing device, cause the computing device to receive a plurality of function requests that each request execution of a respective function, determine a plurality of batchable function requests from the plurality of function requests, receive a first batchable function request from the plurality of batchable function requests, determine that the first batchable function request is to be batched, wait until a second batchable function request from the plurality of batchable function requests is received, determine that the first and second batchable function requests are batchable together, determine one or more latency constraints of the first and second batchable function requests, determine, based on the one or more latency constraints, a time to send the first and second batchable function requests to a same container, send the plurality of batchable function requests to the same container at the determined time, determine that the same container is warm, determine that the plurality of batchable function requests are to be sent to the same container based on the same container being warm, determine one or more non-batchable function requests from the plurality of function request calls that are non-batchable, and send each of the one or more non-batchable function requests to a different container, wherein the functions of the batchable function requests are to be executed in serial, parallel or in a hybrid serial and parallel scheme.

Example 1601 includes at least one computer readable medium, comprising a set of instructions, which, when executed by a computing device, cause the computing device to receive a plurality of function requests that each request execution of a respective function, and determine a plurality of batchable function requests from the plurality of function requests.

Example 1602 includes the least one computer readable medium of Example 1601, comprising a further set of instructions, which, when executed by a computing device, cause the computing device to send the plurality of batchable function requests to a same container.

Example 1603 includes the at least one computer readable medium of Example 1602, comprising a further set of instructions, which, when executed by a computing device, cause the computing device to determine that the same container is warm, and determine that the plurality of batchable function requests are to be sent to the same container based on the same container being warm.

Example 1604 includes the at least one computer readable medium of Example 1601, comprising a further set of instructions, which, when executed by a computing device, cause the computing device to receive a first batchable function request from the plurality of batchable function requests, determine that the first batchable function request is to be batched, wait until a second batchable function request from the plurality of batchable function requests is received, and determine that the first and second batchable function requests are batchable together.

Example 1605 includes the at least one computer readable medium of Example 1604, comprising a further set of instructions, which, when executed by a computing device, cause the computing device to determine one or more latency constraints of the first and second batchable function requests, determine, based on the one or more latency constraints, a time to send the first and second batchable function requests to a same container, and send the first and second batchable function requests to the same container at the determined time.

Example 1606 includes the at least one computer readable medium of Example 1601, comprising a further set of instructions, which, when executed by a computing device, cause the computing device to determine one or more non-batchable function requests from the plurality of function request calls that are non-batchable, and send each of the one or more non-batchable function requests to a different container.

Example 1607 includes the at least one computer readable medium of Example 1601, wherein the functions of the batchable function requests are to be executed in serial, parallel or in a hybrid serial and parallel scheme.

Redundant Function Implementation

Figure 17A:
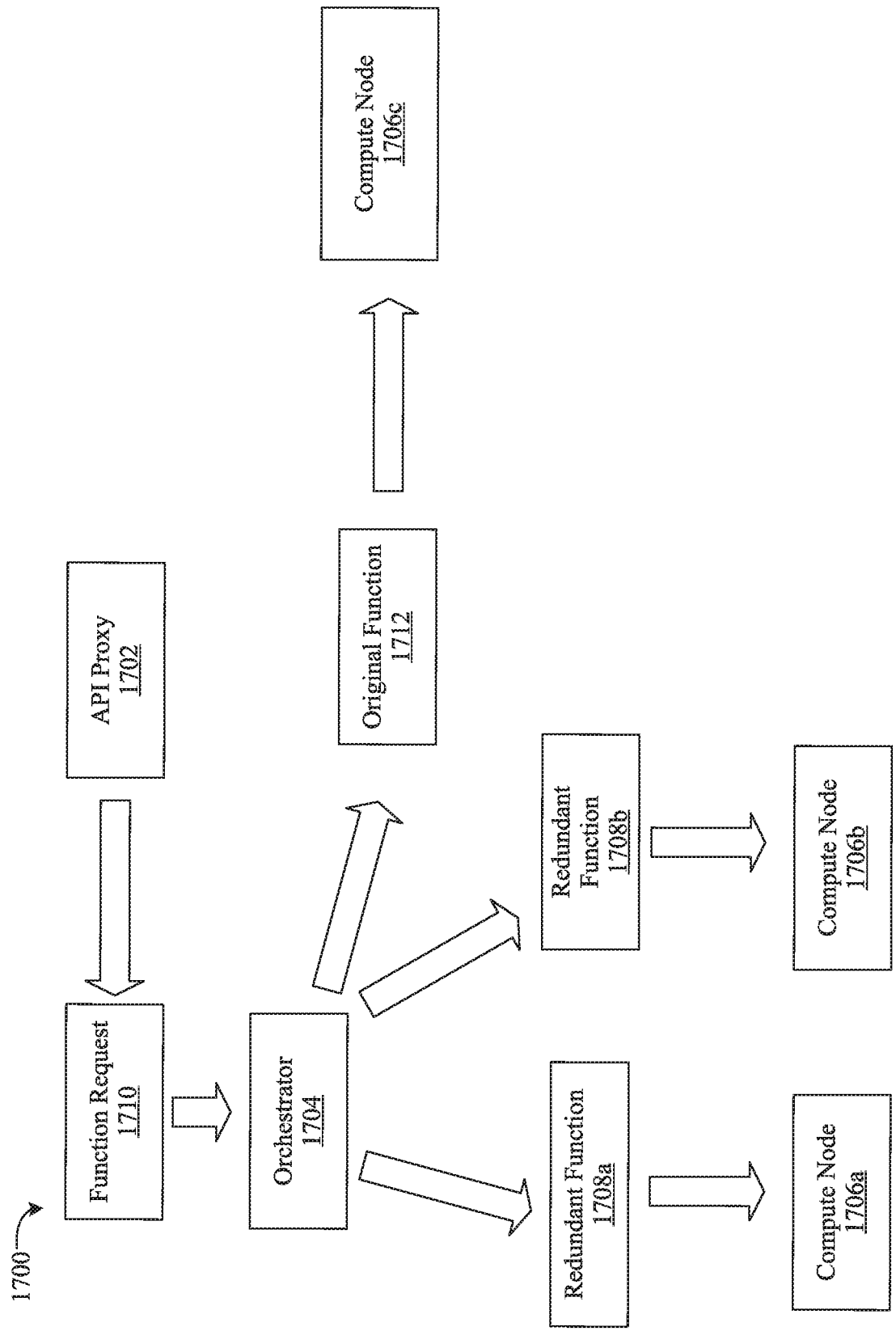
FIG. 17A is an example of redundant function implementation according to an embodiment.

Turning now to FIG. 17A, an example of redundant functions implementation 1700 is shown in which a function request 1710 is handled by an orchestrator 1704 of a FaaS system, for example the FaaS system 400 of FIG. 4.

In some cases, a function may time out due to many factors (e.g., crashing of computing node) and never complete. For example, upon being triggered, an original function 1712 may pass through a series of operations (e.g., authentication, authorization, prelaunch resource availability etc.) in which an orchestrator 1704 may identify and assign a compute node 1706c to the original function 1712. Different platforms however, may have unique characteristics (e.g., virtualization layers, etc.) and resources that may be unknown and opaque to a client of the FaaS service that requested the original function 1712. For example, the original function 1712 may find itself running on a warm container of computing node 1706a with sufficient unsubscribed resources to facilitate timely execution. In other cases, the original function 1712 may execute on a cold container of the compute node 1706a that is also running on a busy platform without sufficient resources to facilitate execution. Moreover, the original function 1712 may further consume other services whose performance is also variable. As a result, there may be limited certainty that the original function 1712 will indeed proceed into execution, complete execution, and further that the original function 1712 will complete in a timely fashion.

For example, the original function 1712 may not dispatch if the original function 1712 exceeds available resources (e.g., dynamic restrictions on memory). Further, the original function 1712 may not dispatch in a timely fashion, or once dispatched, it may unclear whether the original function 1712 will complete execution within the permitted time limit.

In some cases, the original function 1712 may complete, but requires multiple serial retries. Thus, the original function 1712 may be respawned several times, one after another, until the original function 1712 finally completes. Doing such serial retries at the client is both expensive and difficult to assure completion since the client may have no control over the factors that result in success or failure. Testing for successful outcome and retrying also complicates the programming at the requestor.

Some functions may be deemed to have a high requirement for success, and therefore a risk of non-completion or delayed completion may be unacceptable. As discussed below, the orchestrator 1704 may mitigate the possibility of non-completion or delayed completion by redundant function execution across multiple compute nodes 1706a-1706c. For example, redundant functions 1708a, 1708b of the original function 1712 may be spawned and execute at different nodes 1706a, 1706b.

As illustrated in FIG. 17A, an event handling API proxy 1702 may route event calls to functions. In the example of 1700, the API proxy 1702 may generate a function request 1710 via an API for example. The function request call 1710 may be provided to the orchestrator 1704. The function request 1710 may be a request to execute the original function 1712. The orchestrator 1704 may analyze the function request 1710. In detail, the orchestrator 1704 may determine whether to provide redundant function execution. Such a determination may be based on whether the original function 1712 meets a quality threshold. The quality threshold may be based on a user request (e.g., a token, a class, etc.), quality of service (QoS) metrics, or a service-level agreement.

In the example of FIG. 17A, the orchestrator 1704 may determine that the original function 1712 meets the quality threshold, and therefore that the possibility of non-completion or untimely completion of the original function 1712 is to be mitigated through a redundant function execution scheme. The redundant function execution scheme may include spawning redundant functions 1708a, 1708b. In one example, each of the redundant functions 1708a, 1708b may be identical copies of the original function 1712, however, implementations of the original function 1712 may be optionally particularized for slower but guaranteed execution at 1708a, 1708b, etc. For example, this may be accomplished by using different iteration strategies including predictive, proactive, and reactive measures based on available levels of dynamic utilization of resources critical for the execution of a guaranteed function. For example, a 128 MB function can be run on a container provisioned with 256 MB of RAM. function could be run on a container provisioned with 256 MB of RAM. As another example, a function could be run with a longer timeout.

As illustrated, the original function 1712 and the redundant functions 1708a, 1708b may be provided to different compute nodes 1706a-1706c. Therefore, the possibility of a function time out or non-completion may be mitigated. As such, there is an enhanced reliability through an increased likelihood that one of the redundant functions 1708a, 1708b and the original function 1712 completes successfully in a predetermined amount of time.

Once one of the original function 1712 and the redundant functions 1708a, 1708b completes execution, the orchestrator 1704, or another mechanism, may cancel execution of the non-completed ones of the original function 1712 and the redundant functions 1708a-1708b. Thus, resources may be managed efficiently through the cancellation.

In some embodiments, the function request 1710 may include a field which specifies whether a function should be guaranteed. Thus, a user, such as a client, of the FaaS architecture may be able to specify when a function should be guaranteed. In some embodiments, the orchestrator 1704 may include a white list of functions that are guaranteed, and spawn multiple copies of those functions during execution.

In some embodiments, the redundant functions 1708a, 1708b may have non-overlapping execution with the original function 1712. For example, the compute node 1706c may provide a progress report of the execution of the original function 1712. The progress report may indicate a number of completed operations, a currently executed line of code of the original function 1712, etc. If the progress report indicates that the original function 1712 is delayed or may time-out, the orchestrator 1704 may spawn the redundant functions 1708a, 1708b at a time after the original function 1712 began execution.

In some embodiments, the orchestrator 1704 may determine a resource requirement that may be needed for the execution of the original function 1712. The orchestrator 1704 may determine the resource requirement based on available measures of dynamic utilization of resources. In some embodiments, historical information such as that gathered from various telemetry sources, e.g. from timers, function or debug logs, and performance monitors, may be used to estimate the execution time and/or resource requirements for each function, which may then be used to inform scheduling of future invocations of functions. For more detail, see the discussion of FIG. 24A and FIG. 41A. The orchestrator 1704 may determine, based on the resource requirement, whether to spawn the redundant functions 1708a, 1708b. For example, the redundant functions 1708a, 1708b may be spawned in response to an identification that the compute node 1706c may lack sufficient resources or cannot meet the resource requirement to complete execution of the original function 1712. For example, when originally scheduled, the compute node 1706c may have sufficient resources to execute the original function 1712.

If, however, the compute node 1706c degrades in terms of resources, the compute node 1706c may lack sufficient resources to execute original function 1712. For example, if the compute node 1706c needs to throttle due to overheating, or a newer, higher priority function is assigned to compute node 1706c which forces a reallocation of resources, the available resources for the execution for the original function 1712 may decrease. In some embodiments, an identification may be made that the original function 1712 will require a specific amount of resources that exceeds a threshold, and therefore may be difficult to maintain on a particular server, such as the compute node 1706c. In some embodiments, each of the original function 1712 and redundant functions 1708a-1708b may be scheduled by the orchestrator 1704 to begin execution at a same time. For example, the original function 1712 and the redundant functions 1708a, 1708b may be scheduled to execute in response to an identification that the original function 1712 meets the quality threshold, so as to begin execution at approximately a same time or as soon as possible for each of the original function 1712 and the redundant functions 1708a, 1708b. The redundant functions 1708a-1708b and the original function 1712 may have overlapping execution times.

In some embodiments, the redundant functions 1708a, 1708b may be scheduled to execute only if the original function 1712 fails to complete execution. For example, the orchestrator 1704 may determine that the original function 1712 has failed to complete execution and meets the quality threshold. Therefore, the orchestrator 1704 may determine that that multiple redundant copies of the original function 1712 should be spawned as redundant functions 1708a, 1708b to mitigate a second non-completion occurrence.

Furthermore, the API Proxy 1702 or orchestrator 1704 may identify the importance of the original function 1712 based on specified parameters. The specified parameters may be set by an administrator or a client that specifies different types of iteration strategies for different functions in order to obtain a degree of certainty. As described above, such strategies may include predictive, proactive, and reactive measures based on available measures of dynamic utilization of resources needed for the execution of the original function 1712. Once the original function 1712 runs to completion, the orchestrator 1704 may cancel, drop or kill the redundant function 1708a, 1708b in whatever stage of execution the redundant function 1708a, 1708b may be in, therefore saving unnecessary consumption of resources. Therefore, the orchestrator 1704 may enhance FaaS function implementation by mitigating the possibility that functions fail and ensuring that a function will execute in a timely fashion.

Figure 17B:
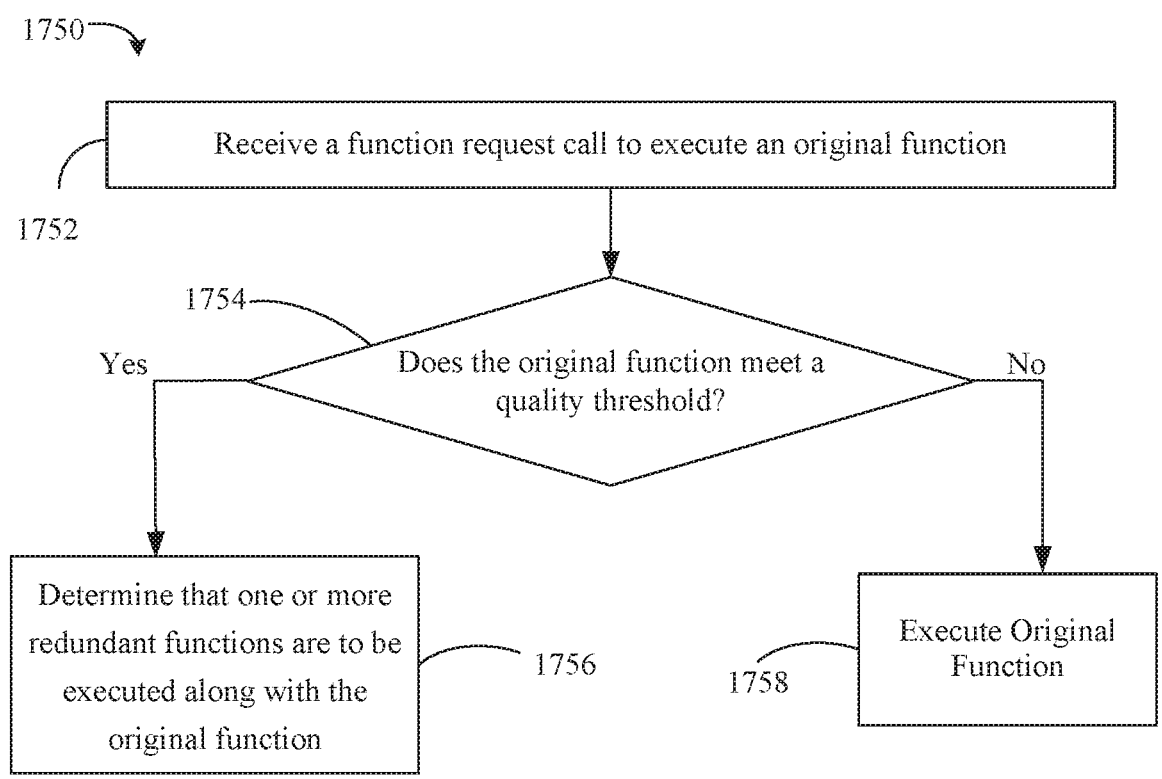
FIG. 17B is a flowchart of redundant function implementation according to an embodiment.

FIG. 17B shows a method 1750 of redundant FaaS function implementation, and may be executed by the server 1302 of FIG. 13A, but may also, or in conjunction with the server 1302 be implemented in the enhanced FaaS system 400 of FIG. 4 and/or the orchestrator 1704 of the FIG. 17A and/or one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 1752 may receive a function request call to execute an original function. The function request call may originate from an application or a user device for example. Illustrated processing block 1754 may determine whether the original function meets a quality threshold. If not, only the original function may be executed. That is, redundant functions may not be spawned. If so however, the illustrated processing block 1756 may determine that one or more redundant functions are to be executed along with the original function. Each of the one or more redundant copies may be an identical copy of the original function. Illustrated processing block 1756 may include executing the original function and the one or more redundant copies at overlapping times at different compute nodes. Further, illustrated processing block 1756 may further include beginning execution of the original function at a first time, and beginning the execution of the one or more redundant copies at a second time after the first time. In some embodiments, the original function and the one or more redundant copies may be executed at non-overlapping times. In some embodiments, the one or more redundant copies may begin execution in response to an identification that the original function fails to meet one or more of a progress threshold or a resource requirement.

Additional Notes and Examples

Example 1700 includes at least one computer readable medium, comprising a set of instructions, which, when executed by a computing device, cause the computing device to receive a function request call to execute an original function, determine whether the original function meets a quality threshold, in response to the original function meeting the quality threshold, determine that one or more redundant functions of the original function are to be executed along with the original function, wherein each of the one or more redundant functions are a copy of the original function, execute the original function and the one or more redundant functions at overlapping times, execute the original function and the one or more redundant functions at different compute nodes, begin execution of the original function at a first time, and begin the execution of the one or more redundant functions at a second time after the first time, and begin execution of the one or more redundant functions in response to an identification that the original function fails to meet a progress threshold or a resource requirement.

Example 1701 includes at least one computer readable medium, comprising a set of instructions, which, when executed by a computing device, cause the computing device to receive a function request call to execute an original function, determine whether the original function meets a quality threshold, and in response to the original function meeting the quality threshold, determine that one or more redundant functions are to be executed along with the original function, wherein each of the one or more redundant functions are a copy of the original function.

Example 1702 includes the at least one computer readable medium of Example 1701, comprising a further set of instructions, which, when executed by a computing device, cause the computing device to execute the original function and the one or more redundant functions at overlapping times.

Example 1703 includes the at least one computer readable medium of Example 1701, comprising a further set of instructions, which, when executed by a computing device, cause the computing device to execute the original function and the one or more redundant functions at different compute nodes.

Example 1704 includes the at least one computer readable medium of Example 1701, comprising a further set of instructions, which, when executed by a computing device cause the computing device to begin execution of the original function at a first time, and begin the execution of the one or more redundant functions at a second time after the first time.

Example 1705 includes the at least one computer readable medium of Example 1701, comprising a further set of instructions, which, when executed by a computing device, cause the computing device to begin execution of the one or more redundant functions in response to an identification that the original function fails to meet a progress threshold or a resource requirement.

Iterative Execution of FaaS and/or AFaaS Functions

Some tasks may trigger iterative execution of FaaS and/or AFaaS functions. While FaaS is referenced below, it will be understood that AFaaS functions may be similarly executed.

FaaS functions may investigate different spaces or areas of concern. For example, a bid matching task may explore various combinations of offers to try to find one that has the most favorable terms. The various combinations may be explored through iterative FaaS functions. As an example, a FaaS function may need to iterate repeatedly to execute a bid matching process. For instance, if terms of an offer contain a clause that requires an alteration in the bid, or to outbid other offers, one or more functions may need to operate iteratively. As another example, in artificial intelligence enabled edge services, an inference may not be identified as a solution until the inference has an associated confidence metric that falls within an acceptable risk criterion.

In some cases, iterative execution may be supported by making the iteration control dynamically scriptable or variable to account for the various dynamic conditions described above, as the conditions for completing an iterative task are likely to be dynamically specified. Thus, FaaS functions in certain contexts operate iteratively with a dynamic control. Iterative FaaS functions may however sometimes needlessly continue to operate without reaching the dynamic conditions for completion. For example, suppose there are two search spaces, each being explored by different FaaS functions. After some amount of time, it may become apparent that one of the FaaS functions is exploring a search subspace that is unlikely to produce a viable solution. Having such a FaaS function needlessly operate is inefficient in that the FaaS function consumes resources which may be allocated to other FaaS functions that are more likely to produce a viable solution. Moreover, the FaaS function may not reach a termination condition (for example, a viable solution) and continue to operate until time is reached. Therefore, latency is increased and resources are inefficiently allocated.

A search space may be a viable region of solutions or answers over which a search scheme or procedure may explore for possible solutions or answers that satisfy the search criteria. For example, a search space may be used to describe an overall collection of possibilities, parameters, algorithms, schemes, value or access or time constraints over which searches may be considered viable. In one particular example, for a supercomputer playing chess, the search space may be very large, but for a program running on a laptop or a tablet disconnected from cloud, the search space may be constrained in depth of evaluation, time to evaluate, or the numbers of alternative moves to evaluate, etc. While a search space is referenced above, a "solution space" is referenced below, in which a search space is an example of a solution space. A solution space may be space within which a solution is to be identified Turning to FIGS. 18A and 18B, an enhanced scheduler 1820 is provided to generate a function generation graph 1800 for FaaS service. The enhanced scheduler 1820 may cancel or reprioritize resource allocations to solution spaces of the function generation graph 1800 based on conditions being met, for example a probability that a solution space (e.g., particular set of explorations) is unlikely to produce a viable solution. Doing so may enhance resource allocations and decrease a timing to find a solution from a viable solution space that is viable and close to optimal.

Figure 18A:
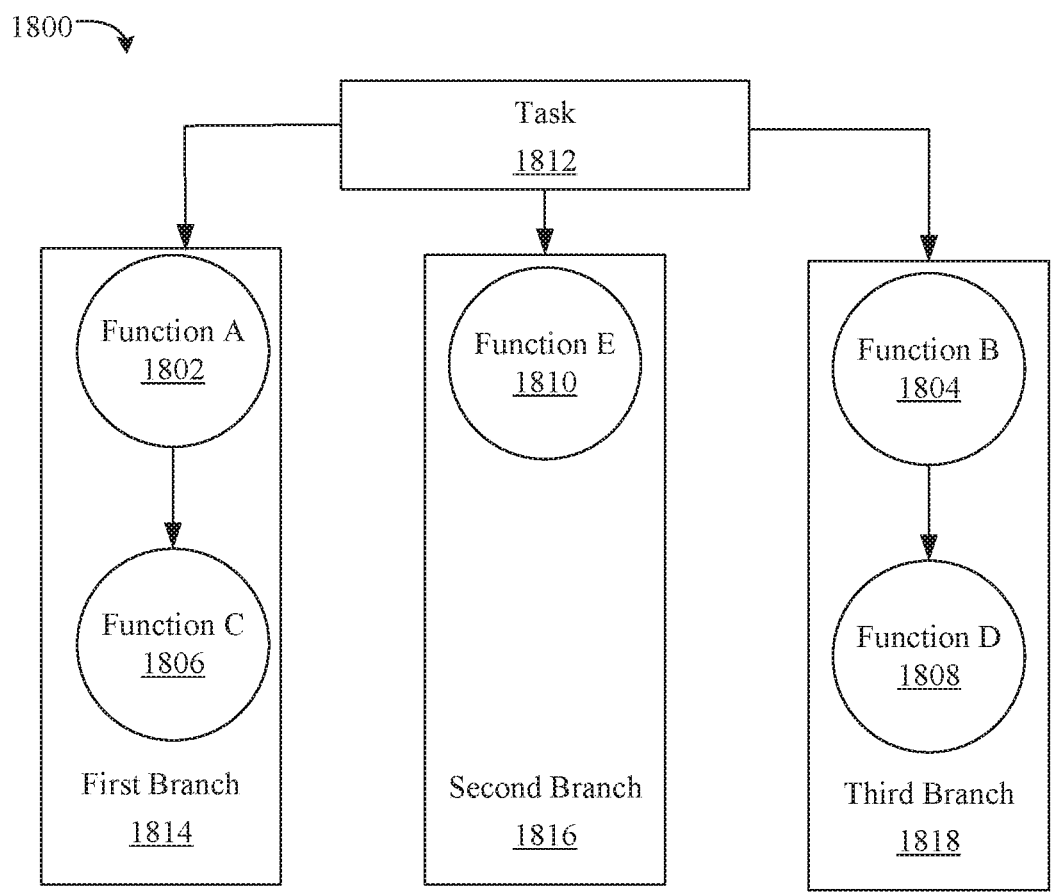
FIG. 18A illustrates a function generation graph representing a scheduler for FaaS according to an embodiment.
Figure 18B:
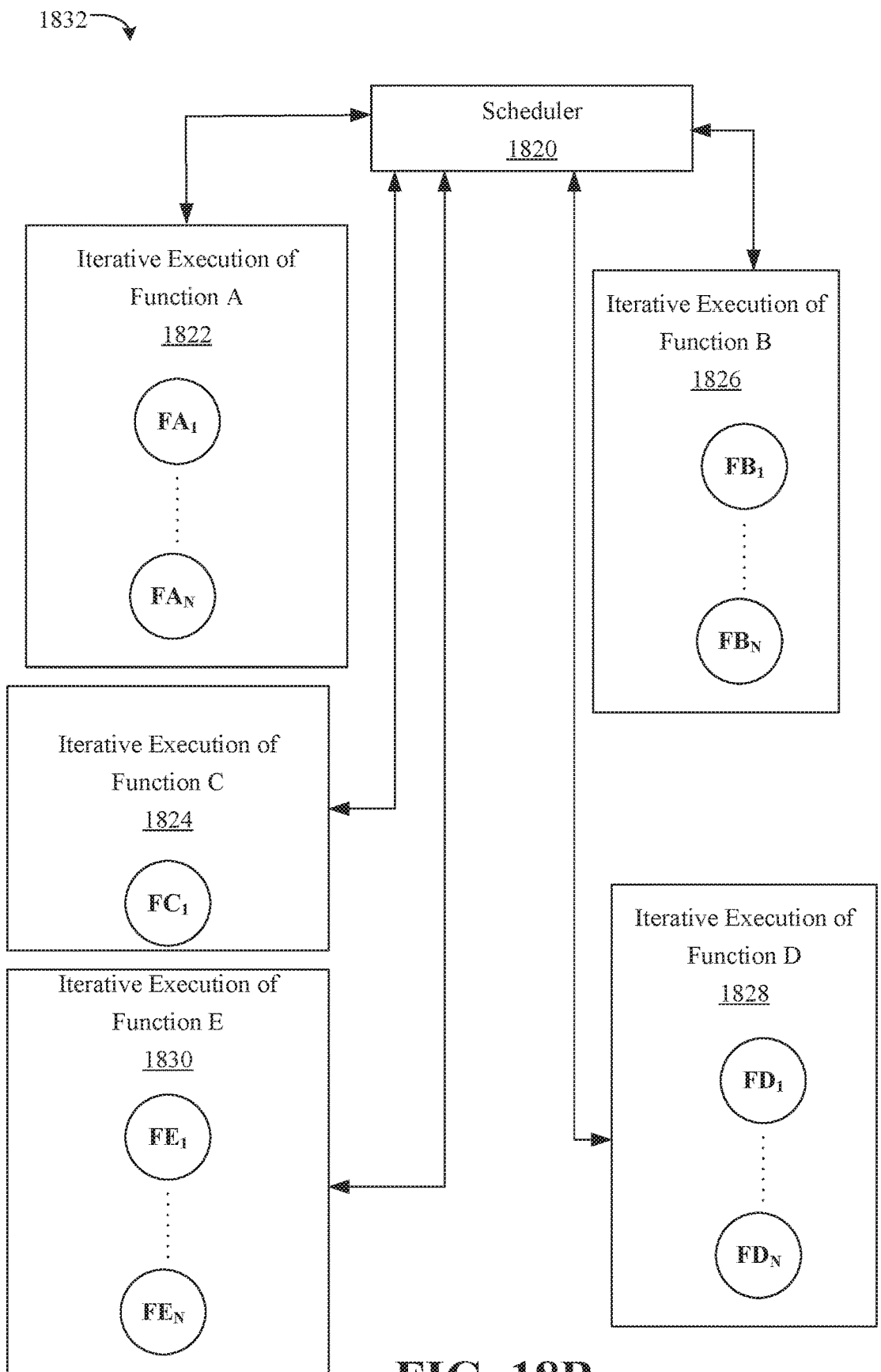
FIG. 18B illustrates an enhanced FaaS system with a scheduler according to an embodiment.

FIG. 18A illustrates the function generation graph 1800. The scheduler 1820 (as shown in FIG. 18B) may include various hardware or software implementations that generate the function graph 1800 and implement the various scheduling, canceling and reprioritization meta-tasks for executing the function graph 1800 towards finding a sufficiently valuable solution. For example, the scheduler 1820 may be a branch and bound operation built using thread building blocks; or it may be a SQL query optimizer, etc. A task 1812 may spawn function A 1802, function B 1804, function C 1806, function D 1808 and function E 1810. Function A 1802, function B 1804, function C 1806, function D 1808 and function E 1810 may be collectively referred to as "spawned functions" for brevity in the following description.

The function generation graph 1800 is a data representation of a schedule with the spawned functions operating in parallel or serially. The spawned functions may be disparate but related functions. Function C 1806 may depend on data from Function A 1802 to execute, and therefore is dependent on Function A 1802. As such, function A 1802 and function C 1806 may be considered a first branch 1814 of the function generation graph 1800. Likewise, Function D 1808 may depend on data from Function B 1804 to execute, and therefore is dependent on Function B. Function B 1804 and function D 1808 may be considered a third branch 1818 of the function generation graph 1800. Function E 1810 may not need data from another function to operate. Function E 1810 may be considered a second branch 1816 of the function generation graph 1800. Each of the first, second and third branches 1814, 1816, 1818 may include at least one iterative function, and be considered a separate solution space and/or exploration possibility for a potential solution or outcome. To be considered complete, the task 1812 may only adopt the best possible solution or outcome from one of the first, second and third branches 1814, 1816, 1818.

As illustrated, the first, second and third branches 1814, 1816, 1818 may be separate but related to each other. That is, the first, second and third branches 1814, 1816, 1818 may represent different search solution spaces or areas of iterative exploration. The first, second and third branches 1814, 1816, 1818 may operate independently, for example by not sharing information to execute, and therefore may be considered separate. The first, second and third branches 1814, 1816, 1818 may be related however in that one of the first, second and third branches 1814, 1816, 1818 may cause a deprioritization or cancellation of itself or another of the first, second and third branches 1814, 1816, 1818.

For example, if one branch of the first, second and third branches 1814, 1816, 1818 reaches a cancellation condition (which may be considered a deprioritization condition), the scheduler 1820 may terminate the one branch. In another example, a resources allocation to a branch of the first, second and third branches 1814, 1816, 1818 may be modified by the scheduler 1820 and based on the deprioritization condition being reached. For example, if the scheduler 1820 identifies that one branch of the first, second and third branches 1814, 1816, 1818 has a significantly less probability of success than another branch of the first, second and third branches 1814, 1816, 1818, the deprioritization condition may be deemed to be met. Further, the scheduler 1820 may reduce a resource allocation to the one branch and increase a resource allocation to the other branch.

For example, each solution space may represent different solutions. As the solution space narrows or reduces in search size, the number of potential solutions correspondingly decreases, implying that a solution may be achieved within a bounded amount of computational effort or time. If one branch of the first, second and third branches 1814, 1816, 1818 reduces a solution space (narrows down possible choices for a solution) over iterations, that one branch may be trending for success. In contrast, if another branch of the first, second and third branches 1814, 1816, 1818 increases a solution space (increases possible choices for a solution) or maintains a same solution space size, the other branch may be trending towards failure and/or may be producing alternative solutions to explore after exhausting the possibility that a currently prioritized exploration leads to a solution. The other branch may therefore reach the deprioritization condition based on the trend towards failure. In some embodiments, a comparison of solution space sizes (solution choices) may cause a deprioritization condition to be reached. For example, if one solution space of one branch of the first, second and third branches 1814, 1816, 1818 has reduced at a faster rate over iterations than another solution space of another branch of the first, second and third branches 1814, 1816, 1818, the other branch may be deemed to meet a deprioritization condition.

In particular, one of the spawned functions may reach a deprioritization condition as described above. The deprioritization condition may indicate that one or more of the first, second and third branches 1814, 1816, 1818 may be deprioritized. Deprioritized may mean that the one or more of the first, second and third branches 1814, 1816, 1818 is deemed to be exploring an area or space that is unlikely to produce a viable solution to a problem addressed by the task, or is likely to require more resources or time than some other spawned function. If the scheduler 1820 deprioritizes one branch of the first, second and third branches 1814, 1816, 1818, then less resources may be allocated to the one branch, or the one branch may be suspended/terminated/unwound by suspending/terminating/unwinding any spawned function comprising the one branch. The deprioritization condition may be when one of the spawned functions identifies a termination condition, thus resulting in termination of the one spawned function or another spawned function. Thus, efficient resource allocation may be achieved by avoiding execution of functions that are less important or irrelevant for the task.

For example, suppose function D 1808 reaches a deprioritization condition. The third branch 1818 may be terminated, which may include ceasing execution of Function D 1808 and/or Function B 1804. In some embodiments, a resource allocation to the third branch 1818 is reduced rather than terminating the third branch 1818. For example, a resource allocation to the function D 1808 and/or function B 1804 may be reduced. In some embodiments, the deprioritization condition may be identified through a value produced by the function D 1808, a confidence interval of a solution produced by the function D, a measurement of likelihood of success by the function D, whether function D is approaching a potential solution and so forth.

As illustrated in FIG. 18B, an enhanced FaaS system 1832 may include the scheduler 1820. As already described, the scheduler 1820 may generate the function generation graph 1800 of FIG. 18A, schedule according to the function graph 1800 and cancel spawned functions accordingly.

In detail, the scheduler 1820 may schedule and monitor execution of the spawned functions according to the function generation graph 1800. Iterative execution of function A 1822, iterative execution of function B 1826, iterative execution of function C 1824, iterative execution of function D 1828 and iterative execution of function E 1830 respectively correspond to function A 1802, function B 1804, function C 1806, function D 1808 and function E 1810 of FIG. 18A.

The scheduler 1820 may identify the deprioritization condition (e.g., a termination condition) during execution of the function generation graph 1800 and stop or suspend execution based on the deprioritization condition. For example, the scheduler 1820 may terminate or suspend one or more of the spawned functions and stop and/or pause any further function instantiations of the spawned functions. The scheduler 1820 may utilize hardware queue manager and multi-casting to do so.

In detail, iterative execution of function A 1822 includes $FA_1$-$FA_n$, which are iterations of function A 1802. Iterative execution of function A 1822 may complete, and then iterative execution of function C 1824 may begin. Likewise, iterative execution of function B 1826 may complete and iterative execution of function D 1828 may begin. In some embodiments, simultaneous execution may be performed. For example, iterative execution of function A 1822 may occur concurrently with iterative execution of function C 1824. Further, iterative execution of function B 1826 may be concurrent with iterative execution of function D 1828.

During iterative execution of function C 1824, the scheduler 1820 may identify a deprioritization condition that terminates iterative execution of function C 1824. Such a deprioritization condition may include an identification that the first branch 1814, and in particular function C 1806, is unlikely to produce a viable solution. Thus, iterative execution of function C 1824 only executes for one iteration $FC_1$. After cancellation or suspension of iterative execution of function C 1824, the resources allocated to the iterative execution of function C 1824 may be reallocated to other executions. For example, iterative execution of function E 1830 may have an increased resource allocation and/or iterative execution of function D 1828 may have an increased resource allocation.

In some embodiments, rather than cancelling iterative execution of function C 1824, the scheduler 1820 may reduce the resource allocation of iterative execution of function C 1824. In some embodiments, the scheduler 1820 may redistribute resource allocations from iterative execution of function C 1824 to iterative execution of function E 1830 and/or iterative execution of function D 1828. In some embodiments, the resources may be reallocated to one or more of the spawned functions based on a probability that the one or more of the spawned functions have a greatest opportunity for success, and/or a greater opportunity for success relative to others of the spawned functions that still continue to execute. Doing so may decrease the latency of the iterative execution of function E 1830 and/or iterative execution of function D 1828, and moreover decrease the latency of identifying a solution for the task. The latency of iterative execution of function C 1824 may increase, however, but may be considered an acceptable trade-off given the lower probability of success presented by iterative execution of function C 1824.

In some embodiments, the iterative execution of function C 1824 may be reprioritized. For example, the iterative execution of function C 1824 may be reprioritized if a reprioritization condition is met, so that iterative execution of function C 1824 is resumed and/or has an increased resource allocation. For example, the reprioritization condition may be an indication that iterative execution of function C 1824 is more likely to produce a viable outcome than others of the spawned functions. In some embodiments, the reprioritization condition may be an identification that another spawned function, for example iterative execution of Function D 1828, has a decreased probability of success.

In some embodiments, the iterative execution of the spawned function occurs at different nodes and/or containers. For example, iterative execution of Function A 1822 may occur at different nodes and/or different containers. $FA_1$ may execute in a first container at a first node, while $FA_N$ may execute at a second container at a second node.

As already described, the scheduler 1820 may reduce latency and have enhanced resource management as described above by terminating spawned functions and/or reducing resource allocations to less successful solution spaces. For example, resources are deallocated efficiently in response to an identification of a deprioritization condition.

Iterative execution control may be dynamically scriptable or variable, as the conditions for completing an iterative task are likely to be dynamically specified. Thus, the scheduler 1820 may explore different strategies which are represented by the first, second and third branches 1814, 1816, 1818, and in particular the spawned functions of the first, second and third branches 1814, 1816, 1818. The first, second and third branches 1814, 1816, 1818 may be different search strategies that are determined according to dynamic hints, recent observed patterns and shifts in patterns, variations in constraints, etc.

For example, the scheduler 1820 may identify the best inference within a finite amount of time and power budget at any given time. To do so, the scheduler 1820 may use low precision strategies if a time window is sufficiently small or fails to meet a threshold, and/or if the compute budget is sufficiently small or fails to meet a threshold. After exploring the first, second and third branches 1814, 1816, 1818 as illustrated in FIG. 18B, the scheduler 1820 may use higher precision for later iterations after having eliminated a solution space such as the first branch 1814 described above. Thus, the scheduler 1820 may initiate several parallel, low cost searches through the first, second and third branches 1814, 1816, 1818, and then cancel some the first, second and third branches 1814, 1816, 1818 in response to an identification that others of the first, second and third branches 1814, 1816, 1818 will produce more productive outcomes. As already described, cancellation of a branch of the first, second and third branches 1814, 1816, 1818 may mean cancellation of the spawned function(s) that comprise the cancelled branch.

Thus, the scheduler 1820 may efficiently cancel or reduce resource allocations to deprioritized ones of the iterative execution of function A 1822, the iterative execution of function B 1826, the iterative execution of function C 1824, the iterative execution of function D 1828 and the iterative execution of function E 1830. Deprioritized may mean that the deprioritized iterative function is deemed to be exploring an area or space that is unlikely to produce a viable solution to a problem addressed by the task. For example, some embodiments may include various meta-programming supports for such dynamic iterative launching and canceling of iterative execution of function A 1822, the iterative execution of function B 1826, the iterative execution of function C 1824, the iterative execution of function D 1828 and the iterative execution of function E 1830. If a solution subspace becomes temporarily deprioritized, then the resources of the solution space consumed for exploring it may be automatically deallocated, for example by moving data out of caching tiers until the solution subspace is reprioritized. Further, cancellations of spawned functions may be automatically generated so that resources can be quickly deallocated from less important functions or work, and allocated to other higher priority work or spawned functions.

In some examples, a flexible multi-casting topology is implemented in which data (and events) from one iteration at a spawned function may be automatically moved towards another iteration of the spawned function (or another spawned function) that may or may not occur locally. Thus, the topology enables an efficient communication strategy to cancel or reprioritize spawned functions.

Furthermore, some embodiments may have an enhanced multi-casting topology that generalizes various point-to-point capabilities to meet network functions virtualization performance demands. For example, some embodiments may implement a flexible multicasting topology so that as spawned functions and tasks are spawned in one part of an infrastructure and canceled in another part of the infrastructure, the communication topology adapts with low communication overhead. For example, in edge computing as a requesting mobile client or a mobile target (e.g., a base station or consumer premises equipment) changes location, some embodiments may modify the multicasting arrangements among the different nodes, containers, etc. in an efficient manner to redistribute the corresponding iterative spawned functions.

For example, in some embodiments the scheduler 1820 may identify a location of a mobile client and/or a mobile target. As the mobile client and/or the mobile target shifts locations, the iterative execution of the spawned functions may be moved to different containers and/or nodes to remain within a predetermined distance of the mobile client and/or target. Doing so may decrease communication latencies, and may be achieved through the flexible multi-casting infrastructure described above. Further, the scheduler 1820 may be aware of the containers and/or nodes so that the scheduler 1820 may control execution, resource allocation, and cancellations of the spawned functions. Moreover, capabilities for running meta-programs may further be shifted into hardware, such as hardware queue manager(s), and provided to platform software so that the spawned functions may have swifter execution, and efficient cancelation when needed. An embodiment of a hardware queue manager is a platform hardware feature that may receive control operations or data movement requests for operations from a first of a plurality of entities (e.g., an entity may be a task, a process, a container, a virtual machine, etc.) and perform the requested operations in a second of a plurality of entities (e.g., another task, another process, another container, another virtual machine, etc.), after validating that the requested operation may be performed without violating applicable security policies, and, optionally, without forcing a first requesting entity to wait until the operation has been completed in a second entity.

Figure 18C:
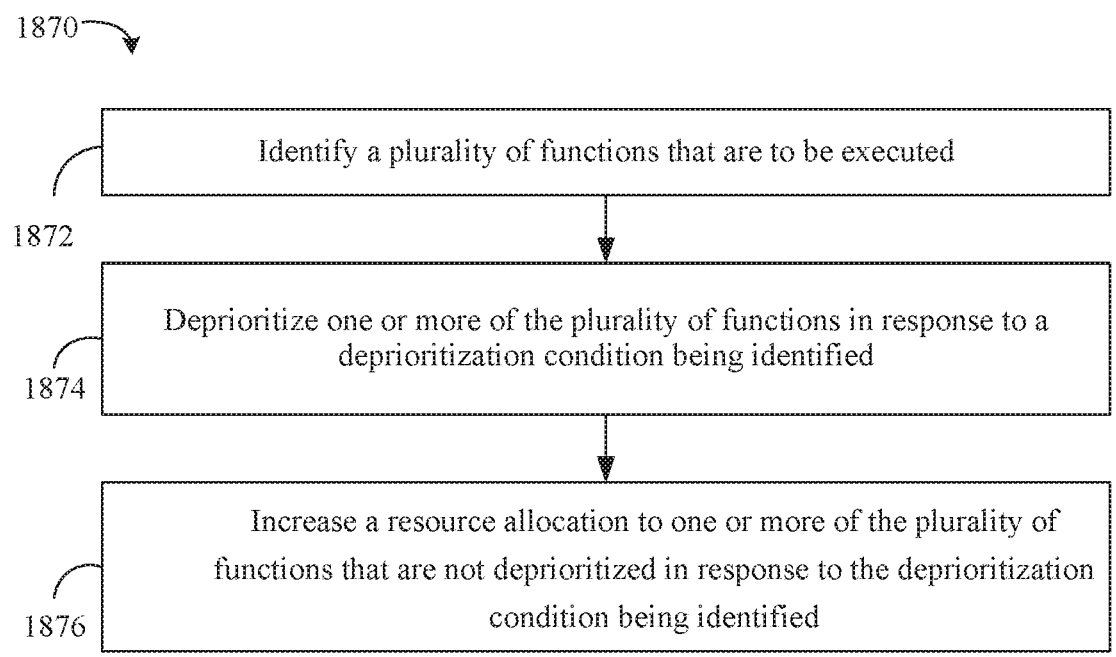
FIG. 18C is a flowchart of FaaS function implementation according to an embodiment.

FIG. 18C shows a method 1870 of FaaS function implementation, and may be executed by the server 1302 of FIG. 13A, but may also, or in conjunction with the server 1302 be implemented in the enhanced FaaS system 400 of FIG. 4 and/or the scheduler 1820 of the FIG. 18B, or one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 1872 may identify a plurality of functions that are to be executed. The plurality of functions may iteratively execute. Illustrated processing block 1874 may deprioritize one or more of the plurality of functions in response to a deprioritization condition being identified. For example, illustrated processing block 1874 cancels execution of the one or more of the plurality of functions in response to the deprioritization condition being identified. Illustrated processing block 1874 may also reduce a resource allocation of the one or more of the plurality of functions in response to the deprioritization condition being identified. Illustrated processing block 1876 may increase a resource allocation to one or more of the plurality of functions that are not deprioritized in response to the deprioritization condition being identified.

The method 1870 may reduce latency and have enhanced resource management as described above by terminating and/or reducing resource allocations to less successful solution spaces, for example the one or more of the plurality of functions. For example, resources are deallocated efficiently in response to an identification of the deprioritization condition as described with respect to illustrated processing block 1874.

Additional Notes and Examples

Example 1800 includes at least one computer readable medium, comprising a set of instructions, which, when executed by a computing device, cause the computing device to identify a plurality of functions that are to be executed, deprioritize one or more of the plurality of functions in response to a deprioritization condition being identified, in response to the deprioritization condition being identified, reduce a resource allocation of the one or more of the plurality of functions or cancel execution of the one or more of the plurality of functions, and increase a resource allocation to one or more of the plurality of functions that are not deprioritized, wherein functions of the plurality of functions are to iteratively execute.

Example 1801 includes at least one computer readable medium, comprising a set of instructions, which, when executed by a computing device, cause the computing device to identify a plurality of functions that are to be executed, and deprioritize one or more of the plurality of functions in response to a deprioritization condition being identified.

Example 1802 includes the at least one computer readable medium of Example 1801, comprising a further set of instructions, which, when executed by a computing device, cause the computing device to cancel execution of the one or more of the plurality of functions in response to the deprioritization condition being identified.

Example 1803 includes the at least one computer readable medium of Example 1802, comprising a further set of instructions, which, when executed by a computing device, cause the computing device to reduce a resource allocation of the one or more of the plurality of functions in response to the deprioritization condition being identified.

Example 1804 includes the at least one computer readable medium of Example 1801, wherein functions of the plurality of functions are to iteratively execute.

Example 1805 includes the least one computer readable medium of Example 1801, comprising a further set of instructions, which, when executed by a computing device, cause the computing device to increase a resource allocation to one or more of the plurality of functions that are not deprioritized.

Enhanced FaaS Architecture with a Common Data Storage

Communication latencies in a FaaS environment may present a significant overhead. For example, some FaaS environments may include thousands of functions, with corresponding data being passed between nodes for long-term storage and/or execution. Functions moreover may be considered "stateless." As such, storage of data, that survives execution of a function that creates the data, may present particular challenges. Some embodiments enhance caching such data for future reuse.

For example, consider a database server that may be a node. The node (database server) may be remote relative to an execution node that executes a function. The database server may store data that the function may utilize for execution. From the execution node, data accesses to the remote database server may be expensive, and as such the data may be moved to the execution node, or to be proximate to the execution node. Such data transfers may be high latency and resource intensive, particularly depending on the nature and size of data. For example, not only is wasteful back-and-forth Input/Output incurred, but the natural format of the data may be modified from an at-rest coding format to an in-use coding format and vice-versa. Thus, marshaling costs are increased and costs for changing between an at-rest and in-use coding formats for the data.

Figure 19A:
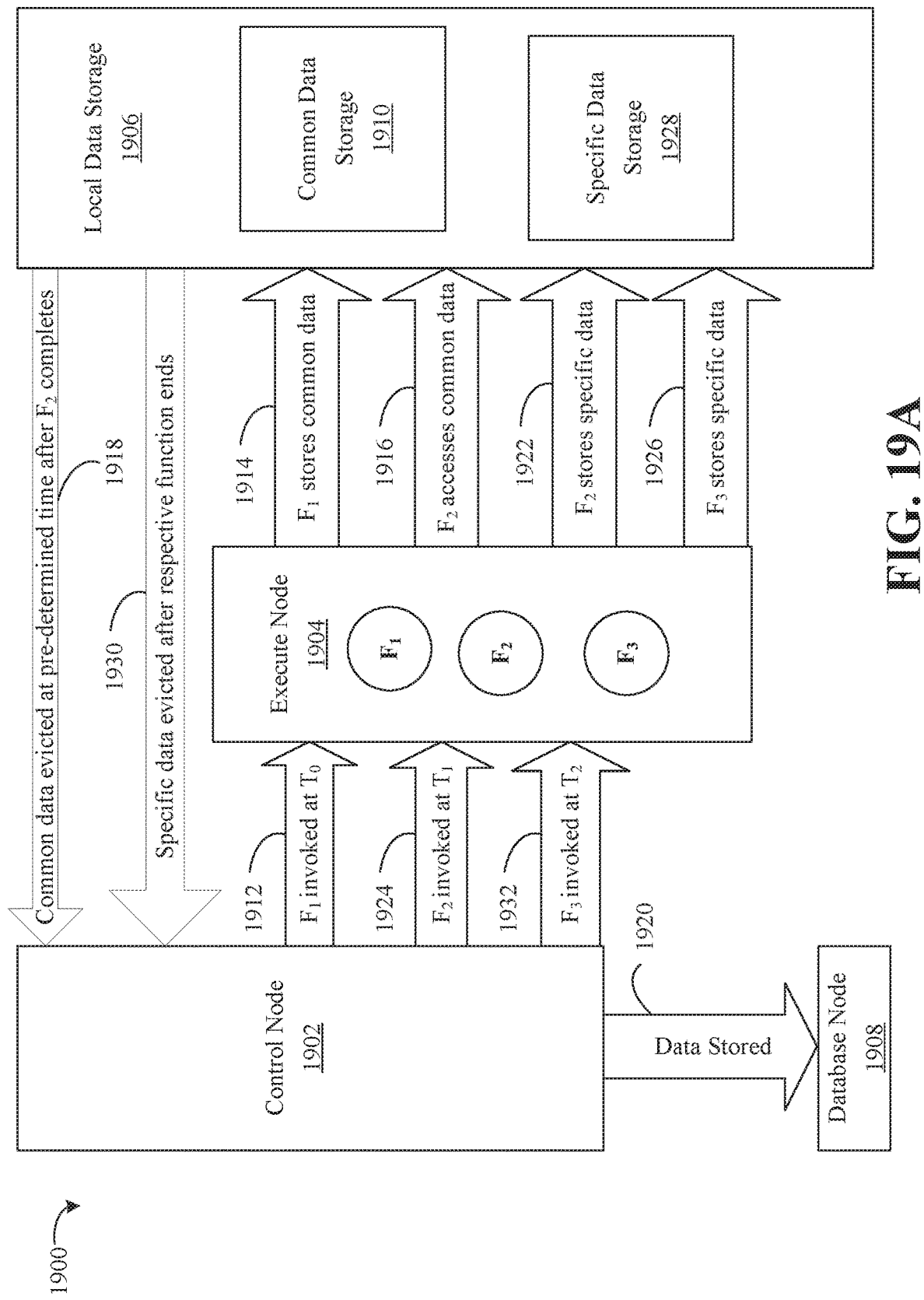
FIG. 19A is an example of an enhanced FaaS architecture with a common data storage according to an embodiment.

Turning now to FIG. 19A an enhanced FaaS architecture with a common data storage 1900 is illustrated. The example 1900 may include the enhanced FaaS system 400 of FIG. 4. Some embodiments may enhance efficiency through utilization of a common data storage 1910 (which may be an ephemeral data storage) to store data for reuse by one or more functions. For example, a function $F_1$ may produce common data that are to be used by other functions. The common data may be stored in the common data storage 1910. After the function $F_1$ completes execution, the common data may remain stored in the common data storage 1910. Thereafter, other functions, such as function $F_2$, may begin execution and access the common data. For example, if the function $F_2$ begins execution after the first function $F_1$ completes execution, the function $F_2$ may be instantiated to a node, such as execute node 1904 that is proximate to and/or includes the common data storage 1910.

Therefore, the common data may remain in the common data storage 1910, rather than being evicted. Moreover, the format of the common data may be encrypted for security reasons, but may be unchanged otherwise. Thus, the above implementation may reduce IO transfers and data coding format modifications, reducing latency and enhancing resource usage.

A control node 1902 may invoke the function $F_1$ at time $T_0$ as indicated by process 1912. The function $F_1$ may execute on node 1904. The node 1904 may be in communication with the local data storage 1906. In some embodiments, the local data storage 1906 may be a part of the execute node 1904. In some embodiments, the local data storage 1906 and the execute node 1904 are part of a same computing device such as a server. As illustrated, the local data storage 1906 includes at least two data storages or partitions, including a common data storage 1910 and specific data storage 1928.

Function $F_1$ may generate data when function $F_1$ executes in a container of the execute node 1904. At least some of the data may be referred to as common data. The common data may be reused by other functions. For example, the control node 1902 may generate a function generation graph, such as the function generation graph 1800 of FIG. 18A. In some embodiments the operation of control node 1902 may be optionally guided by directives received from a programmer or a cloud service provider. The control node 1902 may analyze the function generation graph to determine the interdependencies of functions, and for example whether a function is to operate based on data generated by another function. The control node 1902 may control whether data is stored in the common data storage 1910 or the specific data storage 1928. In some embodiments, the decision whether data is stored in common data storage 1910 or in specific data storage 1928 may be subject to additional input (e.g., hints, directives, etc.) from a programmer or a cloud service provider, and a programmer or a cloud service provider may change these inputs (e.g., hints or directives) from one time to another.

In some embodiments, the control node 1902 may determine that the function $F_2$ will consume data generated by function $F_1$. Thus, the control node 1902 may pass a command or message to execute node 1904 that at least some of the data generated by function $F_1$ is common data. For example, when function $F_1$ is invoked at $T_0$, the control node 1902 may instruct the execute node 1904 to store data generated by the function $F_1$ as common data. In some embodiments, only a subset of data (e.g., final calculations or conclusion data) of function $F_1$ may be considered to be common data, rather than all of the data of function $F_1$. The subset of data may be data which is identified as being usable by the function $F_2$. Other data, which is identified as not being usable by function $F_2$, may be discarded.

Execute node 1904 may instantiate the function $F_1$, and allocate data storage from the common data storage 1910. The function $F_1$ may therefore store the common data as indicated by process 1914 in the common data storage 1910. After function $F_1$ completes execution, rather than sending the common data to control node 1902, the common data may remain in common data storage 1910. For example, rather than immediately removing common data from the common data storage 1910, the common data may remain stored in the common data storage 1910.

The common data may be given a time-to-live policy, which describes a time-to-live for the common data. The time-to-live may be extended by other functions accessing the common data. The time-to-live may be extended by a fixed amount (or by a variable amount as determined from policies or heuristics based on past history), each time a new function accesses the common data. In some embodiments the common data may be subject to a maximum time-to-live after which the common data will be automatically evicted from at least the common data storage 1910, and further evicted from the local data storage 1906. If the common data remains not accessed after function $F_1$ completes execution, then the common data may be evicted to the control node 1902 after the time-to-live expires, and without any adjustment to the time-to-live. The local data storage 1906 and/or the execute node 1904 may enforce the time-to-live policy.

In some embodiments, the time-to-live policy may be balanced against security requirements. For example, if the local data storage 1906 is maintained in an edge device that may be easily compromised through physical intrusion, the time-to-live may be set to a low value. Furthermore, if the common data has a high security requirement, the time-to-live may be set to a low value.

Furthermore, the function $F_1$ and/or local data storage 1906 may encrypt the common data. By doing so, security may be enhanced so that the common data may only be accessed by authorized functions.

The function $F_1$, execute node 1904, and/or local data storage 1906 may generate a descriptor (unique identifiers, etc.) that describes where the common data is stored, and whether the common data is encrypted. Furthermore, if the common data is encrypted for security purposes, the descriptor may include a decryption protocol to access the common data. For example, the descriptor may include a decryption key to decrypt the common data. The descriptor may be provided to the control node 1902, which may pass the descriptor to other functions as appropriate.

After function $F_1$ completes execution, the control node 1902 may invoke function $F_2$ at time $T_2$ as indicated by process 1924. The execute node 1904 may execute function $F_2$. Function $F_2$ may receive the descriptor of the common data stored by function $F_1$. The descriptor may accurately describe a location of the common data as well as any appropriate decryption protocols. Function $F_2$ may access the common data, as indicated by process 1916, that is stored in the common data storage 1910 and execute based on the common data. Thus, the time to live for the common data may be increased. Access may mean that function $F_2$ may read, add new common data to the common data and/or over-write the common data. As described above, since the common data is accessed, the time-to-live for the common data is extended by a predefined value. In some embodiments, in place of or in addition to the time-to-live, a reference count may be used to prevent premature eviction of the common data while Function $F_2$ has not reached its completion.

The function $F_2$ may also generate specific data that only function $F_2$ will use. The specific data may be stored, as indicated by process 1922, in a separate partition from the common data storage 1910, such as the specific data storage 1928. The specific data may be automatically evicted from the specific data storage 1928 when the function $F_2$ completes execution as illustrated by process 1930.

Function $F_2$ may complete execution at a time after $T_1$ (the invocation time of $T_1$) but before function $F_3$ is invoked at $T_2$ as indicated by process 1932. The specific data generated by function $F_2$ may be automatically evicted, as indicated by process 1930, to the control node 1902, when the resources dedicated for $F_2$ are reclaimed. The control node 1902 may abandon the specific data without storing the specific data into long term storage, or store the specific data at the database node 1908.

As such, the common data storage 1910 may provide a temporary storage to pass data between functions $F_1$ and $F_2$. Doing so may limit database access (read/writes) to database node 1908 by saving data produced by the function $F_1$ into the common data storage 1910. Furthermore, the enhanced FaaS architecture illustrated in FIG. 19A may have enhanced resource management protocols since less data is passed to between local data storage 1906 and control node 1902, and further reduces a latency of function $F_2$. For example, due to the reduced data movement and Input/Output bandwidth, the function $F_2$ may begin execution with less overhead and without awaiting data transfer of the common data.

The common data storage 1910 may be a local page cache of the execute node 1904 to allow access by function $F_2$. In detail, function $F_2$ executes on execute node 1904 and can therefore access the local page cache of the execute node 1904 in an expedient manner. In some embodiments, the data storage 1910 may be a storage (file or block cache) cache, a transient key value store or a document store that uses some combination of a page cache and a block cache, etc.

The control node 1902 may invoke function $F_3$ at time $T_2$ as illustrated by process 1932. Function $F_3$ begins execution on execute node 1904 and generates specific data. The specific data may be stored by process 1926 into specific data storage 1928. After the function $F_3$ completes execution, or when the container for function $F_3$ is dismantled or reclaimed, the specific data may be evicted by process 1930, and either discarded by the control node 1902 or stored in the database node 1908.

The function $F_3$ may not access the common data stored in the common data storage 1910. As such, the time-to-live of the common data may not be extended, and may expire. Thus, process 1918 may evict the common data at a pre-determined time after function $F_2$ completes. In detail, the common data may be evicted from the common data storage 1910 and sent to the control node 1902. The control node 1902 may modify the common data from an in-use coding format to an at-rest coding format, and then store the common data in process 1920 to the database node 1908. The database node 1908 may be a long-term storage. The common data may also be modified to an at-rest coding format by the local data storage 1906.

In some embodiments, data produced by the functions $F_1$, $F_2$, $F_3$ may be stored in the common data storage 1910 without reference to potential reuse of the data. Thus, the control node 1902 may not analyze a function graph to determine which of the functions $F_1$, $F_2$, $F_3$ may generate data that may be used by other functions $F_1$, $F_2$, $F_3$. Rather, each function $F_1$, $F_2$, $F_3$ may store generated data in the common data storage 1910. The data may be treated similarly to as described above, and may be encrypted and evicted from the common data storage 1910 after a corresponding time-to-live expires.

Figure 19B:
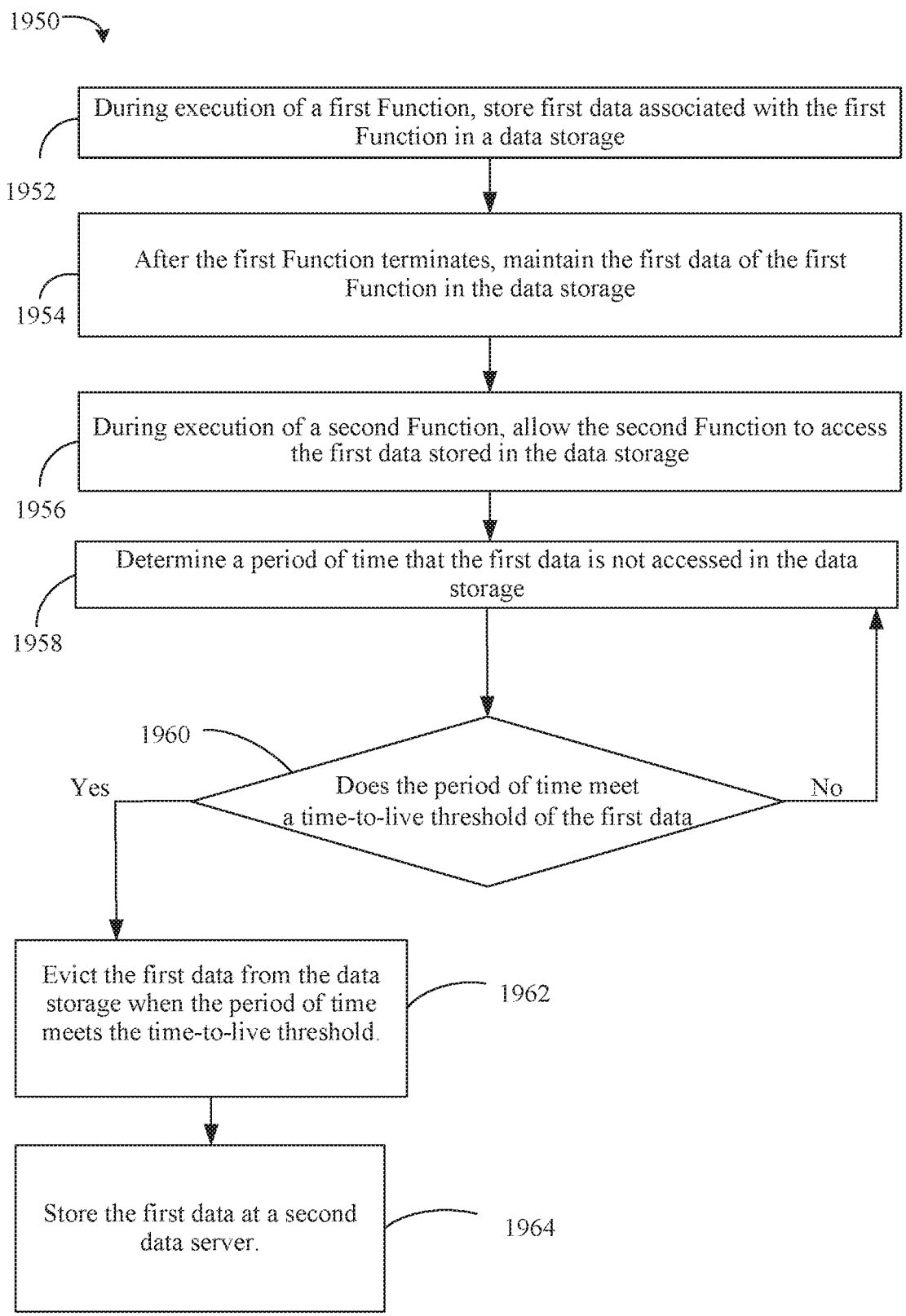
FIG. 19B is a flowchart of an exemplary FaaS data storage according to an embodiment.

FIG. 19B shows a method 1950 of using common data storage generated by one or more FaaS functions, and may be implemented by the enhanced FaaS system 400 of FIG. 4 and/or one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 1952 may, during execution of a first function, store first data associated with the function in a data storage, where the first data will be used by one or more other functions. For example, the first data may be stored in a cache of the data storage, where the data storage is accessible to one or more other functions. Illustrated processing block 1954 may, after the first function terminates, maintain the first data of the first function in the data storage. For example, the first data may not be evicted in response to an identification that the first function has completed execution. Illustrated processing block 1956 may, during execution of a second function, allow the second function to access the first data stored in the data storage. For example, the second function may receive a descriptor indicating the location of the first data, and any security protocols needed to access the first data. Any methods to create descriptors to reference data may be used. For example, a descriptor may include an indication the data to be referenced is stored at a particular location, and may be generated (e.g., by a memory controller) when the data is stored. The descriptor may further include or indicate a location of metadata associated with the first data, where the metadata is to include applicable decryption keys for decrypting the first data if the first data is encrypted, applicable verification codes for verifying the first data if the first data is fingerprinted, decompression codes for decompressing the first data if the first data is compressed, etc. Thus, the first data may be stored in the data storage while the first and second functions access the data storage. As described above, doing so may reduce latency and enhance resource management by reducing I/O operations, data transfers and data modifications.

Illustrated processing block 1958 may determine a period of time that the first data is not accessed in the data storage. Illustrated processing block 1960 may determine whether the period of time meets a time-to-live threshold of the first data. If not, illustrated processing block 1958 may repeat to determine a period of time that the first data is not accessed. When the time-to-live threshold is met, illustrated processing block 1962 may evict the first data from the data storage. Eviction of the first data may include deallocating the memory that the first data is stored within, and/or erasing the first data from the data storage. Illustrated processing block 1964 may store the first data at a second data server. The second data server may be a long term database storage server.

Figure 19C:
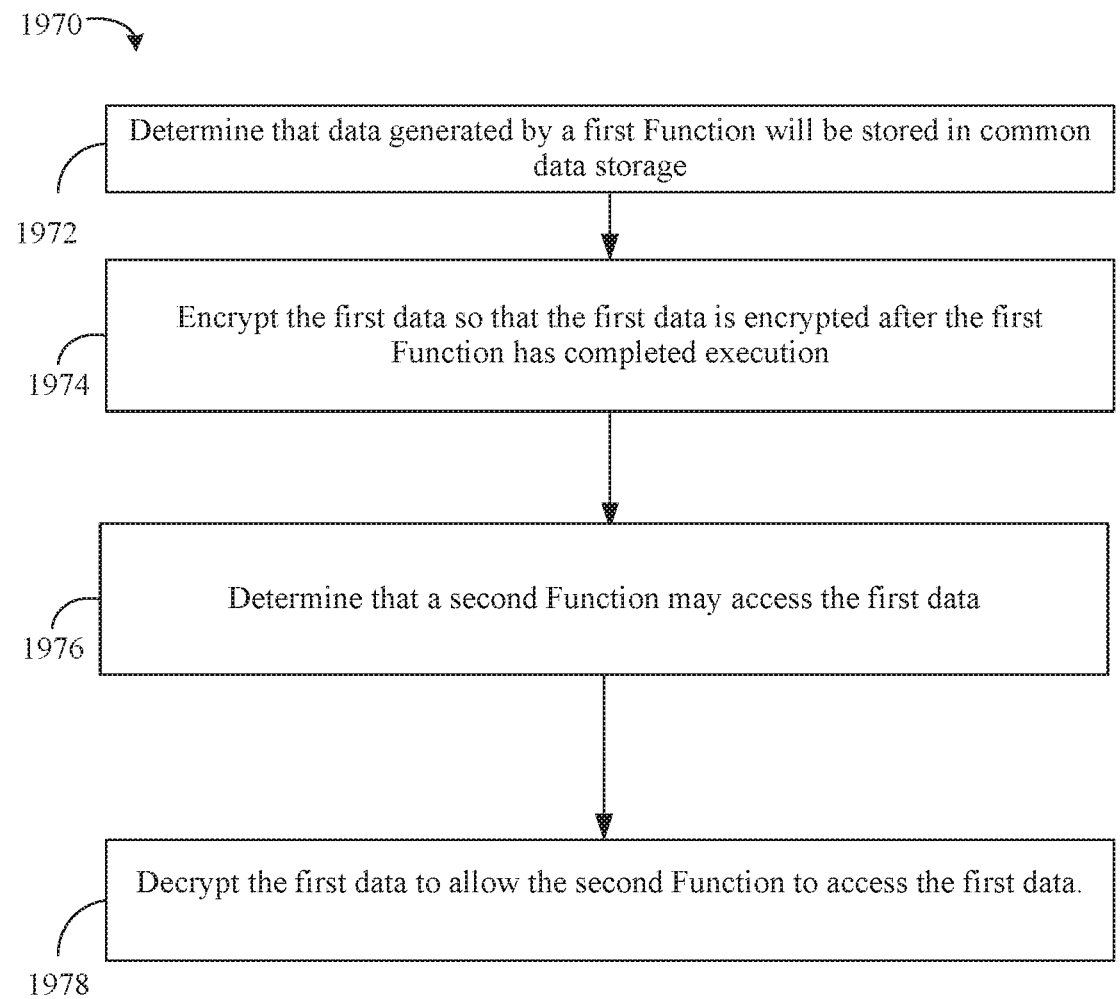
FIG. 19C is a flowchart of an exemplary method of implementing and enforcing FaaS security protocols according to an embodiment.

FIG. 19C shows a method 1970 of implementing and enforcing FaaS security protocols, and may be implemented by the enhanced FaaS system 400 of FIG. 4 and/or one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 1972 may determine that data generated by a first function will be stored in common data storage for access by other functions. Illustrated processing block 1974 may encrypt the first data so that the first data is encrypted after the first function has completed execution. Illustrated processing block 1976 may determine that a second function may access the first data. For example, illustrated processing block 1976 may identify security authorizations of the second function, an origin of the second function instantiation (e.g., a server, service or client that requests execution of the second function), malware analysis of the second function, and/or whether the second function is compatible with the first data. Illustrated processing block 1978 may decrypt the first data to allow the second function to access the first data. The encryption in block 1974 and/or the decryption in block 1978 may be performed by known techniques (e.g., via encryption and decryption keys), using hardware and/or software in the enhanced FaaS system 300 and/or using a combination of hardware and software methods. Thus, method 1970 may enhance security to reduce the potential for malware or third-parties accessing the data.

Additional Notes and Examples

Example 1900 includes at least one computer readable medium, comprising a set of instructions, which, when executed by a computing device, cause the computing device to during execution of a first function, store first data associated with the first function in a data storage, wherein the first data is to be stored in a cache of the data storage, after the first function terminates, maintain the first data of the first function in the data storage, during execution of a second function, allow the second function to access the first data stored in the data storage, determine a period of time that the first data is not accessed in the data storage, determine whether the period of time meets a time-to-live threshold of the first data, evict the first data from the data storage when the period of time meets the time-to-live threshold, in response to the period of time meeting the time-to-live threshold, store the first data at a second data server, pass a descriptor to the second function, wherein the descriptor indicates a location of the first data, and further indicates a location of metadata associated with the first data, wherein the metadata to include one or more of applicable decryption keys for decrypting the first data if the first data is encrypted, applicable verification codes for verifying the first data if the first data is fingerprinted, or decompression codes for decompressing the first data if the first data is compressed, encrypt the first data so that the first data is encrypted after the first function has completed execution, and decrypt the first data to allow the second function to access the first data.

Example 1901 includes at least one computer readable medium, comprising a set of instructions, which, when executed by a computing device, cause the computing device to during execution of a first function, store first data associated with the first function in a data storage, after the first function terminates, maintain the first data of the first function in the data storage, and during execution of a second function, allow the second function to access the first data stored in the data storage.

Example 1902 may include the at least one computer readable medium of Example 1901, comprising a further set of instructions, which, when executed by a computing device, cause the computing device to determine a period of time that the first data is not accessed in the data storage.

Example 1903 includes the at least one computer readable medium of Example 1902, comprising a further set of instructions, which, when executed by a computing device, cause the computing device to determine whether the period of time meets a time-to-live threshold of the first data, and evict the first data from the data storage when the period of time meets the time-to-live threshold.

Example 1904 includes the at least one computer readable medium of Example 1903, comprising a further set of instructions, which, when executed by a computing device, cause the computing device to in response to the period of time meeting the time-to-live threshold, store the first data at a second data server.

Example 1905 includes the at least one computer readable medium of Example 1901, wherein the first data is to be stored in a cache of the data storage.

Example 1906 includes the at least one computer readable medium of Example 1901, comprising a further set of instructions, which, when executed by a computing device, cause the computing device to pass a descriptor to the second function, wherein the descriptor indicates a location of the first data, and further indicates a location of metadata associated with the first data, wherein the metadata to include one or more of applicable decryption keys for decrypting the first data if the first data is encrypted, applicable verification codes for verifying the first data if the first data is fingerprinted, or decompression codes for decompressing the first data if the first data is compressed.

Example 1907 includes the least one computer readable medium of Example 1901, comprising a further set of instructions, which, when executed by a computing device, cause the computing device to encrypt the first data so that the first data is encrypted after the first function has completed execution, and decrypt the first data to allow the second function to access the first data.

Function-as-a-Service environments may have a trade-off between latency and resource overhead. Provisioning a cold container may include large-scale, high-latency data transfers, as well as construction of the container based on the data. Thus, provisioning the cold container may be a high latency operation. In contrast, maintaining a warm container may be a low latency operation since the above data transfers and construction may be avoided. Maintaining the warm container may consume excessive compute resources that remain idle for extended period of time, and have a significant memory footprint. For example, a warm container may remain unutilized and idle while waiting for a function for execution. Further, the warm container may have significant resource allocations to execute an arriving function, while remaining idle and waiting for such a function.

Enhanced FaaS Server Architecture Having Different Modes

Figure 20A:
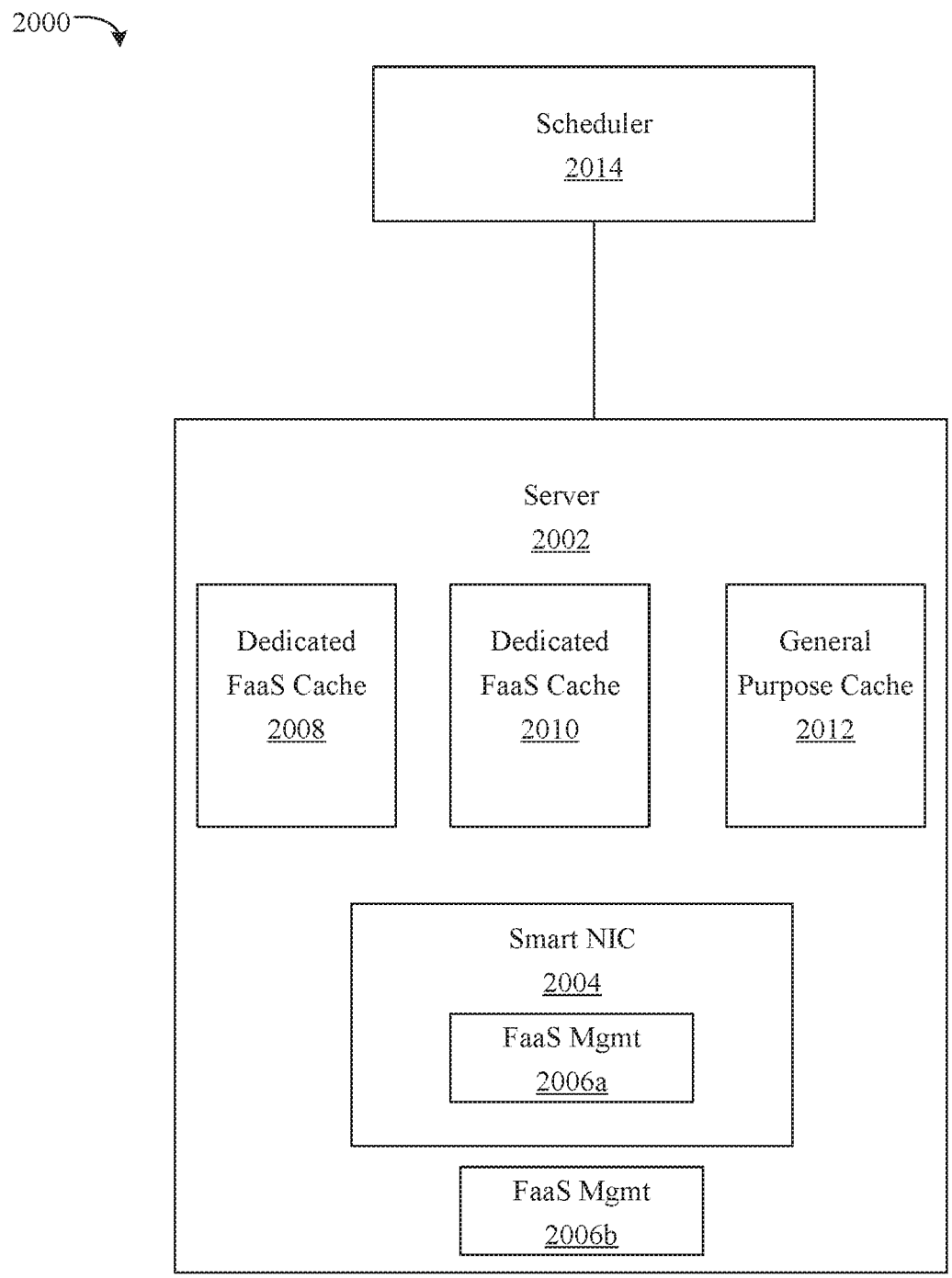
FIG. 20A is a block diagram of an example of an enhanced FaaS server architecture having dedicated FaaS caches according to an embodiment.

FIG. 20A shows an enhanced FaaS server architecture 2000 in which server 2002 includes a smart network interface card (NIC) 2004 that includes FaaS management logic 2006a. In another embodiment, logic 2006a can be implemented in the server architecture 2000 as hardware, for example in a processor, in a baseboard management controller, in an accelerator, and/or an FPGA, etc. Server 2002 may further include FaaS management logic 2006b that operates in conjunction and/or coordination with FaaS management logic 2006a. The FaaS management logic 2006b may be an OS driver or smart middleware of the server 2002. The FaaS management logic 2006a, 2006b may effect a change in the caching policies so that the FaaS server architecture 2000 adapts to a growing FaaS workload by using more memory resources for dedicated FaaS associated data/objects. In some embodiments, the server 2002 may include only one of the FaaS management logic 2006a, 2006b rather than both. So for example only the FaaS Management 2006b may be included to change the caching policies. Such changes may be effected by, for example, programming one or more configuration registers that control caching policies implemented in a general purpose or a special purpose processor. Dedicated caching may also apply to software managed resources such as page caches; accordingly, the operating system and runtime software may subdivide the physical page pool into at least two subpools: one for general use, and one for dedicated FaaS use, with different sizes for the subpools in accordance with whether the system is to operate in dedicated FaaS mode, general purpose mode, or hybrid mode. As such, cache as used with respect to FIGS. 20A-20D may include both software resource caches and hardware caches. It will be understood that both software resource caches and hardware caches are to reflect (either directly or indirectly) access to underlying memory.

The FaaS management logic 2006a, 2006b may determine whether to operate the server 2002 in three or more different modes, including a dedicated FaaS mode, a general purpose mode and a hybrid FaaS mode. In the embodiment illustrated in FIG. 20A, the server 2002 is in the hybrid FaaS mode. In the hybrid FaaS mode, only some of the caches 2008, 2010, 2012 are placed into dedicated FaaS mode, while others are placed in general purpose mode. In a dedicated FaaS mode, each of the caches 2008, 2010, 2012 is dedicated to FaaS mode. The caches 2008, 2010, 2012 may include both software resource caches and hardware caches.

The server architecture 2000 may balance latency and resource considerations through the hybrid and dedicated FaaS modes for a platform (e.g., a server). In the hybrid FaaS mode, one or more caches, such as dedicated FaaS caches 2008, 2010, may be used to save only data objects associated with one or more functions. Alternatively, a dedicated FaaS cache 2008 or 2010 may implement "soft priorities" so that data objects associated with one or more Functions are given greater cache residencies. Such cache residency adjustments may be executed through, for example, employment of different aging policies for data cached by a FaaS Function compared to that cached by ordinary applications. Thus, in some embodiments the dedicated FaaS caches 2008, 2010 may prioritize FaaS data objects over non-FaaS data so that FaaS data objects are more likely to be stored in the dedicated FaaS caches 2008, 2010. In some embodiments, the dedicated FaaS caches 2008, 2010 may store at least some of the data to construct a container. In some embodiments, the dedicated FaaS caches 2008, 2010 may be dedicated to store data of the container that is needed to initialize the container.

Some embodiments may reduce latency for cold container initialization since data transfers between different nodes may be avoided, and container construction may begin based on locally cached data. That is, container and function initialization may be accelerated. As described below, initialization of a function may include construction of the container and starting execution of the function in the container. Initialization and/or construction of the container may include both the construction of function data independent portions that may be cacheable, and the construction of additional, function data specific portions of the container that are not cacheable Some embodiments may employ a "just-in-time" approach to containers. As described above, startup latencies of containers are reduced. When needed, containers may be quickly reinitialized "just-in-time" from the data in the dedicated FaaS caches 2008, 2010 to meet latency requirements of functions. Thus, a "just-in-time" approach to container initialization may be employed to reduce warm container usage since a number of warm containers (e.g., containers that are not executing Functions and awaiting a Function) may be reduced.

Reducing warm container usage may enhance resource allocations through a reduced warm container resource footprint. For example, since, when less or smaller warm containers may be maintained on standby, resources may be freed up and dedicated to active containers (which may be referred to hot containers) that are executing functions. As such, more functions may be supported with fewer resources, complete execution faster through increased resource allocations, and maintain acceptable latency requirements.

As illustrated in FIG. 20A, the server 2002 may include three caches 2008, 2010, 2012. In the hybrid FaaS mode, two of the caches 2008, 2010 may operate as dedicated FaaS caches. The dedicated FaaS caches 2008, 2010 may store initialization data to build one or more containers. The one or more containers may be built locally in the server 2002. Thus, rather than receiving all of the data from a remote node to provision a container, the server 2002 may access the dedicated FaaS caches 2008, 2010. Moreover, the server 2002 may not need to maintain warm containers for some functions, thereby reducing resource allocations of hardware components, such as accelerators, memory, FPGAS, processors and so forth to warm containers. Thus, the server 2002 may support more active (hot) containers and accelerate function execution through enhanced resource allocations and a "just-in-time" container initialization approach.

In some embodiments, the dedicated FaaS caches 2008, 2010 may store only part of a total data set needed to initiate a container. For example, the server 2002 may build several different components of the container in serial order. The initialization data in the dedicated FaaS caches 2008, 2010 may be data to build the beginning components of the container, with data to build the other later components being transmitted to the sever 2002 from a remote node. As such, the container may start a beginning portion of a building process based on the initialization data stored in the dedicated FaaS caches 2008, 2010. Concurrently with the beginning portion of the building process, the server 2002 may receive data for a later portion of the building process from a remote node, and then complete the building process based on the received data.

In some embodiments, the dedicated FaaS caches 2008, 2010 may store only data objects associated with the functions, thereby accelerating the function initialization. For example, the dedicated FaaS caches 2008, 2010 may store only initialization data for containers. Other caches, such as general purpose cache 2012, may store data generated by the function during execution of the function.

The FaaS management 2006a, 2006b may determine when to operate the server 2002 in the dedicated FaaS mode, the general purpose mode or the hybrid FaaS mode. For example, the FaaS management 2006a, 2006b may utilize historical data to determine whether to toggle into the dedicated FaaS mode or the hybrid FaaS mode. For example, the historical data may indicate that the server 2002 has executed a function type a number of times. In detail, the FaaS management 2006a, 2006b may categorize each function into a function type. Functions may be considered to be the same function type if the functions are each executable in a same container. The FaaS management 2006a, 2006b may compare the number of times to a predetermined number, and determine that the dedicated FaaS mode or hybrid FaaS mode should be engaged if the number of times is greater than the predetermined number.

In some embodiments, the historical data may only include function types that have been invoked within a window of time, for example the previous 5 milliseconds. In addition to historical data driving the above decisions about the mode of the server 2002, policies, service-level agreement considerations and explicit instructions from an orchestrator may affect the determination for increasing or reducing the size and amount of dedicated FaaS caches. Further, the smart NIC 2004 may perform an on-the-fly determination about fetching cached FaaS data from a peer machine and/or the caches 2008, 2010, 2012. Similarly, further, FaaS management logic 2006a, 2006b may be implemented in enhanced FaaS system 300 and in elements as CPU 308, accelerator 314, FPGA 318, and may perform on-the-fly determination about fetching cached FaaS data from a peer machine and/or the caches 2008, 2010, 2012. In this way, software may be agnostic about how FaaS objects are distributed in caches, including caches 2008, 2010, 2012, among a set of inter-networked servers 2002.

As noted above, the dedicated FaaS caches 2008, 2010 may coexist with general purpose cache 2012 in the hybrid mode. So, in the above example, two of the caches 2008, 2010 may be dedicated to FaaS cache, while cache 2012 is utilized as general purpose cache. Thus, when the FaaS portion of the workload on the server 2002 increases, the number and/or aggregate sizes of dedicated FaaS caches from the caches 2008, 2010, 2012 may increase correspondingly. Later, when the FaaS portion declines, either a very small dedicated FaaS caches from the caches 2008, 2010, 2012 continues to exist or all caches 2008, 2010, 2012 all become general purpose caches with no distinction between caching FaaS and non-FaaS pages, files, etc.

In some embodiments, the FaaS management 2006a, 2006b may receive a message from a scheduler 2014 to determine whether the dedicated FaaS mode, general purpose mode or hybrid FaaS mode should be engaged. The scheduler 2014 may be remote to the server 2002, for example, in a control node. In some embodiments, the server 2002 may include the scheduler 2014. The scheduler 2014 may instruct the FaaS management 2006a, 2006b to enter into the dedicated FaaS mode, hybrid mode or general purpose mode based on historical data driving these decisions, policies, system-level agreement considerations as well as explicit instructions from an orchestrator.

In some embodiments, the scheduler 2014 may further instruct the FaaS management 2006a, 2006b that specific container data should be stored in the dedicated FaaS caches 2008, 2010. For example, the scheduler 2014 may determine that a particular container is to be utilized by several functions, and may therefore instruct the FaaS management 2006a, 2006b that initialization data for the container is to be stored in the dedicated FaaS caches 2008, 2010 for reuse by the functions.

Moreover, the scheduler 2014 may instruct the FaaS management 2006a, 2006b to disengage the hybrid FaaS mode and enter the general purpose mode based partly in response to a function completing execution. For example, the scheduler 2014 may determine from the function control flow graph, from collected statistics and workload prediction rules built into the scheduler 2014 that the initialization data in the dedicated FaaS caches 2008, 2010, will no longer be utilized by functions that have completed execution, and/or be less likely or unlikely to be in high demand, and therefore instruct the FaaS management 2006 to disengage the dedicated FaaS mode or hybrid FaaS mode and enter a general purpose mode or hybrid FaaS mode. For example, the remainder of functions in the function control graph that may be anticipated based on past histories may be dispatched for execution in containers different from a container associated with initialization data stored in the dedicated FaaS caches 2008, 2010, without significant risk to their performance or efficiency. Once the hybrid FaaS mode is disengaged, the dedicated FaaS caches 2008, 2010 may be reallocated and utilized as general purpose caches in the general purpose mode.

In some embodiments, the scheduler 2014 and/or FaaS management 2006a, 2006b may identify a load of the FaaS server architecture 2000. If the load is above a certain threshold, the dedicated FaaS mode or hybrid FaaS mode may be engaged to effectively balance resources and latency. If the load drops below the threshold, the dedicated FaaS or hybrid FaaS mode may be disengaged and the hybrid FaaS mode or general purpose mode may then be engaged. For example, if the load drops, the dedicated FaaS mode may be toggled to the hybrid FaaS mode, and if the load drops further the hybrid FaaS mode will be toggled to the general purpose mode. The load may be measured through a number of currently executing functions, data accesses, communication requests, and/or other measures. In some embodiments, the load may be predicted by the scheduler 2014 and/or the FaaS management 2006a, 2006b based on control flow graphs. For example, the scheduler 2014 may predict whether several functions will concurrently operate based on the control flow graphs and/or statistical analysis of how frequently the activation of one type of function led to the activation of the same or another type of function.

In some embodiments, the server 2002 may disengage the hybrid FaaS mode and engage the general purpose mode in response to an identification that the server 2002 will not process a sufficiently high number of FaaS applications' requests. For example, when the scheduler 2014 may determine that the server 2002 no longer needs to process FaaS applications requests in large number, and instruct the server 2002 to exit the hybrid FaaS mode.

In some embodiments, the server 2002 may disengage the hybrid FaaS mode and engage the general purpose mode in response to an identification that a time-to-live of the initialization data in the dedicated FaaS caches 2008, 2010 is expired. For example, the FaaS Management 2006a, 2006b may maintain a counter to determine an amount of time that the initialization data is unused and/or is not used to build a container. The FaaS Management 2006a, 2006b may determine whether the amount of time exceeds and/or meets a time-to-live threshold. If the amount of time exceeds and/or meets the threshold, the FaaS Management 2006a, 2006b may automatically disengage the hybrid FaaS mode and engage the general purpose mode.

Several of the above embodiments describe exiting the dedicated FaaS mode and/or hybrid FaaS mode based on certain conditions (e.g., identification that a time-to-live is expired, a load drop, analysis of past control flow graphs, activation sequences, etc.). In some embodiments, rather than immediately exiting the hybrid FaaS mode, the initialization data in the dedicated FaaS caches 2008, 2010 may be released and then replaced with new initialization data. For example, when one of the conditions is met, the scheduler 2014 and/or the server 2002 may determine whether to store different initialization data in the dedicated FaaS caches 2008, 2010.

For example, the scheduler 2014 may determine from a control flow graph, that initialization data stored in the dedicated FaaS caches 2008, 2010 is no longer relevant. That is, the scheduler 2014 may determine that a first container, which is built from the initialization data, will no longer be used, or will be used infrequently. Rather than immediately exiting the hybrid FaaS mode, the scheduler 2014 may reference the control flow graph and/or historical data, and determine whether a second container will be used. If so, the scheduler 2014 may instruct the FaaS management 2006a, 2006b to erase the initialization data for the first container, and store initialization data for the second container in the dedicated FaaS caches 2008, 2010. If however the scheduler 2014 determines that no other initialization data should be stored in the dedicated FaaS caches 2008, 2010, the hybrid FaaS mode may be exited.

In some embodiments, an operating system of the server 2002 may determine when to engage the dedicated FaaS mode, hybrid FaaS mode, general purpose mode and exit the dedicated FaaS mode, general purpose mode as described above with respect to the sever 2002 and/or scheduler 2014. In some embodiments, the dedicated FaaS caches 2008, 2010 may be hardware caches. In some embodiments, the dedicated FaaS caches 2008, 2010 may be software caches including but not limited to page caches.

Embodiments that include the server 2002 may increase a number of functions that may be executed on the server 2002 within a given time frame. Furthermore, a latency (e.g., time) to setup the execution environment to run a function (startup time) and the memory the function consumes may be factors that determine a number of functions that may be executed on the server 2002. As described above, maintaining the resources for function execution ready in memory (e.g., a warm container) may be utilized to reduce the startup time. To deal with potential increased memory footprint and resource allocations of a warm container, some embodiments may sequester dedicated FaaS caches 2008, 2010 to store only the resources to startup functions and/or containers for the functions to reduce the memory footprint and memory allocations. Thus, resource contention is reduced, and a startup time of functions is accelerated. The dedicated FaaS caches 2008, 2010 may be released adaptively when the server 2002 is not being used to serve FaaS applications or there is no significant load.

Figure 20B:
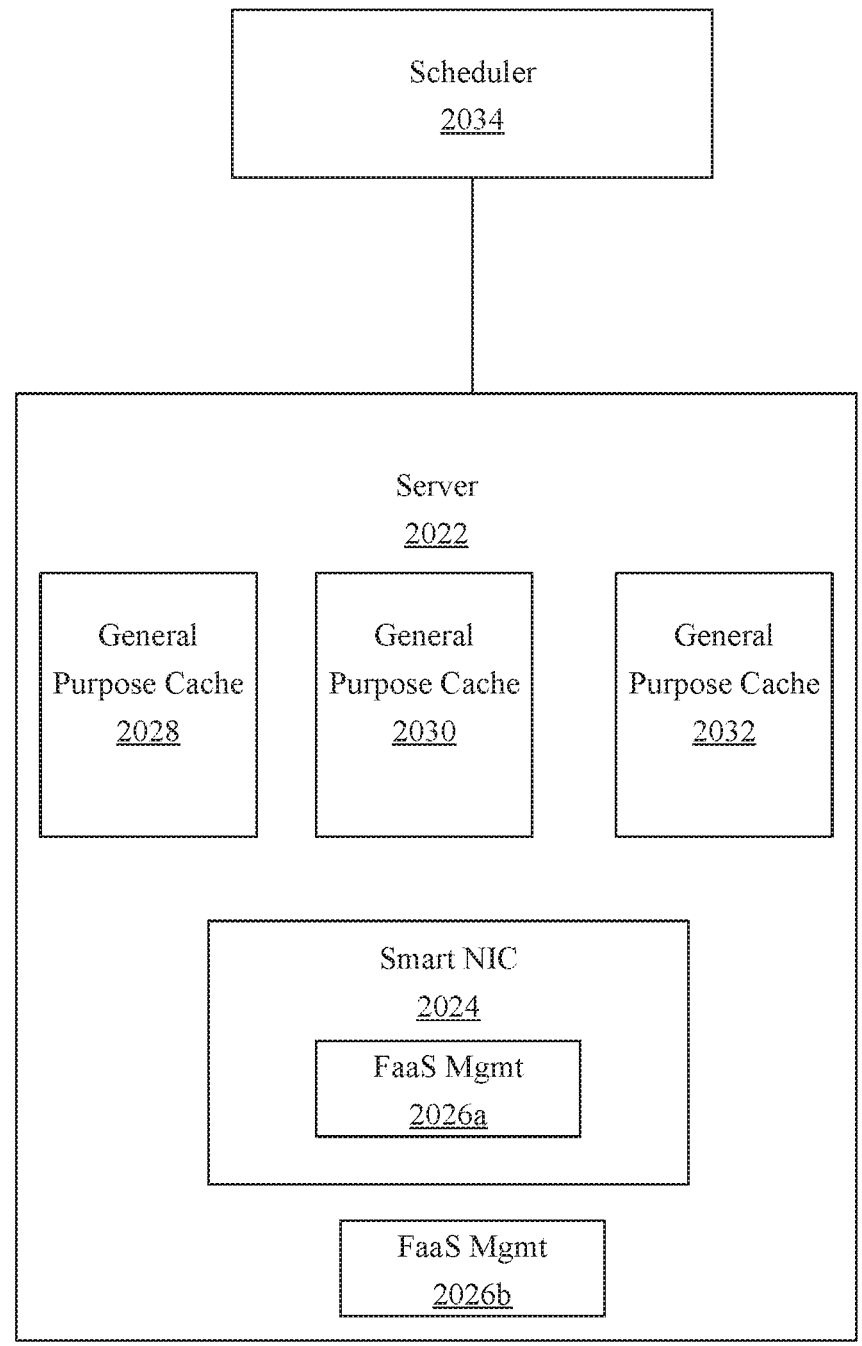
FIG. 20B is a block diagram of an example of an enhanced FaaS server architecture having general purpose caches according to an embodiment.

FIG. 20B shows an enhanced FaaS server architecture 2020 in which a server 2022 is in a general purpose mode as described above with respect to FIG. 20A. As illustrated, the three caches 2028, 2030, 2032 are operated in a general purpose mode. That is, the general purpose caches 2028, 2030, 2032 may store data objects, but may not be dedicated to storing FaaS related objects. It may still be possible for the general purpose caches 2028, 2030, 2032 to store FaaS related objects, and furthermore to store general purpose data objects.

In some embodiments, FaaS management logic 2026a in FIG. 20B is implemented in a Smart NIC 2024. In some embodiments, logic 2026a may be alternatively implemented in the server architecture 2000 as hardware, for example in a processor, in a baseboard management controller, in an accelerator, and/or an FPGA, etc. Server 2002 may further include FaaS management logic 2026b that operates in conjunction and/or coordination with FaaS management logic 2026a. The FaaS management 2026b may be an OS driver or smart middleware of the server 2022. The FaaS management 2026a, 2026b may toggle the server 2022 between the general purpose mode, hybrid mode and a dedicated FaaS mode. For example, the FaaS management 2026a, 2026b may receive instructions from the scheduler 2034 to toggle between the general purpose mode and a dedicated FaaS mode. When the server 2022 is toggled to the hybrid mode, the server 2022 may resemble the server 2002 and operate similarly to as described above with respect to FIG. 20A. When the server 2022 is toggled to the dedicated FaaS mode, each of the caches 2028, 2030, 2032 may operate as a dedicated FaaS cache.

Figure 20C:
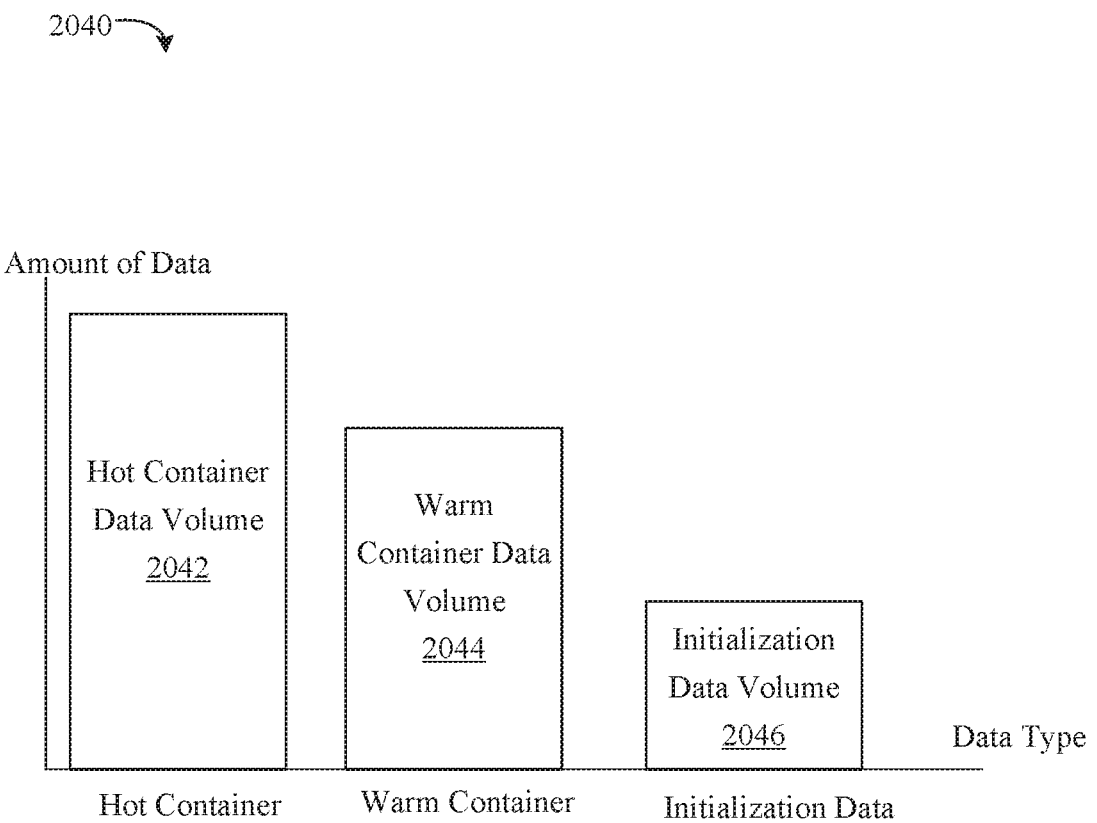
FIG. 20C is an example of a graph illustrating data volumes of data objects according to an embodiment.

FIG. 20C shows a graph 2040 illustrating data volumes of data objects. The graph 2040 illustrates a relationship of various data objects (X-axis) to an amount of data (Y-axis). A hot container may currently be executing a function. The hot container data volume 2042 is the greatest. A warm container may be idle, so as to not currently execute a function. The warm container data volume 2044 is less than the hot container data volume 2042. Initialization data may be data needed to initiate a container, as described above with respect to FIGS. 20A and 20B. The initialization data volume 2046 may be the least. As such, a comparison of warm data container volume 2044 to initialization data volume 2046 illustrates that a memory footprint enhancement may be achieved by tearing down a warm container 2044, storing the initialization data in one or more dedicated caches, and reinitializing a container from the initialization data.

In some embodiments the initialization data represented by the initialization data volume 2046 may be data that is common for initializing more than one container. That is, several containers may be initiated from the initialization data. Such commonality may reduce a memory footprint achieved by storing the initialization data in a dedicated cache in lieu of maintaining the data in warm containers. For example, containers may be initiated from the initialization data. Maintaining each of these containers as warm containers would generate overhead for several warm containers. The overhead may at least include the warm container data volume 2044 multiplied by the number of warm containers. In contrast, only one copy of the initialization data needs to exist to initiate each of those warm containers. Thus, by not maintaining warm containers and rather keeping the initialization data, memory overhead is significantly reduced.

Figure 20D:
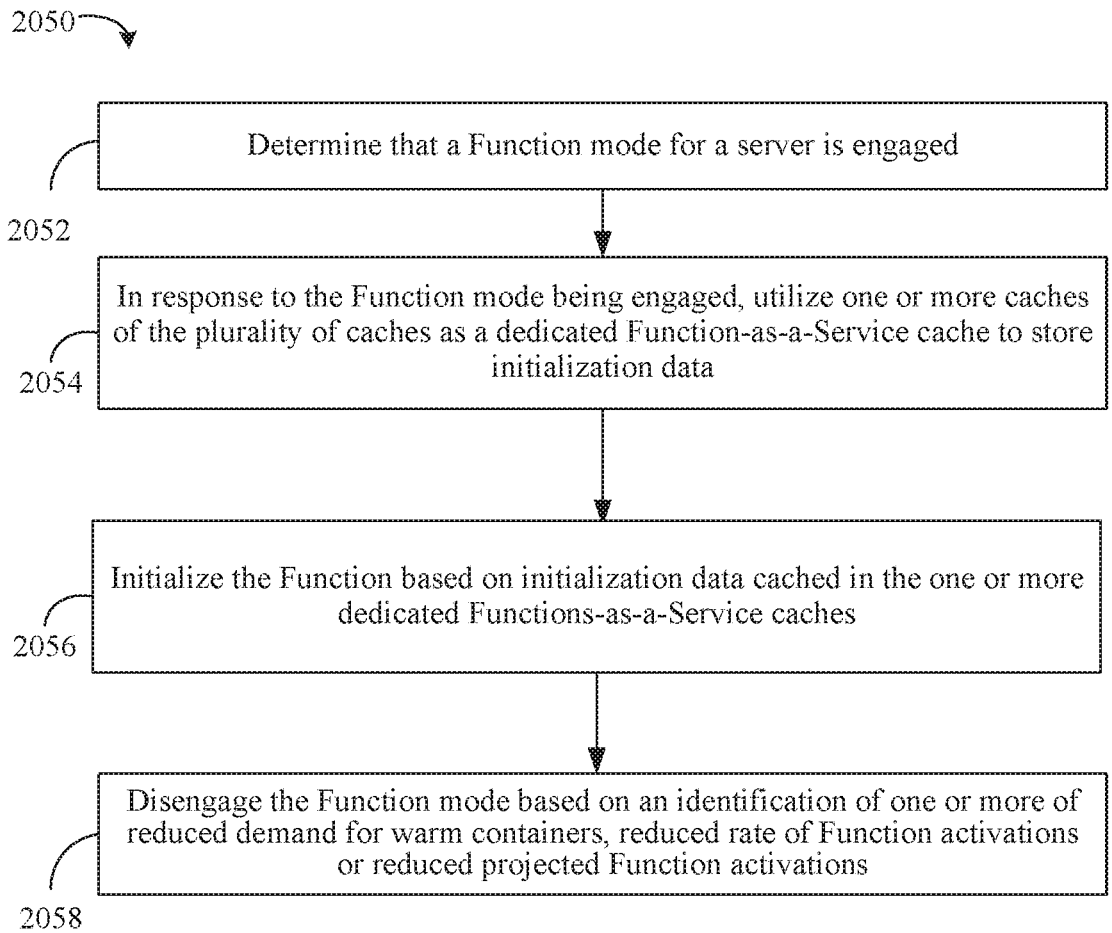
FIG. 20D is a flowchart of an exemplary enhanced function resource management according to an embodiment.

FIG. 20D shows a method 2050 of enhanced function resource management, and may be implemented by the enhanced FaaS server architectures 2000, 2020 of FIGS. 20A and 20B, and/or one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 2052 determines that a function mode for a server is engaged, for example by FaaS management logic 2006a or 2006b. The function mode may be a dedicated FaaS mode or hybrid FaaS mode as described above. The server may include a plurality of caches. Illustrated processing block 2054 utilizes, in response to the function mode being engaged, one or more caches of the plurality of caches as a dedicated Function-as-a-Service cache to store initialization data. The initialization data may be utilized to initiate execution of a function. In some embodiments, the initialization data may only be a part of a total data set to initiate the function. Illustrated processing block 2056 may initialize the function based on initialization data cached in the one or more dedicated Functions-as-a-Service caches. For example, the initialization data may be utilized to build a container to execute the function. Illustrated processing block 2058 may disengage the function mode based on an identification of one or more of reduced demand for warm containers, reduced rate of function activations or reduced projected function activations. Illustrated processing block 2058 may release the one or more caches from being dedicated to the initialization data, and/or engage a general purpose mode. For example, the one or more caches may be utilized as general purpose caches rather than being utilized as Function-as-a-Service caches. Method 2050 may enhance resource utilization and decrease latency of functions as described above.

Additional Notes and Examples

Example 2000 includes at least one computer readable medium, comprising a set of instructions, which, when executed by a computing device, cause the computing device to determine that a function mode for the computing device is engaged, wherein the computing device includes a plurality of caches, in response to the function mode being engaged, utilize one or more caches of the plurality of caches as a dedicated function-as-a-service cache to store initialization data, wherein the initialization data is to be utilized to initiate execution of a function, wherein the initialization data is only a part of a total data set to initiate execution of the function, wherein the initialization data is to be utilized to build a container to execute the function, initialize the function based on initialization data cached in the one or more dedicated Functions-as-a-Service caches, disengage the function mode based on an identification of one or more of reduced demand for warm containers, reduced rate of function activations or reduced projected function activations, in response to the function mode being disengaged, release the one or more caches from being dedicated to the initialization data, and in response to the function mode being disengaged, utilize the one or more caches as a general purpose hardware cache.

Example 2001 includes at least one computer readable medium, comprising a set of instructions, which, when executed by a computing device, cause the computing device to determine that a function mode for the computing device is engaged, wherein the computing device includes a plurality of caches, in response to the function mode being engaged, utilize one or more caches of the plurality of caches as a dedicated Function-as-a-Service cache to store initialization data, wherein the initialization data is to be utilized to initiate execution of a function, and initialize the function based on initialization data cached in the one or more dedicated Functions-as-a-Service caches.

Example 2002 includes the least one computer readable medium of Example 2001, wherein the initialization data is only a part of a total data set to initiate the function.

Example 2003 includes the at least one computer readable medium of Example 2002, wherein the initialization data is to be utilized to build a container to execute the function.

Example 2004 includes the at least one computer readable medium of Example 2001, comprising a further set of instructions, which, when executed by the computing device, cause the computing device to disengage the function mode based on an identification of one or more of reduced demand for warm containers, reduced rate of function activations or reduced projected function activations.

Example 2005 includes the at least one computer readable medium of Example 2004, comprising a further set of instructions, which, when executed by the computing device, cause the computing device to in response to the function mode being disengaged, release the one or more caches from being dedicated to the initialization data.

Example 2006 includes the at least one computer readable medium of Example 2005, comprising a further set of instructions, which, when executed by the computing device, cause the computing device to in response to the function mode being disengaged, utilize the one or more caches as a general purpose hardware cache.

Address Space Based QoS

In a FaaS environment, it is important to be able to prioritize applications, threads, or virtual machines (VMs). Existing approaches that indicate from software (OS/VMM) to hardware which applications or VMs are high/medium/low-priority, are imprecise and resource-intensive.

An example of existing solutions of prioritizing applications, threads, and/or VMs is a class of service (CLOS) thread-based interface. While a CLOS thread-based interface may be convenient, is currently deployed and may be widely accepted, it suffers from at least two drawbacks, namely (1) lack of precision—one cannot specify how each cache line should be treated in the platform, and (2) there is overhead in swapping the CLOS at each context swap. Some exemplary embodiments of an enhanced FaaS solution may provide technical solutions that are more precise and less costly with respect to the resources necessary to indicate which applications or VMs are high/medium/low-priority.

Exemplary embodiments of the enhanced FaaS solution provide visibility and control over how shared resources such as last-level cache (LLC) and memory bandwidth are used by applications, VMs and containers (e.g., RDT or Platform Quality of Service). An extension to such technology may be built to enable address-based QoS, in which either (1) specific ranges of an address space are tagged with a class of service (CLOS), or (2) individual pages may be managed through adding per-page attributes. Address space based QoS may be developed through specification of address ranges in the style of memory type and range registers (MTRRs) or protection keys-like approaches, in which a range is specified through base and limit control registers (CRs) or model-specific registers (MSRs). In such a case, either existing range registers may be reused, or new ones introduced, so long as each range register is associated with a CLOS to enable tagging. In some embodiments, other mechanisms may be used for tagging and filtering; for example, software may populate a range-tag table that is accelerated with a cache by hardware mechanisms in processors, memory controller, or address translation services (ATS) by various DMA-capable devices.

A CLOS may be a software-assigned tag into which threads/apps/VMs/containers may be grouped. This tag may be swapped into an MSR any time a software thread or vCPU begins running on a hardware logical thread (e.g., a simultaneous multithreading (SMT) thread on a core). Software may flexibly assign zero or more threads into a CLOS, then platform resources such as cache capacity at the LLC or memory bandwidth may be set for each CLOS (again by the OS/VMM to meet prioritization needs). Such assignment may be performed via any one of the FaaS systems 400 or 500 in FIGS. 4 and 5, respectively.

In an exemplary implementation, each page table entry may be extended with a CLOS tag. As a CPU traverses page tables during a translation lookaside buffer (TLB) miss, the CLOS attribute may be retrieved and used, and cached in the TLBs. This means that for each line on each page accessed, a CLOS may be provided to enable finer-grained QoS tagging than was previously possible.

While thread-based tagging may be deployed today and may work to prioritize FaaS threads among each other, the concept of range or address-based tagging enables data within FaaS threads to also be prioritized, which may better comport with the more fine-grained nature of FaaS. There also may be technical advantages of address-based tagging in other usages such as IOT, industrial automation, motion control and real-time computing, where key memory ranges may be prioritized or "pseudo-pinned" in the cache, thereby enabling finer-grained controls than were previously available.

During the development process, the above-described approach may be integrated into a toolchain, and critical data may be tagged in a special portion of a linker script, enabling address space based QoS to ensure prioritization. Similarly, known streaming data (which could pollute a cache) may be deprioritized. Thus, for specialized usages, address space based QoS may provide additional benefit atop existing thread-based tagging techniques.

In one embodiment, an electronic processing system similar or same as the one described with connection of FIG. 8A may include a processor, memory communicatively coupled to the processor, and logic communicatively coupled to the processor and the memory to perform operations to prioritize software or software threads. In some embodiments, the logic may be located in, or co-located with, various components, including the processor, memory, etc. (e.g., on a same die).

In another embodiment, a semiconductor package apparatus similar or same as the one described with connection of FIG. 8B may include one or more substrates, and logic coupled to the one or more substrates, where the logic is at least partly implemented in one or more of configurable logic and fixed-functionality hardware logic. The logic coupled to the one or more substrates may be configured to perform operations to prioritize software or software threads. In some embodiments, the logic coupled to the one or more substrates may include transistor channel regions that are positioned within the one or more substrates.

Turning now to FIG. 21A, this figure illustrates a method 2150 of prioritizing a software thread according to one embodiment. Method 2150 includes, in block 2152, an operation of determining whether a software thread is running on a hardware logical thread. In block 2154, a tag may be swapped into a register when the software thread is running on the hardware logical thread (e.g., a processor core). Finally, in block 2156, one or more cache capacity and memory bandwidth may be set for each tag. According to an exemplary embodiment, the one or more of a cache capacity or memory bandwidth may be set by an operating system and/or a virtual machine manager (VMM).

Furthermore, according to an exemplary embodiment, data and application(s) may be dynamically moved into different performance classes at runtime, based on runtime performance indicators, problematic memory regions or areas, and/or based on access patterns.

Embodiments of the method 2150 may be implemented in a system, apparatus, computer, device, etc., for example, such as those described herein. More particularly, hardware implementations of the method 2150 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 2150 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Embodiments or portions of the method 2150 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Page Level QoS

The performance of a CPU relies heavily on low latency, high bandwidth memory accesses. Modem CPU architectures depend on multiple levels of cache to reduce the latency and bandwidth constraints of external memory solutions such as DDR. Caching may be used to improve the CPU's overall performance, and features such as Cache QoS (Cache Allocation Technology, CAT) and Memory Bandwidth Allocation (MBA) (both existing features) provide a means to ensure greater performance for a specific core within a multi-core processor. CAT and MBA provide benefits in many environments, but are dependent on thread-level tagging. This means that after a tag is applied (a Class of Service, CLOS for resource control, or a Resource Monitoring ID, RMID for monitoring) then subsequent activities associated with the thread are controlled and/or monitored. However, there is currently no method to control the data placement of threads in a way that is sensitive and/or corresponds to the data addresses accessed by that thread. In real-time or important threads where the most important cache misses to specific addresses may have a significant effect on performance and execution jitter, this may result in threads that are difficult to tune and optimize to keep their most critical data in the cache. In a real-time environment these cache misses are assumed when contemplating a worst-case execution time, thus significantly impacting a programmer's ability to guarantee a definitive real-time workload completion time.

For example, if a first core, Core A, has a workload that consumes a Data A (<1 KB) regularly every 100 µs, but in turn also performs a stream processing operation that consumes the entire L3 Cache, Data A may be forcefully evicted from L1, L2, and L3 Cache as well as the TL entry in the second-level TLB (STLB). Through this pattern which then re-accesses Data A at its regular beat rate of 100 µs, there may often be an unpredictable added latency imposed by fetching memory from DDR including the page walks needed to translate the virtual address for Data A (where translations are later stored in the TLB/STLB structures, but later forced out by the large working set of the streaming workload phase). In real-time environments, this added latency may further reduce the usable execution cycles, leaving less than 70% of the total available performance as cycle budgets must be padded to account for worst-case cache and TLB behaviors. In some cases with tighter bounds in the order for a 10 us beat rate, the effective performance may be <50%. As another example, mixing workloads on cores through time-slicing of execution may also introduce cache and STLB pressure.

An exemplary embodiment of an enhanced FaaS and real-time solution may allow the cache hierarchy to improve the residency of data blocks in the cache by preventing unnecessary evictions and expensive page table walks.

Additionally, according to an exemplary embodiment, CLOS-selection may be attached to page attributes and provide the cache hierarchy a method to improve cache line residency for critical path execution. Each page allocated into a page table by the operating system may define the selected CLOS for the page. When a memory load/store occurs, and the data must be brought into cache, the page attributes may indicate the cache block that the CLOS may use, specifically which ways it is allowed to evict to make space. Similarly, for the STLB, when the page translation is read, it may have a specific location of the STLB allocated for the CLOS defined by the page attributes, thus improving the residency of the TLB entries. Stated another way, CLOS tags may be used to allocate important data (Data A in the example from two paragraphs above) into protected partitions of the caches at the L1/L2/L3/etc. levels and/or the STLB. The presence of this data in protected partitions removes the possibility that it will be evicted, meaning the data is present when needed, reducing execution jitter induced by needing to fetch this data from memory.

Page level QoS enables the ability to treat each block of data individually (the term may also refer to management at the byte, cache line or page level, but for efficiency of implementation the page level may be a common approach). Instructions may be mapped to pages with a specific attribute (such as a CLOS tag), and in the case of critical path execution, critical path instructions may have separate pages with specific QoS requirements. Similarly, for data, critical path items with less frequency of accesses may have specific QoS requirements preventing stalls on memory access. Incorporating the desired QoS tags (CLOS for instance) to the page attributes may enable better integration with the cache control features such as CAT at various cache levels, and with STLB partitioning features, enabling deterministic residency and simpler modeling to guarantee worst case execution time.

The above-described approach may be different from the related solution of core level QoS (traditional RDT), wherein CLOS is be defined through a register that controls all downstream constructs that exist within the core. Due to security risks, the CLOS is typically controlled through a privileged register not available to user space applications. Through this thread-tagging implementation only one CLOS may be used by a task at a given time during execution for all memory operations. Core level QoS may be more problematic since it assumes all data within the task is treated the same (and core-level features are more difficult to manage in the presence of multiple threads on each core as in the case of SMT). Therefore, without complex special usage flows such as "pseudo locking" wherein CLOS are switched and data is "primed" into the caches a priori before usage, a task cannot control what items will have specific residency requirements in the L2 or STLB cache. Accordingly, without such complex setup operations and/or steps, a stream processing operation may evict all the critical path items in cache. Further, pseudo-locking solutions, while sometimes effective, may be "fragile" in that they may be affected by unforeseen microarchitecture behaviors, which makes building guarantees surrounding the caching behavior quite difficult. Execution environments with many consolidated tasks per core may also pose a problem. In this scenario, the ability to carve out sizable amount of cache per task without impacting performance may be difficult.

Page level QoS may provide a means to improve runtime quality of service by adding the CLOS definition to the entries in the page table in one example embodiment at the page level. Expected usage may be demonstrated by the scenarios below. For example, when an application is prepared for execution, the operating system may allocate pages to place all of the binary sections of the application into memory. Each segment of the binary may be tagged with a CLOS by some means visible to the operating system and may be placed into allocated pages determined by and tagged with that CLOS. This may allow different segments of the application to have higher or lower priority to improve the overall quality of service, but more importantly, for the critical pieces of data in important pages they can be kept in the caches/TLBs with much higher probability, and a simpler interface is provided (through the page-level interface to load these regions of data into the caches/TLBs).

When the pages are allocated, each page entry may be added to the page table with additional bits to define the CLOS for the memory the page represents. At runtime, the page entries may be retrieved by the CPU to provide virtual to physical address translation, at which point the CLOS may be identified for the memory it is to access. Since the CLOS may define how the cache hierarchy is partitioned, the memory may then be loaded into the regions of a shared resource (such as STLB of a cache level) defined by the partition for that CLOS. In the case of evictions, only new memory requests that have access to a specific partition of cache may evict items from the cache partition. This means that important data in separate partitions can be protected from eviction. This may dramatically improve residency for an item in cache for a partition that is reserved, thus providing another (and perhaps more robust) means of pseudo-locking. In the case of memory applications during runtime, the operating system call to allocate memory onto the heap may be additionally provided the CLOS selected for the new page table entries to be created.

Turning now to FIG. 21B and FIG. 21C, these two figures show interaction between tasks and CLOSs in a page table to provide page level QoS in an enhanced FaaS architecture. Page Level QoS may provide a benefit by partitioning a program's segments into separate CLOSs, allowing either certain segments or certain data within segments to be specially prioritized or protected in the caches/TLBs. In FIG. 21B, an application 2160 may have three separate tasks (e.g., Task 0, Task 1, Task 2), each with specific real-time deterministic requirements. Each of these tasks has its own segment for code and data (.text and .bss) to allow specific cache partitioning during execution while still sharing the global process level context (for instance, as in the case of a multithreaded application). The data 2161 and code 2162 relate to Task 0, the data 2163 and code 2164 relate to Task 1, and the data 2165 and code 2166 relate to Task 2. The code and data of each task is targeted into a specific partition of cache providing more determinism to the execution time and allowing a tighter worst-case execution time calculation. According to the exemplary embodiment of FIG. 21B, the .bss and .text segments may share the same class of service, but these may be further partitioned based on memory size constraints and degree of determinism required.

Turning now to FIG. 21C, at runtime, task 0 may request heap data 2170 from the memory allocator CLOS 3 as a partition of CPU Core 0 L2 and L3 cache. Task 1 also requests heap data 2171 from CLOS 4 as a partition of CPU Core 1 L2 and L3 cache. For CPU Core 0, an exemplary tight loop may be executed on sensor data, as follows and as shown in FIG. 21C:

1) Sensor data is placed into L3/LLC through PCI-E DMA. For example, the Intel DDIO feature caches some data stored in memory in dedicated area of L3/LLC cache.
2) Task 0 consumes the input sensor data, streaming it into CLOS 3 L2 cache partition while updating data as well in bss_clos_0 ds.
3) Task 0 produces output for Task 2 through data within bss_clos_2 and loops back to step 1.

For CPU Core 1, Task 1 may execute asynchronously to Task 0 based on an external interrupt with no data correlation to either Task 0 or Task 2. Due to real-time determinism, the residency in cache of Task 1 may be critical.

For CPU Core 1, Task 2 may execute isochronously aligned with the output of Task 0 into bss_clos_2, as follows:

1) Read output from Task 0 through bss_clos_2.
2) Create write Output Data with CLOS 4 in CPU Core 1 L2 and L3 cache.
3) NIC on PCI-E reads output data from L3.

Turning now to FIG. 21D, this diagram illustrates a similar scenario as in FIG. 21C, except where thread level QoS is used to define the CLOS. First, in view of CPU Core 0 2180, since only Task 0 is running on CPU Core 0 2180, without special software-based techniques and a cache hierarchy specially tuned to support it there may be no means to partition the cache to increase residency of the text_clos_0 or bss_clos_0 as it streams in the Sensor Data. This may force unwanted evictions in cache and reduce the overall determinism when additional cache misses occur. Next in view of CPU Core 1 2181, the partitioning may still be present between Task 1 and Task 2, but the streamed writes to the Heap Output Data may be combined with CLOS 2. This may cause unwanted evictions to bss_clos_2 and text_clos_2, further reducing the determinism between in timing between sensor (or packet in this case) data being commanded to be sent and the when NIC is actually sent out. In other words, due to sharing of caches there is non-deterministic latency between the time the application issued command to send, and data actually being sent over the wire. This latency is due to the fact the PCIe device will have to read data from memory, and it may be or may not be cached. Ultimately this uncertainty of caching results in non-determination and jitter in execution time.

In view of L3 cache 2182, the largest deterministic memory block, granularity is reduced such that the Heap input and Output data may cause further evictions of critical code and data. While L2 evictions add unwanted latency to L3 cache 2182, having to fetch data from external memory may add significantly more latency and jitter than on die memory blocks.

By implementing page level QoS, a more deterministic model may be developed based on the data/instruction residency in cache, allowing tighter Real-time execution constraints and higher core utilization. For key FaaS workloads of high importance this is a significant advancement.

Additional Notes and Examples

Example 2101 includes a method comprising determining whether a software thread is running on a hardware logical thread, swapping a tag into a register when the software thread is running on the hardware logical thread, and setting at least one of a cache capacity and memory bandwidth for each tag.

Example 2102 includes the method of Example 2101, wherein the tag is to be a Class of Service (CLOS) tag from a page table.

Example 2103 includes the method of Example 2101, wherein the at least one of the cache capacity and the memory bandwidth is set by one of an operating system and a virtual machine manager.

Ensuring Predictable FaaS Throughput and Fairness Independent of the Number of Consolidated Concurrent Threads According to an exemplary embodiment, a hardware or software solution ensuring determinism and fairness may be provided in the FaaS environment. Such may be implemented to ensure consistency, accuracy, and fairness of billing. Management and monitoring of FaaS resources are designed to be consistent to ensure accurate billing for resource usage.

Fairness in assessing FaaS resource usage is necessary because a tenant pays when FaaS resources are used, and slowdown to one tenant's threads caused by the activity of another tenant's threads may cause unfairness or variation in runtime (and thus variation in billing) given repeated invocations of the same workload. Accordingly, CPU scheduling quanta may be adjusted to ensure fairness; billing statistics may be used to measure CPU time given and fairness overall; and out-of-band (OOB) telemetry may also play a role in monitoring applications to understand the degree of fairness currently being achieved. However, controls are important, as described below.

According to an exemplary embodiment, there are at least 2 approaches to ensuring determinism and fairness: 1) partitioning shared resources to ensure that each of the functions have equal access to the shared resources, or 2) implement a hardware or software performance management controller, which performs operations of:

a. Monitoring and control
b. Dynamic function resource control and migration

FIG. 22 illustrates an exemplary architecture for providing determinism and accuracy in a FaaS environment. In FIG. 22, a computing device, e.g., performance controller 2210, may perform operations "a" and "b" in the paragraph immediately above. The computing device 2210 may also provide history-based resource scheduling, redirect data into appropriate cores for invoking, maximize data sharing to and minimize data movement, bundle functions according to service level agreements.

The above-described operations of the computing device 2210 may also be implemented via software.

To ensure determinism and fairness, the computing device 2210 or software may split up L2 cache such that it is handled by different cores 2220, 2230, especially when L2 is filled.

According to an exemplary embodiment, the computing device 2210 may split code from data. Additionally, functions may be moved around to ensure that they are well balanced, e.g., if one resource is back-end heavy then the functions may be mixed and matched on different cores based on a scheduler. Additionally, the computing device 2210 may dynamically reallocate temporal resources.

Runtime 2240 may or may not be implemented in the architecture of FIG. 22. When implemented, a function may call the runtime to obtain services and instructions from the infrastructure, to avoid operating system-specific calls.

Increased Accuracy of Billing for FaaS

A software-based time sampling approach for billing may be inadequate for FaaS since it suffers from skew and high overhead. If billing is based on milliseconds, granularity is needed such that computing-resource usage may be measured in microseconds.

As workload timescales decrease in a datacenter, fine-grained monitoring and billing become increasingly important. FaaS is designed to allow customers billing down to the millisecond, which requires operators to maintain verifiable billing precision at the microsecond level to ensure accuracy. Hardware techniques to support such billing with minimal overhead thus become necessary, and several techniques are described below.

According to an exemplary embodiment, a hardware approach to billing management and monitoring that has low overhead and enables on-demand retrieval of billing statistics periodically by the infrastructure is provided. This exemplary embodiment may remove time-accounting overhead from the context swap path of FaaS functions, improving overhead and cost.

Taking billing for VMs as an example—traditionally, VMs may be managed through a web-based console or mobile application, and can be spun up or down on-demand by administrators. Typically, however billing is managed on a minute-by-minute basis. This coarse-grained billing is low cost in its infrastructure and straightforward to manage and verify by customers. That is, the requirements for such a system are low (e.g., basic tracking and a time-synchronized infrastructure, and existing protocols such as NTP are adequate for this purpose).

In the fine-grained billing required for FaaS, traditional techniques, such as the coarse-grained billing described above in case of VMs, may be inadequate. Software-based time sampling of the OS time APIs suffers from skew and the high rate of function invocation/termination may lead to high overheads to gather time values, calculate the differences between time stamps, etc. This may lead to (1) increased operator costs and (2) possible mismatches between what customers profile for runtime and what operators report. Cumulative imprecision and inaccuracy over time further exacerbates these problems.

A hardware approach, contrary to a software solution, may involve very low overhead and enable on-demand retrieval of billing statistics periodically by the infrastructure. Several tagging techniques or solutions are possible for hardware-assisted FaaS billing to uniquely identify the functions or a particular thread and their corresponding activity in the system, including but not limited to:

1) Resource Monitoring IDs (RMIDs) technique—As the OS/VMM swaps RMIDs, a RMID resource tracking tag may be used to track FaaS functions. Each function (or each tenant) may be assigned an RMID, and new CPU hardware may be built or enabled to track RMID time on the CPU (either in a fine-grained time base or in CPU reference clock cycles). New per-RMID event codes may then be reported or resource usage may be reported via a new MSR or MMIO block which reports RMID-to-time usage.

2) Process address space IDs (PASIDs) technique—PASIDs, according to an exemplary embodiment, are 20b tags introduced as part of a PCIe gen 3 specification addendum. PASIDS may be assigned to each core and used with other features like Scalable I/O Virtualization (SIOV). Since new hardware may be built or enabled to track CPU time used per PASID, this may be a highly efficient way to track unique function compute time usage (similar implementation options to MMIO based or MSR based above are available with this technique). The addition of a tracking system of counters to track the CPU cycles consumed by each PASID would be an important portion of implementing this approach.

3) Logical processor ID (LPID) technique or per-thread or per-core—Logical processor ID, thread or core may be used similar to PASIDs and RMIDs, and similarly counters per instance could be added to track CPU utilization. This would require the OS/VMM to likely read these counters at each context swap, or hardware would be needed to aggregate these results on behalf of software.

4) Control register CR3-based technique—If the base page table address forms the basis for a process, tracking CPU time in hardware counters per unique control register CR3. Time or cycles consumed per CR3 unique value could be tracked (for the most active CR3s for instance to reduce cost) in order to track CPU utilization.

5) VM vCPU based technique—Assigning hardware counters per VM virtual CPUID (may be associated with the VT-x architecture)—such counters could track CPU utilization for each of the vCPUs (and in practice other techniques as described above would also be required in order to track utilization for non-virtualized cases).

6) Remote Atomics (RAO)-based technique—RAO may build logic at the uncore which may be used to track CPU time—for example, posted RAO instructions may be used to send an "increment by X cycles" to the tracking hardware for a given process ID/PASID/RMID/etc. at each context swap automatically by hardware (or explicitly by software. This may be possible with RAO variables in software starting with future generations of server hardware. An uncore may reflect functions of a microprocessor that are not in the core, but which may be closely connected to the core to achieve high performance. The uncore may provide capabilities like, for example, caching, memory controller access, I/O device access (via PCIe for instance), etc. and usually a high-performance interconnect to tie all the functions together.

6) Remote Atomics (RAO)-based technique—RAO may build logic at the uncore which may be used to track CPU time—for example, posted RAO instructions may be used to send an "increment by X cycles" to the tracking hardware for a given process ID/PASID/RMID/etc. at each context swap automatically by hardware (or explicitly by software. This may be possible with RAO variables in software starting with Sapphire Rapids Server). An uncore may reflect functions of a microprocessor that are not in the core, but which may be closely connected to the core to achieve high performance.

In one or more of the above tagging schemes a mechanism to sample/read the counters on demand and optionally clear the counters on demand may also be required (for example, to reassign and recycle a PASID or RMID for a new tenant). According to an exemplary embodiment, the above-described tags may be assigned by an OS or other hardware.

In one embodiment, an electronic processing system similar or same as the one described with connection of FIG. 8A may include a processor, memory communicatively coupled to the processor, and logic communicatively coupled to the processor and the memory to perform operations to calculate resource usage. In some embodiments, the logic may be located in, or co-located with, various components, including the processor, memory, etc. (e.g., on a same die).

In another embodiment, a semiconductor package apparatus similar or same as the one described with connection of FIG. 8B may include one or more substrates, and logic coupled to the one or more substrates, where the logic is at least partly implemented in one or more of configurable logic and fixed-functionality hardware logic. The logic coupled to the one or more substrates may be configured to perform operations to calculate resource usage. In some embodiments, the logic coupled to the one or more substrates may include transistor channel regions that are positioned within the one or more substrates.

Figure 23:
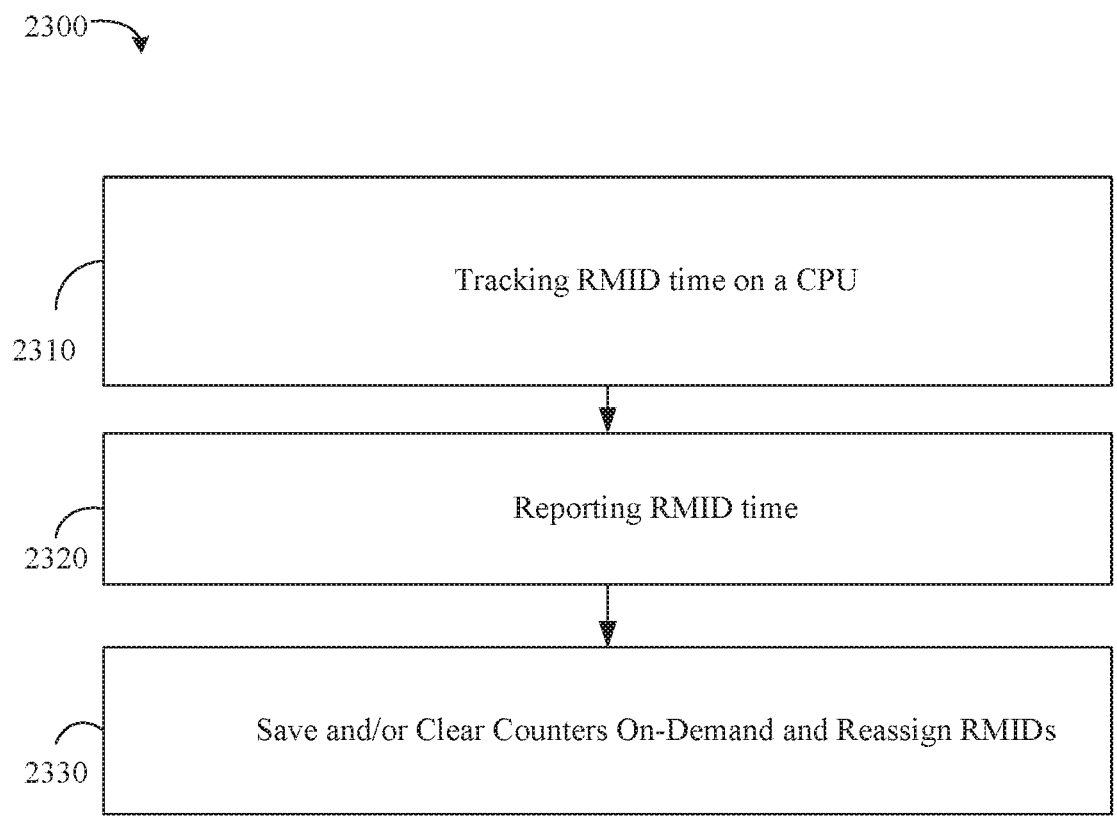
FIG. 23 is an example of a method of calculating resource usage for billing purposes according to an embodiment.

Turning now to FIG. 23, this figure illustrates, according to an exemplary embodiment, a method 2300 for calculating resource usage for billing purposes. Method 2300 includes, in block 2310, an operation of tracking resource monitoring identifier (RMID) time on the CPU. In block 2320, the RMID time may be reported. In block 2330, a counter clearing module may be configured to save and/or clear counters on-demand and reassign RMIDs.

Additional Notes and Examples

Example 2301 includes an apparatus comprising a central processing unit, resource monitoring hardware module configured to partition in a power management unit using a resource monitoring identifier (RMID) and track resource monitoring identifier (RMID) time on the CPU, and code reporting hardware module configured to report the RMID time.

Example 2302 includes the apparatus of Example 2301, wherein hardware counters to count hardware events are to be assigned per RMID.

Example 2303 includes the apparatus of Example 2301, further comprising a counter clearing module, the counter clearing module is to be configured to clear counters on demand and reassign RMIDs.

Intelligent Telemetry Guided Scheduling Examples

A conventional scheduler/orchestrator distributes functions based on availability, with no feedback about how the function behaved. Some embodiments of an enhanced FaaS solution, such as the one described above in connection with FIG. 5, may collect information about behavior when function is executed (e.g., the function took so much time, used so much cache, etc.), and make better scheduling/orchestration decisions based on the collected information. For example, various hardware architectures may provide numerous counters which may provide useful information related to the function behavior. Some embodiments may collect statistics of function-related information (e.g., instead of every data point). For example, a database of collected information may be maintained and used by the scheduler/orchestrator for future routing decisions. Advantageously, some embodiments may make better distribution decision(s), provide better resource utilization, etc.

Turning now to FIG. 24A an embodiment of a distributed computing environment 2440 may include server 2441 communicatively coupled with one or more execution environments (e.g., platforms, servers, etc.) 2442. In some embodiments, the server 2441 is an enhanced FaaS system. The server 2441 may include an orchestrator 2443 to schedule and route functions to the execution environments 2442. The execution environments 2442 may be communicatively coupled to a data collection module 2444 which may be configured to collect information related to the execution of the functions. The data collection module 2444 may be communicatively coupled to a data store 2445 which may store the collected information (e.g., individually, in summary form, statistics related to the collected information, in some structured database, etc.). The orchestrator 2443 may be communicatively coupled to the data store 2445 to utilize the stored data to make decisions about how to schedule and route the functions. In some embodiments, the orchestration and/or data collection may be implemented on only functions that reach a certain usage level (e.g., functions under 1000 instantiations are not orchestrated based on collected data, while function over 1000 instantiations have data collected and are orchestrated based on the collected data). In some embodiments, collection may be halted after the function is well known (e.g., after the function being executed over a predefined threshold times).

In details, the orchestrator 2443 routes and schedules functions to the systems, such as the server 2441, that will run them. The orchestrator 2443 can locate systems and/or subsystems that have free cycles and route the function execution to them. Some embodiments of the orchestrator 2443 may provide an intelligent scheduler that uses the telemetry information from the previous runs of the functions for a more efficient and more economical execution. In some embodiments, the orchestrator 2443 may include AI and/or MI that identifies inefficiencies (e.g., high power consumption, longer than expected latency, etc.), and enhancements to address the inefficiencies. The AI and/or MI may adjust the scheduling and/or distribution of functions on the server 2441 and determine whether the adjustments are effective (e.g., execute a batch of functions and determine whether the inefficiencies are prevented or reduced). If so, the orchestrator 2443 may continue to schedule and/or distribute other functions based on the adjustments. Otherwise, the orchestrator 2443 may employ the AI and/or the MI again to try a different set of adjustments to overcome the inefficiencies. The telemetry information may be gathered in a variety of ways including seamless statistical sampling of the events on the host systems as well as static or dynamic instrumentation of the code to collect the static and dynamic profile information of the function. Non-limiting examples of event information that may be gathered include micro-architectural event information such as data/instruction cache misses, branch mispredictions, thermal counters, IPT, RDT, etc. (e.g., in band (on the CPU), or out of band through CSME). Non-limiting examples of other information that may be gathered include dynamic call-graphs of functions, basic-block counts, API calls, etc. The gathered information may be organized as static/dynamic profile information corresponding to the function.

An embodiment of an intelligent telemetry guided scheduler of the orchestrator 2443 may use the information (e.g., or a summary of the information) that is collected about the functions to dynamically route the function to the system or pools of systems/subsystems that are well suited or best suited for execution of the functions (e.g., available resources, sufficient compute, memory, storage, etc.). With suitable preprocessing of the collected telemetry and profile information about the functions, the intelligent scheduler may be capable of quickly assessing the availability of resources of the systems that are under its control. For example, the scheduler may identify a system or a pool of systems that have sufficient amount of cache that is needed for a function to be scheduled. The granularity of the collected information may vary depending on the implementation, but embodiments of the intelligent scheduler may solve the problem of matching a vector of requirements by the function with those of the available systems. The scheduler may be considered intelligent in the sense that the more functions execute, the more accurate information the scheduler may have about their predicted behavior.

In one instance of telemetry guided scheduling, an embodiment of an intelligent scheduler of the orchestrator 2443 may predict failures and prevent them. For example, some embodiments of the intelligent scheduler of the orchestrator 2443 may record the state of the server 2441 at a crash point including what functions were running, the resource utilization vector (e.g., including power profile, etc.), etc. The intelligent scheduler may potentially see many cases of failures and create deep neural networks DNNs for quick matching the system state (e.g., to predict potential failures).

In some embodiments, a compiler may use profile guided optimization (PGO) or feedback-directed optimization (FDO) for increased compilation performance. This may be considered an aspect of artificial intelligence. Many nodes may be available to execute a function when an event triggers. The various nodes may have different strengths/capabilities and there may be substantial or complete flexibility as to where a function gets executed. The orchestrator 2443 receives a function and decides how to route it to be executed. In some embodiments, when a function gets executed, information may be collected about behavior of the function (e.g., cache misses, timing to execute, etc.) by the orchestrator 2443. Some embodiments may use many counters to collect program information, and/or the function may be instrumented to collect data (e.g., and/or a timer may be used to collect information). Instrumentation may also result in modification of code to accelerate code (e.g., matrix multiplication identified, so next time instrument code to utilize the hardware on a particular server). The collected data may form a profile for the function that a compiler may utilize for profile guided optimization of where to execute the function.

Some embodiments of the orchestrator 2443 may also include changing artificial intelligence decision making capabilities about resources pulled in when the function is distributed in the future (e.g., accelerated functions, including hardware implementations such as an ASIC, a GPU, an FPGA, etc.) for just-in-time (JIT) adaptations. The collected data may be stored into a database or a data store such as the data store 2445 and sampled to identify errors in execution. Based on errors, some embodiments of the orchestrator 2443 may identify ideal resources allocation and servers (e.g., if the profile indicates that the function uses a large cache, the orchestrator 2443 may route the function to a server with large cache allocation to avoid errors). Some embodiments of the orchestrator 2443 may utilize the generated profile to provide profile guided optimization and identify likely outcomes to optimize the selection of the resources. For example, some embodiments of the orchestrator 2433 may analyze the functions and maximize cache use (e.g., two functions that stream a video to different users may be pushed to the same server).

Turning now to FIG. 24B, an embodiment of a method 2430 of providing a function as a service may include collecting behavior-related information related to an executed function at block 2431, and making a subsequent function-management decision based on the collected behavior-related information at block 2432. Some embodiments of the method 2430 may further include determining statistics related to the collected behavior-related information at block 2433, and making the subsequent function-management decision based on the determined statistics at block 2434. For example, the function-management decision may include one or more of a schedule decision and an orchestration decision at block 2435.

Embodiments of the method 2430 may be implemented in a system, apparatus, computer, device, etc., for example, such as those described herein. More particularly, hardware implementations of the method 2430 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 2430 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 2430 may be implemented on a computer readable medium as described in connection with Examples 2411 to 2413 below. Embodiments or portions of the method 2430 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, FPGA bit streams, state information that personalizes electronic circuitry and/or other structural components that are native to hardware (e.g., host processor, central processing unit/CPU, microcontroller, etc.).

Additional Notes and Examples

Example 2400 includes at least one computer readable storage medium, comprising a set of instructions, which, when executed by a computing device, cause the computing device to collect behavior-related information related to an executed function, wherein the behavior-related information includes one or more in-band information and out-of-band information, and make a subsequent just-in-time function-management decision based on the collected behavior-related information.

Example 2401 includes an electronic processing system, comprising a processor, memory communicatively coupled to the processor, and logic communicatively coupled to the processor and the memory to collect behavior-related information related to a function executed by the processor, and make a subsequent function-management decision based on the collected behavior-related information.

Example 2402 includes the system of Example 2401, wherein the logic is further to determine statistics related to the collected behavior-related information, and make the subsequent function-management decision based on the determined statistics.

Example 2403 includes the system of any of Examples 2401 to 2402, wherein the function-management decision includes one or more of a schedule decision and an orchestration decision.

Example 2404 includes a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to collect behavior-related information related to an executed function, and make a subsequent function-management decision based on the collected behavior-related information.

Example 2405 includes the apparatus of Example 2404, wherein the logic is further to determine statistics related to the collected behavior-related information, and make the subsequent function-management decision based on the determined statistics.

Example 2406 includes the apparatus of any of Examples 2404 to 2405, wherein the function-management decision includes one or more of a schedule decision and an orchestration decision.

Example 2407 includes the apparatus of Example any of Examples 2404 to 2406, wherein the logic coupled to the one or more substrates includes transistor channel regions that are positioned within the one or more substrates.

Example 2408 includes a method of providing a function as a service, comprising collecting behavior-related information related to an executed function, and making a subsequent function-management decision based on the collected behavior-related information.

Example 2409 includes the method of Example 2408, further comprising determining statistics related to the collected behavior-related information, and making the subsequent function-management decision based on the determined statistics.

Example 2410 includes the method of any of Examples 2408 to 2409, wherein the function-management decision includes one or more of a schedule decision and an orchestration decision.

Example 2411 includes at least one computer readable storage medium, comprising a set of instructions, which, when executed by a computing device, cause the computing device to collect behavior-related information related to an executed function, and make a subsequent function-management decision based on the collected behavior-related information.

Example 2412 includes the at least one computer readable storage medium of Example 2411, comprising a further set of instructions, which, when executed by the computing device, cause the computing device to determine statistics related to the collected behavior-related information, and make the subsequent function-management decision based on the determined statistics.

Example 2413 includes the at least one computer readable storage medium of any of Examples 2411 to 2412, wherein the function-management decision includes one or more of a schedule decision and an orchestration decision.

Intelligent Function Scheduling to Maximize Memory Re-Use Examples

Some embodiments of the enhanced FaaS system, such as the one described above in connection with FIG. 4 description, may advantageously provide intelligent function scheduling to maximize memory re-use. Memory is a limited resource and functions and data take up space in memory. Some embodiments may route instances of functions of the same language stack to same underlying system/machine/memory. JIT created code may also be duplicated and in some embodiments instances of the duplicate JIT code may be routed to the same underlying system/machine/memory. Some embodiments may preferentially route functions utilizing the same language (e.g., JAVA, PYTHON, etc.) to a same machine and/or physical node. Some embodiments may additionally, or alternatively, route shared data to the same system/machine/memory (e.g., map data).

Execution environments of an enhanced FaaS system, such as the FaaS system 2540 in FIG. 25A below, may load common code libraries (e.g., dynamic link libraries (DLLs)) and/or common data (e.g., datasets, databases, map data, etc.) to support execution of functions. Such shared libraries may be expensive and/or have a lot of data. Some embodiments of the enhanced FaaS system 2540 may advantageously route functions of the same language to the same machine to benefit from shared libraries. In some embodiments, shared libraries may be treated like different instances of a shared function. In some systems, for example, compiled code of the same functions may be similar. Some embodiments of the enhanced FaaS system 2540 may also take advantage of shared data (e.g., two functions may both access the same map data, and some embodiments may route the two functions to the same machine) and resources.

Some embodiments of the enhanced FaaS system 2540 may include memory re-use technology that enables larger memory bandwidth and shorter memory access latencies by using only one copy of physical memory of memory regions (e.g., a cache line) that have exactly the same bit strings. For example, when thousands of distinct cache lines have all the same value (e.g., when all bits are 0's or 1's or any permutation of 0's and 1's), the physical memory would only store one copy of the duplicated region. The memory re-use technology may utilize an extra indirection combined with hashing to re-use the same memory location. However, when one of the regions gets changed, a new region may be created for the new value, and if the permutation already exists, the indirection mechanism would map the modified region to that existing stored value. A benefit of memory re-use technology is for common patterns of all bits being 0's or 1's, to avoid duplication of the data. Some embodiments of the enhanced FaaS system 2540 may increase the possibility of benefitting from memory re-use technology for the function code in addition to the data.

Additionally, functions in the FaaS platforms are often on managed runtimes (e.g., JavaScript, Python, Java, C#, etc.). Each of these platforms has a number of shared libraries such as DLLs that are dynamically loaded and linked. When multiple applications use the same DLL, the OS typically keeps one DLL in the main memory and that is shared for all the apps that load that DLL. In addition, most of these managed runtimes have JIT compilers that generate code dynamically for their high level languages. Some embodiments of the enhanced FaaS system 2540 may advantageously provide a scheduler/orchestrator, e.g., the orchestrator 2443 shown in FIG. 24B, to route functions of the same language, or further functions that are similar or identical to previously routed functions, the same system or the same pool of systems. Furthermore, functions that use the same data (e.g., the same map, stream the same video, etc.) may be routed to the same system or the same pool of systems. Advantageously, some embodiments of the enhanced FaaS system 2540 may increase the likelihood that these different functions will have a lot of duplication of code/data (e.g., in terms of static code, DLLs, JIT generated code, JIT generated data, etc.). Systems that are equipped with memory re-use technology may further benefit from some embodiments because the memory re-use technology may actually use only one instance of each duplicate code at very fine levels including cache level. Advantageously, some embodiments may decrease pressure on memory for bandwidth and functions/apps may have more memory for data in addition to faster access of the code they use.

In some embodiments, system software of the enhanced FaaS system 2540 may be configured to align the code and data structures that have high chances of memory re-use at cache line boundaries. In addition, padding the tails of some data structures with 0's may further increase the chance of benefitting from memory re-use technology. Also, reducing or limiting the "write-set" of the functions/workloads may help ensure that writes fit within the memory re-use technology's staging area and may result in reduction of the overheads associated with avoiding memory duplication, when the write-set starts growing.

Figure 25A:
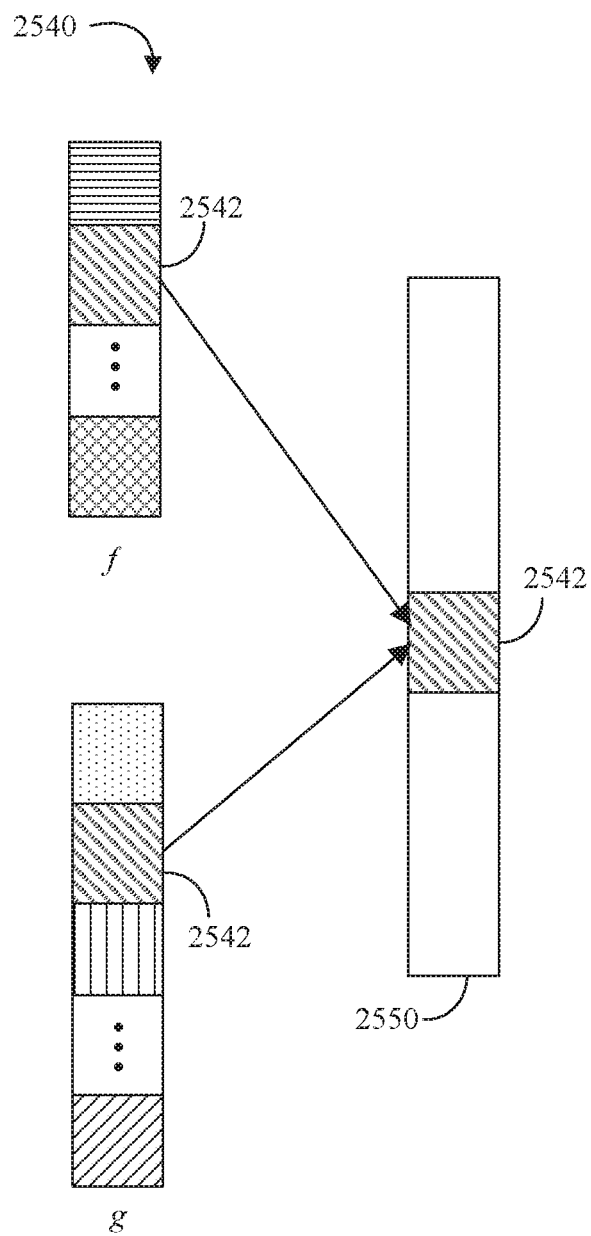
FIG. 25A is a block diagram of an example of a FaaS system that enables memory re-use among multiple functions according to an embodiment.

Turning now to FIG. 25A, an enhanced FaaS system 2540 may include one or more transient functions including a function f and a function g, and one or more target systems 2550 for the functions. Each function f or g has different memory regions associated with its different data and code sections (shown as differently shaded areas in FIG. 25A). Some embodiments of an intelligent orchestrator/scheduler may dynamically and seamlessly sample the highly used duplicated memory regions (both data and code), associate them with the functions that are running, and use the results in the future scheduling scenarios. For example, some embodiments may identify shared information 2542 in functions f, g and route the functions f, g to the same target system 2550 (e.g., because the target system 2550 may have the shared information 2542 already loaded).

Figure 25B:
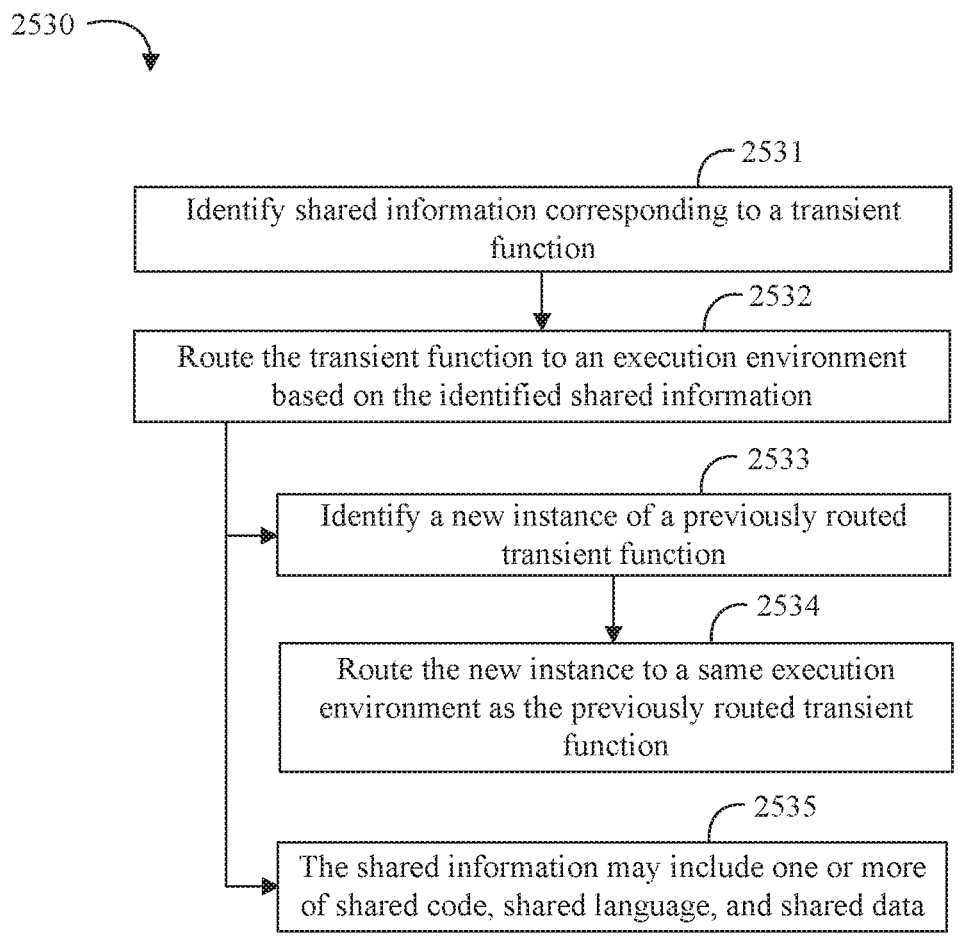
FIG. 25B is a flowchart of another example of a method of providing a function as a service according to an embodiment.

Turning now to FIG. 25B, an embodiment of a method 2530 of providing a function as a service may include identifying shared information corresponding to a transient function at block 2531, and routing the transient function to an execution environment based on the identified shared information at block 2532. For example, block 2531 may include a scheduler and/or orchestrator identifying functions that have a same language and/or functions that are similar to each other, and therefore will utilize a same underlying common data set. For example, functions that use the same data (e.g., the same map, or streaming the same video, same computer language libraries etc.) may be identified as utilizing a same underlying common data set (e.g., shared information). The identified functions may be scheduled to execute in the same system (e.g., particular node) or the same pool of systems.

Some embodiments of the method 2530 may further include identifying a new instance of a previously routed transient function at block 2533, and routing the new instance to a same execution environment as the previously routed transient function at block 2534. In some embodiments, block 2531 may be extended with block 2535. For example, the shared information, as illustrated by block 2535, may include one or more of shared code, shared language, and shared data, and may further include sharing of transient information produced by one function and consumed by another function.

Embodiments of the method 2530 may be implemented in a system such as the FaaS system 2540 described in FIG. 25A above, apparatus, computer, device, etc., for example, such as those described herein. More particularly, hardware implementations of the method 2530 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 2530 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 2530 may be implemented on a computer readable medium as described in connection with Examples 2511 to 2513 below. Embodiments or portions of the method 2530 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Additional Notes and Examples

Example 2501 includes an electronic processing system, comprising a processor, memory communicatively coupled to the processor, and logic communicatively coupled to the processor and the memory to identify shared information corresponding to a transient function, and route the transient function to an execution environment based on the identified shared information, wherein the identified information is shared by at least another function.

Example 2502 includes the system of Example 2501, wherein the logic is further to identify a new instance of a previously routed transient function, and route the new instance to a same execution environment as the previously routed transient function.

Example 2503 includes the system of any of Examples 2501 to 2502, wherein the shared information includes one or more of shared code, shared language, and shared data.

Example 2504 includes a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to identify shared information corresponding to a transient function, and route the transient function to an execution environment based on the identified shared information, wherein the identified information is shared by at least another function.

Example 2505 includes the apparatus of Example 2504, wherein the logic is further to identify a new instance of a previously routed transient function, and route the new instance to a same execution environment as the previously routed transient function.

Example 2506 includes the apparatus of any of Examples 2504 to 2505, wherein the shared information includes one or more of shared code, shared language, and shared data.

Example 2507 includes the apparatus of Example any of Examples 2504 to 2506, wherein the logic coupled to the one or more substrates includes transistor channel regions that are positioned within the one or more substrates.

Example 2508 includes a method of providing a function as a service, comprising identifying shared information corresponding to a transient function, and routing the transient function to an execution environment based on the identified shared information, wherein the identified information is shared by at least another function.

Example 2509 includes the method of Example 2508, further comprising identifying a new instance of a previously routed transient function, and routing the new instance to a same execution environment as the previously routed transient function.

Example 2510 includes the method of any of Examples 2508 to 2509, wherein the shared information includes one or more of shared code, shared language, and shared data.

Example 2511 includes at least one computer readable storage medium, comprising a set of instructions, which when executed by a computing device, cause the computing device to identify shared information corresponding to a transient function, and route the transient function to an execution environment based on the identified shared information, wherein the identified information is shared by at least another function.

Example 2512 includes the at least one computer readable storage medium of Example 2511, comprising a further set of instructions, which when executed by the computing device, cause the computing device to identify a new instance of a previously routed transient function, and route the new instance to a same execution environment as the previously routed transient function.

Example 2513 includes the at least one computer readable storage medium of any of Examples 2511 to 2512, wherein the shared information includes one or more of shared code, shared language, and shared data.

Container Merging/Decomposition and State Aggregation and Disaggregation Examples Some embodiments of the enhanced FaaS system, such as the one described above in connection with FIG. 4 description, may advantageously provide container merging and/or decomposition, and/or state aggregation and disaggregation. Functions may conventionally be treated as independent units of execution, without analyzing or taking into account relationship between functions, which may sometimes cause resources to not be optimized or increased IO overhead (e.g., network and local). Some embodiments of the enhanced FaaS system may advantageously provide a function call graph to define relationship between functions. Some related functions may be brought inline, to avoid multiple function calls. Some functions may be decomposed to reduce resource/bandwidth consumption. In some embodiments, dynamic call graphs may be adjusted based on runtime analysis. Some embodiments of the enhanced FaaS system may provide a data ontology for dynamic representation and navigation of state. Advantageously, some embodiments of the enhanced FaaS system may provide better resource utilization, lower IO overhead, and/or increased bandwidth. Some embodiments may not generate overhead if not needed. In some embodiments, a developer can identify how long the function needs to execute before launching the function.

Figure 26A:
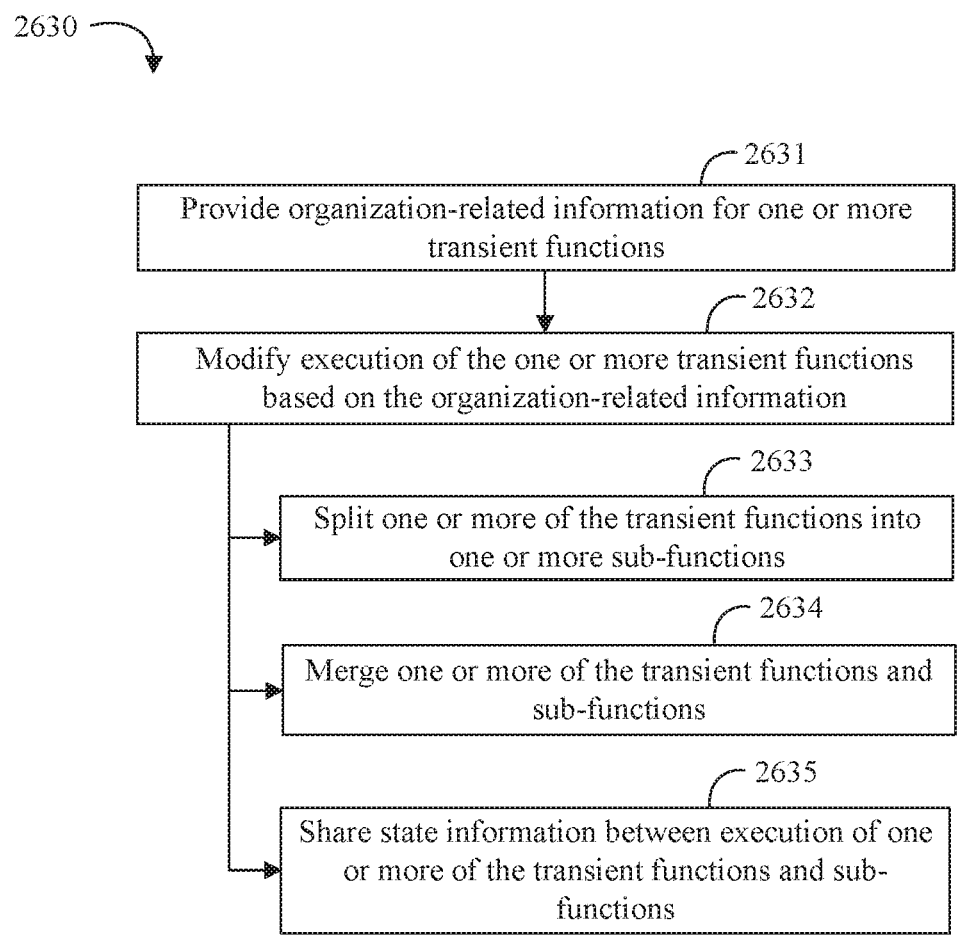
FIG. 26A is a flowchart of another example of providing a function as a service according to an embodiment.

Turning now to FIG. 26A, an embodiment of a method 2630 of providing a function as a service may include providing organization-related information, such as a function call graph to define relationship between functions, for one or more transient functions at block 2631, and modifying execution of the one or more transient functions based on the organization-related information at block 2632. Some embodiments of the method 2630 may further include splitting one or more of the transient functions into one or more sub-functions at block 2633. The method 2630 may also include merging one or more of the transient functions and sub-functions at block 2634. For example, the method 2630 may include sharing state information between execution of one or more of the transient functions and sub-functions at block 2635.

Embodiments of the method 2630 may be implemented in a system, apparatus, computer, device, etc., for example, such as those described herein. More particularly, hardware implementations of the method 2630 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 2630 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 2630 may be implemented on a computer readable medium as described in connection with Examples 2614 to 2617 below. Embodiments or portions of the method 2630 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Container Merging/Decomposition for Efficient Execution Examples

Figure 26B:
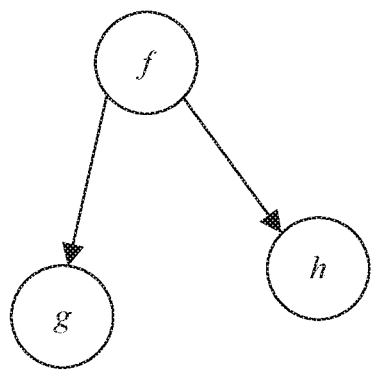
FIG. 26B is an illustrative diagram of a function call graph according to an embodiment.

Turning now to FIG. 26B, an embodiment of a function call graph 2640 may provide organization-related information for transient functions f, g, and h. As noted above, functions identified as being dependent may cause overhead increase, poor resource utilization, etc., due to one or more dependencies among the functions. In the example shown in FIG. 26B, functions g and h depends on function f, e.g., functions g and h needs at least one output generated by function f for execution. Some embodiments may advantageously provide organization-related information such as the function call graph 2640 (e.g., through instrumentation to identify when one function leads to another) for efficient function execution.

A call graph may correspond to a control flow graph representing calling relationships between functions. In a weighted call graph, each arc (e.g., originating from a caller function and ending at a callee function) may be tagged with the frequency and/or probability of that call invocation. The call graph may be formed statically and then may be refined dynamically. Based on regions formed within the call graph certain FaaS functions may be merged to reduce the overhead of invocation and data communication. For example, some embodiments may incorporate intra-FaaS function control-flow graphs into a call graph, such that certain FaaS functions may be split into two or more functions.

Figure 26C:
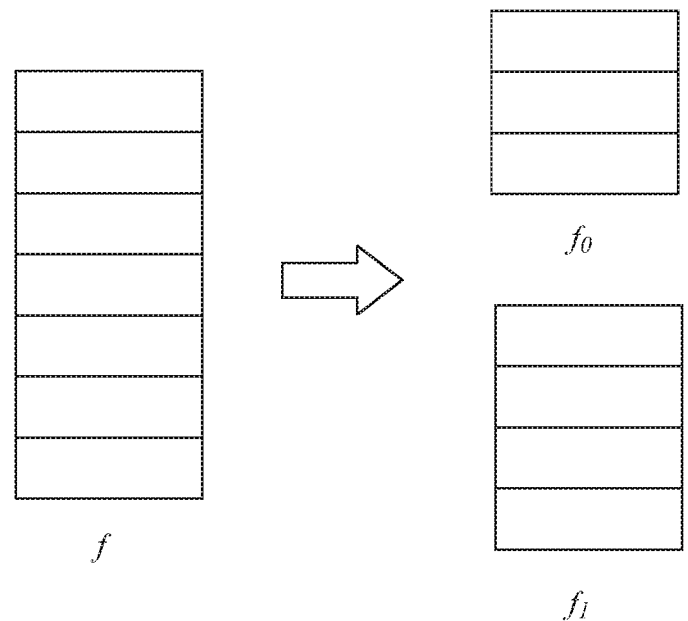
FIG. 26C is an illustrative diagram of splitting a function according to an embodiment.
Figure 26D:
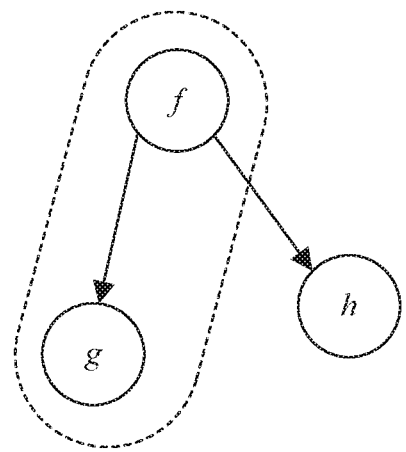
FIG. 26D is another illustrative diagram of a function call graph according to an embodiment.
Figure 26E:
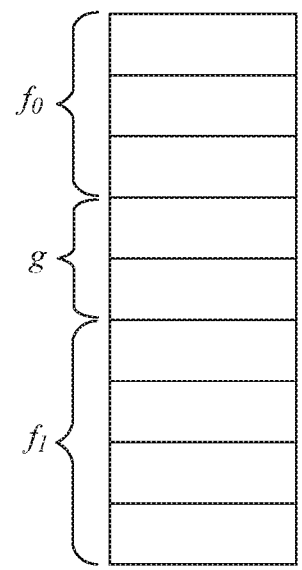
FIG. 26E is an illustrative diagram of merging functions according to an embodiment.

Turning now to FIGS. 26C to 26E, illustrative diagrams show how the function f may be split into two sub-functions $f_0$ and $f_1$ (see FIG. 26C), and subsequently the function g may be merged in between the two sub-functions (see FIGS. 26D and 26E). This decomposition and merge process may help to form a compact and/or efficient sequence of operations. Some embodiments may have a positive impact on a core's cache performance and may also reduce the storage requirement and overhead to keep multiple FaaS functions warm/live at the same time. The control flow path and call paths that are less frequently taken may still need to be provisioned for by inserting appropriate code/call(s) to appropriate FaaS functions in case cold paths are executed.

In some embodiments, code generation may apply compiler techniques (e.g., compiler/code generator from the original lambda) to form superblocks for enhancing instruction level parallelism (ILP). A superblock may correspond to a trace which has no side entrances. For example, control may only enter from the top but may leave at one or more exit points (e.g., a single entry at top, but multiple exits). In some embodiments, profile information may be used to build a superblock from a common path which includes multiple basic blocks.

Some embodiments may be performed by infrastructure (e.g., before scheduling), and/or at runtime by a scheduler. Some embodiments may also utilize co-location of data. For example, some embodiments may deliver a function to data, instead of vice versa, because the cost of moving the data is more than the cost of moving the function. Some embodiments may utilize inlining technology. For example, when an identified function 2 will be called by function 1 with reasonable certainty, some embodiments may inline code of function 2 into function 1, instead of a separated call (e.g., see FIG. 26E). After inlining, the FaaS system does not need to go outside to execute function 2, get scheduler, or download function. As such, inlining may increase efficiency and/or reduce overhead of the enhanced FaaS system. In some embodiments, the scheduler may execute the inline operation. In some embodiments, even after function 1 is inlined with function 2 to generate new merged code, the original function 1 and function 2 codes are still nonetheless stored (e.g., not removed or deleted). By doing so, the original functions 1 and 2 still retain independence to execute separately from each other. For example, if an error occurs when the new merged code is executed, there is the possibility that the inlining was incorrectly executed. In such a case, the original functions 1 and 2 are still retained and may execute independently of each other in a non-inlined fashion with separated function calls.

Some embodiments of the enhanced FaaS system may additionally, or alternatively, utilize outlining technology. For example, some embodiments may remove parts of a same function that are less likely to be executed (e.g., remove the else statement from an if-else statement so it almost never executes). The removed parts may be configured as a separate program/function. Outlining may advantageously provide smaller downloads for each function. Dynamic profiling may identify the "hotness" information (e.g., probability or frequency) of paths in a code, and store the hotness information in the enhanced FaaS system for use. For example, the different paths of the same function may be identified, and then referenced against the hotness information to determine a likelihood of each of the paths occurring. The paths that have associated hotness information (e.g., probability or frequency of occurrence) above a threshold are retained. Other paths that do not have hotness information that is above the threshold are removed and placed as separate programs/functions.

In one particular example, a function may have an "if-else" statement. The hotness information indicates that the "if" statement has a 100% probability of executing, whereas the "else" statement has a 10% probability of executing. If the threshold is set to a 30% probability, the system may conclude that the "if" statement is to be retained but the "else" statement is to be removed and placed as a separate function call. If, however, the hotness information indicated that the "else" statement probability is 40%, the system may conclude that the "else" statement is not to be removed and should be retained. The threshold may be dynamically set based on different factors, such as the available hardware, cache availability, bandwidth availability, priority information of the function (e.g., if the function has a high priority and is essential to complete in short time, then do not break apart the function), etc.

Some embodiments of the enhanced FaaS system may identify functions that operate on the same data (e.g., which may otherwise be unrelated), and put the functions together in same location as the data. Some embodiments may determine metrics to identify whether to perform any merging/decomposition (e.g., minimum 5 minutes execution time for all functions).

State Aggregation and Disaggregation to Facilitate Function Reuse Examples

Many FaaS frameworks may support the notion of reuse of functions that are "pure" or stateless. Thus, a container may be initialized with a memory layout for a function whose internal state is constant, for practical purposes, but which may be provided with new inputs as incoming parameters. That stateless function may then produce an output (e.g., which again is not a part of the function's state). This statelessness is not always beneficial. Sometimes a larger intent may best be met by a single container that is mapped to different submodules that happen to update a common state (e.g., instead of always decomposing that intent into separate functions that have to explicitly move data from one function to another function). Additionally, if the union of the needed functions is too large to fit into a single container, or if breaking the container up is desirable for modularity, then the needed flowing of output from one function to another in a chain of functions adds a lot of data movement and memory management overheads.

Figure 27A:
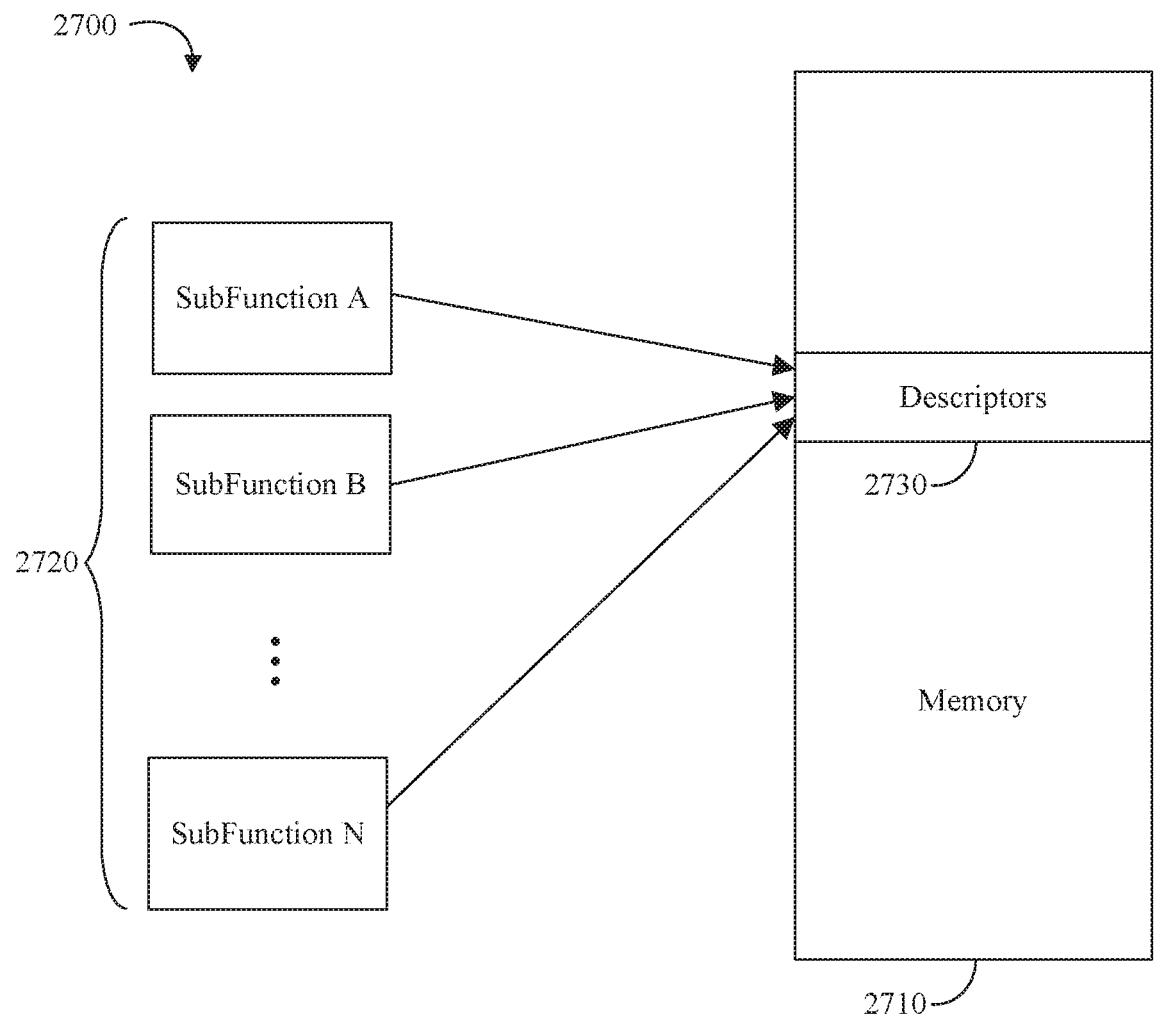
FIG. 27A is a block diagram of another example of an enhanced FaaS system with a shared memory by multiple functions according to an embodiment.

Turning now to FIG. 27A, an embodiment of an enhanced FaaS system 2700 may include a memory 2710 which may be shared by two or more sub-functions 2720 (e.g., SubFunction A through N) through the utilization of organization related information such as descriptors 2730. Some embodiments of the enhanced FaaS system 2700 may advantageously provide technology to avoid the overheads of unnecessary fragmentation of containers. For example, a data ontology may provide for dynamic representation and navigation of state. For example, the total amount of state that is to be logically transferred as output from one function to another may be divided up into a hierarchy of descriptors and described using the ontology. The hierarchy of descriptors may describe how the total information in a consuming function is to be aggregated, according to a shared ontology among the subFunctions.

As a result, state information that does not need to change from a previous function X to a next function Y just remains in place behind a common descriptor that is passed from X to Y, and all other state information may be treated in Y as an overlay (e.g., replace or extend) over that common descriptor. In this way, functions may be intentionally organized to operate on data that is accessed with accessor techniques, and these accessor techniques may both use the descriptors and perform any overlays needed, so that the body of each of the subFunctions remains, by itself, stateless. For example, some embodiments may follow the concept of "apply functions to data" without moving the data from one memory region to another. Some embodiments may instead operate upon the data in-place but indirectly through the descriptors that are passed.

Figure 27B:
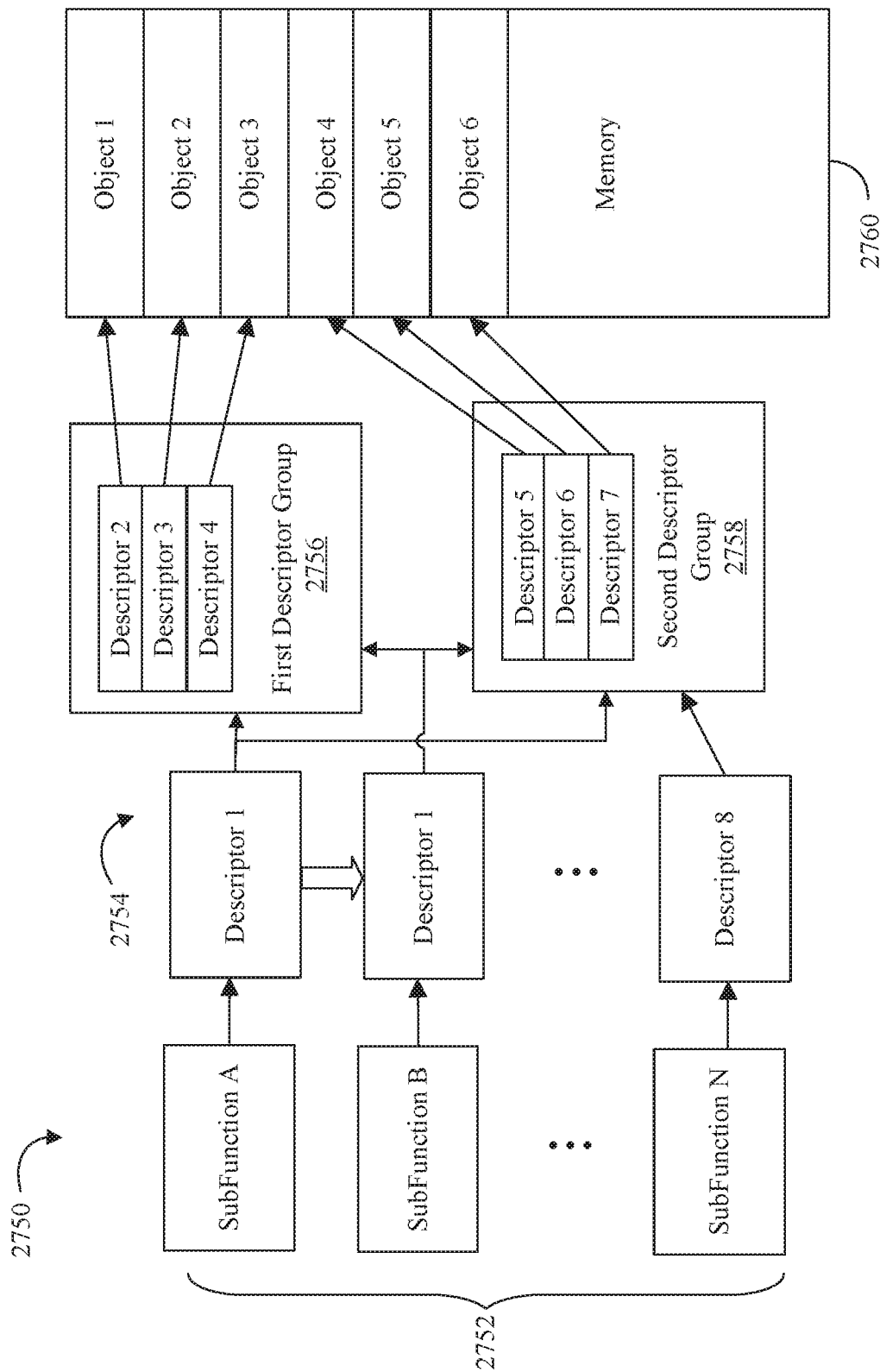
FIG. 27B is a block diagram of another example of an enhanced FaaS system with a shared memory by multiple functions according to an embodiment.

FIG. 27B shows a detailed view of a hierarchy of descriptors 2754 and first and second descriptor groups 2756, 2758 that ultimately refer to objects 1-6 in memory 2760. The hierarchy of descriptors 2754 and descriptor groups 2756 and 2758 may be explicitly defined by a programmer, or may be arrived at implicitly from a data flow analysis performed over functions 2752 and objects in memory 2760, and where such data flow analysis is either explicitly initiated by a programmer or implicitly initiated by the FaaS system itself. In some embodiments, a programmer may explicitly specify some objects and generate and use descriptors for them and place them into a hierarchy, while other objects and their descriptors may be organized into a hierarchy through the use of object naming and referencing mechanisms in file systems, symbol tables, databases, etc. It shows two levels of descriptor transfers, although it is also possible to perform other types of descriptor transfers at different levels in the hierarchy. The first level of descriptor transfers includes descriptors 2754. The descriptors 2754 demonstrate transferring a top-level descriptor (e.g., descriptor 1) from SubFunction A to SubFunction B so that SubFunction B is able to access all of the objects previously accessible to SubFunction A. For example, after SubFunction A completes execution, descriptor 1 may be passed to SubFunction B. The second level of descriptor transfers includes the first and second descriptor groups 2756, 2758. The first and second descriptor groups 2756, 2758 are a generation of new top-level descriptors that may be transferred through the first level of descriptor transfers. Each of the first and second descriptor groups 2756, 2758 refers to only half of the second-level descriptors 2-7 that are referenced from descriptor 1. Various descriptor hierarchies of various depths are possible. It is worth noting that the first level descriptors 2754 may also be able to be modified to point to different ones of the first and second descriptor groups 2756, 2758.

Additional Notes and Examples

Example 2600 includes at least one computer readable storage medium, comprising a set of instructions, which, when executed by a computing device, cause the computing device to provide organization-related information for one or more transient functions, modify execution of the one or more transient functions based on the organization-related information, wherein the modification may include one or more of a split and a merge of one or more of the transient functions into one or more sub-functions, share state information between execution of one or more of the transient functions and sub-functions, and move one or more of the transient functions and sub-functions to be co-located with data utilized by the one or more of the transient functions and sub-functions.

Example 2601 includes an electronic processing system, comprising a processor, memory communicatively coupled to the processor, and logic communicatively coupled to the processor and the memory to provide organization-related information for one or more transient functions, and modify execution of the one or more transient functions based on the organization-related information.

Example 2602 includes the system of Example 2601, wherein the logic is further to split one or more of the transient functions into one or more sub-functions.

Example 2603 includes the system of any of Examples 2601 to 2602, wherein the logic is further to merge one or more of the transient functions and sub-functions.

Example 2604 includes the system of any of Examples 2601 to 2602, wherein the logic is further to share state information between execution of one or more of the transient functions and sub-functions.

Example 2605 includes a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to provide organization-related information for one or more transient functions, and modify execution of the one or more transient functions based on the organization-related information.

Example 2606 includes the apparatus of Example 2605, wherein the logic is further to split one or more of the transient functions into one or more sub-functions.

Example 2607 includes the apparatus of any of Examples 2605 to 2606, wherein the logic is further to merge one or more of the transient functions and sub-functions.

Example 2608 includes the apparatus of any of Examples 2605 to 2606, wherein the logic is further to share state information between execution of one or more of the transient functions and sub-functions.

Example 2609 includes the apparatus of Example any of Examples 2605 to 2608, wherein the logic coupled to the one or more substrates includes transistor channel regions that are positioned within the one or more substrates.

Example 2610 includes a method of providing a function as a service, comprising providing organization-related information for one or more transient functions, and modifying execution of the one or more transient functions based on the organization-related information.

Example 2611 includes the method of Example 2610, further comprising splitting one or more of the transient functions into one or more sub-functions.

Example 2612 includes the method of any of Examples 2610 to 2611, further comprising merging one or more of the transient functions and sub-functions.

Example 2613 includes the method of any of Examples 2610 to 2611, further comprising sharing state information between execution of one or more of the transient functions and sub-functions.

Example 2614 includes at least one computer readable storage medium, comprising a set of instructions, which, when executed by a computing device, cause the computing device to provide organization-related information for one or more transient functions, and modify execution of the one or more transient functions based on the organization-related information.

Example 2615 includes the at least one computer readable storage medium of Example 2611, comprising a further set of instructions, which, when executed by the computing device, cause the computing device to split one or more of the transient functions into one or more sub-functions.

Example 2616 includes the at least one computer readable storage medium of any of Examples 2614 to 2615, comprising a further set of instructions, which, when executed by the computing device, cause the computing device to merge one or more of the transient functions and sub-functions.

Example 2617 includes the at least one computer readable storage medium of any of Examples 2614 to 2615, comprising a further set of instructions, which, when executed by the computing device, cause the computing device to share state information between execution of one or more of the transient functions and sub-functions.

Container Value Hash Cache Examples

Some embodiments of the enhanced FaaS system may advantageously provide a container value hash cache. A container value may correspond to any type of data that may be stored in a container (e.g., a KV-store, text, code, a compressed executable image, parameters used in a function invocation, results from a function execution, etc.) Memory is a limited resource, and container values take up memory space. Some container values may be used by many functions, and IO bandwidth is required to load/reload such container values. Some embodiments may provide a hash index to reduce the amount of memory needed to access a shared container value. In some embodiments, a shared container value may be loaded into cache. Some embodiments may pin one or more container values to avoid an overhead of reloading the container values (e.g., mark the container value to be persistently retained in cache/memory).

Figure 28A:
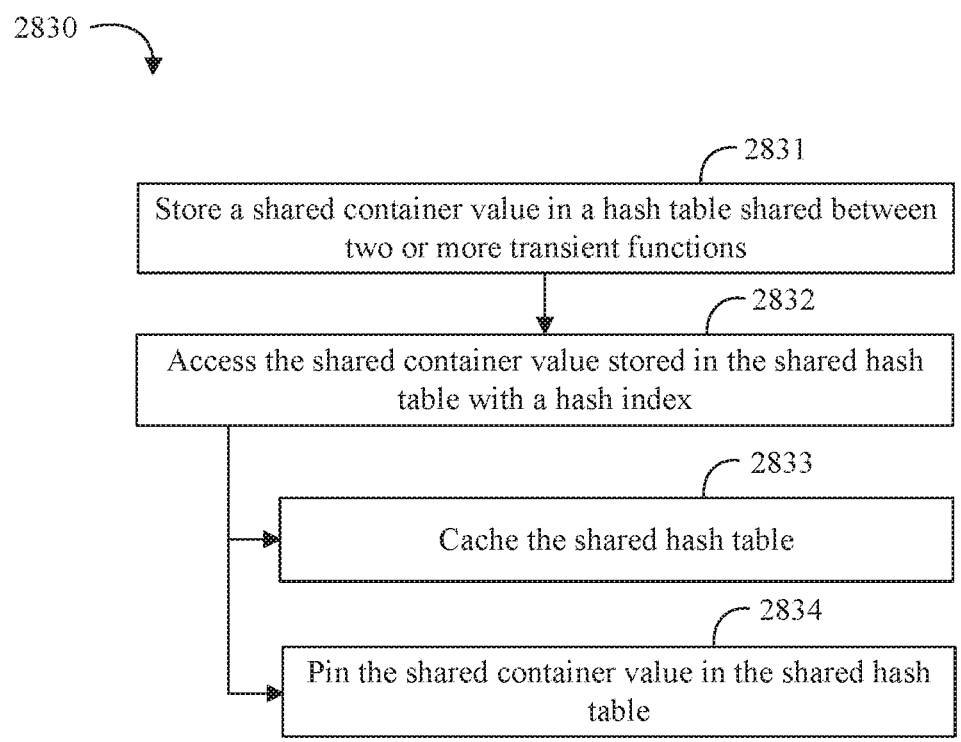
FIG. 28A is a flowchart of providing a function as a service according to an embodiment.

Turning now to FIG. 28A, an embodiment of a method 2830 of providing a function as a service may include storing a shared container value in a hash table shared between two or more transient functions at block 2831, and accessing the shared container value stored in the shared hash table with a hash index at block 2832. Some embodiments of the method 2830 may further include caching the shared hash table at block 2833. The method 2830 may also include pinning the shared container value in the shared hash table at block 2834.

Embodiments of the method 2830 may be implemented in a system, apparatus, computer, device, etc., for example, such as those described herein. More particularly, hardware implementations of the method 2830 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 2830 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 2830 may be implemented on a computer readable medium as described in connection with Examples 2811 to 2813 below. Embodiments or portions of the method 2830 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments of the enhanced FaaS system, such as the one 2840 described below with connection of FIG. 28B, may advantageously provide a container value hash cache. In some other FaaS systems, repetitious constants are not shared between functions. Functions are treated differently in some other FaaS systems, such that the functions don't share values. Some embodiments of the enhanced FaaS system 2840 may advantageously provide a hash table to store shared constants utilized by the container. Functions may advantageously reference the hash table, thereby saving IO bandwidth, memory space, power utilization, compute resources etc., which might otherwise be needed to load the shared container value(s).

Figure 28B:
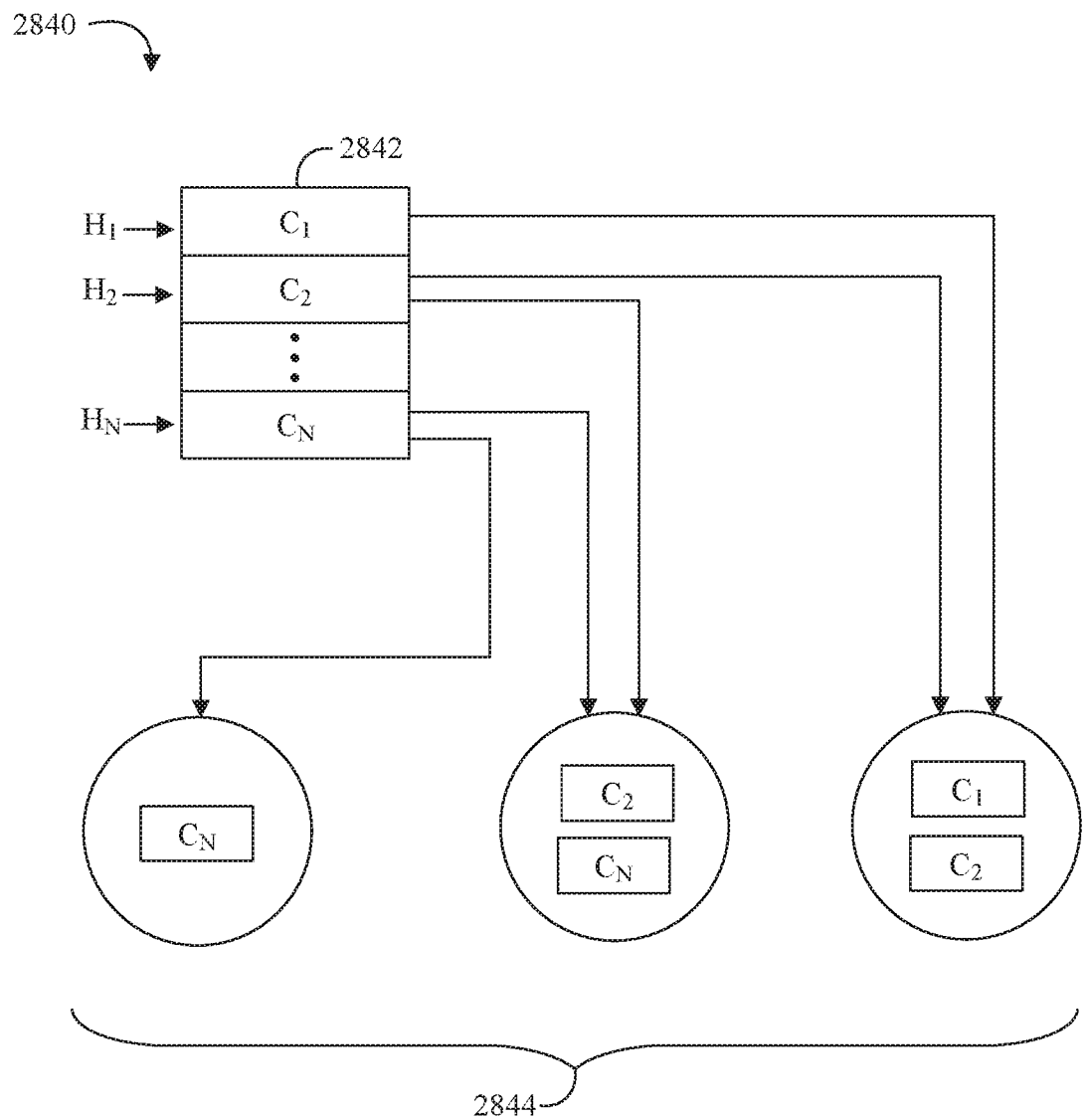
FIG. 28B is a block diagram of another example of a FaaS system according to an embodiment.

Turning now to FIG. 28B, an embodiment of an enhanced FaaS system 2840 may include a hash table 2842 that maybe shared by one or more transient functions 2844. The hash table 2842 may be indexed by a hash value (e.g., $H_1$ through $H_N$) to return a corresponding shared container constant value (e.g., $C_1$ through $C_N$).

Some embodiments of the enhanced FaaS system 2840 may provide a constant value cache that may be populated when the process/lambda/container starts and may store large constant values (e.g., twiddle factors for computing an Fast Fourier Transform (FFT), neural network filter values, etc.,) in a separate cache. For sixty-four (64) different double float constants (e.g., 64 bits each), for example, some embodiments may use a six (6) bit index to access them (e.g., $2^6$ index values to index 64 different constants). These values may be compile time or load time (e.g., when injecting inference lambdas to warmed up neural net containers) constants. The compiler/JIT/code generator may first load the constant values to the constant value cache at the beginning of the lambda/container initialization with a special store instruction. Subsequently regular loads corresponding to the constant values may be replaced with a special load instruction which indicates an index to the constant value cache. Some embodiments of the enhanced FaaS system 2840 may advantageously improve cache performance by a more compact encoding of loads. For example, some fields (e.g., MOD field that specifies an addressing mode, and SIB field that specifies the scale, index, and base for computing memory addresses) of particular architecture instruction formats that are required for memory references may not be needed for references to the constant value cache. Some embodiments may also free up memory ordering buffer (MOB) entries and remove the requirement to check for store forwarding, etc. for load instruction reading from the constant value cache.

Some embodiments of the enhanced FaaS system 2840 may also ensure that the constants are pinned in the constant value cache and will not be kicked out. For example, convolutional neural network (CNN) filter values may be used very frequently during inference. The filter values may be constant, but the large number of input/output channels may make the working set of a CNN much larger than capacity of the cache. As a result, filter values cannot be resident within the cache and in some other systems may be brought back each time from memory over several different function calls, which may be expensive and affect performance. In some embodiments of the enhanced FaaS system 2840, the constant value cache may be loaded once and shared among multiple lambda/processes (e.g., including multiple inference lambdas using the same CNN filter values), which may advantageously save compute, memory, and/or IO resources.

Additional Notes and Examples

Example 2801 includes an electronic processing system, comprising a processor, memory communicatively coupled to the processor, and logic communicatively coupled to the processor and the memory to store a shared container value in a hash table shared between two or more transient functions, and access the shared container value stored in the shared hash table with a hash index.

Example 2802 includes the system of Example 2801, wherein the logic is further to cache the shared hash table.

Example 2803 includes the system of any of Examples 2801 to 2802, wherein the logic is further to pin the shared container value in the shared hash table.

Example 2804 includes a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to store a shared container value in a hash table shared between two or more transient functions, and access the shared container value stored in the shared hash table with a hash index.

Example 2805 includes the apparatus of Example 2804, wherein the logic is further to cache the shared hash table.

Example 2806 includes the apparatus of any of Examples 2804 to 2805, wherein the logic is further to pin the shared container value in the shared hash table.

Example 2807 includes the apparatus of Example any of Examples 2804 to 2806, wherein the logic coupled to the one or more substrates includes transistor channel regions that are positioned within the one or more substrates.

Example 2808 includes a method of providing a function as a service, comprising storing a shared container value in a hash table shared between two or more transient functions, and accessing the shared container value stored in the shared hash table with a hash index.

Example 2809 includes the method of Example 2808, further comprising caching the shared hash table.

Example 2810 includes the method of any of Examples 2808 to 2809, further comprising pinning the shared container value in the shared hash table.

Example 2811 includes at least one computer readable storage medium, comprising a set of instructions, which, when executed by a computing device, cause the computing device to store a shared container value in a hash table shared between two or more transient functions, and access the shared container value stored in the shared hash table with a hash index.

Example 2812 includes the at least one computer readable storage medium of Example 2811, comprising a further set of instructions, which when executed by the computing device, cause the computing device to cache the shared hash table.

Example 2813 includes the at least one computer readable storage medium of any of Examples 2811 to 2812, comprising a further set of instructions, which when executed by the computing device, cause the computing device to pin the shared container value in the shared hash table.

Inverse/Undo Container Examples

Some embodiments of the enhanced FaaS system may advantageously provide an inverse/undo container. In a FaaS system, cancel requests or crashes may leave some resources in an indeterminate state. In some embodiments, a reverse/undo function may be registered to clean up resources affected by a crash/cancel request. Some embodiments may provide better resource utilization, and/or fewer indeterminate states.

Figure 29A:
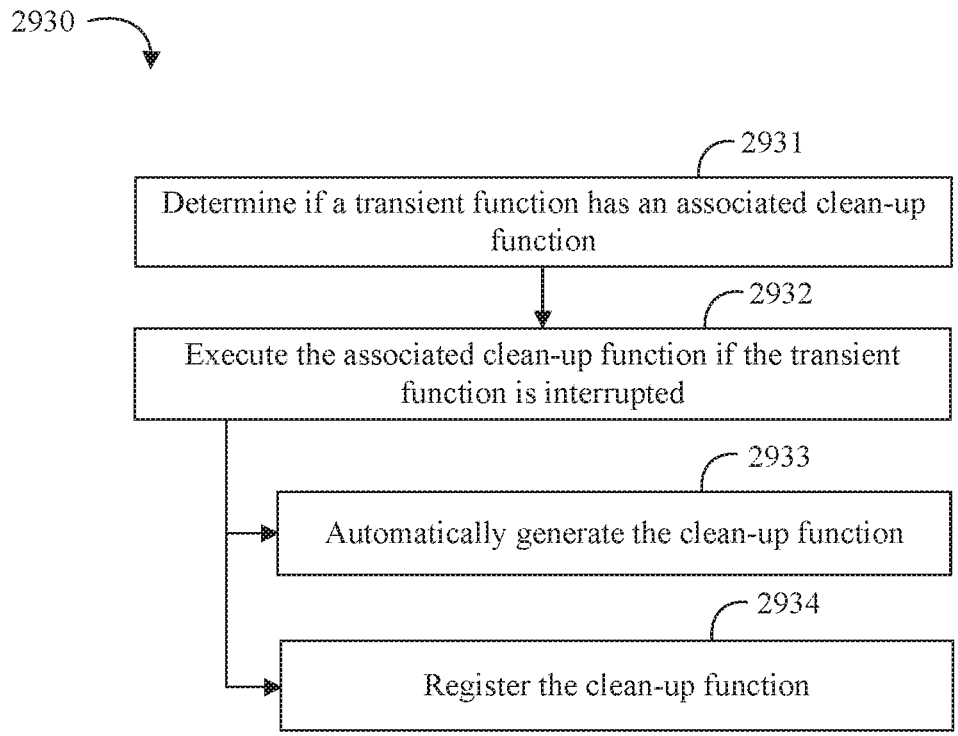
FIG. 29A is a flowchart of providing a function as a service which supports container reversal features according to an embodiment.

Turning now to FIG. 29A, an embodiment of a method 2930 of providing a function as a service may include determining if a transient function has an associated clean-up function at block 2931, and executing the associated clean-up function if the transient function is interrupted at block 2932. Some embodiments of the method 2930 may further include automatically generating the clean-up function at block 2933. The method 2930 may also include automatically registering the clean-up function at block 2934.

Embodiments of the method 2930 may be implemented in a system, apparatus, computer, device, etc., for example, such as those described herein. More particularly, hardware implementations of the method 2930 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 2930 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 2930 may be implemented on a computer readable medium as described in connection with Examples 2911 to 2913 below. Embodiments or portions of the method 2930 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some FaaS system may be considered stateless. An example of "stateless" FaaS system is that there is no monitored state of functions being executed by the FaaS system. If a system or function crashes, a problem may occur because there is no state recorded. For example, if a function modifies some data and then crashes, the system may not be able to determine where to pick up from or how to proceed to finish the function, clean up and start over (e.g., the FaaS system doesn't know what data to undo). Some embodiments of an enhanced FaaS system as such as the one 2940 shown in FIG. 29B may advantageously provide a specialized function to undo damage (e.g., complementary or included in the same function) as an inverse to the original function.

Figure 29B:
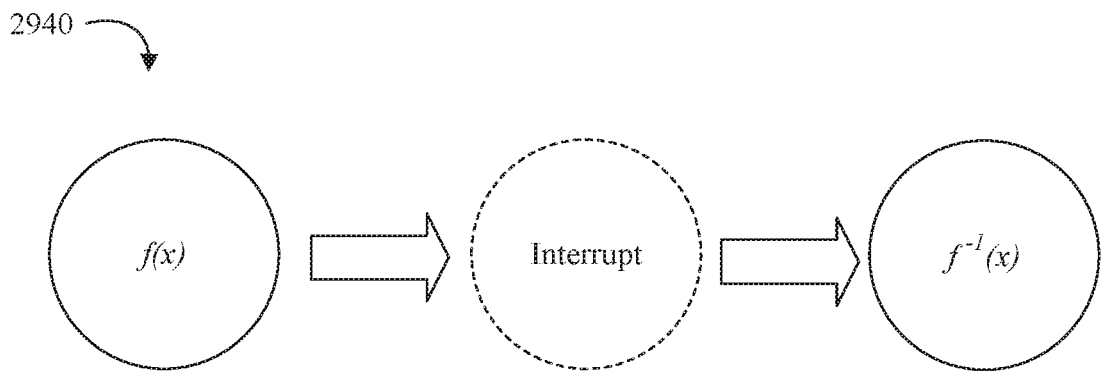
FIG. 29B is a block diagram of an example of a FaaS system which supports container reversal features according to an embodiment.

Turning now to FIG. 29B, an embodiment of an enhanced FaaS system 2940 may invoke a function $f(x)$, which may be interrupted prior to completion. For example, such an interruption may correspond to a cancellation of the function, a crash of the function $f(x)$, a crash of the FaaS system 2940, a loss of a needed resource, etc. Following the interruption, some embodiments of the FaaS system 2940 may invoke a clean-up function $f^{-1}(x)$ to address one or more issues caused by the interruption of the function $f(x)$. For example, the function $f^{-1}(x)$ may be considered as an undo function, an inverse function, a reverse function, etc.

Traditional FaaS functions, e.g., Amazon Web Services (AWS) Lambda™, are supposed to be stateless, which may have some externally visible side effects. For example, a lambda function may update a database entry or invoke another lambda function that itself may have some other externally visible side effects. For example, an order for an item delivery may invoke a series of FaaS functions/lambda functions. If the order is canceled at any point the cancelation request needs to be propagated and certain updates/actions may need to be undone. Some embodiments of the enhanced FaaS system 2940 may perform an undo function by invoking the same chain with the original parameters such as JSON objects, but to undo the side effects, etc.

Some embodiments of the enhanced FaaS system 2940 may register a reverse/undo version of a FaaS function/lambda function to be invoked instead of the actual lambda to clean up the side effects includes the undo lambda function may be provided by the application developer or may be generated automatically by a code generator. For example, the undo lambda function may include a combination of undo logging and may utilize backward slice generation in a bottom up, modular manner (e.g., similar to C++ destructor calls to delete member objects).

Additional Notes and Examples

Example 2901 includes an electronic processing system, comprising a processor, memory communicatively coupled to the processor, and logic communicatively coupled to the processor and the memory to determine if a transient function has an associated clean-up function, and execute the associated clean-up function if the transient function is interrupted.

Example 2902 includes the system of Example 2901, wherein the logic is further to register the clean-up function.

Example 2903 includes the system of any of Examples 2901 to 2902, wherein the logic is further to automatically generate the clean-up function.

Example 2904. A semiconductor package apparatus, comprising one or more substrates, and logic coupled to the one or more substrates, wherein the logic is at least partly implemented in one or more of configurable logic and fixed-functionality hardware logic, the logic coupled to the one or more substrates to determine if a transient function has an associated clean-up function, and execute the associated clean-up function if the transient function is interrupted.

Example 2905 includes the apparatus of Example 2904, wherein the logic is further to register the clean-up function.

Example 2906 includes the apparatus of any of Examples 2904 to 2905, wherein the logic is further to automatically generate the clean-up function.

Example 2907 includes the apparatus of Example any of Examples 2904 to 2906, wherein the logic coupled to the one or more substrates includes transistor channel regions that are positioned within the one or more substrates.

Example 2908. A method of providing a function as a service, comprising determining if a transient function has an associated clean-up function, and executing the associated clean-up function if the transient function is interrupted.

Example 2909 includes the method of Example 2908, further comprising registering the clean-up function.

Example 2910 includes the method of any of Examples 2908 to 2909, further comprising automatically generating the clean-up function.

Example 2911. At least one computer readable storage medium, comprising a set of instructions, which, when executed by a computing device, cause the computing device to determine if a transient function has an associated clean-up function, and execute the associated clean-up function if the transient function is interrupted.

Example 2912 includes the at least one computer readable storage medium of Example 2911, comprising a further set of instructions, which when executed by the computing device, cause the computing device to register the clean-up function.

Example 2913 includes the at least one computer readable storage medium of any of Examples 2911 to 2912, comprising a further set of instructions, which when executed by the computing device, cause the computing device to automatically generate the clean-up function.

Container Continuation Passing Style Examples

Some embodiments of the enhanced FaaS system such as the one shown in FIG. 4 may advantageously provide continuation passing styles for containers. FaaS functions are independent execution units and extra overhead may occur when different FaaS functions have some relationship (e.g., passing data between the functions). Some embodiments of the enhanced FaaS system may provide pass down capability to hand off information between function calls. In some embodiments, a conditional function call may be part of the pass down data. Advantageously, some embodiments may provide better resource utilization, reduced IO bandwidth, and/or faster execution.

Figure 30A:
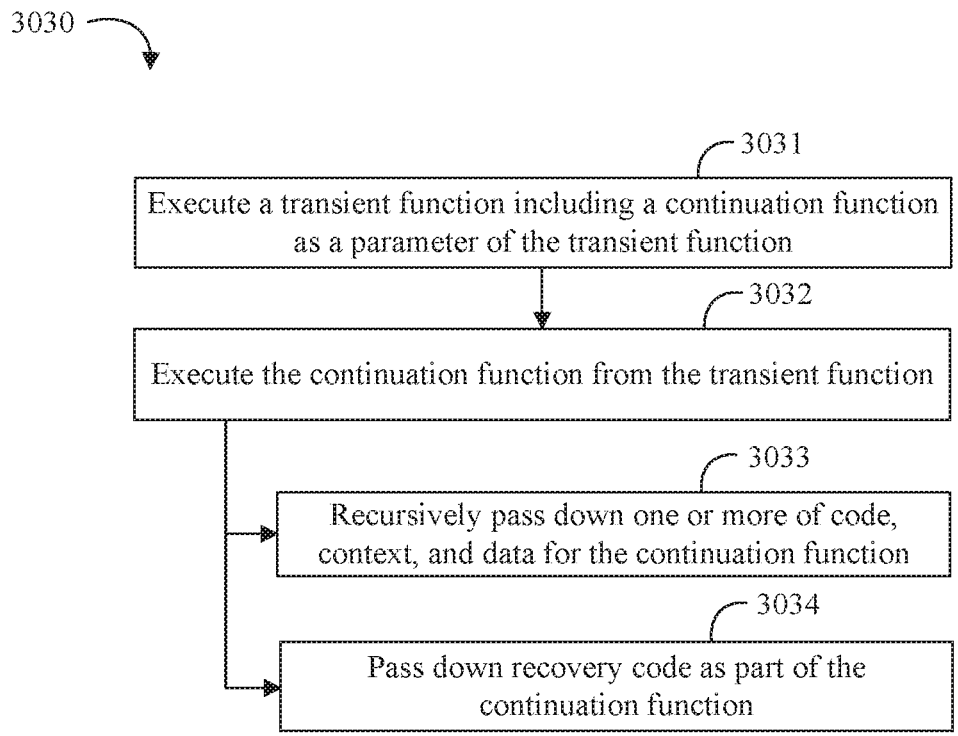
FIG. 30A is a flowchart of providing a function as a service having a continuation application for improved function execution performance according to an embodiment.

Turning now to FIG. 30A, an embodiment of a method 3030 of providing a function as a service may include executing a transient function including a continuation function as a parameter of the transient function at block 3031, and executing the continuation function from the transient function at block 3032. Some embodiments of the method 3030 may further include recursively passing down one or more of code, context, and data for the continuation function at block 3033. For example, the method 3030 may include passing down recovery code as part of the continuation function at block 3034.

Embodiments of the method 3030 may be implemented in a system, apparatus, computer, device, etc., for example, such as those described herein. More particularly, hardware implementations of the method 3030 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 3030 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 3030 may be implemented on a computer readable medium as described in connection with Examples 3011 to 3013 below. Embodiments or portions of the method 3030 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 30B:
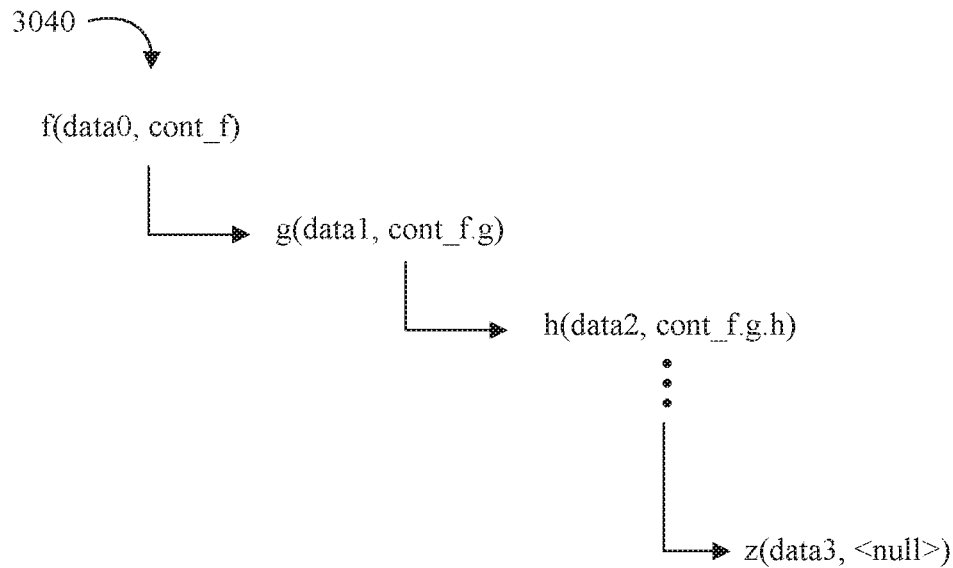
FIG. 30B is a block diagram of an example of a FaaS system having a continuation application for improved function execution performance according to an embodiment.

In some FaaS systems, functions are independent functional units and delegation issues may occur between different functions, since different delegation tactics may affect performance. Some embodiments of the enhanced FaaS system 3040 as shown in FIG. 30B may advantageously pass a continuation function, such as a lambda function or another function, to other callee functions to improve function execution performance. This may be considered a mechanism for enforcing "idempotency" across multiple functions, and it can be more performant to execute idempotent functions. A function with side effects may be considered idempotent if the system state and/or underlying data accessed by the function has the same values after all instances of the function complete execution regardless of how many times the function is invoked without any interleaved executions of other functions. Functions may initially be considered to be side effect free, but there are use cases in which functions modify externally shared resources (e.g., databases and/or data structures), thereby resulting in side effects. Considering the asynchronous nature of function invocations, the approach discussed herein delegates execution of mutating operations (e.g., functions that modify externally shared resources such as databases and/or data structures) to the last function within the call chain.

Turning now to FIG. 30B, an embodiment of an enhanced FaaS system 3040 may include recursive function calls where function $f$ may pass down data and code to invoke function g, function g may pass down data and code to invoke function h, and so on. That is, each continuation function is updated with the current function state of the parent function, and then further passes down the current function state of the continuation function to a child function. So in the illustrated example, function $f$ passes down current function state data (cont_f) to function g. That is, "cont_f" invokes function g and is considered a current function state of function $f$. Function g receives the current function state of function $f$, and updates the function state to "cont_f.g." which also invokes function h and so on. Thus, the invocations also serve to maintain a clear correspondence of function states so that reverse engineering and/or debugging is possible.

Some embodiments of the enhanced FaaS system 3040 may add technology/capabilities to function invocations to be able to pass down code, data, context, etc. to the callee functions. The callee functions may then recursively pass down the code, data, context, etc. For example, function g is the callee of function $f$, which passes data to function g; function h is the callee of function g, which passed data to function h. Some embodiments of the enhanced FaaS system 3040 may advantageously enable delayed execution of certain actions (e.g., actions with externally visible side effects) until certain requirements are met. Some embodiments of the enhanced FaaS system 3040 may also enable pass down recovery/roll back code to be executed if certain exceptions/conditions occur during the function call chain through the above correspondence of the function states. Advantageously, some embodiments of the enhanced FaaS system 3040 may help implement resilient solutions and enable proper/efficient exception handling.

Some embodiments of the enhanced FaaS system 3040 may support continuation passing styles where context and data structures may be passed as standard data-interchange formats such as protocol buffers. Code to be executed may be encapsulated in a lambda function, and lambda address/ID may also be passed along with the context. In some embodiments, the recovery/delayed side effect of lambda code may be extracted by the compiler/code generator from the original lambda.

Additional Notes and Examples

Example 3001 includes an electronic processing system, comprising a processor, memory communicatively coupled to the processor, and logic communicatively coupled to the processor and the memory to execute a transient function including a continuation function as a parameter of the transient function, and execute the continuation function from the transient function.

Example 3002 includes the system of Example 3001, wherein the logic is further to recursively pass down one or more of code, context, and data for the continuation function.

Example 3003 includes the system of any of Examples 3001 to 3002, wherein the logic is further to pass down recovery code as part of the continuation function.

Example 3004 includes a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to execute a transient function including a continuation function as a parameter of the transient function, and execute the continuation function from the transient function.

Example 3005 includes the apparatus of Example 3004, wherein the logic is further to recursively pass down one or more of code, context, and data for the continuation function.

Example 3006 includes the apparatus of any of Examples 3004 to 3005, wherein the logic is further to pass down recovery code as part of the continuation function.

Example 3007 includes the apparatus of Example any of Examples 3004 to 3006, wherein the logic coupled to the one or more substrates includes transistor channel regions that are positioned within the one or more substrates.

Example 3008. A method of providing a function as a service, comprising executing a transient function including a continuation function as a parameter of the transient function, and executing the continuation function from the transient function.

Example 3009 includes the method of Example 3008, further comprising recursively passing down one or more of code, context, and data for the continuation function.

Example 3010 includes the method of any of Examples 3008 to 3009, further comprising passing down recovery code as part of the continuation function.

Example 3011. At least one computer readable storage medium, comprising a set of instructions, which, when executed by a computing device, cause the computing device to execute a transient function including a continuation function as a parameter of the transient function, and execute the continuation function from the transient function.

Example 3012 includes the at least one computer readable storage medium of Example 3011, comprising a further set of instructions, which, when executed by the computing device, cause the computing device to recursively pass down one or more of code, context, and data for the continuation function.

Example 3013 includes the at least one computer readable storage medium of any of Examples 3011 to 3012, comprising a further set of instructions, which when executed by the computing device, cause the computing device to pass down recovery code as part of the continuation function.

Expedient Container Construction and Cache Management Examples

A FaaS system may be an event driven model with periodic and random events. As such, a situation commonly arises in which the same functions and/or functions utilize a same or similar container that include a dataset (e.g., data objects) the functions will utilize during execution. The functions may be executed several times in a short time span. In some architectures, a new container may be used per function execution except for some cases where containers may be re-used through a warm container approach. Maintaining a warm container may consume resources unnecessarily. For example, a warm container may remain idle while waiting for a function for execution. The idle time may be nonproductive. Moreover, container re-use or sharing may be specific to a container and may not be applicable to all situations In contrast, a warm container may be torn down, and a cold container may be started when a function is invoked. Building, initiating or starting up the container may include several stages, such as configuring a namespace and control groups, setting up the network, and setting up an execution environment. The execution environment may include user data and other requirements. Some other requirements may include various keys, CPU/memory/disk capacity reservations or priorities, databases, datasets, key value stores, translation dictionaries, resource usage credits, etc. Further examples of other requirements may also include neural networks, file or network descriptors that have been opened once and then cached for reuse and/or cached resolved images of executables.

As described above, container startup time (cold container startup) has a non-trivial latency and consumes resources. The container startup time may affect FaaS performance, and reduction of the startup time is desirable.

Figure 31A:
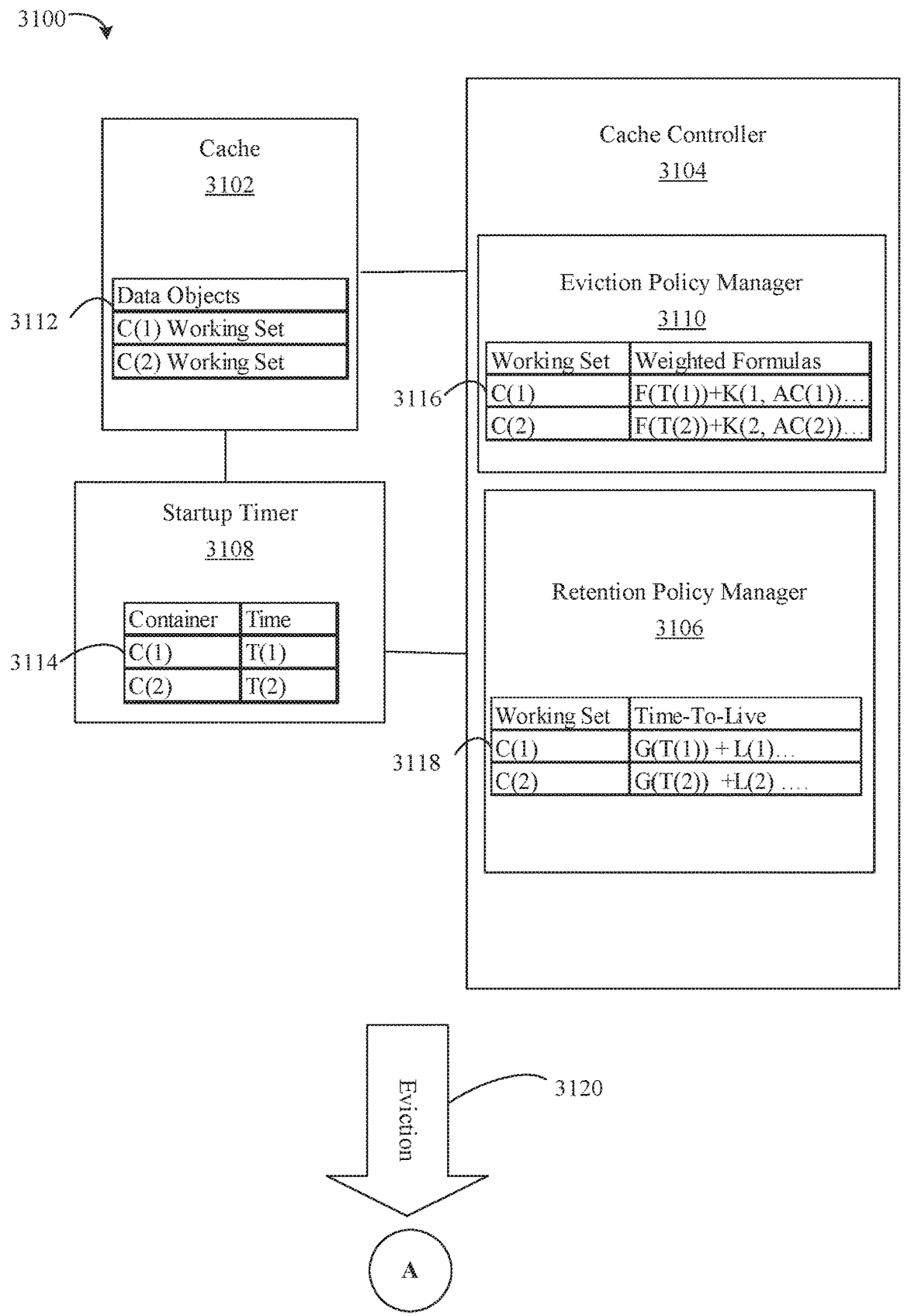
FIGS. 31A and 31B are examples of enhanced container construction and cache management for FaaS according to an embodiment.

Turning now to FIG. 31A, a FaaS example 3100 is illustrated in which a container may be rebuilt in an expedient manner, without utilizing a warm container and/or even storing all data needed to build a container. An enhanced FaaS architecture of example 3100 may include cache 3102, cache controller 3104, retention policy manager 3106 and start-up timer 3108. The cache 3102, cache controller 3104, retention policy manager 3106 and start-up timer 3108 may be a part of a same compute node (e.g., computing device, server, mobile device, etc.). As explained in further detail below, the enhanced FaaS architecture may identify a subset of a container, and store the subset rather than reclaiming or tearing down the container as a whole. The subset may be called a working set. By doing so, warm containers may be torn down to reduce resource consumption, and containers may be quickly rebuilt when needed to decrease latency.

Thus, resources of the container may be referred to as the working set. Thus, a "hot" active working set to be already stored in the cache 3102, while allowing less active parts of the container to be removed. For example, shared working sets may be sets that are shared between functions, and may comprise weights, constants, formulas, databases of common data (e.g., names, images, maps, etc.,) user data, various keys, CPU/memory/disk capacity reservations or priorities, datasets, key value stores, translation dictionaries, resource usage credits, neural networks, file or network descriptors that have been opened once and then cached for reuse and/or cached resolved images of executables. Such working sets may be kept in cache 3102 and managed by the FaaS architecture to grant access to the working sets. Each working set may be assigned a time-to-live that is extended each time a function accesses the working set. The working sets may be evicted from the cache 3102 based on a frequency of use of the data (as explained below), as well as a measurement of start-up time to initiate a container without the working set, and the time-to-live. For example, if a working set has a large frequency of use, that working set may be maintained even if the setup time is short.

As illustrated, the cache 3102 includes a cache space 3112 that stores two working sets: C(1) working set (which may also be referred to as data objects) and C(2) working set (which may also be referred to as data objects). C(1) is an abbreviation for a first container, and C(2) is an abbreviation for a second container. The first and second containers may include datasets that functions utilize during execution. The C(1) working set is the working set for the first container, and the C(2) is the working set for the second container. In the example, both the first and second containers have been torn down and are inactive (e.g., not built). When the first and second containers are torn down, the C(1) and C(2) working sets are maintained in the cache space 3112 to quickly build the first and second containers if invoked. That is, the C(1) working set may be used to build the first container, and the C(2) working set may be used to build the second container.

Thus, maintaining the C(1) and C(2) working sets in cache spaces 3112 may accelerate the subsequent execution of functions in the first or second containers. That is, the first and second containers may be rebuilt at least in part based on the C(1) and C(2) working sets. In some embodiments, the C(1) and C(2) working sets may include all the data to build the first and second containers respectively. In some embodiments, the C(1) and C(2) working sets may include only a subset of data to build the first and second containers respectively. For example, some data may be common to several different containers. Such data may be stored as the C(1) and C(2) working sets, and as such the C(1) and C(2) working sets may each be used to build several different containers. In some embodiments, the C(1) and C(2) working sets may include data objects to begin building of the first and second containers respectively, with the remainder of the data objects to build the first and second containers arriving as the first and second functions are built.

In some embodiments, the first or second container may need further data to support execution of a function. That is, a fully built first or second container may be unable to support a function depending on requirements of the function. Thus, the first or second container may be built and modified to include further data, and to allow the modified first or second container to support the function. The further data may be received from a data source (e.g., another compute node, database server, etc.). The size of the C(1) and C(2) working sets and the first and second container startup times are different for different functions, particularly if the first containers and second containers are to be augmented with further data to facilitate execution.

Some eviction policies may be based almost solely on the frequency of usage and whether new data is to be stored. In FaaS environments, a container startup time (which may be equivalent to function startup time) is nontrivial and therefore may need to be considered during eviction. Thus, the example of 3100 has an enhanced eviction policy for the C(1) and C(2) working sets to consider startup times and enhance container startups.

As illustrated, a start-up timer 3108 is provided. The start-up timer 3108 may measure the startup times of the first and second containers, and store the measured startup times (e.g., build times) as T(1) and T(2) in table 3114. For example, the building time T(1) is the time measurement to build the first container (initial execution). The first container may be considered fully built when the first container can begin execution of a function. Similarly, the building time T(2) (initial execution) is the time measurement to build the second container. The second container may be considered fully built when the second container can begin execution of a function. The table 3114 may be a data structure to store the working sets of each container being built and its build time.

The enhanced cache controller 3104 may control evictions from the cache 3102. The cache controller 3104 may access the table 3114, or receive a message from the start-up timer 3108 that includes the information stored in the table 3114. The cache controller 3104 may utilize the building times T(1) and T(2) when determining evictions from the cache 3102. Thus, the cache controller 3104 may utilize the building times T(1) and T(2) of the first and second containers when determining whether to evict the C(1) working set, or the C(2) working set.

For example, the cache controller 3104 may include an eviction policy manager 3110. The eviction policy manager 3110 may generate different weighted formulas based on the building times T(1) and T(2), and store such values in table 3116. For example, the eviction policy manager 3110 may build a first weighted formula for the C(1) working set. The first weighted formula may include a weighted function F(T(1)). F(T(1)) may be a function that accepts building time T(1) as an input, and outputs a value derived from building time T(1). Likewise, a second weighted formula is generated for the C(2) working set. The second weighted formula may include a function F(T(2)). Function F(T(2)) may be a function that accepts building time T(2) as an input, and outputs a value derived from building time T(2). Table 3116 stores the first and second weighted formulas.

Both of the first and second weighted formulas may include further values as well. For example, the first weighted formula may include function K(1, AC(1)), which may be another function that is based on a frequency of access AC(1) of the C(1) working set. For example, function K(1) may accept a number of accesses AC(1) of the C(1) working set as an input, to produce an output. Likewise, function K(2) may accept a number of accesses AC(2) of the C(2) working set as an input, to produce an output. The first and second weighted formulas may include other values as well. The first and second weighted formulas may be summations of the above functions.

The eviction policy manager 3110 may reference the first and second weighted formulas to determine whether to evict the C(1) working set or C(2) working set from the cache 3102. For example, the eviction policy manager 3110 may determine a first final value that is a total computation of the first weighted formula, and a second final value that is a total computation of the second weighted formula. The first and second final value may be stored in table 3116 of the eviction policy manager 3110. The eviction policy manager 3110 may compare the first and second final values to determine whether to evict the C(1) and C(2) working set. Thus, the eviction policy manager 3110 compares the building times T(1) and T(2) to each other, and/or a number of accesses AC(1) and AC(2) to the C(1) and C(2) working sets.

As an example, the first and second final values may be proportional to a startup time of the first and second containers respectively, and a number of data access AC(1) and AC(2) to the C(1) and C(2) working sets respectively. Thus, if the first final value is greater than the second final value, the C(1) working set may be accessed more than the C(2) working set, and/or the first container may have a higher start up time relative to the second container. Thus, evicting the C(1) working set would result in greater overall latencies relative to evicting the C(2) working set. As such, the eviction policy manager 3110 may evict the C(2) working set based on the first and second final values. Thus, the eviction policy manager 3100 may evict a working set associated with a smallest final value.

The cache controller 3104 may also include a retention policy manager 3106. The retention policy manager 3106 may generate different weighted formulas to determine a time-to-live for the C(1) and C(2) working sets. The time-to-live may be stored in table 3118. For example, the retention policy manager 3106 may build a third weighted formula for the first container. The third weighted formula may include function G(T(1)), that is a function that accepts building time T(1) and a function L(1) as an input, to output a value derived from building time T(1). Likewise, a fourth weighted formula is generated for the second container. The fourth weighted formula may include function G(T(2)), or a function that accepts building time T(2) as an input, as well as a function L(2) to output a value derived from building time T(2). The third and fourth weighted formulas may include other values as well, such as constants and/or a number of data access to the C(1) and C(2) working sets respectively. The value derived from the third weighted formula may be a time-to-live for the C(1) working set, and the value derived from the fourth weighted formula may be a time-to-live for the C(2) working set. Table 3118 shows the third and fourth weighted formulas.

In some embodiments, the retention policy manager 3106 only determines the "time to live" for a working set. The retention policy manager 3106 therefore essentially enables the eviction policy manager 3110 to make a more informed decision about prioritized evictions that are not based solely on the time-to-live. In some embodiments, the results of the retention policy manager 3106 may be used by the eviction policy manager 3110 to make more informed eviction decisions and are a factor in the first and second weighted formulas. In such embodiments, the retention policy manager 3106 may not evict data from the cache 3102, but defer such decisions to the eviction policy manager.

In some embodiments, the retention policy manager 3106 and the eviction policy manager 3110 may operate independently of each other to remove the C(1) and C(2) working sets as needed. For example, the eviction policy manager 3110 may be triggered to evict data in response to a determination that the cache 3102 is full and more free space is required for another FaaS function. The eviction policy manager 3110 may then determine whether the C(1) working set or the C(2) working set is to be evicted as described above. The retention policy manager 3106 may simply identify when a time-to-live is expired and evict the corresponding C(1) or C(2) working set regardless of the amount of free space in the cache 3102. That is, the eviction policy manager 3110 may be triggered to remove working sets by an identification that more free space is needed in the cache 3102, whereas the retention policy manager 3106 may not be triggered by such an identification.

In some embodiments, each working set C(1) and (C2) may have a separate timer. The calculated time-to-live values may be compared against the timers. When one of the timers for one of the working sets C(1) and C(2) meets the time-to-live value for the one working set, the one working set may be evicted. As an example, when the corresponding time-to-live times out, as counted by a counter and identified by the retention policy manager 3106, the C(1) working set or the C(2) working set may be evicted. The timers may be reset every time the C(1) or C(2) working set is accessed. For example, if the C(1) working set is accessed, the timer for the C(1) working set would be reset. In contrast, the C(2) working set timer may not be reset since C(2) was not accessed. The timers may also be reset automatically and/or administratively in response to an identification of a need to release resources or to give high priorities to selected categories of requests. In some embodiments, the timers may not be reset and the time-to-live represents a maximum time-to-live.

The cache 3102 may be hardware cache (e.g., LLC, TLBs) or a software object cache (e.g., Java persistent objects cache). The cache 3102 may be a page cache for example. Furthermore, the cache controller 3104 may control several caches or levels of caches. Moreover, an eviction event may be triggered by a lack of storage space for incoming data, and monitored by the cache controller 3104.

As an example, the first container may execute a first function for image recognition, and the second container may execute a second function for image rotation. An image recognition startup for the first function may involve initializing a neural network of the first container. Therefore, the building time T(1) for the first container may be significantly higher than the building time T(2) for the second container. The memory footprint of image recognition may be higher, and keeping containers alive for re-use may be costly. Further, the frequency of execution of image recognition may be lower than the image rotation function. Thus, the number of accesses to the data of the first container may be lower than to the second container. Nonetheless, from a performance perspective, as the building time T(1) is significantly higher than the building time T(2), the eviction policy manager 3110 may determine that it is not beneficial to evict the C(1) working set (image recognition container) and to evict the C(2) working set (image rotation container). Moreover, maintaining the C(1) working set may enhance the second container startup, since data from the C(1) working set may be identified as being common to both the first and second containers, and utilized during a build of the second container. Therefore, the eviction policy manager 3110 may consider the startup time in cache eviction policies.

Figure 31B:
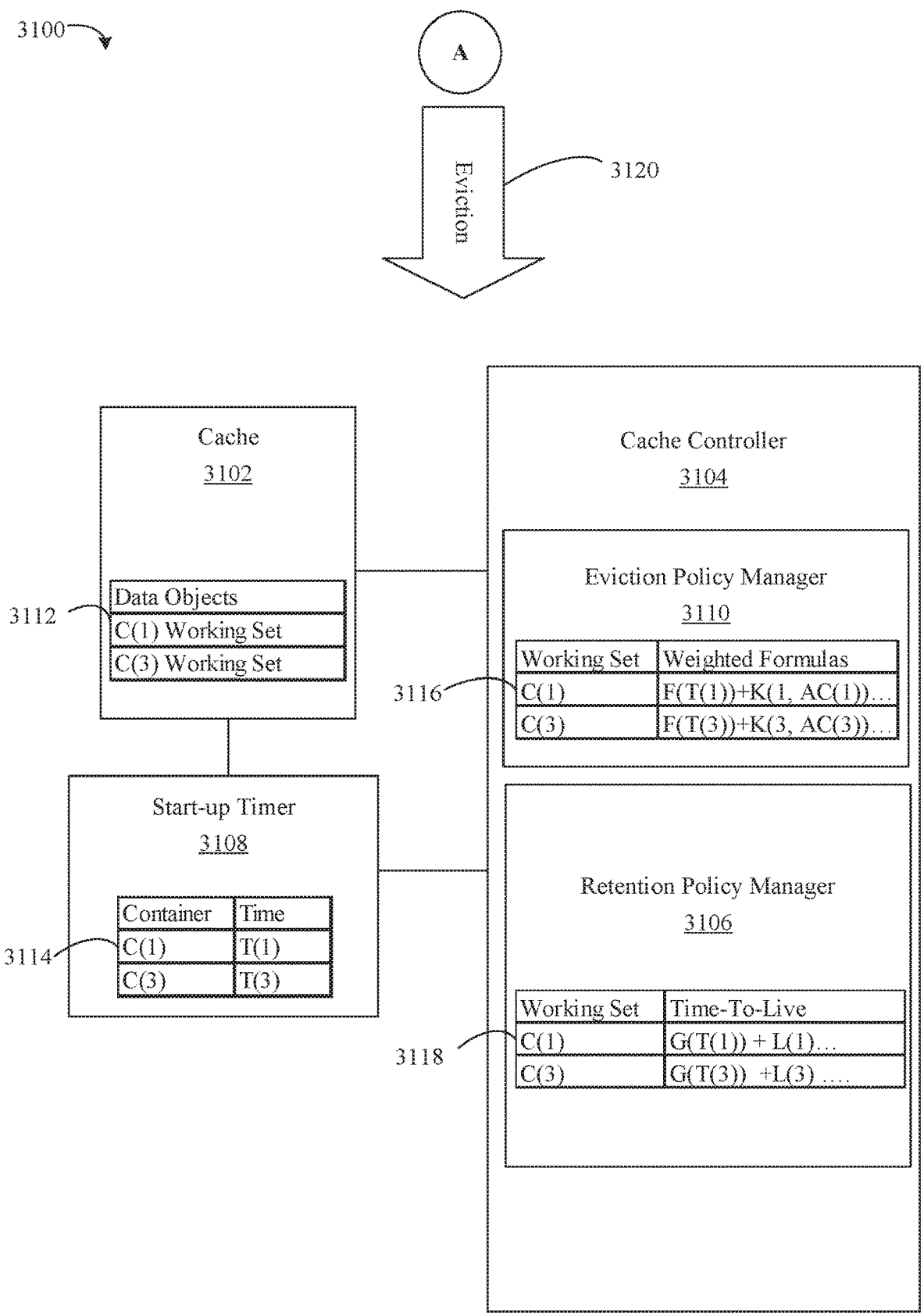

Process 3120 may evict the C(2) working set to accommodate an incoming C(3) working set. The C(3) working set may be data to build a third container, and include data similar to as described above with respect to the C(1) and C(2) working sets. FIG. 31B may be a continuation of the scenario 3100 illustrated by FIG. 31A. As illustrated in FIG. 31B, the C(2) data set and associated data is erased from the cache space 3112, table 3114, table 3116 and table 3118. The cache space 3112, table 3114, table 3116 and table 3118 store data for the third container and C(3) working set, which may be similar to the corresponding data described above.

Figure 31C:
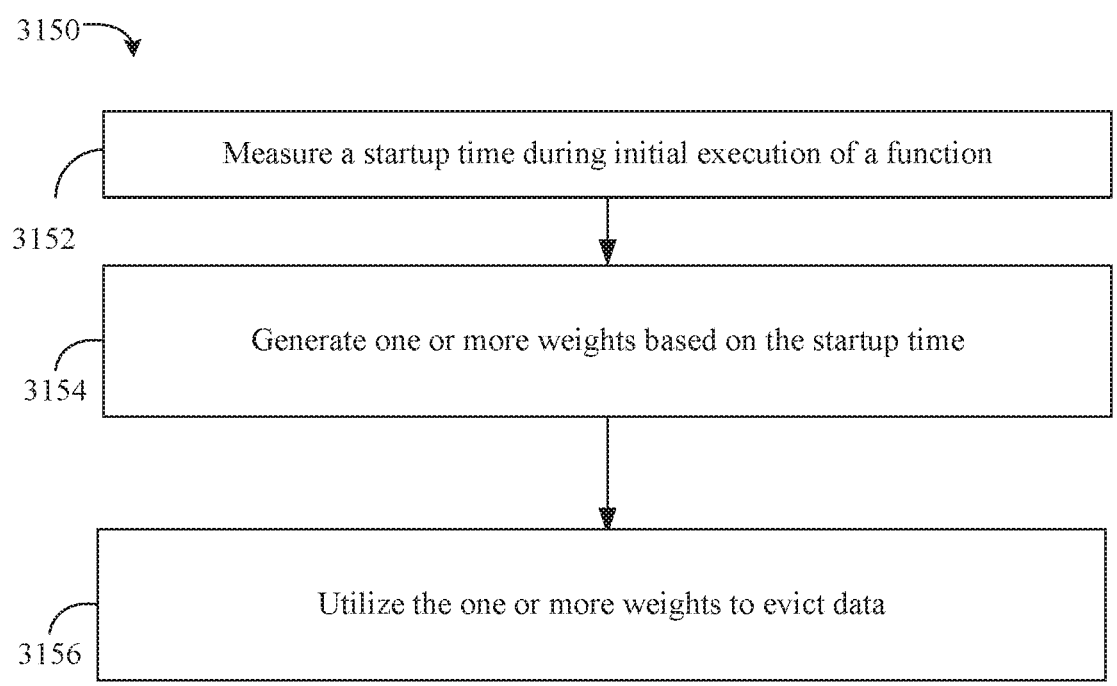
FIG. 31C is a flowchart of an exemplary cache eviction according to an embodiment.

FIG. 31C shows a method 3150 of enhanced cache eviction, and may be implemented in the enhanced FaaS server architecture of FIGS. 31A, and 31B and/or one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

For example, computer program code to carry out operations shown in the method 3150 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 3152 may measure a start-up time during initial execution of a function. The initial execution may only include building of a container to execute the function. For example, the startup time may only be measured from a start of the container build, until the container is built and ready to execute a function. Illustrated processing block 3154 may generate one or more weights based on the startup time. The one or more weights may be proportional to the start-up time. Illustrated processing block 3156 may utilize the one or more weights to evict data. For example, the one or more weights may be used in a weighted algorithm and/or scheme to compute a final value indicating a utility of a working set of the container in a cache, and evict data based on the final value. For example, if the final value is greater than another final value (calculated similarly to as described herein), the working set may not be evicted from the cache, and a different working set, that corresponds to the another final value, may be evicted. Thus, method 3150 may enhance cache eviction.

Figure 31D:
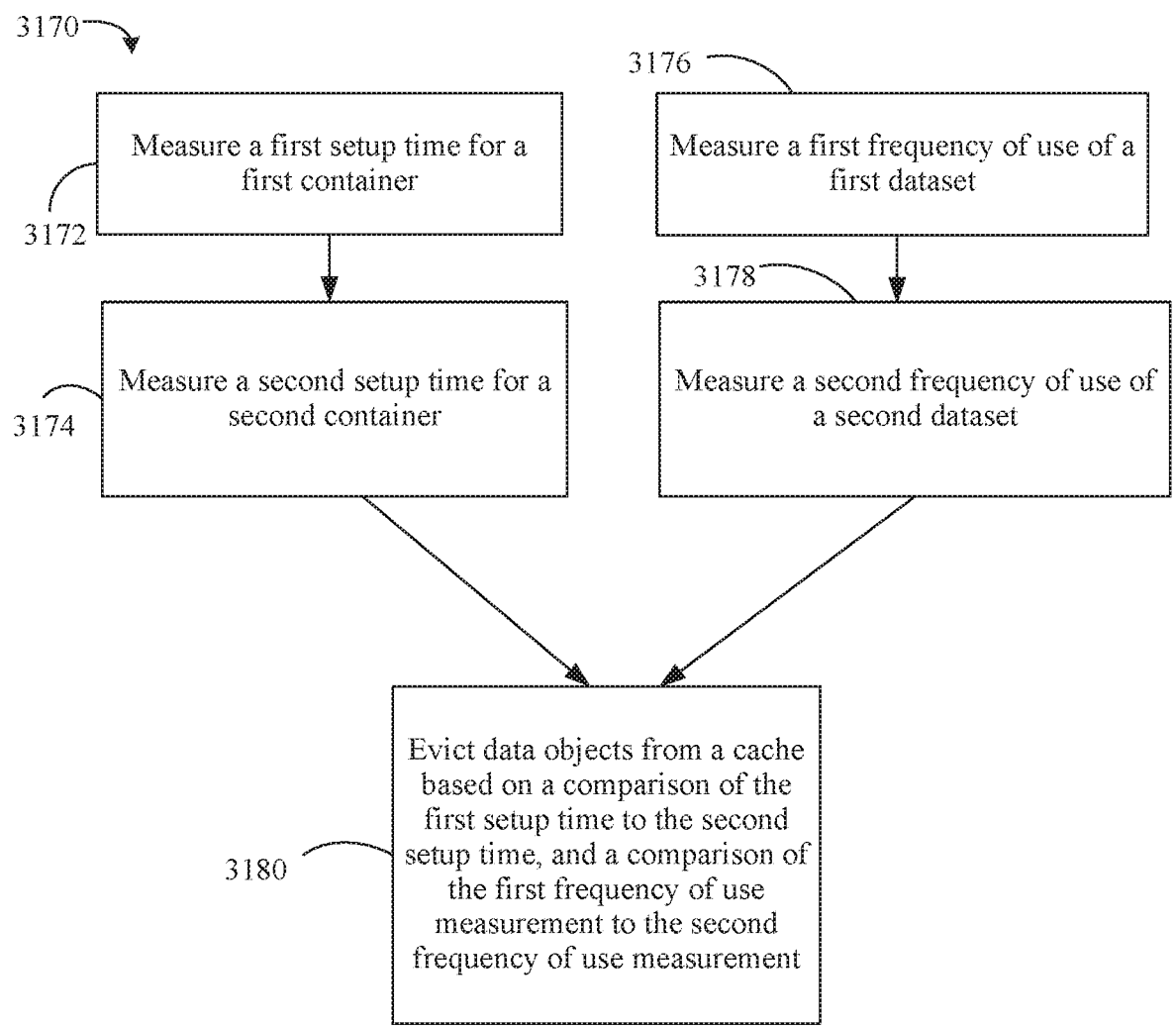
FIG. 31D is a flowchart of another exemplary cache eviction according to an embodiment.

FIG. 31D shows a method 3170 of enhanced cache eviction, and may be implemented in the enhanced FaaS server architecture of FIGS. 31A, and 31B and/or one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

For example, computer program code to carry out operations shown in the method 3170 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 3172 may measure a first setup time for a first container. A first function may execute in the first container after the first container is setup (e.g., built). The first setup time may be a time to configure one or more namespaces of the first container and one or more control groups of the first container, as well as setting up the execution environment. Illustrated processing block 3174 may measure a second setup time for a second container. A second function may execute in the second container after the second container is setup (e.g., built). The second setup time may be a time to configure one or more namespaces of the second container and one or more control groups of the second container, as well as an execution environment. The second function may different from the first function, and the first and second containers may be different from each other.

Illustrated processing block 3176 may measure a first frequency of use (e.g., accesses) of a first data set. The first data set may be data to build the first container. Illustrated processing block 3178 may measure a second frequency of use (e.g., accesses) of a second data set. The second data set may be data to build the second container. An access may mean a read and/or a write.

Illustrated processing block 3180 may evict data objects from a cache based on a comparison of the first setup time to the second setup time. Furthermore, illustrated processing block 3180 may evict the data objects from the cache based on a comparison of the first frequency of use measurement to the second frequency of use of measurement. The data objects may be associated with the first container when the second setup time is greater than the first setup time. For example, the first setup time may be less than the second setup time, and the first frequency of use may be greater than the second frequency of use by a marginal amount. Despite the first frequency of use being greater, the data objects (e.g., the first dataset) of the first container may be evicted since the first setup time is less than the second setup time. The data objects may be or may include the first dataset that initiates the first container.

In some embodiments, if the first frequency of use is greater than the second frequency of use by a large enough magnitude, data objects e.g., the second dataset) associated with the second container, rather than data objects of the first container, may be evicted despite the second setup time being greater than first setup time. For example, if the first frequency of use greater than the second frequency of use by a predetermined amount or is greater than a ratio, the data objects associated with the second container may be evicted. In some embodiments, if a frequency of use of data objects (e.g., a dataset) falls below a certain threshold, the data objects may be evicted without considering startup times. Thus, method 3170 may enhance cache evictions and reduce latency of function executions.

Figure 31E:
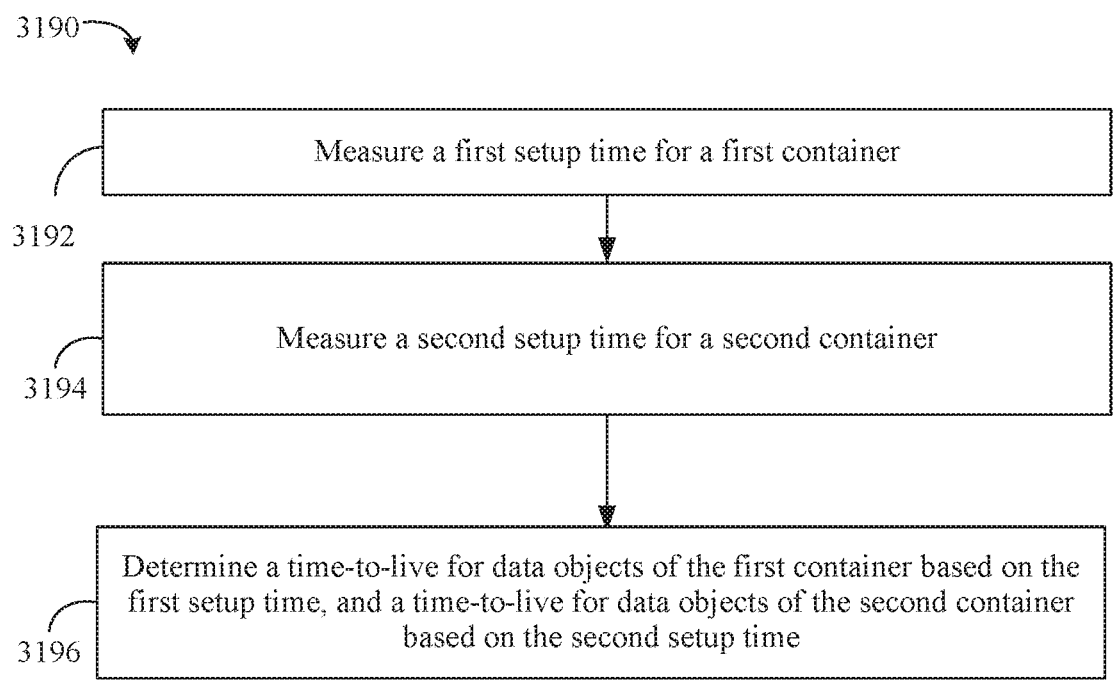
FIG. 31E is a flowchart of determining a time-to-live for cached data objects according to an embodiment.

FIG. 31E shows a method 3190 of enhanced cache eviction, and may be implemented in the enhanced FaaS server architecture of FIGS. 31A, and 31B and/or one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

For example, computer program code to carry out operations shown in the method 3190 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 3192 may measure a first setup time for a first container. As discussed, the first setup time may be a time to build the first container. Illustrated processing block 3194 may measure a second setup time for a second container. As discussed, the second setup time may be the time to build the second container. Illustrated processing block 3196 may determine a time-to-live for data objects of the first container based on the first setup time. The data objects may be stored in a cache. Illustrated processing block 3196 may further determine a time-to-live for data objects of the second container based on the second setup time. The data objects of the second container may be stored in a cache. While not illustrated, the first and second objects may be evicted if the time-to-live expires.

Additional Notes and Examples

Example 3100 includes at least one computer readable medium, comprising a set of instructions, which, when executed by a computing device, cause the computing device to measure a first setup time for a first container, wherein a first function is to execute in the first container, wherein the first setup time is a time to configure one or more namespaces of the first container and one or more control groups of the first container, measure a second setup time for a second container, wherein a second function is to execute in the second container and the second function is different from the first function, wherein the second setup time is a time to configure one or more namespaces of the second container and one or more control groups of the second container, and evict data objects from a cache based on a comparison of the first setup time to the second setup time, and a frequency of use of a first dataset compared to a frequency of use of a second dataset, wherein the first dataset is utilized to build the first container, further wherein the second dataset is used to build the second container, and further wherein the data objects include the first dataset.

Example 3101 includes at least one computer readable medium, comprising a set of instructions, which, when executed by a computing device, cause the computing device to measure a first setup time for a first container, wherein a first function is to execute in the first container, measure a second setup time for a second container, wherein a second function is to execute in the second container and the second function is different from the first function, and evict data objects from a cache based on a comparison of the first setup time to the second setup time, wherein the data objects are associated with the first container.

Example 3102 includes the least one computer readable medium of Example 3101, wherein the first setup time is greater than the second setup time.

Example 3103 includes the at least one computer readable medium of Example 3102, wherein the first setup time is a time to configure one or more namespaces of the first container and one or more control groups of the first container, and the second setup time is a time to configure one or more namespaces of the second container and one or more control groups of the second container.

Example 3104 includes the at least one computer readable medium of Example 3102, comprising a further set of instructions, which, when executed by a computing device, cause the computing device to evict the data objects from the cache based on a frequency of use of the first container.

Example 3105 includes the at least one computer readable medium of Example 3102, comprising a further set of instructions, which, when executed by a computing device, cause the computing device to evict the data objects from the cache based on a frequency of use of a first dataset compared to a frequency of use of a second dataset, wherein the first dataset is utilized to build the first container, wherein the second dataset is used to build the second container, wherein the data objects include the first dataset.

Example 3106 includes the at least one computer readable medium of Example 3102, comprising a further set of instructions, which, when executed by a computing device, cause the computing device to determine a time-to-live for the data objects of the first container based on the first setup time, and determine a time-to-live for data objects of the second container based on the second setup time.

Example 3106 includes the at least one computer readable medium of Example 3100, wherein the data objects include data to initiate the first container.

Enhanced FaaS Function Distribution Examples

As already described herein, some functions may rely on datasets during execution. The datasets may be contained in containers, and so the functions may be provided to an appropriate container to access an appropriate dataset. Some data may be large and/or distributed, such as in Hadoop environments. As such, moving the dataset to the function may be inefficient and/or increase total cost of environment (TCE). That is, the data that functions may touch or modify (e.g., their memory or storage or network footprints) may have a significant bearing on the latency within which the actions complete and on the efficient use of computational resources furnished by the service provider. Some functions and datasets may have increased TCE without specialized computing (e.g., hardware accelerators) as well.

Figure 32A:
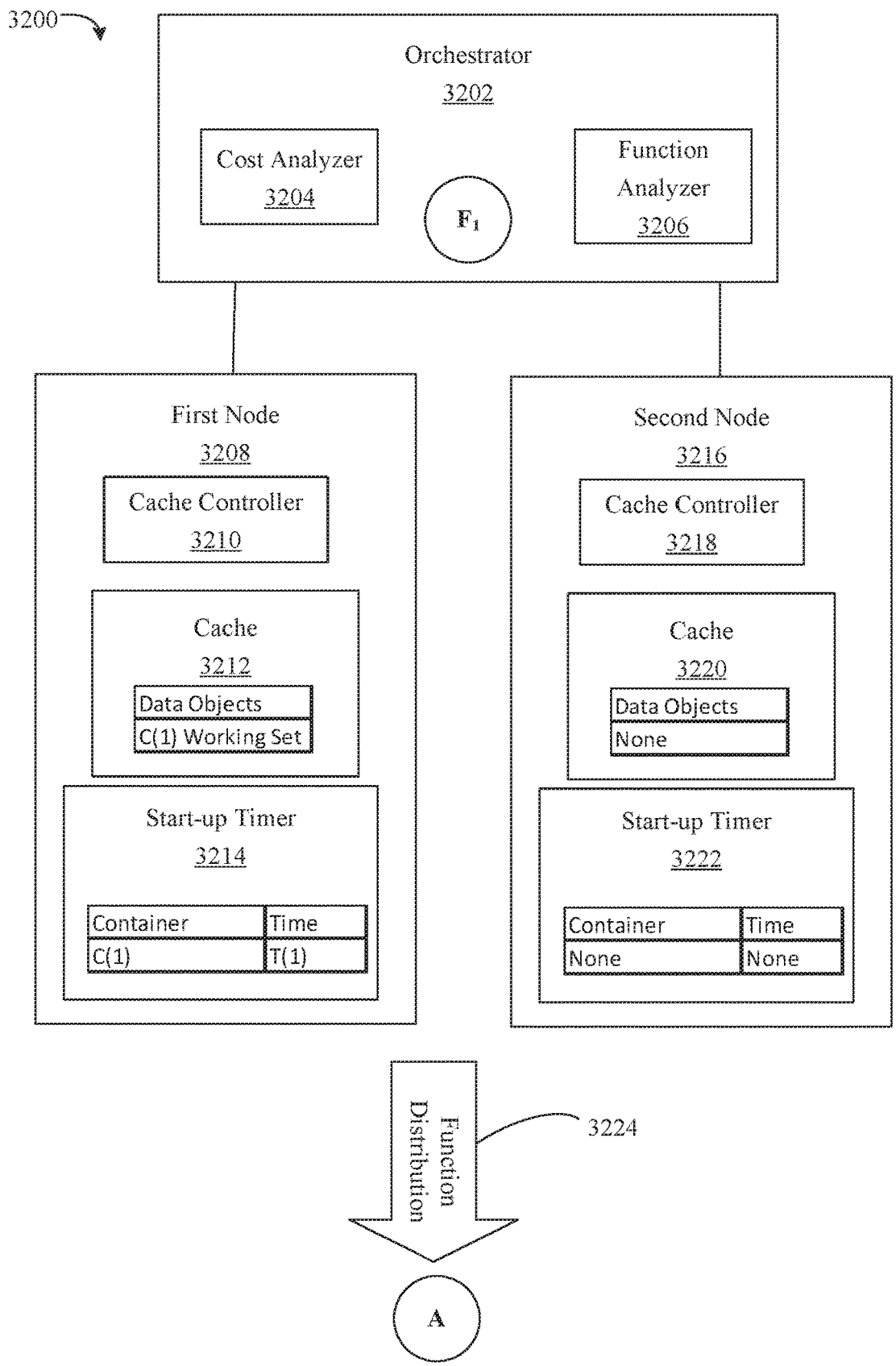
FIGS. 32A and 32B are examples of enhanced function distribution according to an embodiment.

As such, in the example of 3200 of FIG. 32A, an orchestrator 3202 may analyze a FaaS infrastructure to identify a node from first node 3208 and second node 3216 with a lowest latency transfer for a dataset for a function $F_1$. The orchestrator 3202 may schedule the function $F_1$ based on data movement, and data movement costs. For example, a cost analyzer 3204 may determine a total cost of execution of the function $F_1$ at each of the first and second nodes 3208, 3216. The total cost may be a summation of a cost of movement of data and cost of execution. The total cost may further include latency measurements, execution time measurements, resource measurements, secure channel establishments, encryption/decryption or compression/decompression latency measurements, network hop, bandwidth and buffering estimates, and so on. For example, the orchestrator 3202 may determine data object(s) associated with execution of the function $F_1$ and locality of the data objects. The orchestrator 3202 may orchestrate distribution of the function $F_1$ and the data objects based on preferred resource utilization. As such, the orchestrator 3202 may free up resources, reduce a total cost of execution, have lower IO bandwidth, and lower latency function execution.

Similar to the embodiments of FIGS. 31A and 31B, the first node 3208 includes a cache 3212 that stores data objects in a C(1) working set. For the sake of brevity, similar description of similar components will be omitted. For example, the cache controller 3210, cache 3212 and start-up timer 3214 of FIG. 32A may operate similarly to the cache controller 3104, cache 3102 and start-up timer 3108 of FIG. 31A. Likewise, the second node 3216 may operate similarly to the embodiments of FIGS. 31A-31B.

As is understood, C(1) is an abbreviation for a first container. The C(1) working set is the working set for the first container. In the example, the first container has been torn down and is inactive (not built). When the first container is torn down, the C(1) working set is maintained in the cache 3212 to quickly build the first container. That is, the C(1) working set may be used to build the first container.

Figure 33B:
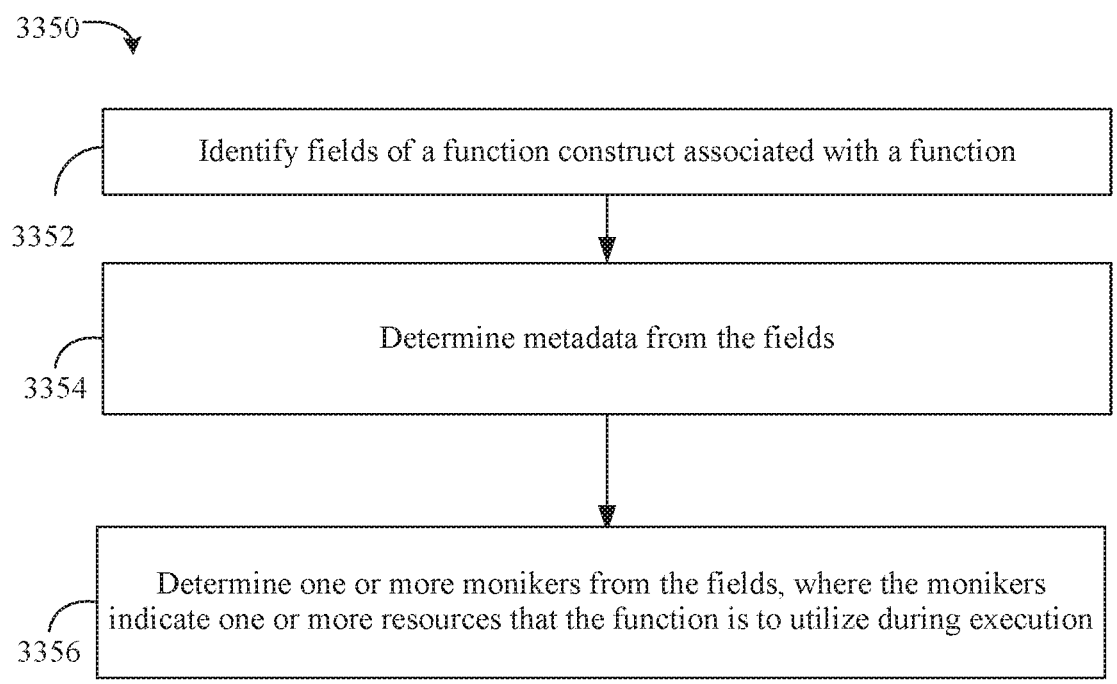
FIG. 33B is a flowchart of moniker identification from an enhanced function construct according to an embodiment.

The orchestrator 3202 may determine whether function $F_1$ may execute in a particular container. For example, the function analyzer 3206 may determine characteristics of optional fields (e.g., metadata) from a function construct of the function $F_1$. FIGS. 33A and 33B and the associated description discuss the function construct at greater length. The metadata describe the association of function $F_1$ with data monikers. A data moniker may be an approximate representation of the identities of a dataset construct. A moniker may be constructed by a set function (e.g., a Bloom Filter) and/or a moniker construction API over various universally unique identifiers of the functions, the caller of a function, specific parameters of a function, file system pathnames associated with a function, Resilient Distributed Dataset lineages in, for example, Spark, tablespace ranges in relational databases accessed by the function and so on. Thus, function analyzer 3206 may interact with a moniker construct API to derive the monikers, and/or include a set function. In some embodiments, the function analyzer 3206 may include the moniker construction API. More details are described below with respect to FIGS. 33A and 33B.

The monikers may be compact representation or description of names of resources (e.g., accelerators, data, weighted formulas, hardware requirements, etc.) that the function $F_1$ may need during execution. The monikers may indicate that a particular dataset may be utilized by function $F_1$ during execution. Such a particular dataset may be referred to as a $F_1$ dataset.

The function analyzer 3206 may determine the monikers based on the metadata, and the function $F_1$ may determine a type of container having a soft affinity with the monikers to determine whether the container may include at least part of the $F_1$ dataset as well as other resources that may be needed during execution. The first and second nodes 3208, 3216 may inform the orchestrator 3202 of any stored working sets (e.g., C(1) working set). The orchestrator 3202 may determine whether the C(1) working set may build a container having a soft affinity to the monikers. In some embodiments, the orchestrator 3202 may determine whether the C(1) working set includes at least part of the $F_1$ dataset.

Thus, the orchestrator 3202 defines an association between the function $F_1$ and the dataset that serves as a latent state to guide storage, cache, and communication efficient scheduling by attracting the function $F_1$ towards a container (e.g., the first container as is described below) that has a highest likelihood of possessing local, warm copies of the data the function $F_1$ will most likely to need during execution. Moreover, the above enhancement may be achieved without breaching a serverless abstraction.

In more detail, in the present example, the function analyzer 3206 may determine that the first container includes at least part of the $F_1$ dataset that the function $F_1$ will utilize during execution. The orchestrator 3202 may determine that the first node 3208 includes the C(1) working set, which as described above may be used to build the first container. As such, the orchestrator 3202 may identify that the first node 3208 may include at least part of the $F_1$ dataset, and steer the function to the first node 3208. For example and prior to building, the orchestrator 3202 may compare the C(1) working set, as stored in the cache 3212, to the $F_1$ dataset to determine that the stored C(1) working set includes at least part of the $F_1$ dataset.

In contrast, the second node 3216 may not include any relevant data objects. While the second node 3216 may include some working sets (unillustrated), those working sets are omitted as they do not include data associated with execution of the $F_1$ dataset.

The cost analyzer 3204 may determine the total costs of the first node 3208 and the second node 3216 to execute the function $F_1$. The total costs may be projected costs, predicted estimates, predicated latencies and/or estimated latencies, with projected or estimated costs and latencies to include costs and latencies of transporting data between the first and second nodes. The total may further include latency measurements, execution time measurements, resource measurements, secure channel establishments, encryption/decryption or compression/decompression latency measurements, network hop, bandwidth and buffering estimates, and so on. The total cost of the first node 3248 may represent the cost to build a container (e.g., the first container or modified version of the first container with added data) at the first node 3208, and execute the function $F_1$ at the first node 3208. The total cost of the second node 3216 may represent the cost to build a container to execute the function $F_1$ at the second node 3216 and execute the function $F_1$ at the second node 3216. The total costs may be compared to determine whether to send the function $F_1$ to the first node 3208 or the second node 3216.

In more detail, the cost analyzer 3204 may determine the total cost of each of the first and second nodes 3208, 3216 to execute the function $F_1$. The total cost may be determined for each of the first and second node 3208, 3218, and may be based on communication costs (e.g., volume of data needed to be transferred to build a container, proximity to the data, etc.,) building costs of a container, execution latency costs (e.g., whether an accelerator is required), and so forth.

For example, an execution latency cost may be reduced if a node from the first and second nodes 3208, 3216 includes an accelerator to facilitate execution of the function $F_1$ and/or includes sufficient resources to support the function $F_1$. The execution costs may be increased if there is a lack of resources to support the function $F_1$ or an accelerator is not supported by the node. The orchestrator 3202 may assign the function $F_1$ to a node from the first and second nodes 3208, 3216 based on a comparison of the total costs, or one of the first and second nodes 3208, 3216 having the lowest total cost.

For example, the second node 3216 may present a higher latency (e.g., a higher latency cost) to execute the function $F_1$ relative to the first node 3208. In detail, the second node 3216 may need to receive all data to build a container for function $F_1$, and then build the container. In contrast, the first node 3208 may quickly build the first container from the C(1) working set locally stored in the cache 3212 and modify the first container if needed with further data, to thereby avoid at least some of the communication latency cost presented by the second node 3216. Thus, due to the overlap between the $F_1$ dataset and the C(1) working set, the communication latency of the first node 3208 may be reduced relative to the second node 3216, thereby reducing the overall cost for the first node 3208. As a result, the total cost to execute function $F_1$ at the first node 3208 may be less than the total cost to execute function $F_1$ at the second node 3216.

In some embodiments, the C(1) working set may only include a portion of the $F_1$ dataset, with the remainder of the data arriving at the first node 3208 before construction or during construction of the first container. In such an embodiment, the cost analyzer 3204 may include the cost to transfer the remainder of the data as part of the total cost to execute the function $F_1$ at first node 3208. After the first node 3208 receives the remainder of the data, the first container may be augmented with the remainder of the data to execute the function $F_1$.

Figure 32B:
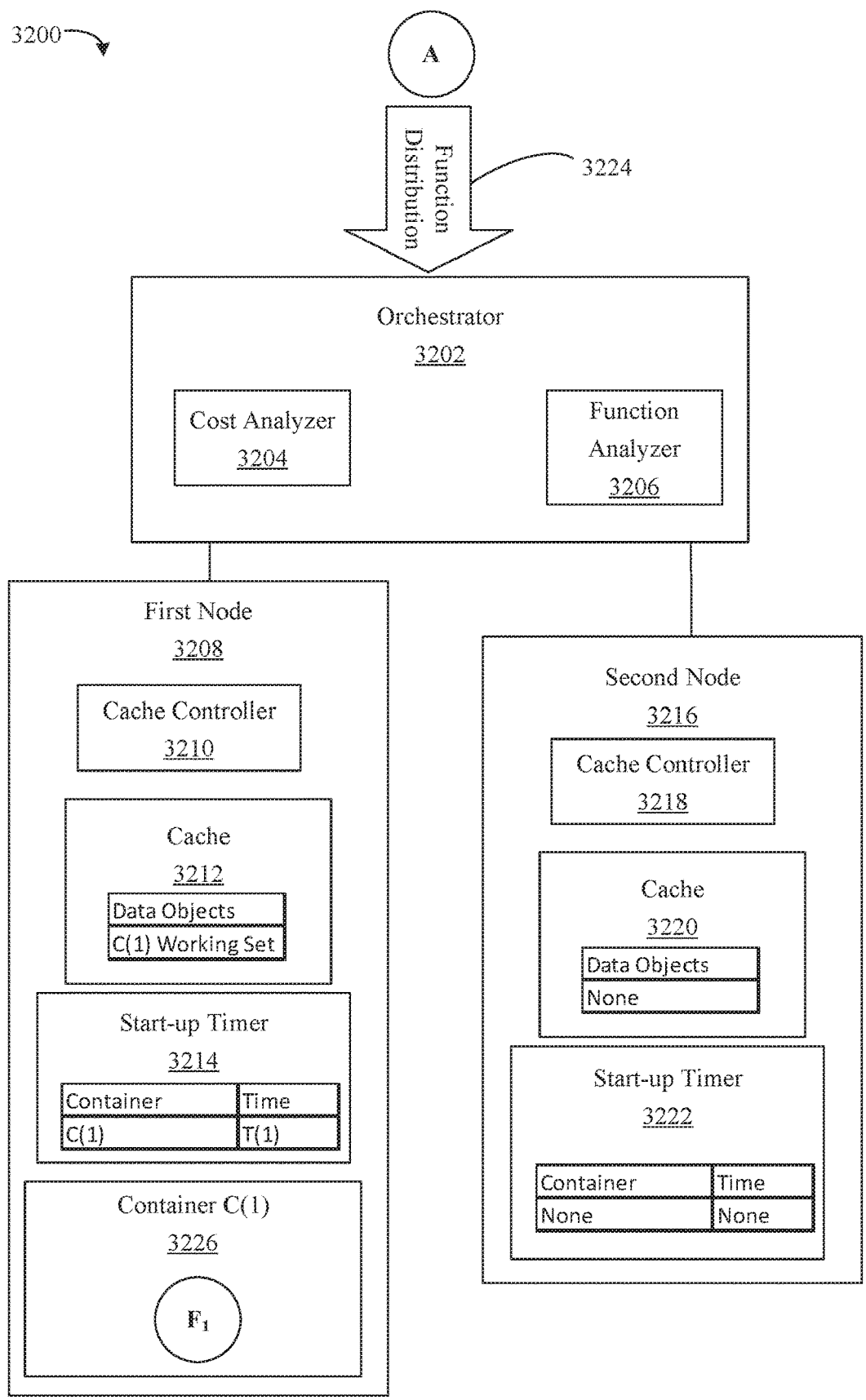

In the present example, the orchestrator 3202 may determine that the total cost for the function $F_1$ to execute at the first node 3208 is less than the total cost to execute the function $F_1$ at the second node 3216. Process 3224 may distribute function $F_1$. In detail, the orchestrator may provide the function $F_1$ to the first node 3208. As illustrated in FIG. 32B, the first node 3208 builds the container C(1) 3226 (e.g., the first container) in the first node 3208, and based on the C(1) working set stored in the cache 3212.

In some embodiments, the container C(1) may be augmented with further data not included in the C(1) working set to facilitate execution of the function $F_1$. The function $F_1$ may then begin execution. For example, the first node 3208 may receive some data that the function $F_1$ utilizes during execution, and may add that data to the container C(1) during the building of the container C(1).

Figure 32C:
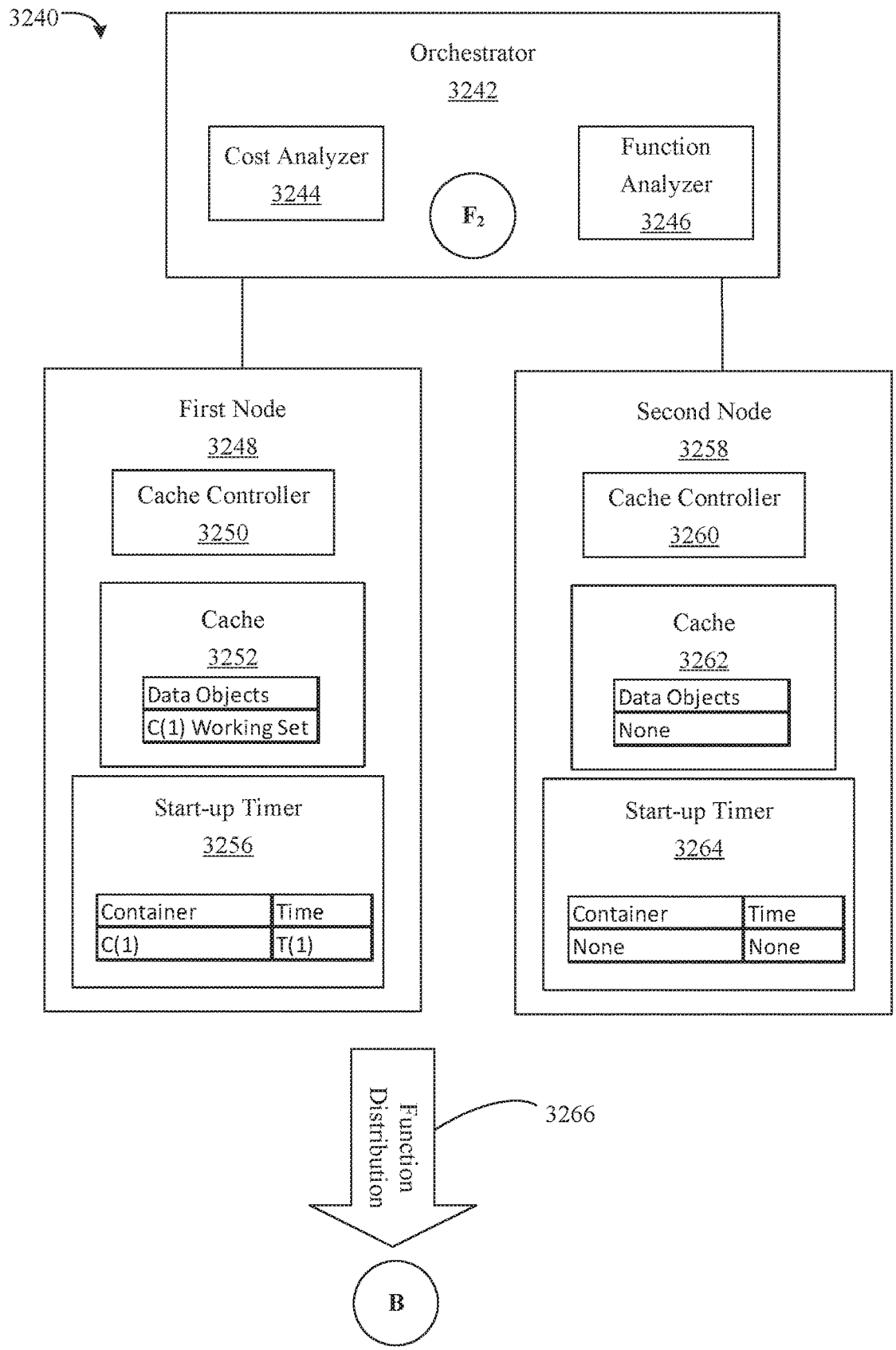
FIGS. 32C and 32D are s examples of enhanced function distribution according to an embodiment.

Turning to FIG. 32C, an example 3240 is illustrated. For the sake of brevity, like components to those as illustrated in FIGS. 32A, 32B will not be reiterated here. It will be understood that the corresponding components may, however, operate similarly to each other.

In the example 3240, a function $F_2$ is to be assigned by the orchestrator 3242. Similar to the above embodiments, the first node 3248 includes a C(1) working set to construct a first container to execute the function $F_2$, while the second node 3258 contains no such working set.

The function analyzer 3246 may analyze the function $F_2$ to determine a $F_2$ dataset. The orchestrator 3242 may determine that the C(1) working set includes only a first part of the $F_2$ dataset. As such, a second part of the $F_2$ dataset must be transmitted to the first node 3248 in order to execute the function $F_2$ at the first node 3248. The second node 3258 may not include any relevant working sets, and so a new container will need to be built at the second 3258 to execute the function $F_2$.

The cost analyzer 3244 may determine the total costs of the first node 3248 and the second node 3258. The total cost for the first node 3248 may include the cost to transmit the second part of the $F_2$ dataset to the first node 3248. The first node 3248 may be distal to a data source that is to transmit the second part of the $F_2$ dataset to the first node 3248. The data source may be another node, and may the closest node to the first node 3248 that has the second part of the $F_2$ dataset. The cost analyzer 3244 may therefore determine that the communication cost to transmit the second part of the $F_2$ dataset is high, and that the total cost for the first node 3248 is correspondingly high.

The total cost for the second node 3258 may be the cost to receive all building data to build the first container. In this present example however, the second node 3258 may be positioned proximate to the data source. The data source may include all the building data, and may be able to transmit the building data to the second node 3258. As such, the communication cost of the second node 3258 may be significantly lower than the communication cost of the first node 3248. Due to the significant difference between the communication costs, the second node 3258 may have a lower overall cost even though no working set is present. That is, the orchestrator 3242 may determine that it is more efficient (lower latency) to execute function $F_2$ at the second node 3258 due to lowered data transfer costs of the second node 3258, despite the second node 3258 having no working set. Thus, the orchestrator 3242 may build containers at nodes closer to data sources to reduce latency costs, rather than building containers at nodes (even with relevant working sets) that are farther away from data sources.

Figure 32D:
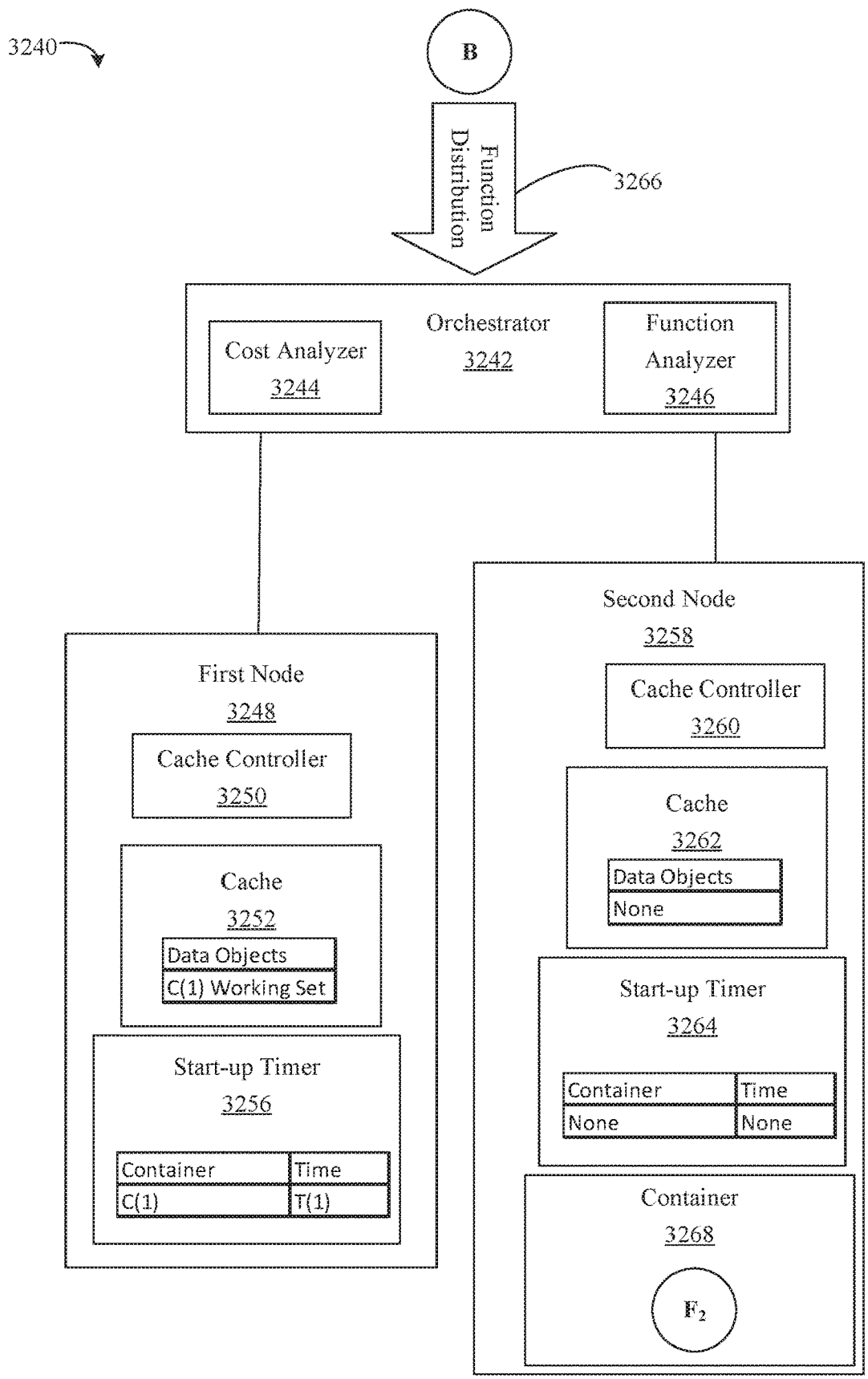

In process 3266, the orchestrator 3242 may distribute the function $F_2$. As illustrated in FIG. 32D, which is a continuation of the example 3240 of FIG. 32C, the function $F_2$ is provided to the second node 3258. A container 3268 may be built to execute the function $F_2$ and based on data received from the data source.

Thus, the above embodiments of FIGS. 32A-32D may push computation towards data but in an enhanced manner to execute actions which are otherwise agnostic of the hardware upon which they run or of the physical locations of the data they may refer to during their execution. The embodiments may reduce latencies to execute functions and moreover reduce resource utilization.

Figure 32E:
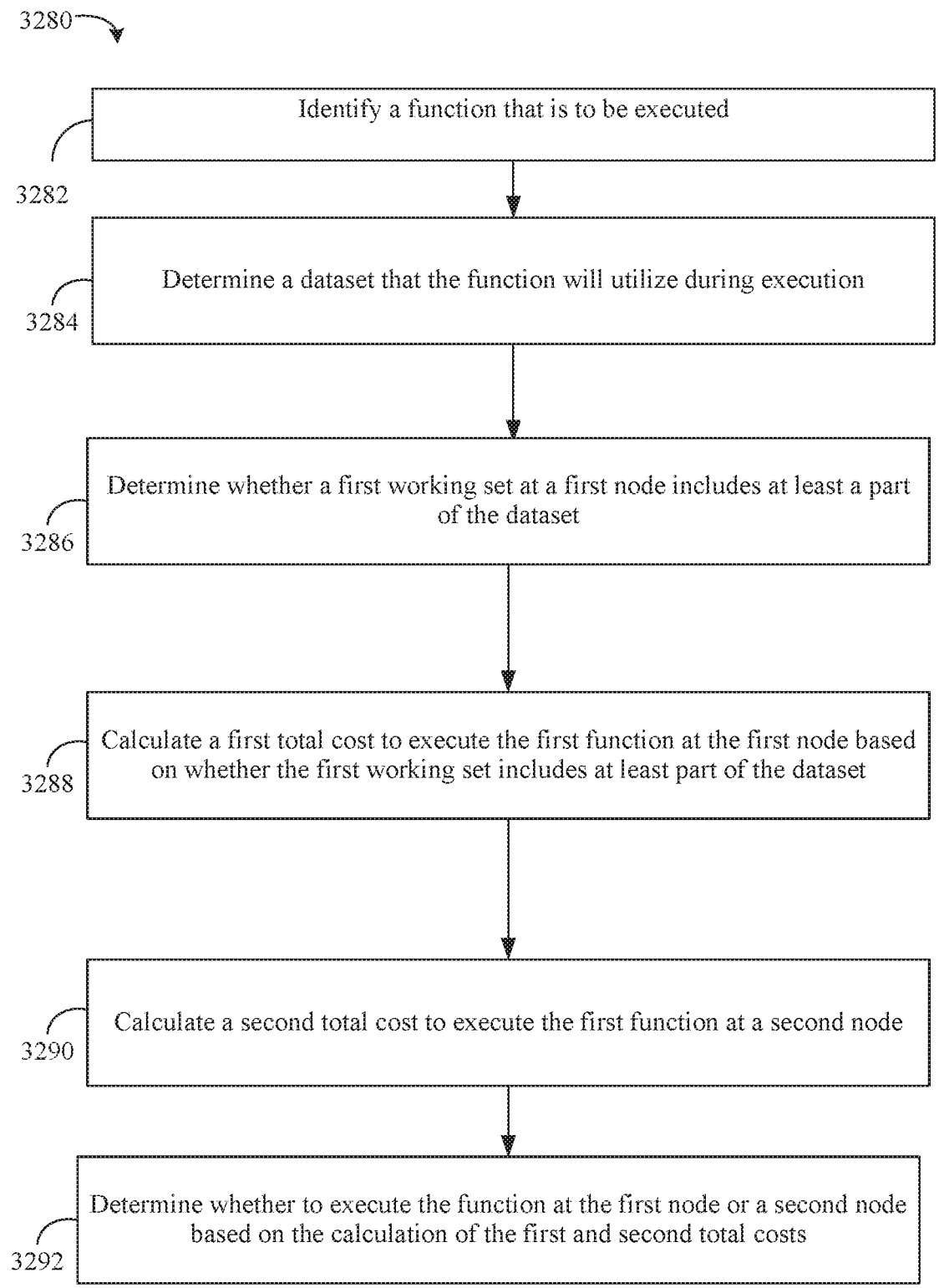
FIG. 32E is a flowchart of function distribution according to an embodiment.

FIG. 32E shows a method 3280 of enhanced function distribution, and may be implemented in the enhanced FaaS server architecture of FIGS. 32A-32D and/or one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

For example, computer program code to carry out operations shown in the method 3280 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 3282 may identify a function that is to be executed. Illustrated processing block 3284 may determine a dataset that the function will utilize during execution. Illustrated processing block 3286 may determine whether a first working set includes at least a part of the dataset. The first working set may include resources to startup a first container. Furthermore, the first working set may be stored at a first node. For example, the first working set may be stored in a hardware and/or software cache of the first node.

Illustrated processing block 3288 may calculate a first total cost to execute the first function at the first node. The first total cost calculation may be based on whether the first working set includes part of the dataset. As an example, illustrated processing block 3286 may determine that the first working set includes only a first part of the dataset. In such an embodiment, illustrated processing block 3288 may determine a transfer cost (which may referred to as a first total transfer cost) to transfer a second part of the dataset to the first node, and include the transfer cost in the first total cost. For example, illustrated processing block 3288 may determine that the first total cost includes a cost to build the first container and the transfer cost.

Illustrated processing block 3290 may calculate a second total cost to execute the first function at a second container in a second node. The second total cost may include a data transfer cost to transfer data to build the second container at the second node, and a cost to build the second container. The second container may be a cold container.

Illustrated processing block 3292 may determine whether to execute the function at the first node or the second node based on the calculations of the first and second total costs.

As an example, illustrated processing block 3292 may determine whether to startup the first container at the first node, and execute the function in the first container at the first node based on whether the first working set includes at least the part of the dataset.

Illustrated processing block 3292 may build the first container at the first node, and execute the function in the first container at the first node when the first total cost is less than the second total cost. In contrast, the second container may be built at the second node, and the function may be executed in the second container at the second node when the second total cost is less than the first total cost.

Additional Notes and Examples

Example 3200 includes at least one computer readable medium, comprising a set of instructions, which, when executed by a computing device, cause the computing device to identify a function that is to be executed, determine a dataset that the function will utilize during execution, determine that a first working set includes only at least a first part of the dataset, wherein the first working set includes resources to startup a first container, wherein the first working set is stored at a first node, wherein the first working set is stored in a cache of the first node, determine a transfer cost to transfer a second part of the dataset to the first node, determine a first total cost to execute the function at the first node, wherein the first total cost includes a cost to build the first container and the transfer cost, determine a second total cost to execute the function in a second container at a second node, wherein the second total cost includes a data transfer cost to transfer data to build the second container at the second node, and a cost to build the second container, build the second container at the second node, and execute the function in the second container at the second node when the second total cost is less than the first total cost, and build the first container at the first node, and execute the function in the first container at the first node when the first total cost is less than the second total cost.

Example 3201 includes at least one computer readable medium, comprising a set of instructions, which, when executed by a computing device, cause the computing device to identify a function that is to be executed, determine a dataset that the function will utilize during execution, determine whether a first working set includes at least a part of the dataset, wherein the first working set includes resources to startup a first container, wherein the first working set is stored at a first node, and determine whether to startup the first container at the first node to execute the function in the first container at the first node based on whether the first working set includes at least the part of the dataset.

Example 3202 includes the at least one computer readable medium of Example 3201, wherein the first working set is stored in a cache of the first node.

Example 3203 includes the at least one computer readable medium of Example 3201, comprising a further set of instructions, which, when executed by a computing device, cause the computing device to determine that the first working set includes only a first part of the dataset, and determine a transfer cost to transfer a second part of the dataset to the first node.

Example 3204 includes the at least one computer readable medium of Example 3203, comprising a further set of instructions, which, when executed by a computing device, cause the computing device to determine a first total cost to execute the function at the first node, wherein the first total cost includes a cost to build the first container and the transfer cost, determine a second total cost to execute the function in a second container at a second node, wherein the second total cost includes a data transfer cost to transfer data to build the second container at the second node, and a cost to build the second container.

Example 3205 includes the at least one computer readable medium of Example 3204, wherein the second container is a cold container.

Example 3206 includes the at least one computer readable medium of Example 3204, comprising a further set of instructions, which, when executed by a computing device, cause the computing device to build the second container at the second node, and execute the function in the second container at the second node when the second total cost is less than the first total cost, and build the first container at the first node, and execute the function in the first container at the first node when the first total cost is less than the second total cost.

Enhanced FaaS Function Construct Examples

FIG. 33A illustrates a function construct 3300 of a function. As discussed with respect to the embodiments of FIGS. 32A-32D, the function construct 3300 may be utilized to determine a suitable mode to execute the function. In FIG. 33A, the function construct 3300 includes optional fields that describe associations with data monikers. The function construct fields may be read to identify the metadata contained therein, and make associations to monikers based on the metadata. A data moniker may be an approximate representation of the identities of the function construct 3300. A moniker may be constructed from the function construct 3330 by a set function (e.g., a Bloom Filter) and/or a moniker construction API over various universally unique identifiers of the functions, the caller of a function, specific parameters of a function, file system pathnames associated with a function, Resilient Distributed Dataset lineages in, for example, Spark, tablespace ranges in relational databases accessed by the function and so on. A function that is attributed through the function construct 3300 may be provided for execution at containers associated in soft affinity with those monikers derived from the function construct. Thus, the monikers may be used to effectively assign the function to reduce resources and latency.

The dataset construct includes several fields. The attributes of the fields may be generated on function creation as well as updated dynamically based on the function execution and a level of cache/memory thrashing. Based on the data touched during the function execution, gathered from the function construct 3300, a function associated with the function construct 3300 may be assigned to a container which is likely to possess a warm copy of the data thereby reducing data movement and reducing the possibility of thrashing.

A caller field 3302 may be used to identify the source of the function invocation (e.g., a client, a computing device, geographic area, etc.). A caller moniker may be determined from the caller field 3302 to describe an identity, location and/or device of the source.

An arguments field 3304 may be used to identify the arguments of the function. The arguments may be used to determine the type of function, underlying data requirements and so forth. For example, input data into the arguments may be identified, access to specific language libraries and/or data requirements may be identified. Moreover, certain types of arguments may be enhanced through specific hardware utilization. As such, a type moniker may be determined from the arguments field 3304 to describe a computer language, data requirements, hardware requirements (e.g., accelerator, memory space, processor speed) and so forth of the function.

Other fields 3306 may be used to identify the other attributes of the function. For example, the others field 3306 may be used to identify a geographic location for execution, a location of a client and so forth. Another moniker may be determined from the other fields 3306 to describe geographic location and location of clients, etc. The other moniker may be used to steer the function towards a node proximate to the geographic location of the client or where data will eventually be transmitted.

The file system path 3308 may be used to determine a path of the function. For example, the file system path 3308 may be used to identify a location to save the output of the function. A path moniker may be determined from the file system path 3308 to describe the location to save the output. The path moniker may be used to steer the function towards a node proximate to the location to save the output.

The database tablespace range 3310 may be used to describe the logical identity of the set of "tuples" in a database for the purpose of a compact identification and subsequent use in associating with the dataset of a Function. A range moniker may be determined from the database tablespace range 3310 to describe the logical span of data whose values in various fields or attributes fall within a range minimum and range maximum value. It may be used to describe compactly a range of data used in a Function based on various constraints satisfied by fields within the data.

FIG. 33B shows a method 3350 of moniker identification from an enhanced function construct as shown in FIG. 33B, and may be implemented in the enhanced orchestrators 3202, 3242 of FIGS. 32A-32D, and/or one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

For example, computer program code to carry out operations shown in the method 3350 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 3352 may identify fields of a function construct associated with a function. Illustrated processing block 3354 may determine metadata from the fields.

Illustrated processing block 3356 may determine one or more monikers from the fields, wherein the monikers are to indicate one or more resources that the function is to utilize during execution. For example, the one or more resources may include data that the function is to utilize during execution. The one or more resources may further include a hardware resource requirement of the function. The one or more resources may further include a hardware accelerator that the function is to utilize during execution. Moreover, the one or more monikers may indicate a geographic area to execute the function. Further, the one or more monikers may indicate a type of the function (e.g., image recognition or image rotation). As described above, the one or more resources and the type of the function may be utilized to allocate the function to an appropriate node and reduce latency while increasing efficiency.

Additional Notes and Examples

Example 3300 includes at least one computer readable medium, comprising a set of instructions, which, when executed by a computing device, cause the computing device to identify fields of a function construct associated with a function, and determine metadata from the fields, determine one or more monikers from the metadata, wherein the monikers are to indicate one or more resources that the function is to utilize during execution, wherein the one or more resources include data that the function is to utilize during execution, a hardware resource requirement of the function, a hardware accelerator that the function is to utilize during execution, wherein the one or more monikers indicate a geographic area to execute the function and a type of the function.

Example 3301 includes at least one computer readable medium, comprising a set of instructions, which, when executed by a computing device, cause the computing device to identify fields of a function construct associated with a function, and determine metadata from the fields, and determine one or more monikers from the metadata, wherein the monikers are to indicate one or more resources that the function is to utilize during execution.

Example 3302 includes the at least one computer readable medium of Example 3301, wherein the one or more resources include data that the function is to utilize during execution.

Example 3303 includes the at least one computer readable medium of Example 3301, wherein the one or more resources include a hardware resource requirement of the function.

Example 3304 includes the at least one computer readable medium of Example 3301, wherein the one or more resources include a hardware accelerator that the function is to utilize during execution.

Example 3305 includes the at least one computer readable medium of Example 3301, wherein the one or more monikers indicate a geographic area to execute the function.

Example 3306 includes the at least one computer readable medium of Example 3301, wherein the one or more monikers are to indicate a type of the function.

Dynamic Placement and Prefetching Examples

For currently existing solutions, FaaS functions are not optimally placed at each stage of function execution. For example, there may be high resource-cost of reflowing data between a field-programmable gate array (FPGA) version and a software (memory) version of execution. Often an infrastructure may not have sufficient memory at any given time to keep a desired number (and type) of function containers available for quick reuse.

Figure 34A:
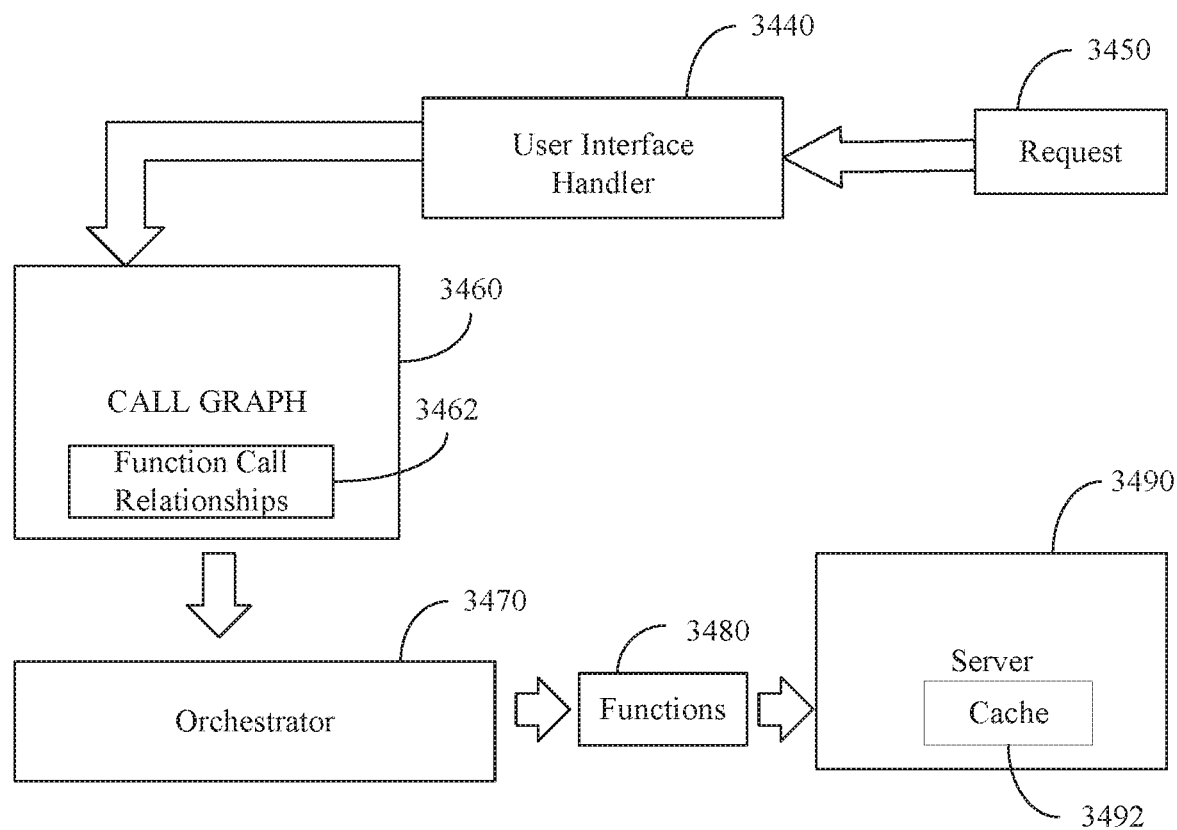
FIG. 34A is an illustration of an example of prefetching functions using a call graph based on the frequency of functions calls according to an embodiment.

Turning now to FIG. 34A, according to an exemplary embodiment, an example is shown in which a call graph is used to prefetch functions based on the frequency of functions calls. A user interface handler 3440 may receive a request 3450 to optimize FaaS function execution and, in turn, generate a call graph 3460. The call graph 3460 may represent calling relationships 3462 between functions.

In the illustrated example, an orchestrator 3470 may prefetch a function 3480 that is most likely to be invoked next, based on an indicated frequency of function calls in call graph 3460. The prefetched function may be loaded into temporary storage and initialized. In the illustrated example, the prefetched function may be stored temporarily in the cache 3492 of a server 3490. The orchestrator 3470 may issue a command for the server 3490 to release the least likely function to be invoked.

Figure 34B:
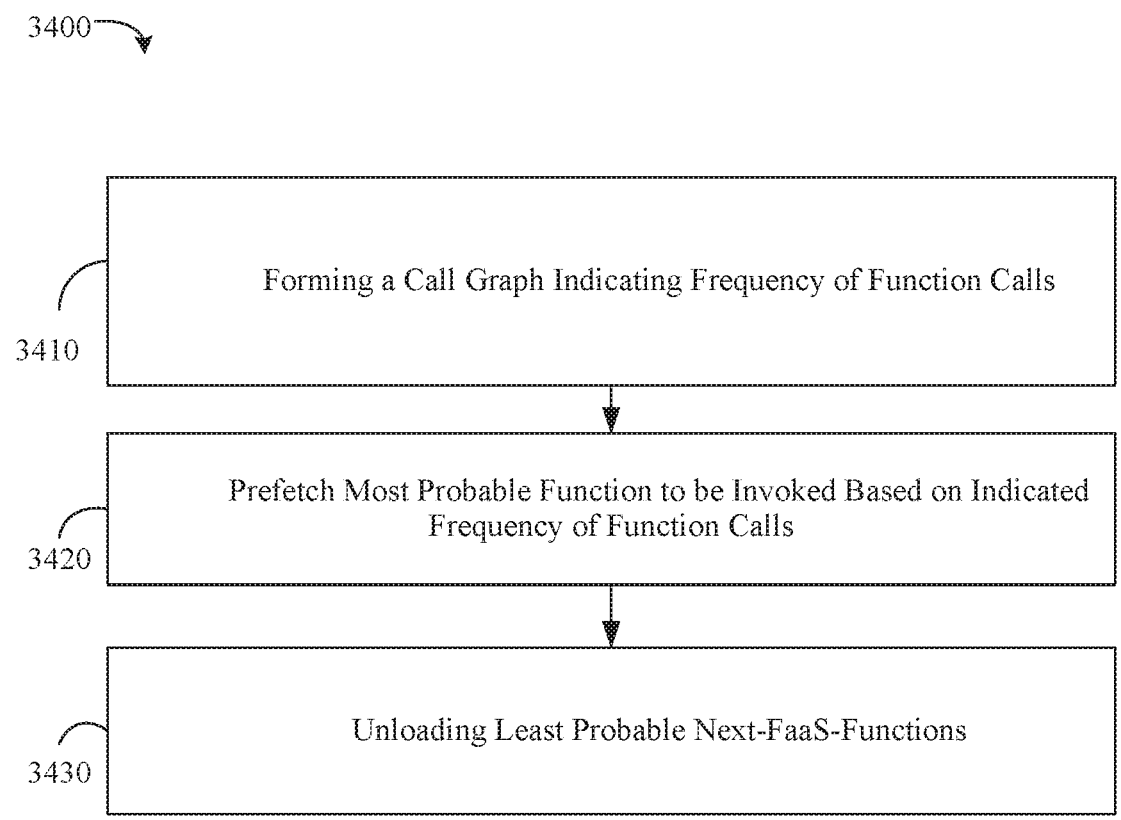
FIG. 34B is an example of a method for enhancing execution of a FaaS function according to an embodiment.

FIG. 34B illustrates a method for enhancing executing a FaaS function according to an embodiment. In block 3410 of method 3400, a call graph indicating a frequency of function activations ("calls") may be generated. A call graph may be a control flow graph that represents calling relationships between functions. In a weighted call graph, each arc— originating from a precursor (antecedent function) and ending at one or more successor functions—may be tagged with the frequency (e.g., probability that precursor will lead to that successor) of the successor's invocation. A call graph may be similar to a control flow graph except that where the control flow graph has call-return relationships (and nesting) among procedures, a call graph for functions is a graphical indication of various functions executing and progressively triggering the conditions that cause the executions of other functions, usually the latter functions consuming or accessing data or results produced by the former ones. According to an exemplary embodiment, the knowledge that at present function F is executing and that it is going to lead to function G executing, means that G may be "prefetched"—its construction may begin, its data may be positioned/mapped etc. The weights on the call graph may represent probabilities— indicating the likelihood that F will cause the execution of G.

The call graph may be formed statically and then may be refined dynamically. In block 3420, the most probable function to be invoked next, may be prefetched based on the indicated frequency of function calls in the call graph. That is, the prefetched function may be loaded into temporary storage and initialized, so that the function is ready to be executed when the precursor function activates it. In block 3430, FaaS functions that are least likely to be invoked at each phase/region of the call graph may be unloaded to release resources.

In analogy with ordinary procedure calling sequences in conventional programs, one "caller" function may optionally call another "callee" function directly with a remote procedure call (and then wait to receive an indication that the remote procedure call to the callee has completed). The above-mentioned arc may be further augmented with the cost associated with the performing of the successor function—for FaaS, this may include the cost of passing parameters and results. For example, the overhead of JavaScript Object Notation (JSON) objects may be communicated, considering the size in bytes and communication bandwidth between the two points that host callee and caller functions. Based on the frequency of the calls, resources available on each host, call overhead, pricing/priority tier provided, etc., an optimal placement may be computed for FaaS functions at each stage. The stages may be dynamic. That is, each time that some function F is activated, the activation of function F may result in an activation of some other function G, and in general, G may be performed somewhere different.

Embodiments of the method 3400 may be implemented in a system, apparatus, computer, device, etc., for example, such as those described herein. More particularly, hardware implementations of the method 3400 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 3400 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Embodiments or portions of the method 3400 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/ or other structural components that are native to hardware (e.g., host processor, central processing unit/CPU, microcontroller, etc.).

Additional Notes and Examples

Example 3401 includes a method comprising forming a call graph representing calling relationships between functions, the call graph indicating a frequency or likelihood of precursor to successor activations, based on the frequency of function calls indicated by the call graph, prefetching a most probable next-function so that the most probable next-function is already prepared to run when invoked, and unloading at least one least probable next-function.

Example 3402 includes the method of Example 3401, further comprising the call graph utilizing an arc which represents a frequency of call invocation.

Example 3403 includes the method of Example 3402, further comprising computing resources available on each host based on said frequency/probability of function calls.

Example 3404. The method of Example 3401, wherein the function calls are to be backwards compatible to existing applications.

Example 3405. The method of Example 3401, wherein memory integrity protocol is to be used to identify data versions in memory.

Example 3406 includes a method comprising forming a call graph representing calling relationships between functions, the call graph indicating a frequency of function calls, based on the frequency of function calls indicated by the call graph, prefetching a most probable next-function so that the probable next-function is already prepared to run when invoked, unloading at least one least probable next-function, utilizing an arc in the call graph, the arc representing a frequency of call invocation, and computing resources available on each host based on the frequency of function calls, wherein the function calls are to be backwards compatible to existing applications, and wherein memory integrity protocol is to be used to identify data version in memory.

Graduated Multi-Version Initiation of Multi-Tenant Function Examples

Figure 35A:
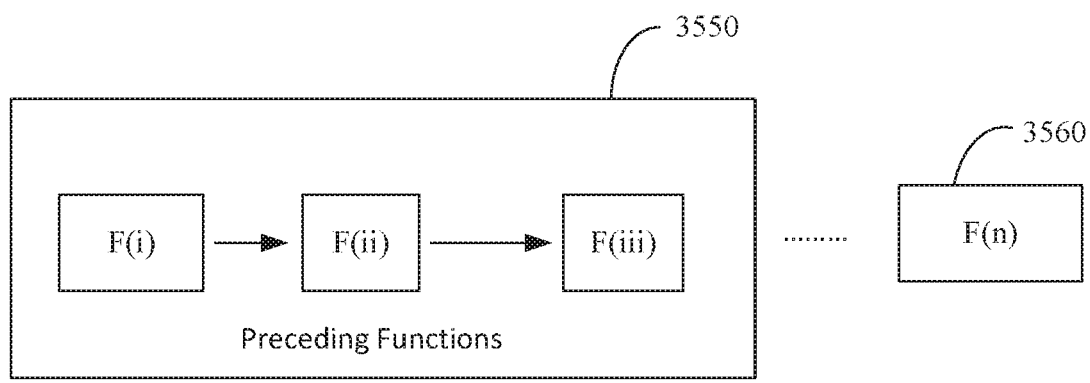
FIG. 35A is a block diagram illustrating preceding functions of a current function according to an embodiment.

The exemplary embodiment that is described immediately above may be extended to a second function "B" in a chain of Functions C: {F(i) . . . F(ii) . . . F(iii) . . . F(n)}, on the basis of prior history—e.g., not just based on the second function itself but also a subset of its precursor chain. In other words, when choosing whether or not to launch a software-based, minimally accelerated, or accelerated version of a function, an exemplary embodiment may take into account not just the history of usages of function B, but that of the precursor functions Bp in the chain that precedes B. FIG. 35A is a block diagram showing preceding functions Bp 3550 of a function B 3560, in which the preceding functions Bp 550 of a function 3560 that is currently being executed, may be used to determine the next function to be prefetched and invoked.

Exemplary benefits of this embodiment include simultaneously balancing the use of limited acceleration resources (among multiple contenders), and minimizing the costs of reflowing data between hardware (e.g., FPGA) and software (memory) versions of execution. In practice, this embodiment may enable activating chains of minimal versions of accelerated functions over activating full versions, so that reflowing of data is minimized.

According to an exemplary embodiment, there may be a chain depth of 1: Bp→B, where Bp represents the functions that precede function B, as explained above.

According to this embodiment, function Bp is the immediate precursor of function B, and x and y may be the launch threshold and reclaim threshold, respectively, for a full version of function B. Similarly, u and v may be the launch and reclaim thresholds, respectively, for a full version of Bp. A function's resources are 'reclaimed' if the function's time-to-live has expired, or if other considerations such as its weighted measure for being kept running, has fallen below some threshold. In the opposite direction, with respect to launch threshold, if a function that is not usually cached or prefetched is showing signs of increased use, then with the increased use, it becomes attractive to keep that function cached and possibly prefetched. Thus, according to an exemplary embodiment, if a function's precursor functions are currently running, and with increasing frequency, then the precursor functions may cause the eligibility for the function B to be prefetched, to exceed a launch threshold. According to an exemplary embodiment, the reclaim thresholds for the respective functions may be lower than the launch thresholds.

Also, x may be lowered by a small amount, z (coupling contribution), when u is lowered, and y may be raised by a small amount, z, when v is raised, in an effort to ensure that desired hardware or software conditions are met. Such modifications are subject to the condition that x, y, and |x−y| are all constrained to take values that do not violate various max/min rules;

According to another exemplary embodiment, if u and v are not allowed to change, but x and y may change, then virtual values u' and v' (shadow values for u and v) may be computed, and then a coupling contribution z may be applied to x and y based on computed values u' and v', respectively. According to an exemplary embodiment, values 'u' and 'v', for example, may not be permitted to vary because of a need to keep resource utilization of Bp in check; however, if there is an uptick in the arrival rate into Bp, then the uptick may influence x downward (since the arrival rate into B would increase) and similarly y may be influenced upward (to reduce reclaim rate for B).

The above-described embodiment may be used to generalize to chain depths >1, transitively. In general there may be more parameters than one in computing the coupling contribution (z)—for example, in a resource constrained environment, a variable amount of increase in the time-to-live may be applied for a given accelerated function B when the demand for function B and its precursors drops off (so that B may be reclaimed faster); similarly, when the overall demand is low or when SLA requirements are stringent, there may be a stronger positive bias for launching function B and a stronger negative bias against reclaiming B, based the observations at its precursors.

Figure 35B:
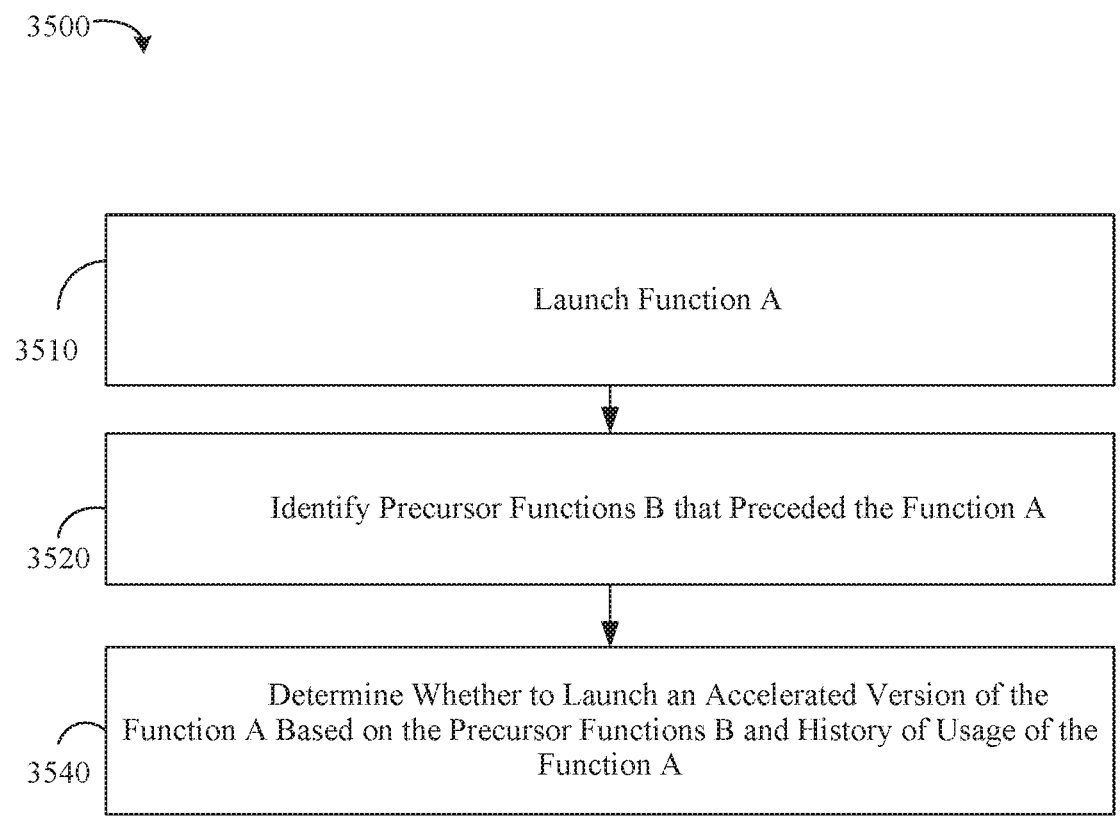
FIG. 35B is an example of a method of executing a FaaS function based on precursor functions according to an embodiment.

Turning now to FIG. 35B, according to an exemplary embodiment, in block 3510 of method 3500, a function A may be launched. In block 3520, precursor functions B, which precede function A, may be identified. In block 3540, whether to launch an accelerated version of the function A based on the precursor functions B and the history of usage of function A, may be determined.

Embodiments of the method 3500 may be implemented in a system, apparatus, computer, device, etc., for example, such as those described herein. More particularly, hardware implementations of the method 3500 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 3500 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Embodiments or portions of the method 3500 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Additional Notes and Examples

Example 3501 includes a method comprising launching a function, identifying precursor functions that preceded the function, determining whether to launch an accelerated version of the function based on precursor functions that preceded the function and history of usage of the function, and storing the function and the precursor functions in a repository.

Example 3502 includes the method of Example 3501, further comprising identifying function versions in memory using message authentication code (MAC).

Example 3503 includes the method of Example 3501, further comprising a container intercepting a remote procedure call (RPC) and serving it locally, wherein the function is to be transparent and backward compatible to existing applications.

Example 3503 includes the method of Example 3501, further comprising prefetching data related to the function.

Example 3504 includes a method comprising launching a function, identifying precursor functions that preceded the function, determining whether to launch an accelerated version of the function based on precursor functions that preceded the function and history of usage of the function, identifying function versions in memory using message authentication code (MAC), intercepting, via a container, a remote procedure call (RPC) and serving it locally, wherein the function is to be transparent and backward compatible to existing applications, prefetching data related to the function, and storing the function and the precursor functions in a repository.

Adaptive Reclaim Rate Examples

Turning now to FIG. 36A, according to another exemplary embodiment, FIG. 36A shows example of maintaining the warmth of a container based on a probability of a function being executed. In detail, upon completing (executing) a function X 3655 in a container 3650, there is a probability P 3660 that another function Y 3675 in a container 3670, will be executed. For example, in a video surveillance application, function X 3655 may be a media transcoding function and function Y 3675 may be a detection and coarse-grained match function (e.g., a function to determine whether the video stream shows a person or a part of a person); or function X 3655 may be a coarse-grained match function while function Y 3675 may be a recognition function (e.g., a function to determine whether any person detected in the video is also a known person in a database— e.g., a friend or family member, a stranger, etc.). This probability P 3660 may be constant, but is usually variable, based on the time of processing, and other temporally or spatially correlated factors.

A probability evaluator 3685 of orchestrator 3680 may generate a decision to keep container 3670 for function Y 3675 warm, which may hinge upon a dynamic evaluation of such a probability P 3660; or more generally, a container reclaim rate for functions of type Y may be varied according to this probability P 3660. By adapting the reclaim rates and decisions based on both recent and historical assessments of probability P 3660, an overall objective that is both adaptive to recent information and also load-balanced with respect to long term information, may be attained.

The exemplary solution immediately above may be generalized to a graph of function invocations—or a service mesh—and may be further generalized to accelerated functions so that not only (i) the time to reclaim is varied adaptively, but (ii) longer range assessments of probability flows across multiple graph edges, may be used to pre-activate those functions for whom the activation time (warm-up) time is non-trivial.

In one embodiment, Probabilistic Graph Models (PGMs) may be used as a general-purpose framework for factorizing the probability flows of one or more interdependent functions. PGM factorization techniques and libraries may be used to obtain the dynamic probabilities of each function Y 3675 based on its dependence on its precursors function X 3655, and the dynamic probabilities of function X 3655, based on precursors of function X 3655. A simpler, but workable simplification may be to remove weak probability flows (e.g., treat weakly correlated functions as being mutually independent), to make such graphs sparse, and then apply a PGM solver written in a probabilistic programming language (for example, FIGARO). Another implementation may be to use a search engine page rank scheme as a simplified form of relating the popularity of a function to that of its precursors or antecedents by a weight (which may itself be estimated ahead of time or be inferred dynamically), and using the iterative page rank solution to estimate how frequently different functions are likely to get executed based on available data.

Such an approach may allow agile resource allocation for both accelerated or traditional (CPU software based) realizations of functions, instead of using hardcoded constants or simple heuristics for controlling the numbers of warm containers or time-to-live (TTL) parameters. Alternatively, this exemplary embodiment may work with other realizations and may be used to adjust such configuration settings, over numbers of containers or their TTLs based on periodic evaluation of collected telemetry, using the above probability flow techniques. Further, the total optimization problem itself may have a bin-packing problem that tries to maximize the resources constrained throughput the problem, by maximizing throughput of higher probability activations, normalized by their resource requirements.

Turning now to FIG. 36B, a method for executing a FaaS function from a warm container according to an embodiment is illustrated. In block 3610 of method 3600, a function A may be launched. In block 3630, a readiness (e.g., warmth) of a computing container for executing a subsequent function of function A, is maintained based on a dynamic evaluation of a probability that the subsequent function will be executed.

Embodiments of the method 3600 may be implemented in a system, apparatus, computer, device, etc., for example, such as those described herein. More particularly, hardware implementations of the method 3600 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 3600 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Embodiments or portions of the method 3600 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/ or other structural components that are native to hardware (e.g., host processor, central processing unit/CPU, microcontroller, etc.).

Additional Notes and Examples

Example 3601 includes a method comprising executing a function, subsequent to the executing the function, maintaining a readiness of a container for executing a subsequent function based on a dynamic evaluation of a probability that the subsequent function will be executed.

Example 3602 includes a method comprising executing a function, subsequent to the executing the function, maintaining a readiness of a container for executing a subsequent function based on a dynamic evaluation of a probability that the subsequent function will be executed, clearing only function data but not function logic, determining multi-key total memory encryption (MKTME) key when separate keys assigned to separate functions, and reclaiming only user programs but not managed runtime.

Adaptive Memory Tiering Examples

When a function becomes less used, the amount of capacity that it takes up may be reduced. Often an infrastructure may not have sufficient memory at any given time to keep a desired number (and type) of function containers available for quick reuse.

According to an exemplary embodiment of the enhanced FaaS system such as the one shown in FIG. 4, both the size and the usage frequency of a function may be considered, in deciding whether a function should have its data or code in high performance memory tier. In other embodiments, this may be based on usage: keep less used function alive in a lower performance tier (like 3DXP memory) instead of reclaiming it altogether. According to one embodiment of the enhanced FaaS system with tiering in memory, tiering in memory may be made adaptive to both size and usage. That is, if size is large, then, even if a function is frequently used, the function may be put in a far-away tier like in 3DXP. If usage is low, then also the function may be put in a far-away tier. Further, if it is in a farther tier, then the function should be provided a correspondingly longer time to live since it is already consuming less resources.

In other embodiments, the use of multiple, actual or virtualized tiers of memory may have been described, to achieve an overall higher warm container rate without oversubscribing the performance critical memory capacity such as in MCDRAM/HBM or DDR tiers. In the current exemplary embodiment as shown in FIG. 37A, the same approach may be applied to both within a function and to function chains.

1. WITHIN A FUNCTION: First, consider that oftentimes a function may be too large compared to the amount of available capacity in performance tiers (e.g., MCDRAM/HBM, DRAM) in multi-tiered memory—Amazon Lambda, for example, imposes a per container limit of ~400 MBs, which is large enough for public versions of many topologies but may be too small for Math Kernel Library for Deep Neural Learning Networks (MKL-DNN).

Figure 37A:
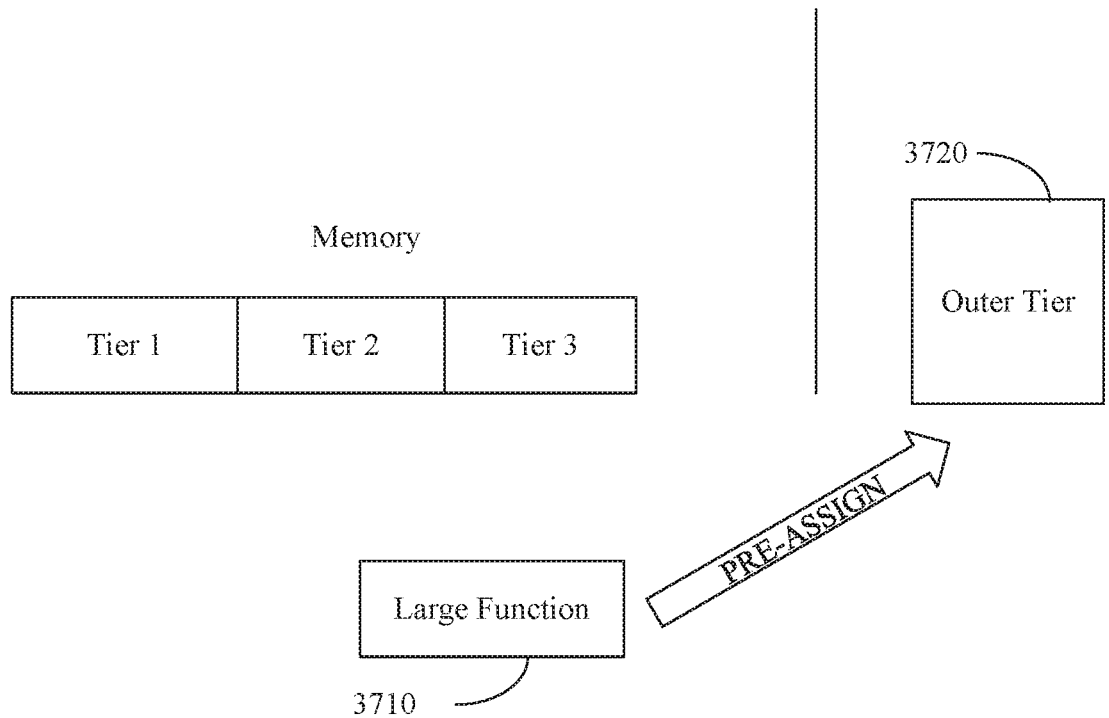
FIG. 37A is a block diagram illustrating adaptive memory tiering based on size according to an embodiment.
Figure 37B:
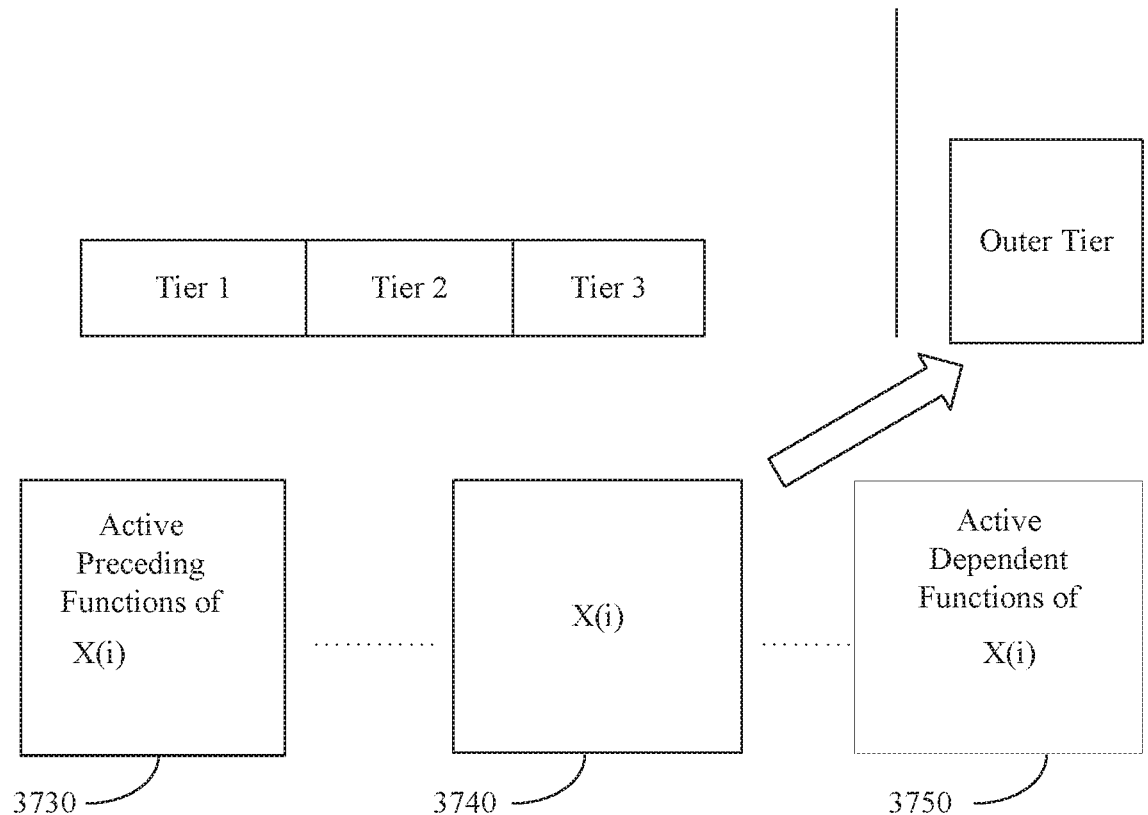
FIG. 37B is a block diagram illustrating adaptive memory tiering based on usage according to an embodiment.

According to the current exemplary embodiment, aspects of which are illustrated in FIGS. 37A and 37B, functions may be segmented both according to size and according to usage, so that:

1a. Functions 3710 too large to be assigned DRAM placement may be preassigned into an outer memory tier 3720 (FIG. 37A); and 1b. Functions that have an overall high historical frequency of use but have already run out of their current pause rate threshold may be held over in an outer memory tier instead of being reclaimed immediately; and they may age there for a longer duration. The pause rate threshold may effectively be the time to live for a container of a function after its most recent use. If no request arrives over that time, the function may be removed so that its resources—mainly memory—get freed up.

According to usage statistics and memory page access profiling, over time, hotter page sets may be reflected into MCDRAM/HBM/DDR reserved ranges—unless a function's dynamic code footprint is just too large to benefit from having a portion of it assigned temporarily into a performance tier.

2. ACROSS CHAINS OF FUNCTIONS: The embodiments described immediately above may be extended to chains of Functions, thus:

2a. As illustrated in FIG. 37B, if antecedent functions 3730 or dependent functions 3750 of a function X(i) 3740 in a chain (or web) of functions are active—whether in upper or lower-tier assigned memory—then, instead of recycling X(i) (e.g., tearing down a container that hosts X(i)), X(i) may be given the outer-tier placement predicated on the continuation of those antecedent and/or dependent Functions.

This approach of adaptive memory tiering may be implemented since latencies of execution are far more sensitive to cold launches than to slower performance of a non-cold container whose memory is in an outer tier of memory. Further, this approach does not preclude temporary promotion of such active containers maintained in a far tier, when there is sufficient free capacity in a near tier.

The inventive concept of FIG. 37A may be applied to different objects within Functions. In an exemplary embodiment, software may know more about what part of a function's data the function is going to keep around, and what part it is not. So, for objects that may be normally allocated in, for example, a Java nursery (young object area), if it is known that the objects are likely to be used for longer duration, then the objects may be allocated somewhere else—e.g., in a less performant tier of memory. That is, instead of putting an entire function body of a large function in an outer tier, the non-nursery part of a large function may be put in an outer tier, since nursery memory may be reclaimed soon anyway.

According to an exemplary embodiment, there may be a case where the outer tier shown in FIG. 37A or 37B may not be protected from privacy attacks because, for example, it is not protected by a hardware key mechanism. So in that case, a solution may be to keep a function's body in outer tier encrypted by software, and then decrypt it when that function needs to be activated, and place the function body in a memory tier covered by HW protection. For such encryption-decryption, a key may be associated with a function where the key is protected within the HW protected memory, and that key may be used in a software based encrypt-decrypt method. Decrypting a function's body and state may be cheaper than reconstructing it from scratch, particularly if the size of it is large.

Figure 37C:
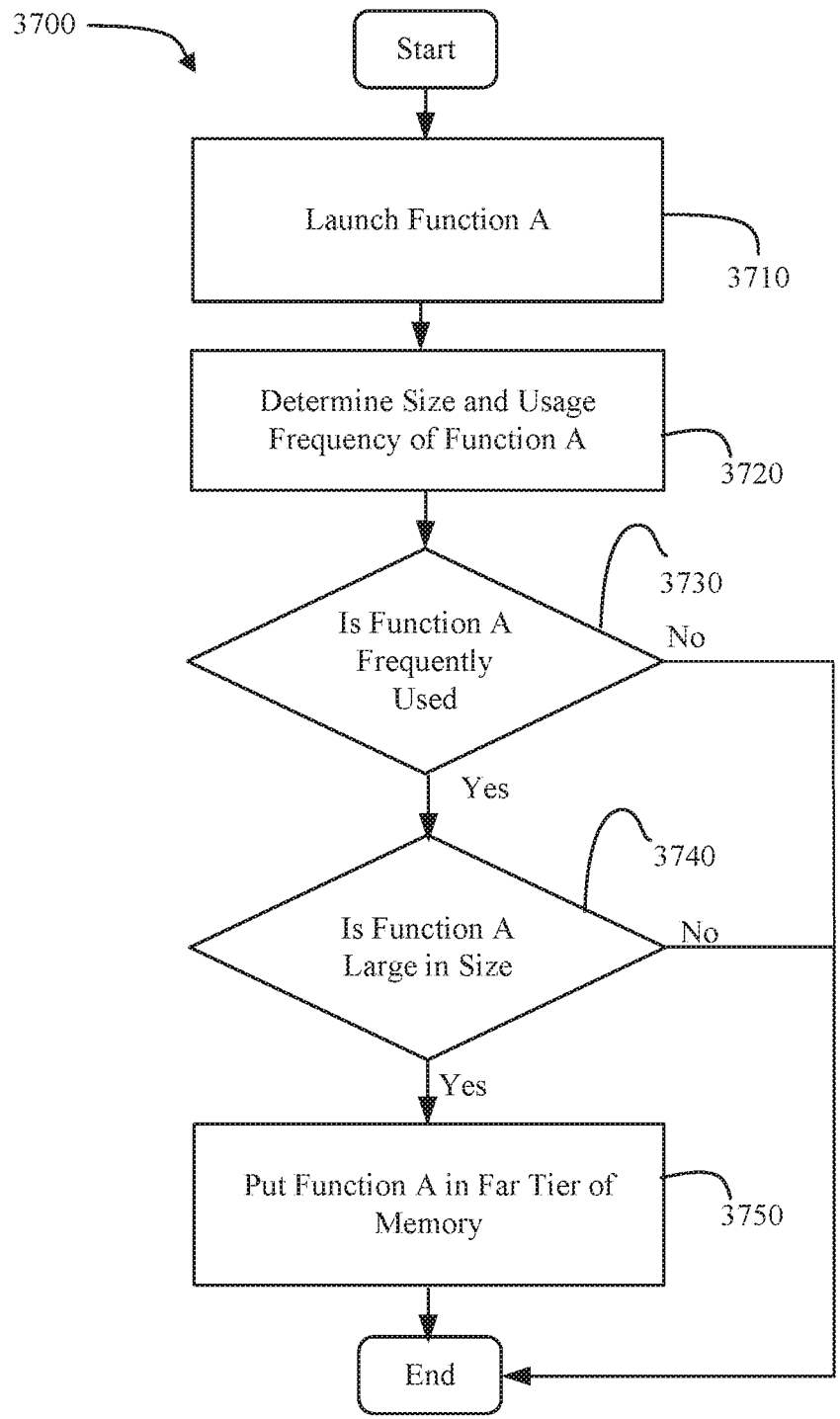
FIG. 37C is an example of a method for adaptively memory-tiering a function according to an embodiment.

Turning now to FIG. 37C, a method for adaptively memory-tiering a function according to an embodiment is illustrated. In block 3710 of method 3700, a function A may be launched. In block 3720, the size and usage frequency of the function A are determined. In block 3730, it is determined whether the function A is frequently used. If, in block 3730, it is determined that a function A is frequently used, in block 3740, it is determined whether function A is large in size. If function A is large in size, then, in block 3750, function A is put into far tier of memory.

Embodiments of the method 3700 may be implemented in a system, apparatus, computer, device, etc., for example, such as those described herein. More particularly, hardware implementations of the method 3700 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 3700 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Embodiments or portions of the method 3700 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Additional Notes and Examples

Example 3701 includes a method comprising executing a function, determining size and usage frequency of the function, and if the function is used frequently and is large in size, putting the function in a far tier of memory.

Example 3702 includes the method of Example 3701, further comprising moving functions in memory hierarchy using cryptography.

Example 3703 includes the method of Example 3701, communicating between functions using cache.

Example 3704 includes a method comprising executing a function, determining size and usage frequency of the function, if the function is used frequently and is large in size, putting the function in a far tier of memory, moving functions in memory hierarchy using cryptography, and communicating between functions using cache.

Fast Class Loading Examples

A CSP may usually utilize flexible scheduling mechanisms/modules for FaaS. Loading and tearing down the managed runtime containers for FaaS may be costly, as such may consume precious CPU time that could be used for other purposes (e.g., processing active functions, distributing and scheduling new functions, any other type of revenue generating purpose, etc.). Thus, loading and tearing down containers may reduce efficiency and increase power usage. This problem may be especially severe with static-type managed runtime languages such as Java, as a managed runtime system such as, for example, a java virtual machine (JVM), may need to load a complete set of basic class libraries even to run, for example, a simple "Hello World" program. This may not be an issue for conventional data center usage, but such is costly for FaaS.

Unlike long-running applications or continuous microservices, the ad-hoc, bursty, and unpredictable arrival rates of requests for FaaS executions make it difficult to achieve QoS expectations—particularly if the QoS expectations themselves vary from one function to the next.

Figure 38A:
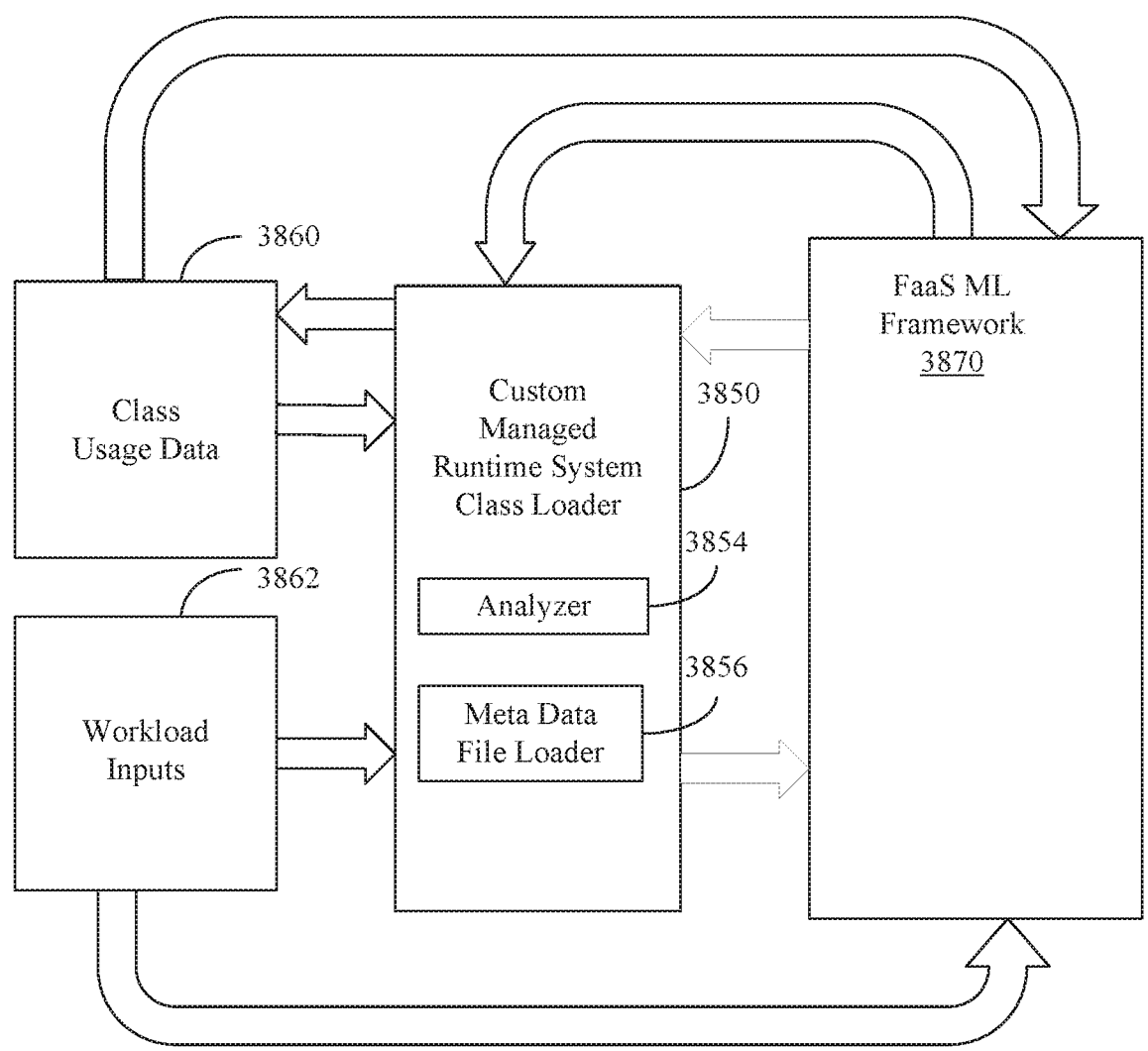
FIG. 38A illustrates an environment for fast class loading for FaaS according to an embodiment.

According to an exemplary embodiment, as illustrated in the block diagram of FIG. 38A, there is provided a workload-based class loading optimization module, where only the used classes get loaded by the optimized class loader. This module enables fast, managed runtime load time.

In FIG. 38A, class usage data 3860 may be obtained via a custom managed runtime system class loader 3850 (e.g., a custom Java Virtual Machine) in which: An analyzer 3854 of the custom managed runtime system class loader 3850 may be invoked during the first execution of a function of a FaaS service. In some embodiments, the analyzer 3854 may be invoked during executions of the function that occur after the first execution. Usage data such as class dependency graphs, classes, method and variable initialization, offset computation, de-virtualization, and data related to binding JNI function to JAVA native methods, may be saved as a meta data file for later invocation of the cloud function. The workload inputs 3862 may include the inputs and/or values for the FaaS function.

The custom managed runtime system class loader 3850 may load the meta data file via a meta data file loader 3856 that is associated with a specific FaaS function for all subsequent execution of that function.

Multiple meta data files may be established for a single FaaS function due to different data sources including data from the class usage data 3860, the workload inputs 3862 (e.g., inputs for the specific FaaS Function) and the FaaS machine learning framework 3870. Machine learning algorithms and/or schemes, generated by a FaaS machine learning framework 3870, may be used for further enhancement of the custom managed runtime system class loader 3850 to reduce and/or eliminate the inefficiencies described above. The enhancements (e.g., accelerator usage, specific node usage, timings for execution, etc.) may be provided to the custom managed resource system class loader 3850 and stored as the meta data file loader 3856. Moreover, the FaaS machine learning framework 3870 may be modified based on whether the enhancements to the functions are successful. For example, the enhancements may include a modification to future executions of a function. If the modifications increase efficiency in some manner (reduced power, lower latency, reduced resource usage, etc.), then the modifications may be deemed successful and the FaaS machine learning framework 3870 may attempt similar such modifications with future invocations of the function as well as with other functions. If the modifications are unsuccessful, the FaaS machine learning framework 3870 may rollback the modifications and not apply those modifications to other functions.

The FaaS machine learning framework 3870, according to an exemplary embodiment, may facilitate continuous application of both chronological feedback that is developed from a history of a function, and cloud-scale feedback that is digested from large numbers of activations of the function that occur concurrently and independently. In this way, it is a form of continuous learning combined with crowd learning. The FaaS machine learning framework 3870 may train based on the actual class usage data 3860, workload inputs 3862 and metadata from the metadata file loader 3856 and data from the analyzer 3854.

Figure 38B:
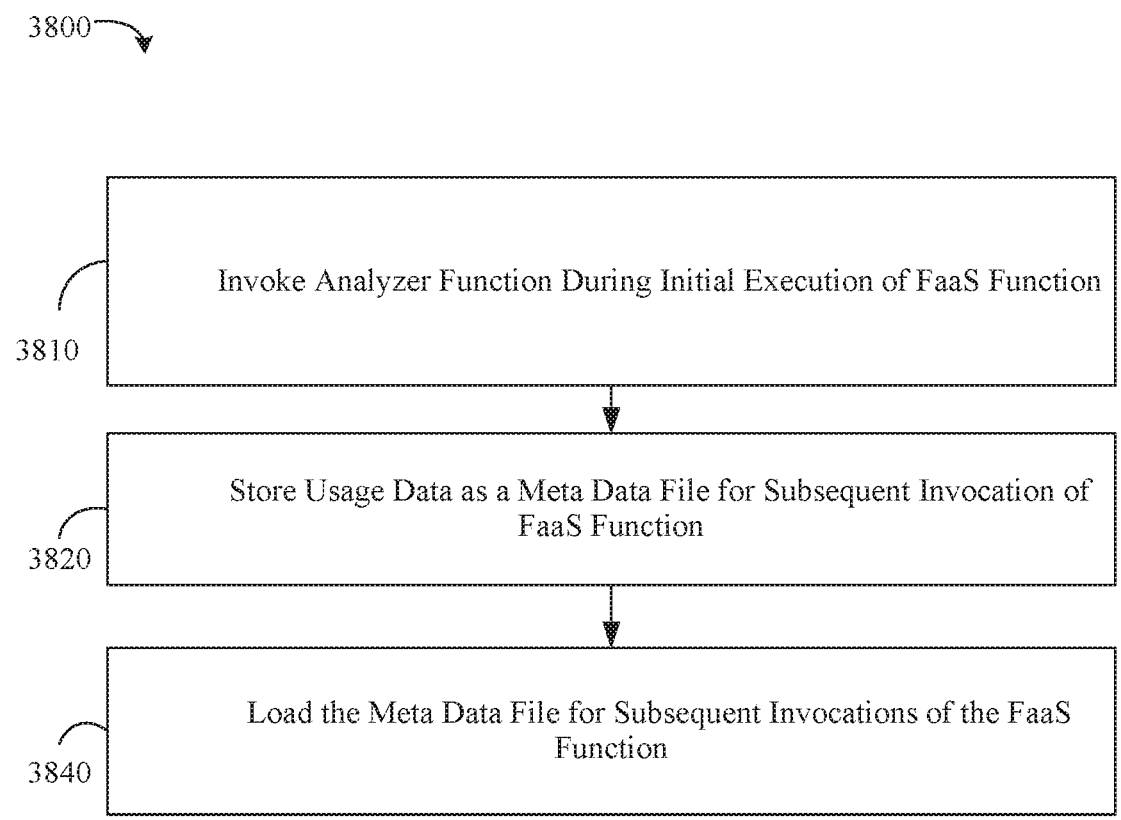
FIG. 38B is an example of a method of executing a function in an enhanced FaaS computing environment according to an embodiment.

Turning now to FIG. 38B, according to an exemplary embodiment, in block 3810 of method 3800, an analyzer function may be invoked during initial execution of a function of a FaaS service. In block 3820, usage data may be stored as a meta data file for subsequent execution of the function. In block 3840, the meta data file may be loaded for subsequent invocations of the function.

Embodiments of the method 3800 may be implemented in a system, apparatus, computer, device, etc., for example, such as those described herein. More particularly, hardware implementations of the method 3800 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 3800 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Embodiments or portions of the method 3800 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 38C:
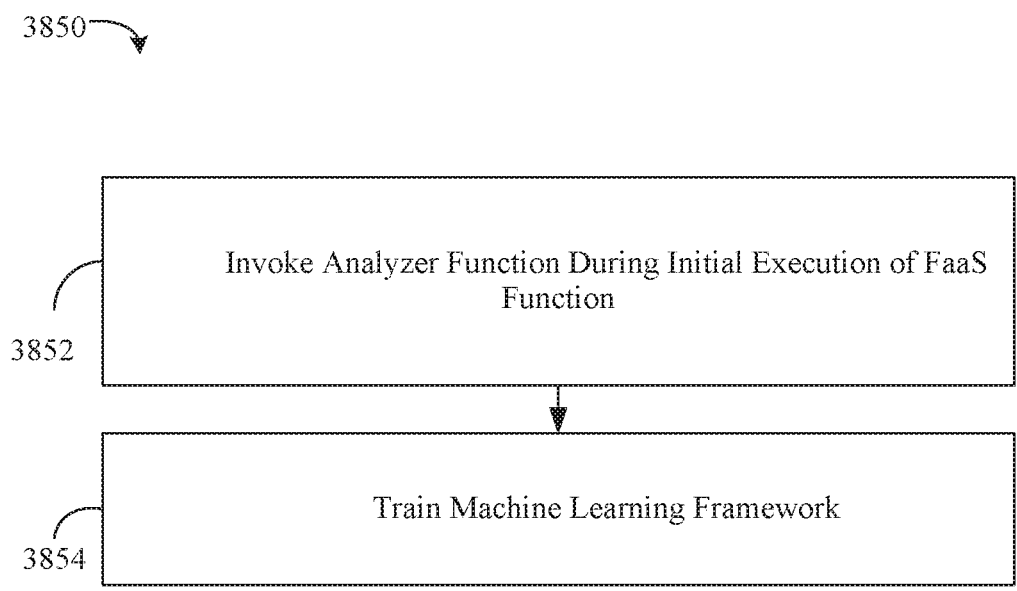
FIG. 38C is an example of a method of executing a function in an enhanced FaaS computing environment according to an embodiment.

Turning now to FIG. 38C, according to an exemplary embodiment, in block 3852 of method 3850, an analyzer function may be invoked during initial execution of a function of a FaaS service. In block 3854, a machine learning framework may be trained. In some embodiments the machine learning framework may be trained based on meta data stored by a custom managed runtime system class loader, class usage data and workload inputs associated with the function.

In some embodiments, a FaaS provider might ask the developer to include a particular runtime system and/or library in the FaaS deployment package that might be custom made and/or different from a standard library and a runtime system for a given language and/or runtime. In some embodiments, the suggested runtime system and/or library might be provided by the FaaS provider or by third parties. In some embodiments, a custom runtime system may provide additional information about the execution characteristics of the functions to the developer or user (e.g., profile information about the code execution characteristics such as execution time, counts of executed statements, code coverage, power/energy consumption, amount of allocated memory, number of exceptions happened, or telemetry data about micro-architectural events associated with code execution including the number of mispredicted branch instructions, OS page faults, and data/instruction cache misses among others). In some embodiments, use of custom runtimes may result in shorter or longer execution time compared to the standard runtimes. In particular, in intelligent custom runtime systems, execution of the same code may improve over time as the intelligent runtime learns about the typical behavior of the function and might use preprocessing and/or anticipatory techniques such as guessing and checking for a faster performance. In such embodiments, the cost of executing the same code can get cheaper over time and this change might be observable by the developer or user through the use of customization of the runtime and/or library. Thus, the intelligent runtime may customize the execution environment of functions.

Embodiments of the method 3850 may be implemented in a system, apparatus, computer, device, etc., for example, such as those described herein. More particularly, hardware implementations of the method 3850 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 3800 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Embodiments or portions of the method 3850 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Additional Notes and Examples

Example 3801 includes a method comprising invoking an analyzer function during an initial execution of a function of a FaaS service, storing usage data as a meta data file for subsequent invocation of the function, and loading the meta data file for subsequent invocations of the function, wherein multiple meta data files correspond to the single function.

Example 3802 includes the method according to Example 3801, further comprising reclaiming the function based on an execution environment.

Example 3803 includes the method according to Example 3802, further comprising implementing a security policy in the execution environment.

Example 3804 includes the method according to Example 3801, wherein some function sets are to be encoded with a same MKTME key.

Example 3805 includes a method comprising invoking an analyzer function during an initial execution of a function of a FaaS service, storing usage data as a meta data file for subsequent invocation of the function, loading the meta data file for subsequent invocations of the function, reclaiming the function based on an execution environment, and implementing a security policy in the execution environment, wherein multiple meta data files correspond to the single function, and wherein some function sets are to be encoded with a same MKTME key.

Function Resourcing Examples

One of the key challenges with FaaS activations is agile resource balancing while maximizing efficiency and widely varying QoS compliant execution. Unlike long-running applications or continuous microservices, the ad-hoc, bursty, and unpredictable arrival rates of requests for FaaS executions make it difficult to achieve QoS expectations—particularly if the QoS expectations themselves vary from one function to the next.

It may be difficult to pre-reserve the needed resources using other techniques (e.g., RDT technology) for a container, and then assign that container to some function whose needs are not known in advance. Therefore, embodiments of then enhanced FaaS system as shown in FIG. 4 are provided to identify a function's resource needs (e.g., how much cache capacity, how much memory BW, etc.) that should be pre-reserved for a container to which the function is being assigned. To capture this information, both a chronological and cloud-wide history mechanism are used, by which it is learned what a function, that has run before, needs; and then that information may be used to set the RDT parameters by the enhanced FaaS system.

Figure 39A:
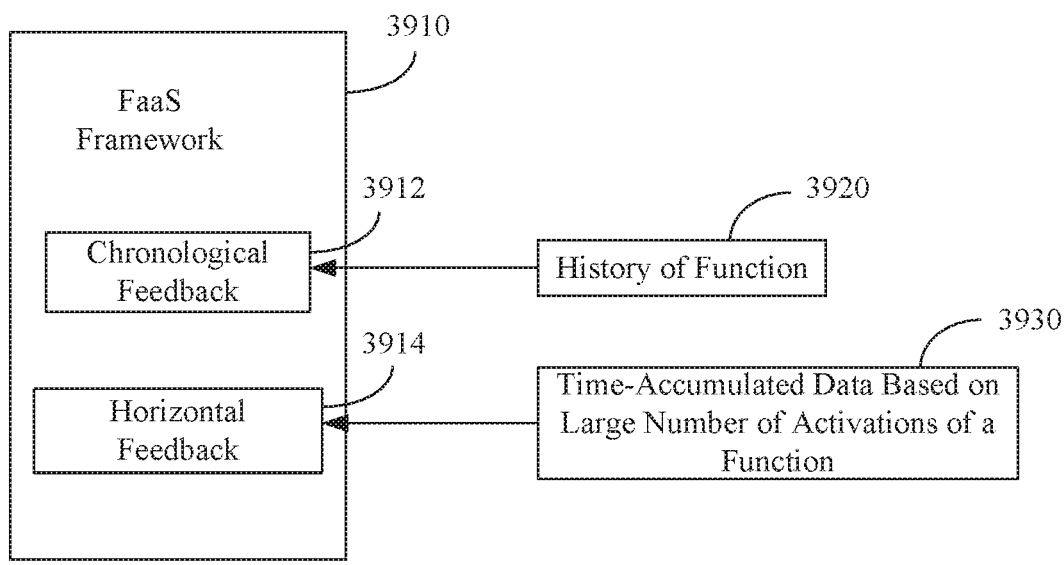
FIG. 39A illustrates a FaaS environment that facilitates continuous application of both chronological and cloud-scale (horizontal) feedback according to an embodiment.

According to an exemplary embodiment, as illustrated in FIG. 39A, a FaaS framework 3910 that facilitates continuous application of both chronological feedback 3912 that is developed from a history of a function 3920, and cloud-scale (horizontal) feedback 3914 that is developed from large numbers of activations of the function 3930 that occur concurrently and independently. In this way, it is a form of continuous learning combined with crowd learning that may be implemented at runtime of a Function.

Figure 39B:
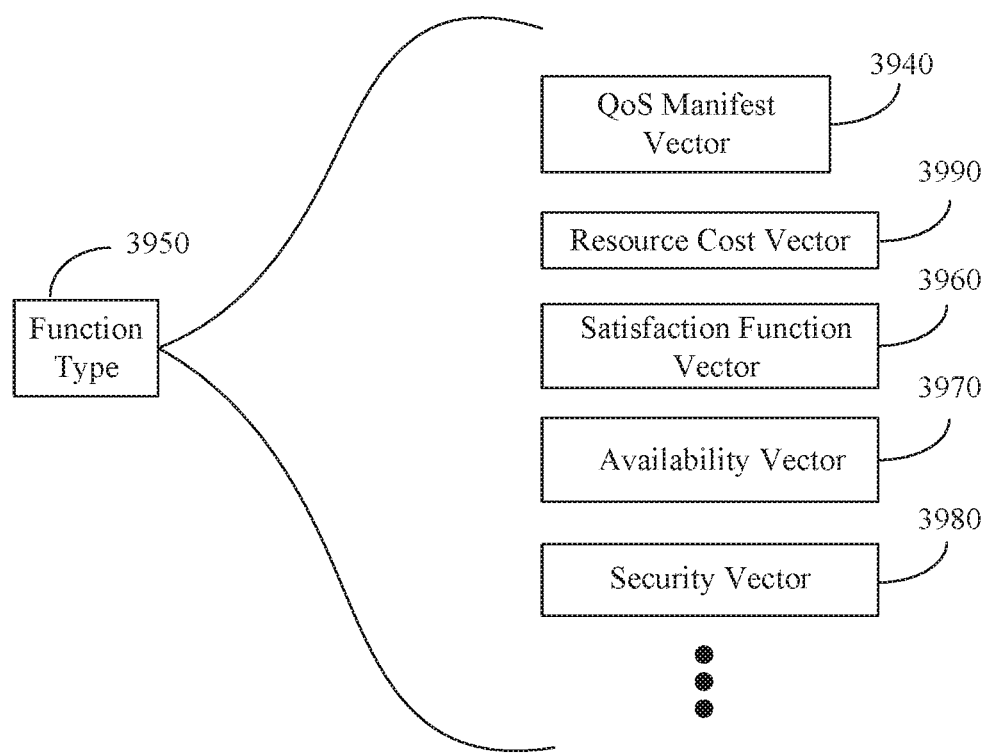
FIG. 39B illustrates different vectors of each function type according to an embodiment.

Turning now to FIG. 39B, according to an exemplary embodiment, the following components/aspects may be provided for each Function Type 3950:

1. A QoS manifest vector 3940—describes the particular QoS mix desired as a vector in a multi-dimensional space of {LATENCY, THROUGHPUT, VARIABILITY, UTILIZATION, COST, etc.}, normalized to a common reference so that each QoS vector takes values inside a unit sphere Q, where data is represented so that relationships among data may be magnitude or scale invariant.
2. A corresponding resource cost vector of resource cost functions {CPU CYCLES, MEM BW, IO BW, ... etc.} 3990, similarly normalized to a common (machine-neutral) reference so that the cost functions (e.g., routines of code) take values inside a unit sphere C. The custom managed runtime system class loader 3850 of FIG. 38A may generate at least a component of the resource cost vector. For example, the meta data file loader 3856 may identify the vector based on the FaaS function.
3. A multivalued satisfaction function vector G={g1, g2, ... gN} 3960, that maps a vector Q to a set of vectors in C—e.g., where multiple different vectors g1 (Q), g2(Q), ... gN(Q) from Q into C satisfy a given vector Q.
4. Both C and Q may be discretized versions of underlying continuous domains. Also, each G may be limited to an upper limit in N, so that there are a limited number of variations of satisfying resource assignments to search over.
5. Availability vector 3970, which describes the available subset of resources, or, equivalently the available subset of vectors in C at a given epoch in time.
6. A security vector 3980 related to QoS.

The satisfaction functions vector G 3960 may be trained (or learned) iteratively from applying local histories in which desired or specified QoS may be met by evaluated expenditures of resources. The resource expenditures may be available through telemetry at runtime within each host or container for a given Function. In addition, they may also be updated by mixing in satisfaction functions that are trained from other hosts or containers in the cloud. This mixing may be weighted, so that local histories are given greater weight over temporal inputs from other hosts; but these weights may be intentionally mutated to achieve evolutionary learning. Over time, this solution may allow continuous evolution in resource assignments resilient to momentary fluctuations, due to, for example, transient abnormalities in machine or software behaviors and to intrinsic variations in demand. In particular, mixing in satisfaction functions may result in applying bin-packing heuristics (to select best fit satisfaction vectors) while generalizing them to cloud scale learning.

Yet further, according to an exemplary embodiment, a meta language accelerator may be implemented to aggregate the telemetry related to the above-described vectors to evaluate the host functions for specific workloads. There may be a QoS specification (e.g., manifest) for the desired QoS, and the specification may include data about the tenant (e.g., the software implementation that the functions get serviced by, such as database systems, an image processing service, etc.). There may be an automatic way of accumulating and processing such data about tenants. In some cases, a service (e.g., a database) may indicate that its metrics should be ignored—for example, when it is not operating in a standard way.

According to an exemplary embodiment, end to end latency may be tracked across some function requests that accumulate time as the same function request goes through multiple phases of being serviced. Functions may be maintained locally if latency SLA requires milliseconds (ms) latency. An exemplary embodiment may guarantee staying below some threshold latency and may provide for construction of links that can assure such a threshold latency.

Figure 39C:
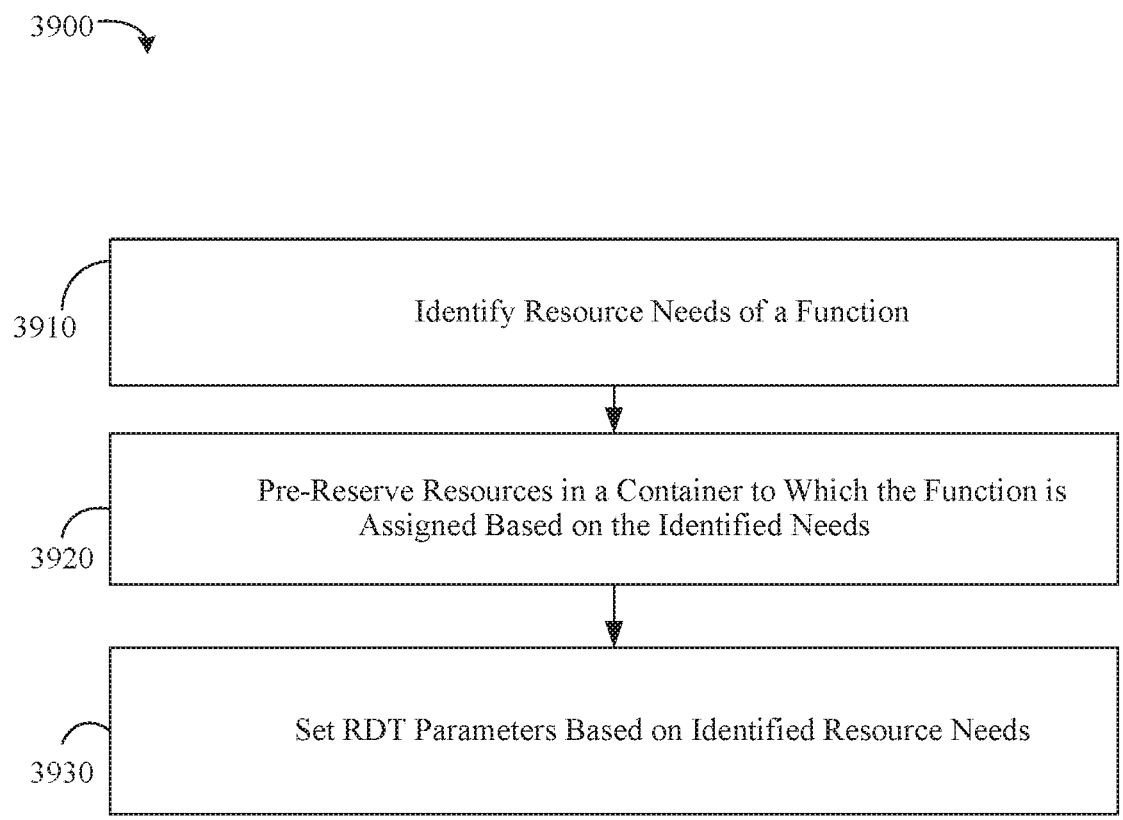
FIG. 39C is an example of a method of pre-reserving appropriate resources according to an embodiment.

Turning now to FIG. 39C, a method for pre-reserve appropriate resources according to an embodiment is illustrated. In block 3910 of method 3900, resource needs of a function may be identified. In block 3920, resources in a container to which the function is assigned, may be pre-reserved based on the identified resource needs. In block 3930, RDT parameters may be set based on the identified resource needs.

Embodiments of the method 3900 may be implemented in a system, apparatus, computer, device, etc., for example, such as those described herein. More particularly, hardware implementations of the method 3600 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 3900 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Embodiments or portions of the method 3900 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Additional Notes and Examples

Example 3901 includes a method comprising identifying resource needs of a function, pre-reserving resources in a container to which the function is assigned, based on the identified resource needs, and setting RDT parameters based on the identified resource needs.

Example 3902 includes the method according to Example 3901, further comprising invoking an accelerator to evaluate a cost function for a workload of the function.

Example 3903 includes the method according to Example 3901, further comprising constructing links to ensure a minimum latency.

Example 3904 includes the method according to Example 3901, further comprising securing QoS using at least one vector.

Example 3905 includes a method comprising identifying resource needs of a function, pre-reserving resources in a container to which the function is assigned, based on the identified resource needs, setting RDT parameters based on the identified resource needs, invoking an accelerator to evaluate a cost function for specific workloads, constructing links to ensure a minimum latency, and securing QoS using at least one vector.

Enhanced Lightweight Profile-Guided Optimization (PGO) Examples

Code optimization may be critical for serverless execution, particularly because non-optimized code incurs bloated latency and footprint, which directly translate to cost in the FaaS paradigm. The majority of code in serverless architectures may be in dynamic languages like node.js, python, etc. While PGO may provide important clues to create larger type-specialized compiler regions and thus minimize type checking and spilling values from stack registers to memory, its use in serverless computing may be restrained by the CPU overheads of collecting, analyzing, and applying it, and the resulting latency tax.

As the cost of executing a function depends on the execution time measured in milliseconds and the memory used, reducing the latency and code footprint becomes very important in FaaS environments. With enhanced PGO methods, the function source code may be compiled first and, during execution, a dynamic profile may be created. The profile may be used to make various optimizations and improve code performance for future function execution. A profile may be useful for future execution of a function since it is not known how well future execution of a function will be performed or whether future execution of a particular function will actually be performed. This process may be time consuming, this exemplary embodiment may accelerate the above-described profile generation using hardware assistance for FaaS functions. For example, last branch records or other hardware may be implemented to create the above-mentioned dynamic profiles. The creation of the dynamic profiles may also be created, in part, using software or software-hardware combinations.

According to yet another embodiment of the enhanced PGO methods, low level machine related bottlenecks that degrade the function performance may be identified. In FaaS execution environments, as the subsequent execution of the functions may be on different machines, understanding low level machine dependencies may be very useful.

Finally, according to yet another exemplary embodiment of the enhanced PGO methods, new optimizations using the enhanced PGO methods may be added to reduce the function latency such as vectorizing the array operations (e.g. in image processing functions), minimizing branch re-steering, and compacting the code to fit in the faster caches.

Various embodiments of the enhanced PGO methods also enable detection of anomalies using dynamic profiling capabilities in FaaS runtime. Generally, anomaly detection is the process of identifying abnormal events. In the context of FaaS execution environments, example anomaly events include an illegal instruction fault, prohibited access to a memory region, immature or unexpected function exit. Upon detecting anomaly events, the enhanced PGO methods report the detection to performance analysis tools of the enhanced FaaS system for further analysis. An anomaly event may be, for example, a function expecting certain files to be available, but they in fact are not available.

Figure 40A:
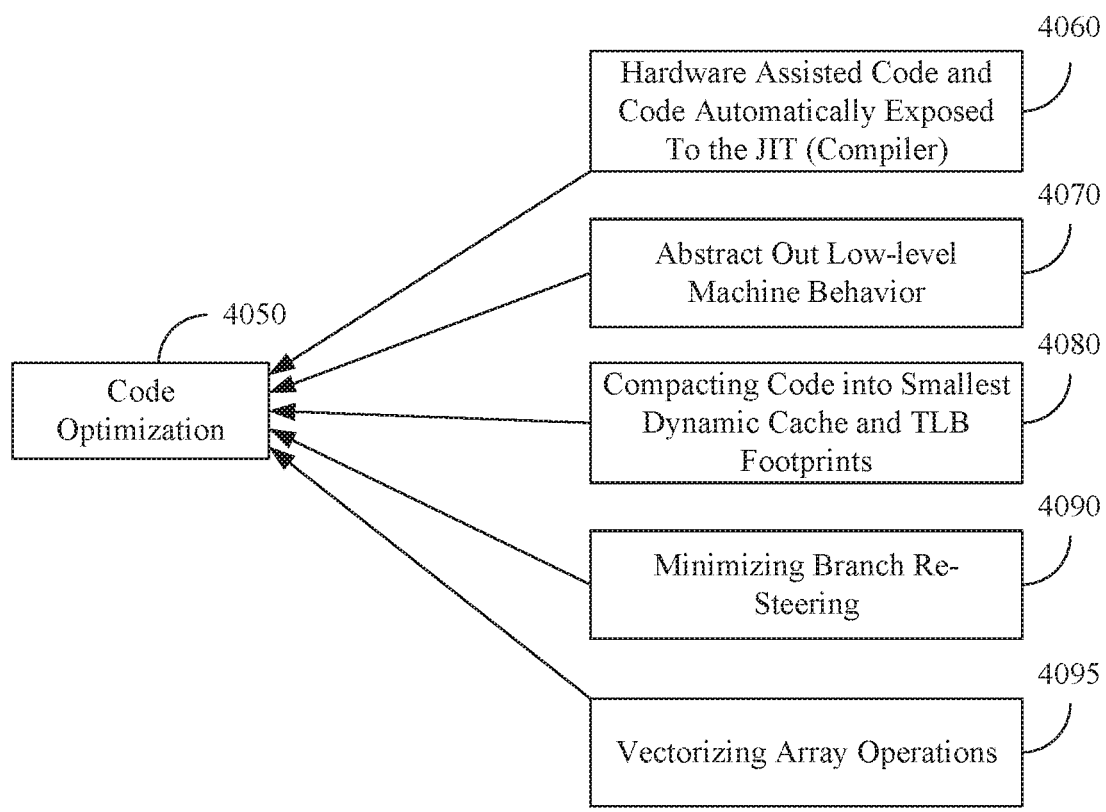
FIG. 40A illustrates different characteristics related to code optimization according to an embodiment.

Turning now to FIG. 40A, according to an exemplary embodiment, there may be several enhancements of the enhanced FaaS system such as the one shown in FIG. 4 that include three broad categories to address the above-described challenge related to code optimization 4050:

1. The first category relates to the collection of both hardware assisted code and code automatically exposed to the JIT (4060).
2. The second category may make it easier to identify the main issues affecting code execution, e.g., abstracting out low-level differences between machine performance data, which vary from machine to machine (4070). That is, when some function is being executed on a particular machine and it is running slowly, such information related to machine performance data may indicate that the slowness is due to a machine not running at a desirable frequency and not due to some weakness in the function that needs to be optimized for.
3. The third category comprises multiple optimizations or enhancements of existing FaaS solutions:
    Compacting code into smallest dynamic cache and TLB footprints (4080)
    Minimizing branch re-steering (4090)
    Vectorizing array operations (4095)

TLBs are performance-critical structures for caching address translation information for memory of a computer system. High rates of TLB misses are costly for system and function performance. Embodiments of the enhanced FaaS system can compile code in such a manner such that either TLB misses can be reduced, or TLB miss penalties can be reduced, e.g., by communicating information about strided access patterns among CPU cores and using prefetchers to predict future references (so that TLB misses only slow down data being prefetched—but which does not affect the speed of actual execution.

Similarly, Embodiments of the enhanced FaaS system optimize code compilation such that the compiled code can be accommodated in a smaller, dynamic page footprint (and thus reduce the space it consumes in a processor cache). Similarly any static data touched by the code is also compacted so that frequently accessed static data is co-located. For example, the embodiments of the enhanced FaaS system analyze a function's execution history under different compiler options and the gathered cache statistics, to select those compiled parts of code (e.g., those code modules) that have low temporal locality and place them in different part of the function's address space from the remaining parts of the code—to improve L1 instruction cache hits; and, similarly bring together various data objects that are more frequently accessed or accessed at the same time, so that the L1 data cache hits can be improved. Such compaction also reduces the average numbers of virtual addresses (for instruction and data pages) that are accessed contemporaneously, so that the TLB hit rates are improved in the enhanced FaaS system.

Branch re-steering refers to a process of re-directing an instruction fetcher to the right destination if the instruction fetcher went to a wrong branch destination earlier. For example, the Brach Target Buffer (BTB) is a cache-like structure, which can be used by the enhanced FaaS system to look up previously-seen branches. Some number of bits of the current program counter provided by the BTB contain information about potential branches. When the guess of a potential branch is wrong, the instruction fetcher will go to a wrong branch destination; once such wrong branch destination is found, the instruction fetcher needs to be re-steered to the right destination. Using the enhanced FaaS system, such branch re-steering can be minimized. A compiler can use many different techniques for reducing branch re-steering: in one example, a compiler can change the direction of a branch so that the frequently taken branch is easier for the BTB to predict as taken (usually a backward branch is easier to predict as taken than a forward branch); in another example, a compiler can use prediction hints as prefixes in the branch instruction, based on the evaluated profile information.

Embodiments of the enhanced FaaS system can further optimize function execution through vectorization of array operations. For example, the embodiments of the enhanced FaaS system can employ a vectorizing compiler to transform loops operations into a sequence of vector operations. Such vectorization/transformation allows the enhanced FaaS system to process one operation on multiple pairs of operands at once such that the performance of function execution is improved.

Execution characteristics extracted by the first category and translated by the second category of enhancements may also be used to drive orthogonal values such as enabling just-in-time QoS, security, and durability with information architecture (IA) uniqueness such as RDT, SGX, and 3DXP.

Figure 40B:
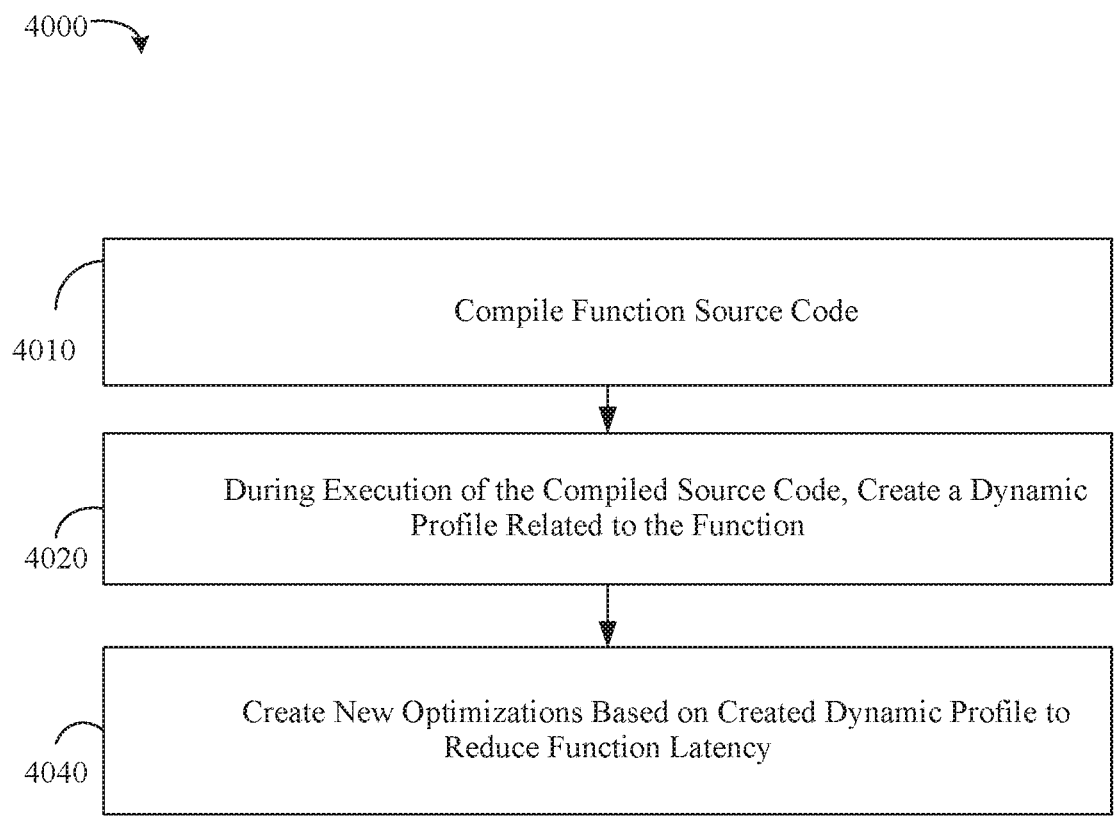
FIG. 40B is an example of a method of executing a function in an enhanced FaaS computing according to an embodiment.

Turning now to FIG. 40B, according to an exemplary embodiment, in block 4010 of method 4000, function source code may be compiled. In block 4020, during execution of the compiled source code, a dynamic profile related to the function may be created. In block 4040, new optimizations based on the created dynamic profile may be created to reduction function latency.

Embodiments of the method 4000 may be implemented in a system, apparatus, computer, device, etc., for example, such as those described herein. More particularly, hardware implementations of the method 4000 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 4000 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Embodiments or portions of the method 4000 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Additional Notes and Examples

Example 4001 includes a method comprising compiling source code of a function, during execution of the compiled source code, creating a dynamic profile related to the function, and creating new optimizations based on the created dynamic profile to reduce function latency.

Example 4002 includes the method according to Example 4001, further comprising detecting anomalies using dynamic profiling capabilities in FaaS runtime.

Example 4003 includes the method according to Example 4002, further comprising reporting results of the detecting to performance analysis tools.

Example 4004 includes the method according to Example 4001, further comprising maintaining, via an orchestrator, a profile mapping.

Example 4005 includes a method comprising identifying resource needs of a function, pre-reserving resources in a container to which the function is assigned, based on the identified resource needs, setting RDT parameters based on the identified resource needs, invoking an accelerator to evaluate a cost function for specific workloads, constructing links to ensure a minimum latency, securing QoS using at least one vector, detecting anomalies using dynamic profiling capabilities in FaaS runtime, reposting results of the detecting to performance analysis tools, maintaining, via an orchestrator, a profile mapping.

Chronicled Fingerprint Examples

Functions may exhibit different characteristics during their execution and use resources like CPU, memory, network, etc. at different rates. Understanding these characteristics and associating them with Functions (as their demand fingerprints) is important for efficient resource allocation and scheduling. An exemplary demand fingerprint is shown in FIG. 41D. However, demand fingerprints may not be easily obtained without significant prior experimentation—many function may be executed multiple times over a course of days, weeks, months.

Figure 41A:
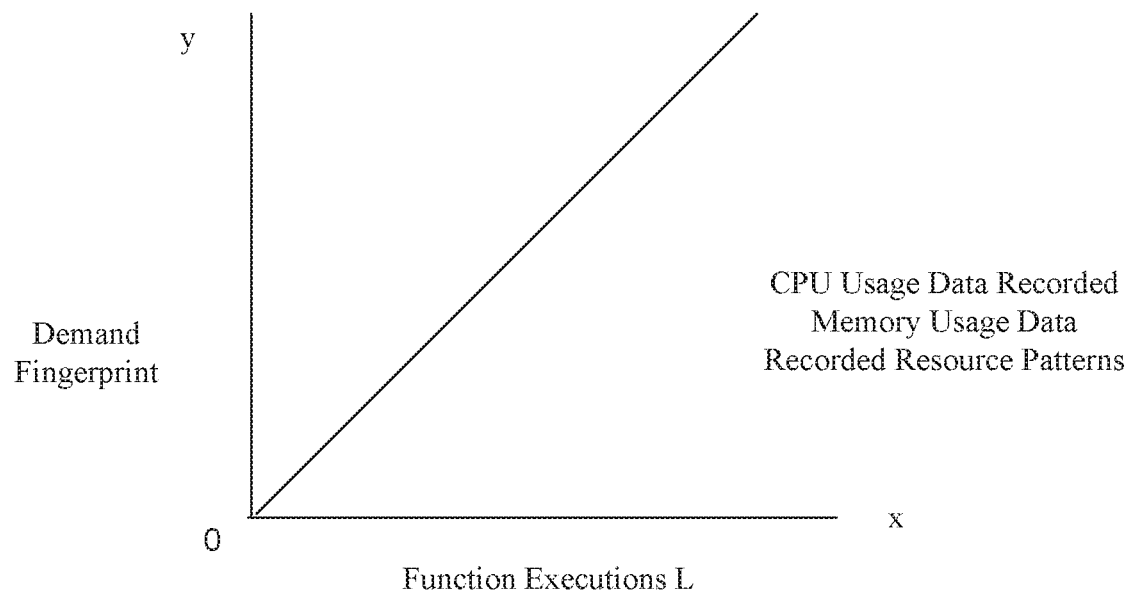
FIG. 41A is a graph that shows the relationship between demand fingerprints and function executions according to an embodiment.
Figure 41B:
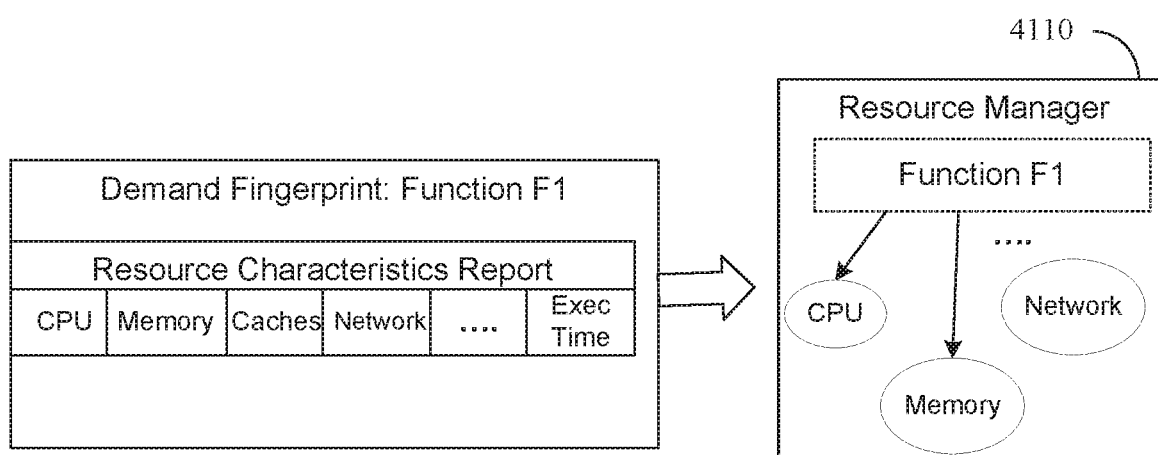
FIG. 41B illustrates an operation of a resource manager according to an embodiment.

According to an exemplary embodiment of the enhanced FaaS system such as the one shown in FIG. 4, a process is provided for automatically generating a detailed report on the usage of different resources at various stages of the function execution and generating the demand fingerprint on that basis over multiple executions. Some resources (e.g. CPU) might be heavily used at the start of the function and some other resources (e.g. memory, caches) might be used heavily during the latter part. One function may end up calling other functions as well. Such a detailed report may be called FUNCTION CHRONICLE. Thus, over time, as shown in FIG. 41A, with each execution of the function, various performance, power, and scaling characteristics or sensitivities of the function may be obtained and a rich history builds up, into a mature DEMAND FINGERPRINT. As illustrated in FIG. 41B, the DEMAND FINGERPRINT information may be used to schedule functions and allocate resources to the functions for an efficient resource management via a resource manager 4110, which may be implemented in an orchestrator or server of a CSP. Demand fingerprints may be associated with function call chains, with originating caller (specific client) and with values of specific parameters of function calls.

According to an exemplary embodiment as shown in FIG. 41B, a DEMAND FINGERPRINT may be created at the time of function creation and may contain only the details regarding the function parameters like memory requirement and timeouts. During the function execution the various resource consumption (e.g. CPU, memory) may be recorded. At the end of the function execution, different resource usage patterns may be inferred such as that the function is CPU/memory/network intensive or the particular stages when the function is executed, that are CPU/memory intensive. With multiple function executions, the DEMAND FINGERPRINT grows and more (accurate) information regarding the resource usage pattern of the function may be obtained. This DEMAND FINGERPRINT may be used for resource scheduling for further execution of the functions. In case of function chaining, the resource manager 4110 may prepare the resources for executing the chained functions ahead of time by allocating resources (CPU, memory) based on the DEMAND FINGERPRINT of the chained functions.

Turning now to FIG. 41C, according to an exemplary embodiment, in block 4120 of method 4100, resource characteristics may be associated with executed functions to generate demand fingerprints of the executed functions at each stage of execution. In block 4130, an orchestrator (not shown), for example, may generate detailed reports on the usage of different resources at multiple stages of execution of the functions. In block 4140, the execution of functions may be scheduled, and resources may be allocated to the functions based on the generated reports.

Embodiments of the method 4100 may be implemented in a system, apparatus, computer, device, etc., for example, such as those described herein. More particularly, hardware implementations of the method 4100 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 4100 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Embodiments or portions of the method 4100 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Additional Notes and Examples

Example 4101 includes a method comprising associating resource characteristics with executed functions to generate demand fingerprints of the executed functions at each stage of execution, generating, via an orchestrator, detailed reports on the usage of different resources at multiple stages of execution of the functions, scheduling the execution of the functions, and allocating resources to the functions based on the generated reports.

Example 4102 may include the method according to Example 4101, further comprising generating the demand fingerprints in association with parameters of the functions and a tenant that invokes the functions.

Example 4103 may include the method according to Example 4101, further comprising implementing sequence analytics machine learning model to generate the demand fingerprints.

Example 4104 includes a method comprising associating resource characteristics with executed functions to generate demand fingerprints of the executed functions at each stage of execution, generating, via an orchestrator, detailed reports on the usage of different resources at multiple stages of execution of the functions, scheduling the execution of the functions, allocating resources to the functions based on the generated reports, generating the demand fingerprints in association with parameters of the functions and a tenant that invokes the functions, and implementing sequence analytics machine learning model to generate the demand fingerprints.

Framework Method and Means for Automating Deep Profiling

The mutual opaqueness of function and its associated execution engines (such as containers and/or hosting means) in which they are executed, introduces significant challenges in profiling, debugging, auditing, and optimizing their execution. An exemplary embodiment of the enhanced FaaS system such as the one shown in FIG. 4 provides methods, some of which may be hardware assisted, for simplifying the performance tracing of a function and integrating the information with that obtained from the execution engine. In this integration, details of the hosting engine/container or platform may be suitably protected from being revealed, to achieve the desired level of execution engine transparency, and a function's architecture-neutral behavior may be profiled, traced, and time lined for debugging, tuning and auditing objectives.

Figure 42A:
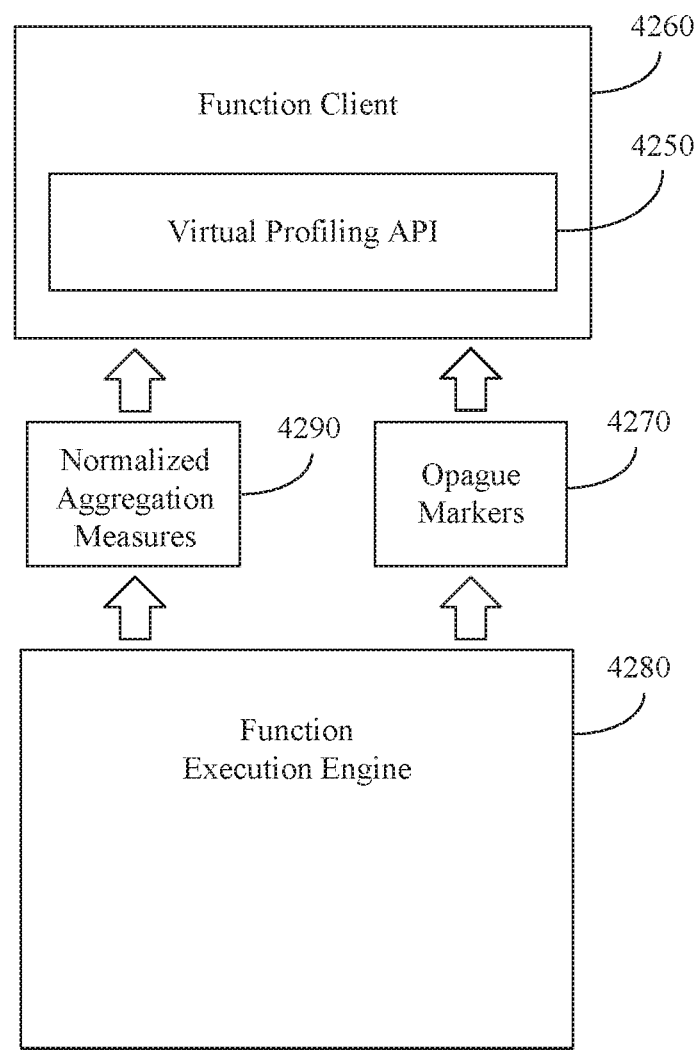
FIG. 42A is an example of communication between a function client and a function execution engine according to an embodiment.

Turning now to FIG. 42A, an enhanced FaaS framework includes a virtual profiling API 4250 via which a function client 4260 may obtain a time or event-punctuated trace along with opaque markers 4270 (e.g., indexes or data handles). The time or event-punctuated trace may be annotated with events which occurred during trace collection (e.g., interrupts or other signals, timeouts, page faults, etc.), and when they occurred in fine grained time units, starting with the execution of the function. The opaque markers 4270 may be presented to an execution engine 4280 to obtain various normalized aggregate measures 4290 from the execution environment 4280 according the degree of transparency that is negotiated between the function client 4260 and the execution service provider. The opaque markers 4270 may enable the referencing of information objects without the referencer having any access to the contents or structure of the referenced objects.

The opaque markers 4270 may provide a way for a suitably privileged tool to receive various statistics that are at the infrastructure level, and which may not therefore be available to the executing function (which runs at an inferior privilege level). In this way, the platform level events or statistics may be suitably filtered or mapped to some reference units and then blended into the trace. For example, an opaque marker 4270 may be translated later, into "CPU entered Turbo frequency G at time 0x12345", or "Memory error detected and corrected at time 0x56789 due to a thermal trip", etc.

Aggregate measures may be obtained to analyze and characterize a system and function's behavior together since, in general, it may not be necessary to know about everything in the system at the most minute level of detail. It may be sufficient to know, for example, that page faults occurred at an average frequency X or that the system experienced a thermal event or did not experience any thermal events during a time span when a function was executing. Obtaining a full train of measurements may be performed according to an exemplary embodiment, although, in some instances, such may be both too revealing and too expensive to store and analyze later. The aggregate measures obtained from the function execution engine 4280 can be further normalized for improved performance of analysis of the obtained aggregate measures. The normalized aggregate measures 4290 may include software metrics such as swap usage and hardware metrics such as L1 cache misses.

The virtual profiling may occur at runtime and may be performed by the container that is executing the function. The generated trace includes a collection of hardware and software metrics over the course of execution of the function and may also be classified based on the different events occurring during the function execution or function chaining. The opaque markers 4270 may be generated by the container layer, the virtual machine layer, or the hardware layer. Optional hardware extensions provide direct access to a virtual power management unit (PMU) capability for abstracted but agile self-characterization from within a function.

Figure 42B:
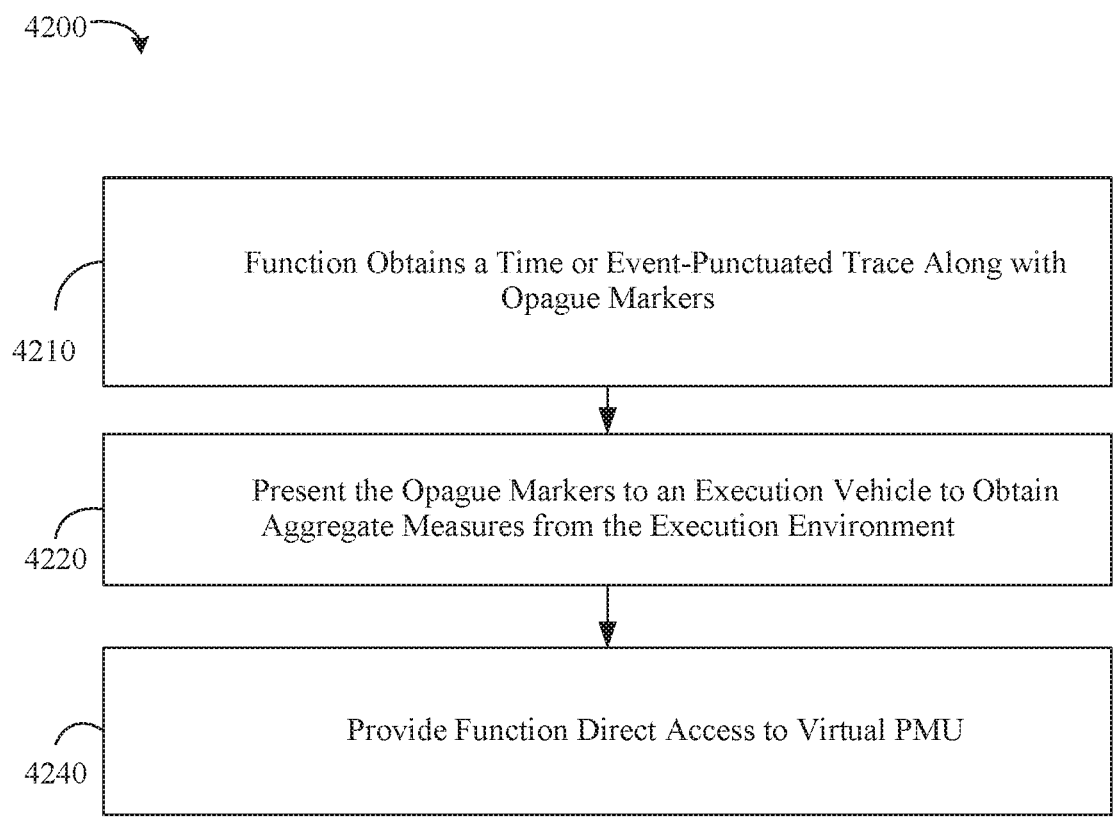
FIG. 42B is an example of a method of executing a FaaS function using opaque markers according to an embodiment.

Turning now to FIG. 42B, according to an exemplary embodiment, in block 4210 of method 4200, a function may obtain a time or event-punctuated trace along with opaque markers. In block 4220, the opaque markers may be presented to an execution engine of the function, such as a container executing the function, to obtain aggregate measures from the execution environment. In block 4240, the function may be provided direct access to a virtual PMU.

Embodiments of the method 4200 may be implemented in a system, apparatus, computer, device, etc., for example, such as those described herein. More particularly, hardware implementations of the method 4200 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 4200 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Embodiments or portions of the method 4200 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Additional Notes and Examples

Example 4201 includes a method comprising obtaining, via a function, a time or event-punctuated trace of the function and opaque markers, presenting the opaque markers to an execution engine associated with the function to obtain information about the function from the execution engine, and providing the function with direct access to one or more hardware components, wherein the opaque markers are to reference data objects without having any access to the contents or structure of the data objects.

Example 4202 includes the method of Example 4201, further comprising storing signed data into an enclave that is to be supplied to a trusted entity.

Example 4203 includes the method of Example 4201, further comprising encrypting system telemetry captured in relation to the opaque markers, wherein the encryption is to be performed using app-specific settings.

Example 4204 includes the method of Example 4201, further comprising generating API for application to determine profiling points independent of execution environment.

Example 4205 includes the method of Example 4201, further comprising decoupling privileges from the function and profiling data.

Example 4206 includes the method of Example 4201, further comprising managing safe points to insert tabs/tokens.

Example 4207 includes a method comprising obtaining, via a function, a time or event-punctuated trace and opaque markers, presenting the opaque markers to an execution engine to obtain information from the execution engine, providing the function with direct access to a virtual power management unit, storing signed data into an enclave that is to be supplied to a trusted entity, encrypting a captured page using app-specific settings, generating API for application to determine profiling points independent of execution environment, decoupling privileges from the function and profiling data, and managing safe points to insert tabs/tokens.

Server Selection for Function Execution

Figure 43A:
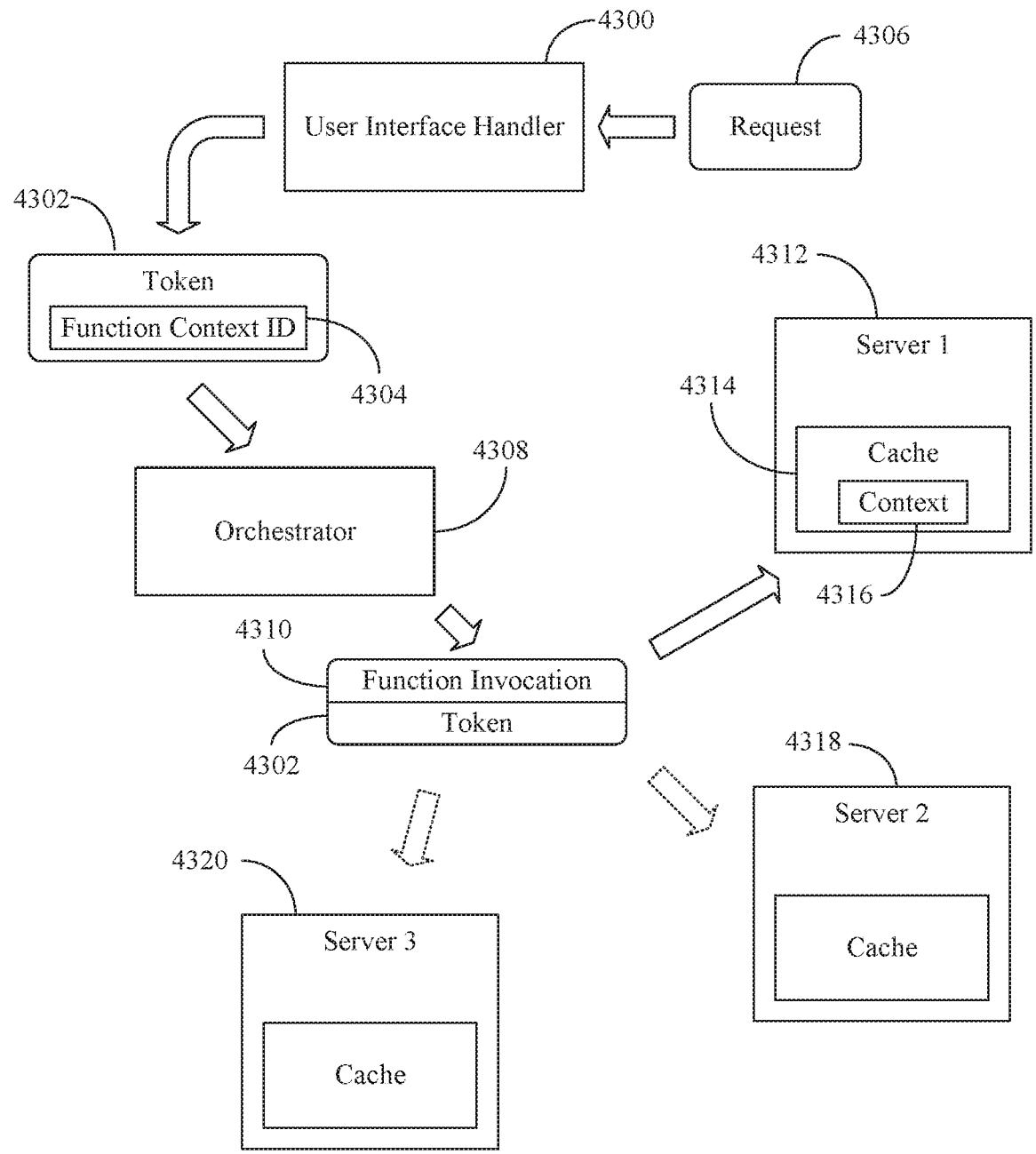
FIG. 43A is an illustration of an example of a server location selection based on a token that uniquely identifies a context of a function according to an embodiment.

Turning now to FIG. 43A, an example is shown in which session state management is handled by a user interface handler 4300 (e.g., API proxy such as, for example, API GATEWAY) of an enhanced FaaS system. In the illustrated example, the user interface handler 4300 generates a token 4302 (e.g., data "moniker") that includes a function context identifier (ID) 4304. The function context ID 4304 uniquely identifies a context 4316 of a function associated with an incoming request 4306 to execute the function. More particularly, the function may be attributed with optional fields that describe the context 4316 as an approximate representation of the identity of a dataset construct. In one example, the token 4302 is constructed by a moniker construction API of the user interface handler 4300 that uses, for example, a set function (e.g., a Bloom filter) applied over various universally unique IDs (UUIDs), the source of the request 4306 (e.g., caller of the function in an application-defined function mapping solution), specific parameters of the function, file system pathnames, resilient distributed dataset (RDD) lineages (e.g., in APACHE SPARK), tablespace ranges in relational databases, and so forth.

In the illustrated example, an orchestrator 4308 selects a server location based on the token 4302 (and potentially other factors to be discussed in greater detail) and transfers the token 4302 along with a function invocation 4310 to the selected server location. In the illustrated example, the function invocation 4310 and the token 4302 are transferred to a first server 4312 that includes a local cache 4314 containing the context 4316, where the context 4316 facilitates retrieval of state data (e.g., permissions, authentication status, transaction related data, etc.) by the function. The illustrated solution therefore enables computation to be pushed towards the data used during the function execution. In this regard, more efficient retrieval of state data is achieved because the context 4316 is cached locally (e.g., where function processing requests with the same state are created on demand when function-specific affinity is enforced).

The server location may be selected based on additional factors. For example, relative location cost (e.g., the cost of data transfer/bandwidth to the location, storing data at the location and/or processing data at the location) of the first server 4312, a second server 4318, a third server 4320, and so forth, may dictate the transfer of the function invocation 4310 and the token 4302 elsewhere. In yet another example, the orchestrator 4308 selects the server location based on a quality of service (QoS) requirement (e.g., reliability, processing speed, etc.). In such a case, the function invocation 4310 and the token 4302 might be transferred to the second server 4318 if the second server 4318 is able to satisfy the QoS requirement and the first server 4312 is not able to satisfy the QoS requirement.

In still another example, the orchestrator 4308 selects the server location based on a hash result of a previous execution of the function. More particularly, if DataID2=hash($fn$(DataID1))

When $fx$(DataID2) is called, the orchestrator 4308 may decide whether to move DataID2 or the function $fx$( ).

The server location may also be a node where the data is streamed (e.g., consumed via $2^{nd}$ or $3^{rd}$ order processing). In further examples, the server location is selected based on a history (e.g., time/temporal history) associated with the function, the request source and/or a function call tree (that is, a sequence of invocations that include the function being scheduled).

The illustrated solution enhances the FaaS system with event orientation to the extent that the function invocation 4310 is generated on demand in response to the request 4306. Additionally, the illustrated solution enhances the FaaS system with minimal administration because the selection of the server location is abstracted away from the user. Moreover, the FaaS system is enhanced with high scalability because the function invocation 4310 scales automatically with the number of requests 4306. In addition, the illustrated solution enhances the FaaS system with an atomic unit of scale to the extent that the function is the unit of compute scale. The illustrated solution also enables customers to pay only when the function invocation 4310 runs, and therefore provides granular billing to the FaaS system. Additionally, the illustrated solution reduces any need to maintain the context 4316 in a database, which would otherwise make retrieval of the context 4316 less efficient.

Figure 43B:
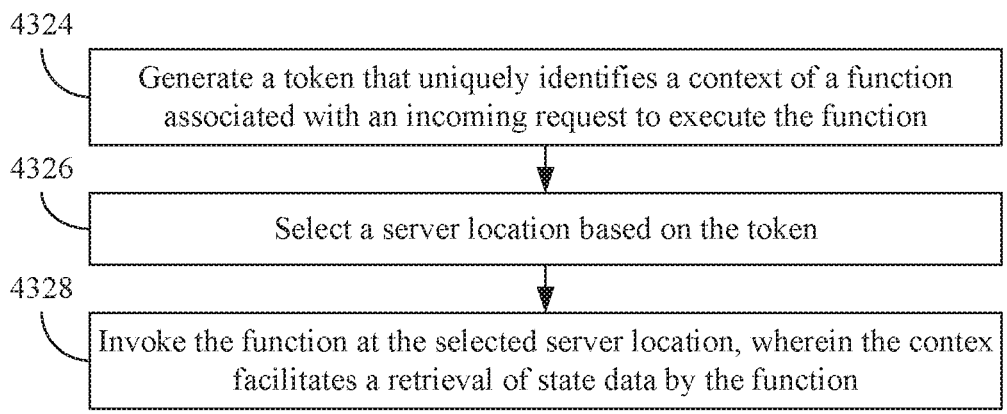
FIG. 43B is a flowchart of managing function invocations according to an embodiment.

Turning now to FIG. 43B, a method 4322 of managing function invocations is shown. The method 4322 may generally be implemented in an enhanced FaaS system such as, for example, the system 202 (FIG. 2) the system 300 (FIG. 3) and/or the system 400 (FIG. 4), already discussed. More particularly, the method 4322 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 4324 provides for generating a token that uniquely identifies a context of a function associated with an incoming request to execute the function. The incoming request may be a trigger such as, for example, an IoT event and/or FaaS event such as user request for executing a function developed by the user. In one example, block 4324 is conducted by a user interface handler such as, for example, the user interface handler 4300 (FIG. 43A), already discussed. A server location is selected at block 4326 based on the token, wherein illustrated block 4328 invokes the function at the selected server location. In the illustrated example, the context facilitates a retrieval of state data by the function (e.g., the function retrieves the state data from the context). Blocks 4326 and 4328 may be conducted by an orchestrator such as, for example, the orchestrator 4308

(FIG. 43A), already discussed. The illustrated method 4322 therefore enhances the FaaS system in terms of event orientation, minimal administration, high scalability, atomic unit of scale and granular billing. Additionally, the illustrated method 4322 reduces any need to maintain the context in a separate database and access it each time, which would be much less efficient due to the additional latency of remote accesses.

Figure 43C:
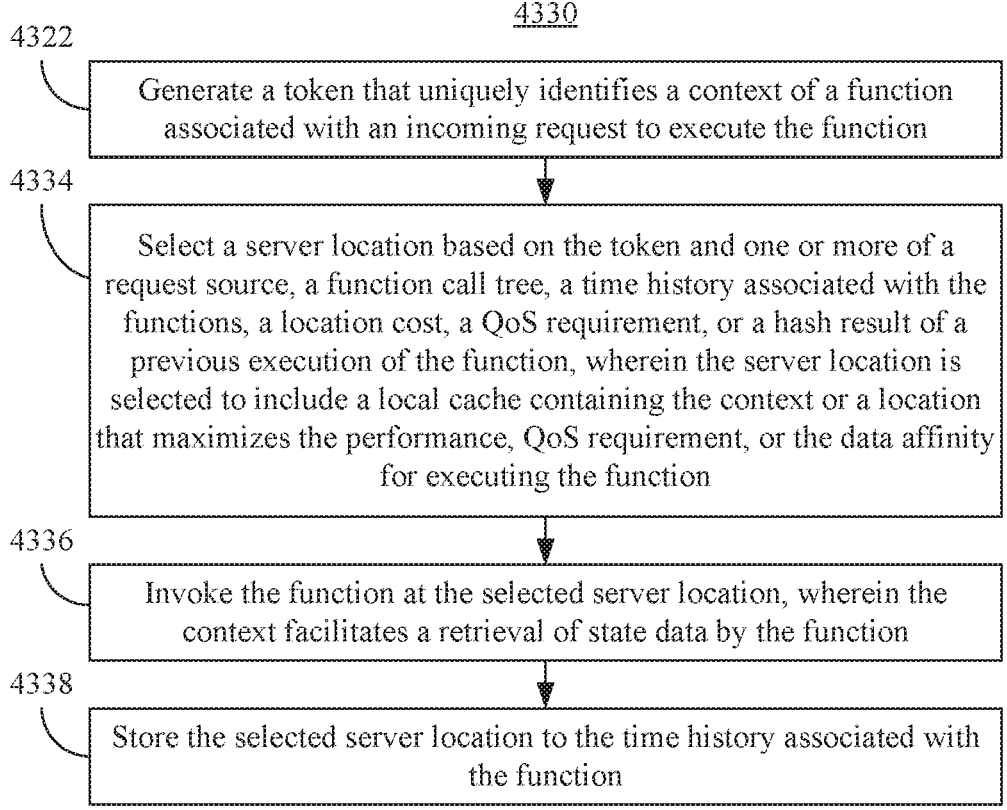
FIG. 43C is a flowchart of a detailed method of managing function invocations according to an embodiment.

FIG. 43C shows a more detailed method 4330 of managing function invocations. The method 4330 may generally be implemented in an enhanced FaaS system such as, for example, the system 202 (FIG. 2) the system 300 (FIG. 3) and/or the system 400 (FIG. 4), already discussed. More particularly, the method 4330 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 4332 provides for generating a token that uniquely identifies a context of a function associated with an incoming request to execute the function. The incoming request may be a trigger such as, for example, an IoT event and/or FaaS event. In one example, block 4332 is conducted by a user interface handler such as, for example, the user interface handler 4300 (FIG. 43A), already discussed. A server location is selected at block 4334 based on the token and one or more of a time history associated with the function, a request source, a function call tree, a location cost, a QoS requirement, or a hash result of a previous execution of the function. In the illustrated example, the server location is selected to include a local cache containing the context or a location that maximizes the performance, QoS requirement, or the data affinity for executing the function. The server location may also be a node where the data is streamed (e.g., consumed via $2^{nd}$ or $3^{rd}$ order processing).

Block 4336 invokes the function at the selected server location, wherein the context facilitates the retrieval of state data by the function. The selected server location is stored to the time history associated with the function at block 4338. Thus, the time history may be used to make future server location decisions for the function. In one example, blocks 4334, 4336 and 4338 are conducted by an orchestrator such as, for example, the orchestrator 4308 (FIG. 43A), already discussed. The illustrated method 4330 therefore enhances the FaaS system in terms of event orientation, minimal administration, high scalability, atomic unit of scale and granular billing.

Figure 43D:
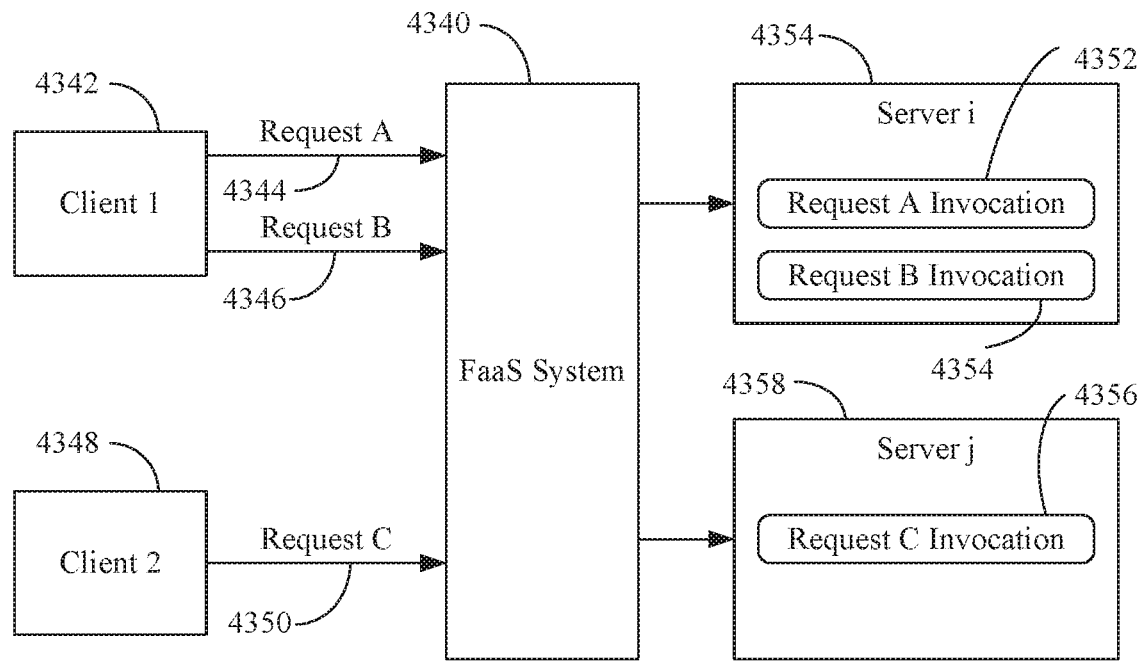
FIG. 43D is a block diagram of an example of a FaaS system in which the location of function invocations is selected based on request source.

FIG. 43D shows a FaaS system 4340 in which the location of function invocations is selected based on the request source. More particularly, a first client 4342 ("Client 1") issues a first request 4344 ("Request A") to execute a particular function to the FaaS system 4340. The first client 4342 may also issue a second request 4346 ("Request B") to execute the same function to the FaaS system 4340. Additionally, a second client 4348 ("Client 2") issues a third request 4350 ("Request C") to execute the function to the FaaS system 4340, in the illustrated example. In such a case, the FaaS system 4340 might send a Request A invocation 4352 and a Request B invocation 4354 to a common server such as, for example, an $i^{th}$ server 4354 ("Server i") to reduce the likelihood of moving context and/or state data. By contrast, the illustrated FaaS system 4340 sends a Request C invocation 4356 to a $j^{th}$ server 4358 ("Server j") because the third request 4350 is from the second client 4348 (e.g., a different request source).

Figure 43E:
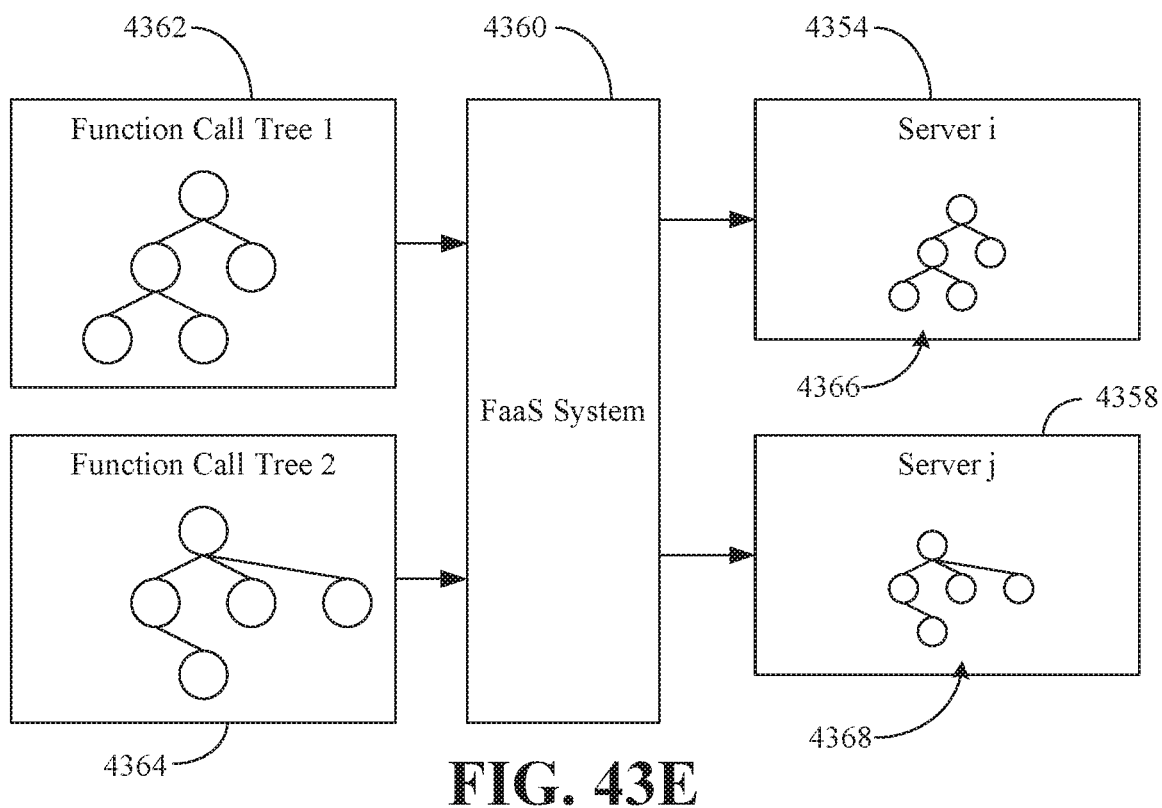
FIG. 43E is a block diagram of an example of a FaaS system in which the location of function invocations is selected based on the function call tree.

FIG. 43E shows a FaaS system 4360 in which the location of function invocations is selected based on function call trees. More particular, a first function call tree 4362 ("Function Call Tree 1") and a second function call tree 4364 ("Function Call Tree 2") are issued to the FaaS system 4360. In such a case, the FaaS system 4360 might send a first set of invocations 4366 corresponding to the first function call tree 4362 to the $i^{th}$ server 4354 to reduce the likelihood of moving context and/or state data associated with the first function call tree 4362. Similarly, the illustrated FaaS system 4360 sends a second set of invocations 4368 to the $j^{th}$ server 4358 to reduce the likelihood of moving context and/or state data associated with the second function call tree 4364.

Additional Notes and Examples

Example 4301 includes at least one computer readable storage medium comprising a set of executable program instructions, which, when executed by a computing device, cause the computing device to: generate a token that uniquely identifies a context of a function associated with an incoming request to execute the function; select a server location based on the token and one or more of a time history associated with the function, a request source, a function call tree, a location cost, a Quality of Service (QoS) requirement, or a hash result of a previous execution of the function, wherein the server location is selected to include a local cache containing the context; invoke the function at the selected server location, wherein the context facilitates a retrieval of state data by the function; and store the selected server location to the time history.

Example 4302 includes the at least one computer readable storage medium of Example 4301, wherein the server location is selected to be a node where data is streamed.

Cross-Domain Invocation Transfer Examples

Cross-domain control transfer—most often arising from a remote procedure call (RPC)—is frequent in distributed applications and services and its high cost may be attributable to associated context-switches, cross-stack copying (e.g., under control of a supervisor/hypervisor) and secure control transfers. RPCs have been a key mechanism for building client-server or peer-to-peer interactions. Efficient RPC implementation, however, may be challenging in a FaaS environment. Indeed, the importance of efficient cross-domain control transfers may grow as other issues (e.g., efficient isolation through lighter-weight containment, service level agreement/SLA support, etc.) are addressed.

During RPC interactions, the caller may (a) move from its user space into the kernel space, where, (b) after validation of various capabilities (c) the call parameters/data are marshalled and (d) messaged over an appropriate transport mechanism to the callee. Measurements show that control plane overhead in optimized gRPC (GOOGLE RPC) implementations account for over 90% of cycles. In one example, cloud-native data plane (e.g., the part of a network that carries user traffic) work such as, for example, the NFF-Go project (e.g., github.com/intel-go/nff-go) has established that efficient RPC may be critical for network function virtualization (e.g., capable of hundreds of millions of requests/second, ~1 request per packet). At the same time, attempts to apply FaaS paradigm to data plane processing may have exposed a need for unified mechanism(s) to access the OS, platform and hardware acceleration, as well as Function-to-Function chaining to avoid dependencies on specific frameworks (e.g., to make function calls in the same way in different cloud environments, like in AMAZON LAMBDA™, OPENWHISK™, GCP/GOOGLE CLOUD PLATFORM™, and NFF-Go™).

The operations involved in processes (a)-(d) above may include boiler-plate code sequences that are performed across different domains, which involve supervisory intervention that renders them computationally expensive. Indeed, similar overheads apply on the callee's side and on the results return path. As other hardware features become faster (e.g., in successive hardware technology generations) these overheads become proportionally a larger portion of the "pie."

Although recently developed instructions may facilitate a hardware implementation of the above "macro" or cookie-cutter operations, there remains room for improvement. For example, the lack of an underlying mechanism focused on making the control-transfer efficient may result in greater costs associated with more frequent context switches, cross-stack copying, transfer security and/or supervisory intervention. As will be discussed in greater detail, virtual hardware threads and uniform resource identifier (URI) call instructions may be used to increase the efficiency of cross-domain control transfers.

Figure 44A:
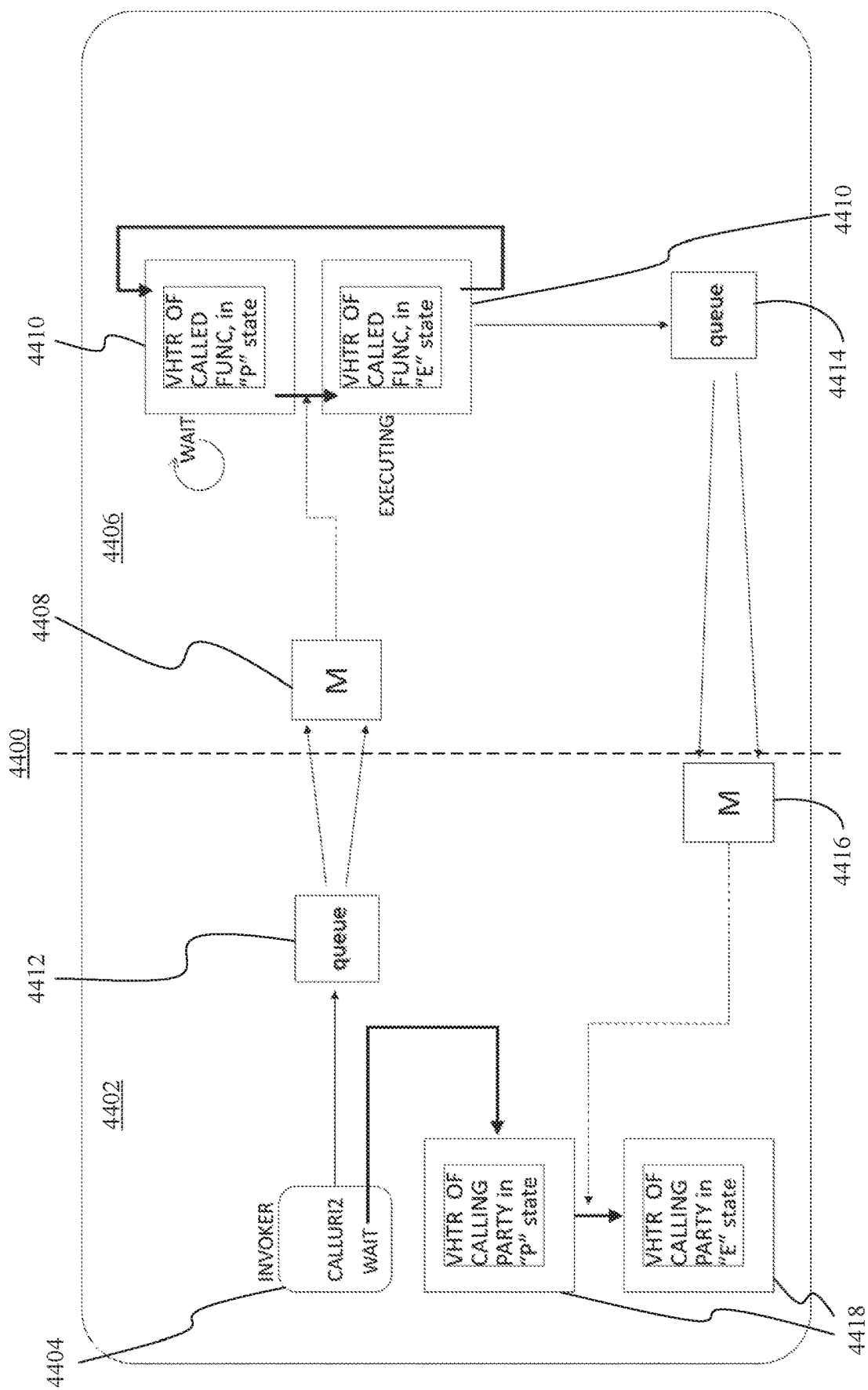
FIG. 44A is a block diagram of an example of a cross-domain control transfer according to an embodiment.

Turning now to FIG. 44A, a cross-domain environment 4400 is shown in which an invoker 4404 (e.g., caller) in a first domain 4402 calls a function that is "virtually waiting" for the call in a second domain 4406. In general, a core in the second domain 4406 may include monitor logic 4408 (e.g., logic instructions, configurable logic, fixed-functionality hardware logic, etc., or any combination thereof) and a plurality of virtual hardware threads (VHTRs) such as, for example, a virtual hardware thread 4410. The virtual hardware thread 4410 may generally be a thread scheduling structure used by scheduling hardware to subdivide core resources and cycles among multiple threads, or virtual network functions (VNFs). From a software and operating system stand-point, a VHTR is similar to a regular CPU core. In some embodiments, a VHTR is pinned to a thread and associated with multiple functions to assist in scheduling and execution. In some embodiments, a hardware scheduler adapts CPU slicing among VHTRs. For example, a hundred or more VHTRs might be scheduled to share the CPU cycles of two processing cores. Accordingly, thousands of VHTRs may be allocated and pinned to threads, as long as there is sufficient storage.

In the illustrated example, the virtual hardware thread 4410 is placed in a pause state ("P" state) in which execution and polling are suspended. While the virtual hardware thread 4410 is waiting in the P state, it is neither receiving processor cycles nor polling. When the invoker 4404 enqueues (e.g., via a CALLURI2 instruction) one or more call parameters of the called function in a monitored location such as, for example, a queue 4412 or other location that is monitored by the called party, the illustrated invoker 4404 enters (e.g., via a WAIT command) a local virtual hardware thread 4418 into the P state. Additionally, the monitor logic 4408 may detect the presence of the call parameter(s) in the queue 4412. The presence of the call parameter(s) in the queue 4412 may be detected via a preexisting microarchitectural capability such as, for example, a user level interrupt (e.g., UMONITOR/UMWAIT), a memory trigger (e.g., MONITOR/MWAIT), a transactional synchronization extension (TSX) mechanism-generated indication of a load or store to a marked cache line, an inter-processor interrupt (IPI) in combination with a halt (HLT) instruction and a lightweight interrupt service routine (ISR), backward compatible polling loops, and so forth.

In one example, the monitor logic 4408 is part of a hardware scheduler, which selects a core that is in waiting state and triggers execution of the selected core by passing the address of function, a pointer to the call parameter(s), and a token that identifies a request that may be used for future return of results. If no waiting cores exist, the HW scheduler may either support a queue of tasks for each core (e.g., hardware queue manager/HQM) or use an extended semantic of UMONITOR/UMWAIT that supports parameter transfers and queues (e.g., reporting whether a core is waiting in the P state). Thus, in response to the call parameter(s) being in the queue 4412, the monitor logic 4408 places the virtual hardware thread 4410 in an execution state ("E" state). In the illustrated example, the virtual hardware thread 4410 enqueues one or more results of the called function in a monitored location such as, for example, a queue 4414 or other location that is monitored by the calling party. Monitor logic 4416 (e.g., logic instructions, configurable logic, fixed-functionality hardware logic, etc., or any combination thereof) may detect the presence of the result(s) in the queue 4414. The presence of the result(s) in the queue 4414 may be detected via a preexisting microarchitectural capability such as, for example, a user level interrupt, a memory trigger, a TSX mechanism-generated indication of a load or store to a marked cache line, an IPI in combination with a HLT instruction and a lightweight ISR, backward compatible polling loops, and so forth. In response to the result(s) being in the queue 4414, the illustrated monitor logic 4416 places virtual hardware thread 4418 into the execution state so that it may consume the result(s) and perform further operations.

Figure 44B:
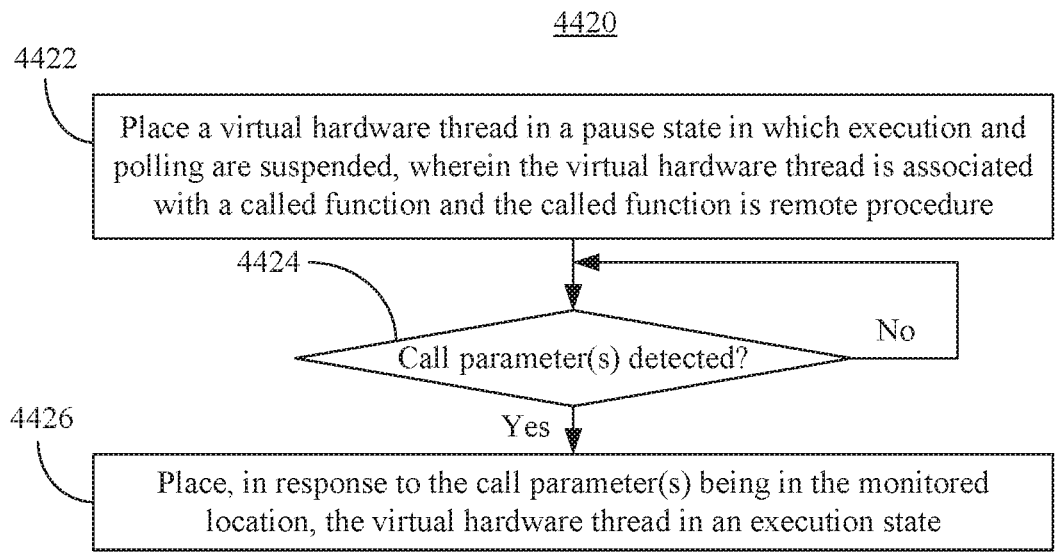
FIG. 44B is a flowchart of operating a remote procedure callee according to an embodiment.

Turning now to FIG. 44B, a method 4420 of operating a remote procedure callee is shown. The method 4420 may generally be implemented in an enhanced FaaS system such as, for example, the system 202 (FIG. 2) the system 300 (FIG. 3) and/or the system 400 (FIG. 4), already discussed. In an embodiment, the method 4420 is implemented in a called party domain such as, for example, the second domain 4406 (FIG. 44A), already discussed. More particularly, the method 4420 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 4422 provides for placing a virtual hardware thread in a pause state in which execution and polling are suspended. In the illustrated example, the virtual hardware thread is associated with a called function and the called function is a remote procedure. A determination may be made at block 4424 as to whether one or more call parameters of the called function is in a monitored location. If not, the illustrated method 4420 repeats block 4424. Once it is determined that the call parameter(s) have been detected, block 4426 provides for placing, in response to the call parameter(s) being in the monitored location, the virtual hardware thread in an execution state.

Figure 44C:
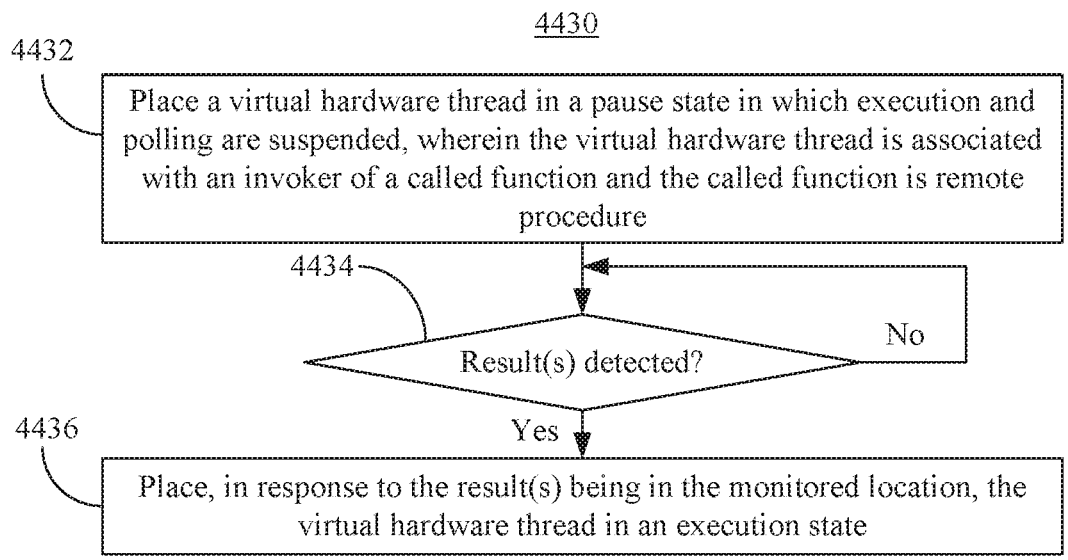
FIG. 44C is a flowchart of operating a remote procedure caller according to an embodiment.

FIG. 44C shows a method 4430 of operating a remote procedure caller. The method 4430 may generally be implemented in an enhanced FaaS system such as, for example, the system 202 (FIG. 2) the system 300 (FIG. 3) and/or the system 400 (FIG. 4), already discussed. In an embodiment, the method 4430 is implemented in a calling party domain such as, for example, the first domain 4402 (FIG. 44A), already discussed. More particularly, the method 4430 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 4432 provides for placing a virtual hardware thread in a pause state in which execution and polling are suspended. In the illustrated example, the virtual hardware thread is associated with an invoker of a called function and the called function is a remote procedure. A determination may be made at block 4434 as to whether one or more results of the called function is in a monitored location. If not, the illustrated method 4430 repeats block 4434. Once it is determined that the result(s) have been detected, block 4436 provides for placing, in response to the result(s) being in the monitored location, the virtual hardware thread in an execution state.

Additional Notes and Examples

Example 4401 includes at least one computer readable storage medium comprising a set of executable program instructions, which, when executed by a computing device, cause the computing device to place a virtual hardware thread in a pause state in which execution and polling are suspended, wherein the virtual hardware thread is associated with a called function and the called function is a remote procedure, detect one or more call parameters of the called function in a monitored location, and place, in response to the one or more call parameters being in the monitored location, the virtual hardware thread in an execution state.

Example 4402 includes at least one computer readable storage medium comprising a set of executable program instructions, which, when executed by a computing device, cause the computing device to place a virtual hardware thread in a pause state in which execution and polling are suspended, wherein the virtual hardware thread is associated with an invoker of a called function and the called function is a remote procedure, detect one or more results of the called function in a monitored location, and place, in response to the one or more results being in the second location, the second virtual hardware thread in the execution state.

Unification of Heterogeneous Data Flow Examples

Figure 45A:
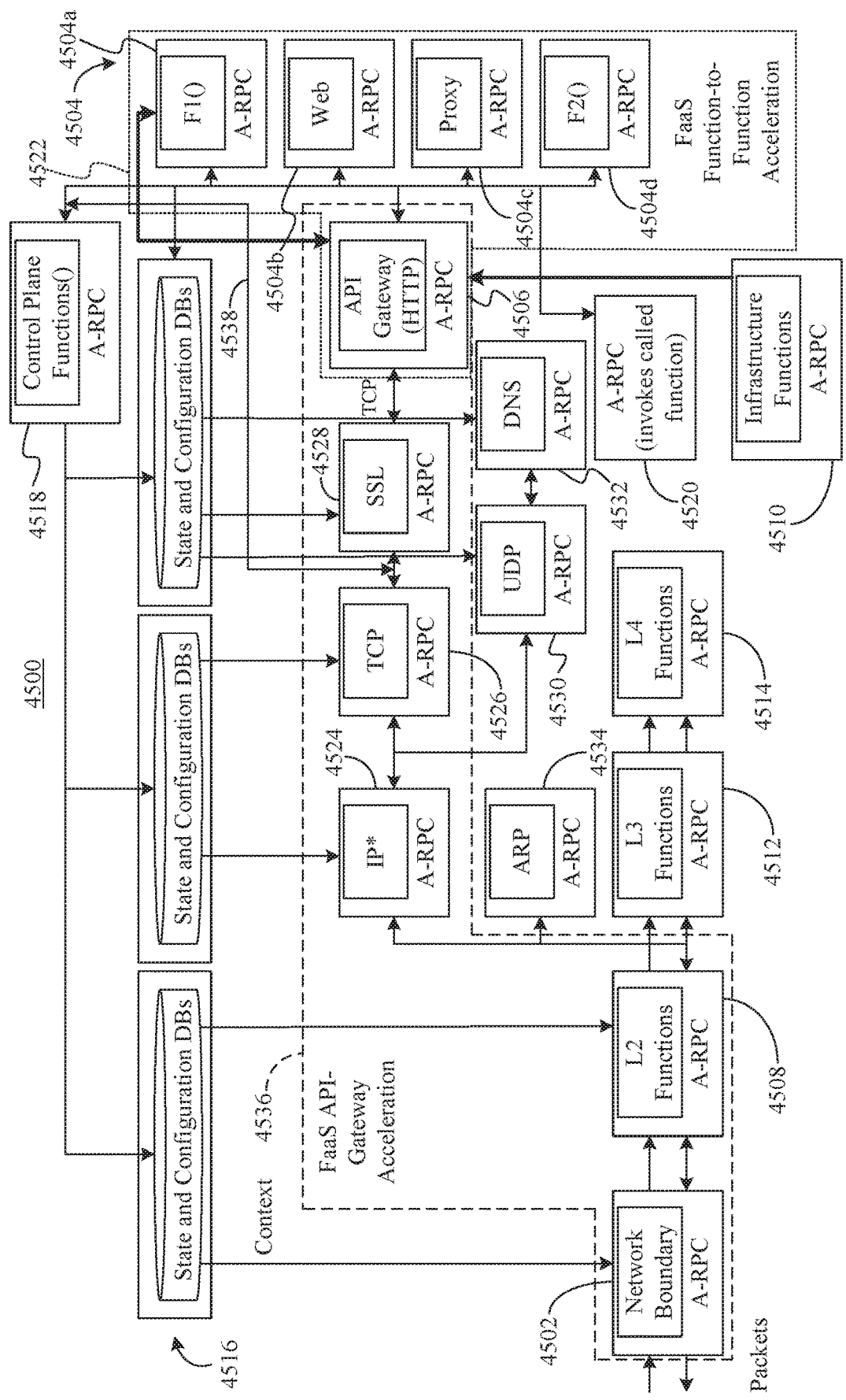
FIG. 45A is a block diagram of an example of a FaaS architecture in which application layer functions are collocated with data plane functions according to an embodiment.

FIG. 45A shows a FaaS architecture 4500 in which packets traverse a network boundary 4502 and a network stack generally includes several layers (e.g., L7—application layer, L4—transport layer, L3—network layer, L2—data link layer, etc.). For example, one or more data link (e.g., layer L2 of the Open Systems Interconnection/OSI model) functions 4508 facilitate the transfer of data between adjacent network nodes in a wide area network (WAN) or between nodes on the same local area network (LAN) segment. Additionally, one or more network (e.g., layer L3 of the OSI model) functions 4512 may handle packet forwarding and one or more transport (e.g., layer L4 of the OSI model) functions 4514 provide host-to-host communication services for applications.

In one example, an API gateway 4506 intercepts remote procedure calls (RPCs) from various functions 4504 (4504a-4504d) such as, for example, a first application layer (e.g., L7 of the OSI model) function 4504a, a first data plane function 4504b (e.g., web function), a second data plane function 4504c (e.g., proxy function), a second application layer function 4504d, and so forth. The illustrated API gateway 4506, which supports a Hypertext Transfer Protocol (HTTP), also intercepts RPCs from one or more infrastructure functions 4510. An accelerated RPC (A-RPC) invoker 4520 may conduct instantiations of network functions associated with the intercepted RPCs. For example, the API gateway 4506 might intercept an RPC from the first application layer function 4504a, where if the intercepted RPC is associated with the second application layer function 4504d, the invoker instantiates the second application layer function 4504d.

In particular, the RPCs are intercepted prior to packetization of the RPCs and the instantiations bypass the transport layer and/or the network layer of the network stack. Thus, the illustrated solution provides a new application binary interface (ABI) that does not need to pass through the entire network stack. The instantiations may also bypass one or more encryption operations, one or more invoker-target handshake messages, etc. Accordingly, the illustrated API gateway 4506, functions 4504 and invoker 4520 constitute a FaaS function to function acceleration logic 4522 that enables more efficient instantiation and routing.

The illustrated functions 4504 and various event sources 4516 (e.g., state and configuration database) are supported by one or more control plane functions 4518. Additionally, the event sources 4516 may provide context data to the network boundary 4502, the data link function(s) 4508, Internet Protocol (IP) logic 4524 (e.g., IPv4, IPv6), Transmission Control Protocol (TCP) logic 4526, Secure Sockets Layer (SSL) logic 4528 that exchanges TCP messages with the API gateway 4506, User Datagram Protocol (UDP) logic 4530, and Domain Name Server (DNS) logic 4532, which are all accelerated in the illustrated example. The illustrated architecture 4500 also includes Address Resolution Protocol (ARP) logic 4534. In one example, the network boundary 4502, data link function(s) 4508, IP logic 4524, TCP logic 4526, SSL logic 4528, and API gateway 4506 are FaaS API-Gateway acceleration logic 4536.

The first application layer function 4504a and the second application layer function 4504d are callable via Representational State Transfer (REST), gRPC, A-RPC, and so forth. An additional path 4538 may be provided for packets containing legacy style protocols such as, for example, Border Gateway Protocol (BGP) to be processed before reaching the API gateway 4506. The legacy style protocols might affect some configurations of other functions. For example, BGP may be used to update routing tables that are in turn used by some IP functions. Accordingly, the illustrated additional path 4538 enables the functionality of the API gateway 4506 to be limited to just a few protocols, if appropriate. Indeed, the additional path 4538 may handle REST and gRPC calls, with the API gateway 4506 being responsible for only A-RPC calls (including their recirculation, e.g., F1⇒F2⇒F3, etc., without low levels of the network stack). The illustrated architecture 4500 therefore unifies an implementation of a complete L2-L7 network stack and L7 application functions and enables various shortcuts by exposing the API gateway 4506 as an infrastructure (or runtime) function on its own. The illustrated architecture 4500 also eliminates performance problems associated with differently designed applications such as NGINX, which may otherwise require calls to go through the kernel network stack.

FIG. 45B shows a method 4540 of operating a runtime framework for a FaaS service. The method 4540 may generally be implemented in an enhanced FaaS system such as, for example, the system 202 (FIG. 2) the system 300 (FIG. 3) and/or the system 400 (FIG. 4), already discussed. In an embodiment, the method 4540 is implemented in a FaaS architecture such as, for example, the FaaS architecture 4500 (FIG. 45A), already discussed. More particularly, the method 4540 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 4542 provides for intercepting an RPC from a first network function at an application layer of a network stack prior to packetization of the RPC. Block 4544 may conduct an instantiation of a second network function associated with the RPC (e.g., at the application layer), wherein the instantiation is to bypass one or more of a transport layer of the network stack or a network layer of the network stack. In one example, the instantiation also bypasses one or more encryption operations and/or one or more invoker-target handshake messages.

Additional Notes and Examples

Example 4501 includes at least one computer readable storage medium comprising a set of executable program instructions, which, when executed by a computing device, cause the computing device to intercept a remote procedure call from a first network function at an application layer of a network stack prior to packetization of the remote procedure call, and conduct an instantiation of a second network function associated with the remote procedure call, wherein the instantiation is to bypass one or more of a transport layer of the network stack or a network layer of the network stack.

Example 4502 includes the least one computer readable storage medium of Example 4501, wherein the instantiation is to bypass one or more encryption operations and one or more invoker-target handshake messages.

Response Object Tailoring Examples

In one example, FaaS architectures use standard data-interchange formats to pass parameters and arguments between functions, receive invocation request responses that are serialized into such formats, and so forth includes a commonly used format is JSON (JavaScript Object Notation), which is lightweight and may be easily read/parsed. Different invocation instances of a function may use different fields of the response object, where the response object may be serialized and returned in the form of a JSON object. For example, a function "funcGetItems" might return a list of items—each containing a detailed list of fields.

```
funcGetItems( ){
    //retrieve items from, e.g., database
    itemsRet= . . .
    return itemsRet;
}
```

A sample JSON response returned by funcGetItems:
```
{
    "items": [
        "item_id": "CCA",
            "estimated_at": 1461612017,
            "expires_at": 1461612617,
            "start_time": 1461618000,
            "end_time": 1461621600,
            "fee": 4.34,
            "currency_code": "USD",
            "ready_by_time": 1461617260
        },
        "item_id": "CVOWF",
            "estimated_at": 1461612017,
            "expires_at": 1461612617,
            "start_time": 1461621600,
            "end_time": 1461625200,
            "fee": 4.34,
            "currency_code": "USD",
            "ready_by_time": 1461620860
        },
        "item_id": "Y2UyND",
            "estimated_at": 1461612017,
            "expires_at": 1461612617,
            "start_time": 1461625200,
            "end_time": 1461628800,
            "fee": 4.34,
            "currency_code": "USD",
            "ready_by_time": 1461624460
        }
    ]
}
```

A scenario may be encountered in which functions "funcA" and "funcB" each call "funcGetItems", but they each use only a few fields of each item.

```
funcA( ) {
    response=lambda.invoke(funcGetItems)
    all=response["items"]
    for item in all:
        process(item["item_id"], item["fee"])
}
funcB( ) {
    response=lambda.invoke(funcGetItems)
    all=response["items"]
    for item in all:
        process(item["item_id"], item["start_time"])
}
```

Technology described herein tailors the serialized response (or parameter) object to be tailored based on the requirements/signature of each caller. For example, the returned response to "funcB" may be compressed into the following JSON object—containing only the necessary/appropriate data fields.

```
{
    "items": [
        {"item_id": "CCA",
            "start_time": 1461618000,
        },
        {"item_id": "CVOWF",
            "start_time": 1461621600,
        },
        {"item_id": "Y2UyND",
            "start_time": 1461625200,
        }
    ]
}
```

Figure 46A:
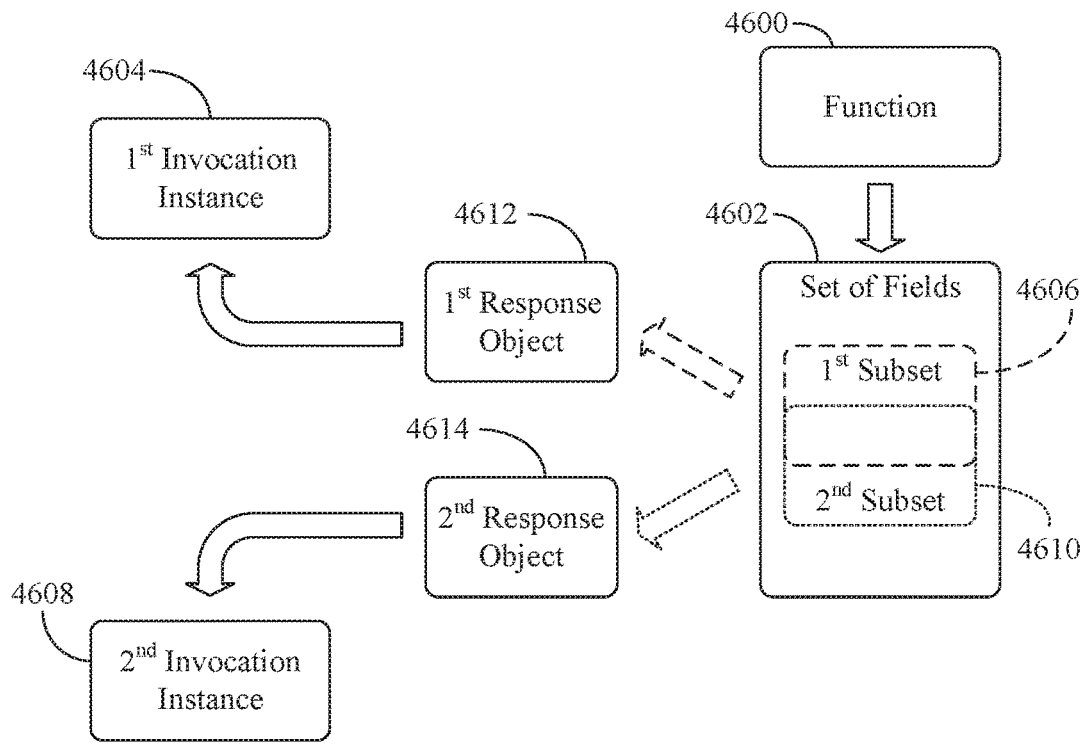
FIG. 46A is an illustration of an example of a tailored response object solution according to an embodiment.

For example, FIG. 46A demonstrates that a function 4600 may return a set of data fields 4602 (e.g., "item_id" through "ready_by_time"). If a first call by a first invocation instance 4604 of the function 4600 (e.g., lambda/anonymous invoker of "funcA") is detected, a first subset 4606 (e.g., only "item_id" and "fee") of the set of fields 4602 may be identified, wherein the first subset 4606 is relevant to the first invocation instance 4604. Moreover, a first relayout (e.g., reconfiguration, reordering) of a first response object 4612 (e.g., JSON object) may be conducted based on the first subset 4606. As will be discussed in greater detail, the first relayout may filter the first response object 4612 to include only the first subset 4606, reorder the first response object 4612 to list the first subset 4606 before remaining fields in the set of fields 4602, and so forth.

Similarly, if a second call by a second invocation instance 4608 of the function 4600 (e.g., lambda/anonymous invoker of "funcB") is detected, a second subset 4610 (e.g., only "item_id" and "start_time") of the set of fields 4602 may be identified, wherein the second subset 4610 is relevant to the second invocation instance 4608. Moreover, a second relayout of a second response object 4614 (e.g., JSON object) may be conducted based on the second subset 4610. Again, the second relayout might filter the second response object 4612 to include only the second subset 4610, reorder the second response object 4614 to list the second subset 4606 before remaining fields in the set of fields 4602, and so forth. The illustrated solution provided by the enhanced FaaS system therefore compresses the response objects 4612, 4614 and enables more efficient networking/bandwidth usage, less processing overhead, enhanced performance, minimized administration and greater scalability.

In one embodiment, the compression mechanism may be implemented as a gather of relevant fields for each caller anonymous function (e.g., function literal, lambda abstraction, lambda expression) before the response is sent back. In one example, the labels/offsets of relevant data fields are registered for each caller—and can further be cached in a software/hardware structure in proximity of the callee lambda. For example, a lookup table might be indexed by the caller ID/IP/address to retrieve the filter that will be applied to the raw result. The filter may select a few fields of interest similar to the above examples. Additionally, the filter can also reformat the response/JSON object to list/bring up the fields of interest first and place the rest of the fields/data afterwards. While JSON compression is used herein to facilitate discussion, other encodings of message parameters such as, for example, gRPC binary encoding, may also be used.

In one example, the filter code (e.g., method stub, lambda) is provided as part of the caller implementations (e.g., signature, method stub). The filter code may also be derived by a compiler/runtime tool. In an embodiment, filtering of the raw result before sending it back is implemented via a jump table (e.g., an indirect jump to code performing the compression/relayout that is tailored for each caller) before executing the return instruction. Further instruction set architecture (ISA) and hardware support may be developed to cache targets of the indirect jump (e.g., similar to a Translation Lookaside Buffer/TLB cache) or predict the targets of the indirect jump (e.g., similar to a Branch Target Buffer/BTB).

Figure 46B:
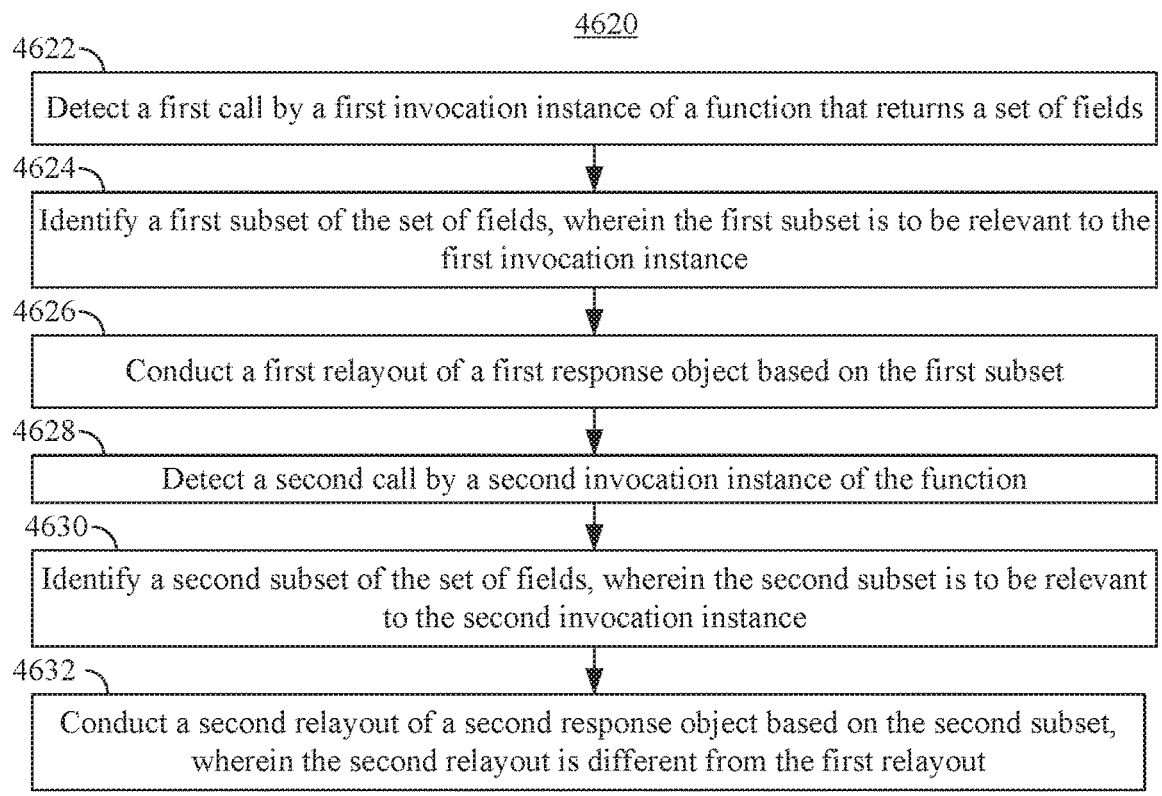
FIG. 46B is a flowchart of tailoring response objects to invocation instances according to an embodiment.

Turning now to FIG. 46B, a method 4620 of tailoring response objects to invocation instances is shown. The method 4620 may generally be implemented in an enhanced FaaS system such as, for example, the system 202 (FIG. 2) the system 300 (FIG. 3) and/or the system 400 (FIG. 4), already discussed. More particularly, the method 4620 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 4622 detects a first call by a first invocation instance of a function that returns a set of fields. A first subset of the set of fields may be identified at block 4624, wherein the first subset is to be relevant to the first invocation instance. Additionally, block 4626 conducts a first relayout of a first response object based on the first subset. In one example, block 4626 includes filtering the first response object to include only the first subset. Block 4626 may also include reordering the first response object to list the first subset before remaining fields in the set of fields. Other relayout techniques may also be used.

In one example, a second call by a second invocation instance of the function is detected at block 4628. A second subset of the set of data fields is identified at block 4630, wherein the second subset is to be relevant to the second invocation instance. Illustrated block 4632 conducts a second relayout of a second response object based on the second subset, wherein the second relayout is different from the first relayout. Block 4632 may include filtering the second response object to include only the second subset, reordering the second response object to list the second subset before remaining fields in the set of fields, and so forth. The illustrated method 4620 therefore compresses the response objects and enables more efficient networking/bandwidth usage, less processing overhead, enhanced performance, minimized administration and greater scalability.

Additional Notes and Examples

Example 4601 includes at least one computer readable storage medium comprising a set of executable program instructions, which, when executed by a computing device, cause the computing device to detect a first call by a first invocation instance of a function that returns a set of fields, identify a first subset of the set of fields, wherein the first subset is to be relevant to the first invocation instance, and conduct a first relayout of a first response object based on the first subset.

Example 4602 includes the at least one computer readable storage medium of Example 4601, wherein the first relayout is to filter the first response object to include only the first subset.

Example 4603 includes the at least one computer readable storage medium of Example 4601, wherein the first relayout is to reorder the first response object to list the first subset before remaining fields in the set of fields.

Example 4604 includes the at least one computer readable storage medium of Example 4601, wherein the instructions, when executed, cause the computing device to detect a second call by a second invocation instance of the function, identify a second subset of the set of fields, wherein the second subset is to be relevant to the second invocation instance, and conduct a second relayout of a second response object based on the second subset, wherein the second relayout is different from the first relayout.

Parameter Marshalling Examples

Parameter marshalling involves transforming the memory representation of an object into another format that is suitable for storage or transmission to other software applications. Marshalling therefore facilitates communication between remote objects by converting an object into serialized form. The marshalling of parameters for RPCs in a FaaS framework may face bottleneck challenges due to the sheer volume of data being transferred. Whether text encoding (e.g., REST with JSON) or binary encoding (e.g., GRPS, FLATBUFFERS, APACHE THRIFT) are used to pass function parameters, the bottleneck challenge may persist because data on "the wire" is formatted differently from data in memory and there is permanent serialization/deserialization.

Figure 47A:
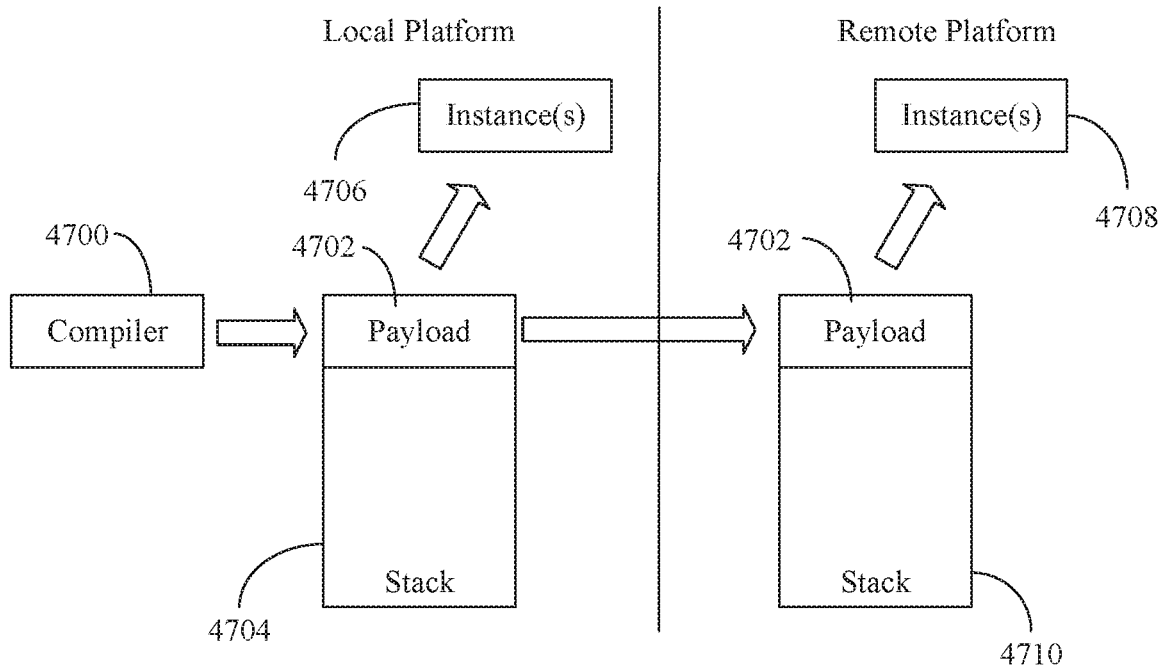

FIG. 47A shows a scenario in which a compiler 4700 determines a payload 4702 (e.g., a "ready-to-execute" data array) for a function and places, at compile time, the payload 4702 onto a call stack 4704. As will be discussed in greater detail, the function is uniformly invokable via the payload 4702 as either one or more local instances 4706 (e.g., on a local platform) or one or more remote instances 4708 (e.g., on a remote platform). If it is determined at runtime (e.g., based on various conditions not known at compile time) that the function is to be invoked on the remote platform, the illustrated payload 4702 is transported to a call stack 4710 on the remote platform, where it is used by a generic RPC handler to invoke the instance(s) 4708. In one example, the payload 4702 includes one or more parameter values, the size of the payload 4702 and an identifier of the function. The illustrated solution therefore eliminates bottlenecks associated with the inefficient marshalling of function parameters. Accordingly, enhanced performance, minimal administration, and greater scalability may be achieved.

More particularly, a "ready-to-wire" format may be used as part of the ABI (application binary interface) for function calls in which the stack 4704 for a stub-side portion of the call contains all of the details required for transmitting it using an RPC transport mechanism or passing it to hardware. Thus, the stack 4704 is where the payload 4702 is placed as a ready-to-execute data array, making it ready for invocation of the target. Thus, if the target is remote and needs to be invoked via a non-shared-memory transport mechanism, it gets invoked directly with the payload 4702 already assembled on the stack 4704 of the local platform.

On the remote platform (e.g., receiver/target side), the reverse operation similarly sets up the stack 4710 for invoking (e.g., collapsing the protocol processing and data unpacking into a single operation). Thus, if the target is a remote procedure that can be invoked without having to transport the payload by wire, then the stack 4704 can be built up in shared memory and the RPC can be extremely lightweight—even matching a local function call, if all arguments are in shared memory together with the stack 4704 that is used for dispatching the remote call.

The principle is illustrated below with a deliberately simple example in which marshalling involves simply copying the parameter values (e.g., arguments) into a stack frame. The core principle remains the same for more complex arguments.

At runtime, depending on the configuration, a function such as, for example, test(int a, short b) might either be dispatched as a local call, or as a remote call on a remote network host. This decision may be predicated on various conditions not known at compile time. In such a case, a conventional runtime might perform such a call as follows (with code annotations following double forward slashes "//"):

```
if (_local_call_to_test( ) {
  test(a, b); // compiler generates code placing a and b on
    stack or registers, as
  // follows—
  // stack.a=a;
  // stack.b=b;
  // call test
} // use regular ABI, a and b would be on stack and/or
    registers
else { // client-side stub for test(a, b) . . .
  // construct the message for sending
  struct m_test m=malloc (sizeof (struct m_test));
  m→a=a;
  m→b=b;
  m→header= . . . xxx . . . ;
  // perform the invocation via-transport
  _RPC_CALL_("test", m);
  // the target host will reverse the above operations, and
    then invoke test(a, b) at the target.
}
```

By contrast, the technology described herein performs the following unification and simplification via the compiler 4700. The compiler 4700 would produce, for the call to test(a, b):

```
stack.header=test_specific_header; // identification of
    'test' function,
// such as a 32- or 64-bit ID that may be an index in vtable
    for this function
stack. a=a;
stack.b=b;
stack.epilogue=test_specific_epilogue; // contains size of
    frame, and may
// be, something else in addition.
// Size of frame/payload enables generic RPC implementation
call [test]; // indirect call using vtable (virtual method
    table)
```

Moreover, if the call is a remote inter-process communication (IPC) call, a generic RPC handler may perform:

```
#define SES sizeof (stack.epilogue) // make a call to the
    function
// as defined in the header, using stack content as payload,
    and size of payload
send(stack.header.id,&stack-_SES_,_SES_);
```

Where SES refers to stack epilogue size (e.g., a macro replacement used for code clarity). As already noted, the payload may contain an identification of the called function, a size of payload and values of parameters (e.g., avoiding any pointers/references that would otherwise prevent cross-domain calls).

Figure 47C:
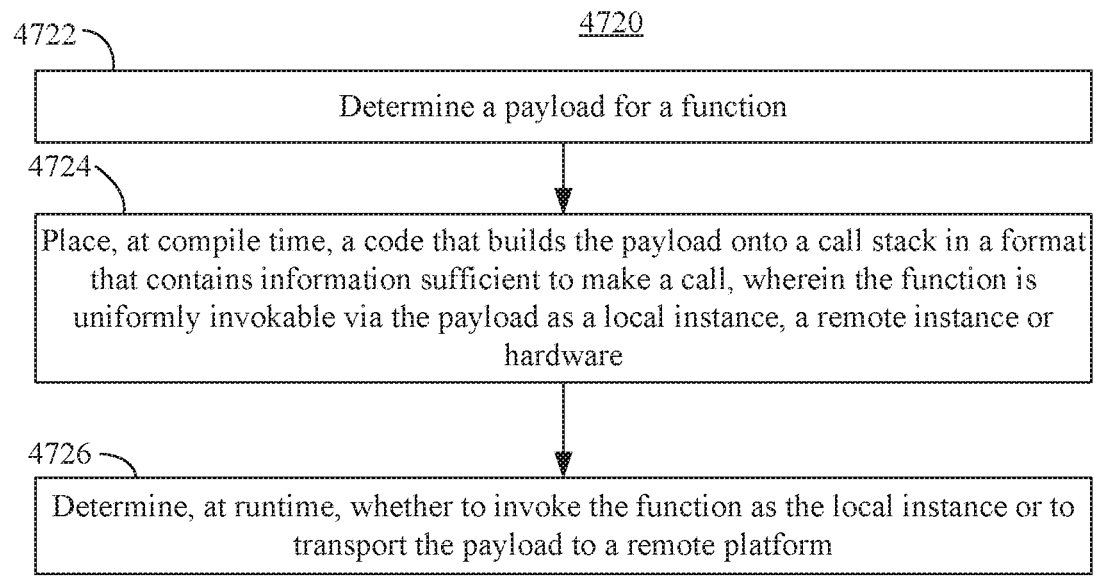
Figure 47B:
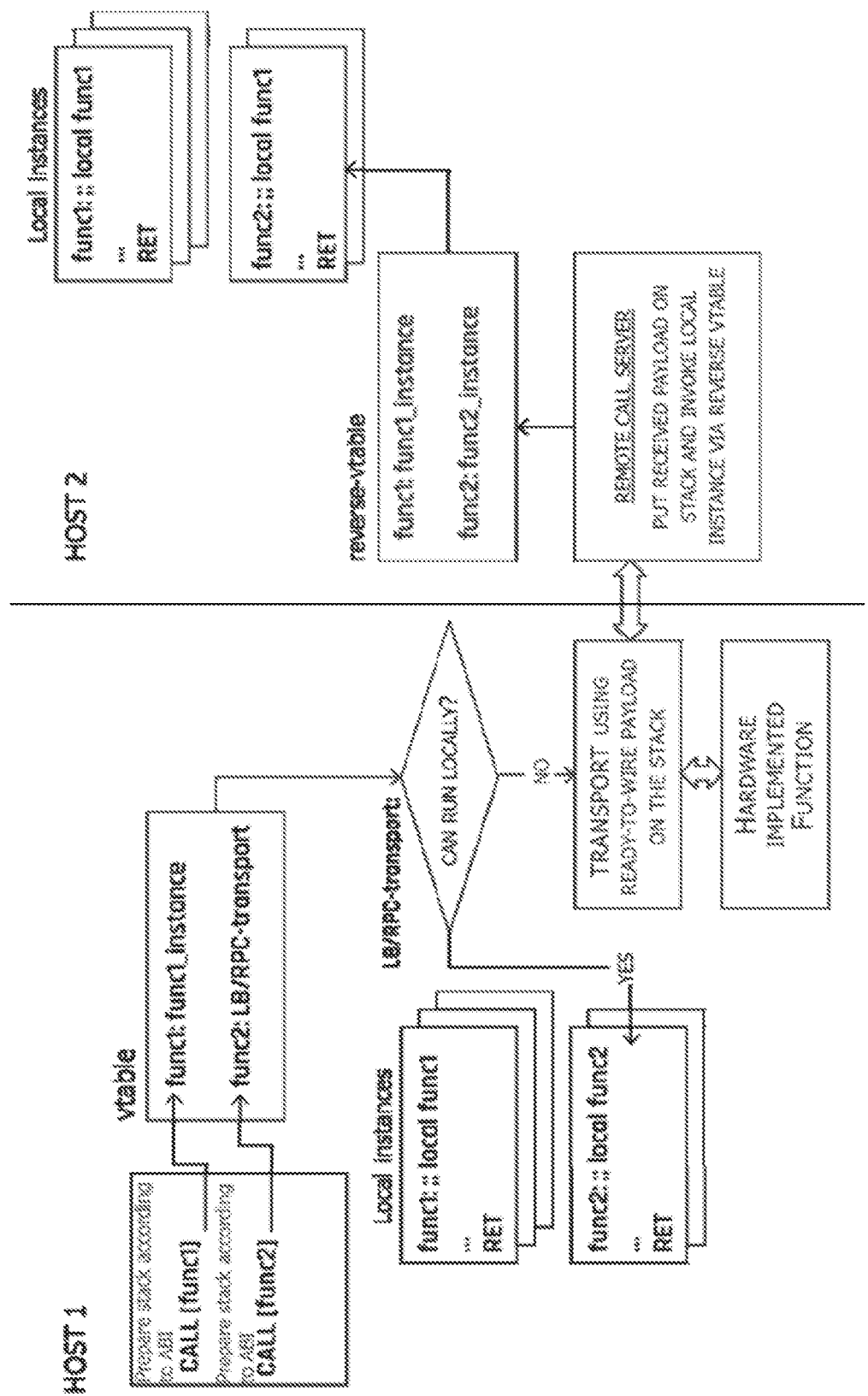

FIG. 47B shows a high-level architecture 4712 in which a remote call is arranged for dispatch on its stack in the same way that a local call executes on the local system.

Turning now to FIG. 47C, a method 4720 of marshalling function parameters is shown. The method 4720 may generally be implemented in an enhanced FaaS system such as, for example, the system 202 (FIG. 2) the system 300 (FIG. 3) and/or the system 400 (FIG. 4), already discussed. More particularly, the method 4620 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 4722 provides for determining a payload for a function. In one example, the payload includes one or more parameter values, the size of the payload, and an identifier of the function. Block 4724 places, at compile time, the payload onto a call stack, wherein the function is uniformly invokable via the payload as either a local instance or a remote instance. Additionally, block 4726 may determine, at runtime, whether to invoke the function as the local instance or to transport the payload to a remote platform. The illustrated method 4720 therefore eliminates bottlenecks associated with the inefficient marshalling of function parameters. Accordingly, enhanced performance, minimal administration, and greater scalability may be achieved.

More efficient data marshalling may therefore involve a scatter/gather of data structures with optional bit-order (MSB/LSB) and type transcoding. With specific regard to optional bit ordering, in some implementations (e.g., when calls are done between heterogeneous architectures, say INTEL↔MIPS or ARM), it may be important to specify the order of bytes in multi-byte types (e.g., 32-bit integer or float). For example, a 32-bit integer 0x12345678 can be encoded as the following sequence of bytes: 0x78, 0x56, 0x34, 0x12 for LSB (least significant byte/bit first) or as 0x12, 0x34, 0x56, 0x78 for MSB (most significant byte/bit first). Accordingly, the receiver might need to reverse the order on load, which is done with special instruction on many architectures. The technology may also use a function hub to translate between CPU-based parameter passing and either remoted invocations or invocations that are handled by an accelerator offload. Accordingly, the target where the work occurs appears exactly like a process local call to the caller.

Additional Notes and Examples

Example 4701 includes at least one computer readable storage medium comprising a set of executable program instructions, which, when executed by a computing device, cause the computing device to determine a payload for a function, and place, at compile time, a code that builds the payload onto a call stack in a format that contains information sufficient to make a call, wherein the function is uniformly invokable via the payload as a local instance, a remote instance or hardware.

Example 4702 includes the at least one computer readable storage medium of Example 4701, wherein the payload includes one or more parameter values, a size of the payload and an identifier of the function.

Example 4703 includes the at least one computer readable storage medium of Example 4701, wherein the instructions, when executed, cause the computing device to determine, at runtime, whether to invoke the function as the local instance or transport the payload to a remote platform.

Capability Transfer Examples

During the operation of a FaaS system, the capabilities of a function (e.g., source function) are often passed to another function (e.g., destination function), which may be local (e.g., sharing memory regions with the source function) or remote (e.g., not sharing memory regions with the destination function). When the functions are relatively unprivileged (e.g., privilege Ring 3), security measures are appropriate to ensure that the capabilities being passed between functions are legitimate. As will be discussed in greater detail, enhanced technology employed by the enhanced FaaS system, such as one shown in FIG. 4, is used to reduce any need for development of, or insertion of, a trusted software runtime to generate function capabilities in a complex software architecture. Moreover, the technology eliminates overhead associated with transferring HTTP messages and copying data in shared memory settings.

Figure 48A:
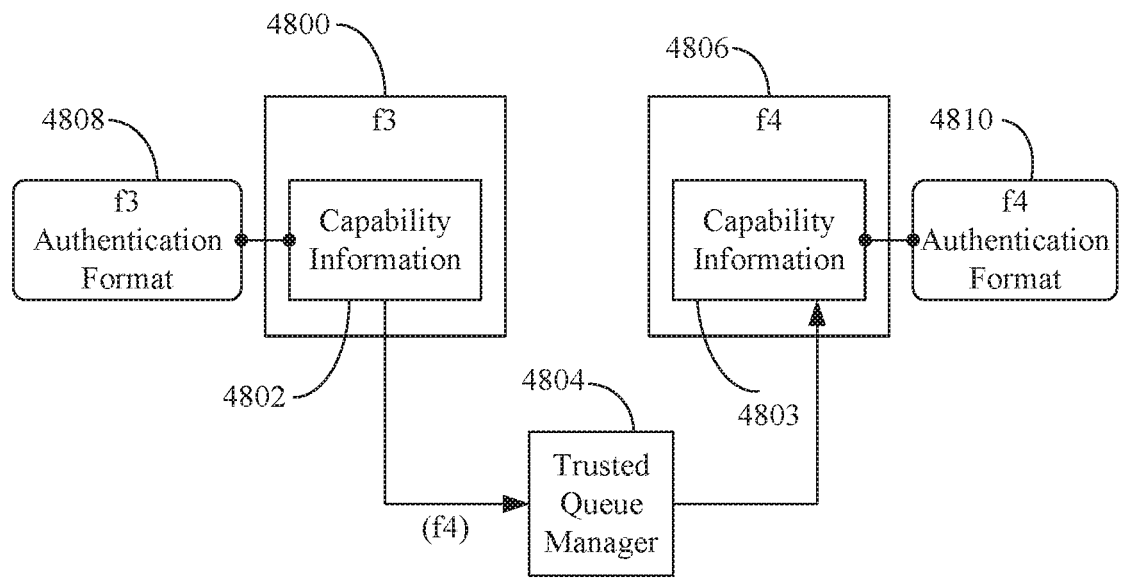

FIG. 48A shows a scenario in which a first function 4800 (source function "f3") sends capability information 4802 to a trusted queue manager 4804 in conjunction with a call/invocation of a second function 4806 (destination function "f4"). In the illustrated example, the trusted queue manager 4804 determines whether the capability information 4802 is valid (e.g., authentic) with respect to a first authentication format 4808, wherein the capability information 4802 and the first authentication format 4808 correspond to the first function 4800. In an embodiment, the first authentication format 4808 is recognized by the first function 4800 and involves the trusted queue manager 4804 using a first key (not shown) assigned to the first function 4800 to determine whether the capability information 4802 is valid. More particularly, the trusted queue manager 4804 may compare the first key to a message authentication code (MAC) embedded in the capability information 4802. Alternatively, the capability information 4802 may be encrypted in such a way that corrupting the capability information 4802 does not provide predictable and usable functionality for an adversary.

If the trusted queue manager 4804 determines that the capability information 4802 is valid with respect to the first authentication format 4808, the trusted queue manager 4804 stores (e.g., enqueues) the capability information to a trusted queue (not shown). The illustrated trusted queue manager 4804 also generates and sends capability information 4803 to the second function 4806 in accordance with a second authentication format 4810 that corresponds to the second function 4806. In an embodiment, the second authentication format 4810 is recognized by the second function 4806 and involves authenticating the capability information 4803 with a second key (not shown) assigned to the second function 4806. In an embodiment, the authentication includes recomputing a MAC using the second key and comparing the result to a MAC embedded in the capability information 4803. Thus, the first authentication format 4808 is typically different from the second authentication format 4810.

Implementing the trusted queue manager 4804 as a hardware queue manager (HQM) eliminates any need for a trusted software runtime to generate the capability information 4802, 4803 in a complex software architecture. Moreover, the trusted queue manager 4804 eliminates overhead associated with transferring messages (e.g., in HTTP format or any other format that may be transferred from f3 to f4) and copying data in shared memory settings. The functions 4800, 4806 may be portable functions (e.g., with portable identities) to the extent that a load balancer dynamically moves the functions 4800, 4806 throughout the FaaS system.

Figure 48B:
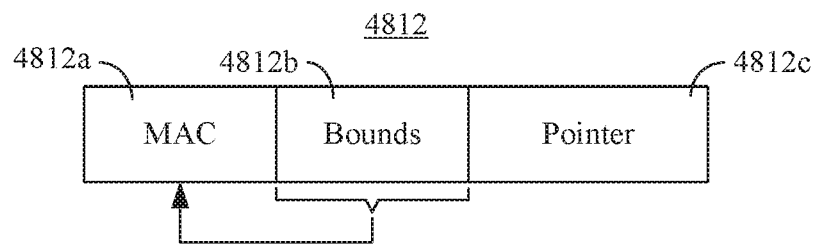

FIG. 48B shows encoded inline capability (EIC) information 4812 (4812a-4812c), which may be readily substituted for the capability information 4802, 4803 (FIG. 48A), already discussed. In the illustrated example, the EIC information 4812 includes a MAC 4812a, boundary information 4812b, and a pointer 4812c. In one example, the MAC 4812a is a tag created by a keyed one-way hash function based on the boundary information 4812b, wherein the secret key that is used to create the MAC 4812a is located in a protected region (e.g., on the host processor). The MAC 4812a is therefore used to confirm that the EIC information 4812 came from the stated sender and has not been changed. Accordingly, the illustrated MAC 4812a protects both the integrity and the authenticity of the EIC information 4812 by enabling verifiers, who also possess the secret key, to detect any changes to the EIC information 4812. In one example, the pointer 4812c references a memory region defined by the boundary information 4812*b*. Thus, when a memory access is attempted by a function, the MAC 4812*a* is checked to ensure that the pointer being used in the access is legitimate and within the memory region defined by the boundary information 4812*b*.

In an embodiment, the EIC information 4812 includes hierarchical encoded inline capabilities. For example, a compound EIC might include a subgroup of EICs, which in turn correspond to virtual (e.g., multicasting) channels in a multilevel hierarchy. Additionally, the EIC information 4812 may include user-level interrupts (ULIs) as a capability and the process address space identifier (PASID) may be enqueued with the EIC information 4812.

Figure 48C:
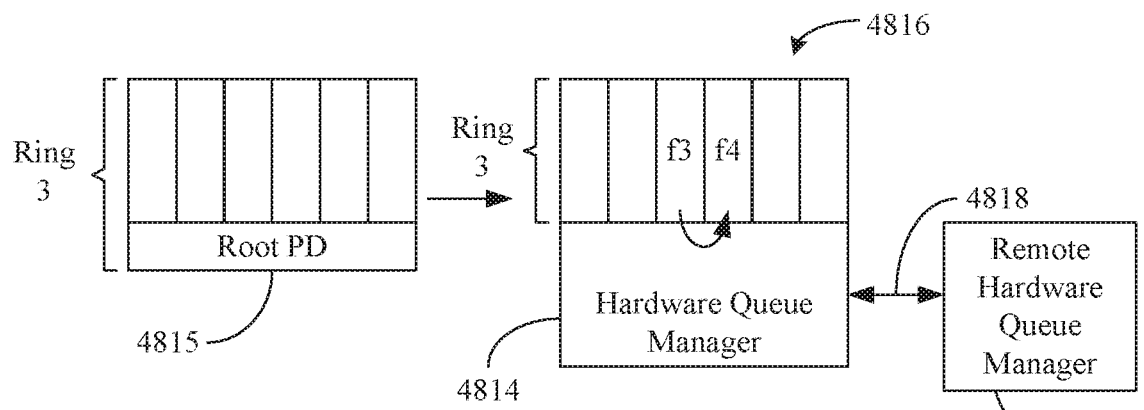

FIG. 48C shows a hardware queue manager 4814 that may be readily substituted for the trusted queue manager 4804 (FIG. 48A), already discussed. In the illustrated example, the hardware queue manager 4814 maintains a set of queues 4816, wherein each queue 4816 holds capability information for a specific function or a set of functions. The illustrated solution therefore enforces virtual channels using hardware management of enqueued capabilities. The hardware queue manager 4814, which has system level privileges (e.g., more privileged than Ring 3), may also exchange key information 4818 with a remote hardware queue manager 4820 (e.g., across edges in another platform/machine). In an embodiment, the hardware queue manager 4814 also assumes the responsibility for updating other context information such as, for example, the key used to authenticate capabilities, range registers indicating the bounds of a private data region for each function, and so forth. The hardware queue manager 4814 therefore represents an efficiency improvement over a conventional root protection domain (PD) 4815 that resides in Ring 3 and acts as a trusted software runtime to generate function capabilities. For example, some conventional root PDs may be implemented as unprivileged software (e.g. in ring 3 of a CPU or in another unprivileged mode on processors) that has access to all memory within a process. The software is responsible for initializing private data region bounds registers, initializing a capability authentication key register, and generating encoded inline capabilities referring to regions of memory in the shared data region that particular non-root PDs are authorized to access, which degrades efficiency. In one example, the hardware queue manager 4814 of the current embodiment is located in a host processor (e.g., CPU) that detects when a context switch is about to occur due to the invocation of a different function.

Figure 48D:
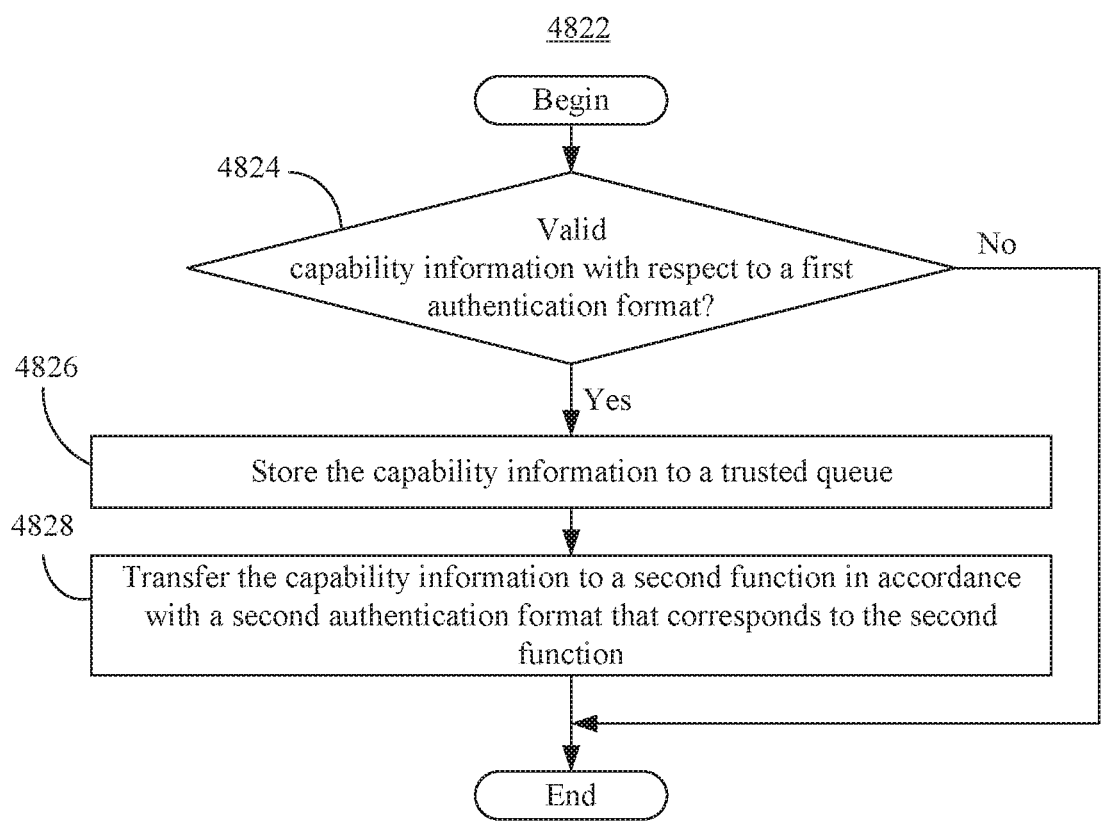

FIG. 48D shows a method 4822 of operating a hardware queue manager. The method 4822 may generally be implemented by a queue manager such as, for example, the trusted queue manager 4804 (FIG. 48A) and/or the hardware queue manager 4814 (FIG. 48C), already discussed. More particularly, the method 4822 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 4824 determines whether capability information is valid/authentic with respect to a first authentication format, wherein the capability information and the first authentication format correspond to a first function. In one example, block 4824 uses a first key associated with the first function to determine whether the capability information is valid. If so, block 4826 stores (e.g., enqueues) the capability information to a trusted queue. In one example, the capability information includes hierarchical encoded inline capabilities.

The capability information is transferred to a second function at block 4828 in accordance with a second authentication format that corresponds to the second function. In an embodiment, the second authentication format specifies the use of a second key associated with the second function to protect and authenticate the capability information during transmission to the second function. In an example, the first function and the second function are portable functions. The illustrated method 4822 therefore reduces any need for a trusted software runtime to generate function capabilities in a complex software architecture. Moreover, the technology eliminates overhead associated with transferring messages and copying data in shared memory settings.

Figure 48E:
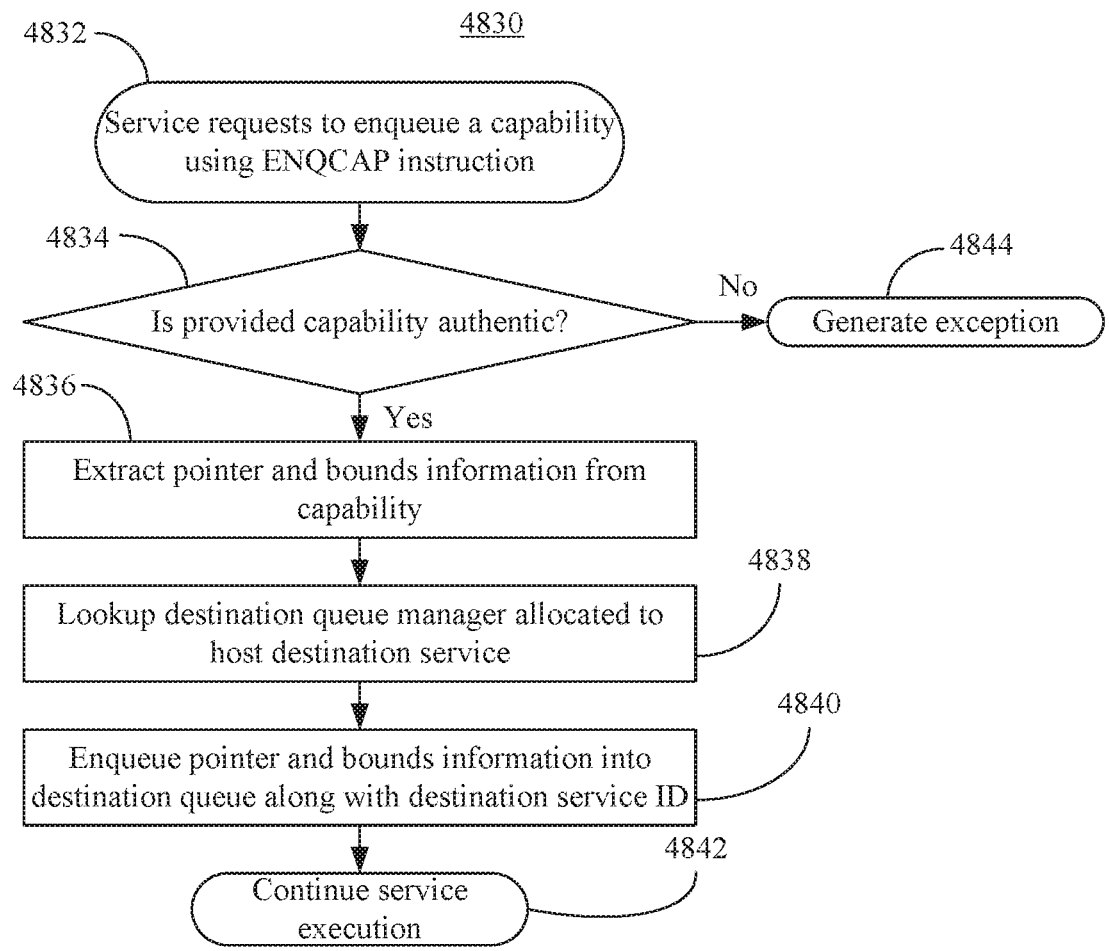

FIG. 48E shows a method 4830 of enqueueing a capability according to an embodiment. The method 4830 may generally be implemented by a queue manager such as, for example, the trusted queue manager 4804 (FIG. 48A) and/or the hardware queue manager 4814 (FIG. 48C), already discussed. More particularly, the method 4830 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 4832 detects one or more service requests to enqueue a capability using a new instruction (e.g., ENQCAP), that specifies the capability to be sent as well as its intended destination. For example, the destination can be specified as a globally- or locally-unique service ID. At illustrated block 4834, ENQCAP uses the current capability authentication key to authenticate the provided capability. If authentication succeeds, then ENQCAP block 4836 extracts the bounds and pointer information from the capability. ENQCAP block 4838 then identifies the appropriate destination queue for the extracted information. For example, this procedure may involve translating the service ID to the ID of a processor that has been allocated to host the service. Each service may be locked to one or more processors, or it may be possible to invoke the service on any processor in a system. It may even be possible to automatically invoke a service on a processor in a different system. Such an invocation would require copying the data referenced by the capability to the destination system. It may also require copying the code for the service to the destination system.

A network protocol for communicating with the destination system may be required. For example, the operating system may be responsible for establishing connectivity between hardware queue manager instances on different systems. The hardware queue managers may then communicate with one another. Illustrated block 4840 enqueues pointer and bounds information into the destination queue along with the destination service ID. Service execution may then be continued at block 4842. If it is determined at block 4834 that the provided capability is not authentic, an exception is generated at illustrated block 4844.

Figure 48F:
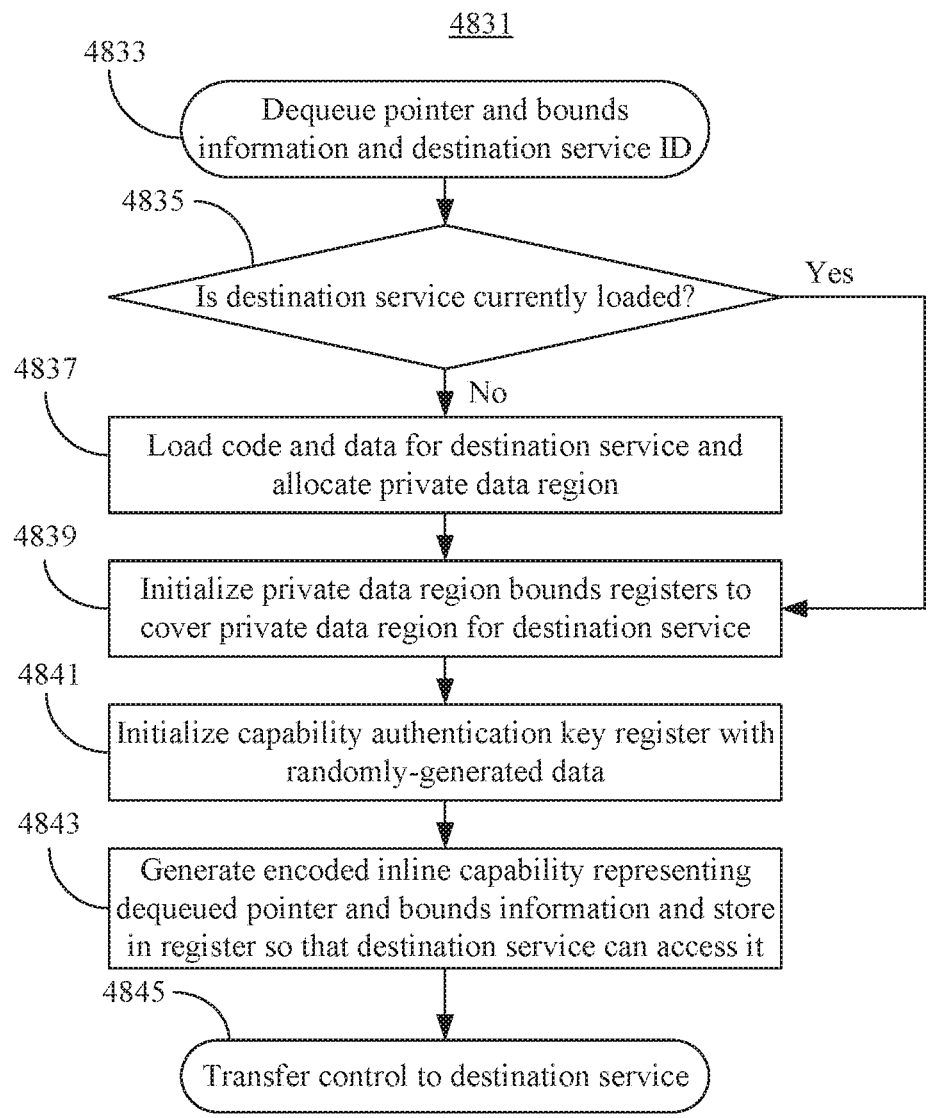

FIG. 48F shows a method 4831 of dequeuing a capability according to an embodiment. The method 4831 may generally be implemented by a queue manager such as, for example, the trusted queue manager 4804 (FIG. 48A) and/or the hardware queue manager 4814 (FIG. 48C), already discussed. More particularly, the method 4831 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 4833 detects a request to dequeue pointer and bounds information, as well as a destination service ID. A determination may be made at block 4835 as to whether the destination service is currently loaded. If not, block 4837 loads code and data for the destination service and allocates a private data region. Additionally, private data region bounds registers are initialized at block 4839 to cover the private data region for the destination service. In an embodiment, block 4841 initializes a capability authentication key register with randomly-generated data. The key in the authentication key register is used as an input when generating the MAC in an encoded (e.g., encrypted) inline capability and/or message. Since non-root PDs are unable to read or access the key, the use of the key helps to prevent non-root PDs from having forging capabilities. Illustrated block 4843 generates an encoded inline capability representing dequeued pointer and bounds information and stores the generated EIC in a register so that the destination service can access it. Block 4845 transfers control to the destination service. If it is determined at block 4835 that the destination service is currently loaded, the method 4831 may bypass block 4837.

Additional Notes and Examples

Example 4801 includes a semiconductor apparatus comprising one or more substrates, and logic coupled to the one or more substrates, wherein the logic is implemented at least partly in configurable logic or fixed-functionality hardware logic, the logic coupled to the one or more substrates to determine whether capability information is valid with respect to a first authentication format, wherein the capability information and the first authentication format correspond to a first function, store the capability information to a queue if the capability information is valid with respect to the first authentication format, and transfer the capability information to a second function in accordance with a second authentication format that corresponds to the second function, wherein the first function and the second function are portable functions, and wherein the capability information includes hierarchical encoded inline capabilities and user-level interrupts.

Example 4802 includes a semiconductor apparatus comprising one or more substrates, and logic coupled to the one or more substrates, wherein the logic is implemented at least partly in configurable logic or fixed-functionality hardware logic, the logic coupled to the one or more substrates to determine a dequeuer pointer and bounds information and destination service ID associated with a function to be executed, in response to the destination service being not currently loaded, to load code and data associated with the function for the identified destination service and to allocate a private data region for executing the function, and transfer control to the identified destination service, wherein allocating the private data region for executing the function comprises initializing one or more private data region bounds registers to cover the private data region for destination service, initializing capability authentication key register with randomly generated data, generating encoded inline capability representing dequeued pointer and bound information, and storing the encoded inline capability in the register for accessible by the destination service.

Intra-Address Space Compartmentalization Examples

Total Memory Encryption (TME) may encrypt a platform's entire memory (e.g., various cache levels) with a single key. TME may be enabled through a BIOS configuration and/or other software, and may help ensure that all data (e.g., customer to credentials, encryption keys, and other IP or personal information) in the memory is encrypted on the external memory bus. Thus, if an application and/or CPU requests data from the memory, the data may be encrypted and then later decrypted after transmission.

The encryption key used for memory encryption may be generated using a hardened random number generator in the CPU and/or a trusted platform manager. In some embodiments, the key may never be exposed to software, thereby reducing the potential for malicious data theft and/or cross-contamination of key usage. In other embodiments, the software may be able to access the keys through key IDs.

Data in-memory and on the external memory buses may be encrypted and is decrypted to be in plain text while inside the CPU and/or by a Trusted Platform Manager (TPM), similar to typical storage encryption. This allows existing software to run unmodified while protecting memory using TME. The TME may be adjusted to only encrypt a portion (e.g., a particular physical address range) of the memory, while leaving another portion (e.g., another physical address range) of the memory to remain unencrypted. Software running on a TME-capable system may read a configuration register in the CPU to have full visibility into the unencrypted portions of memory that are configured to not be encrypted by TME.

Multi-Key TME (MK-TME) extends TME to support multiple encryption keys to provide the ability to specify use of a specific key for only a portion (e.g., page and/or physical address range) of memory. MK-TME allows locally generated keys (e.g., TPM-generated keys and/or CPU-generated keys) and/or third-party keys (e.g., tenant-provided keys that are generated off-platform at a remote location), giving full flexibility to customers. As such, the memory may be encrypted according to multiple encryption keys. So a first address range may be encrypted according to a first key, and a second address range may be encrypted according to a second key.

MK-TME allows virtual machines (VMs) and containers to be cryptographically isolated from each other in memory with separate encryption keys. In a multi-tenant cloud environment, such an isolation is advantageous when sensitive data is being processed by a customer.

VMs and containers may be authorized under certain circumstances to share an individual key, further extending scale and flexibility. For example, if a first FaaS function invokes a second FaaS function, both the first and second functions may be allowed to access the same data. In another example, the same customer may invoke two functions, with one function generating data and another function consuming the generated data. The two functions may be allowed to share keys as described above.

Thus, MK-TME may be used to isolate/compartmentalize functions from one another by encrypting the memory region assigned to each function with a different encryption key. Such an approach reduces any need to assign the functions to separate linear address spaces having separate page tables, which would otherwise incur the overhead of invoking the OS kernel, switching page tables, and refilling the translation lookaside buffer (TLB, which stores the recent translations of virtual memory to physical memory). While the description below is described with respect to functions accessing data through keys, it may be understood that the functions may operate in conjunction with underlying hardware (e.g., CPU or TPM) to decrypt data. For example, the function may execute in such a way that the CPU and/or processor retrieves data from memory, and decrypts the data, thereby allowing the function access to the data.

FIG. 49A shows a mapping between a set of key identifiers (IDs) 4900 (4900a-4900d) and a set of encryption keys 4902 (4902a-4902f) that are used to encrypt memory regions in a shared linear address range. In the illustrated example, a first key ID 4900a is assigned to a first key 4902a and a second key 4902b, a second key ID 4900b maps to a third key 4902c, a third key ID 4900c maps to a fourth key 4902d and a fifth key 4902e, and a fourth key ID 4900d maps to a sixth key 4902f. The illustrated mapping therefore enables the key IDs 4900 to be reused across the keys 4902. For example, if the function corresponding to the first key 4902a terminates or the memory region encrypted with the first key 4902a is otherwise freed up, the first key ID 4900a may be automatically re-assigned to the second key 4902b without switching page tables.

FIG. 49B shows an example of a single address space 4901 in which key ID (kID) multiplexing is not limited to keys and key IDs for private regions. In the illustrated example, kID1 maps to k7 in both functions f1 and f3, kID2 maps to k9 in function f2 and kID3 maps to k9 in function f4. These latter two mappings illustrate that a single underlying key can be mapped from multiple key IDs, which is not necessarily apparent in FIG. 49A.

FIG. 49C shows an example in which a first function 4904 uses (e.g., reads from and/or writes to) a first memory region 4906 that is encrypted with the fourth key 4902d. In the illustrated example, the third key ID 4900c is initially assigned to the fourth key 4902d. When a context switch from the first function 4904 to a second function 4908 occurs, the third key ID 4900c is automatically re-assigned to the fifth key 4902e, which is used to encrypt a second memory region 4910 associated with the second function 4908. Of particular note is that the first memory region 4906 and the second memory region 4910 are located in a shared linear address range 4912. Accordingly, the illustrated solution eliminates the overhead of invoking the OS kernel, switching page tables, and refilling the TLB with translations of virtual memory to physical memory. The illustrated memory regions 4906, 4910 may also be encrypted according to keys ("k9" and "k7," respectively) that are used to encrypt shared memory regions.

More particularly, functions that need to communicate via shared memory should share access to the keys used to encrypt the corresponding regions of shared memory. For example, if functions f1 and f3 need to communicate through a shared memory region 4910, that region can be encrypted using k7, and some key ID in each function can be mapped to k7. The key ID can be the same in both functions, or it can be different. The important thing is that both functions are able to use k7. There may be some advantage, however, to having both functions use the same key ID, since key IDs may be conveyed via physical address bits. Sharing a key ID makes it simple to have just a single linear-to-physical address mapping covering the memory region shared between f1 and f2. Such an approach reduces TLB overheads compared to having multiple linear-to-physical address mappings covering that region to support different key IDs.

For example, a new type of instruction could be defined to switch a key ID to map to a different key. That instruction type could be restricted to only be usable within a particular code range (e.g., defined using a range register). That range could be configured to correspond to a root PD code. That instruction may permit selecting a key from a repository of keys configured by privileged software (e.g., OS or VMM) and/or hardware (e.g., CPU or TPM). Alternatively, the instruction may record a software-provided key into a structure in a location known to privileged software and inaccessible from unprivileged software. The processor may be configured to retrieve the current key ID to key mappings for each function from that structure. For example, to this could occur each time a new function is invoked, or the root PD may invoke an instruction to cause the processor to update its internal state based on the contents of the in-memory structure.

Alternatively, an instruction could be defined to change the key ID in the leaf page table entry or entries responsible for mapping a single virtual address or a range of virtual addresses.

It is apparent that each function may access memory using multiple key IDs. To select the appropriate key ID for each memory access, the function may specify a tag value in each virtual memory address, and that tag value may be mapped to a corresponding key ID in the physical memory address. For example, FIG. 49F illustrates a TLB/page miss handler 4394 that maps between virtual addresses 4932 and physical addresses 4936. The TLB/page miss handler 4394 may be part of the processor. The tag value of the virtual addresses 4932 is used to refer to a value in a slice of linear address bits, such as physical addresses 4936 that may be mapped to a "Key ID" value in some way. "Key ID" is used to refer to the value in a slice of physical address bits that may be mapped to a key in some way, for example through a look-up table that is referenced against the Key ID. Page table entries may specify physical addresses. In the illustrated embodiment, the TLB/page miss handler 4934 translates the virtual address 4932 to the physical address 4936, and may ignore the tag value during translation aside from translating the tag value. The tag value may then be extracted from the virtual address 4932 and inserted into the physical address 4936. Thus, the processor may extract the slice of virtual address bits that specify the tag and insert them into the slice of the physical address that specifies the key ID, as shown in FIG. 49F.

Referring again to FIG. 49E, the private data region for the Root PD may be encrypted using a separate key to prevent adversarial functions from accessing its plaintext contents. No key ID usable from within functions would map to that key.

The code for each function and the root PD could be encrypted using a separate key and key ID to key mappings could be configured to help prevent unauthorized control flow transfers (e.g. directly between functions or from a function to an unauthorized entry point in the Root PD) by only granting each function access to the key used for its own private code region. A trampoline, which may include a process to reach a second location in code via a jump to a first location in code, may be to employed. A trampoline section of code that updates key ID to key mappings when transferring control between the Root PD and a function could be encrypted using a key that is mapped from a key ID accessible from all functions and the Root PD. Alternatively, this trampoline section of code could be replicated for each function so that each function only needs to use a single key to encrypt all of the code executed in the context of that function, including the trampoline code.

Alternatively, the code for all functions and the Root PD could be encrypted using a single, shared key, and a variety of control-flow integrity enforcement mechanisms could be applied to prevent unauthorized control flow transfers. For example, Ser. No. 16/024,547 describes some possible mechanisms.

FIG. 49D shows a single address space 4915 containing a root protection domain 4914 (PD, e.g., user space trusted monitor located in a host processor/CPU), a plurality of per-service private data regions 4917, and a shared data region 4916 having a multiple communications buffers. In the illustrated example, each per-service private data region is encrypted using a different key (e.g., k*). In an embodiment, the root PD 4914 performs mapping updates when switching between functions to avoid the overhead of invoking the kernel. Thus, the illustrated root PD 4914 assigns different key IDs to different keys to minimize the frequency of key ID re-assignments. More particularly, the root PD 4914 can switch to a function with a different key ID than the current function if the destination key ID is already mapped to the key for the destination function. Some key IDs may be accessible from multiple functions to implement shared memory communications.

FIG. 49E shows a method 4918 of updating key ID mappings. The method 4918 may generally be implemented by a root PD such as, for example, the root PD 4914 (FIG. 49D), already discussed. More particularly, the method 4918 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 4920 provides for mapping a key identifier to a first key, wherein the first key is associated with a first function and a first memory region that is encrypted with the first key. A context switch from the first function to a second function is detected at block 4922. Additionally, illustrated block 4924 maps the key identifier to a second key in response to the context switch, wherein the second key is associated with the second function and a second memory region that is encrypted with the second key. In an embodiment, the first memory region and the second memory region share a linear address range. The illustrated method 4918 therefore eliminates the overhead of invoking the OS kernel, switching page tables, and refilling the TLB with translations of virtual memory to physical memory.

Additionally, the first key may be a symmetric key for a first target domain and the second key may be a symmetric key for a second target domain. In one example, the first target domain and/or the second target domain are a sub-domain of a trust domain. In such a case, a "tweak" value in addition to the encryption key (which may be referred to as a "tweak key") might be used with a tweakable cipher that enables a different cryptographic input (e.g., a tweak in addition to the usual key and plaintext or ciphertext inputs) to be specified for each sub-domain. Using tweak keys is often more efficient than specifying an entirely different key for each sub-domain. Tweak keys may allow effectively maintained, separate, sub-trust domains within the trust domain, without the cost of additional keys being maintained in hardware. Since a sub-domain always executes in the context of the "outer" trust domain, and two sub-domains are mutually exclusive in memory address space, the tweak gives us additional pseudo-randomness when used with the primary trust domain key to generate tweak keys. Additionally, when the trust domain is destroyed, the primary key is destroyed which serves the function of effectively scrubbing all the sub-domains contents as well by removing access to any of the tweak keys.

A function may be prevented from accessing keys that it is not authorized to use by having the root PD unmap those keys from any key IDs that may be accessible from the function one-by-one prior to invoking the function. However, that may introduce unnecessary performance overhead. A more efficient alternative may be to support tables mapping address tags to key IDs and to support an efficient operation for switching between such tables. This is analogous to page tables, which map virtual memory addresses to physical memory addresses. If the key mapping tables are stored in memory, as would be beneficial for supporting a large number of functions, then it may also be beneficial to cache mappings from tags to key IDs in a tag to key ID lookaside buffer (TKLB), which is analogous to the translation lookaside buffers (TLBs) used to cache virtual to physical address mappings. Analogously to how TLB entries can be tagged with an address space identifier (ASID) to minimize the need to flush them when switching between different address spaces, TKLB entries could also be tagged with a compartment ID. For example, the compartment ID could be stored in a register that is accessible only from the root PD.

Alternatively, or in addition to tag to key ID mapping tables, a mechanism/procedure may be defined to block access by a function to specific tag values or key IDs. For example, a bitmask could be stored in a register or in-memory bitmap that is only accessible from the root PD. The root PD could update that tag mask structure prior to invoking each function to indicate the tags or key IDs that the function is authorized to use. For example, a set bit in the tag mask structure could indicate that a particular tag or key ID corresponding to that bit position is authorized for use by the function. Separate tag mask structures could be defined to regulate code fetches and data accesses (e.g., to enforce execute-only memory permissions). Data accesses may even be further sub-divided as reads, writes, etc., with separate tag mask structures being defined for each type of access.

Invocations of an instruction to change tag values in page table entries could also be checked against tag mask structures to ensure that the new function is authorized to use both the original and new tag values. The instruction may accept a specifier for which tag mask structures should be checked, or they could all be checked in parallel.

To further reduce performance overheads, it may be beneficial to enable functions to drop access to specified tags. For example, an instruction might be defined that only supports clearing bits in the tag mask structure. This approach could enable a function to drop access to certain tags prior to invoking a sub-compartment to effectively sandbox that sub-compartment by preventing it from accessing memory regions that are associated with the dropped tag. The sub-compartment would be prevented from re-enabling access to that tag itself.

The root PD may be invoked to re-add access to tag values that are currently blocked by the tag mask structure. Alternatively, call gates could be extended with tag mask structure values to be applied when passing through each gate.

The functionality to drop access to a tag value could be useful for enforcing execute-only memory permissions in a Just-In-Time (JIT) compiler, since the JIT could write code to memory and then drop the corresponding tag from the data tag mask structure while still leaving it enabled in the code tag mask structure.

Furthermore, hardware could optionally enforce a policy that prevents writes to executable memory within a non-root protection domain. When enabled either for all tag values or for specific tag values, it could check both data write and code fetch tag mask structures when fetching an instruction with one of the tag values for which this policy is enabled. It could block the fetch if either the fetch tag mask structure blocks access to the corresponding tag or if the data write tag mask structure allows access to the corresponding tag.

It may be undesirable in some applications to give up virtual address bits to specify a tag. Alternatively, the effective segment of each memory access could be used to select a tag or key ID. For example, code fetches could use a tag associated with the code segment (CS), ordinary data accesses would use a tag associated with the data segment (DS), and stack accesses would use a tag associated with the stack segment. The tag associations could be based on just the effective segment (e.g. CS vs. DS), the relevant segment selector value, or other information contained within the segment register (e.g., loaded from a segment descriptor table entry). The segment to tag associations could be stored in registers or an in-memory table. The association data may be updateable only from privileged software or also from authorized unprivileged software. For example, an instruction could be defined to update those associations, and its use could be restricted to the code range of the root PD.

Additional Notes and Examples

Example 4901 includes at least one computer readable storage medium comprising a set of executable program instructions, which, when executed by a computing system, cause the computing system to map a key identifier to a first key, wherein the first key is associated with a first function and a first memory region that is encrypted with the first key, detect a context switch from the first function to a second function, and map the key identifier to a second key in response to the context switch, wherein the second key is associated with the second function and a second memory region that is encrypted with the second key, wherein the first memory region and the second memory region are in a same address space, wherein the first key is a key for a first target domain and the second key is a key for a second target domain, and wherein one or more of the first target domain or the second target domains are a sub-domain of a trust domain.

Unprivileged Protection Key Update Examples

FIG. 50A shows multiple service protection domains 5000 (5000a-5000n) that enable access permissions to be specified for multiple functions. More particularly, the illustrated domains 5000 correspond to multiple "slices" in a protection key register (PKR, not shown) with each slice containing a bit to disable all access to a page (e.g., memory region) and a bit to disable writes to the page. A root protection domain (PD) 5002 (e.g., trusted userspace monitor) generally schedules functions for execution and assigns each scheduled function to one of the domains 5000 (e.g., and one of the slices in the protection key register). Thus, the root PD 5002 might assign a first function to a first domain 5000a (e.g., and a first slice in the PKR), a second function to a second domain 5000b (e.g., and a second slice in the PKR), and so forth. Some functions may be allocated access to multiple slices (e.g., if one of the slices regulates accesses to a region of memory that is shared between multiple functions).

The illustrated root PD 5002 also assigns protection key IDs to the scheduled functions, wherein each protection key ID maps to an encryption key that is used to encrypt the page that the function will access. When the root PD 5002 schedules a function for execution, the root PD 5002 determines whether a protection key ID is available to be assigned to the function. In this regard, the number of functions may be greater than the number of protection key IDs (e.g., "n" in the illustrated example). If there is no protection key available to be assigned to the function, the number of protection key IDs is insufficient with respect to the set of all functions. In such a case, the illustrated root PD 5002 issues an update instruction 5004 to a host processor (e.g., CPU, not shown). The update instruction 5004 instructs the host processor to update an entry 5006 in a hierarchical page table 5008 with a new protection key ID ($PKID_{new}$). In this regard, the update instruction 5004 may indicate what value to use for the new protection key ID as well as the linear address of the page. Thus, the host processor may use the linear address to locate (e.g., via a page walk), the entry 5006 in the hierarchical page table 5008. The entries in the page table 5008 are privileged data structures that are protected from direct modification by unprivileged components. The illustrated approach therefore permits only the protection key ID information to be modified.

In an embodiment, the update instruction 5004 also instructs the host to processor to clear a paging structure cache. Such an approach ensures that stale protection key ID values are removed from the paging structure cache. Additionally, the update instruction 5004 may instruct the host processor to clear the TLB (not shown), which stores the recent translations of virtual memory addresses to physical memory addresses, as already noted. The illustrated solution therefore eliminates any need to invoke the OS kernel when updating the page table 5008 with a new protection key ID.

Other security concerns may be addressed by restricting access to the update instruction 5004. In one example, the functions are limited to managed runtime functions. In general, a managed runtime environment may be a high level solution such as, for example, HTML5 (Hypertext Markup Language 5, e.g., HTML5 Editor's Draft 8 May 2012, W3C), Dalvik (ANDROID Open Handset Alliance/OHA), ART (ANDROID Runtime, OHA), C# (e.g., C# 5.0, MICROSOFT Corp., Aug. 15, 2012), .NET (e.g., .NET Framework 4.5, MICROSOFT Corp., Oct. 17, 2013), Ruby (e.g., Ruby 2.1.0, Y. Matsumoto, Dec. 25, 2013), Perl (e.g., Perl 5.18.2, Perl.org, Jan. 7, 2014), Python (e.g., Python 3.3.3, Python Software Foundation, Nov. 19, 2013), JAVA (e.g., JAVA Standard Edition 7 Update 51, ORACLE Corp., Jan. 14, 2014), etc. Thus, security is enhanced because the functions are interpreted or invoked just-in-time (JIT) by the managed runtime environment.

Additionally, atomic execution of the functions may be enforced. Such an approach therefore protects against the suspension of a thread in the middle of operation, which might occur in applications that manipulate their own threads (e.g., database, JAVA and/or garbage collection applications).

Other approaches to restricting access to the update instruction 5004 include scanning untrusted code to verify that it does not contain the update instruction 5004, blocking any attempts to execute the update instruction 5004 outside a specified region containing the root PD 5002, and so forth.

FIG. 50B shows a method 5010 of updating protection key IDs. The method 5010 may generally be implemented by a root PD such as, for example, the root PD 5002 (FIG. 50A), already discussed. More particularly, the method 5010 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 5012 provides for detecting an insufficient number of protection key IDs with respect to a set of functions. Block 5014 instructs, in response to the insufficient number of protection key IDs, a processor such as, for example, a host processor, to update a page table entry with a new protection key ID. Block 5014 may therefore include issuing an update instruction that indicates the new protection key ID and a linear address, wherein the processor performs a page walk of a hierarchical page table based on the linear address. The illustrated block 5014 also instructs (e.g., via the update instruction) the processor to clear a paging structure cache and a TLB. In one example, the set of functions are restricted to managed runtime functions to limit unauthorized access to the update instruction. In an embodiment, block 5014 also updates the page table entries (PTEs) for all pages allocated to a particular service because each service likely has more than a single page. Block 5014 may also include enforcing atomic execution of the functions, scanning untrusted code to verify that it does not contain the update instruction, blocking any attempts to execute the update instruction outside a specified region containing the root PD, and so forth. The illustrated method 5010 therefore eliminates any need to invoke the OS kernel when updating page table entries.

Additional Notes and Examples

Example 5001 includes at least one computer readable storage medium comprising a set of executable program instructions, which, when executed by a computing system, cause the computing system to detect an insufficient number of protection key identifiers with respect to a set of functions, instruct a host processor to update a page table entry in response to the insufficient number of protection key identifiers, wherein the set of functions are limited to managed runtime functions, and enforce an atomic execution of the set of functions.

Example 5002 includes the at least one computer readable storage medium of Example 5001, wherein the executable program instructions, when executed, further cause the computing system to instruct the host processor to clear a paging structure cache.

Example 5003 includes the at least one computer readable storage medium of Example 5001, wherein the executable program instructions, when executed, cause the computing system to instruct the host processor to clear a translation lookaside buffer.

Unprivileged Page Table Permission Update Examples

FIG. 51A shows a process 5100 that includes a sandbox 5102 (e.g., a set of rules operating as a code isolation tool), wherein the sandbox 5102 restricts an unprivileged component such as, for example, a user-mode broker 5104 (e.g., user space compartment manager) from accessing "sandboxed" resources such as, for example, logical block addresses 5112 in a logical address space 5106 and physical pages 5114 in a physical address space 5110. User-mode sandboxing may conventionally be enforced via software-oriented access-controls. In the illustrated example, an instruction set architecture page table (ISA-PT) 5108 maps the logical address space 5106 to the physical address space 5110 and a page miss handler (PMH) 5116 of a CPU 5118 performs address translation when a page address translation misses the TLB (not shown). Strengthening the software-based access controls with hardware may be particularly advantageous with regard to "side-channel attacks" that might occur when multi-tenant workloads share the logical address space 5106 and the CPU 5118 is an out-of-order (OOO) processor that uses speculative execution.

With specific regard to out-of-order processing, the CPU completes certain instructions and begins performing other instructions even if they will later be found to have been disallowed, and therefore, none of those instructions would be eligible for actual retirement. Thus, none of the results of the disallowed instructions actually ever modify any variables. A side-channel attack risk may come in the form of observing the performance effects that result from such carefully constructed operations that the attacker knows are forbidden. Thus, even if the attacker cannot access a location X, but can temporarily make sufficient progress due to OOO to construct a value V out of a few bits at location X (e.g., with *X & 0x0F), the attacker can then access some other permissible range such as, for example, R[V]. The access to R[V] causes a performance difference later, when the attacker can check if the access to R[ . . . ] at different possible values of V produces cache hits or misses by checking latencies. In this way, the attacker learns about contents at location X a few bits at a time without ever actually allowed to see those contents directly.

FaaS workloads may be a server form of multi-tenant workload that also can to benefit from finer-grain access-control that is enforced via hardware. More particularly, FaaS can benefit from hardware providing access-control at a finer granular memory object level where conventional hardware may limit memory permissions at a 4096-byte (4 KB) level (e.g., a page level).

The illustrated solution provides a sub-page permission model that is hardware-enforced and enables an OS 5120 to delegate permission management and updates on a fine-granularity to the user-mode broker 5104. Thus, multi-tenant workloads may run in the same logical address space 5106 with the user-mode broker 5104 managing the compartment permissions. Of particular note, however, is that the OS 5120 continues to control the mapping of the linear address space 5106 to the physical address space 5110.

In general, protection keys enable the logical address space 5106 to be partitioned in a sparse manner across a plurality of sub-domains (e.g., sixteen sub-domains) within the process 5100. Conventional protection keys may allow read/write (RW) permissions to be expressed for pages on a per-domain basis, and a fast switch between domains without making system calls.

In the illustrated example, a sub-page permissions table (SPPT) 5122 specifies permissions at the level of a sub-page 5125 (e.g., 128-byte granularity for a 4 KB page) and is exposed to the user-mode broker 5104. The illustrated user-mode broker 5104 has read/write/execute (RWX) privileges with respect to the SPPT 5122. In one example, the user-mode broker 5104 is able to reduce sub-page permissions (e.g., downgrade RW access to read only access) with respect to sub-pages in the physical address space 5110 but does not have the ability to increase sub-page permissions (e.g., upgrade read only access to read/write access).

Sub-page permissions are therefore enforced for each physical page 5124 (or guest physical address/GPA in a virtualized environment) in the physical address space 5110 via the SPPT 5122. In an embodiment, the SPPT 5122 maps the physical pages 5124 to a bit-vector of permissions, where each bit corresponds to write-permissions for a sub-page region. Rather than walking the SPPT 5122 by the CPU 5118 only when an extended page table (EPT) page entry specifies that sub-page permissions are enabled for a specific 4 KB mapping, the illustrated solution changes the page walk to 1) completing the ISA-PT 5108 page walk, translating a logical block address 5126 to an address of a physical page 5124, and then using the address of the physical page 5124 to walk the SPPT 5122. Thus, sub-page permissions are enabled/triggered by the ISA-PT 5108, but without requiring a virtual machine monitor (VMM) to enable EPTs.

Additionally, the SPPT 5122 is exposed to the user-mode broker 5104 by appropriate mappings in the ISA-PT 5108 that are created by the OS 5120 for the user-mode broker 5104. These mappings permit the user-mode broker 5104 to modify permissions freely, but not the logical block address to physical address mappings for pages, which are still controlled by the OS 5120.

Moreover, a new instruction may be used by the user-mode broker 5104 to invalidate the SPPT 5122, wherein the new instruction flushes cached permissions. Such an approach is particularly useful when permissions are reduced. Any cached permissions may also be flushed if/when the user-mode broker 5104 is migrated across CPUs on process context switches. In one example, the sub-page permissions are exposed to a high-level program language on a per-security domain basis. Additionally, call stack regions may be used to isolate called functions from caller functions (e.g., to prevent reverse stack attacks from called functions with relatively low privileges).

FIG. 51B shows a method 5128 of controlling sub-page permissions. The method 5128 may generally be implemented by an OS such as, for example, the OS 5120 (FIG. 51A), already discussed. In an embodiment, the method 5128 is implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 5130 provides for preventing an unprivileged component (e.g., user-mode broker) from modifying mappings between a logical address space and a physical address space that is shared by a plurality of functions. The unprivileged component is permitted at block 5132 to reduce sub-page permissions with respect to the physical address space.

In one example, block 5134 exposes the sub-page permissions to a high-level program language on a per-security domain basis. In this regard, the sub-page permissions might be exposed to certain security domains as a tag or annotation.

In an embodiment, block 5136 isolates a called function in the plurality of functions from a caller function in the plurality of functions via call stack regions. Block 5136 therefore protects against reverse stack attacks in which the called function is at a lower privileged than the caller function. The blocks 5130, 5132, 5134, 5136 are independent operations that may be performed non-sequentially and/or in any suitable order.

Additional Notes and Examples

Example 5101 includes at least one computer readable storage medium comprising a set of executable program instructions, which, when executed by a computing system, cause the computing system to prevent an unprivileged component from modifying mappings between a logical address space and a physical address space that is shared by a plurality of functions, permit the unprivileged component to reduce sub-page permissions with respect to the physical address space, expose the sub-page permissions to a high level program language on a per-security domain basis, and isolate a called function in the plurality of functions from a caller function in the plurality of functions via call stack regions.

Deprivileged Mode Examples

Improving hardware utilization and overall business efficiency is commonly achieved by sharing hardware computing resources among tenants, with examples being cloud computing, FaaS, etc. This sharing may require a process to delimit actions and prevent cross-tenant workload interaction to preserve security and privacy. Thus, delimited actions refers to anything that needs to be pre-limited (e.g., contained)—usually this containment applies to code that is "hemmed in" through some kind of isolation such as, for example, sandboxes, virtual machines (VMs), and so forth.

While VMs, processes, namespaces (e.g., for "containers"), and managed run-times may address the containment challenge, there remains considerable room for improvement with regard to start-up time, invocation performance and/or memory overhead, limiting applicability and density of deployments.

Some applications such as Network Functions Virtualization (NFV) may require latency in the nanoseconds to microseconds range, while a conventional FaaS implementation might cause latencies on the order of tens of milliseconds when invoking a cold-start container. Poll-mode, typically used in such applications, has another set of problems —density and memory overhead associated with isolation. Indeed, VMs and containers may still use a relatively large amount of memory —from a few MBs to GBs. Accordingly, the amount of instances on a server is typically limited. Moreover, poll-mode execution may not work well with oversubscription. By contrast, a run-to-completion approach is typically either applicable only within a single application (e.g., due to shared memory space between function calls), or, if mapped to a FaaS model with good isolation, will have high latency.

In extreme cases, when all applications are decomposed into functions (e.g., including the OS, platform and infrastructure services) running both locally and remotely, demands for performance may reach hundreds of millions of calls per second per server—something only conventionally reachable via native code and CALL instructions.

A recently-developed technique referred to as deprivileged mode provides a framework to run functions in a sandboxed environment while sharing an address space made up of multiple memory "segments." Sandboxing prevents functions from changing segments and limits control transfers to be contained within a sandbox defined by a code segment. A local descriptor table (LDT) is a memory table that contains memory segment descriptors. Each segment descriptor includes a selector (e.g., index) and various properties such as, for example, a base address, size, access privileges, etc. In order to reference a memory segment, a function loads the selector into a segment register, which causes the descriptor properties to be transferred from the LDT into the host processor. Subsequent modifications to the LDT are generally not effective unless the segment register is reloaded. The deprivileged mode approach relies on the use of modified segment descriptors, where the base address is treated as a low bound of range. Because the number of available segment descriptors is limited, however, dynamic updates to LDT may be required. Additionally, a low number of segment registers allows only a limited number of memory ranges to be used, putting pressure on the caller to place all parameters and results in the continuous memory area.

The technology described herein extends deprivileged mode to capability information such as, for example, encoded inline capability (EIC) information and enables the use of multiple memory regions while sharing an address space. More particularly, a configuration of deprivileged mode is implemented to enforce EIC semantics for memory accesses, define application binary interfaces (ABIs) for EIC that covers stack accesses, and define the handling of system/external calls from deprivileged code.

FIG. 52A shows a deprivileged mode path 5200 for a function attempting to access shared memory (e.g., a memory segment). In the illustrated example, one or more capability constraints (e.g., semantics) of EIC information 5202 (5202a-5202c) are enforced on the attempted memory access. The EIC information 5202 includes a MAC 5202a, boundary information 5202b, and a pointer 5202c. In one example, the MAC 5202a is a tag created by a keyed one-way hash function based on the boundary information 5202b, wherein the secret key that is used to create the MAC 5202a is located in a protected region (e.g., on the host processor). The MAC 5202a is therefore used to confirm that the EIC information 5202 came from the stated sender and has not been changed. Accordingly, the illustrated MAC 5202a protects both the integrity and the authenticity of the EIC information 5202 by enabling verifiers, who also possess the secret key, to detect any changes to the EIC information 5202. In one example, the pointer 5202c references a memory region defined by the boundary information 5202b. Thus, when a memory access is attempted by a deprivileged function, the MAC 5202a is checked to ensure that the pointer being used in the access is legitimate and within the memory region defined by the boundary information 5202b.

In one example, the segment descriptors are also modified to define ABIs for EIC that covers stack accesses and define the handling of system/external calls from deprivileged code. An ABI is a calling convention under which specific behavioral responsibilities are followed by the caller and the callee. As used herein, the ABI specifies how the segment registers or capabilities of the callee are loaded and how segment registers or capabilities of the caller are unloaded in a call. Similarly, the ABI specifies how the respective loading/unloading is performed in the reverse if a callee completes and the caller needs to resume from the point that the callee completed. In an embodiment, the ABI states that all references to memory are passed as EICs and placed on callee's stack in a specific binary format (e.g., composed of bit fields—MAC/Bound/Pointer) to distinguish it from regular pointers containing single bit field for the pointer. In the illustrated example, a privileged mode path 5204 bypasses the capability constraints of the EIC information 5202.

FIG. 52B shows a method 5206 of controlling sub-page permissions. In an embodiment, the method 5206 is implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 5208 detects an invocation of a function, where a determination is made at block 5210 as to whether the function is invoked in deprivileged mode. As already noted, the deprivileged mode may provide framework to run functions in a sandboxed environment while sharing an address space made up of multiple memory segments. In response to the function being invoked in deprivileged mode, illustrated block 5212 enforces one or more capability constraints on attempts by the function to access the shared memory space. In one example, block 5212 includes defining an ABI for EIC that covers stack accesses and defining the handling of system/external calls from deprivileged code, in addition to enforcing the EIC semantic for memory accesses. The illustrated method therefore addresses concerns over a limited number of available segment descriptors and a low number of segment registers in a FaaS system containing an extremely large number of calls per second per server.

Code segment descriptors and the code segment register could be extended to store a capability authentication key that would be automatically loaded into the EIC authentication key register when loading each descriptor. Alternatively, the code segment selector could be used as an input for the EIC authentication scheme and/or algorithm (e.g., concatenated with the other inputs to the MAC generation procedure or as a cryptographic tweak).

Alternatively, the capability authentication key or other inputs for the EIC authentication scheme and/or algorithm could be drawn from other segment registers (e.g., data segment/DS, extra segment/ES, general segments (FS, GS), or stack segment/SS).

Additional Notes and Examples

Example 5201 includes at least one computer readable storage medium comprising a set of executable program instructions, which, when executed by a computing system, cause the computing system to detect an invocation of a function, determine that the function is invoked in a deprivileged mode, and enforce, in response to the function being invoked in the deprivileged mode, one or more capability constraints on attempts by the function to access a shared memory space.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

As will be understood, a computer and/or computing device as used herein may include various circuitry, including and not limited to CPU, GPU, FPGA, ASIC, etc.

We claim:

1. At least one non-transitory computer readable storage medium comprising a set of executable computer programming instructions for providing enhanced function as a service (FaaS) to a plurality of users, which, when executed by a computing system, cause the computing system to:
execute a plurality of functions on one or more architectural subsystems in the computing system in response to one or more events received from the plurality of users, the one or more architectural subsystems representing an abstraction of execution environment for the plurality of functions and a plurality of containers associated with the plurality of functions;
allocate a plurality of computing resources of the computing system to facilitate the execution of the plurality of functions by one or more software and orchestration subsystems in the computing system;
analyze a plurality of parameters associated with the plurality of functions and a plurality of parameters associated with the plurality of computing resources of the computing system;
store the plurality of functions and analysis of the plurality of parameters associated with the plurality of functions and the plurality of parameters associated with the plurality of computing resources in one or more networking and storage subsystems in the computing system, locations for storing of the plurality of functions and the analysis being selected for enhancing locality between the plurality of functions and the corresponding plurality of computing resources and reducing function execution latency;
secure the execution of the plurality of functions by one or more security subsystems in the computing system; and
conduct a first relayout of a first response object based on a first subset of a set of fields associated with a first invocation instance of a function, wherein the first relayout of the first response object includes reordering or reconfiguring the first response object.

2. The at least one non-transitory computer readable storage medium of claim 1, wherein the executable computer programming instructions, when executed by the computing system, cause the computing system to:
monitor the execution of one or more functions of the plurality of functions;
partition one or more computing resources of the computing system into one or more shared resources, each function of the plurality of functions having access to the one or more shared resource;
provide a scheduling of allocation of one or more computing resources for executing the plurality of function, the scheduling being generated based, at least, upon history-based resource scheduling of functions being executed by the computing system;
redirect data of the one or more functions to selected computing devices for execution;
select one or more functions of the plurality of functions according to service level parameters associated with the one or more functions;
combine the selected one or more functions into a combined function for execution.

3. The at least one non-transitory computer readable storage medium of claim 1, wherein the executable computer programming instructions, when executed by the computing system, cause the computing system to:
receive a trigger agent for invoking a second function of the plurality of functions, the second function being executed subsequent to a function of the plurality of functions being currently executed;
provide feedback to the trigger agent to indicate readiness for invocation of the second function;
in response to a multi-tenant function of the plurality of function being a multi-tenant accelerated function, initiate one or more versions of the multi-tenant function;
provide synchronization among execution actions associated with the executing of the plurality of functions, the execution actions being distributed among a plurality of computing devices and/or containers associated with the plurality of functions; and
trigger the invocation of the second function in response to a criterion being met.

4. The at least one non-transitory computer readable storage medium of claim 1, wherein the executable computer programming instructions, when executed by the computing system, cause the computing system to:
identify shared information among two or more functions of the plurality of functions;
analyze whether a called function called for execution requires the shared information for execution; and
route the called function to an execution environment based on the analysis.

5. The at least one non-transitory computer readable storage medium of claim 1, wherein the executable computer programming instructions, when executed by the computing system, cause the computing system to:
analyze an execution function during an initial execution of the execution function;
store usage data generated from the analysis of the execution function as a meta data file for subsequent invocation of the execution function, each invocation of the execution function generating at least one meta data file for the execution function;
reclaim the execution function based on one or more factors, each of the one or more factors indicating execution status of the execution function, the execution status indicating whether to reclaim the execution function; and
apply a security policy to the execution function, the security policy associated with the execution environment of the execution function, one or more function sets of the execution function being encoded with a same security key.

6. The at least one non-transitory computer readable storage medium of claim 1, wherein the executable computer programming instructions, when executed by the computing system, cause the computing system to:
identify one or more computing resources needs of a first function of the plurality of functions;

pre-reserve one or more identified computing resources in a container to which the first function is assigned, each identified computing resource having a resource directory identification;
apply an accelerator to evaluate a cost function for specific workloads of the first function;
construct data transfer and communication links between the pre-reserved computing resources and the first function to reduce data transfer or communication latency; and
monitor one or more quality of service (QoS) measurements associated with the execution of the first function, at least one QoS measurement being defined by a vector.

7. The at least one non-transitory computer readable storage medium of claim 6, further comprising executable computer programming instructions, when executed by the computing system, cause the computing system to:
detect one or more anomalies at runtime of executing the first function, the anomalies being detected using dynamic profiling capabilities in the runtime of executing the first function;
report results of the detecting of the one or more anomalies to at least one performance analysis tool; and
maintain a profile mapping of the first function based on the dynamic profiling capabilities.

8. The at least one non-transitory computer readable storage medium of claim 1, wherein the executable computer programming instructions, when executed by the computing system, cause the computing system to:
associate resource characteristics with executed functions to generate demand fingerprints of the executed functions at each stage of execution of the executed functions, the demand fingerprints being associated with parameters of the executed functions and at least one tenant that invokes the executed functions, and the demand fingerprints being generated based on application of a trained sequence analytics machine learning model;
generate reports on the usage of different resources at multiple stages of execution of the executed functions; and
allocate resources to the executed functions for executing the executed functions based on the generated reports.

9. The at least one non-transitory computer readable storage medium of claim 1, wherein the executable computer programming instructions, when executed by the computing system, cause the computing system to:
detect a first call by the first invocation instance of the function that returns the set of fields; and
identify the first subset of the set of fields.

10. The at least one non-transitory computer readable storage medium of claim 1, wherein the executable computer programming instructions, when executed by the computing system, cause the computing system to:
determine a payload for a first function of the plurality of functions; and
place, at compile time, a code that builds the payload onto a call stack in a format that contains information sufficient to make a call, wherein the first function is uniformly invokable via the payload as a local instance, a remote instance or hardware.

11. The at least one non-transitory computer readable storage medium of claim 1, wherein the executable computer programming instructions, when executed by the computing system, cause the computing system to:
determine whether capability information associated with a first function of the plurality of functions is valid with respect to a first authentication format, wherein the capability information and the first authentication format correspond to the first function;
store the capability information to a queue if the capability information is valid with respect to the first authentication format; and
transfer the capability information to a second function of the plurality of functions in accordance with a second authentication format that corresponds to the second function, wherein the first function and the second function are portable functions, a portable function having a portable identity and being dynamically movable throughout the computing system by a load balancer, and wherein the capability information includes hierarchical encoded inline capabilities and user-level interrupts.

12. The at least one non-transitory computer readable storage medium of claim 1, wherein the executable computer programming instructions, when executed by the computing system, cause the computing system to:
map a key identifier to a first key, wherein the first key is associated with a first function and a first memory region that is encrypted with the first key;
detect a context switch from the first function to a second function; and
map the key identifier to a second key in response to the context switch,
wherein the second key is associated with the second function and a second memory region that is encrypted with the second key,
wherein the first memory region and the second memory region share a linear address range,
wherein the first key is a key for a first target domain and the second key is a key for a second target domain, and wherein one or more of the first target domains or the second target domains are a sub-domain of a trust domain.

13. The at least one non-transitory computer readable storage medium of claim 1, wherein the executable computer programming instructions, when executed by the computing system, cause the computing system to:
detect an insufficient number of protection key identifiers with respect to a set of functions of the plurality of functions;
instruct a host computing device to update a page table entry in response to the insufficient number of protection key identifiers, wherein the set of functions are limited to managed runtime functions; and
enforce an atomic execution of the set of functions.

14. The at least one non-transitory computer readable storage medium of claim 1, wherein the executable computer programming instructions, when executed by the computing system, cause the computing system to:
determine whether a software thread is running on a hardware logical thread;
swap a tag into a register when the software thread is running on the hardware logical thread; and
set at least one of a cache capacity and memory bandwidth for the tag.

15. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:

execute a plurality of functions on one or more architectural subsystems in a computing system in response to one or more events received from a plurality of users, the one or more architectural subsystems representing an abstraction of execution environment for the plurality of functions and a plurality of containers associated with the plurality of functions;

allocate a plurality of computing resources of the computing system to facilitate the execution of the plurality of functions by one or more software and orchestration subsystems in the computing system;

analyze a plurality of parameters associated with the plurality of functions and a plurality of parameters associated with the plurality of computing resources of the computing system;

store the plurality of functions and analysis of the plurality of parameters associated with the plurality of functions and the plurality of parameters associated with the plurality of computing resources in one or more networking and storage subsystems in the computing system, locations for storing of the plurality of functions and the analysis being selected for enhancing locality between the plurality of functions and the corresponding plurality of computing resources and reducing function execution latency;

secure the execution of the plurality of function by one or more security subsystems in the computing system; and conduct a first relayout of a first response object based on a first subset of a set of fields associated with a first invocation instance of a function, wherein the first relayout of the first response object includes reordering or reconfiguring the first response object.

16. The semiconductor apparatus of claim 15, wherein the logic coupled to the one or more substrates is to:

monitor the execution of one or more functions of the plurality of functions;

partition one or more computing resources of the computing system into one or more shared resources, each function of the plurality of functions having access to the one or more shared resource;

provide a scheduling of allocation of one or more computing resources for executing the plurality of functions, the scheduling being generated based, at least, upon history-based resource scheduling of functions being executed by the computing system;

redirect data of the one or more functions to selected computing devices for execution;

select one or more functions of the plurality of functions according to service level parameters associated with the one or more functions;

combine the selected one or more functions into a combined function for execution.

17. The semiconductor apparatus of claim 15, wherein the logic coupled to the one or more substrates is to:

receive a trigger agent for invoking a second function of the plurality of functions, the second function being executed subsequent to a function of the plurality of functions being currently executed;

provide feedback to the trigger agent to indicate readiness for the invocation of the second function;

in response to a multi-tenant function of the plurality of function being a multi-tenant accelerated function, initiate one or more versions of the multi-tenant function;

provide synchronization among execution actions associated with the executing of the plurality of functions, the execution actions being distributed among a plurality of computing devices and/or containers associated with the plurality of functions; and trigger the invocation of the second function in response to a criterion being met.

18. The semiconductor apparatus of claim 15, wherein the logic coupled to the one or more substrates is to:

identify shared information among two or more functions of the plurality of functions;

analyze whether a called function called for execution requires the shared information for execution; and route the called function to an execution environment based on the analysis.

19. The semiconductor apparatus of claim 15, wherein the logic coupled to the one or more substrates is to:

analyze an execution function during an initial execution of the function;

store usage data generated from the analysis of the function as a meta data file for subsequent invocation of the execution function, each invocation of the function generating at least one meta data file for the execution function;

reclaim the execution function based on one or more factors, each of the one or more factors indicating execution status of the execution function, the execution status indicating whether to reclaim the execution function; and apply a security policy to the execution function, the security policy associated with the execution environment of the function, one or more function sets of the execution function being encoded with a same security key.

20. The semiconductor apparatus of claim 15, wherein the logic coupled to the one or more substrates is to:

identify one or more computing resources needs of a first function of the plurality of functions;

pre-reserve one or more identified computing resources in a container to which the first function is assigned, each identified computing resource having a resource directory identification;

apply an accelerator to evaluate a cost function for specific workloads of the first function;

construct data transfer and communication links between the pre-reserved computing resources and the first function to reduce data transfer or communication latency; and monitor one or more quality of service (QoS) measurements associated with the execution of the first function, at least one QoS measurement being defined by a vector.

21. The semiconductor apparatus of claim 20, wherein the logic coupled to the one or more substrates is to:

detect one or more anomalies at runtime of executing the first function, the anomalies being detected using dynamic profiling capabilities in the runtime of executing the first function;

report results of the detecting of the one or more anomalies to at least one performance analysis tool; and maintain a profile mapping of the first function based on the dynamic profiling capabilities.

22. The semiconductor apparatus of claim 15, wherein the logic coupled to the one or more substrates is to:

associate resource characteristics with executed functions to generate demand fingerprints of the executed functions at each stage of execution of the executed functions, the demand fingerprints being associated with parameters of the executed functions and at least one tenant that invokes the executed functions, and the demand fingerprints being generated based on application of a trained sequence analytics machine learning model;
generate reports on the usage of different resources at multiple stages of execution of the executed functions; and
allocate resources to the executed functions for executing the executed functions based on the generated reports.

23. The semiconductor apparatus of claim 15, wherein the logic coupled to the one or more substrates is to:
detect a first call by the first invocation instance of the function that returns the set of fields; and
identify the first subset of the set of fields.

24. The semiconductor apparatus of claim 15, wherein the logic coupled to the one or more substrates is to:
determine a payload for a first function of the plurality of functions; and
place, at compile time, a code that builds the payload onto a call stack in a format that contains information sufficient to make a call, wherein the first function is uniformly invokable via the payload as a local instance, a remote instance or hardware.

25. The semiconductor apparatus of claim 15, wherein the logic coupled to the one or more substrates is to:
determine whether capability information associated with a first function of the plurality of functions is valid with respect to a first authentication format, wherein the capability information and the first authentication format correspond to the first function;
store the capability information to a queue if the capability information is valid with respect to the first authentication format; and
transfer the capability information to a second function of the plurality of functions in accordance with a second authentication format that corresponds to the second function, wherein the first function and the second function are portable functions, a portable function having a portable identity and being dynamically movable throughout the computing system by a load balancer, and wherein the capability information includes hierarchical encoded inline capabilities and user-level interrupts.

26. The semiconductor apparatus of claim 15, wherein the logic coupled to the one or more substrates is to:
map a key identifier to a first key, wherein the first key is associated with a first function and a first memory region that is encrypted with the first key;
detect a context switch from the first function to a second function; and
map the key identifier to a second key in response to the context switch,
wherein the second key is associated with the second function and a second memory region that is encrypted with the second key,
wherein the first memory region and the second memory region share a linear address range,
wherein the first key is a key for a first target domain and the second key is a key for a second target domain, and wherein one or more of the first target domains or the second target domains are a sub-domain of a trust domain.

27. The semiconductor apparatus of claim 15, wherein the logic coupled to the one or more substrates is to:
detect an insufficient number of protection key identifiers with respect to a set of functions of the plurality of functions;
instruct a host computing device to update a page table entry in response to the insufficient number of protection key identifiers, wherein the set of functions are limited to managed runtime functions; and
enforce an atomic execution of the set of functions.

28. The semiconductor apparatus of claim 15, wherein the logic coupled to the one or more substrates is to:
determine whether a software thread is running on a hardware logical thread;
swap a tag into a register when the software thread is running on the hardware logical thread; and
set at least one of a cache capacity and memory bandwidth for the tag.

29. A system for providing enhanced function as a service (FaaS) to a plurality of users, comprising:
a memory; and
a processor coupled to the memory, the processor including logic to:
execute a plurality of functions on one or more architectural subsystems in a computing system in response to one or more events received from the plurality of users, the one or more architectural subsystems representing an abstraction of execution environment for the plurality of functions and a plurality of containers associated with the plurality of functions;
allocate a plurality of computing resources of the computing system to facilitate the execution of the plurality of functions by one or more software and orchestration subsystems in the computing system;
analyze a plurality of parameters associated with the plurality of functions and a plurality of parameters associated with the plurality of computing resources of the computing system;
storing the plurality of functions and analysis of the plurality of parameters associated with the plurality of functions and the plurality of parameters associated with the plurality of computing resources in one or more networking and storage subsystems in the computing system, locations for storing of the plurality of functions and the analysis being selected for enhancing locality between the plurality of functions and the corresponding plurality of computing resources and reducing function execution latency;
secure the execution of the plurality of function by one or more security subsystems in the computing system;
detect an insufficient number of protection key identifiers with respect to a set of functions of the plurality of functions; and
instruct a host computing device to update a page table entry in response to the insufficient number of protection key identifiers, wherein the set of functions are limited to managed runtime functions.

30. A method for providing enhanced function as a service (FaaS) to a plurality of users, comprising:
executing a plurality of functions on one or more architectural subsystems in a computing system in response to one or more events received from the plurality of users, the one or more architectural subsystems representing an abstraction of execution environment for the plurality of functions and a plurality of containers associated with the plurality of functions;
allocating a plurality of computing resources of the computing system to facilitate the execution of the plurality of functions by one or more software and orchestration subsystems in the computing system;

analyzing a plurality of parameters associated with the plurality of functions and a plurality of parameters associated with the plurality of computing resources of the computing system;

storing the plurality of functions and analysis of the plurality of parameters associated with the plurality of functions and the plurality of parameters associated with the computing resources in one or more networking and storage subsystems in the computing system, locations for storing of the plurality of functions and the analysis being selected for enhancing locality between the plurality of functions and the corresponding plurality of computing resources and reducing function execution latency;

securing the execution of the plurality of functions by one or more security subsystems in the computing system;

detect an insufficient number of protection key identifiers with respect to a set of functions of the plurality of functions; and instruct a host computing device to update a page table entry in response to the insufficient number of protection key identifiers, wherein the set of functions are limited to managed runtime functions.

* * * * *